United States Patent
Griffin et al.

(10) Patent No.: US 11,822,780 B2
(45) Date of Patent: Nov. 21, 2023

(54) DEVICES, METHODS, AND SYSTEMS FOR PERFORMING CONTENT MANIPULATION OPERATIONS

(71) Applicant: Apple Inc., Cupertino, CA (US)

(72) Inventors: Bradley W. Griffin, Redwood City, CA (US); Morgan H. Winer, Sunnyvale, CA (US); Wayne Carl Westerman, Burlingame, CA (US); Christopher D. Soli, Santa Cruz, CA (US); Meredith Noelani Burkle, San Francisco, CA (US); Sara E. Andrews, Campbell, CA (US); Toby Charles Wood Paterson, San Francisco, CA (US); Stephen O. Lemay, Palo Alto, CA (US); Patrick Lee Coffman, San Francisco, CA (US); Tiffany S. Jon, Cupertino, CA (US); Aram D. Kudurshian, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/842,997

(22) Filed: Apr. 8, 2020

(65) Prior Publication Data
US 2020/0326841 A1    Oct. 15, 2020

Related U.S. Application Data

(60) Provisional application No. 62/855,974, filed on Jun. 1, 2019, provisional application No. 62/834,270, filed on Apr. 15, 2019.

(51) Int. Cl.
G06F 3/04883    (2022.01)

(52) U.S. Cl.
CPC .............................. *G06F 3/04883* (2013.01)

(58) Field of Classification Search
CPC ................................................. G06F 3/04883
See application file for complete search history.

(56) References Cited

U.S. PATENT DOCUMENTS

| | | | |
|---|---|---|---|
| 2009/0143141 A1* | 6/2009 | Wells | G07F 17/3239 463/37 |
| 2012/0013556 A1* | 1/2012 | Chen | G06F 3/017 345/173 |
| 2013/0016129 A1* | 1/2013 | Gossweiler, III | G06F 1/1694 345/667 |

(Continued)

*Primary Examiner* — Seth A Silverman
(74) *Attorney, Agent, or Firm* — Fernando & Partners, LLP

(57) ABSTRACT

A method includes displaying, via a display device, first content with respect to which a first plurality of editing operations have been performed. The method further includes while displaying the first content, detecting, on the touch-sensitive surface, a first multi-finger gesture. The method further includes in response to detecting the first multi-finger gesture: in accordance with a determination that the first multi-finger gesture includes more than a first predetermined amount of movement in a first direction, undoing one of the first plurality of editing operations; and in accordance with a determination that the first multi-finger gesture includes more than a first predetermined amount of movement in a second direction that is different from the first direction, redoing one of the first plurality of editing operations.

22 Claims, 209 Drawing Sheets

(56) References Cited

U.S. PATENT DOCUMENTS

| | | | |
|---|---|---|---|
| 2014/0298266 A1* | 10/2014 | Lapp | G06F 3/04886 715/835 |
| 2014/0317539 A1* | 10/2014 | Unpingco | G06F 3/0481 715/764 |
| 2015/0339051 A1* | 11/2015 | Yang | G06F 3/0482 382/189 |
| 2016/0004432 A1* | 1/2016 | Bernstein | G06F 3/0486 715/769 |
| 2016/0188181 A1* | 6/2016 | Smith | G06F 3/04886 715/765 |

* cited by examiner

1000

```
┌─────────────────────────────────────────────────────────────────┐
│ At an electronic device with one or more processors, a non-transitory memory, a │─ 1002
│ touch-sensitive surface, and a display device:                  │
│     display, via the display device, first content with respect to which a first │
│ plurality of editing operations have been performed             │
└─────────────────────────────────────────────────────────────────┘
                            │
                          (A-E)
                            ▼
┌─────────────────────────────────────────────────────────────────┐
│     While displaying the first content, detect, on the touch-sensitive surface, a first │─ 1004
│ multi-finger gesture                                            │
│                          (F-G)                                  │
└─────────────────────────────────────────────────────────────────┘
                            ▼
┌─────────────────────────────────────────────────────────────────┐─ 1006
│ In response to detecting the first multi-finger gesture:        │
│     in accordance with a determination that the first multi-finger gesture │
│ includes more than a first predetermined amount of movement in a first │
│ direction, undo one of the first plurality of editing operations │
│                           (H)                                   │
└─────────────────────────────────────────────────────────────────┘
                            ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│     After undoing one of the first plurality of editing operations in response to │─ 1008
│ detecting the first multi-finger gesture, detect, on the touch-sensitive surface of the │
│ electronic device, a second multi-finger gesture; and           │
│     in response to determining that the second multi-finger gesture includes more │
│ than the first predetermined amount of movement in the first direction, undo another │
│ one of the first plurality of editing operations                │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                            ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│     Detect, on the touch-sensitive surface, a first multi-finger tap input a first │─ 1010
│ amount of time after undoing the one or more of the first plurality of editing │
│ operations;                                                     │
│     in accordance with a determination that the first amount of time satisfies a │
│ threshold condition, undo another one of the first plurality of editing operations; and │
│     in accordance with a determination that the first amount of time does not │
│ satisfy the threshold condition, forego undoing another one of the first plurality of │
│ editing operations                                              │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                            ▼
┌─────────────────────────────────────────────────────────────────┐─ 1012
│ In response to detecting the first multi-finger gesture:        │
│         in accordance with a determination that the first multi-finger gesture │
│ includes more than the first predetermined amount of movement in a second │
│ direction that is different from the first direction, redo one of the first plurality of │
│ editing operations                                              │
│                           (I)                                   │
└─────────────────────────────────────────────────────────────────┘
```

While displaying the first content, detect, on the touch-sensitive surface, a multi-finger tap input; and in response to detecting the multi-finger tap input, display, via the display device, an interface including a plurality of content manipulation operation affordances indicative of a corresponding plurality of content manipulation operations ⎯ 1014

> In accordance with a determination that the first multi-finger gesture is in the first direction, changing the appearance of a first one of the plurality of content manipulation operation affordances that corresponds to an undo operation;
>
> in accordance with a determination that the first multi-finger gesture is in the second direction, change the appearance of a second one of the plurality of content manipulation operation affordances that corresponds to a redo operation; and
>
> in accordance with a determination that the first multi-finger gesture is in the third direction, change the appearance of a third one of the plurality of content manipulation operation affordances that corresponds to a particular one of the plurality of content manipulation operations different from the undo operation and the redo operation, wherein the third direction is different from the first direction and the second direction ⎯ 1016

---

While displaying the interface: in response to detecting the first multi-finger gesture, in accordance with a determination that the first multi-finger gesture includes less than the first predetermined amount of movement, maintain display of the user interface without performing any the plurality of content manipulation operations ⎯ 1018

---

Detect, on the touch-sensitive surface of the electronic device, a first input directed to a respective one of the plurality of content manipulation operation affordances; and In response to detecting the first input, perform a content manipulation operation corresponding to the respective one of the plurality of content manipulation operation affordances ⎯ 1020

---

Detect on the touch-sensitive surface of the electronic device, a drag input directed to an undo affordance of the plurality of content manipulation operation affordances; and in response to detecting the drag input, partially undo a particular one of the first plurality of editing operations without undoing any other of the first plurality of editing operations ⎯ 1022

While displaying the first content, detect, on the touch-sensitive surface, a single-finger single-tap input; and
  in response to detecting the single-finger tap input, perform a particular operation different from an undo operation or a redo operation ~1024

While displaying the first content, detect, on the touch-sensitive surface, a single-finger double-tap input; and
  in response to detecting the single-finger double-tap input, perform a particular operation different from an undo operation or a redo operation ~1026

While displaying the first content, detect, on the touch-sensitive surface, a single-finger swipe input; and
  in response to detecting the single-finger swipe input, perform a particular operation different from an undo operation or a redo operation ~1028

While displaying the first content, detect, on the touch-sensitive surface, a second multi-finger gesture, wherein the second multi-finger gesture is associated with more than a threshold number of fingers associated with the first multi-finger gesture; and
  in response to detecting the second multi-finger gesture, perform a particular operation different from an undo operation or a redo operation ~1030

The first multi-finger gesture is detected within a first application interface of a first application

---

Detect, on the touch-sensitive surface of the electronic device, a second multi-finger gesture within a second application interface of a second application that is different from the first application, wherein the second application interface includes second content with respect to which a second plurality of editing operations have been performed; — 1034

In response to detecting the second multi-finger gesture:

in accordance with a determination that the second multi-finger gesture includes more than the first predetermined amount of movement in the first direction, undo one of the second plurality of editing operations; and in accordance with a determination that second first multi-finger gesture includes more than the first predetermined amount of movement in the second direction, redo one of the second plurality of editing operations

---

(G)

In response to detecting the first multi-finger gesture, in accordance with a determination that the first multi-finger gesture includes more than the first predetermined amount of movement in a third direction that is different from the first direction and the second direction, copy selected first content — 1036

In response to detecting the first multi-finger gesture, in accordance with a determination that the first multi-finger gesture includes more than the first predetermined amount of movement in a fourth direction that is different from the first direction, the second direction, and the third direction, paste previously selected first content — 1038

In response to detecting the first multi-finger gesture, in accordance with a determination that the first multi-finger gesture includes more than a predetermined number of multi-finger tap inputs, undo one or more of the first plurality of operation — 1040

In response to detecting the first multi-finger gesture: in accordance with a determination that the first multi-finger gesture includes more than a second predetermined amount of movement in the first direction, undo another one of the first plurality of editing operations, wherein the second predetermined amount of movement in the first direction is larger than the first predetermined amount of movement in the first direction — 1042

In response to detecting the first multi-finger gesture:
in accordance with the determination that the first multi-finger gesture includes more than the first predetermined amount of movement in the first direction, display an undo indicator indicative of an undo operation — 1044

In response to detecting the first multi-finger gesture:
in accordance with a determination that the first multi-finger gesture includes more than a second predetermined amount of movement in the second direction, redo another one of the first plurality of editing operations, wherein the second predetermined amount of movement in the first direction is larger than the first predetermined amount of movement in the first direction — 1046

In response to detecting the first multi-finger gesture:
in accordance with the determination that the first multi-finger gesture includes more than the first predetermined amount of movement in the second direction, display a redo indicator indicative of a redo operation — 1048

In response to detecting the first gesture:
 in accordance with a determination that the first gesture is directed to a location outside of the scrubber and corresponds to the first gesture type, undo the one or more groups of operations without partially undoing any of the groups of operations; and
 in accordance with a determination that the first gesture is directed to the location outside of the scrubber and corresponds to the second gesture type, undo the set of operations based on the magnitude of the first gesture ⎯1114

In response to detecting the first gesture: in accordance with a determination that the first gesture is directed to the second one of the plurality of distinct undo affordances, undo the corresponding first one and the corresponding second one of the plurality of groups of operations without partially undoing any other group of operations of the plurality of groups of operations ⎯1116

In response to detecting the first gesture: in accordance with the determination that the first gesture corresponds to a first movement input, move the first one of the plurality of distinct undo affordances from a first location within the scrubber to a second location within the scrubber, wherein the magnitude of the first gesture determines the second location ⎯1118

The distance between the first one of the plurality of distinct undo affordances and the second one of the plurality of distinct undo affordances indicates a scope of the corresponding first one of the plurality of groups of operations ⎯1120

In response to detecting the first gesture:
    in accordance with a determination that the first gesture is directed to the first one of the plurality of distinct undo affordances, undo the corresponding first one of the plurality of groups of operations without partially undoing any other group of operations of the plurality of groups of operations; and
    in accordance with a determination that the first gesture corresponds to a first movement input across the partial undo operation region towards the second one of the plurality of distinct undo affordances, undo a portion of the corresponding first one of the plurality of groups of operations, wherein the portion is less than the entirety of the corresponding first one of the plurality of groups of operations — 1122

The first movement input originates at the first one of the plurality of distinct undo affordance — 1124 after undoing the portion of the corresponding first one of the plurality of groups of operations, detect a second gesture that corresponds to a second movement input away from the first one of the plurality of distinct undo affordances; and
    in response to detecting the second gesture, redo the portion of the corresponding first one of the plurality of groups of operations based on the magnitude of the second gesture — 1126

```
While displaying the content, detect a second input performed with two
contacts that includes a two-finger pinch gesture including a third movement of the     ─ 1416
two contacts toward each other, wherein the second input is directed to a portion of
the content; and
    in response to detecting the second input, perform a zooming operation with
respect to the portion of the content
```

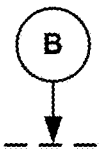

```
While displaying the content, detect, on the touch-sensitive surface, a second
input performed with more than three contacts that includes a multi-finger pinch     ─ 1418
gesture including a third movement of the more than three contacts toward each
other; and
    in response to detecting the second input, perform a system-level operation
```

- While displaying the content and before detect the first input, detect, on the touch-sensitive surface, a selection gesture; and
  in response to detecting the selection gesture, perform a first selection operation on the subset of the content — 1420

- Detect first and second contacts of the plurality of contacts dragging on the touch-sensitive surface; and
    in response to detecting the first and second contacts dragging on the touch-sensitive surface, place a focus-selector at a first location, wherein the first location is based on a termination point of the dragging relative to the subset of the content — 1422

- Detect, on the touch-sensitive surface, a third contact of the plurality of contacts in addition to the first and second contacts;
    detect, on the touch-sensitive surface, the first, second, and third contacts moving on the touch-sensitive surface; and
    in response to detecting the first, second, and third contacts moving on the touch-sensitive surface, move the focus-selector from the first location to a second location and perform the first selection operation — 1424

- Detect a release of one of the contacts from the touch-sensitive surface;
    after detecting the release of one of the contacts, detect, on the touch-sensitive surface, the third contact in addition to the first and second contacts;
    detect the first, second, and third contacts moving on the touch-sensitive surface; and
    in response to detecting the first, second, and third contacts moving on the touch-sensitive surface, move the focus-selector from the second location to a third location and perform a second selection operation that is different from the first selection operation — 1426

- In response to detecting the first input, change an appearance of the subset of the content — 1428

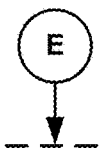

```
In response to detecting the first input, display, via the display device, an      ┌─1430
interface including a plurality of content manipulation operation indicators including a
first content manipulation operation indicator that is indicative of the first content
manipulation operation and a second content manipulation operation indicator that is
indicative of the second content manipulation operation In response to detecting the first input:                                      ┌─1432
        distinguish an appearance of the first content manipulation
    operation indicator from the remainder of the interface; and
        in accordance with the determination that the first input
    includes the second movement of the plurality of contacts, distinguish an
    appearance of the second content manipulation operation indicator from
    the remainder of the interface
```

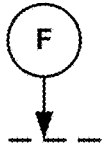

```
In response to detecting the first input:                                          ┌─1434
    in accordance with a determination that the first input includes a third
movement of the two or more of the plurality of contacts away from
each other after the first movement of two or more of the plurality of
contacts toward each other, forego performing the first and second
content manipulation operation
```

```
    In response to the first movement of two or more of the plurality of contacts  ┌─1436
toward each other, change an appearance of the content;
    after changing the appearance of the content, detect a third movement of the
plurality of contacts away from each other; and
    in response to detecting the third movement of the plurality of contacts away
from each other, reverse at least a portion of the change in appearance of the content
```

The second content manipulation operation is selected based on a distance of the second movement and performing the second content manipulation operation includes:
 in accordance with a determination that the second movement is greater than a first movement threshold and less than a second movement threshold, perform a first alternative operation; and
 in accordance with a determination that the second movement is greater than the second movement threshold, perform a second alternative operation that is different from the first alternative operation
—1438

The second content manipulation operation is selected based on a direction of the second movement and performing the second content manipulation operation includes:
 in accordance with a determination that the second movement is in a first direction, perform a first alternative operation; and
 in accordance with a determination that the second movement is in a second direction that is different from the first direction, perform a second alternative operation that is different from the first alternative operation
—1440

After detecting the first multi-finger gesture, detect, on the touch-sensitive surface, a multi-finger drag gesture performed with the contacts, wherein the multi-finger drag gesture corresponds to a continuation of the first multi-finger gesture; and in response to detecting the multi-finger drag gesture:
    in accordance with a determination that the multi-finger drag gesture more than a predetermined amount of movement in a first direction, undo an additional one of the plurality of operations —1518

In response to detecting the multi-finger drag gesture:
    in accordance with a determination that the multi-finger drag gesture includes more than the predetermined amount of movement in a second direction that is different from the first direction, redo an additional one of the one or more previously undone operations —1520

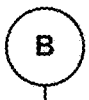

After undoing the one or more of the plurality of operations, detect, on the touch-sensitive surface, a second multi-finger gesture in the first direction, wherein the second multi-finger gesture corresponds to a continuation of the first multi-finger gesture in the first direction; and
    in response to detecting the second multi-finger gesture in the first direction, undo an additional one of the plurality of operations —1522

Select the additional one of the plurality of operations based on a reverse sequential order —1524

After redoing the one or more previously undone operations, detect, on the touch-sensitive surface, a second multi-finger gesture in the second direction, wherein the second multi-finger gesture corresponds to a continuation of the first multi-finger gesture in the second direction; and
    in response to detecting the second multi-finger gesture in the second direction, redo an additional one of the one or more previously undone operations —1526

Select the additional one of the one or more previously undone operations based on a reverse sequential order —1528

After detecting the first multi-finger gesture, detect, on the touch-sensitive surface, a second multi-finger gesture performed with the contacts, wherein the second multi-finger gesture corresponds to a continuation of the first multi-finger gesture; and ~1530 in response to detecting the second multi-finger gesture:

in accordance with a determination that the first multi-finger gesture includes rotation of the contacts as the group in the first direction and that the second multi-finger gesture includes rotation of the contacts as the group in the second direction, redo the one or more of the plurality of previously undone operations; and in accordance with a determination that the first multi-finger gesture includes rotation of the contacts as the group in the second direction and that the second multi-finger gesture includes rotation of the contacts as the group in the first direction, undo the one or more previously redone operations

Figure 15C

DEVICES, METHODS, AND SYSTEMS FOR PERFORMING CONTENT MANIPULATION OPERATIONS

CROSS-REFERENCE TO RELATED APPLICATIONS

This application claims priority to U.S. Provisional Patent App. No. 62/855,974 filed on Jun. 1, 2019 and U.S. Provisional Patent App. No. 62/834,270, filed on Apr. 15, 2019, both of which are hereby incorporated by reference in their entirety.

TECHNICAL FIELD

This relates generally to electronic devices performing content manipulation operations, and, in particular, to electronic devices that detect inputs in order to perform the content manipulation operations on content with respect to which previous editing operations have been performed.

BACKGROUND

Using inputs for performing content manipulation operations within user interfaces of an electronic device has become ubiquitous. For example, the electronic device uses peripheral-type inputs (e.g., a touch-screen input, mouse, keyboard) in order to perform undo, redo, cut, copy, and/or paste operations on content with respect to which previous editing operations have been performed.

However, many of these inputs provide limited and inefficient control for having the electronic device perform the content manipulation operations. Accordingly, repetitive, complex, and/or cumbersome inputs or input types may be needed to in order for the electronic device to perform a particular content manipulation operation.

SUMMARY

Accordingly, there is a need for a robust and efficient mechanism for an electronic device to utilize one or more inputs in order to perform content manipulation operations on content within a user interface. In particular, there is a need for the electronic device to have faster, more efficient methods and interfaces for performing content manipulation operations. Such methods and interfaces optionally complement or replace conventional methods for manipulating user interfaces. Such methods and interfaces reduce the number, extent, and/or nature of the inputs from a user and produce a more efficient human-machine interface. Accordingly, for battery-operated devices, such methods and interfaces conserve power and increase the time between battery charges.

The above deficiencies and other problems associated with the electronic devices performing content manipulation operations are reduced or eliminated by the disclosed devices, systems, and methods. In some embodiments, the electronic device is a desktop computer. In some embodiments, the electronic device is portable (e.g., a notebook computer, tablet computer, or handheld device). In some embodiments, the electronic device is a personal electronic device, such as a mobile phone or a wearable device (e.g., a smartwatch). In some embodiments, the electronic device has a touchpad. In some embodiments, the electronic device has a touch-sensitive display (also known as a "touch screen" or "touch-screen display"). In some embodiments, the electronic device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the user interacts with the GUI primarily through user interactions with the stylus while the stylus is not in physical contact with the touch-sensitive surface. In some embodiments, the user interacts with the GUI primarily through finger and/or hand contacts and gestures on the stylus while the user is holding the stylus. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with one or more processors, a non-transitory memory, a touch-sensitive surface, and a display device. The method includes displaying, via the display device, first content with respect to which a first plurality of editing operations have been performed. The method further includes while displaying the first content, detecting, on the touch-sensitive surface, a first multi-finger gesture. The method further includes in response to detecting the first multi-finger gesture: in accordance with a determination that the first multi-finger gesture includes more than a first predetermined amount of movement in a first direction, undoing one of the first plurality of editing operations; and in accordance with a determination that the first multi-finger gesture includes more than a first predetermined amount of movement in a second direction that is different from the first direction, redoing one of the first plurality of editing operations.

In accordance with some embodiments, a method is performed at an electronic device with one or more processors, a non-transitory memory, an input device, and a display device. The method includes displaying, via the display device, content with respect to which editing operations have been performed. The editing operations include a plurality of groups of operations that include one or more operations, wherein two or more groups of the plurality of groups of operations include a plurality of editing operations. The method further includes while displaying the content, detecting, via the input device, a first gesture for undoing one or more of the plurality of groups of operations. The method further includes in response to detecting the first gesture: in accordance with a determination that the first gesture corresponds to a first gesture type, undoing one or more groups of operations without partially undoing any of the groups of operations; and in accordance with a determination that the first gesture corresponds to a second gesture type that is different from the first gesture type, undoing a set of operations based on a magnitude of the first gesture, including for a gesture of a respective magnitude partially undoing a first group of operations including undoing one or more operations in the first group of operations without undoing one or more operations in the first group of operations.

In accordance with some embodiments, a method is performed at an electronic device includes one or more processors, a non-transitory memory, a touch-sensitive surface, and a display device. The method includes displaying, via the display device, content. The method further includes, while displaying the content, detecting, on the touch-sensitive surface, a first input performed with a plurality of contacts that includes a multi-contact pinch gesture including a first movement of two or more of the plurality of contacts toward each other. The first input is directed to a subset of the content. The method further includes in response to detecting the first input: in accordance with a determination that the first input does not include a second movement of the plurality of contacts of more than a threshold amount of movement after detecting the multi-contact pinch gesture and before detecting an end of the first input, performing a first content manipulation operation on the subset of the content. The method further includes in response to detecting the first input: in accordance with a determination that the first input includes the second movement of more than the threshold amount of movement after detecting the multi-contact pinch gesture and before detecting the end of the first input, performing a second content manipulation operation on the subset of the content, wherein the second content manipulation operation is different from the first content manipulation operation.

In accordance with some embodiments, a method is performed at an electronic device with one or more processors, a non-transitory memory, a touch-sensitive surface, and a display device. The method includes displaying, via the display device, content with respect to which a plurality of operations have been performed. The method further includes, while displaying the content, detecting, on the touch-sensitive surface, a first multi-finger gesture performed with contacts. The method further includes in response to detecting the first multi-finger gesture: in accordance with a determination that the first multi-finger gesture includes rotation of the contacts as a group in a first direction, undoing one or more of the plurality of operations. The method further includes in response to detecting the first multi-finger gesture: in accordance with a determination that the first multi-finger gesture includes rotation of the contacts as a group in a second direction, redoing one or more previously undone operations, wherein the second direction is different from the first direction.

In accordance with some embodiments, an electronic device includes one or more processors, a non-transitory memory, an input device (e.g., a touch-sensitive sensor associated with a touch-sensitive surface of the electronic device), a display device, and one or more programs. The one or more programs are stored in the non-transitory memory and configured to be executed by the one or more processors. The one or more programs include instructions for performing or causing performance of the operations of any of the methods described herein. In accordance with some embodiments, a non-transitory computer readable storage medium has stored therein instructions, which, when executed by an electronic device with one or more processors, an input device (e.g., a touch-sensitive sensor associated with a touch-sensitive surface of the electronic device), and a display device, cause the electronic device to perform or cause performance of the operations of any of the methods described herein. In accordance with some embodiments, a graphical user interface on an electronic device with a non-transitory memory, an input device (e.g., a touch-sensitive sensor associated with a touch-sensitive surface of the electronic device), and a display device, and one or more processors to execute one or more programs stored in the non-transitory memory includes one or more of the elements displayed in any of the methods described herein, which are updated in response to inputs, as described in any of the methods described herein. In accordance with some embodiments, an electronic device includes: one or more processors, a non-transitory memory, an input device (e.g., a touch-sensitive sensor associated with a touch-sensitive surface of the electronic device), a display device, and means for performing or causing performance of the operations of any of the methods described herein. In accordance with some embodiments, an information processing apparatus, for use in an electronic device with one or more processors, a non-transitory memory, an input device (e.g., a touch-sensitive sensor associated with a touch-sensitive surface of the electronic device), and a display device, includes means for performing or causing performance of the operations of any of the methods described herein.

Thus, an electronic device with an input device and a display device exploits various inputs detected via the input device, such as touch inputs (e.g., multi-finger gestures), mouse inputs, keyboard inputs, etc. Based on the inputs, the electronic device performs a variety of content manipulation operations, such as undo, cut, copy, paste, and redo operations. In some embodiments, as compared with other electronic devices, the electronic device detects fewer inputs in order to perform a particular operation, resulting in improved functionality of the electronic device. Examples of the improved functionality are longer battery life and less wear-and-tear, as well as more efficient and accurate user interactions with the electronic device.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 10A-10E is a flow diagram of a method for performing content manipulation operations in response to multi-finger gestures in accordance with some embodiments.

FIGS. 11A-11C is a flow diagram of a method for performing undo and redo operations in response to various inputs in accordance with some embodiments.

FIGS. 14A-14E is a flow diagram of a method for performing content manipulation operations in response to multi-finger pinch gestures in accordance with some embodiments.

FIGS. 15A-15C is a flow diagram of a method for performing undo or redo operations based on rotational multi-finger gestures in accordance with some embodiments.

DESCRIPTION OF EMBODIMENTS

Figure 1A:
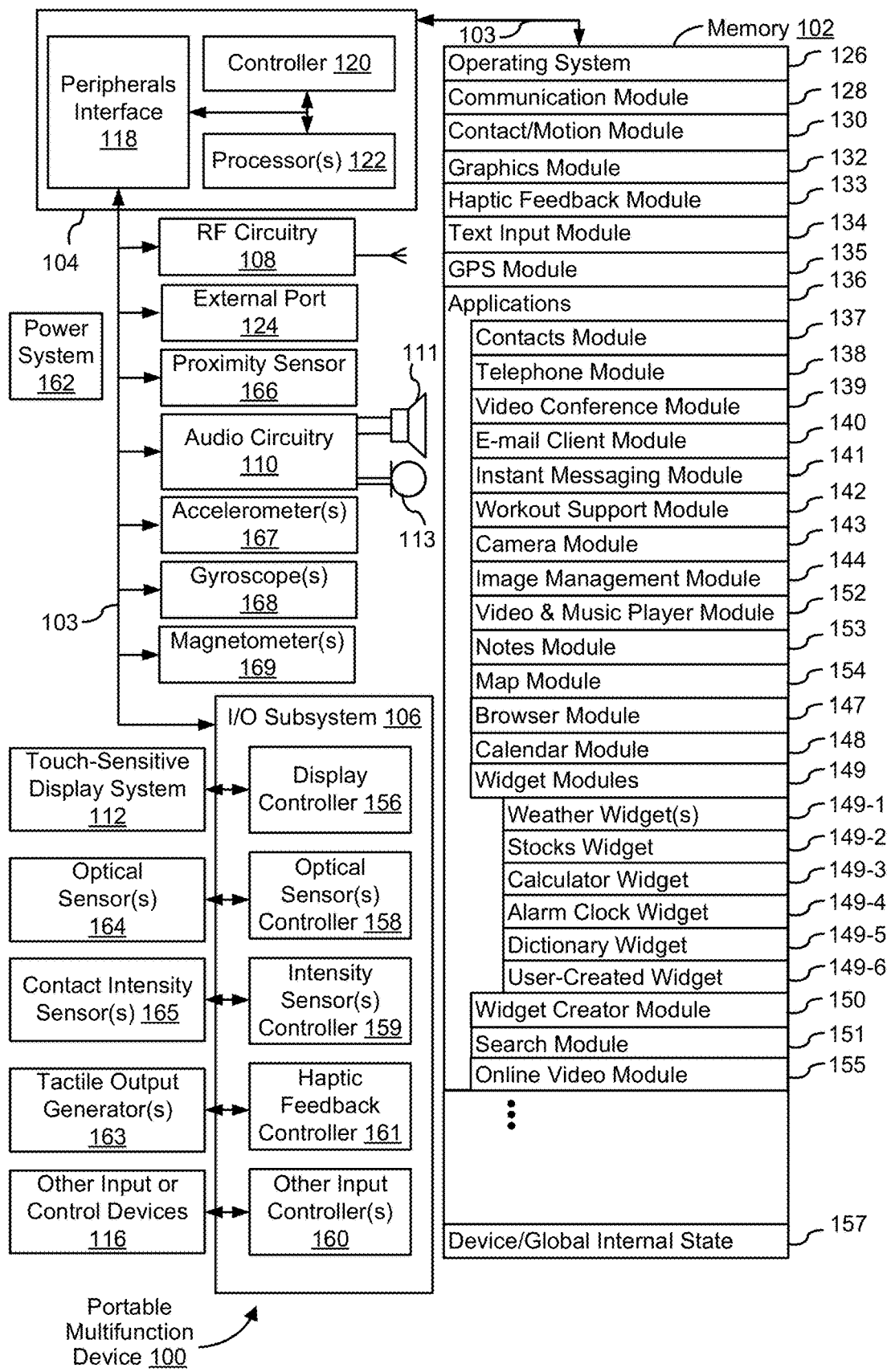
FIG. 1A is a block diagram illustrating a portable multifunction device with a touch-sensitive display in accordance with some embodiments.

Many electronic devices perform content manipulation operations based on detected inputs. However, existing methods for manipulating user interfaces are slow, cumbersome, and inefficient.

For example, in various circumstances, an electronic device may display an editing interface (e.g., an undo/redo stack, cut/copy/paste interface) that enables content manipulation operations to be performed on content with respect to which editing operations have been performed. In some cases, the electronic device displays the editing interface in response to one or more inputs and closes the editing interface in response to additional inputs. Accordingly, the electronic device expends processing and battery resources while detecting these inputs. In other cases, the electronic device constantly or near-constantly displays the editing interface, independent of inputs. Accordingly, the amount of useable display area is reduced because the editing interface covers an otherwise useable display area. By contrast, as disclosed herein, an electronic device performs content manipulation operations in response to detecting a multi-finger gesture, independent of detecting other inputs that invoke an editing interface. In some embodiments, in response to detecting the multi-finger gesture, the electronic device displays an interface that indicates the nature of the multi-finger gesture and ceases to display the interface after a threshold amount of time. Accordingly, the electronic device saves processor and battery resources by not having to detect inputs that invoke and/or remove the editing interface. Additionally, the electronic device provides a larger useable display than the electronic device because the electronic device removes the interface after the threshold amount of time.

As another example, in various circumstances, an electronic device performs a complete undo or redo of a particular operation, such as undoing (e.g., deleting) all text before a carriage return or redoing (e.g., drawing) the entirety of a previously deleted shape. However, the electronic device does not include partial undo or redo functionality. Moreover, because the device lacks a partial undo feature, a multitude of deletion inputs are needed to cause the device to perform the same feature, such as detecting five presses of a backspace key in order to delete the last five characters of a sentence. Accordingly, the electronic device provides a slow, cumbersome, and resource-wasting mechanism for removing portions of content with respect to which operations have been performed. By contrast, as disclosed herein, an electronic device performs complete or partial undo/redo operations, based on the nature of the detected input. Moreover, the electronic device expends fewer processing and battery resources by providing a partial undo and redo feature, thereby avoiding detecting multiple deletion inputs.

As yet example, in various circumstances, an electronic device may display an editing interface (e.g., an undo/redo stack, cut/copy/paste interface) that enables content manipulation operations to be performed on content. In some cases, the electronic device displays the editing interface in response to one or more inputs and closes the editing interface in response to additional inputs. Accordingly, the electronic device expends processing and battery resources while detecting these inputs. In other cases, the electronic device constantly or near-constantly displays the editing interface, independent of inputs. Accordingly, the amount of useable display area is reduced because the editing interface covers an otherwise useable display area. By contrast, as disclosed herein, an electronic device performs content manipulation operations in response to detecting multi-finger pinch gestures, independent of detecting other inputs that invoke an editing interface. In some embodiments, in response to detecting a multi-finger pinch gesture, the electronic device displays an interface that indicates the nature of the multi-finger pinch gesture and ceases to display the interface after a threshold amount of time. Accordingly, the electronic device saves processor and battery resources by not having to detect inputs that invoke and/or remove the editing interface. Additionally, the electronic device provides a larger useable display than the electronic device because the electronic device removes the interface after the threshold amount of time.

As yet another example, in various circumstances, an electronic device performs a single undo operation or a single redo operation in response to a respective input, such as a control key input. However, the electronic device lacks the functionality for performing the undo/redo based on a gesture input, much less performing successive undo operations and/or successive redo operations based on a single gesture or a sequence of gestures. By contrast, as disclosed herein, an electronic device performs one or more undo operations and/or one or more redo operations based on a multi-finger rotational gesture input. In some embodiments, the electronic devices performs undo/redo operations based on the magnitude and/or direction of the rotation. In some embodiments, the electronic devices performs an additional undo operation or an additional redo operation based on a multi-finger drag gesture that is detected before liftoff of the multi-finger rotational gesture input. Accordingly, the electronic device saves processor and battery resources by not having to detect multiple inputs in order to perform corresponding multiple undo/redo operations.

Below, FIGS. 1A-1B, 2-4, 5A-5B, and 6A-6B provide a description of example devices. FIGS. 7A-7BF are examples of user interfaces for performing content manipulation operations in response to multi-finger gestures in accordance with some embodiments. The user interfaces in FIGS.

Figure 8A:
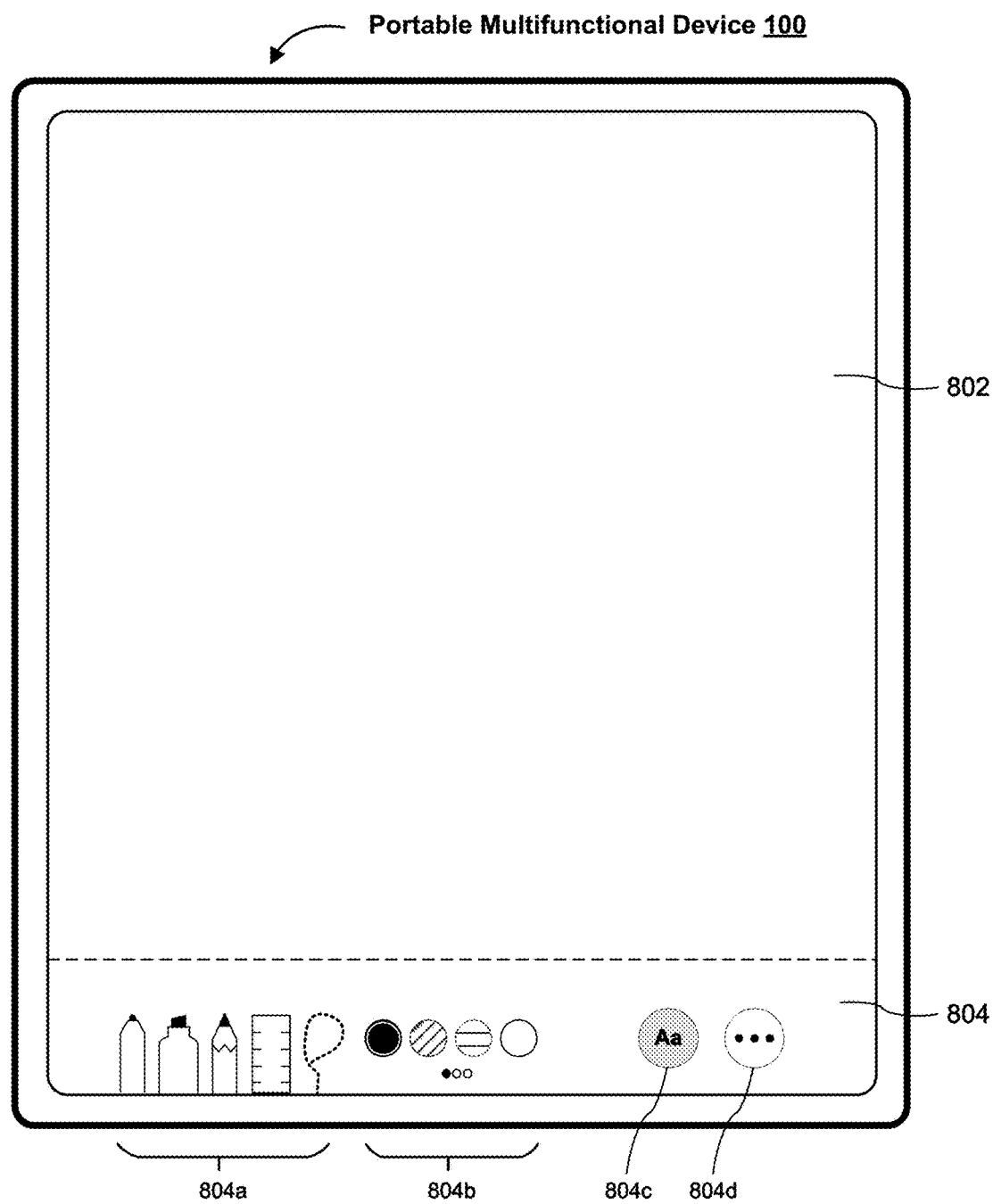
FIGS. 8A-8AJ are examples of user interfaces for performing partial and complete undo/redo operations in accordance with some embodiments.
Figure 12A:
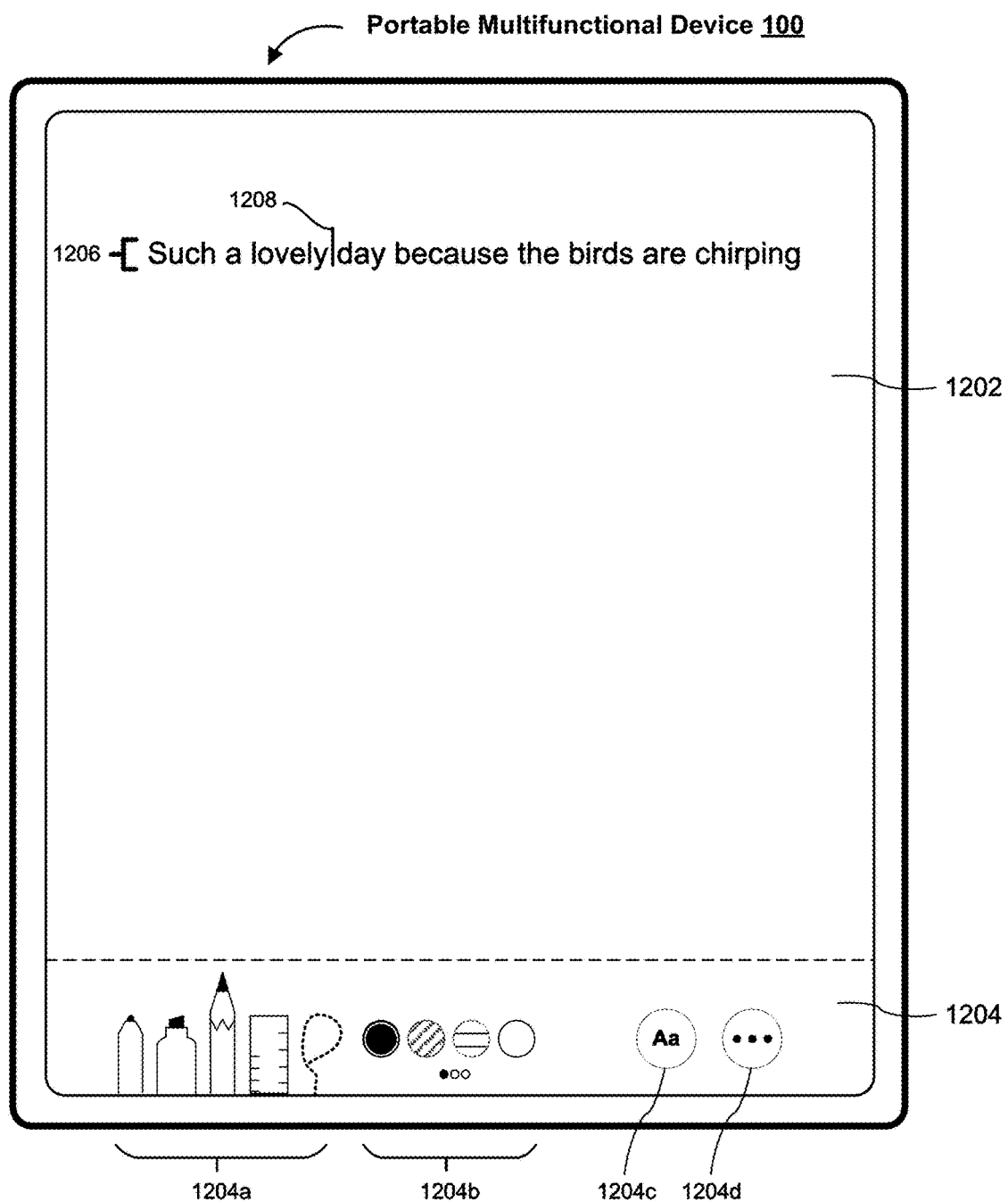
FIGS. 12A-12AY are examples of user interfaces for performing content manipulation operations in response to multi-finger pinch gestures in accordance with some embodiments.
Figure 13A:
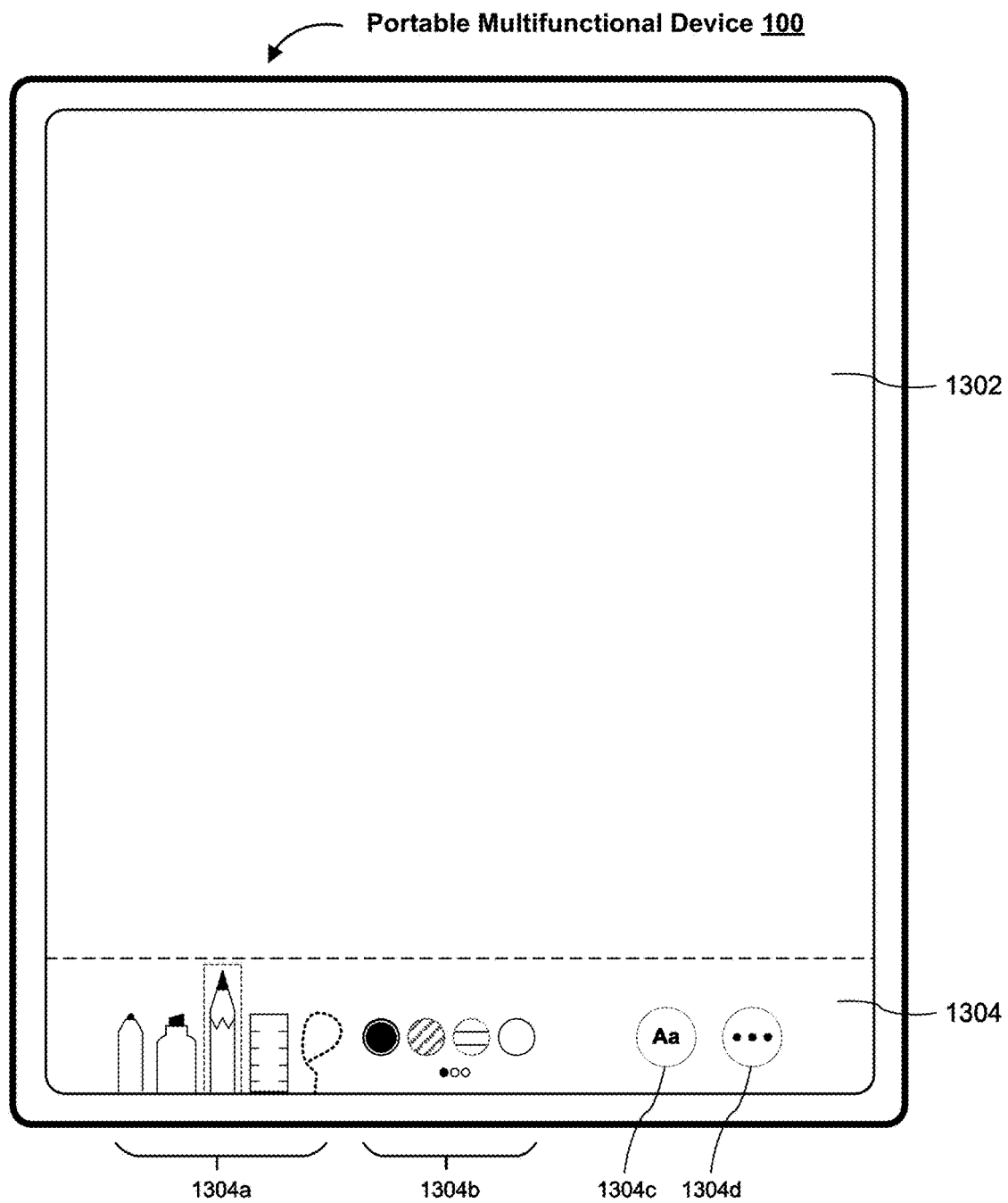
FIGS. 13A-13AB are examples of user interfaces for performing undo or redo operations based on rotational multi-finger gestures in accordance with some embodiments.

7A-7BF are used to illustrate the processes in FIGS. 10A-10E. FIGS. 8A-8AJ are examples of user interfaces for performing undo and redo operations in response to inputs directed to a scrubber interface in accordance with some embodiments. FIGS. 9A-9K are examples of user interfaces for performing undo and redo operations in response to multi-finger gestures in accordance with some embodiments. The user interfaces in FIGS. 8A-8AJ and FIGS. 9A-9K are used to illustrate the processes in FIGS. 11A-11C. FIGS. 12A-12AY are examples of user interfaces for performing content manipulation operations in response to detecting multi-finger pinch gestures in accordance with some embodiments. The user interfaces in FIGS. 12A-12AY are used to illustrate the processes in FIGS. 14A-14E. FIGS. 13A-13AB are examples of user interfaces for performing undo or redo operations based on rotational multi-finger gestures in accordance with some embodiments. The user interfaces in FIGS. 13A-13AB are used to illustrate the processes in FIGS. 15A-15C.

EXEMPLARY DEVICES

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the electronic device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the electronic device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The electronic device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the electronic device optionally use at least one common physical user-interface device, such as the touch-sensitive surface. One or more functions of the touch-sensitive surface as well as corresponding information displayed on the electronic device are, optionally, adjusted and/or varied from one application to the next and/or within a respective application. In this way, a common physical architecture (such as the touch-sensitive surface) of the electronic device optionally supports the variety of applications with user interfaces that are intuitive and transparent to the user.

Attention is now directed toward embodiments of portable devices with touch-sensitive displays. FIG. 1A is a block diagram illustrating a portable multifunction device 100 with touch-sensitive display system 112 in accordance with some embodiments. The touch-sensitive display system 112 is sometimes called a "touch screen" for convenience and is sometimes simply called a touch-sensitive display. The electronic device 100 includes memory 102 (which optionally includes one or more computer readable storage mediums), a memory controller 122, one or more processing units (CPUs) 120, a peripherals interface 118, RF circuitry 108, audio circuitry 110, a speaker 111, a microphone 113, an input/output (I/O) subsystem 106, other input or control devices 116, and an external port 124. The electronic device 100 optionally includes one or more optical sensors 164. The electronic device 100 optionally includes one or more intensity sensors 165 for detecting intensity of contacts on the electronic device 100 (e.g., a touch-sensitive surface such as the touch-sensitive display system 112 of the electronic device 100). The electronic device 100 optionally includes one or more tactile output generators 163 for generating tactile outputs on the electronic device 100 (e.g., generating tactile outputs on a touch-sensitive surface such as the touch-sensitive display system 112 of the electronic device 100 or touchpad 355 of device 300). These components optionally communicate over one or more communication buses or signal lines 103.

As used in the specification and claims, the term "tactile output" refers to physical displacement of an electronic device relative to a previous position of the electronic device, physical displacement of a component (e.g., a touch-sensitive surface) of an electronic device relative to another component (e.g., housing) of the electronic device, or displacement of the component relative to a center of mass of the electronic device that will be detected by a user with the user's sense of touch. For example, in situations where the electronic device or the component of the electronic device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the electronic device or the component of the electronic device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," or "roughness"), unless otherwise stated, the generated tactile output corresponds to physical displacement of the electronic device or a component thereof that will generate the described sensory perception for a typical (or average) user.

It should be appreciated that the electronic device 100 is only one example of a portable multifunction device, and that the electronic device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

The memory 102 optionally includes high-speed random-access memory and optionally also includes non-volatile memory, such as one or more magnetic disk storage devices, flash memory devices, or other non-volatile solid-state memory devices. Access to memory 102 by other components of the electronic device 100, such as the one or more CPUs 120 and the peripherals interface 118, is, optionally, controlled by the memory controller 122.

The peripherals interface 118 can be used to couple input and output peripherals of the electronic device to the one or more CPUs 120 and the memory 102. The one or more processors CPUs run or execute various software programs and/or sets of instructions stored in the memory 102 to perform various functions for the electronic device 100 and to process data.

In some embodiments, the peripherals interface 118, the one or more CPUs 120, and the memory controller 122 are, optionally, implemented on a single chip, such as chip 104. In some other embodiments, they are, optionally, implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), BLUETOOTH, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The audio circuitry 110, the speaker 111, and the microphone 113 provide an audio interface between a user and the electronic device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data is, optionally, retrieved from and/or transmitted to the memory 102 and/or the RF circuitry 108 by the peripherals interface 118. In some embodiments, the audio circuitry 110 also includes a headset jack (e.g., a headset jack 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the electronic device 100, such as the touch-sensitive display system 112 and the other input or control devices 116, with the peripherals interface 118. The I/O subsystem 106 optionally includes a display controller 156, an optical sensor controller 158, an intensity sensor controller 159, a haptic feedback controller 161, and one or more input controllers 160 for other input or control devices. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate embodiments, the one or more input controllers 160 are, optionally, coupled with any (or none) of the following: a keyboard, infrared port, USB port, stylus, and/or a pointer device such as a mouse. The one or more buttons (e.g., buttons 208, FIG. 2) optionally include an up/down button for volume control of the speaker 111 and/or the microphone 113. The one or more buttons optionally include a push button (e.g., a push button 206, FIG. 2).

The touch-sensitive display system 112 provides an input interface and an output interface between the electronic device and a user. The display controller 156 receives and/or sends electrical signals from/to the touch-sensitive display system 112. The touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system 112 has a touch-sensitive surface, sensor or set of sensors that accepts input from the user based on haptic and/or tactile contact. The touch-sensitive display system 112 and the display controller 156 (along with any associated modules and/or sets of instructions in the memory 102) detect contact (and any movement or breaking of the contact) on the touch-sensitive display system 112 and converts the detected contact into interaction with user-interface objects (e.g., one or more soft keys, icons, web pages or images) that are displayed on the touch-sensitive display system 112. In an example embodiment, a point of contact between the touch-sensitive display system 112 and the user corresponds to a finger of the user or a stylus.

The touch-sensitive display system 112 optionally uses LCD (liquid crystal display) technology, LPD (light emitting polymer display) technology, or LED (light emitting diode) technology, although other display technologies are used in other embodiments. The touch-sensitive display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 112. In an example embodiment, projected mutual capacitance sensing technology is used, such as that found in the iPhone®, iPod Touch®, and iPad® from Apple Inc. of Cupertino, Calif.

The touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with the touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the electronic device translates the rough finger-based input into a precise pointer/cursor position or command for performing the actions desired by the user.

In some embodiments, in addition to the touch screen, the electronic device 100 optionally includes a touchpad (not shown) for activating or deactivating particular functions. In some embodiments, the touchpad is a touch-sensitive area of the electronic device that, unlike the touch screen, does not display visual output. The touchpad is, optionally, a touch-sensitive surface that is separate from the touch-sensitive display system 112 or an extension of the touch-sensitive surface formed by the touch screen.

The electronic device 100 also includes a power system 162 for powering the various components. The power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The electronic device 100 optionally also includes one or more optical sensors 164. FIG. 1A shows an optical sensor coupled with an optical sensor controller 158 in the I/O subsystem 106. The one or more optical sensors 164 optionally include charge-coupled device (CCD) or complementary metal-oxide semiconductor (CMOS) phototransistors. The one or more optical sensors 164 receive light from the environment, projected through one or more lens, and converts the light to data representing an image. In conjunction with imaging module 143 (also called a camera module), the one or more optical sensors 164 optionally capture still images and/or video. In some embodiments, an optical sensor is located on the back of the electronic device 100, opposite the touch-sensitive display system 112 on the front of the electronic device 100, so that the touch screen is enabled for use as a viewfinder for still and/or video image acquisition. In some embodiments, another optical sensor is located on the front of the electronic device 100 so that the user's image is obtained (e.g., for selfies, for videoconferencing while the user views the other video conference participants on the touch screen, etc.).

The electronic device 100 optionally also includes one or more contact intensity sensors 165. FIG. 1A shows a contact intensity sensor coupled with the intensity sensor controller 159 in I/O subsystem 106. The one or more contact intensity sensors 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The one or more contact intensity sensors 165 receive contact intensity information (e.g., pressure information or a proxy for pressure information) from the environment. In some embodiments, at least one contact intensity sensor is collocated with, or proximate to, a touch-sensitive surface (e.g., the touch-sensitive display system 112). In some embodiments, at least one contact intensity sensor is located on the back of the electronic device 100, opposite the touch-screen display system 112 which is located on the front of the electronic device 100.

The electronic device 100 optionally also includes one or more proximity sensors 166. FIG. 1A shows the proximity sensor 166 coupled with the peripherals interface 118. Alternately, the proximity sensor 166 is coupled with an input controller 160 in the I/O subsystem 106. In some embodiments, the proximity sensor 166 turns off and disables the touch-sensitive display system 112 when the electronic device 100 is placed near the user's ear (e.g., when the user is making a phone call).

The electronic device 100 optionally also includes one or more tactile output generators 163. FIG. 1A shows a tactile output generator coupled with the haptic feedback controller 161 in the I/O subsystem 106. The one or more tactile output generators 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the electronic device). The one or more tactile output generators 163 receive tactile feedback generation instructions from a haptic feedback module 133 and generates tactile outputs on the electronic device 100 that are capable of being sensed by a user of the electronic device 100. In some embodiments, at least one tactile output generator is collocated with, or proximate to, a touch-sensitive surface (e.g., the touch-sensitive display system 112) and, optionally, generates a tactile output by moving the touch-sensitive surface vertically (e.g., in/out of a surface of the electronic device 100) or laterally (e.g., back and forth in the same plane as a surface of the electronic device 100). In some embodiments, at least one tactile output generator sensor is located on the back of the electronic device 100, opposite the touch-sensitive display system 112, which is located on the front of the electronic device 100.

The electronic device 100 optionally also includes one or more accelerometers 167, gyroscopes 168, and/or magnetometers 169 (e.g., as part of an inertial measurement unit (IMU)) for obtaining information concerning the position (e.g., attitude) of the electronic device. FIG. 1A shows sensors 167, 168, and 169 coupled with the peripherals interface 118. Alternately, sensors 167, 168, and 169 are, optionally, coupled with an input controller 160 in the I/O subsystem 106. In some embodiments, information is displayed on the touch-screen display in a portrait view or a landscape view based on an analysis of data received from the one or more accelerometers. The electronic device 100 optionally includes a GPS (or GLONASS or other global navigation system) receiver (not shown) for obtaining information concerning the location and orientation (e.g., portrait or landscape) of the electronic device 100.

Figure 3:
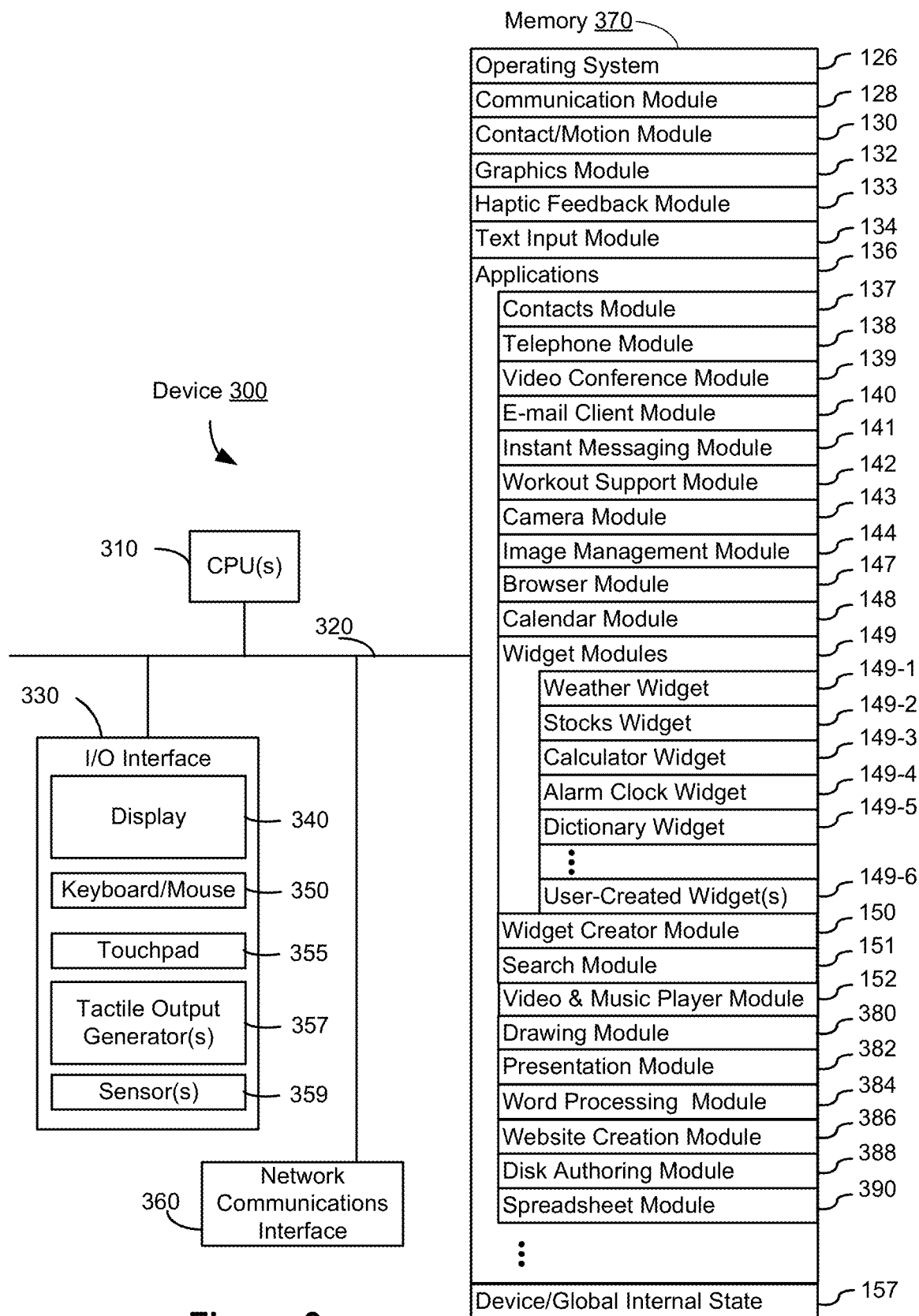
FIG. 3 is a block diagram of an example multifunction device with a display and a touch-sensitive surface in accordance with some embodiments.

In some embodiments, the software components stored in the memory 102 include an operating system 126, a communication module (or set of instructions) 128, a contact/motion module (or set of instructions) 130, a graphics module (or set of instructions) 132, a haptic feedback module (or set of instructions) 133, a text input module (or set of instructions) 134, a Global Positioning System (GPS) module (or set of instructions) 135, and applications (or sets of instructions) 136. Furthermore, in some embodiments, the memory 102 stores a device/global internal state 157, as shown in FIGS. 1A and 3. The device/global internal state 157 includes one or more of: an active application state, indicating which applications, if any, are currently-selected; a display state, indicating what applications, views or other information occupy various regions of the touch-sensitive display system 112; a sensor state, including information obtained from the electronic device's various sensors and other input or control devices 116; and location and/or positional information concerning the electronic device's location and/or attitude.

The operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

The contact/motion module 130 optionally detects contact with the touch-sensitive display system 112 (in conjunction with the display controller 156) and other touch-sensitive devices (e.g., a touchpad or physical click wheel). The contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, the contact/motion module 130 and the display controller 156 detect contact on a touchpad.

The contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

The position module 131, in conjunction with the accelerometers 167, the gyroscopes 168, and/or the magnetometers 169, optionally detects positional information concerning the electronic device, such as the electronic device's attitude (e.g., roll, pitch, and/or yaw) in a particular frame of reference. The position module 131 includes software components for performing various operations related to detecting the position of the electronic device and detecting changes to the position of the electronic device. In some embodiments, the position module 131 uses information received from a stylus being used with the electronic device 100 to detect positional information concerning the stylus, such as detecting the positional state of the stylus relative to the electronic device 100 and detecting changes to the positional state of the stylus.

The graphics module 132 includes various known software components for rendering and displaying graphics on the touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic is, optionally, assigned a corresponding code. The graphics module 132 receives, from applications etc., one or more codes specifying graphics to be displayed along with, if necessary, coordinate data and other graphic property data, and then generates screen image data to output to the display controller 156.

The haptic feedback module 133 includes various software components for generating instructions used by the one or more tactile output generators 163 to produce tactile outputs at one or more locations on the electronic device 100 in response to user interactions with the electronic device 100.

The text input module 134, which is, optionally, a component of the graphics module 132, provides soft keyboards for entering text in various applications (e.g., contacts 137, e-mail 140, IM 141, browser 147, and any other application that needs text input).

The GPS module 135 determines the location of the electronic device 100 and provides this information for use in various applications (e.g., to the telephone 138 for use in location-based dialing, to the camera 143 as picture/video metadata, and to applications that provide location-based services such as weather widgets, local yellow page widgets, and map/navigation widgets).

The applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154;
online video module 155; and/or
annotation application 195, which is used for providing annotations to user interfaces and optionally storing and/or accessing saved annotations 196 in the memory 102.

Examples of other applications 136 that are, optionally, stored in the memory 102 include other word processing applications, other image editing applications, drawing applications, presentation applications, JAVA-enabled applications, encryption, digital rights management, voice recognition, and voice replication.

In conjunction with the touch-sensitive display system 112, the display controller 156, the contact module 130, the graphics module 132, and the text input module 134, the contacts module 137 includes executable instructions to manage an address book or contact list (e.g., stored in application internal state 192 of the contacts module 137 in the memory 102 or the memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by the telephone module 138, video conferencing module 139, e-mail client module 140, or IM module 141; and so forth.

In conjunction with the RF circuitry 108, the audio circuitry 110, the speaker 111, the microphone 113, the touch-sensitive display system 112, the display controller 156, the contact module 130, the graphics module 132, and the text input module 134, the telephone module 138 includes executable instructions to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with the RF circuitry 108, the audio circuitry 110, the speaker 111, the microphone 113, the touch-sensitive display system 112, the display controller 156, the one or more optical sensors 164, the optical sensor controller 158, the contact module 130, the graphics module 132, the text input module 134, the contact list 137, and the telephone module 138, the video conferencing module 139 includes executable instructions to initiate, conduct, and terminate a video conference between a user and one or more other participants in accordance with user instructions.

In conjunction with the RF circuitry 108, the touch-sensitive display system 112, the display controller 156, the contact module 130, the graphics module 132, and the text input module 134, the e-mail client module 140 includes executable instructions to create, send, receive, and manage e-mail in response to user instructions. In conjunction with the image management module 144, the e-mail client module 140 makes it very easy to create and send e-mails with still or video images taken with the camera module 143.

In conjunction with the RF circuitry 108, the touch-sensitive display system 112, the display controller 156, the contact module 130, the graphics module 132, and the text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with the RF circuitry 108, the touch-sensitive display system 112, the display controller 156, the contact module 130, the graphics module 132, the text input module 134, the GPS module 135, the map module 154, and the music player module 146, the workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with the touch-sensitive display system 112, the display controller 156, the one or more optical sensors 164, the optical sensor controller 158, the contact module 130, the graphics module 132, and the image management module 144, the camera module 143 includes executable instructions to capture still images or video (including a video stream) and store them into the memory 102, modify characteristics of a still image or video, and/or delete a still image or video from the memory 102.

In conjunction with the touch-sensitive display system 112, the display controller 156, the contact module 130, the graphics module 132, the text input module 134, and the camera module 143, the image management module 144 includes executable instructions to arrange, modify (e.g., edit), or otherwise manipulate, label, delete, present (e.g., in a digital slide show or album), and store still and/or video images.

In conjunction with the RF circuitry 108, the touch-sensitive display system 112, the display controller 156, the contact module 130, the graphics module 132, and the text input module 134, the browser module 147 includes executable instructions to browse the Internet in accordance with user instructions, including searching, linking to, receiving, and displaying web pages or portions thereof, as well as attachments and other files linked to web pages.

In conjunction with the RF circuitry 108, the touch-sensitive display system 112, the display controller 156, the contact module 130, the graphics module 132, the text input module 134, the e-mail client module 140, and the browser module 147, the calendar module 148 includes executable instructions to create, display, modify, and store calendars and data associated with calendars (e.g., calendar entries, to do lists, etc.) in accordance with user instructions.

In conjunction with the RF circuitry 108, the touch-sensitive display system 112, the display controller 156, the contact module 130, the graphics module 132, the text input module 134, and the browser module 147, the widget modules 149 are mini-applications that are, optionally, downloaded and used by a user (e.g., the weather widget 149-1, the stocks widget 149-2, the calculator widget 149-3, the alarm clock widget 149-4, and the dictionary widget 149-5) or created by the user (e.g., the user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with the RF circuitry 108, the touch-sensitive display system 112, the display controller 156, the contact module 130, the graphics module 132, the text input module 134, and the browser module 147, the widget creator module 150 includes executable instructions to create widgets (e.g., turning a user-specified portion of a web page into a widget).

In conjunction with the touch-sensitive display system 112, the display controller 156, the contact module 130, the graphics module 132, and the text input module 134, the search module 151 includes executable instructions to search for text, music, sound, image, video, and/or other files in the memory 102 that match one or more search criteria (e.g., one or more user-specified search terms) in accordance with user instructions.

In conjunction with the touch-sensitive display system 112, the display controller 156, the contact module 130, the graphics module 132, the audio circuitry 110, the speaker 111, the RF circuitry 108, and the browser module 147, the video and music player module 152 includes executable instructions that allow the user to download and play back recorded music and other sound files stored in one or more file formats, such as MP3 or AAC files, and executable instructions to display, present or otherwise play back videos (e.g., on the touch-sensitive display system 112, or on an external display connected wirelessly or via the external port 124). In some embodiments, the electronic device 100 optionally includes the functionality of an MP3 player, such as an iPod (trademark of Apple Inc. of Cupertino, Calif.).

In conjunction with the touch-sensitive display system 112, the display controller 156, the contact module 130, the graphics module 132, and the text input module 134, the notes module 153 includes executable instructions to create and manage notes, to do lists, and the like in accordance with user instructions.

In conjunction with the RF circuitry 108, the touch-sensitive display system 112, the display controller 156, the contact module 130, the graphics module 132, the text input module 134, the GPS module 135, and the browser module 147, the map module 154 includes executable instructions to receive, display, modify, and store maps and data associated with maps (e.g., driving directions; data on stores and other points of interest at or near a particular location; and other location-based data) in accordance with user instructions.

In conjunction with the touch-sensitive display system 112, the display controller 156, the contact module 130, the graphics module 132, the audio circuitry 110, the speaker 111, the RF circuitry 108, the text input module 134, the e-mail client module 140, and the browser module 147, the online video module 155 includes executable instructions that allow the user to access, browse, receive (e.g., by streaming and/or download), play back (e.g., on the touch screen 112, or on an external display connected wirelessly or via the external port 124), send an e-mail with a link to a particular online video, and otherwise manage online videos in one or more file formats, such as H.264. In some embodiments, the instant messaging module 141, rather than the e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, the memory 102 optionally stores a subset of the modules and data structures identified above. Furthermore, the memory 102 optionally stores additional modules and data structures not described above.

In some embodiments, the electronic device 100 is an electronic device where operation of a predefined set of functions on the electronic device is performed exclusively through a touch screen and/or a touchpad. By using a touch screen and/or a touchpad as the primary input control device for operation of the electronic device 100, the number of physical input control devices (such as push buttons, dials, and the like) on the electronic device 100 is, optionally, reduced.

The predefined set of functions that are performed exclusively through a touch screen and/or a touchpad optionally include navigation between user interfaces. In some embodiments, the touchpad, when touched by the user, navigates the electronic device 100 to a main, home, or root menu from any user interface that is displayed on the electronic device 100. In such embodiments, a "menu button" is implemented using a touchpad. In some other embodiments, the menu button is a physical push button or other physical input control device instead of a touchpad.

Figure 1B:
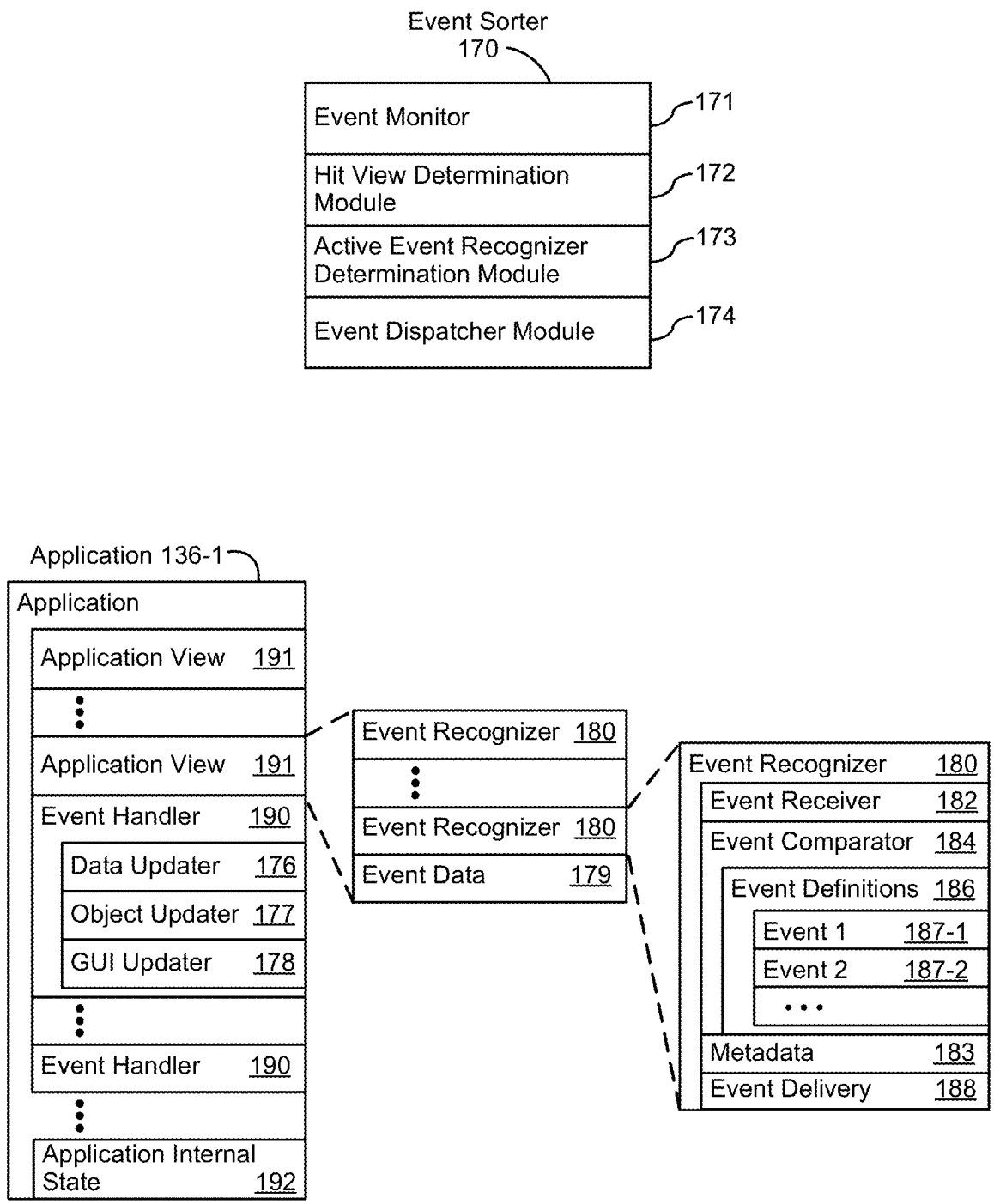
FIG. 1B is a block diagram illustrating example components for event handling in accordance with some embodiments.

FIG. 1B is a block diagram illustrating example components for event handling in accordance with some embodiments. In some embodiments, the memory 102 (in FIG. 1A) or 370 (in FIG. 3) includes an event sorter 170 (e.g., in the operating system 126) and a respective application 136-1 (e.g., any of the aforementioned applications 136, 137-155, 380-390).

The event sorter 170 receives event information and determines the application 136-1 and application view 191 of application 136-1 to which to deliver the event information. The sorter 170 includes an event monitor 171 and an event dispatcher module 174. In some embodiments, application 136-1 includes application internal state 192, which indicates the current application view(s) displayed on the touch-sensitive display system 112 when the application is active or executing. In some embodiments, the device/global internal state 157 is used by the event sorter 170 to determine which application(s) is (are) currently-selected, and the application internal state 192 is used by the event sorter 170 to determine application views 191 to which to deliver event information.

In some embodiments, the application internal state 192 includes additional information, such as one or more of: resume information to be used when the application 136-1 resumes execution, user interface state information that indicates information being displayed or that is ready for display by application 136-1, a state queue for enabling the user to go back to a prior state or view of application 136-1, and a redo/undo queue of previous actions taken by the user.

The event monitor 171 receives event information from the peripherals interface 118. Event information includes information about a sub-event (e.g., a user touch on the touch-sensitive display system 112, as part of a multi-touch gesture). The peripherals interface 118 transmits information it receives from the I/O subsystem 106 or a sensor, such as the proximity sensor 166, the accelerometer(s) 167, the gyroscope(s) 168, the magnetometer(s) 169, and/or the microphone 113 (through the audio circuitry 110). Information that the peripherals interface 118 receives from the I/O subsystem 106 includes information from the touch-sensitive display system 112 or a touch-sensitive surface.

In some embodiments, the event monitor 171 sends requests to the peripherals interface 118 at predetermined intervals. In response, the peripherals interface 118 transmits event information. In other embodiments, the peripherals interface 118 transmits event information only when there is a significant event (e.g., receiving an input above a predetermined noise threshold and/or for more than a predetermined duration).

In some embodiments, the event sorter 170 also includes a hit view determination module 172 and/or an active event recognizer determination module 173. The hit view determination module 172 provides software procedures for determining where a sub-event has taken place within one or more views, when the touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

The hit view determination module 172 receives information related to sub-events of a touch-based gesture. When an application has multiple views organized in a hierarchy, the hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

The active event recognizer determination module 173 determines which view or views within a view hierarchy should receive a particular sequence of sub-events. In some embodiments, the active event recognizer determination module 173 determines that only the hit view should receive a particular sequence of sub-events. In other embodiments, the active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

The event dispatcher module 174 dispatches the event information to an event recognizer (e.g., the event recognizer 180). In embodiments including the active event recognizer determination module 173, the event dispatcher module 174 delivers the event information to an event recognizer determined by the active event recognizer determination module 173. In some embodiments, the event dispatcher module 174 stores in an event queue the event information, which is retrieved by a respective event receiver module 182.

In some embodiments, the operating system 126 includes the event sorter 170. Alternatively, the application 136-1 includes the event sorter 170. In yet other embodiments, the event sorter 170 is a stand-alone module, or a part of another module stored in the memory 102, such as the contact/motion module 130.

In some embodiments, the application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher-level object from which application 136-1 inherits methods and other properties. In some embodiments, a respective event handler 190 includes one or more of: a data updater 176, an object updater 177, a GUI updater 178, and/or event data 179 received from the event sorter 170. The event handler 190 optionally utilizes or calls the data updater 176, the object updater 177, or the GUI updater 178 to update the application internal state 192. Alternatively, one or more of the application views 191 includes one or more respective event handlers 190. Also, in some embodiments, one or more of the data updater 176, the object updater 177, and the GUI updater 178 are included in a respective application view 191.

A respective event recognizer 180 receives event information (e.g., event data 179) from the event sorter 170, and identifies an event from the event information. The event recognizer 180 includes an event receiver module 182 and an event comparator 184. In some embodiments, the event recognizer 180 also includes at least a subset of: metadata 183, and event delivery instructions 188 (which optionally include sub-event delivery instructions).

The event receiver module 182 receives event information from the event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the electronic device from one orientation to another (e.g., from a portrait orientation to a landscape orientation, or vice versa), and the event information includes corresponding information about the current orientation (also called device attitude) of the electronic device.

The event comparator 184 compares the event information to predefined event or sub-event definitions and, based on the comparison, determines an event or sub-event, or determines or updates the state of an event or sub-event. In some embodiments, the event comparator 184 includes event definitions 186. The event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across the touch-sensitive display system 112, and lift-off of the touch (touch end). In some embodiments, the event also includes information for one or more associated event handlers 190.

In some embodiments, the event definition 187 includes a definition of an event for a respective user-interface object. In some embodiments, the event comparator 184 performs a hit test to determine which user-interface object is associated with a sub-event. For example, in an application view in which three user-interface objects are displayed on the touch-sensitive display system 112, when a touch is detected on the touch-sensitive display system 112, the event comparator 184 performs a hit test to determine which of the three user-interface objects is associated with the touch (sub-event). If each displayed object is associated with a respective event handler 190, the event comparator uses the result of the hit test to determine which the event handler 190 should be activated. For example, the event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in the event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates the event handler 190 associated with an event when one or more particular sub-events of an event are recognized. In some embodiments, a respective event recognizer 180 delivers event information associated with the event to the event handler 190. Activating an event handler 190 is distinct from sending (and deferred sending) sub-events to a respective hit view. In some embodiments, the event recognizer 180 throws a flag associated with the recognized event, and the event handler 190 associated with the flag catches the flag and performs a predefined process.

In some embodiments, the event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, the data updater 176 creates and updates data used in application 136-1. For example, the data updater 176 updates the telephone number used in the contacts module 137 or stores a video file used in video player module 145. In some embodiments, the object updater 177 creates and updates objects used in application 136-1. For example, the object updater 177 creates a new user-interface object or updates the position of a user-interface object. The GUI updater 178 updates the GUI. For example, the GUI updater 178 prepares display information and sends it to the graphics module 132 for display on a touch-sensitive display.

In some embodiments, the event handler(s) 190 includes or has access to the data updater 176, the object updater 177, and the GUI updater 178. In some embodiments, the data updater 176, the object updater 177, and the GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the electronic device; oral instructions; detected eye movements; biometric inputs; and/or any combination thereof are optionally utilized as inputs corresponding to sub-events which define an event to be recognized.

Figure 2:
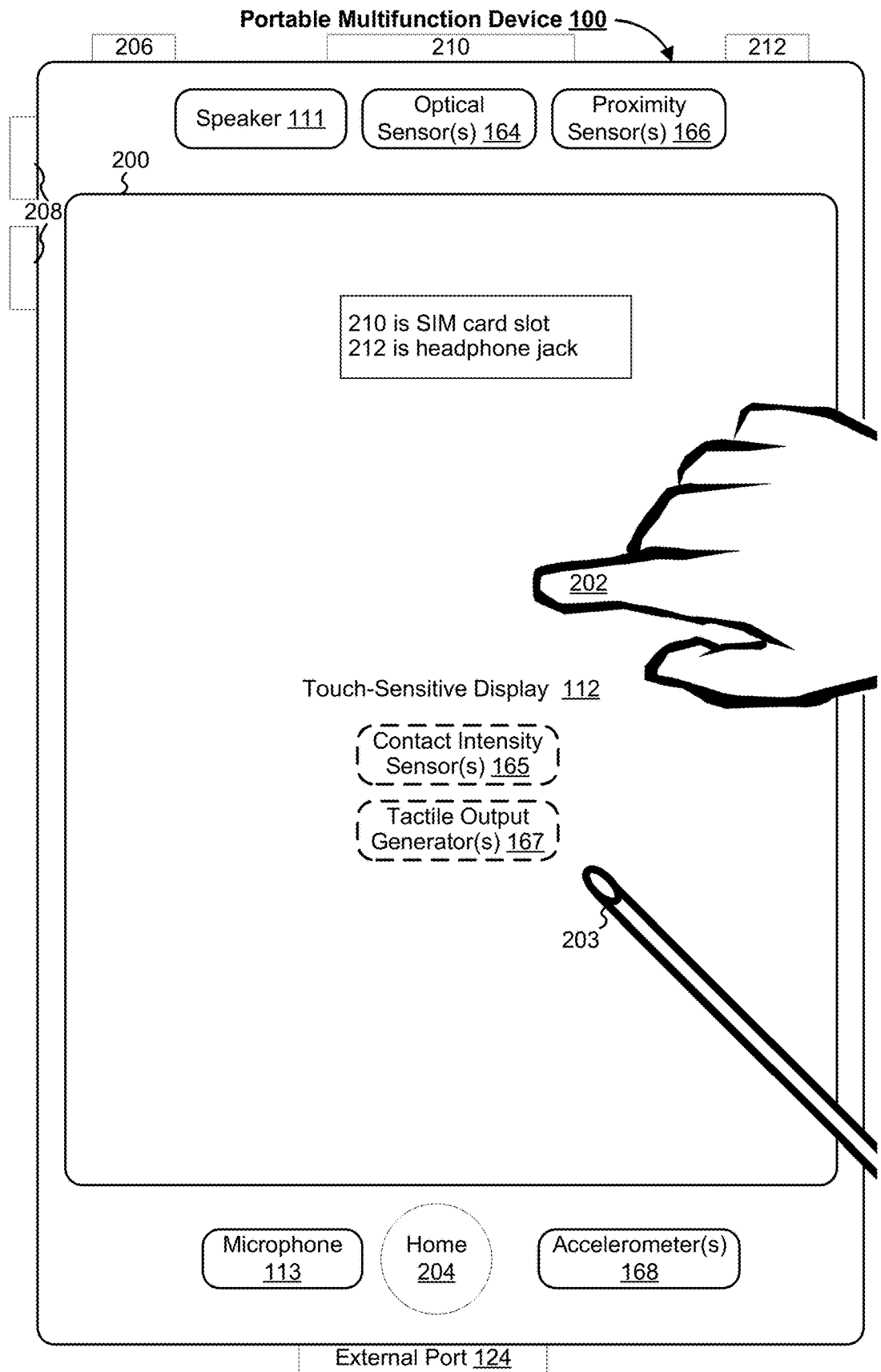
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within a user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with the electronic device 100. In some embodiments or circumstances, inadvertent contact with a graphic does not select the graphic. For example, a swipe gesture that sweeps over an application icon optionally does not select the corresponding application when the gesture corresponding to selection is a tap.

The stylus 203 includes a first end 276 and a second end 277. In various embodiments, the first end 276 corresponds to a tip of the stylus 203 (e.g., the tip of a pencil) and the second end 277 corresponds to the opposite or bottom end of the stylus 203 (e.g., the eraser of the pencil).

The stylus 203 includes a touch-sensitive surface 275 to receive touch inputs from a user. In some embodiments, the touch-sensitive surface 275 corresponds to a capacitive touch element. The stylus 203 includes a sensor or set of sensors that detect inputs from the user based on haptic and/or tactile contact with the touch-sensitive surface 275. In some embodiments, the stylus 203 includes any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive surface 275. Because the stylus 203 includes a variety of sensors and types of sensors, the stylus 203 can detect a variety of inputs from the user, including the gestures disclosed herein with respect to the touch screen of the portable multifunction device 100. In some embodiments, the one or more sensors can detect a single touch input or successive touch inputs in response to a user tapping once or multiple times on the touch-sensitive surface 275. In some embodiments, the one or more sensors can detect a swipe input on the stylus 203 in response to the user stroking along the touch-sensitive surface 275 with one or more fingers. In some embodiments, if the speed with which the user strokes along the touch-sensitive surface 275 breaches a threshold, the one or more sensors detect a flick input rather than a swipe input.

The stylus 203 also includes one or more sensors that detect orientation (e.g., angular position relative to the electronic device) and/or movement of the stylus 203, such as an accelerometer, magnetometer, gyroscope, and/or the like. The one or more sensors can detect a variety of rotational movements of the stylus 203 by the user, including the type and direction of the rotation. For example, the one or more sensors can detect the user rolling and/or twirling the stylus 203, and can detect the direction (e.g., clockwise or counterclockwise) of the rolling/twirling. In some embodiments, the detected input depends on the angular position of the first end 276 and the second end 277 of the stylus 203 relative to the electronic device. For example, in some embodiments, if the stylus 203 is substantially perpendicular to the electronic device 100 and the second end 277 (e.g., the eraser) is nearer to the electronic device, then contacting the surface of the electronic device with the second end 277 results in an erase operation. On the other hand, if the stylus 203 is substantially perpendicular to the electronic device and the first end 276 (e.g., the tip) is nearer to the electronic device, then contacting the surface of the electronic device with the first end 276 results in a marking operation.

The electronic device 100 optionally also includes one or more physical buttons, such as "home" or menu button 204. As described previously, menu button 204 is, optionally, used to navigate to any application 136 in a set of applications that are, optionally executed on the electronic device 100. Alternatively, in some embodiments, the menu button 204 is implemented as a soft key in a GUI displayed on the touch-screen display.

In some embodiments, the electronic device 100 includes the touch-screen display, the menu button 204, a push button 206 for powering the electronic device on/off and locking the electronic device 100, volume adjustment button(s) 208, Subscriber Identity Module (SIM) card slot 210, a headset jack 212, and docking/charging external port 124. The push button 206 is, optionally, used to turn the power on/off on the electronic device by depressing the push button 206 and holding the push button 206 in the depressed state for a predefined time interval; to lock the electronic device 100 by depressing the push button 206 and releasing the push button 206 before the predefined time interval has elapsed; and/or to unlock the electronic device 100 or initiate an unlock process. In some embodiments, the electronic device 100 also accepts verbal input for activation or deactivation of some functions through a microphone 113. The electronic device 100 also, optionally, includes one or more contact intensity sensors 165 for detecting intensity of contacts on the touch-sensitive display system 112 and/or one or more tactile output generators 163 for generating tactile outputs for a user of the electronic device 100.

FIG. 3 is a block diagram of an example multifunction device 300 with a display and a touch-sensitive surface in accordance with some embodiments. The electronic device 300 need not be portable. In some embodiments, the electronic device 300 is a laptop computer, a desktop computer, a tablet computer, a multimedia player device, a navigation device, an educational device (such as a child's learning toy), a gaming system, or a control device (e.g., a home or industrial controller). The electronic device 300 typically includes one or more processing units (CPUs) 310, one or more network or other communications interfaces 360, memory 370, and one or more communication buses 320 for interconnecting these components. The one or more communication buses 320 optionally include circuitry (sometimes called a chipset) that interconnects and controls communications between system components. The electronic device 300 includes an input/output (I/O) interface 330 comprising a display 340, which is typically a touch-screen display. The I/O interface 330 also optionally includes a keyboard and/or mouse (or other pointing device) 350 and touchpad 355, a tactile output generator 357 for generating tactile outputs on the electronic device 300 (e.g., similar to the tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). The memory 370 includes high-speed random-access memory, such as DRAM, SRAM, DDR RAM or other random-access solid-state memory devices; and optionally includes non-volatile memory, such as one or more magnetic disk storage devices, optical disk storage devices, flash memory devices, or other non-volatile solid-state storage devices. The memory 370 optionally includes one or more storage devices remotely located from the one or more CPUs 310. In some embodiments, the memory 370 stores programs, modules, and data structures analogous to the programs, modules, and data structures stored in the memory 102 of the portable multifunction device 100 (FIG. 1A), or a subset thereof. Furthermore, the memory 370 optionally stores additional programs, modules, and data structures not present in the memory 102 of the portable multifunction device 100. For example, the memory 370 of device 300 optionally stores a drawing module 380, a presentation module 382, a word processing module 384, a website creation module 386, a disk authoring module 388, and/or a spreadsheet module 390, while the memory 102 of the portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, the memory 370 optionally stores additional modules and data structures not described above.

Figure 4:
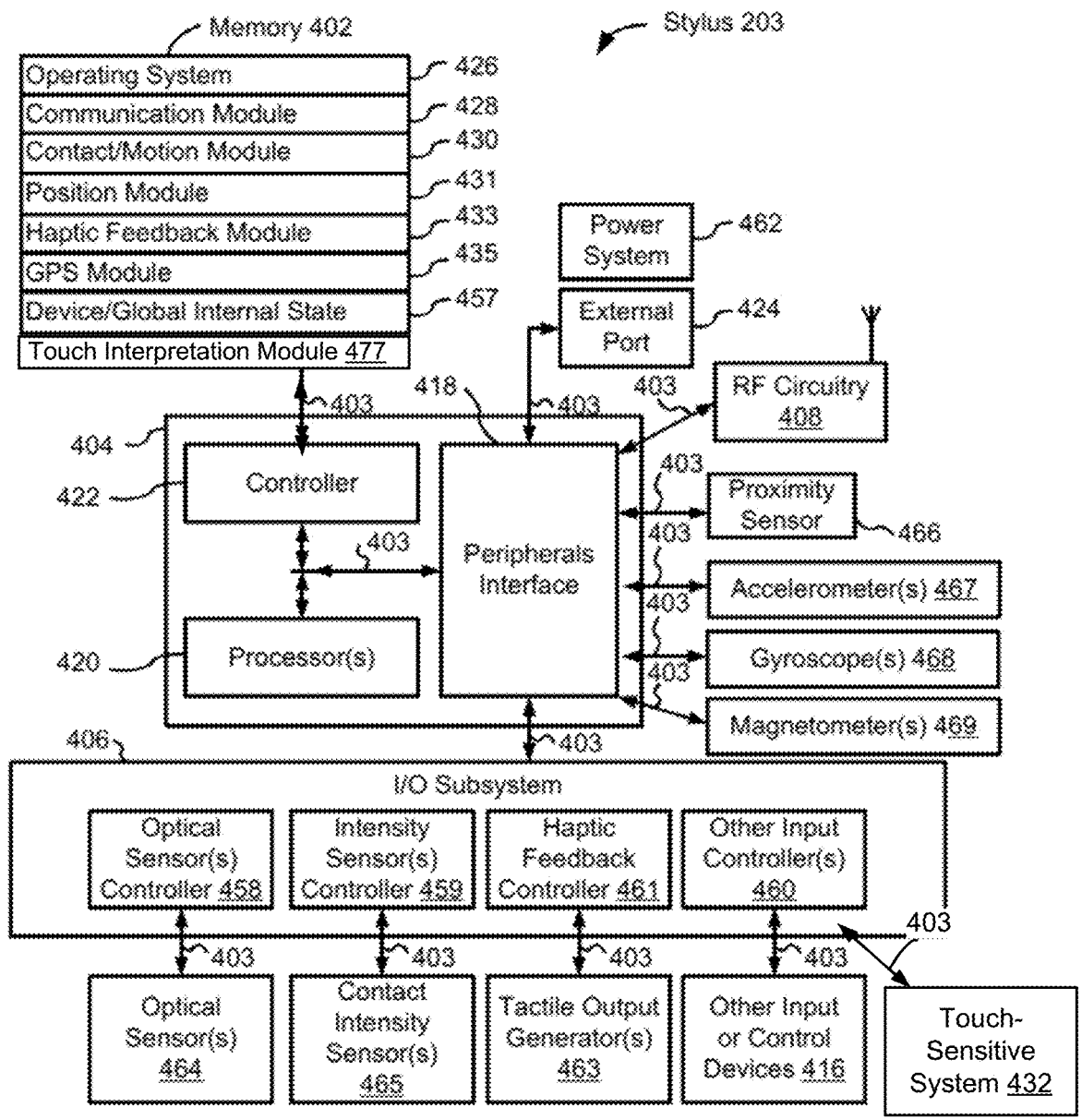
FIG. 4 is a block diagram of an example electronic stylus in accordance with some embodiments.

FIG. 4 is a block diagram of an exemplary electronic stylus 203 in accordance with some embodiments. The electronic stylus 203 is sometimes simply called a stylus. The stylus 203 includes memory 402 (which optionally includes one or more computer readable storage mediums), a memory controller 422, one or more processing units (CPUs) 420, a peripherals interface 418, RF circuitry 408, an input/output (I/O) subsystem 406, and other input or control devices 416. The stylus 203 optionally includes an external port 424 and one or more optical sensors 464. The stylus 203 optionally includes one or more intensity sensors 465 for detecting intensity of contacts of the stylus 203 on the electronic device 100 (e.g., when the stylus 203 is used with a touch-sensitive surface such as the touch-sensitive display system 112 of the electronic device 100) or on other surfaces (e.g., a desk surface). The stylus 203 optionally includes one or more tactile output generators 463 for generating tactile outputs on the stylus 203. These components optionally communicate over one or more communication buses or signal lines 403.

In some embodiments, the term "tactile output," discussed above, refers to physical displacement of an accessory (e.g., the stylus 203) of an electronic device (e.g., the electronic device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of the stylus 203) is, optionally, interpreted by the user as a "click" of a physical actuator button. In some cases, a user will feel a tactile sensation such as a "click" even when there is no movement of a physical actuator button associated with the stylus that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the electronic device or a component thereof that will generate the described sensory perception for a typical (or average) user.

It should be appreciated that the stylus 203 is only one example of an electronic stylus, and that stylus 203 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

The memory 402 optionally includes high-speed random-access memory and optionally also includes non-volatile memory, such as one or more flash memory devices, or other non-volatile solid-state memory devices. Access to the memory 402 by other components of the stylus 203, such as the one or more CPUs 420 and the peripherals interface 418, is, optionally, controlled by the memory controller 422.

The peripherals interface 418 can be used to couple input and output peripherals of the stylus to the one or more CPUs 420 and the memory 402. The one or more CPUs 420 run or execute various software programs and/or sets of instructions stored in the memory 402 to perform various functions for the stylus 203 and to process data.

In some embodiments, the peripherals interface 418, the one or more CPUs 420, and the memory controller 422 are, optionally, implemented on a single chip, such as a chip 404. In some other embodiments, they are, optionally, implemented on separate chips.

The RF (radio frequency) circuitry 408 receives and sends RF signals, also called electromagnetic signals. The RF circuitry 408 converts electrical signals to/from electromagnetic signals and communicates with the electronic device 100 or 300, communications networks, and/or other communications devices via the electromagnetic signals. The RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 408 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), BLUETOOTH, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The I/O subsystem 406 couples input/output peripherals on the stylus 203, such as the other input or control devices 416, with the peripherals interface 418. The I/O subsystem 406 optionally includes an optical sensor controller 458, an intensity sensor controller 459, a haptic feedback controller 461, and one or more input controllers 460 for other input or control devices. The one or more input controllers 460 receive/send electrical signals from/to the other input or control devices 416. The other input or control devices 416 optionally include physical buttons (e.g., push buttons, rocker buttons, etc.), dials, slider switches, click wheels, and so forth. In some alternate embodiments, the one or more input controllers 460 are, optionally, coupled with any (or none) of the following: an infrared port and/or a USB port.

The stylus 203 also includes a power system 462 for powering the various components. The power system 462 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

The stylus 203 optionally also includes the one or more optical sensors 464. FIG. 4 shows an optical sensor coupled with the optical sensor controller 458 in the I/O subsystem 406. The one or more optical sensors 464 optionally include charge-coupled device (CCD) or complementary metal-oxide semiconductor (CMOS) phototransistors. The one or more optical sensors 464 receive light from the environment, projected through one or more lens, and converts the light to data representing an image.

The stylus 203 optionally also includes one or more contact intensity sensors 465. FIG. 4 shows a contact intensity sensor coupled with the intensity sensor controller 459 in the I/O subsystem 406. The one or more contact intensity sensors 465 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a surface). The one or more contact intensity sensors 465 receive contact intensity information (e.g., pressure information or a proxy for pressure information) from the environment. In some embodiments, at least one contact intensity sensor is collocated with, or proximate to, a tip of the stylus 203.

The stylus 203 optionally also includes one or more proximity sensors 466. FIG. 4 shows the proximity sensor 466 coupled with the peripherals interface 418. Alternately, the proximity sensor 466 is coupled with the input controller 460 in the I/O subsystem 406. In some embodiments, the proximity sensor 466 determines proximity of the stylus 203 to an electronic device (e.g., the electronic device 100).

The stylus 203 optionally also includes one or more tactile output generators 463. FIG. 4 shows a tactile output generator 463 coupled with the haptic feedback controller 461 in the I/O subsystem 406. The one or more tactile output generators 463 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the electronic device). The one or more tactile output generators 463 receive tactile feedback generation instructions from the haptic feedback module 433 and generates tactile outputs on the stylus 203 that are capable of being sensed by a user of the stylus 203. In some embodiments, at least one tactile output generator 463 is collocated with, or proximate to, a length (e.g., a body or a housing) of the stylus 203 and, optionally, generates a tactile output by moving the stylus 203 vertically (e.g., in a direction parallel to the length of the stylus 203) or laterally (e.g., in a direction normal to the length of the stylus 203).

The stylus 203 optionally also includes one or more accelerometers 467, gyroscopes 468, and/or magnetometers 469 (e.g., as part of an inertial measurement unit (IMU)) for obtaining information concerning the location and positional state of the stylus 203. FIG. 4 shows sensors 467, 468, and 469 coupled with the peripherals interface 418. Alternately, sensors 467, 468, and 469 are, optionally, coupled with an input controller 460 in the I/O subsystem 406. The stylus 203 optionally includes a GPS (or GLONASS or other global navigation system) receiver (not shown) for obtaining information concerning the location of the stylus 203.

The stylus 203 includes a touch-sensitive system 432. The touch-sensitive system 432 detects inputs received at the touch-sensitive surface 275. These inputs include the inputs discussed herein with respect to the touch-sensitive surface 275 of the stylus 203. For example, the touch-sensitive system 432 can detect tap, twirl, roll, flick, and swipe inputs. The touch-sensitive system 432 coordinates with a touch interpretation module 477 in order to decipher the particular kind of touch input received at the touch-sensitive surface 275 (e.g., twirl/roll/flick/swipe/etc.).

Figure 5A:
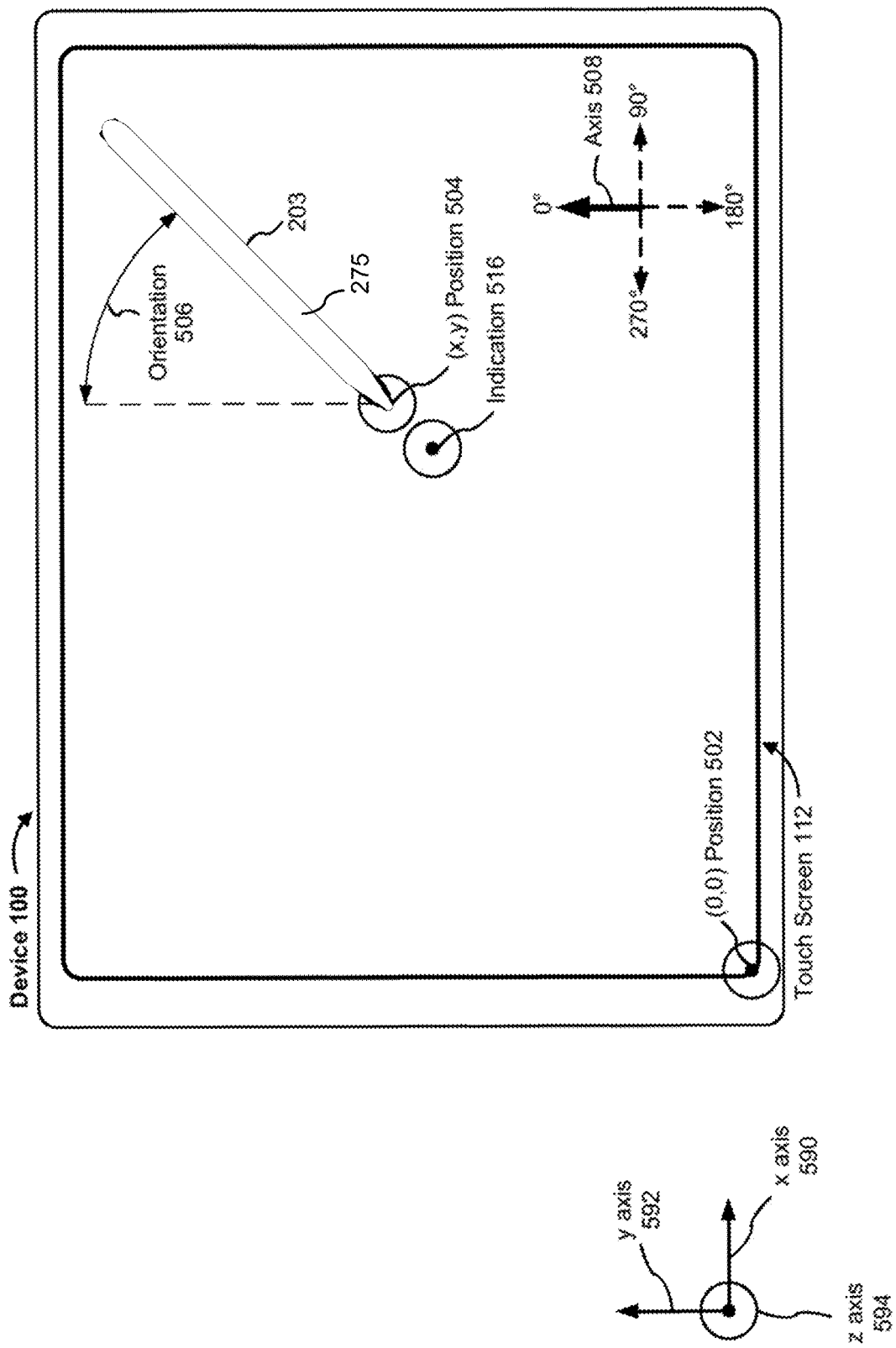
FIGS. 5A-5B illustrate a positional state of a stylus relative to a touch-sensitive surface in accordance with some embodiments.
Figure 5B:
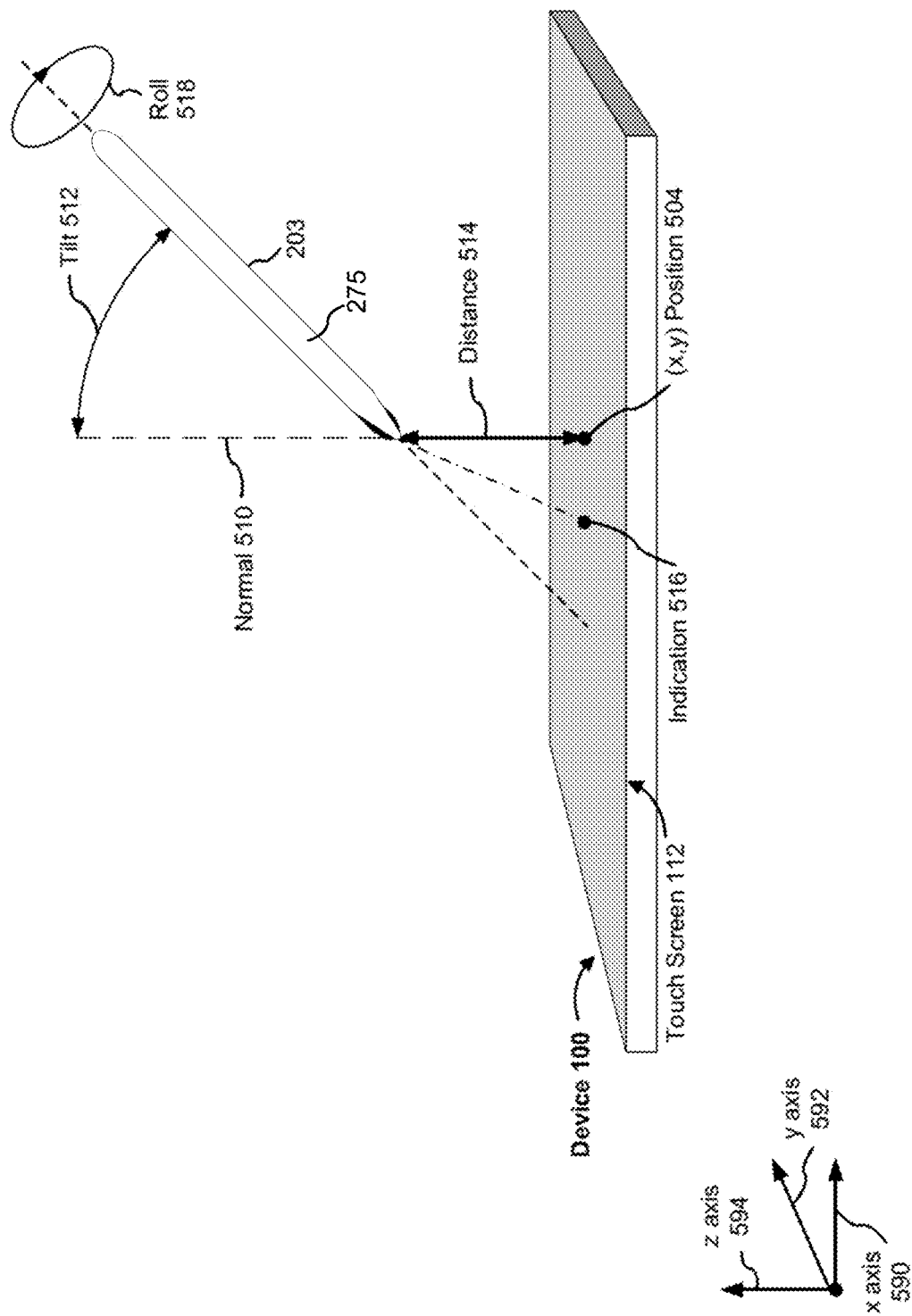

In some embodiments, the software components stored in memory 402 include an operating system 426, a communication module (or set of instructions) 428, a contact/motion module (or set of instructions) 430, a position module (or set of instructions) 431, and a Global Positioning System (GPS) module (or set of instructions) 435. Furthermore, in some embodiments, the memory 402 stores a device/global internal state 457, as shown in FIG. 4. Moreover, although not depicted, the memory 402 includes the touch interpretation module 477. The device/global internal state 457 includes one or more of: a sensor state, including information obtained from the stylus's various sensors and the other input or control devices 416; a positional state, including information regarding the stylus's position (e.g., position, orientation, tilt, roll and/or distance, as shown in FIGS. 5A and 5B) relative to an electronic device (e.g., the electronic device 100); and location information concerning the stylus's location (e.g., determined by the GPS module 435).

The operating system 426 (e.g., iOS, Darwin, RTXC, LINUX, UNIX, OS X, WINDOWS, or an embedded operating system such as VxWorks) includes various software components and/or drivers for controlling and managing general system tasks (e.g., memory management, power management, etc.) and facilitates communication between various hardware and software components.

The communication module 428 optionally facilitates communication with other devices over the one or more external ports 424 and also includes various software components for handling data received by the RF circuitry 408 and/or the external port 424. The external port 424 (e.g., Universal Serial Bus (USB), FIREWIRE, etc.) is adapted for coupling directly to other devices or indirectly over a network (e.g., the Internet, wireless LAN, etc.). In some embodiments, the external port 424 is a Lightning connector that is the same as, or similar to and/or compatible with the Lightning connector used in some iPhone®, iPod Touch®, and iPad® devices from Apple Inc. of Cupertino, Calif.

The contact/motion module 430 optionally detects contact with the stylus 203 and other touch-sensitive devices of the stylus 203 (e.g., buttons or other touch-sensitive components of the stylus 203). The contact/motion module 430 includes software components for performing various operations related to detection of contact (e.g., detection of a tip of the stylus 203 with a touch-sensitive display, such as the touch screen 112 of the electronic device 100, or with another surface, such as a desk surface), such as determining if contact has occurred (e.g., detecting a touch-down event), determining an intensity of the contact (e.g., the force or pressure of the contact or a substitute for the force or pressure of the contact), determining if there is movement of the contact and tracking the movement (e.g., across the touch screen 112 of the electronic device 100), and determining if the contact has ceased (e.g., detecting a lift-off event or a break in contact). In some embodiments, the contact/motion module 430 receives contact data from the I/O subsystem 406. Determining movement of the point of contact, which is represented by a series of contact data, optionally includes determining speed (magnitude), velocity (magnitude and direction), and/or an acceleration (a change in magnitude and/or direction) of the point of contact. As noted above, in some embodiments, one or more of these operations related to detection of contact are performed by the electronic device 100 using the contact/motion module 130 (in addition to or in place of the stylus 203 using the contact/motion module 430).

The contact/motion module 430 optionally detects a gesture input by the stylus 203. Different gestures with the stylus 203 have different contact patterns (e.g., different motions, timings, and/or intensities of detected contacts). Thus, a gesture is, optionally, detected by detecting a particular contact pattern. For example, detecting a single tap gesture includes detecting a touch-down event followed by detecting a lift-off event at the same position (or substantially the same position) as the touch-down event (e.g., at the position of an icon). As another example, detecting a swipe gesture includes detecting a touch-down event followed by detecting one or more stylus-dragging events, and subsequently followed by detecting a lift-off event. As noted above, in some embodiments, gesture detection is performed by the electronic device 100 using the contact/motion module 130 (in addition to or in place of the stylus 203 using the contact/motion module 430).

The position module 431, in conjunction with the accelerometers 467, the gyroscopes 468, and/or the magnetometers 469, optionally detects positional information concerning the stylus 203, such as the stylus's attitude (roll, pitch, and/or yaw) in a particular frame of reference. The position module 431, in conjunction with the accelerometers 467, the gyroscopes 468, and/or the magnetometers 469, optionally detects stylus movement gestures, such as flicks, taps, and rolls of the stylus 203. The position module 431 includes software components for performing various operations related to detecting the position of the stylus and detecting changes to the position of the stylus in a particular frame of reference. In some embodiments, the position module 431 detects the positional state of the stylus 203 relative to the electronic device 100 and detects changes to the positional state of the stylus 203 relative to the electronic device 100. As noted above, in some embodiments, the electronic device 100 or 300 determines the positional state of the stylus 203 relative to the electronic device 100 and changes to the positional state of the stylus 203 using the position module 131 (in addition to or in place of the stylus 203 using the position module 431).

The haptic feedback module 433 includes various software components for generating instructions used by the tactile output generator(s) 463 to produce tactile outputs at one or more locations on stylus 203 in response to user interactions with stylus 203.

The GPS module 435 determines the location of the stylus 203 and provides this information for use in various applications (e.g., to applications that provide location-based services such as an application to find missing devices and/or accessories).

The touch interpretation module 477 coordinates with the touch-sensitive system 432 in order to determine (e.g., decipher or identify) the type of touch input received at the touch-sensitive surface 275 of the stylus 203. For example, the touch interpretation module 477 determines that the touch input corresponds to a swipe input (as opposed to a tap input) if the user stroked a sufficient distance across the touch-sensitive surface 275 in a sufficiently short amount of time. As another example, the touch interpretation module 477 determines that the touch input corresponds to a flick input (as opposed to a swipe input) if the speed with which user stroked across the touch-sensitive surface 275 was sufficiently faster than the speech corresponding to a swipe input. The threshold speeds of strokes can be preset and can be changed. In various embodiments, the pressure and/or force with which the touch is received at the touch-sensitive surface determines the type of input. For example, a light touch can correspond to a first type of input while a harder touch can correspond to a second type of input.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, the memory 402 optionally stores a subset of the modules and data structures identified above. Furthermore, the memory 402 optionally stores additional modules and data structures not described above.

FIGS. 5A-5B illustrate a positional state of the stylus 203 relative to a touch-sensitive surface (e.g., the touch screen 112 of the electronic device 100) in accordance with some embodiments. In some embodiments, the positional state of the stylus 203 corresponds to (or indicates): a position of a projection of a tip (or other representative portion) of the stylus 203 on the touch-sensitive surface (e.g., an (x,y) position 504, FIG. 5A), an orientation of the stylus 203 relative to the touch-sensitive surface (e.g., an orientation 506, FIG. 5A), a tilt of the stylus 203 relative to the touch-sensitive surface (e.g., a tilt 512, FIG. 5B), and/or a distance of the stylus 203 relative to the touch-sensitive surface (e.g., a distance 514, FIG. 5B). In some embodiments, the positional state of stylus 203 corresponds to (or indicates) a pitch, yaw, and/or roll of the stylus (e.g., an attitude of the stylus 203 relative to a particular frame of reference, such as a touch-sensitive surface (e.g., the touch screen 112) or the ground). In some embodiments, the positional state includes a set of positional parameters (e.g., one or more positional parameters). In some embodiments, the positional state is detected in accordance with one or more measurements from the stylus 203 that are sent to an electronic device (e.g., the electronic device 100). For example, the stylus 203 measures the tilt (e.g., the tilt 512, FIG. 5B) and/or the orientation (e.g., the orientation 506, FIG. 5A) of the stylus and sends the measurement to the electronic device 100. In some embodiments, the positional state is detected in accordance with raw output, from one or more electrodes in the stylus, that is sensed by a touch-sensitive surface (e.g., the touch screen 112 of the electronic device 100) instead of, or in combination with a positional state detected in accordance with one or more measurements from the stylus 203. For example, the touch-sensitive surface receives raw output from one or more electrodes in the stylus 203 and calculates the tilt and/or the orientation of the stylus 203 based on the raw output (optionally, in conjunction with positional state information provided by the stylus 203 based on sensor measurements generated by the stylus 203).

FIG. 5A illustrates the stylus 203 relative to a touch-sensitive surface (e.g., the touch screen 112 of the electronic device 100) from a viewpoint directly above the touch-sensitive surface, in accordance with some embodiments. In FIG. 5A, a z axis 594 points out of the page (i.e., in a direction normal to a plane of touch screen 112), an x axis 590 is parallel to a first edge (e.g., a length) of the touch screen 112, a y axis 592 is parallel to a second edge (e.g., a width) of the touch screen 112, and the y axis 592 is perpendicular to the x axis 590.

FIG. 5A illustrates the tip of the stylus 203 at the (x,y) position 504. In some embodiments, the tip of the stylus 203 is a terminus of the stylus 203 configured for determining proximity of the stylus 203 to a touch-sensitive surface (e.g., the touch screen 112). In some embodiments, the projection of the tip of the stylus 203 on the touch-sensitive surface is an orthogonal projection. In other words, the projection of the tip of the stylus 203 on the touch-sensitive surface is a point at the end of a line from the stylus tip to the touch-sensitive surface that is normal to a surface of the touch-sensitive surface (e.g., the (x,y) position 504 at which the tip of the stylus 203 would touch the touch-sensitive surface if the stylus 203 were moved directly along a path normal to the touch-sensitive surface). In some embodiments, the (x,y) position 504 at the lower left corner of the touch screen 112 is position (0,0) (e.g., the (0,0) position 502) and other (x,y) positions on touch screen 112 are relative to the lower left corner of the touch screen 112. Alternatively, in some embodiments, the (0,0) position is located at another position of touch screen 112 (e.g., in the center of the touch screen 112) and other (x,y) positions are relative to the (0,0) position of the touch screen 112.

Further, FIG. 5A illustrates the stylus 203 with the orientation 506. In some embodiments, the orientation 506 is an orientation of a projection of the stylus 203 onto the touch screen 112 (e.g., an orthogonal projection of a length of the stylus 203 or a line corresponding to the line between the projection of two different points of the stylus 203 onto the touch screen 112). In some embodiments, the orientation 506 is relative to at least one axis in a plane parallel to the touch screen 112. In some embodiments, the orientation 506 is relative to a single axis in a plane parallel to the touch screen 112 (e.g., an axis 508, with a clockwise rotation angle from the axis 508 ranging from 0 degrees to 360 degrees, as shown in FIG. 5A). Alternatively, in some embodiments, the orientation 506 is relative to a pair of axes in a plane parallel to the touch screen 112 (e.g., the x axis 590 and the y axis 592, as shown in FIG. 5A, or a pair of axes associated with an application displayed on the touch screen 112).

In some embodiments, an indication (e.g., an indication 516) is displayed on a touch-sensitive display (e.g., the touch screen 112 of the electronic device 100). In some embodiments, the indication 516 shows where the stylus 203 will touch (or mark) the touch-sensitive display before the stylus 203 touches the touch-sensitive display. In some embodiments, the indication 516 is a portion of a mark that is being drawn on the touch-sensitive display. In some embodiments, the indication 516 is separate from a mark that is being drawn on the touch-sensitive display and corresponds to a virtual "pen tip" or other element that indicates where a mark will be drawn on the touch-sensitive display.

In some embodiments, the indication 516 is displayed in accordance with the positional state of the stylus 203. For example, in some circumstances, the indication 516 is displaced from the (x,y) position 504 (as shown in FIGS. 5A and 5B), and in other circumstances, the indication 516 is not displaced from the (x,y) position 504 (e.g., the indication 516 is displayed at or near the (x,y) position 504 when the tilt 512 is zero degrees). In some embodiments, the indication 516 is displayed, in accordance with the positional state of the stylus 203, with varying color, size (or radius or area), opacity, and/or other characteristics. In some embodiments, the displayed indication accounts for thickness of a glass layer on the touch-sensitive display, so as to carry through the indication 516 "onto the pixels" of the touch-sensitive display, rather than displaying the indication 516 "on the glass" that covers the pixels.

FIG. 5B illustrates the stylus 203 relative to a touch-sensitive surface (e.g., the touch screen 112 of the electronic device 100) from a side viewpoint of the touch-sensitive surface, in accordance with some embodiments. In FIG. 5B, a z axis 594 points in a direction normal to the plane of the touch screen 112, an x axis 590 is parallel to a first edge (e.g., a length) of the touch screen 112, a y axis 592 is parallel to a second edge (e.g., a width) of the touch screen 112, and the y axis 592 is perpendicular to the x axis 590.

FIG. 5B illustrates the stylus 203 with the tilt 512. In some embodiments, the tilt 512 is an angle relative to a normal (e.g., a normal 510) to a surface of the touch-sensitive surface (also called simply the normal to the touch-sensitive surface). As shown in FIG. 5B, the tilt 512 is zero when the stylus is perpendicular/normal to the touch-sensitive surface (e.g., when the stylus 203 is parallel to the normal 510) and the tilt 512 increases as the stylus 203 is tilted closer to being parallel to the touch-sensitive surface.

Further, FIG. 5B illustrates the distance 514 of the stylus 203 relative to the touch-sensitive surface. In some embodiments, the distance 514 is the distance from the tip of stylus 203 to the touch-sensitive surface, in a direction normal to the touch-sensitive surface. For example, in FIG. 5B, the distance 514 is the distance from the tip of the stylus 203 to the (x,y) position 504.

Although the terms, "x axis," "y axis," and "z axis," are used herein to illustrate certain directions in particular figures, it will be understood that these terms do not refer to absolute directions. In other words, an "x axis" could be any respective axis, and a "y axis" could be a particular axis that is distinct from the x axis. Typically, the x axis is perpendicular to the y axis. Similarly, a "z axis" is distinct from the "x axis" and the "y axis," and is typically perpendicular to both the "x axis" and the "y axis."

Further, FIG. 5B illustrates a roll 518, a rotation about the length (long axis) of the stylus 203.

Attention is now directed towards embodiments of user interfaces ("UP") that are, optionally, implemented on a portable multifunction device 100.

Figure 6A:
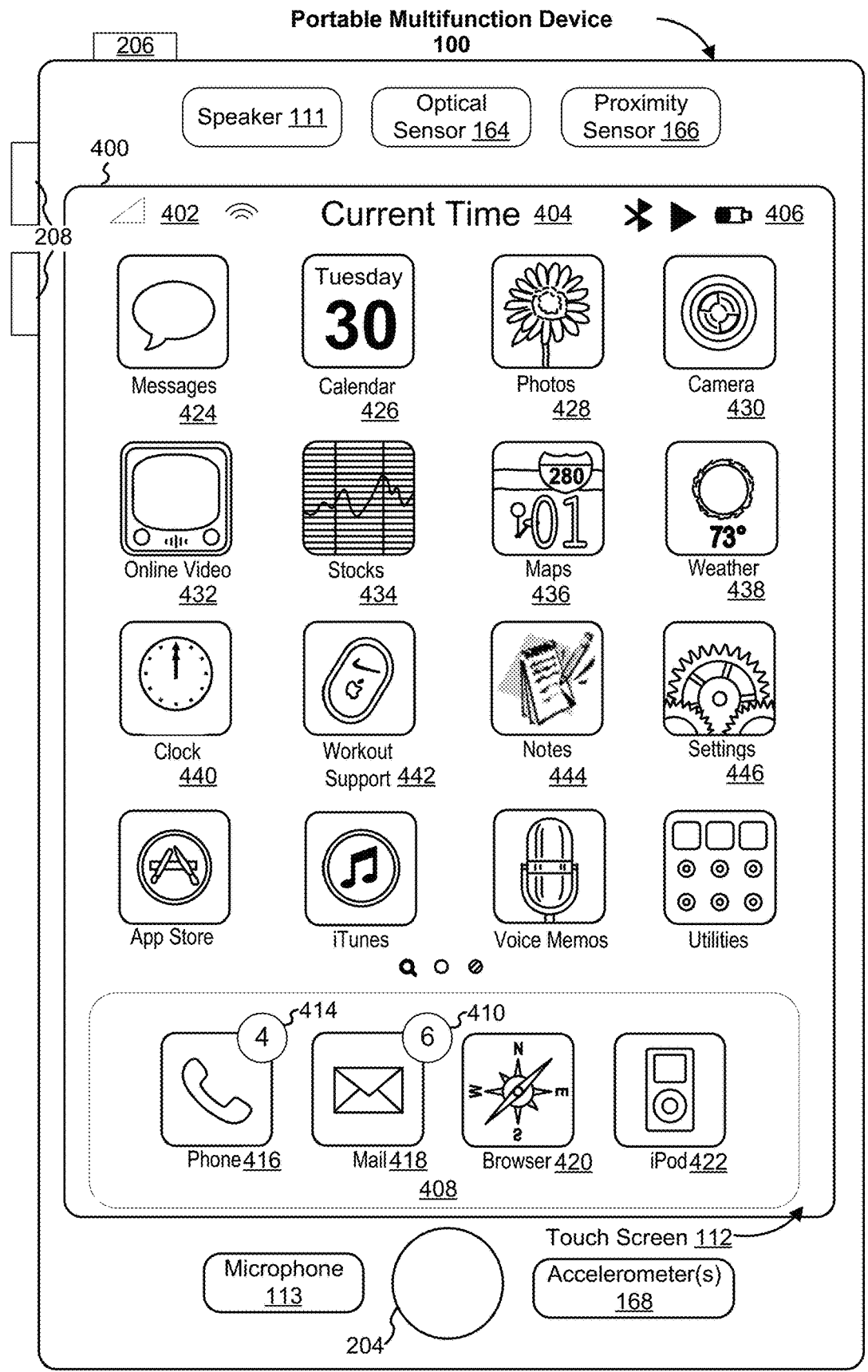
FIG. 6A illustrates an example user interface for a menu of applications on a portable multifunction device in accordance with some embodiments.
Figure 7A:
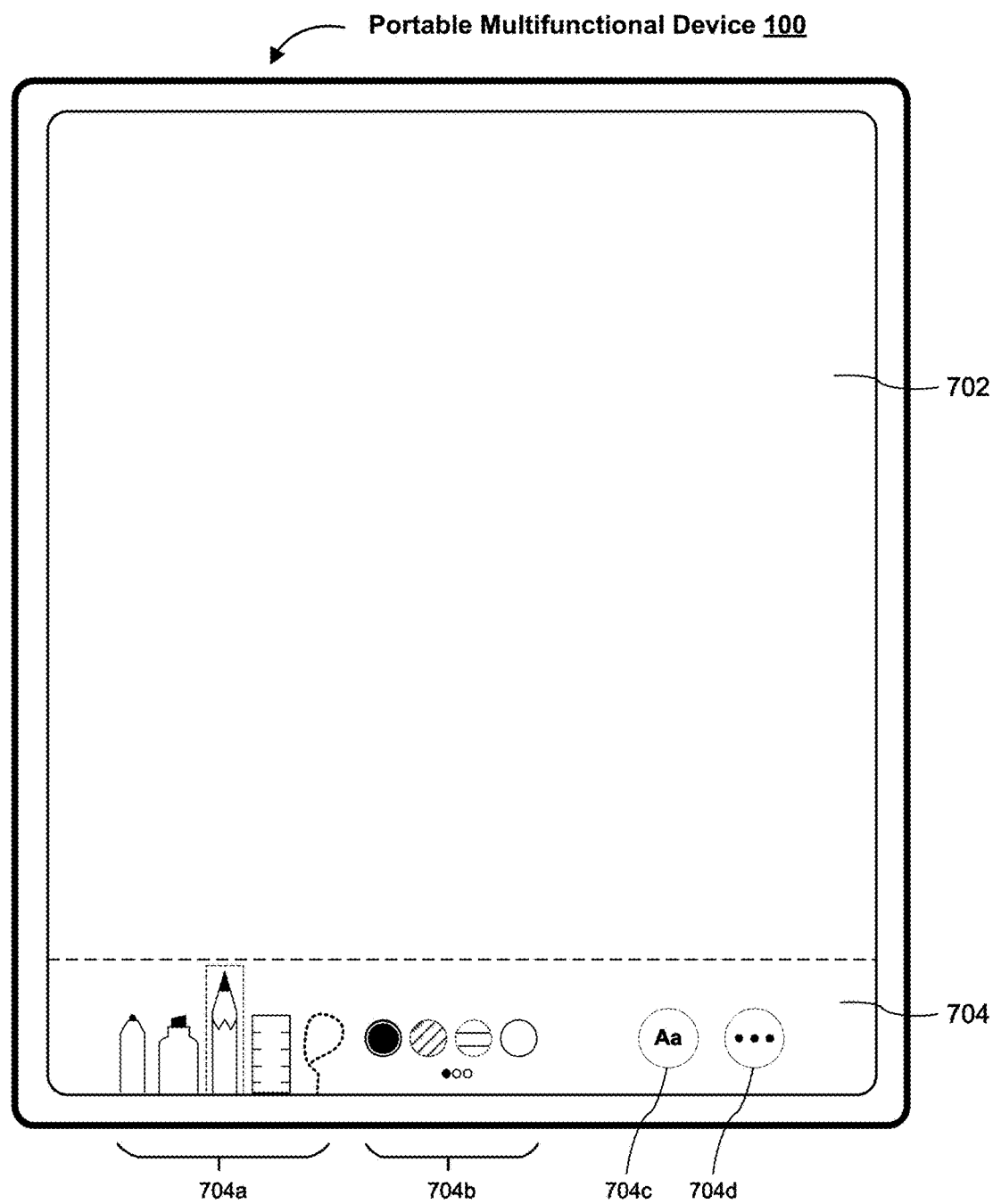
FIGS. 7A-7BF are examples of user interfaces for performing content manipulation operations in response to multi-finger gestures in accordance with some embodiments.
Figure 7B:
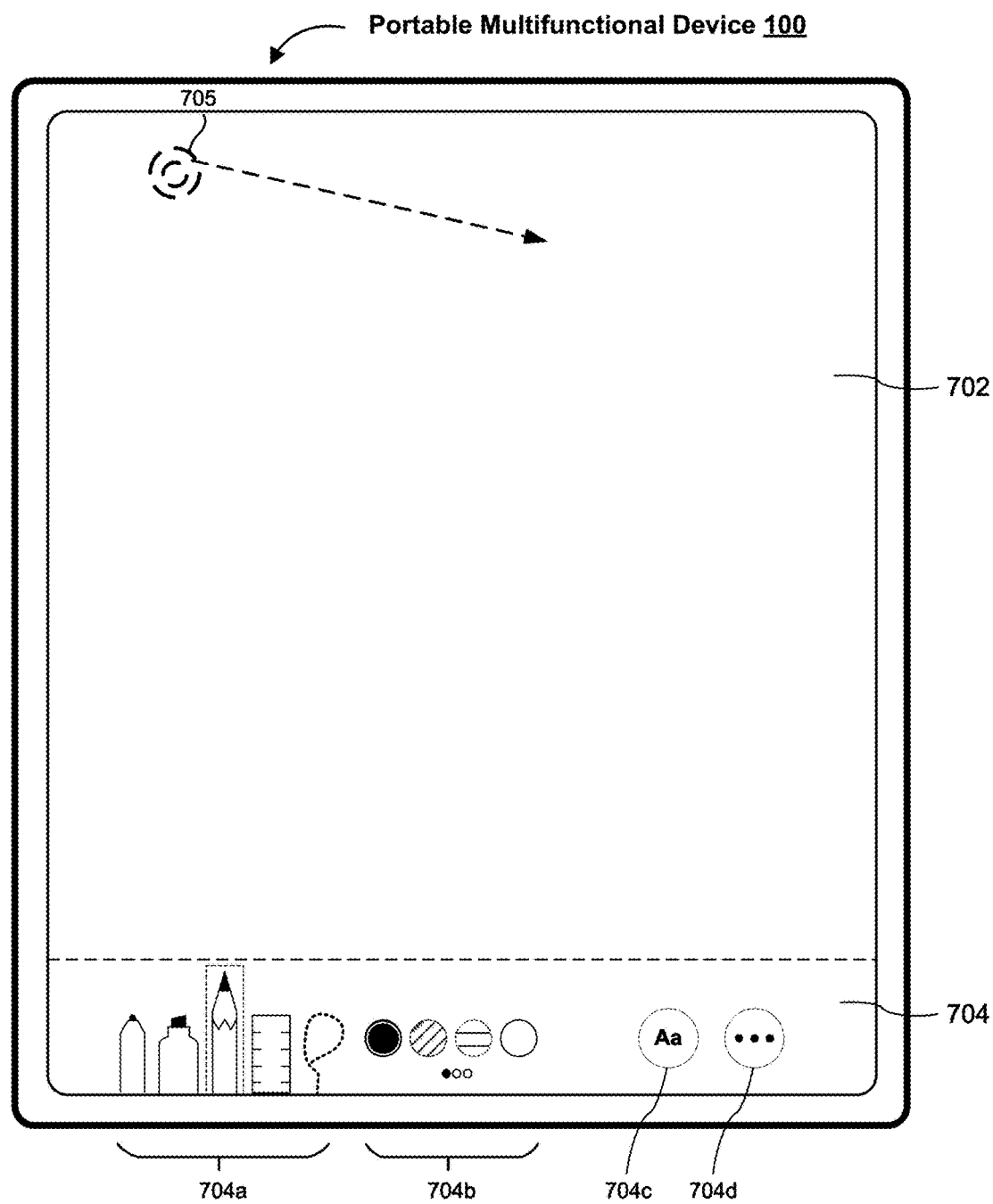
Figure 7C:
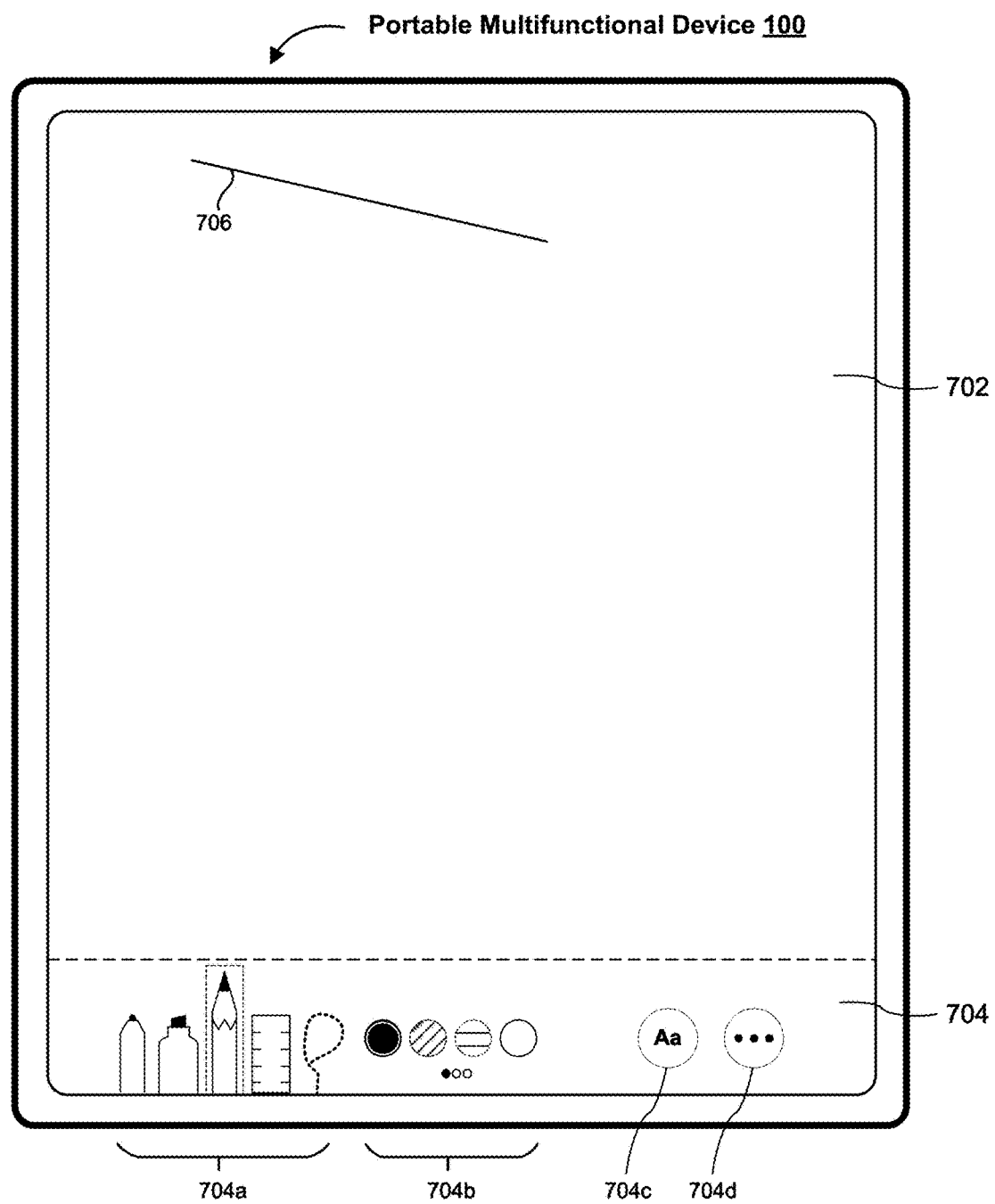
Figure 7D:
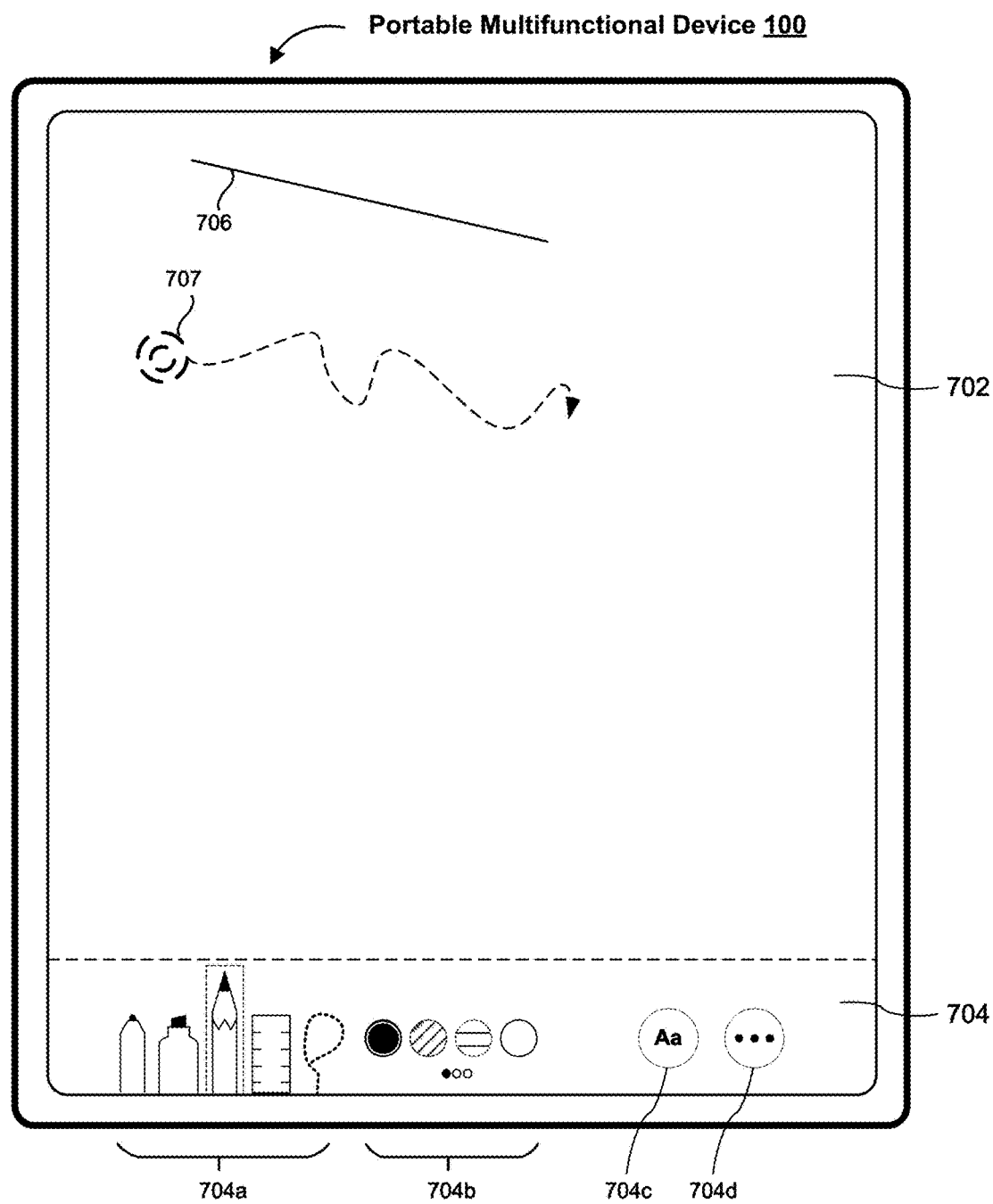
Figure 7E:
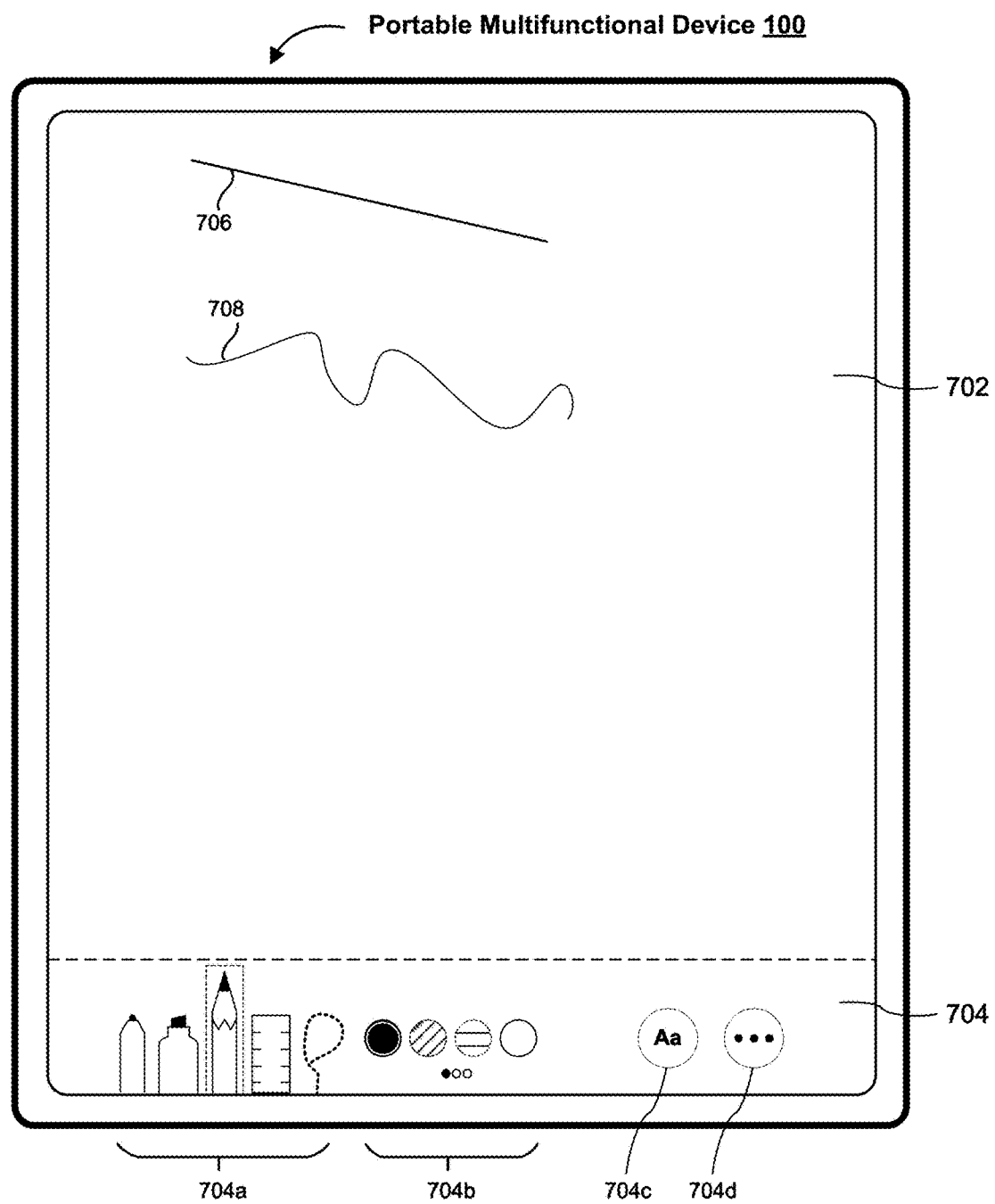

FIG. 6A illustrates an exemplary user interface for a menu of applications on the portable multifunction device 100 in accordance with some embodiments. Similar user interfaces are, optionally, implemented on the electronic device 300. In some embodiments, user interface 600 includes the following elements, or a subset or superset thereof:

Signal strength indicator(s) 602 for wireless communication(s), such as cellular and Wi-Fi signals;
Time 604;
BLUETOOTH indicator 605;
Battery status indicator 606;
Tray 608 with icons for frequently used applications, such as:
  Icon 616 for telephone module 138, labeled "Phone," which optionally includes an indicator 614 of the number of missed calls or voicemail messages;
  Icon 618 for e-mail client module 140, labeled "Mail," which optionally includes an indicator 610 of the number of unread e-mails;
  Icon 620 for browser module 147, labeled "Browser;" and
  Icon 622 for video and music player module 152, also referred to as iPod® (trademark of Apple Inc.) module 152, labeled "iPod;" and
Icons for other applications, such as:
  Icon 624 for IM module 141, labeled "Messages;"
  Icon 626 for calendar module 148, labeled "Calendar;"
  Icon 628 for image management module 144, labeled "Photos;"
  Icon 630 for camera module 143, labeled "Camera;"
  Icon 632 for online video module 155, labeled "Video Editing;"
  Icon 634 for stocks widget 149-2, labeled "Stocks;"
  Icon 636 for map module 154, labeled "Map;"
  Icon 638 for weather widget 149-1, labeled "Weather;"
  Icon 640 for alarm clock widget 149-4, labeled "Clock;"
  Icon 642 for workout support module 142, labeled "Workout Support;"
  Icon 644 for notes module 153, labeled "Notes;" and
  Icon 646 for a settings application or module, which provides access to settings for the electronic device 100 and its various applications 136.

It should be noted that the icon labels illustrated in FIG. 6A are merely examples. For example, in some embodiments, the icon 622 for the video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 6B:
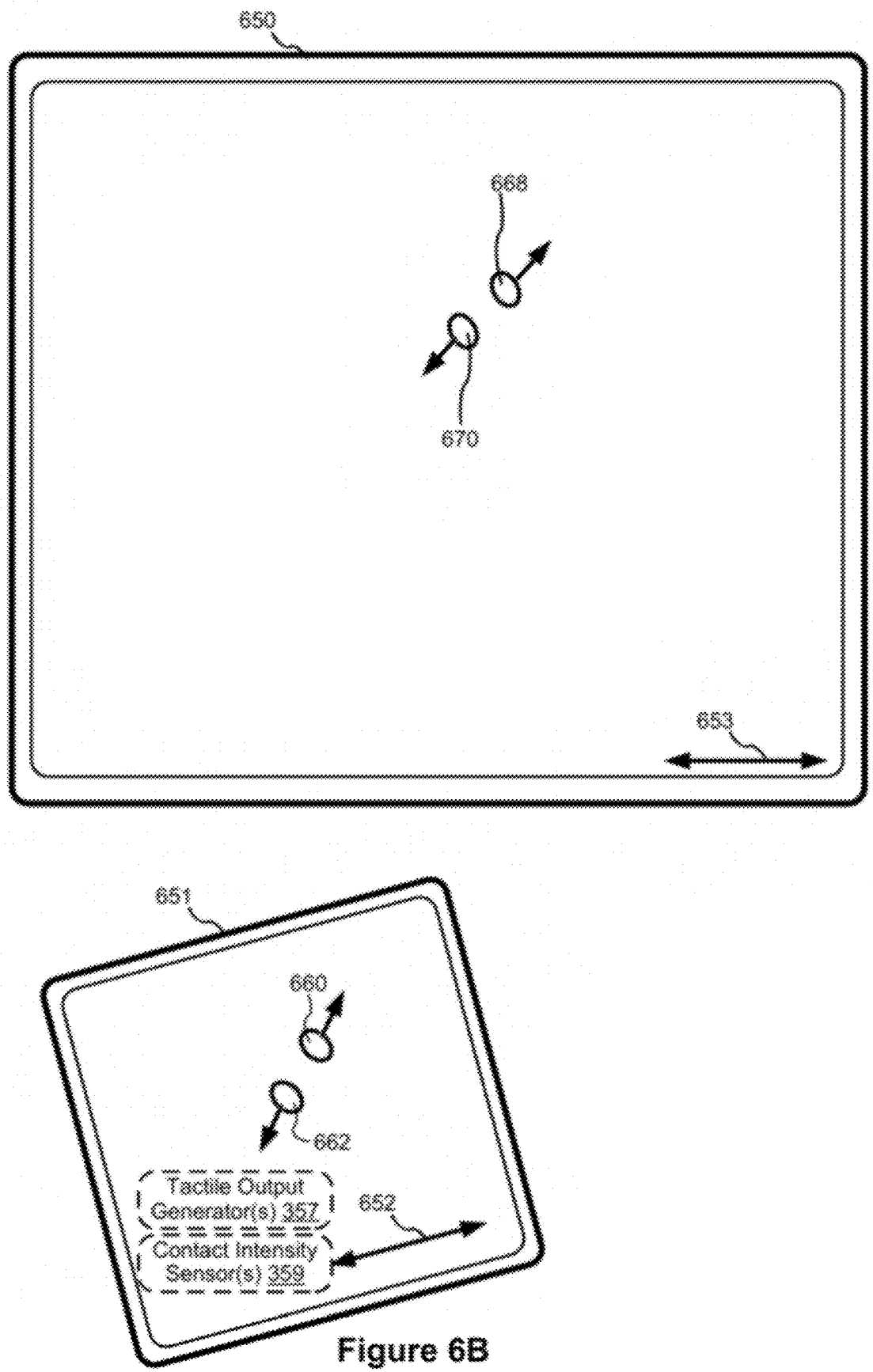
FIG. 6B illustrates an example user interface for a multifunction device with a touch-sensitive surface that is separate from the display in accordance with some embodiments.

FIG. 6B illustrates an exemplary user interface on an electronic device (e.g., the device 300, FIG. 3) with a touch-sensitive surface 651 (e.g., a tablet or touchpad 355, FIG. 3) that is separate from the display 650. The device 300 also, optionally, includes one or more contact intensity sensors (e.g., the one or more sensors 359) for detecting intensity of contacts on the touch-sensitive surface 651 and/or one or more tactile output generators 357 for generating tactile outputs for a user of the device 300.

FIG. 6B illustrates an exemplary user interface on an electronic device (e.g., the device 300, FIG. 3) with a touch-sensitive surface 651 (e.g., a tablet or touchpad 355, FIG. 3) that is separate from the display 650. Although many of the examples that follow will be given with reference to inputs on the touch screen display 112 (where the touch-sensitive surface and the display are combined), in some embodiments, the electronic device 100 detects inputs on a touch-sensitive surface that is separate from the display, as shown in FIG. 6B. In some embodiments, the touch-sensitive surface (e.g., the touch-sensitive surface 651 in FIG. 6B) has a primary axis (e.g., a primary axis 652 in FIG. 6B) that corresponds to a primary axis (e.g., a primary axis 653 in FIG. 6B) on the display (e.g., the 650). In accordance with these embodiments, the electronic device 100 detects contacts (e.g., contacts 660 and 662 in FIG. 6B) with the touch-sensitive surface 651 at locations that correspond to respective locations on the display (e.g., in FIG. 6B, the contact 660 corresponds to a location 668 and the contact 662 corresponds to a location 670). In this way, user inputs (e.g., the contacts 660 and 662, and movements thereof) detected by the electronic device 100 on the touch-sensitive surface (e.g., the touch-sensitive surface 651 in FIG. 6B) are used by the electronic device 100 to manipulate the user interface on the display (e.g., the display 650 in FIG. 6B) of the electronic device 100 when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.) and/or stylus inputs, it should be understood that, in some embodiments, one or more of the finger inputs are replaced with input from another input device (e.g., a mouse-based input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts (or stylus contacts) are, optionally, used simultaneously.

User Interfaces and Associated Processes

Attention is now directed towards embodiments of user interfaces ("UI") and associated processes that may be implemented on an electronic device, such as the portable multifunction device 100 in FIG. 1 or the electronic device 300 in FIG. 3, with one or more input devices to detect various inputs (e.g., touch inputs, stylus inputs, mouse inputs, keyboard inputs, etc.) and a display device for manipulating a user interface based on the various inputs.

FIGS. 7A-7BF are examples of user interfaces for performing content manipulation operations in response to multi-finger gestures in accordance with some embodiments. The user interfaces in these figures are used to illustrate the processes described below, including the processes in FIGS. 10A-10E. Although some of the examples which follow will be given with reference to inputs on a touch-screen display (where the touch-sensitive surface and the display are combined, for example on the touch screen 112), in some embodiments, the electronic device 100 detects inputs on the touch-sensitive surface 651 that is separate from the display 650, as shown in FIG. 6B.

As illustrated in FIG. 7A, the electronic device 100 displays a first application interface 702 of a first application, such as a drawing application interface or a word processing application interface. The first application interface 702 includes a toolbar region 704 that may include a variety of affordances (e.g., drawing tools, editing functions, color pots) to facilitate content manipulation operations. For example, as illustrated in FIG. 7A, the toolbar region 704 includes a set of drawing tool affordances 704a, a set of color pots 704b, a text tool affordance 704c, and an additional functions affordance 704d (e.g., share affordance, save affordance, etc.). One of ordinary skill in the art will appreciate that the toolbar region 704 may include any number and types of affordances, arranged in any number of a variety of ways.

The set of drawing tool affordances 704a includes (from left-to-right) a pen affordance, a marker (e.g., highlighter) affordance, a pencil affordance, a ruler affordance, and a selection tool (e.g., lasso tool) affordance. As illustrated in FIG. 7A, the pencil is selected as the currently-selected drawing tool. An input directed to a particular drawing tool affordance sets the particular drawing tool as the currently-selected drawing tool.

The set of color pots 704b enables selection of the currently-selected color. As illustrated in FIG. 7A, black is the currently-selected color. An input directed to a particular color pot sets the corresponding color as currently-selected.

The text tool affordance 704c enables creation of text content within the first application interface 702. For example, after selection of the text tool affordance 704c, inputs directed to the first application interface 702 cause the electronic device 100 to display a text box for receiving a text string and then replace the text box with the text string.

Figure 7F:
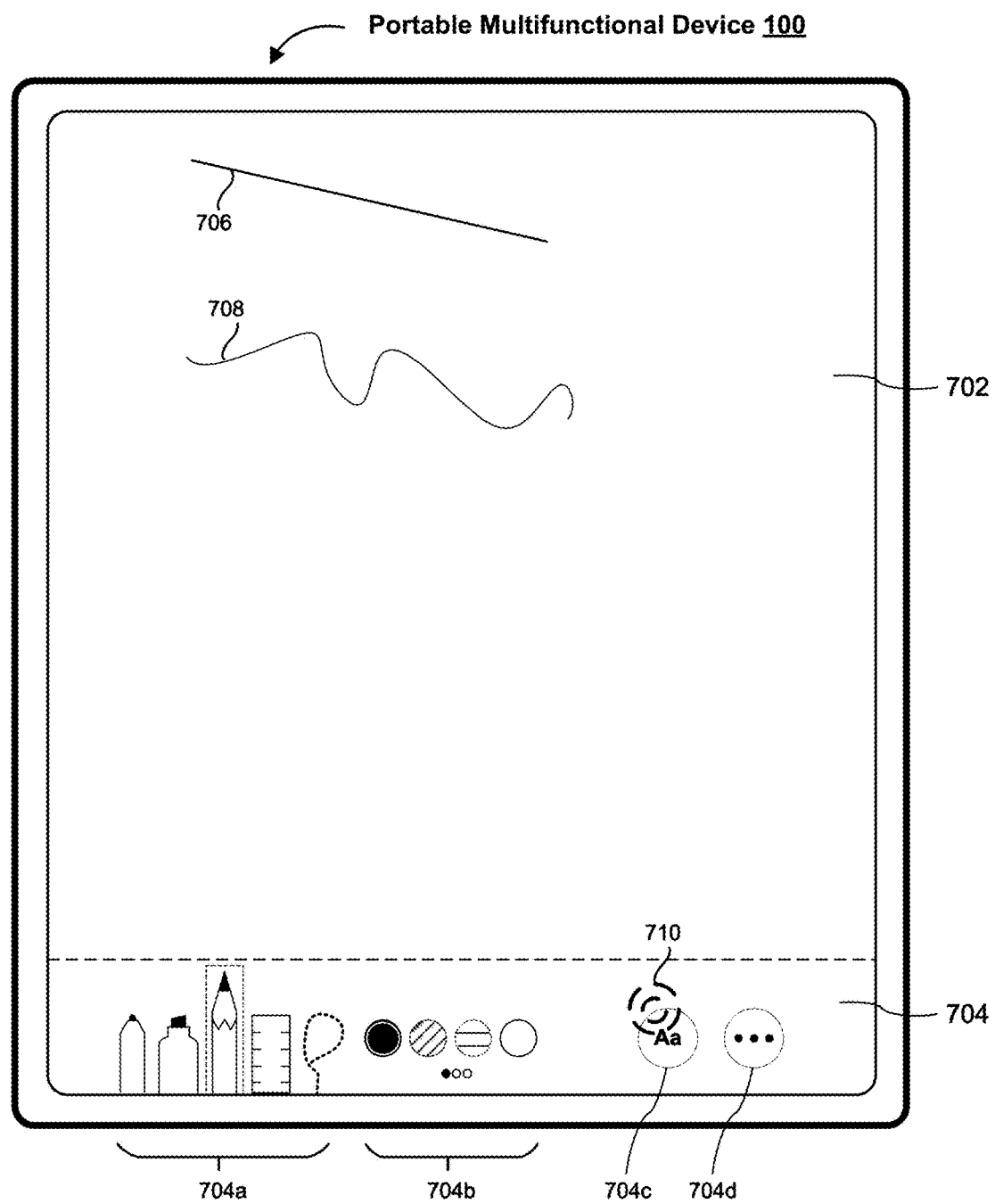
Figure 7G:
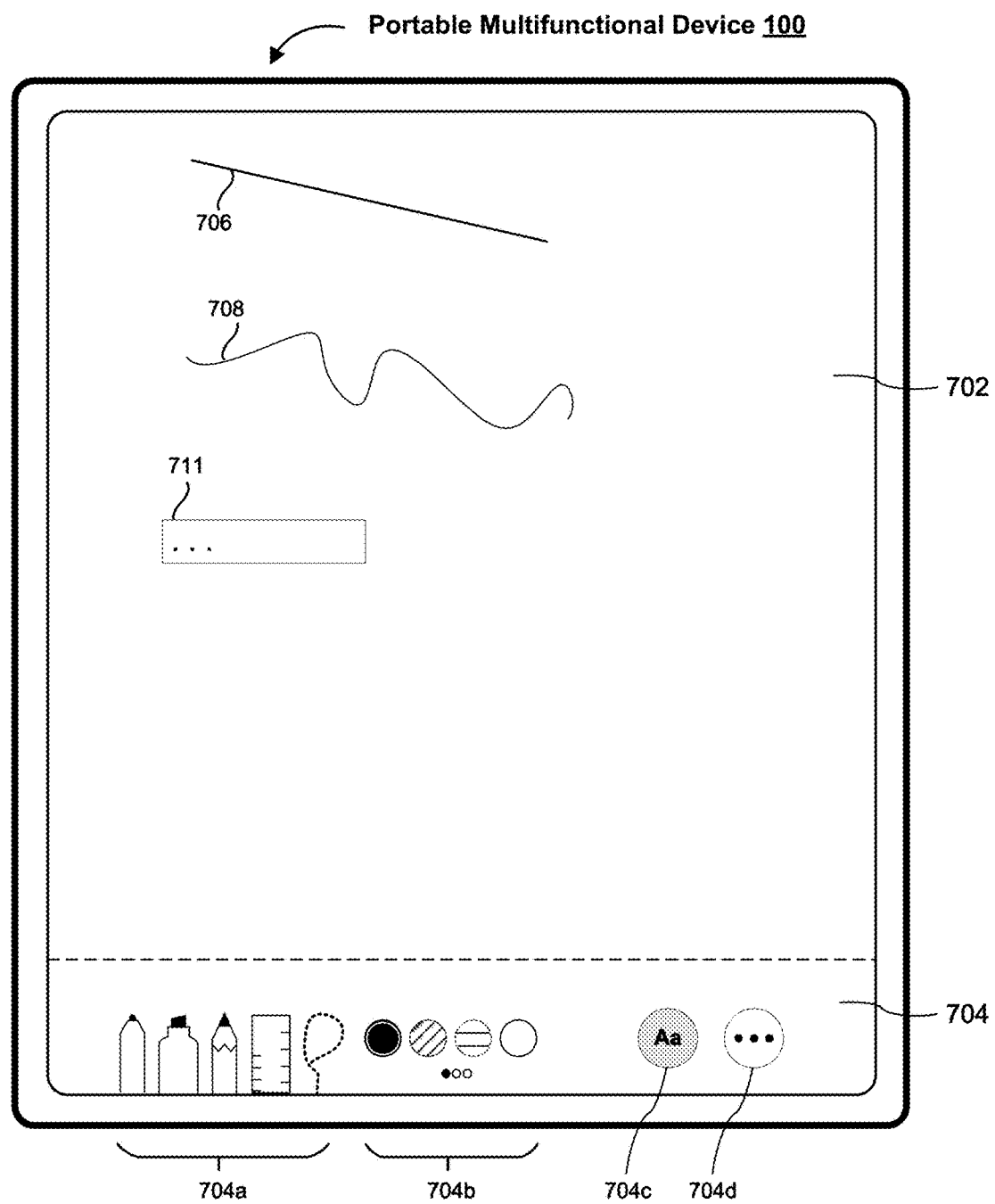
Figure 7H:
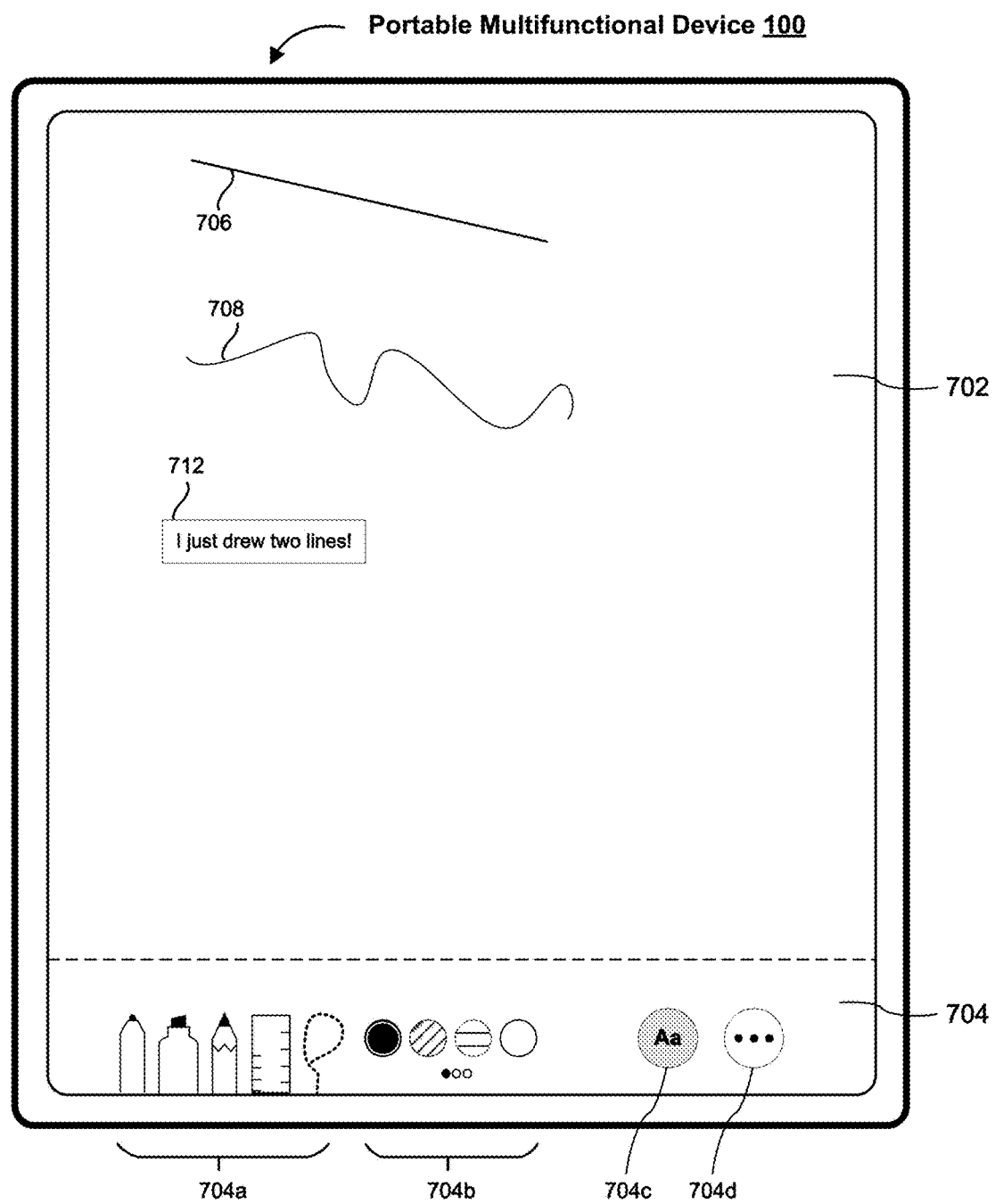
Figure 7I:
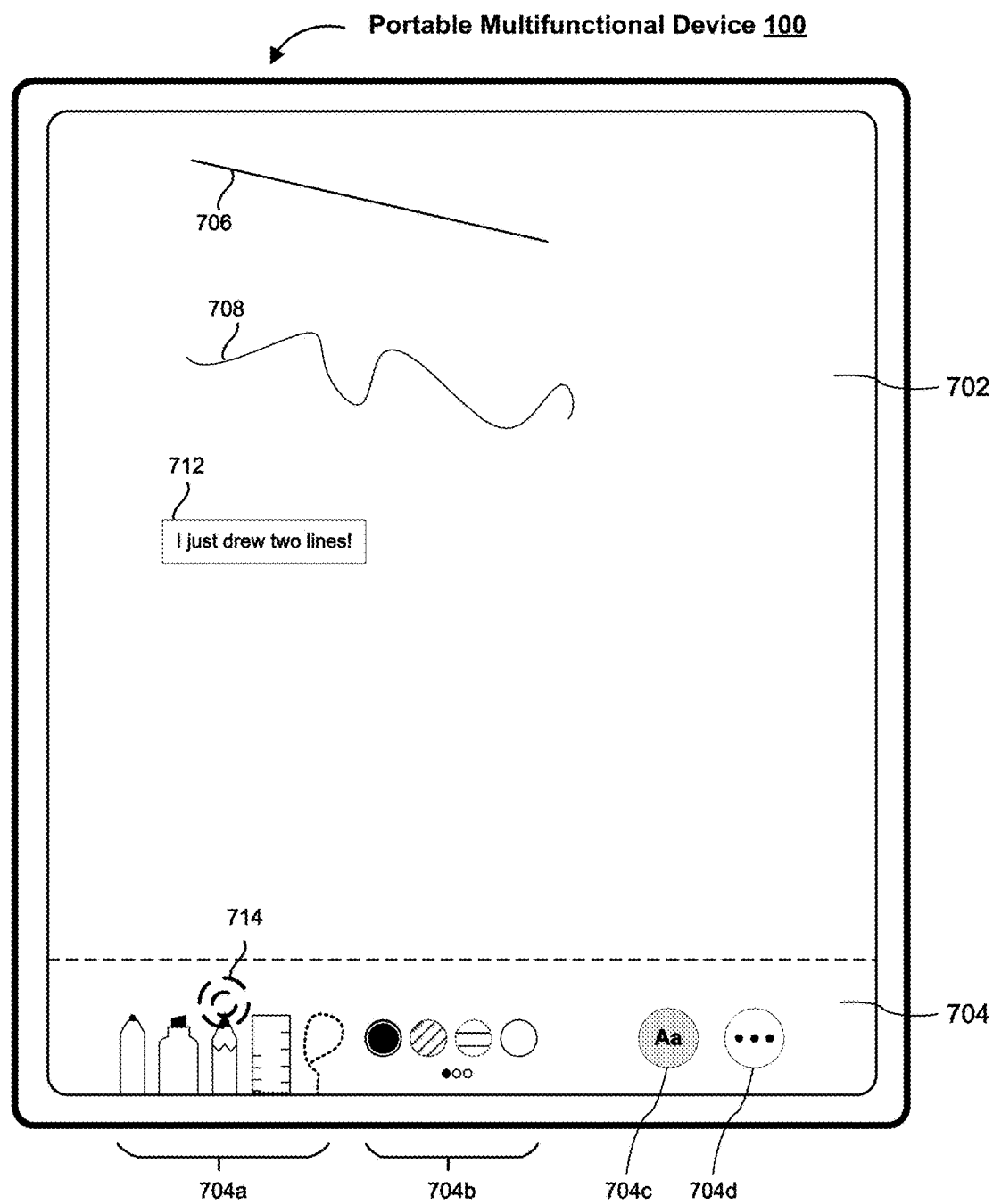
Figure 7J:
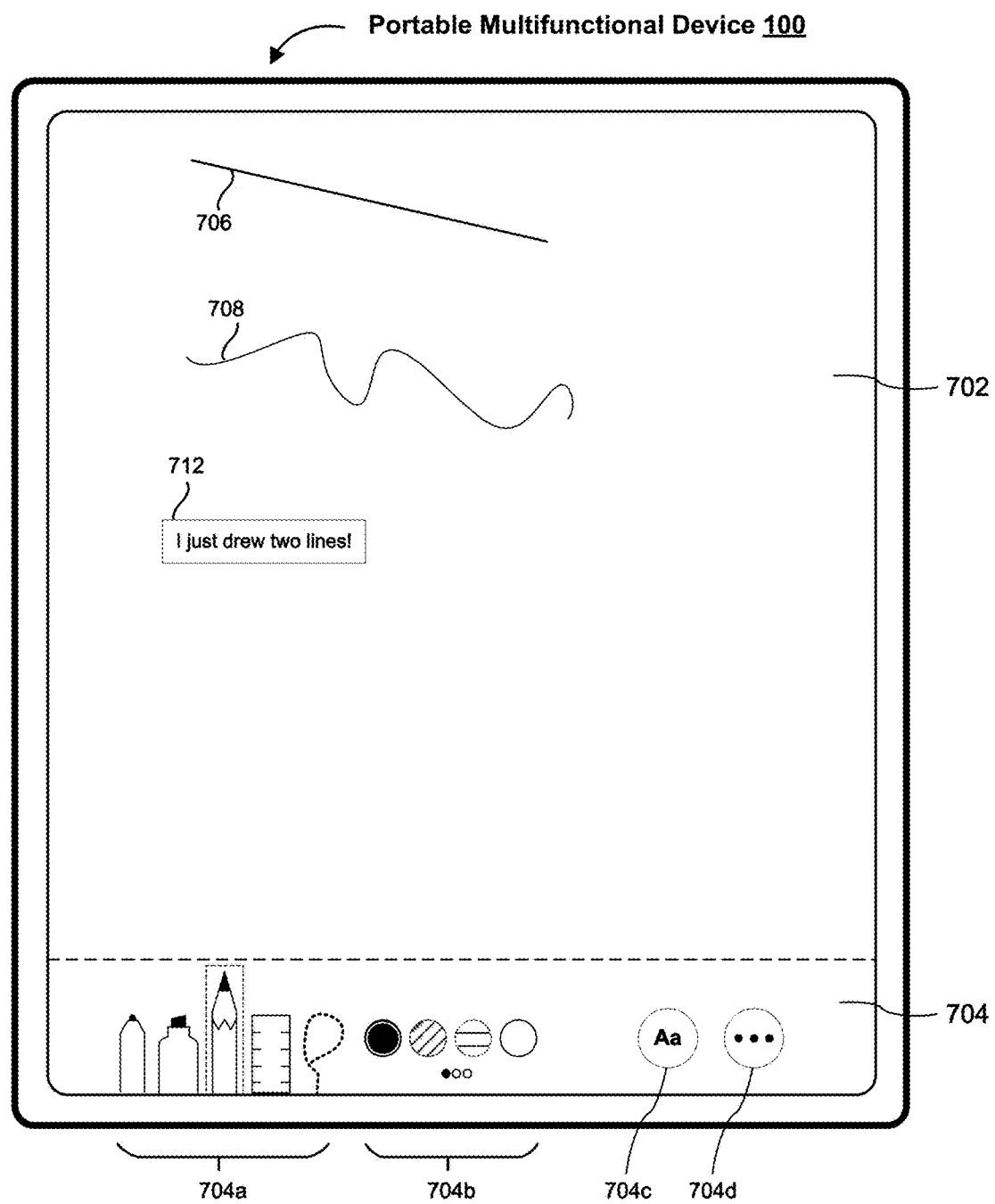

As illustrated in FIGS. 7B-7H, the electronic device 100 displays various content on the first application interface 702 in response to receiving corresponding inputs. Namely, in response to receiving a first draw input 705 in FIG. 7B, the electronic device 100 displays a first mark 706 in FIG. 7C. Moreover, in response to receiving a second draw input 707 in FIG. 7D, the electronic device 100 displays a second mark 708 in FIG. 7E. As illustrated in FIGS. 7F and 7G, based on an input 710 requesting selection of the text tool affordance 704c, the electronic device 100 sets the text tool affordance 704c as the currently-selected tool. After setting the text tool as the currently-selected tool, in response to receiving a text string 712 (e.g., "I just drew two lines!") directed to a text box 711 in FIG. 7G, the electronic device 100 displays the text string 712 in FIG. 7H. As illustrated in FIGS. 7I and 7J, based on an input 714 requesting selection of the pencil affordance within the set of drawing tool affordances 704a, the electronic device 100 sets the pencil as the currently-selected tool.

Figure 7K:
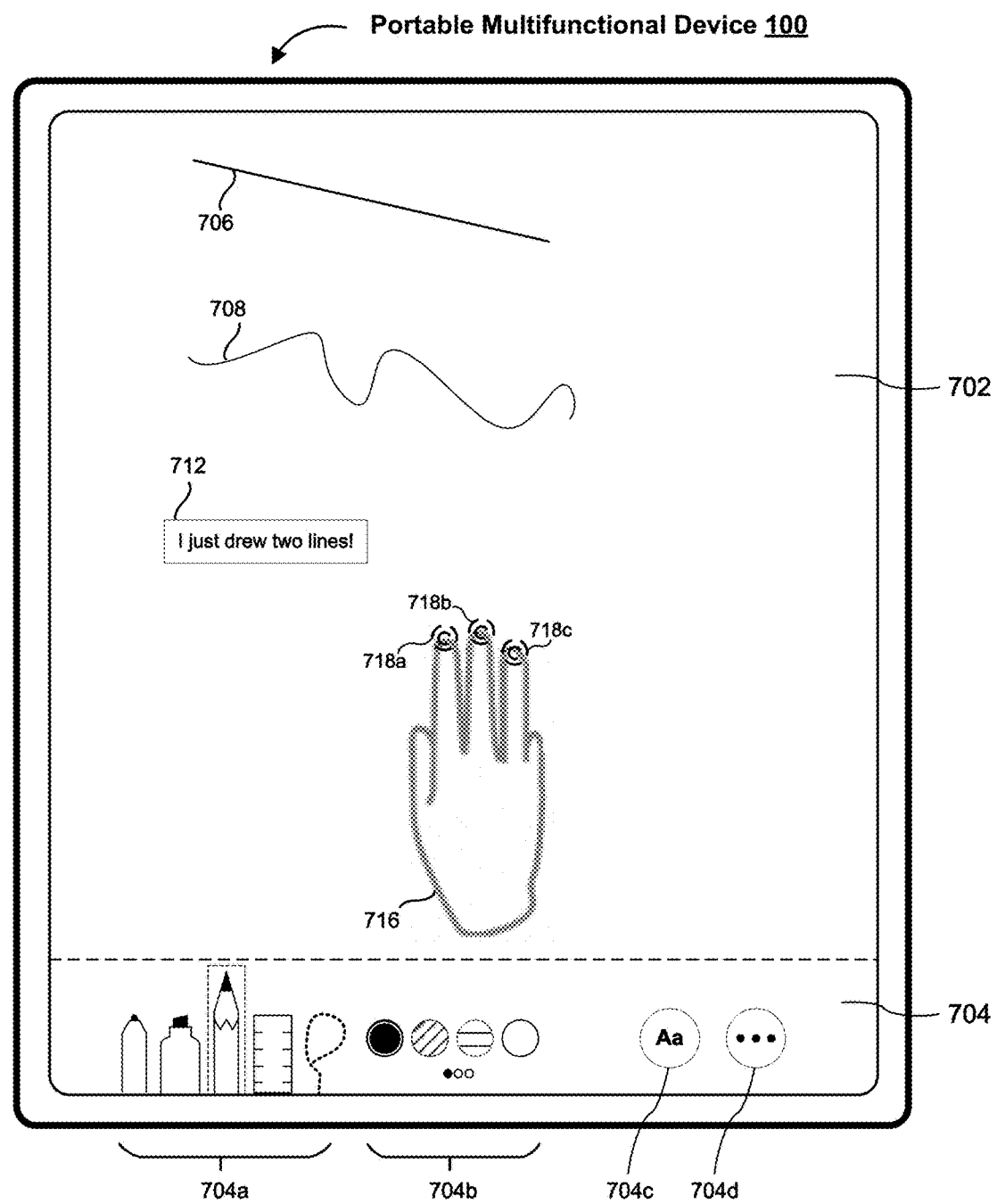

As illustrated in FIG. 7K-7BF, the electronic device 100 performs various content manipulation operations based on multi-finger gestures in different directions. Although the multi-finger gestures in FIGS. 7K-7BF correspond to three-finger gestures, one of ordinary skill in the art will appreciate that some or all of the multi-finger gestures may differ according to some embodiments. Moreover, the relationship between a particular content manipulation operation and a respective direction of a multi-finger gesture may differ in some embodiments.

As illustrated in FIG. 7K, the electronic device 100 detects a multi-finger tap input 718 including a first finger tap input 718a, a second finger tap input 718b, and a third finger tap input 718c associated with a hand 716 of a user. In some embodiments, the multi-finger tap input 718 corresponds to a single tap input. In some embodiments, the electronic device 100 detects the first finger tap input 718a, the second finger tap input 718b, and the third finger tap input 718c within a threshold amount of time of each other. In response to detecting the multi-finger tap input 718 in FIG. 7K, the electronic device 100 displays an interface 722 in FIG. 7L. The interface 722 includes a plurality of content manipulation operation affordances 722a-722e indicative of a corresponding plurality of content manipulation operations. One of ordinary skill in the art will appreciate that, in some embodiments, the interface 722 includes fewer or additional content manipulation operation affordances. The electronic device 100 displays the interface 722 overlaid on the first mark 706 so the first mark 706 does not obscure the interface 722.

Figure 7L:
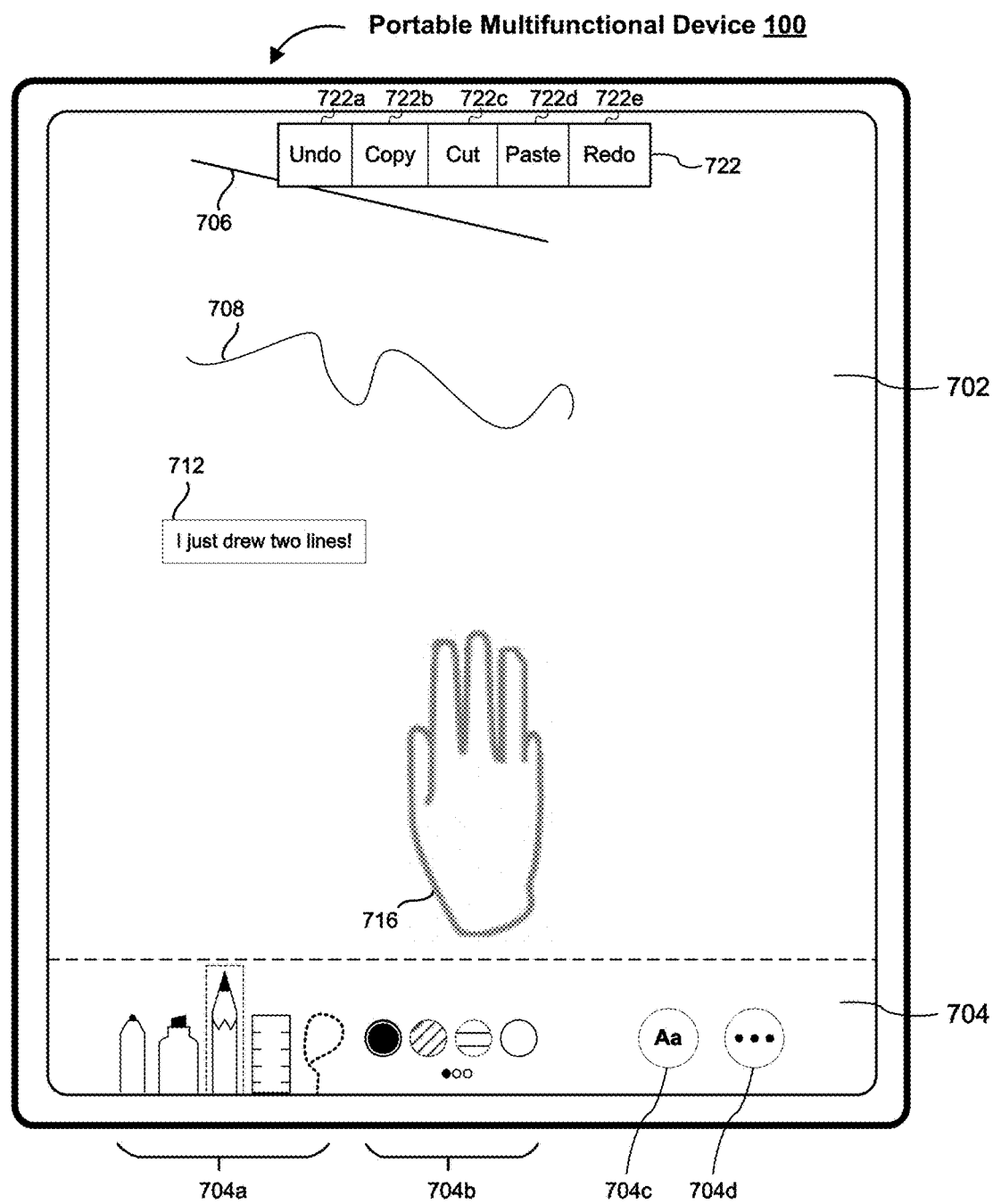
Figure 7M:
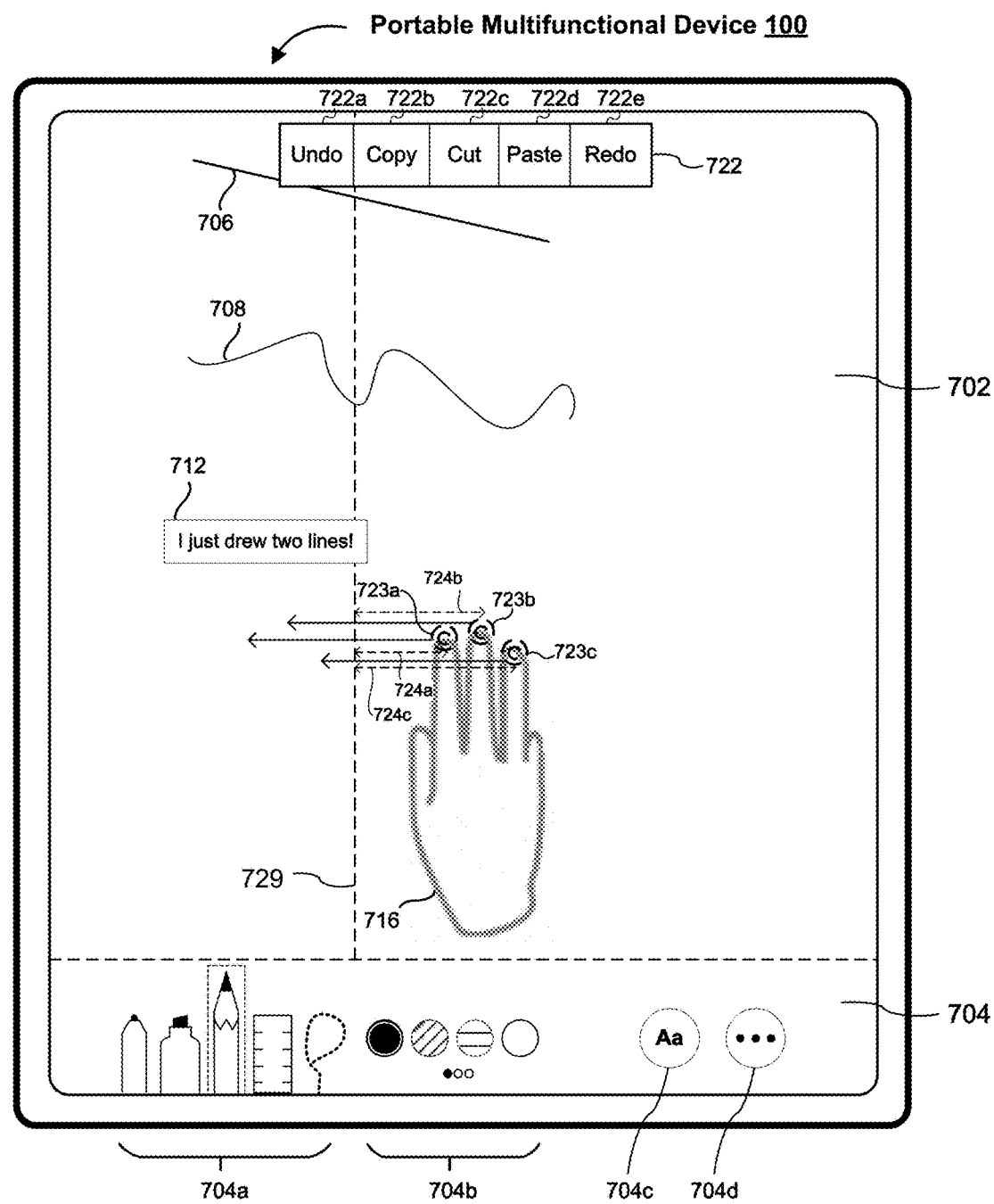

As illustrated in FIGS. 7M-7T, the electronic device 100 performs successive undo operations based on successive multi-finger gestures in a first direction. Although the first direction corresponds to substantially leftwards in FIG. 7M-7T, one of ordinary skill in the art will appreciate that the first direction may correspond to other directions in other embodiments. As illustrated in FIG. 7M, the electronic device 100 detects a first multi-finger gesture 723 input in the (e.g., substantially) leftwards direction. The first multi-finger gesture 723 includes a first finger swipe input 723a, a second finger swipe input 723b, and a third finger swipe input 723c.

The electronic device 100 determines that the first multi-finger gesture 723 includes more than a first predetermined amount of movement in the first direction. The first predetermined amount of movement corresponds to a distance between the origin point of a particular finger swipe and a first threshold line 729, which is illustrated for purely explanatory purposes. In various embodiments, the first threshold line 729 corresponds to a threshold distance from one of the first finger swipe input 723a, the second finger swipe input 723b, or the third finger swipe input 723c. For example, in some embodiments, the first predetermined amount of movement corresponds to a first distance 724a between the origin point of the first finger swipe input 723a and the first threshold line 729, a second distance 724b between the origin point of the second finger swipe input 723b and the first threshold line 729, a third distance 724c between the origin point of the third finger swipe input 723c and the first threshold line 729, or a combination thereof. The first distance 724a, the second distance 724b, and the third distance 724c are illustrated for purely explanatory purposes.

Figure 7N:
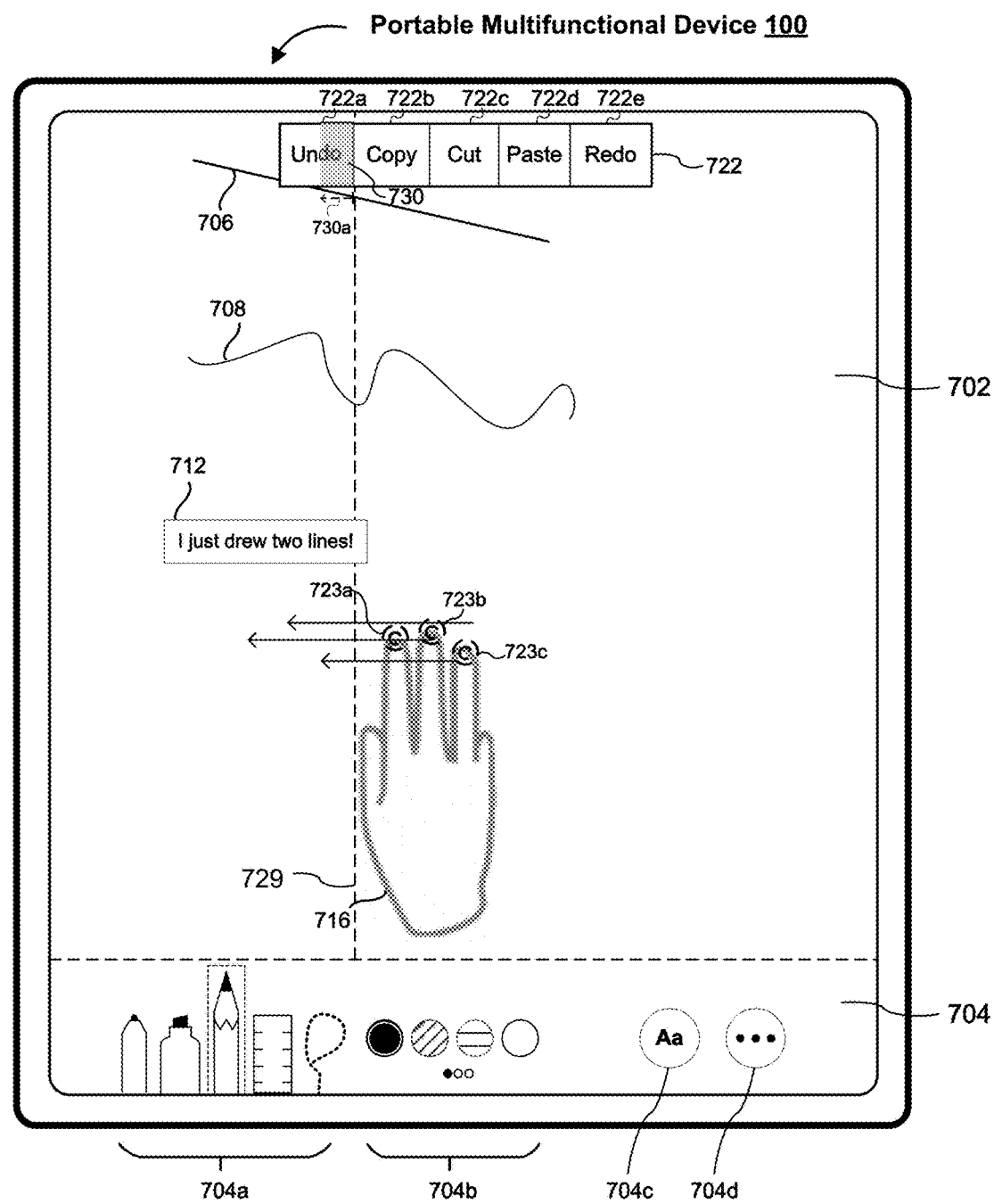
Figure 7O:
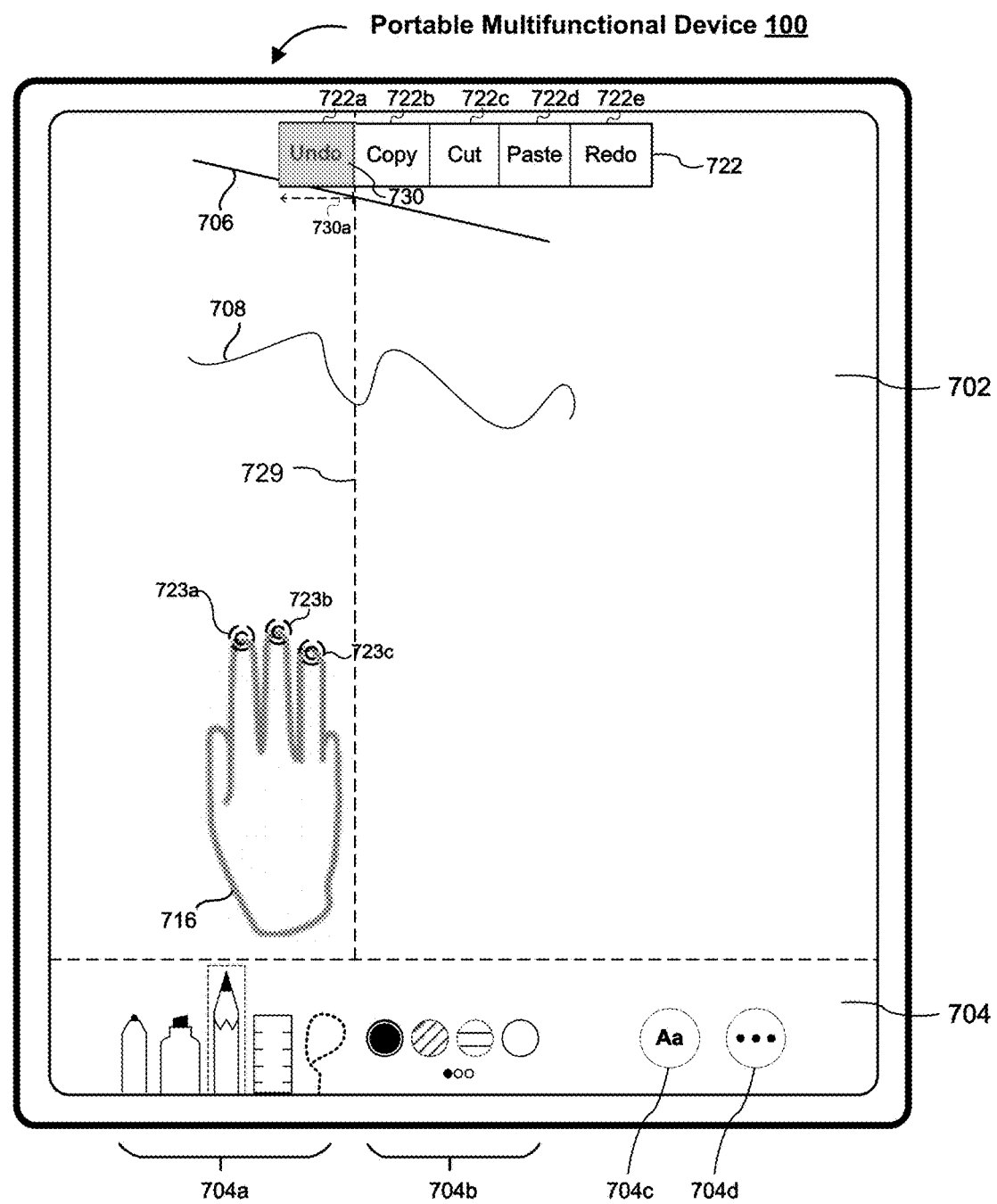

As illustrated in FIGS. 7N and 7O, as the first multi-finger gesture 723 proceeds towards its termination point, the electronic device 100 changes the appearance of the undo affordance 722a. Namely, the electronic device 100 displays a color overlay 730 within the undo affordance 722a. The size 730a of the color overlay 730 depends on how near the first multi-finger gesture 723 is to crossing the first threshold line 729. As illustrated in FIG. 7N, because the first multi-finger gesture 723 is approximately halfway to crossing the first threshold line 729, the size 730a of the color overlay 730 is approximately half the size of the undo affordance 722a. In various embodiments, rather than changing the size 730a of the color overlay 730 depending on how near the first multi-finger gesture 723 is to crossing the first threshold line 729, the electronic device changes a color (or transparency) of the color overlay 730 (e.g., from light to dark) as the first multi-finger gesture 723 approaches crossing the first threshold line 729.

In response to detecting that the first multi-finger gesture 723 crosses the first threshold line 729, the electronic device 100 performs the undo operation on the most recently created content (e.g., removes the text string 712) as illustrated in FIG. 7O. Moreover, as illustrated in FIG. 7O, because the first multi-finger gesture 723 has crossed the first threshold line 729, the size 730a of the color overlay 730 is the same as the size of the undo affordance 722a. Thus, the color overlay 730 completely covers the undo affordance 722a.

Figure 7P:
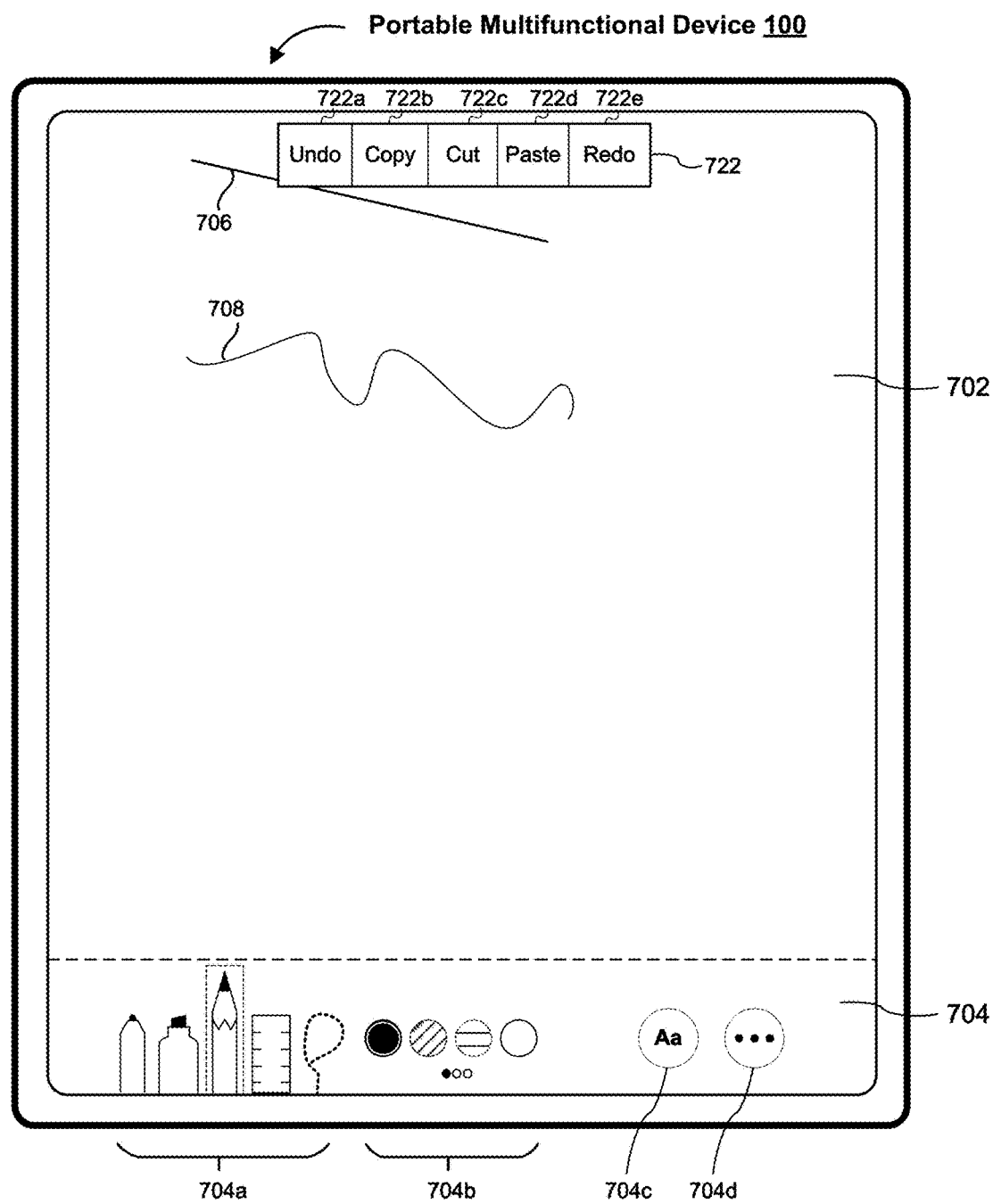
Figure 7Q:
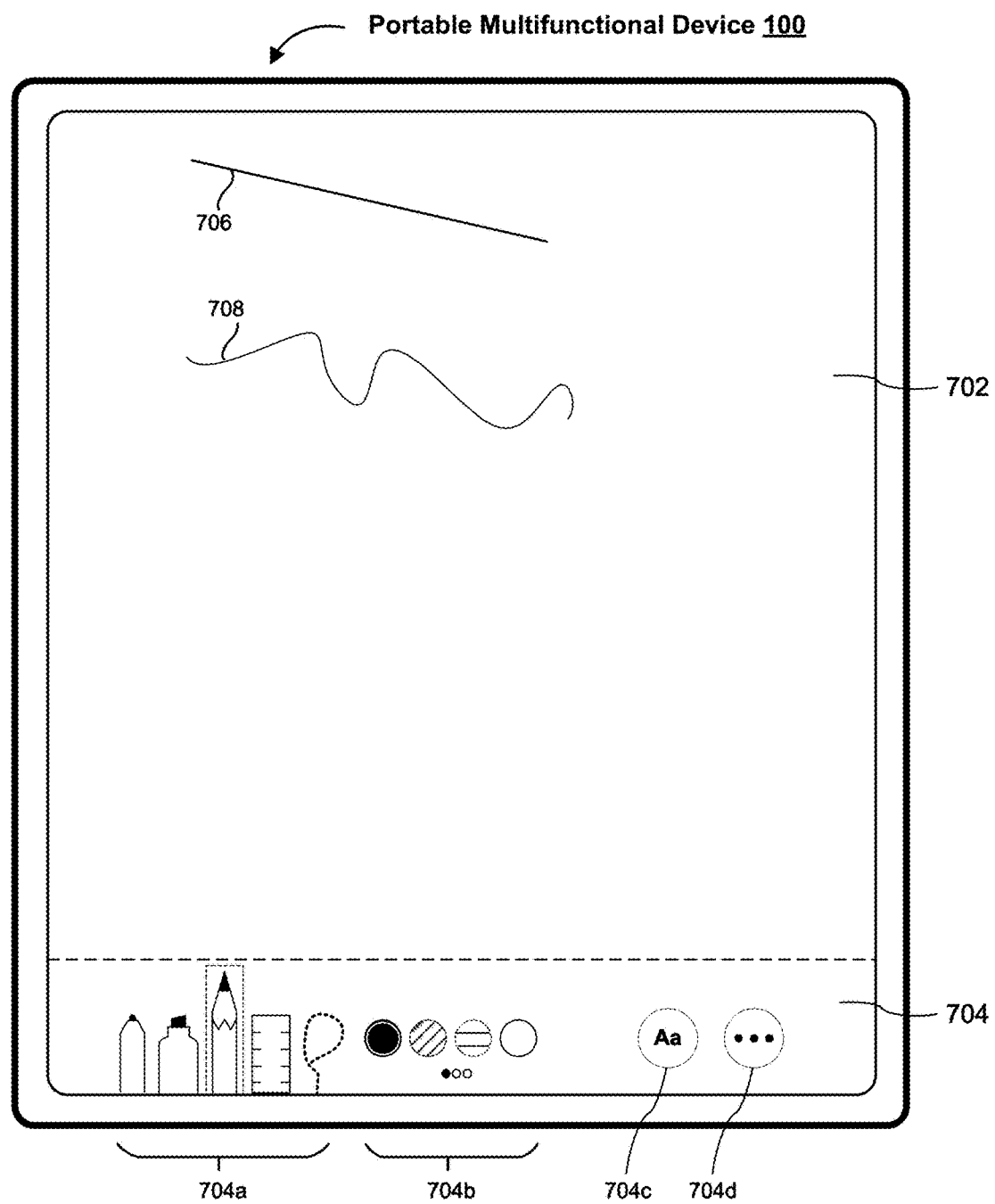

As illustrated in FIGS. 7P and 7Q, in response to the electronic device 100 ceasing to detect the first multi-finger gesture 723, the electronic device 100 maintains displaying the interface 722 for a threshold amount of time and thereafter ceases to display the interface 722. Maintaining the interface 722 enables the electronic device 100 to detect inputs directed to the interface 722 requesting corresponding content manipulation operations, which will be described below.

Figure 7R:
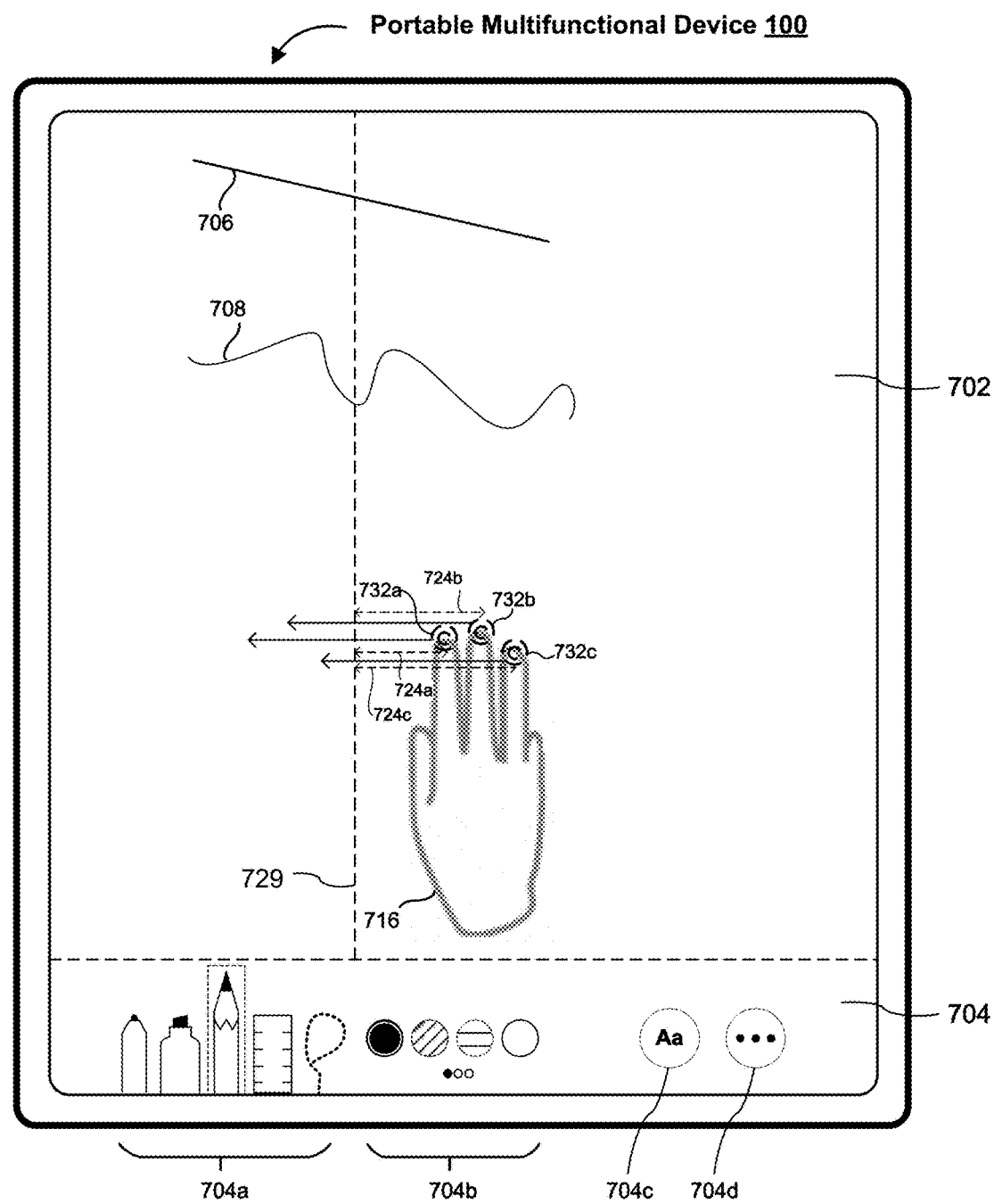

As illustrated in FIG. 7R, the electronic device 100 detects a second multi-finger gesture 732 in the (e.g., substantially) leftwards direction. The second multi-finger gesture 732 includes a first finger swipe input 732a, a second finger swipe input 732b, and a third finger swipe input 732c. The second multi-finger gesture 732 includes more than the first predetermined amount of movement in the first direction. Namely, each of the first finger swipe input 732a, the second finger swipe input 732b, and the third finger swipe input 732c crosses the first threshold line 729.

Figure 7S:
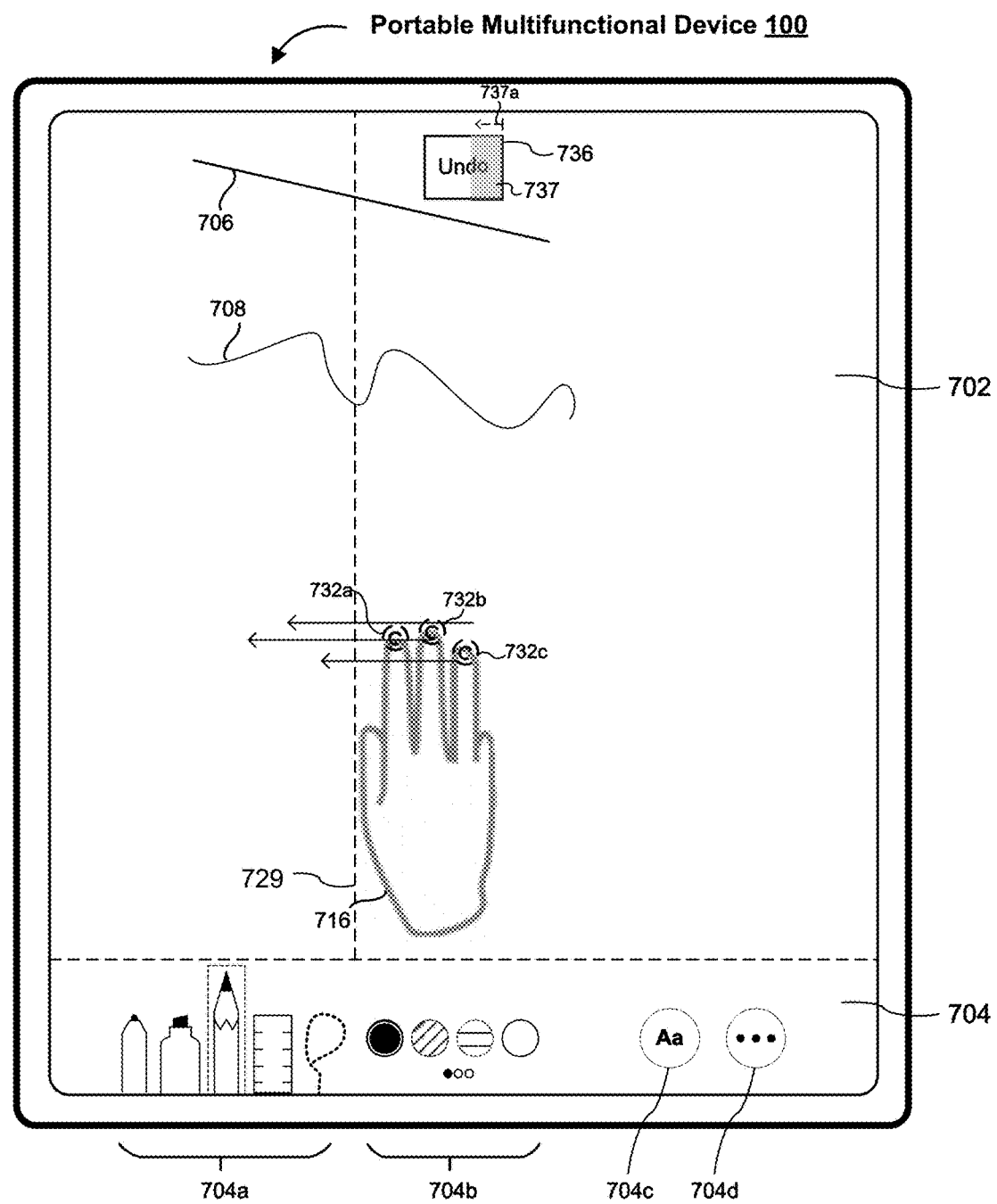

Notably, in contrast to the sequence described above with reference to FIGS. 7K-7O, the electronic device 100 does not detect a tap input prior to detecting the second multi-finger gesture 732. Accordingly, the electronic device 100 does not display the interface 722. Instead, in response to detecting the second multi-finger gesture 732 in FIG. 7R, the electronic device 100 displays an undo indicator 736 that is indicative of the undo operation in FIG. 7S. The electronic device 100 displays a color overlay 737 within the undo indicator 736, wherein the size 737a of the color overlay 737 is based on how near the second multi-finger gesture 732 is to crossing the first threshold line 729. Because, as illustrated in FIG. 7S, the second multi-finger gesture 732 is approximately halfway to the first threshold line 729, the size 737a of the color indicator 737 is approximately half the size of the undo indicator 736.

Figure 7T:
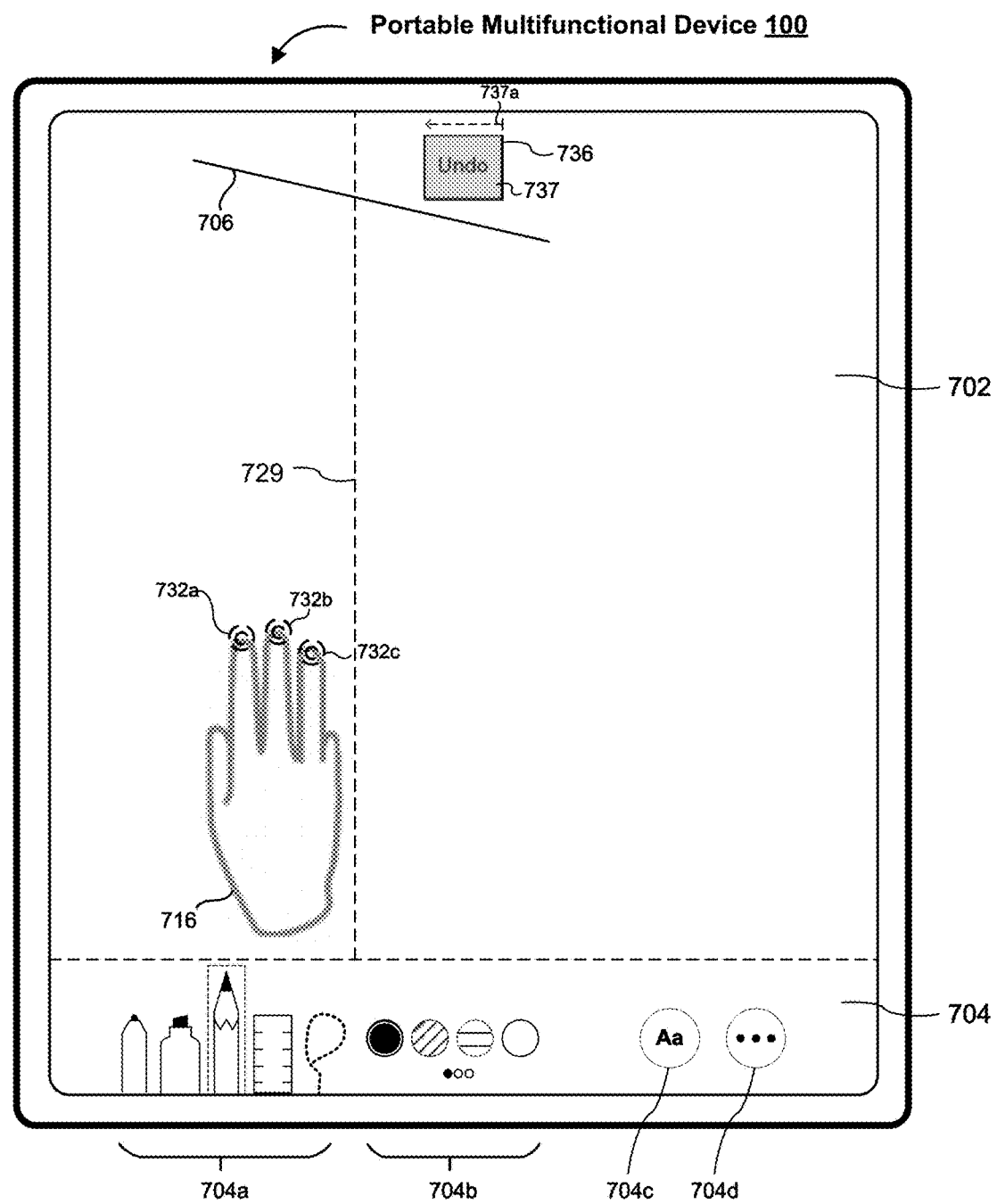

As illustrated in FIG. 7T, in response to detecting the second multi-finger gesture 732 cross the first threshold line 729, the electronic device 100 performs an undo operation on the second mark 708 (e.g., removes the second mark 708). Moreover, the size 737a of the color overlay 737 is the same as the size the undo indicator 736 because the second multi-finger gesture 732 has crossed the first threshold line 729.

Figure 7U:
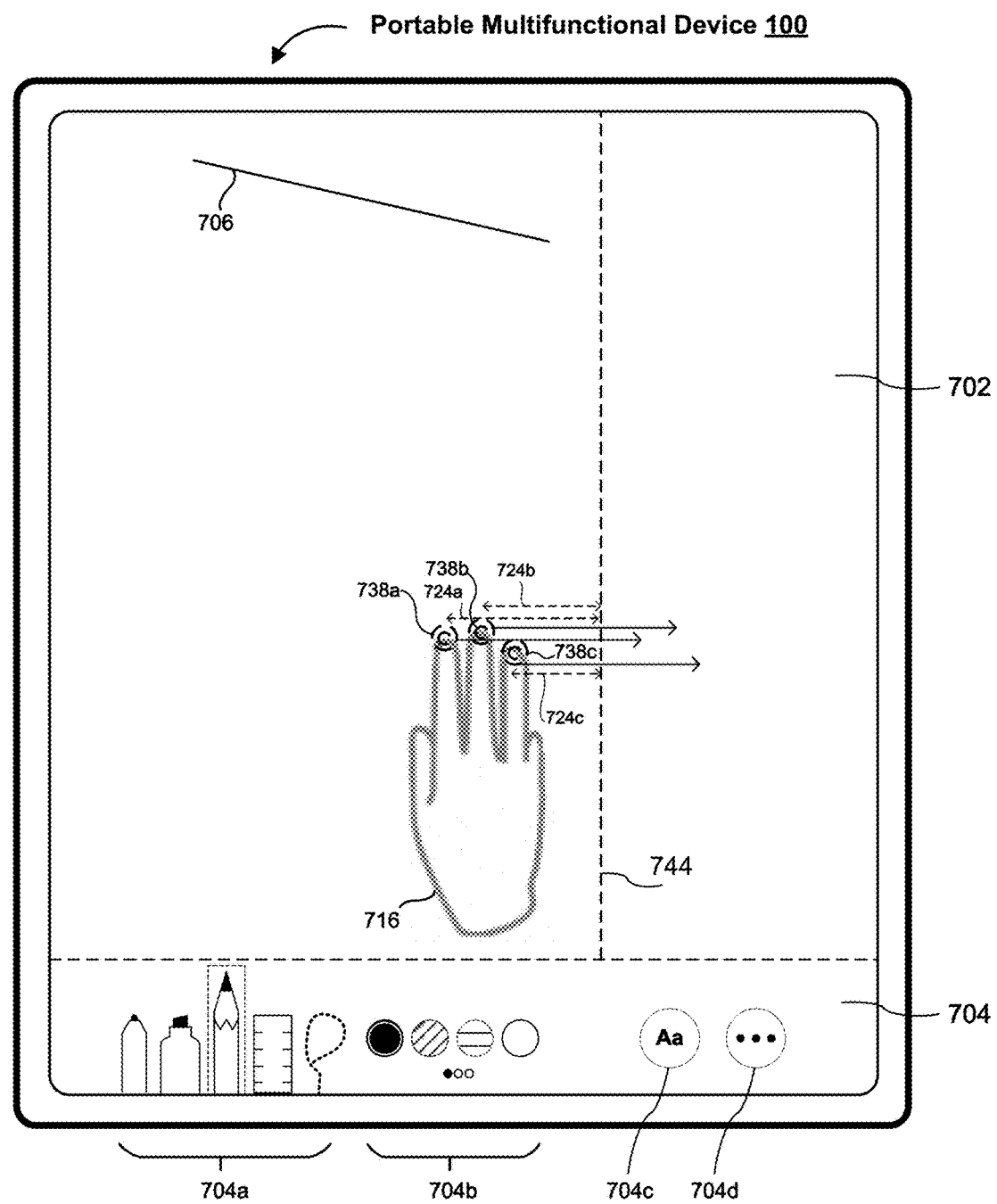
Figure 7V:
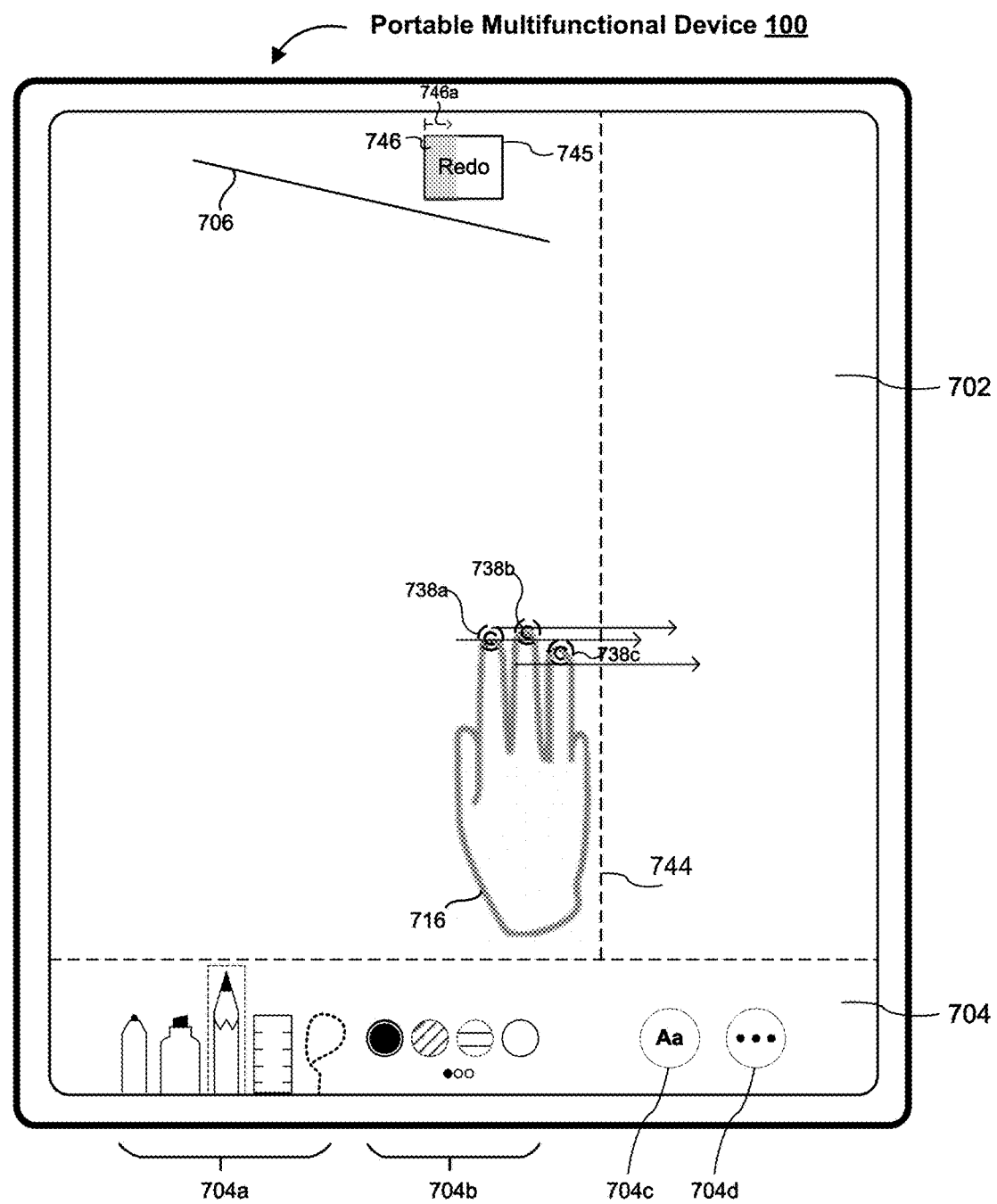
Figure 7W:
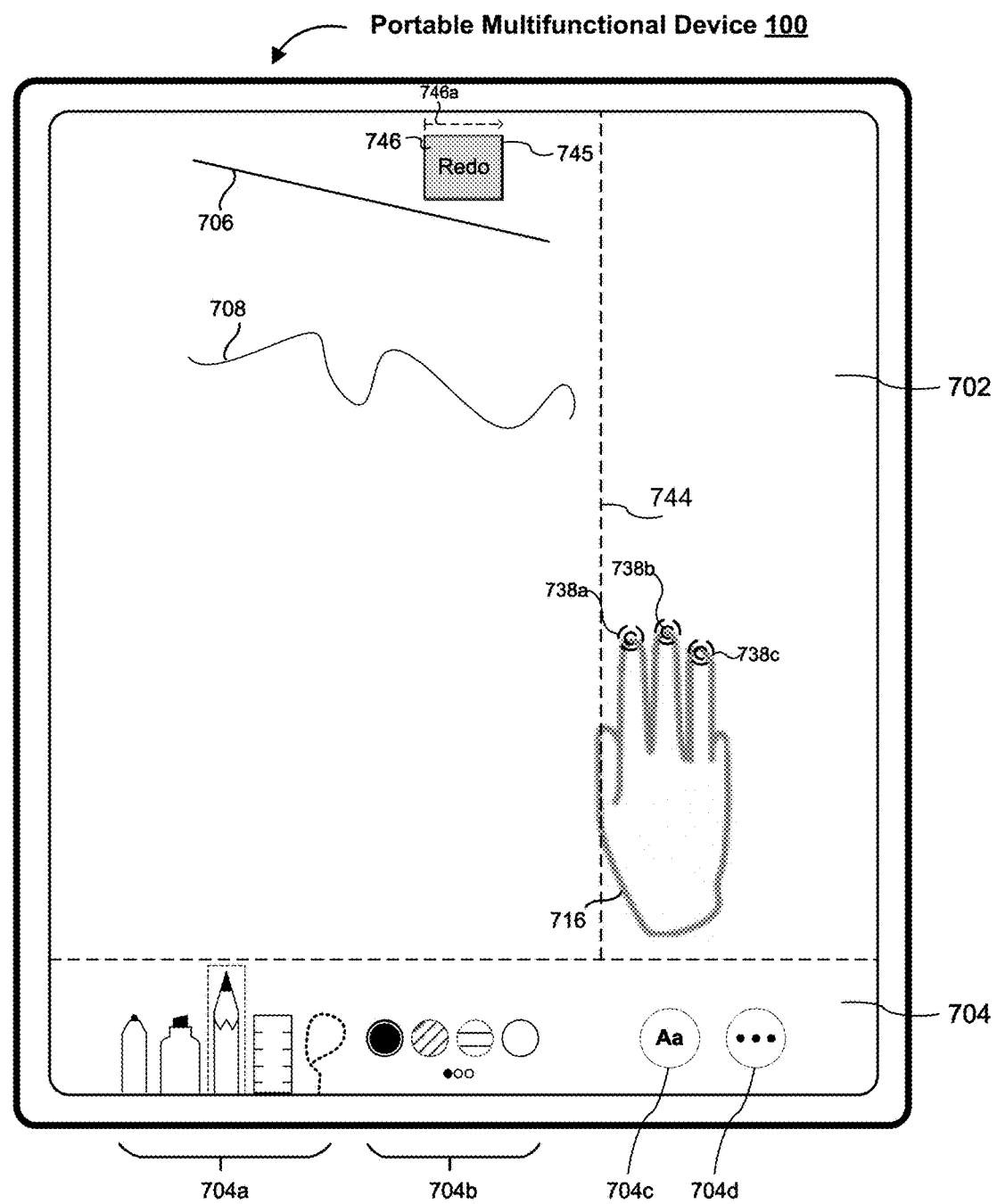

As illustrated in FIGS. 7U-7W, the electronic device 100 performs a redo operation based on a third multi-finger gesture 738 in a second direction (e.g., rightwards) that is different from (e.g., the opposite of) the first direction (e.g., leftwards) described above with reference to FIGS. 7M-7T. Although the second direction corresponds to substantially rightwards in FIG. 7U-7W, one of ordinary skill in the art will appreciate that the second direction may correspond to other directions in other embodiments.

As illustrated in FIG. 7U, the electronic device 100 detects the third multi-finger gesture 738 in the (e.g., substantially) rightwards direction. The third multi-finger gesture 738 includes a first finger swipe input 738a, a second finger swipe input 738b, and a third finger swipe input 738c. The electronic device 100 determines that the third multi-finger gesture 738 includes more than the first predetermined amount of movement in the second direction. The first predetermined amount of movement corresponds to a distance between the origin point of a particular finger swipe and a second threshold line 744, which is illustrated for purely explanatory purposes. In various embodiments, the second threshold line 744 corresponds to a threshold distance from one of the first finger swipe input 738a, the second finger swipe input 738b, or the third finger swipe input 738c. For example, in some embodiments, the first predetermined amount of movement corresponds to the first distance 724a between the origin point of the first finger swipe input 738a and the second threshold line 744, the second distance 724b between the origin point of the second finger swipe input 738b and the second threshold line 744, the third distance 724c between the origin point of the third finger swipe input 738c and the second threshold line 744, or a combination thereof.

In response to detecting the third multi-finger gesture 738 in FIG. 7U, the electronic device 100 displays a redo indicator 745 that is indicative of the redo operation, as is illustrated in FIG. 7V. The electronic device 100 displays a color overlay 746 within the redo indicator 745, wherein the size 746a of the color overlay 746 is based on how near the third multi-finger gesture 738 is to crossing the second threshold line 744. Because, as illustrated in FIG. 7V, the third multi-finger gesture 738 is approximately halfway to crossing the second threshold line 744, the size 746a of the color overlay 746 is approximately half the size of the redo indicator 745.

As illustrated in FIG. 7W, in response to detecting the third multi-finger gesture 738 cross the second threshold line 744, the electronic device 100 performs a redo operation on the second mark 708 (e.g., redisplays the second mark 708). Moreover, the size 746a of the color overlay 746 is the same as the size of the redo indicator 745 because the third multi-finger gesture 738 has crossed the second threshold line 744.

Figure 7X:
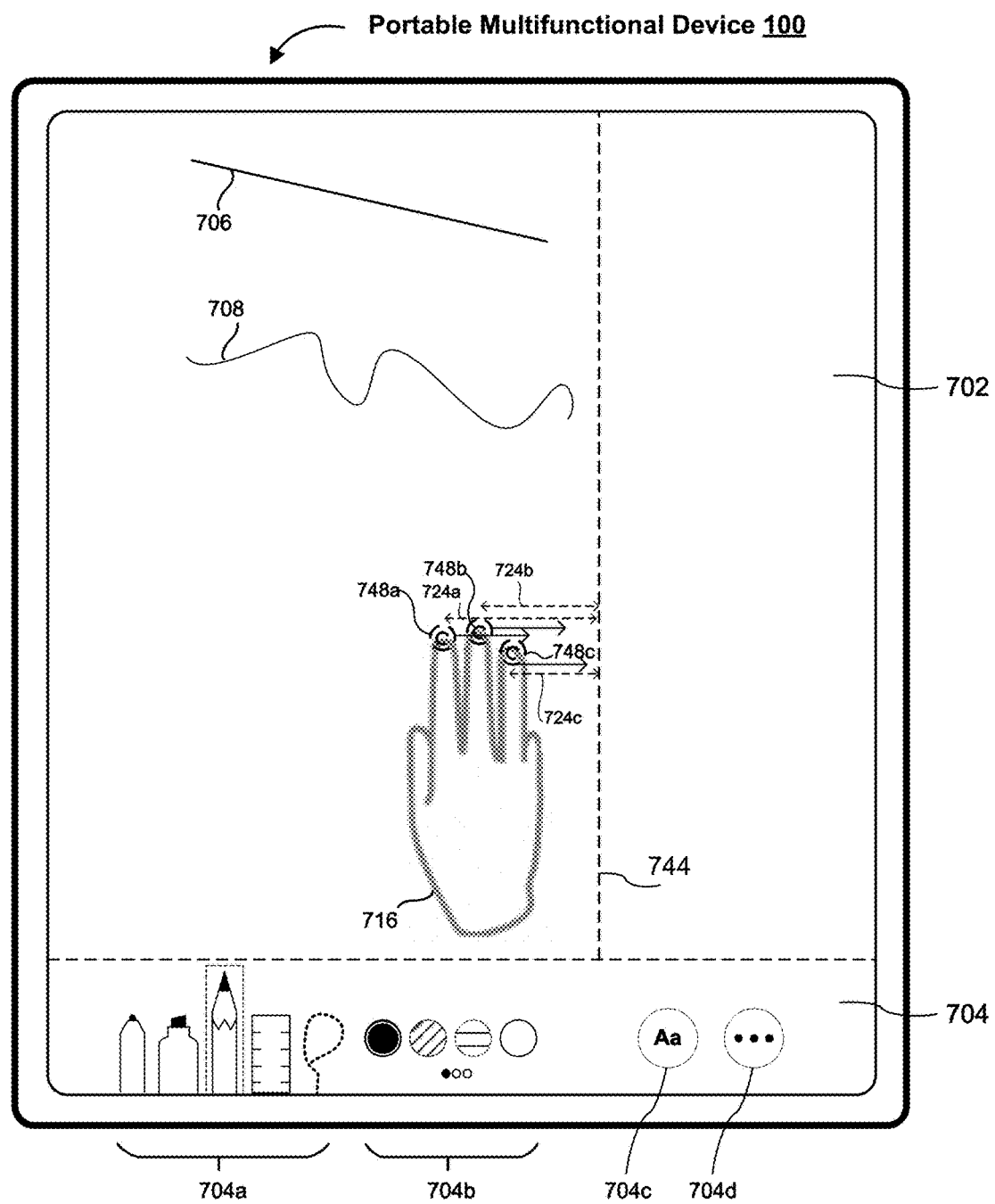
Figure 7Y:
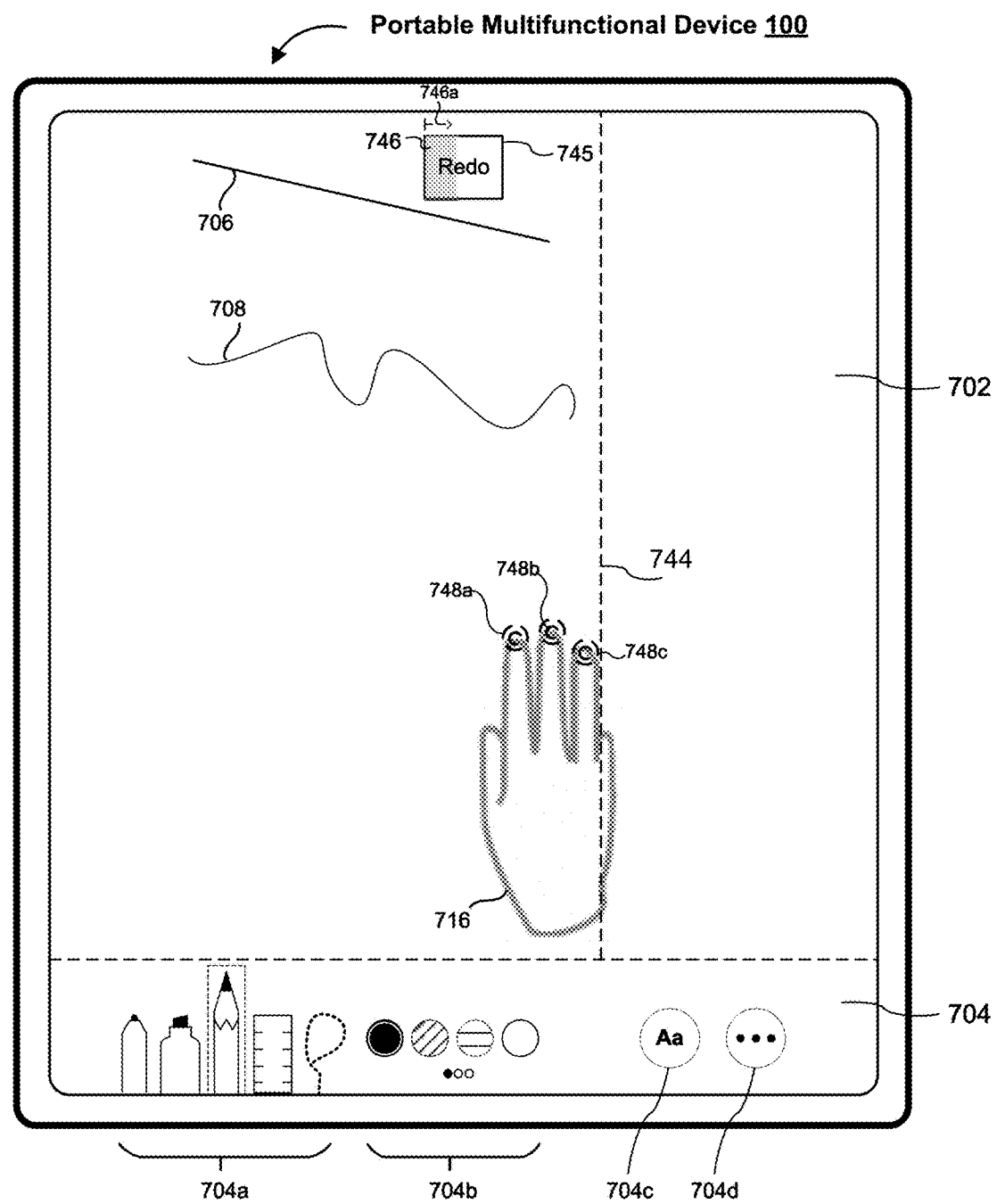
Figure 7Z:
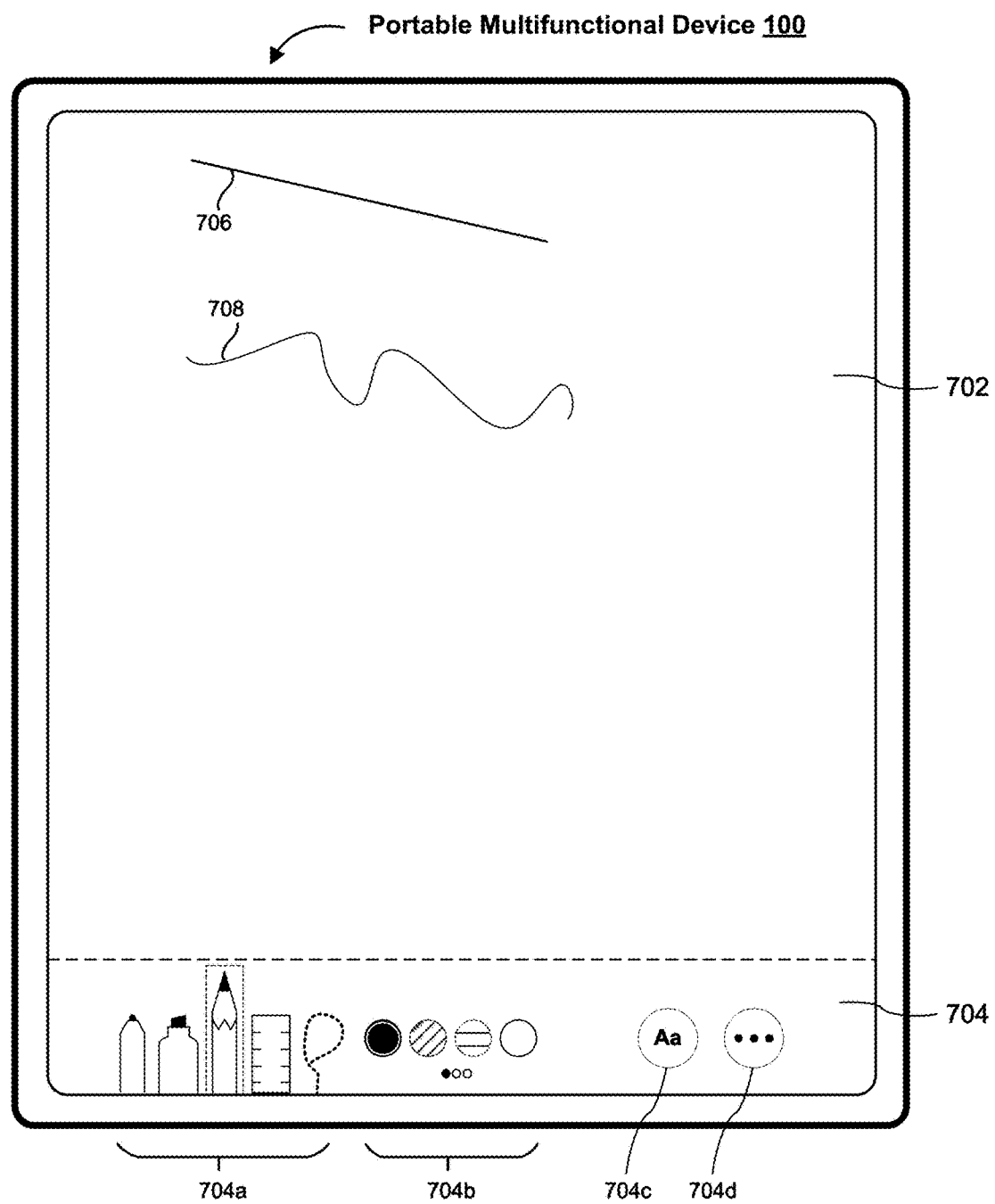
Figure 7A:
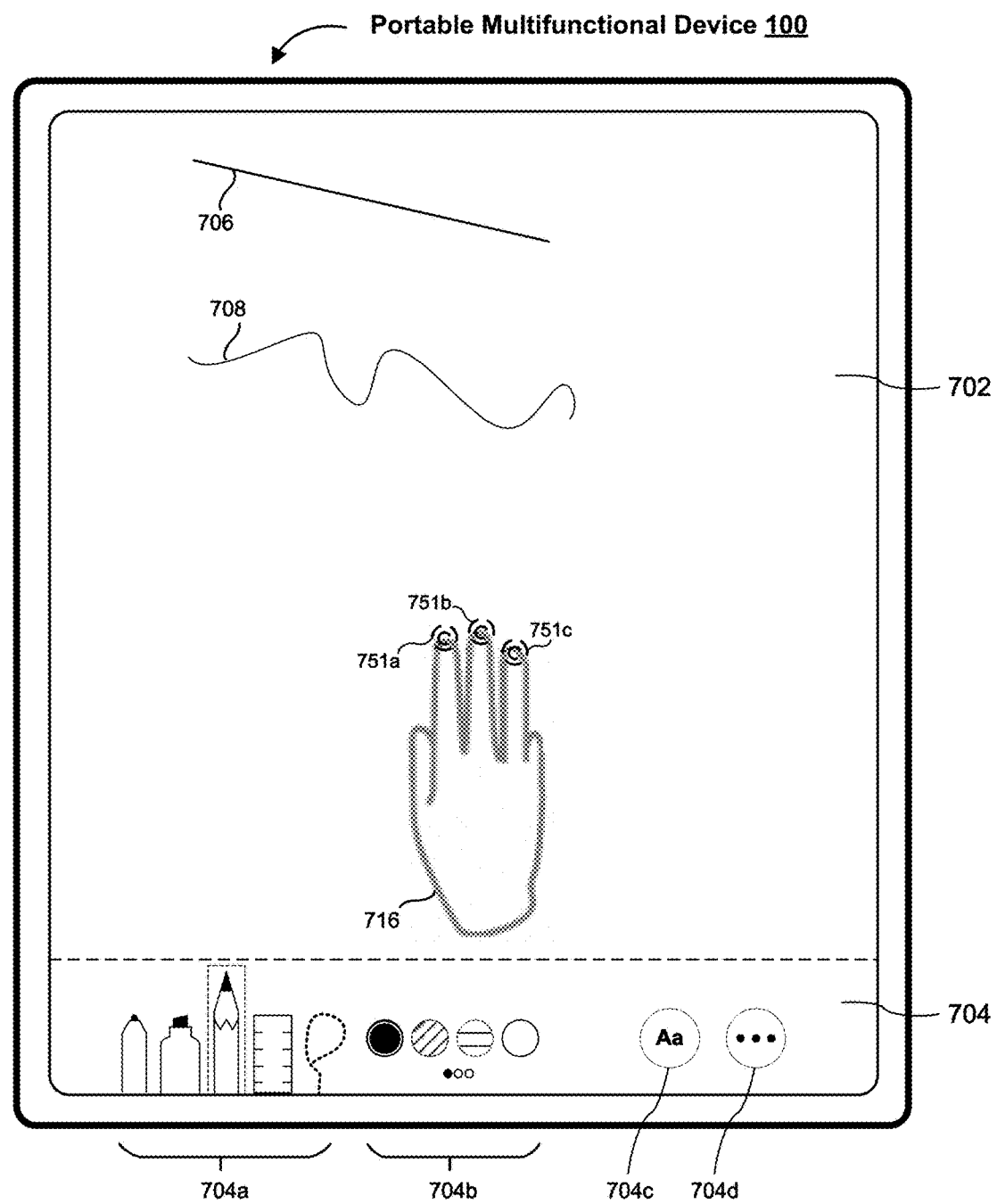
Figure 7A:
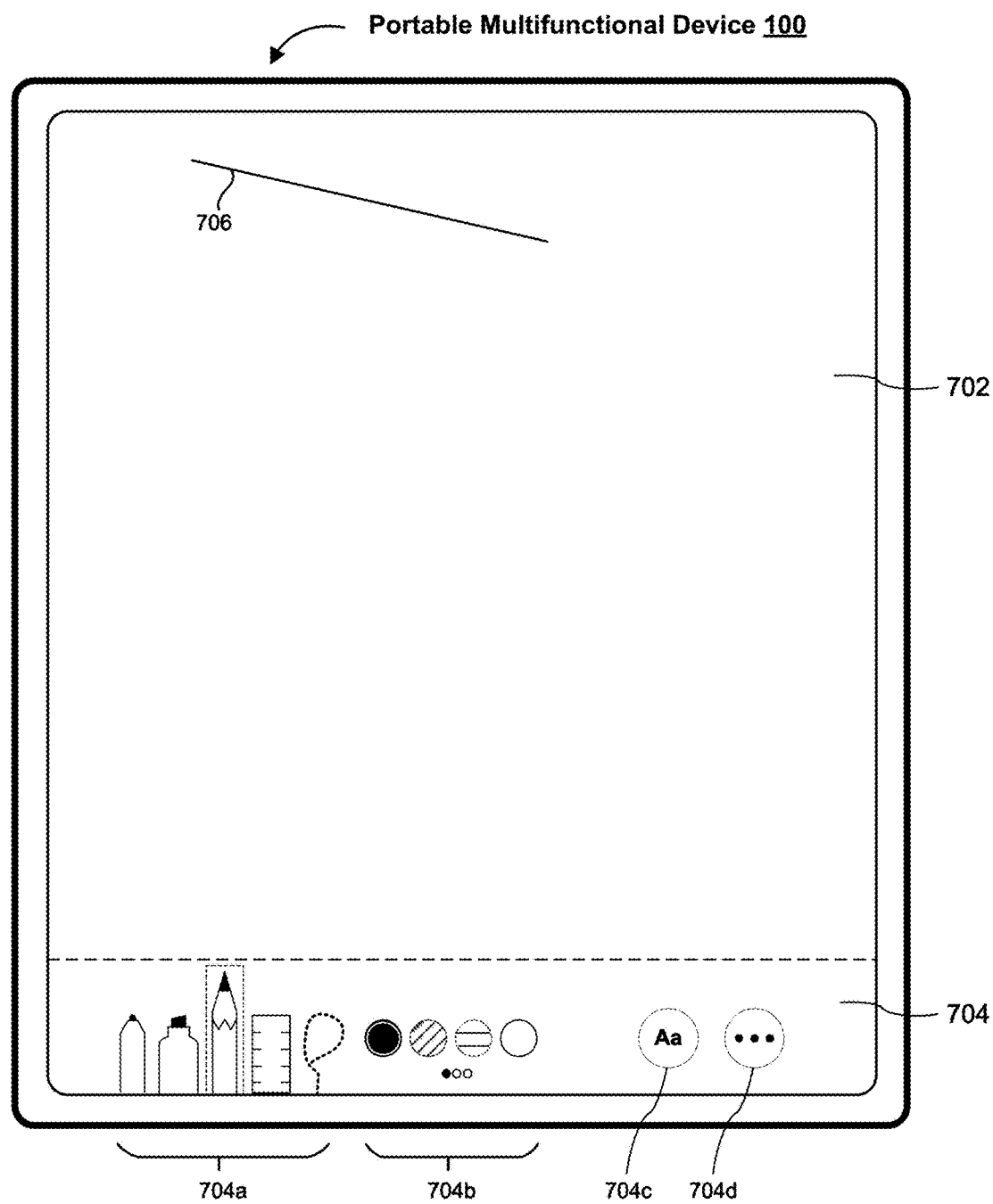
Figure 7A:
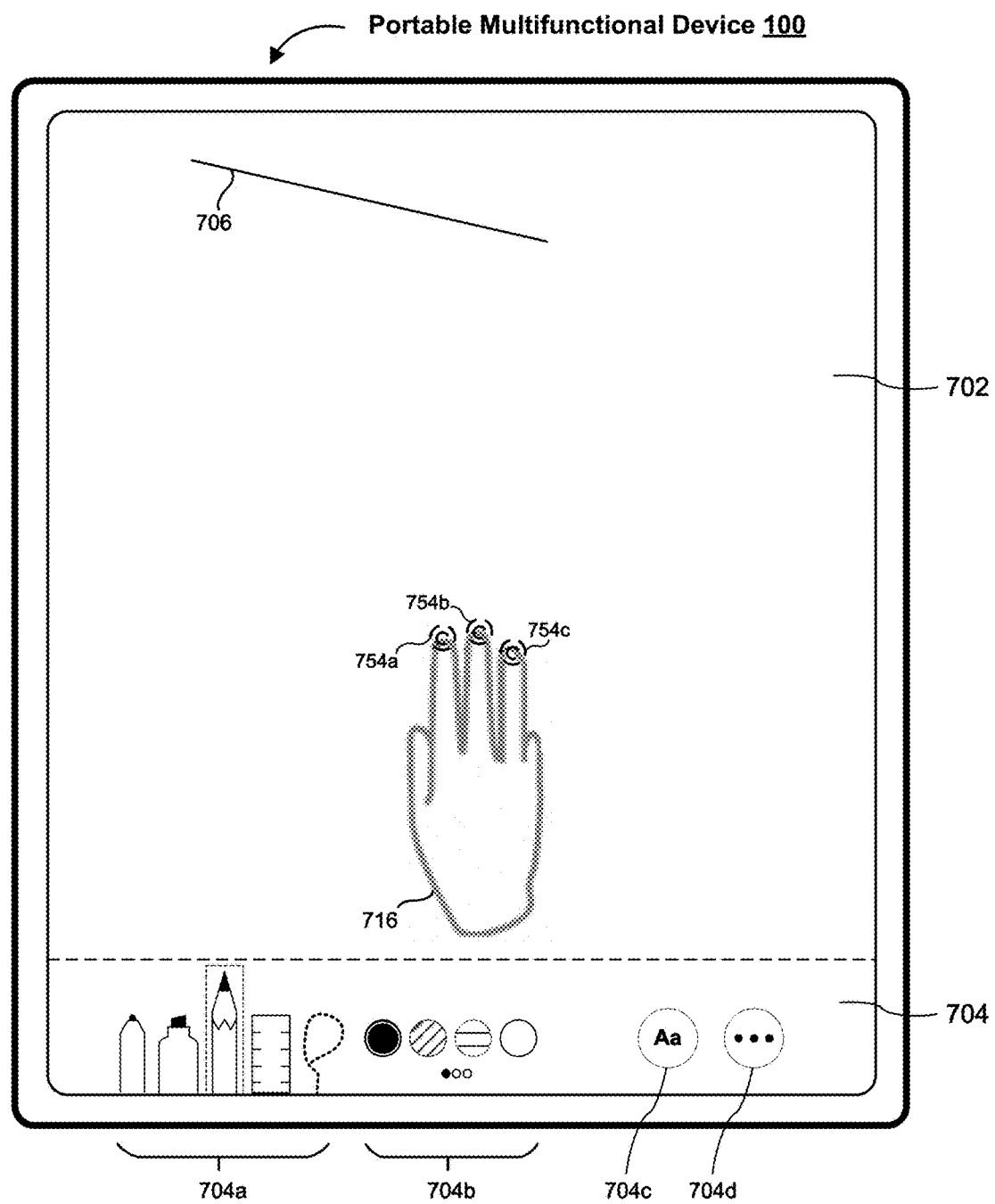
Figure 7A:
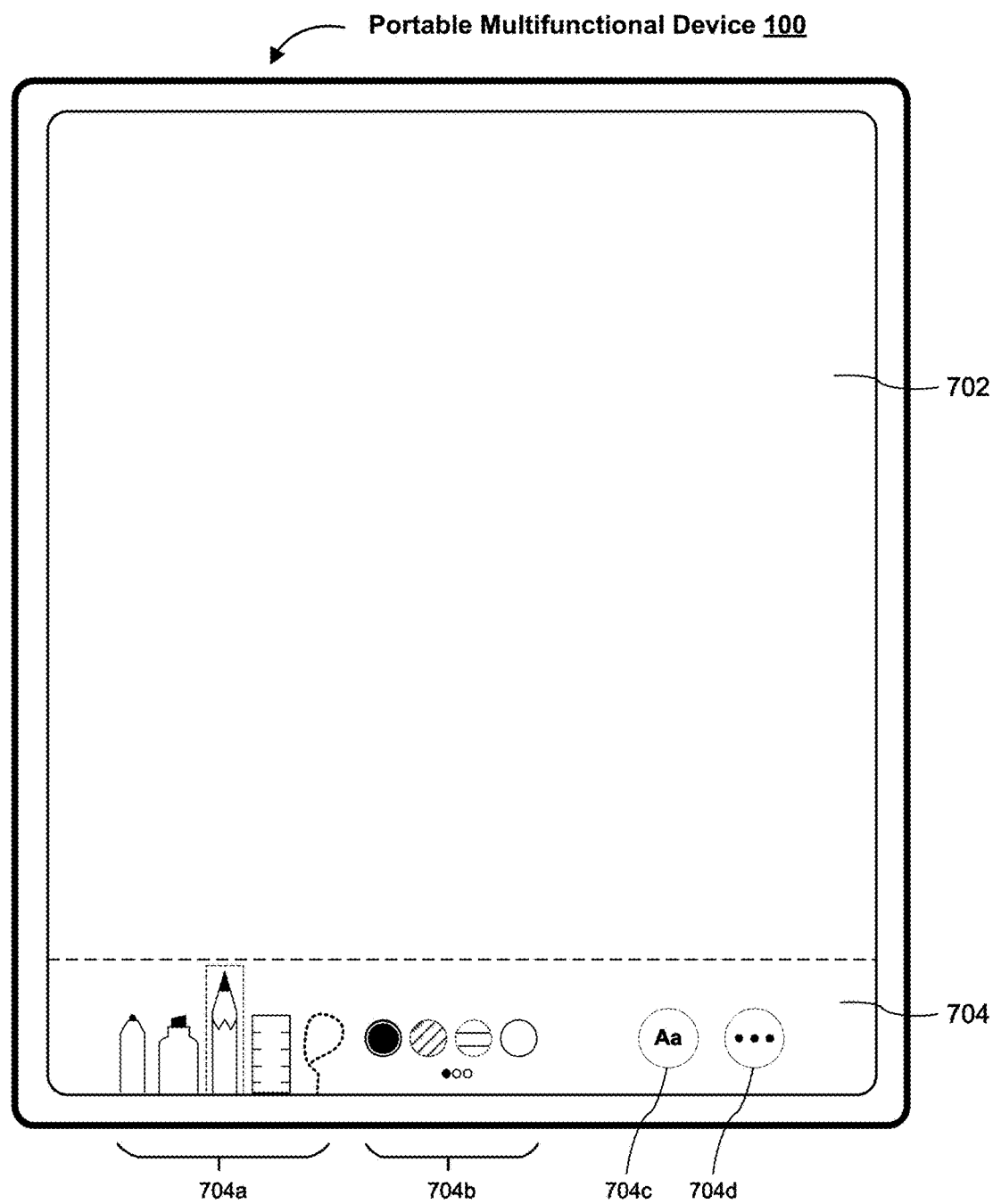
Figure 7A:
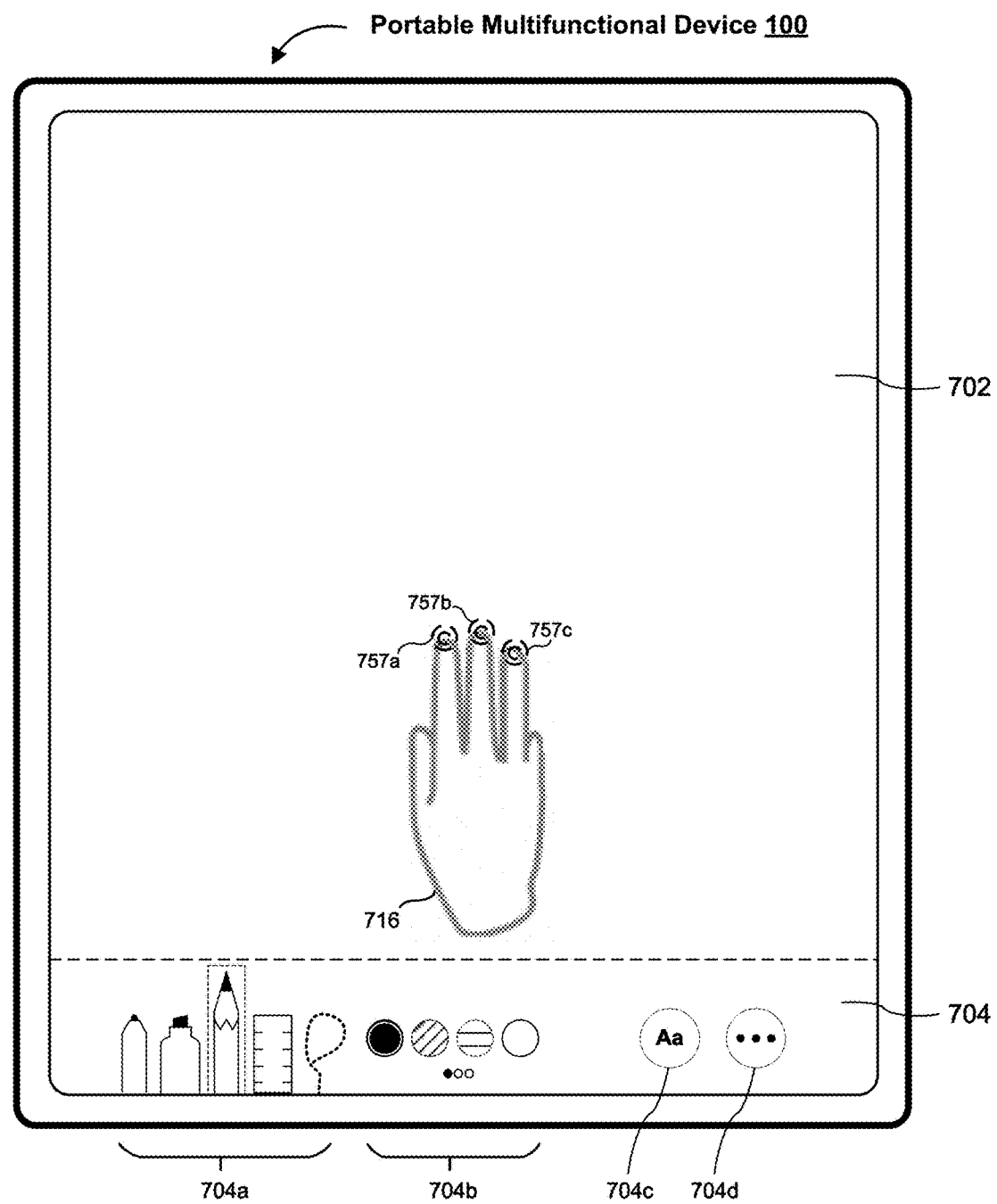
Figure 7A:
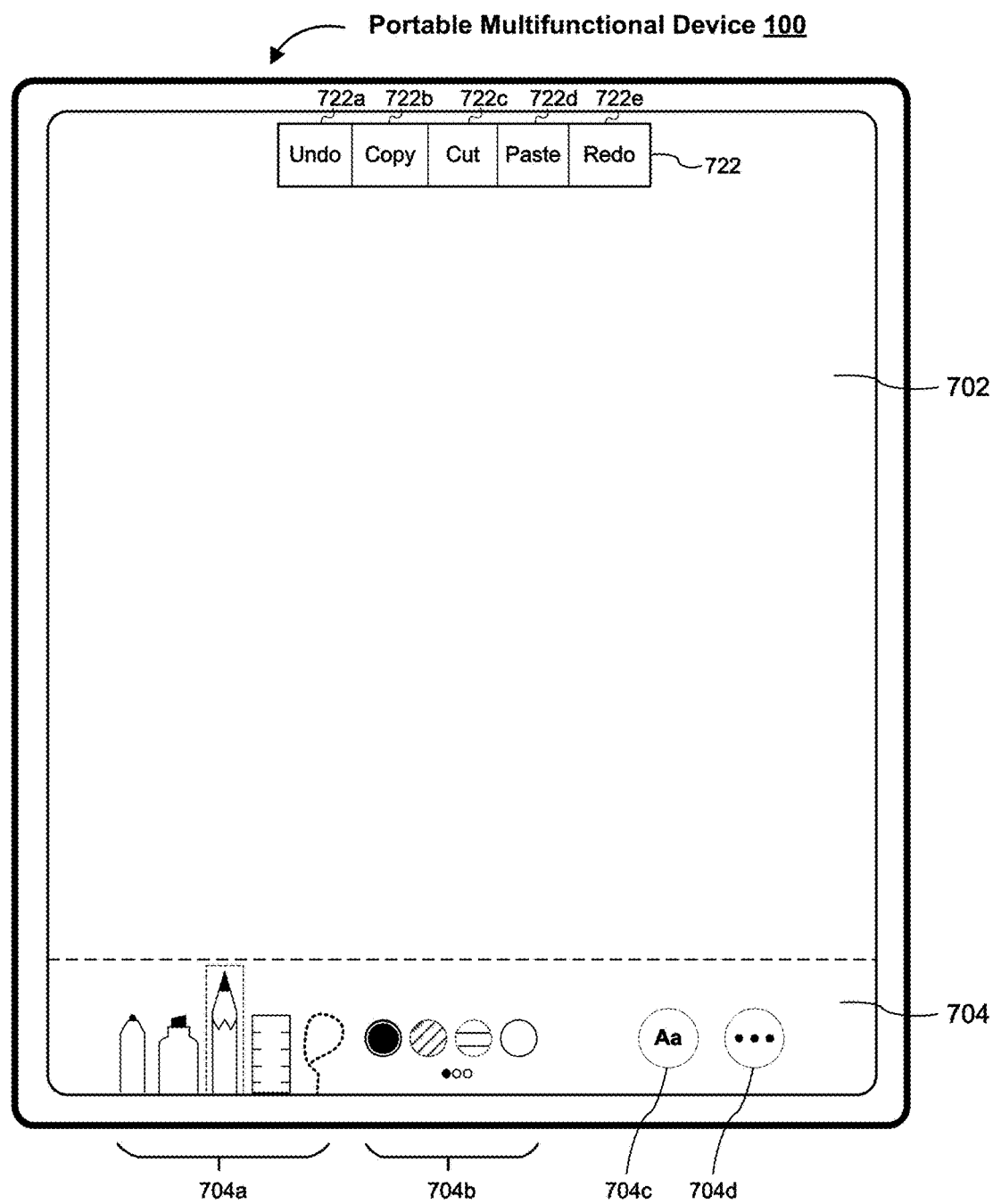
Figure 7A:
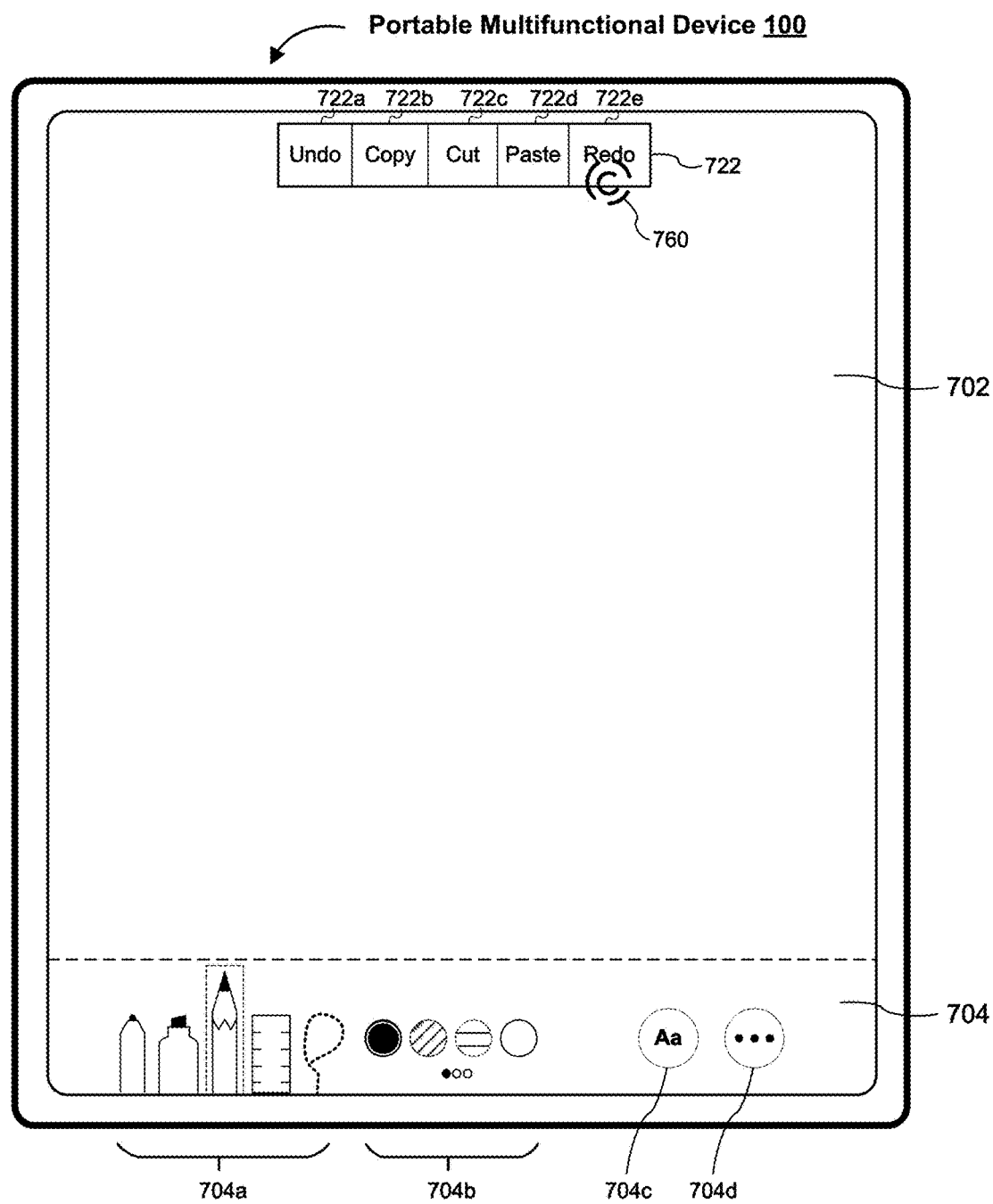
Figure 7A:
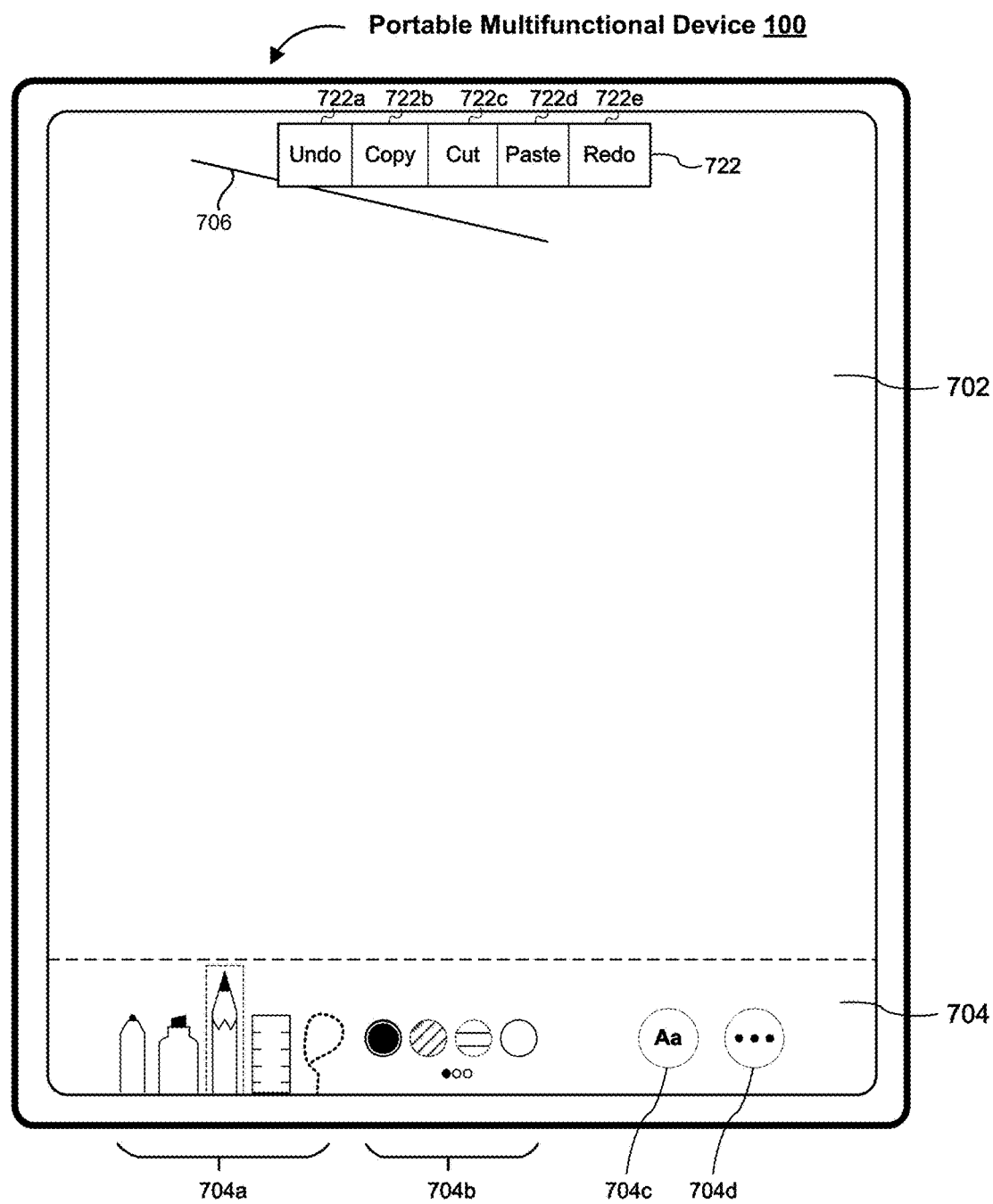
Figure 7A:
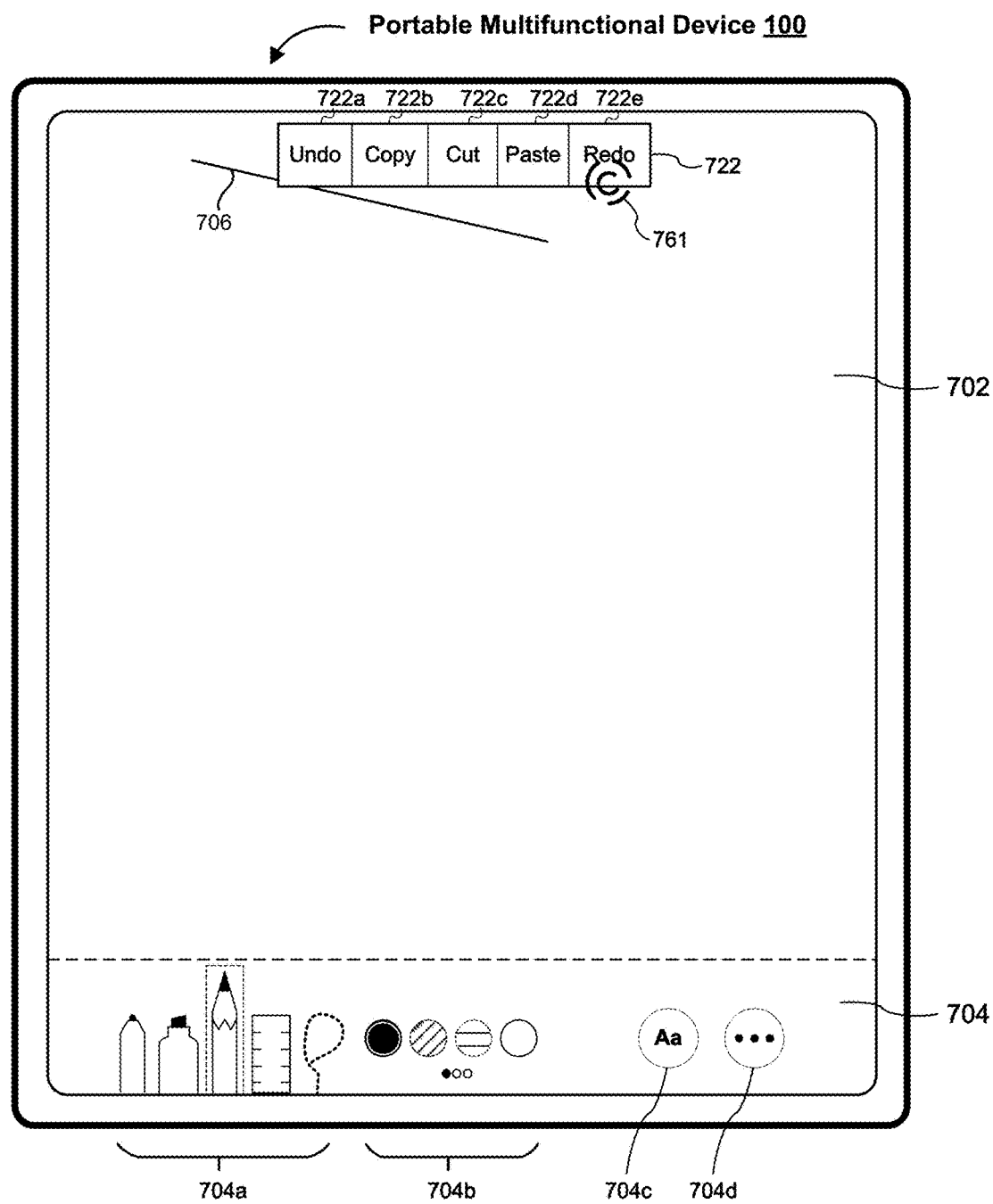
Figure 7A:
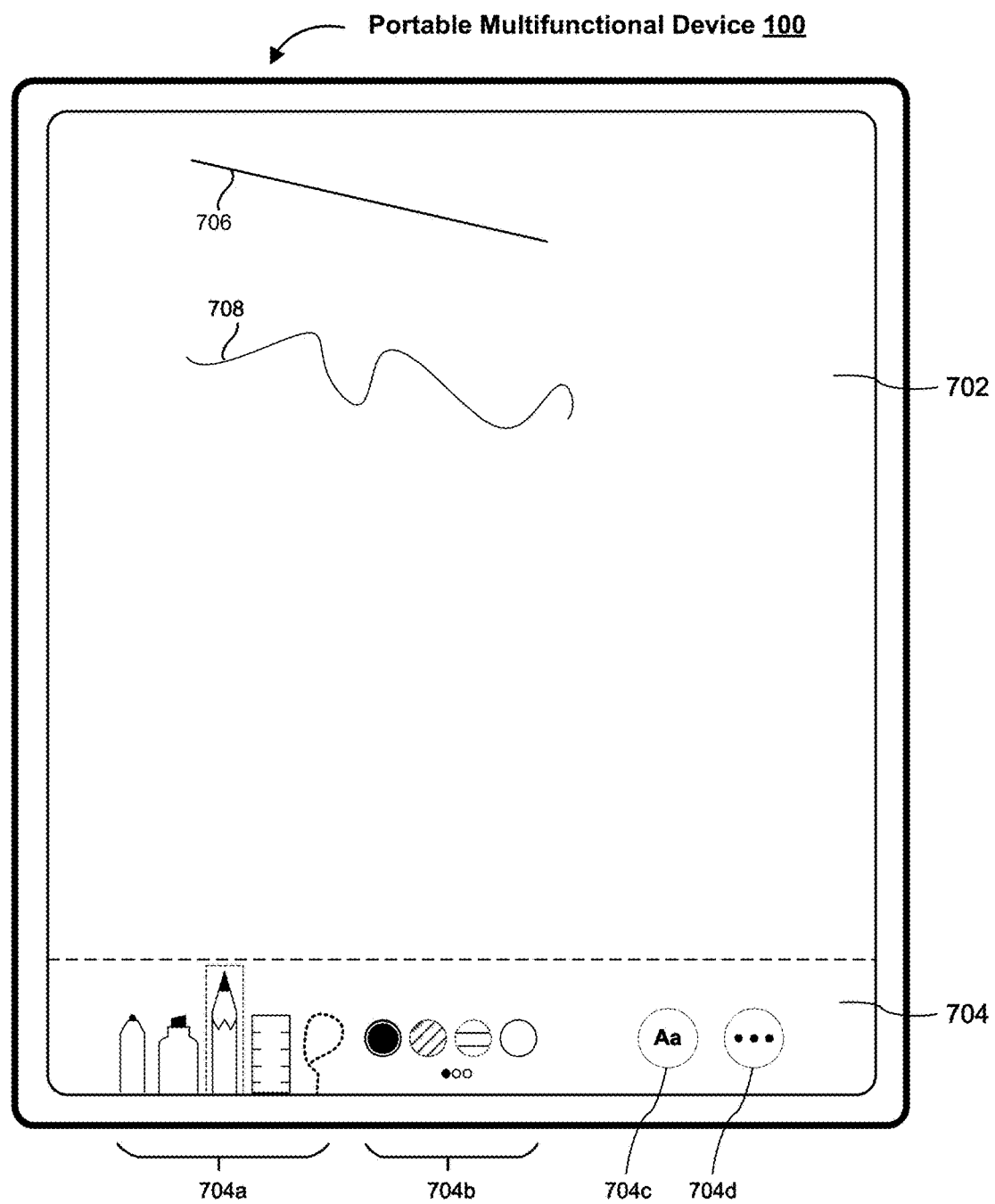
Figure 7A:
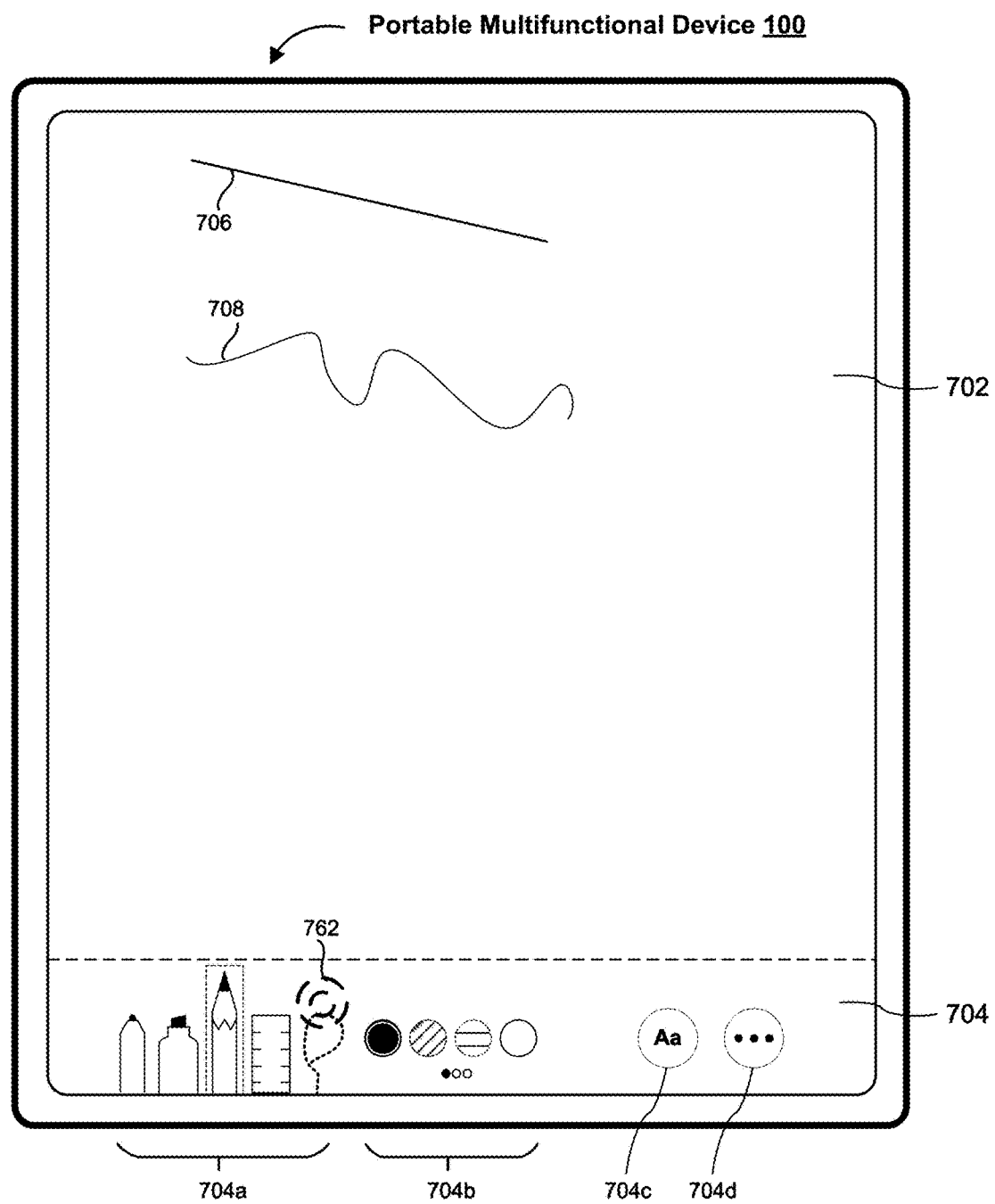
Figure 7A:
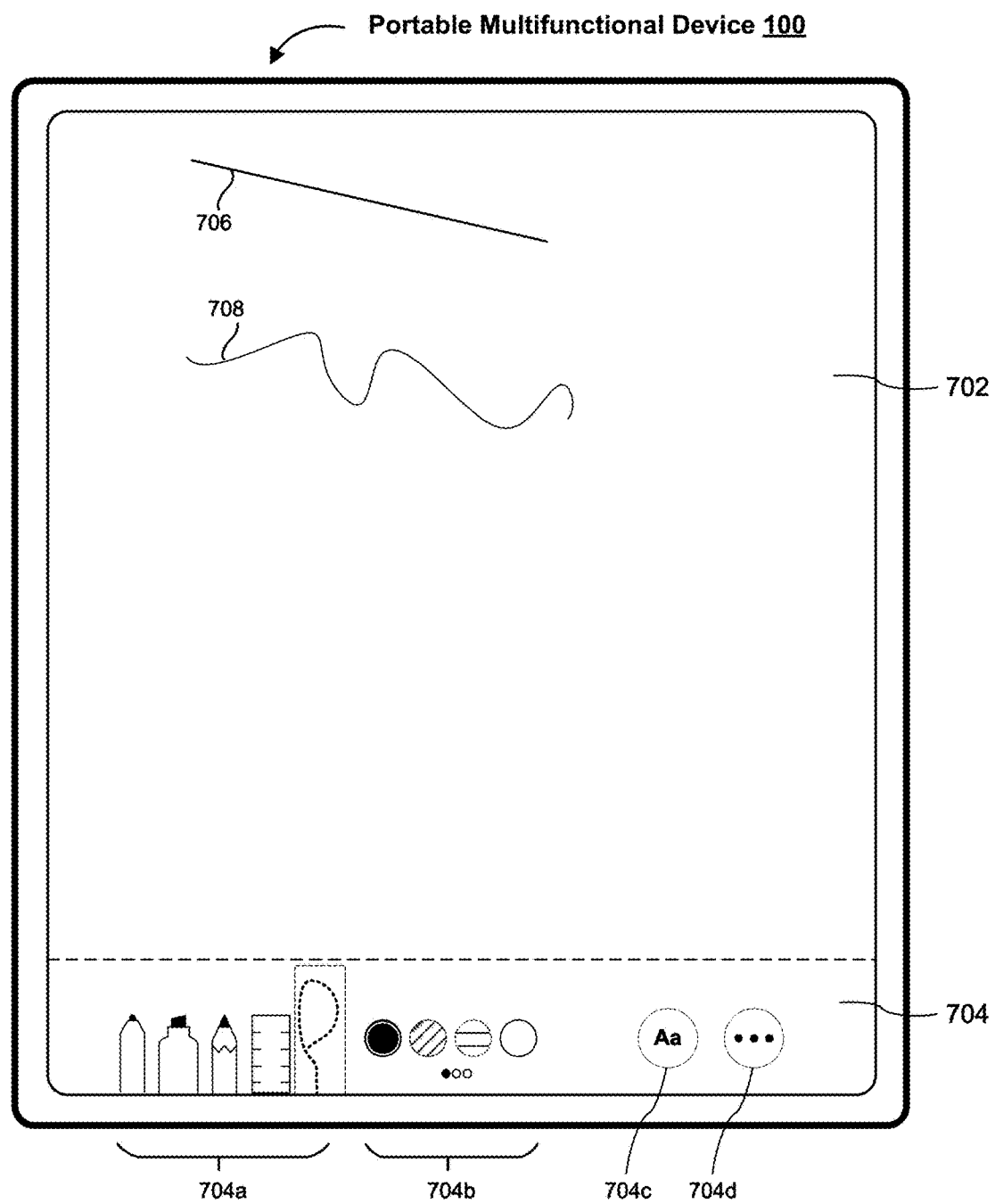
Figure 7A:
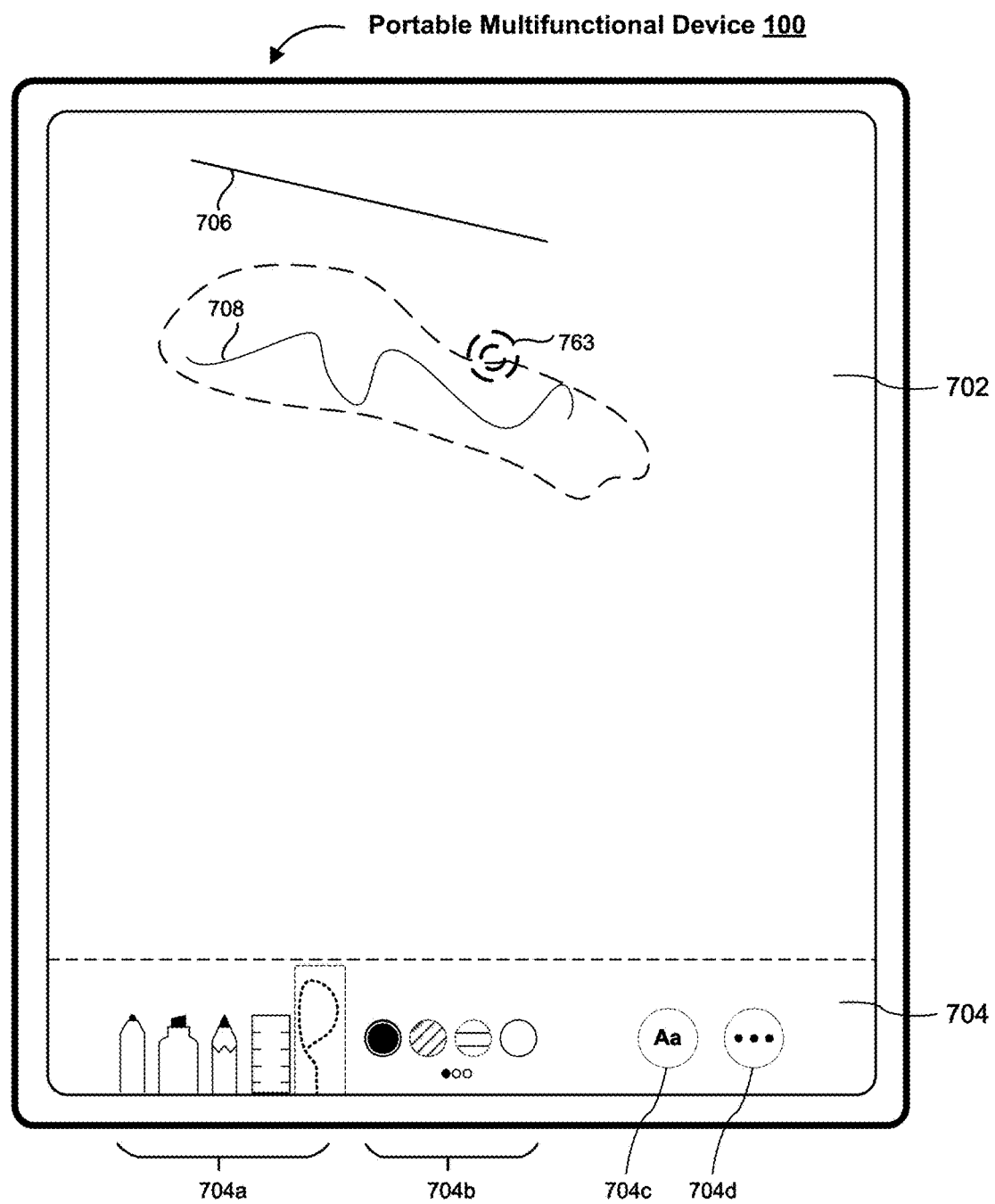
Figure 7A:
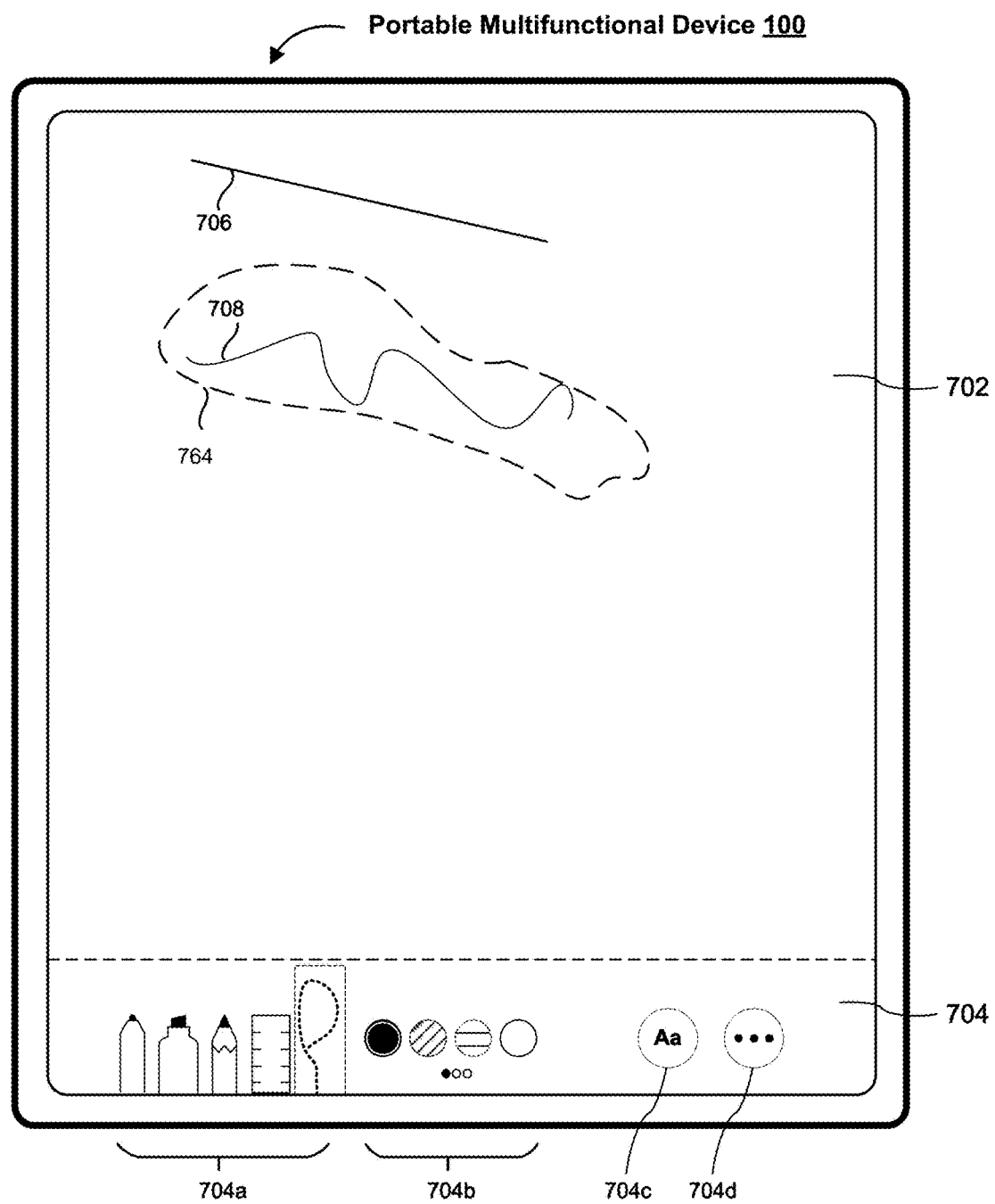
Figure 7A:
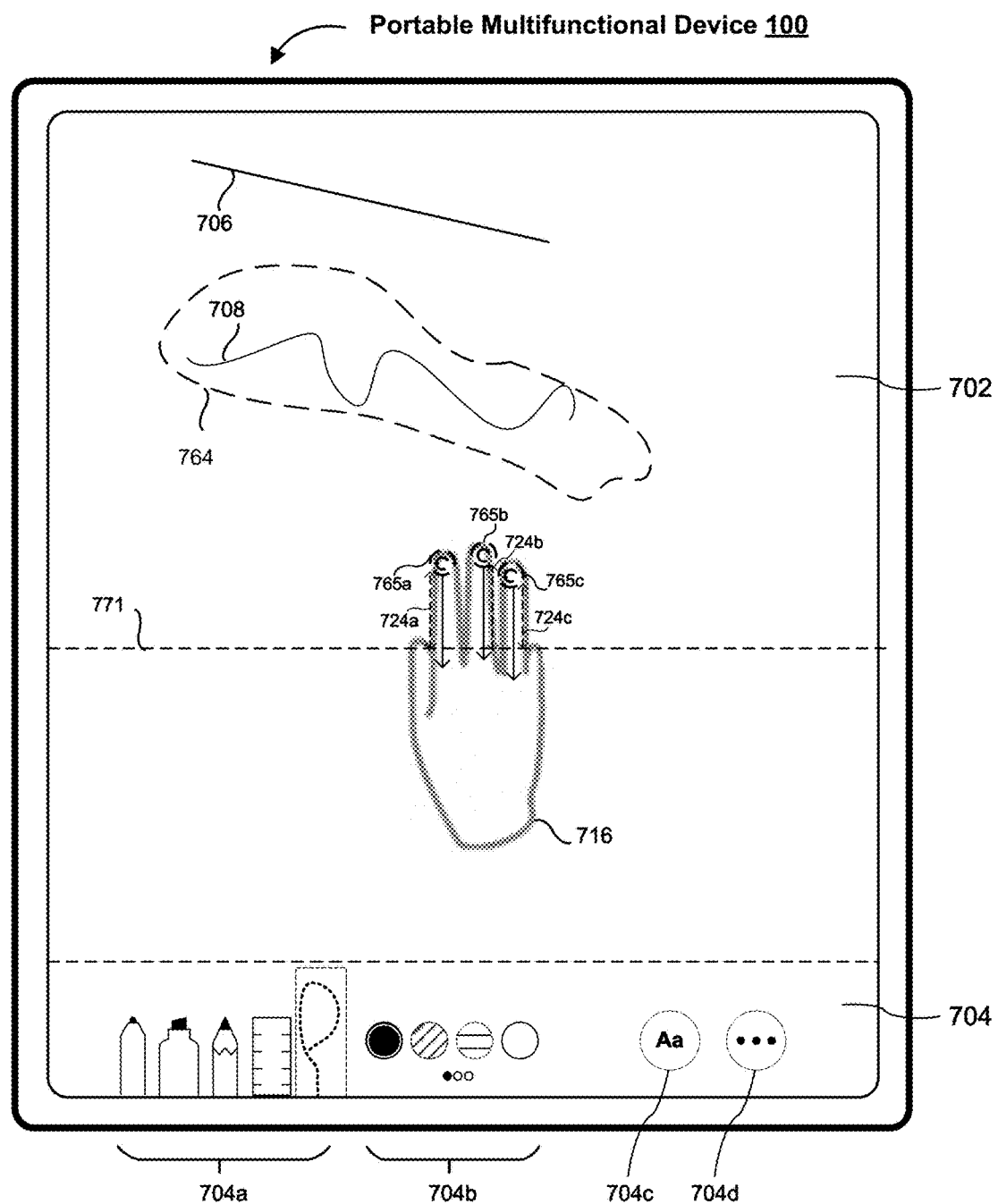
Figure 7A:
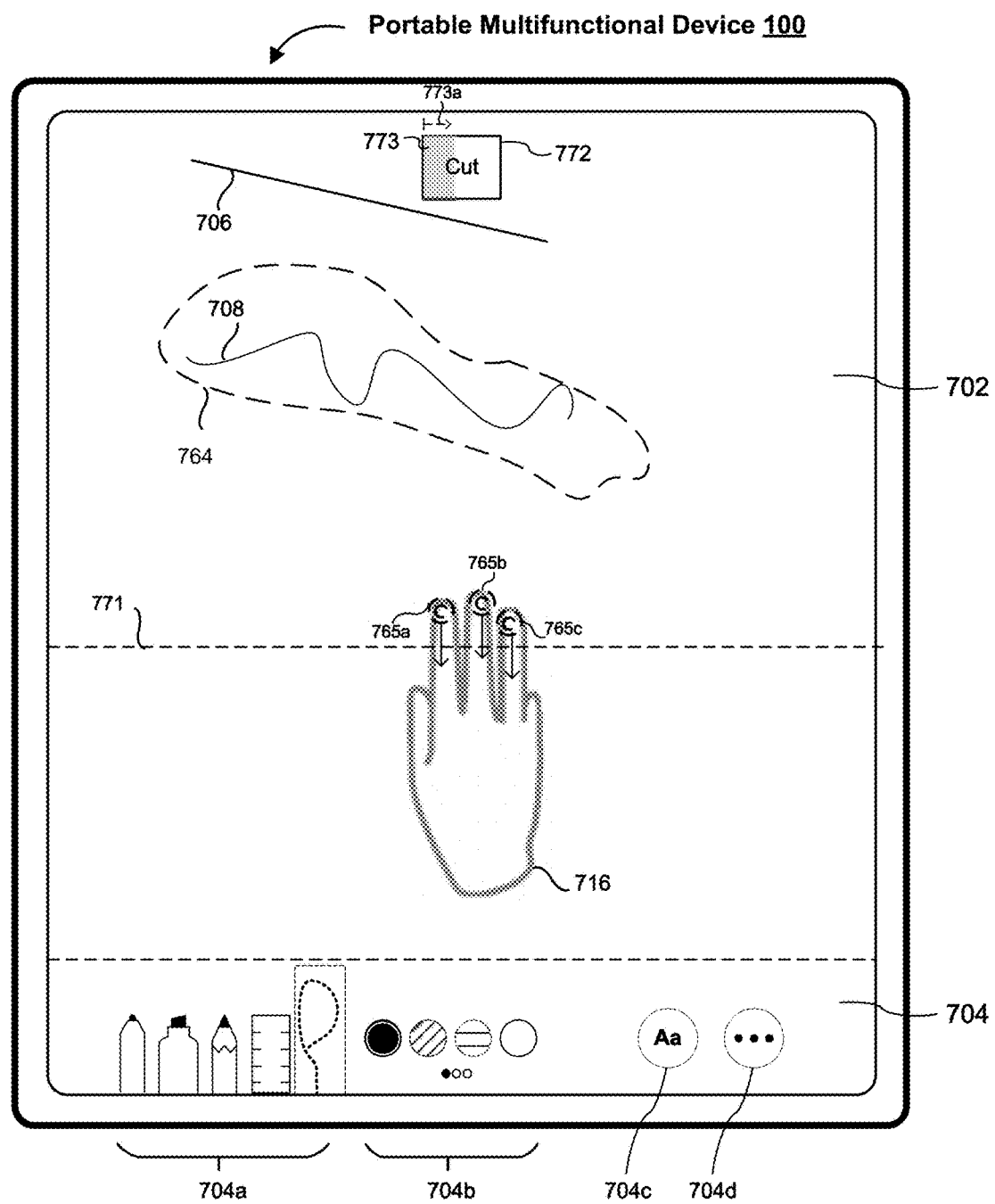
Figure 7A:
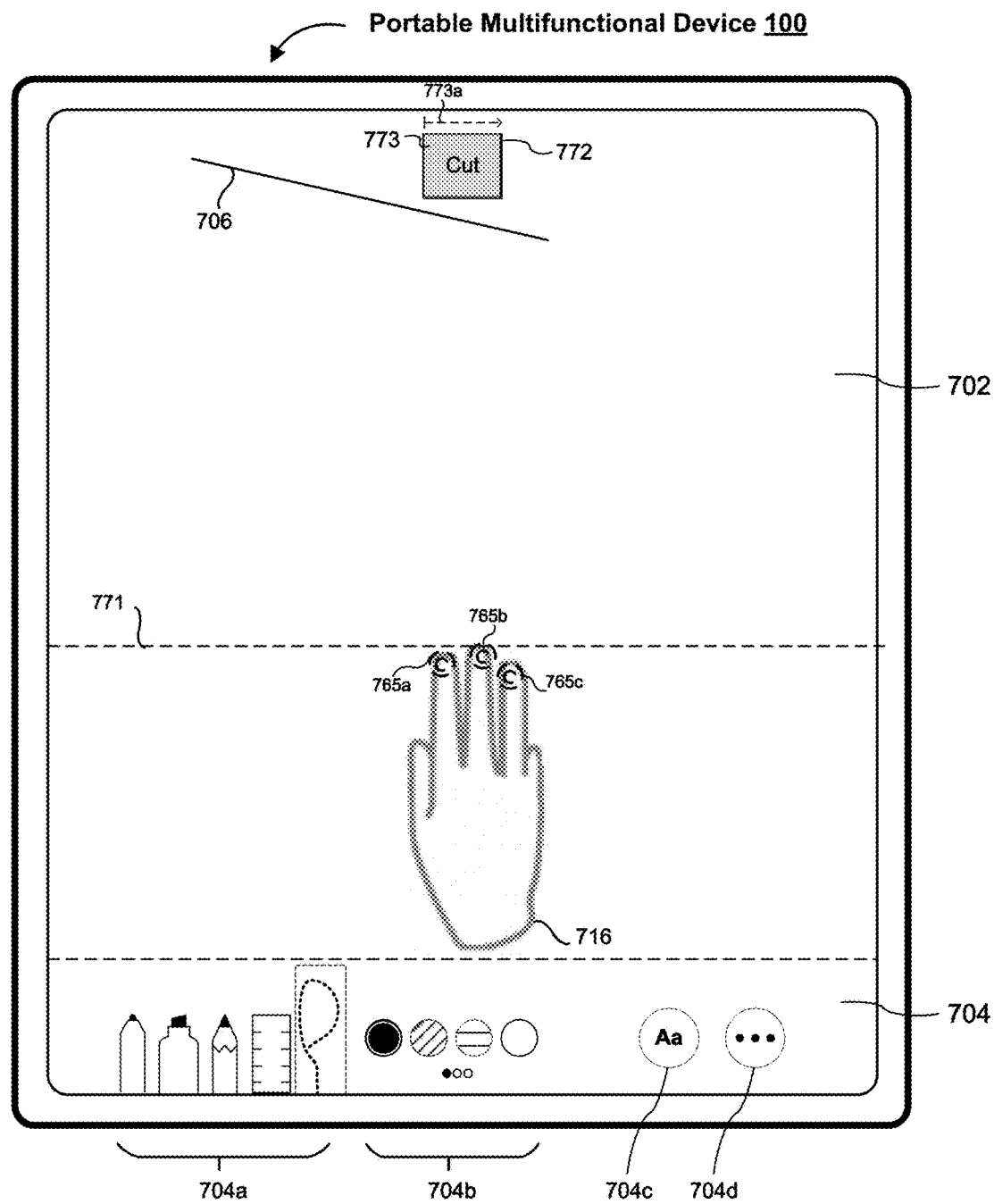
Figure 7A:
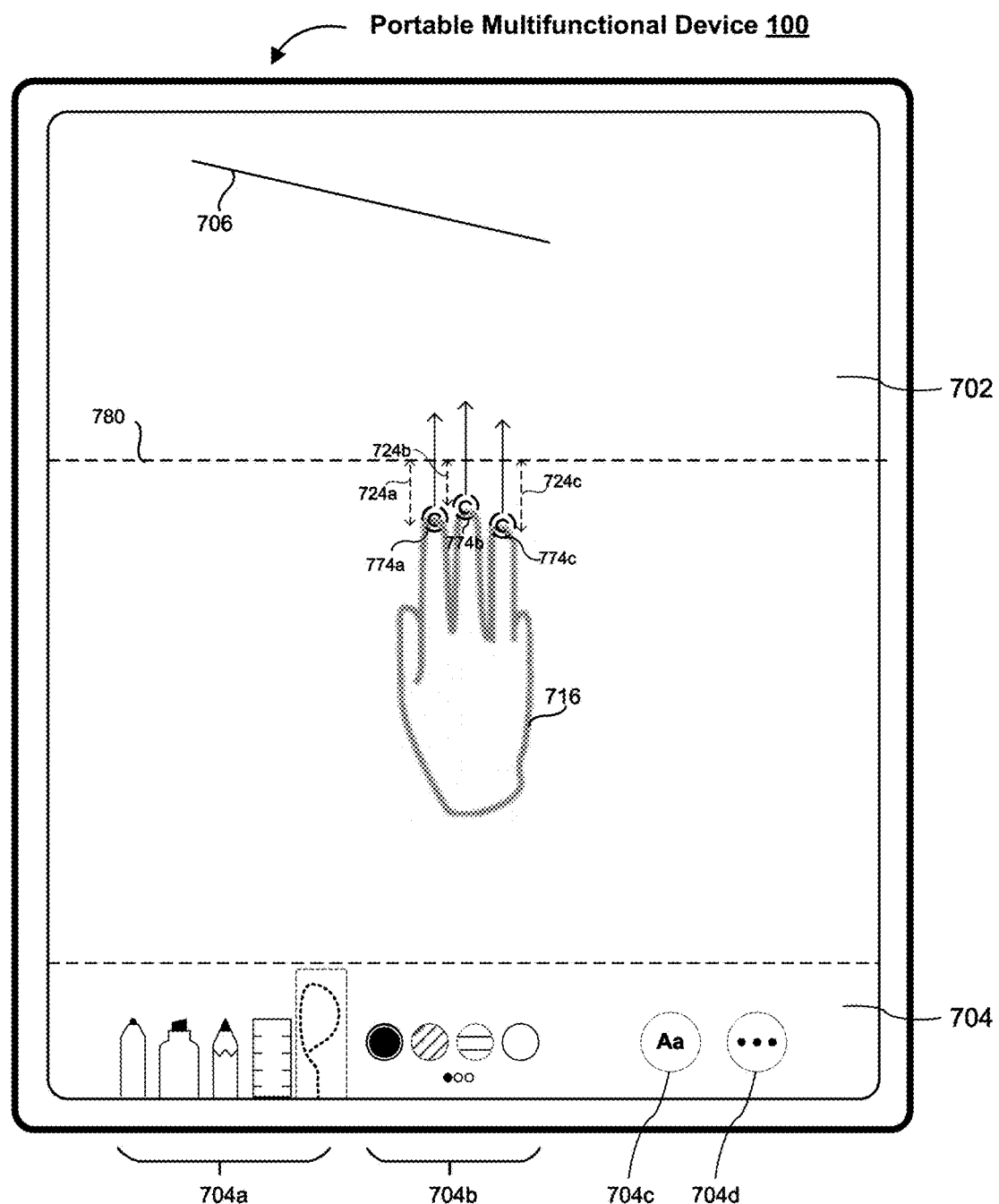
Figure 7A:
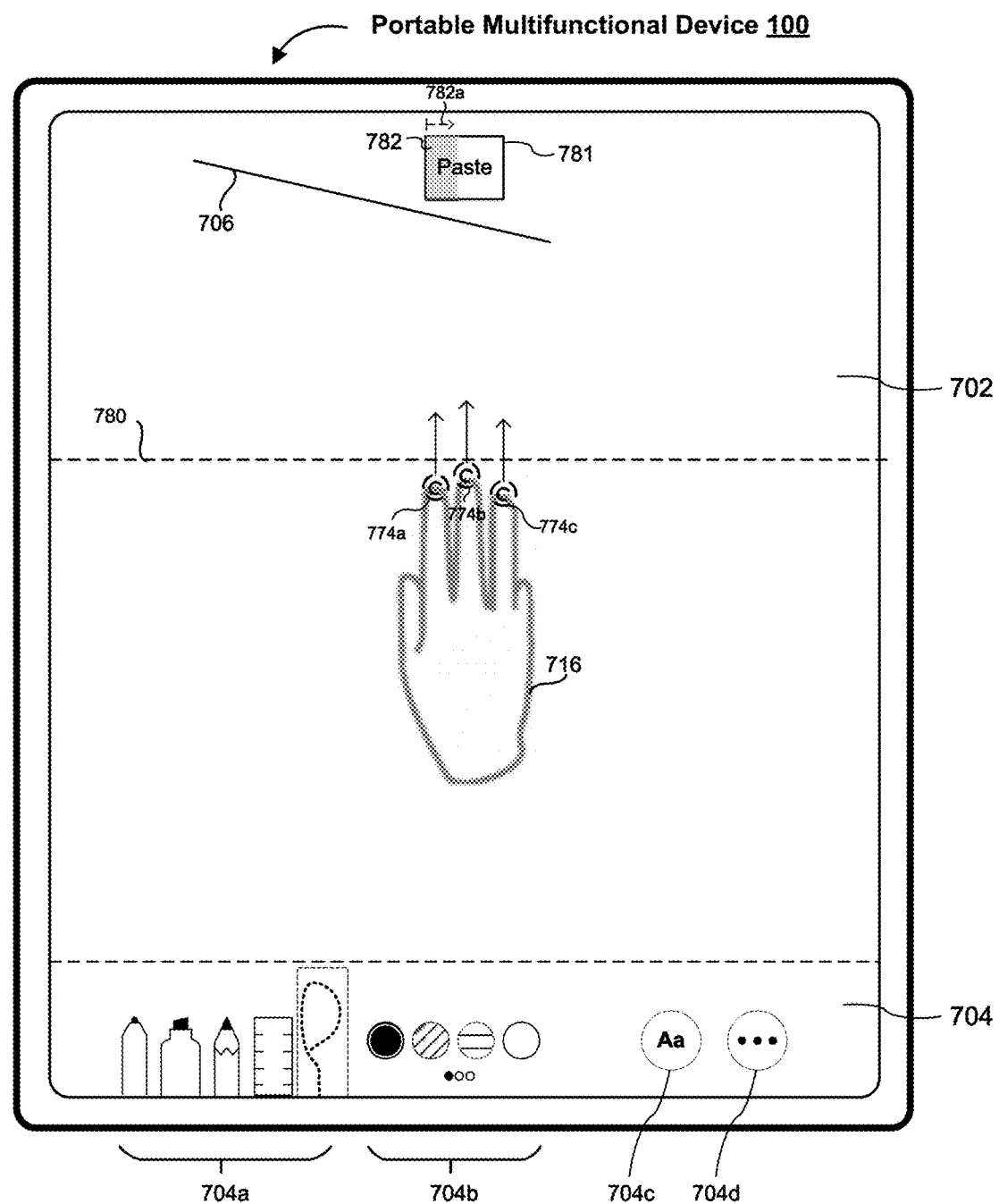
Figure 7A:
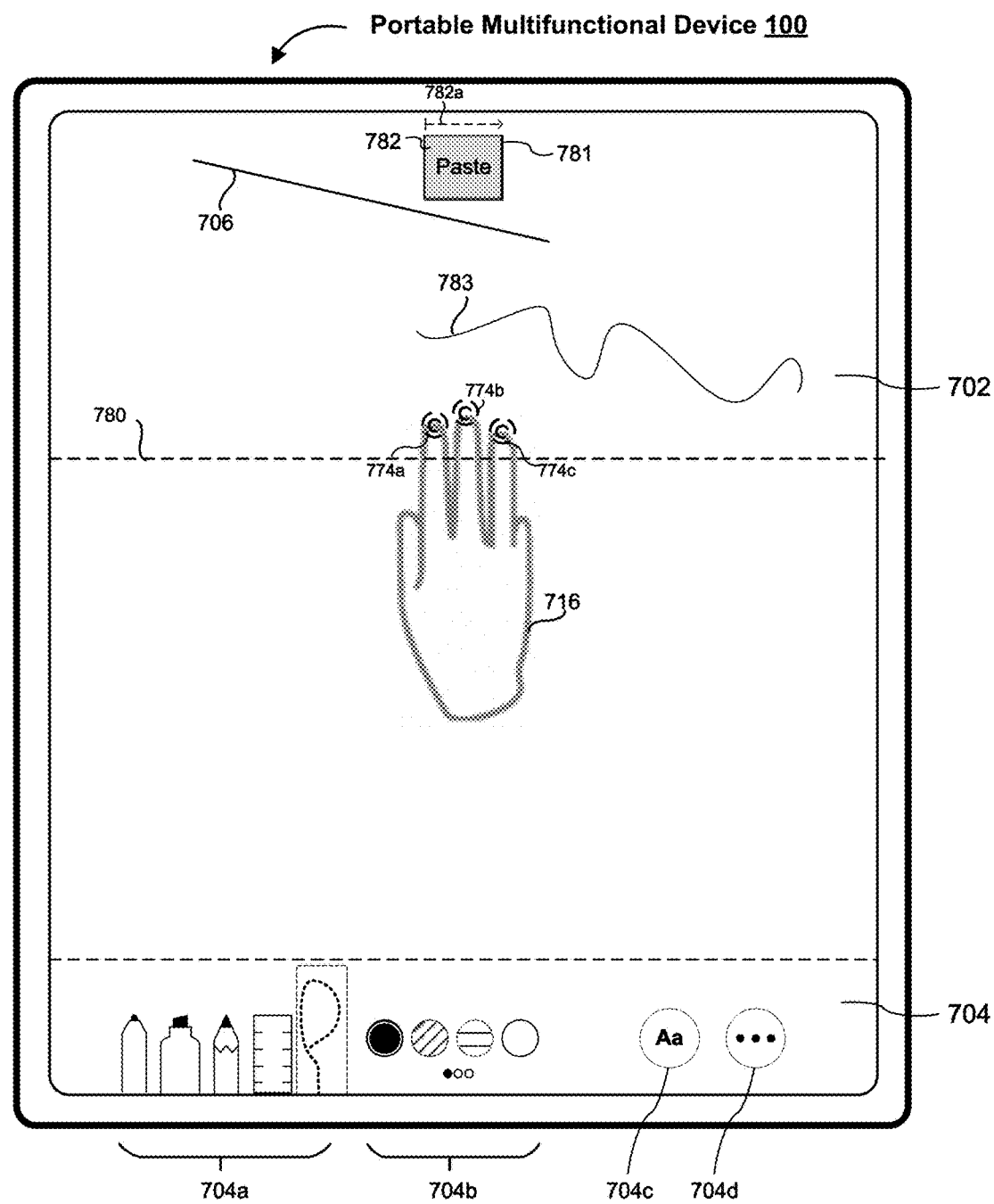
Figure 7A:
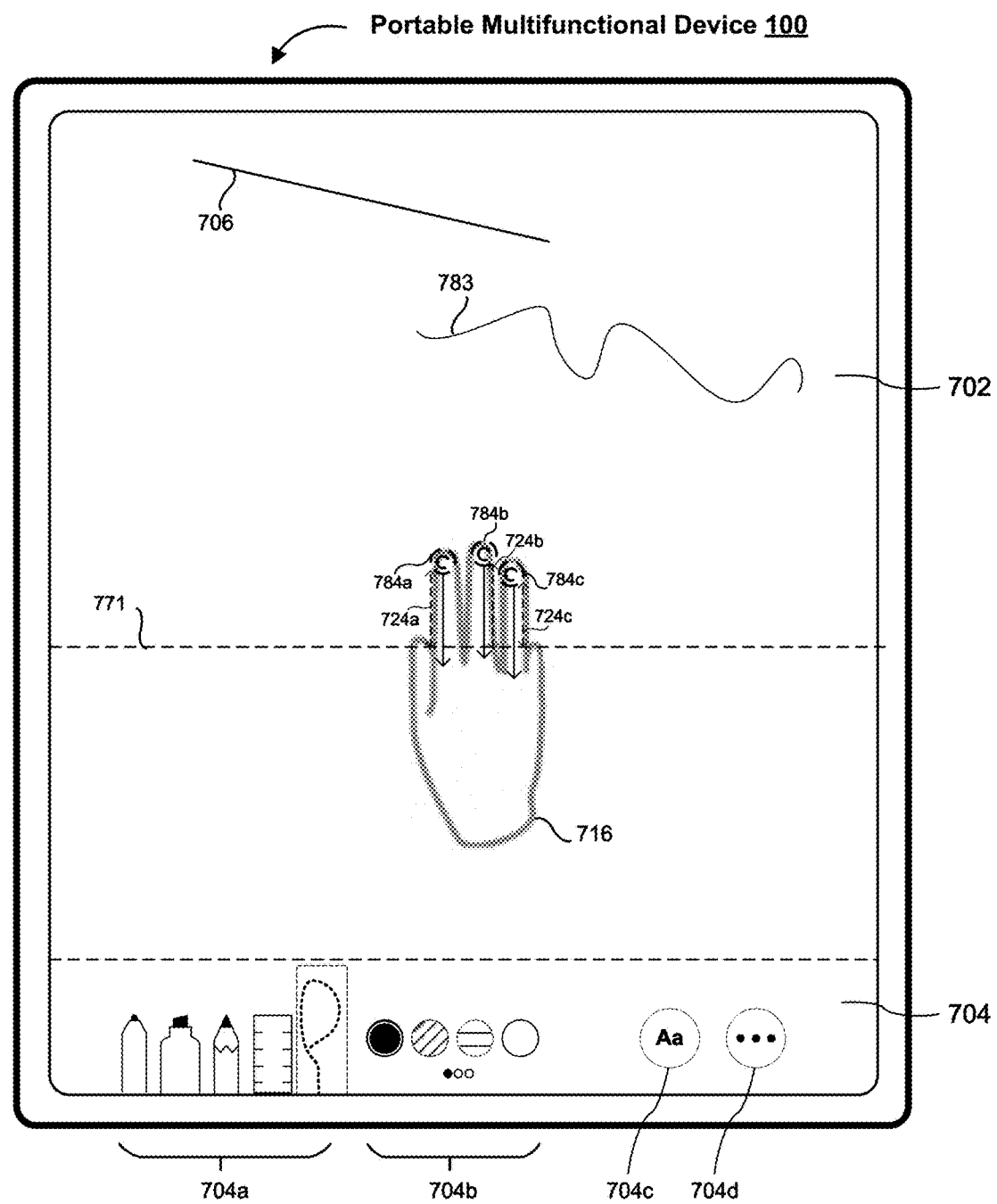
Figure 7A:
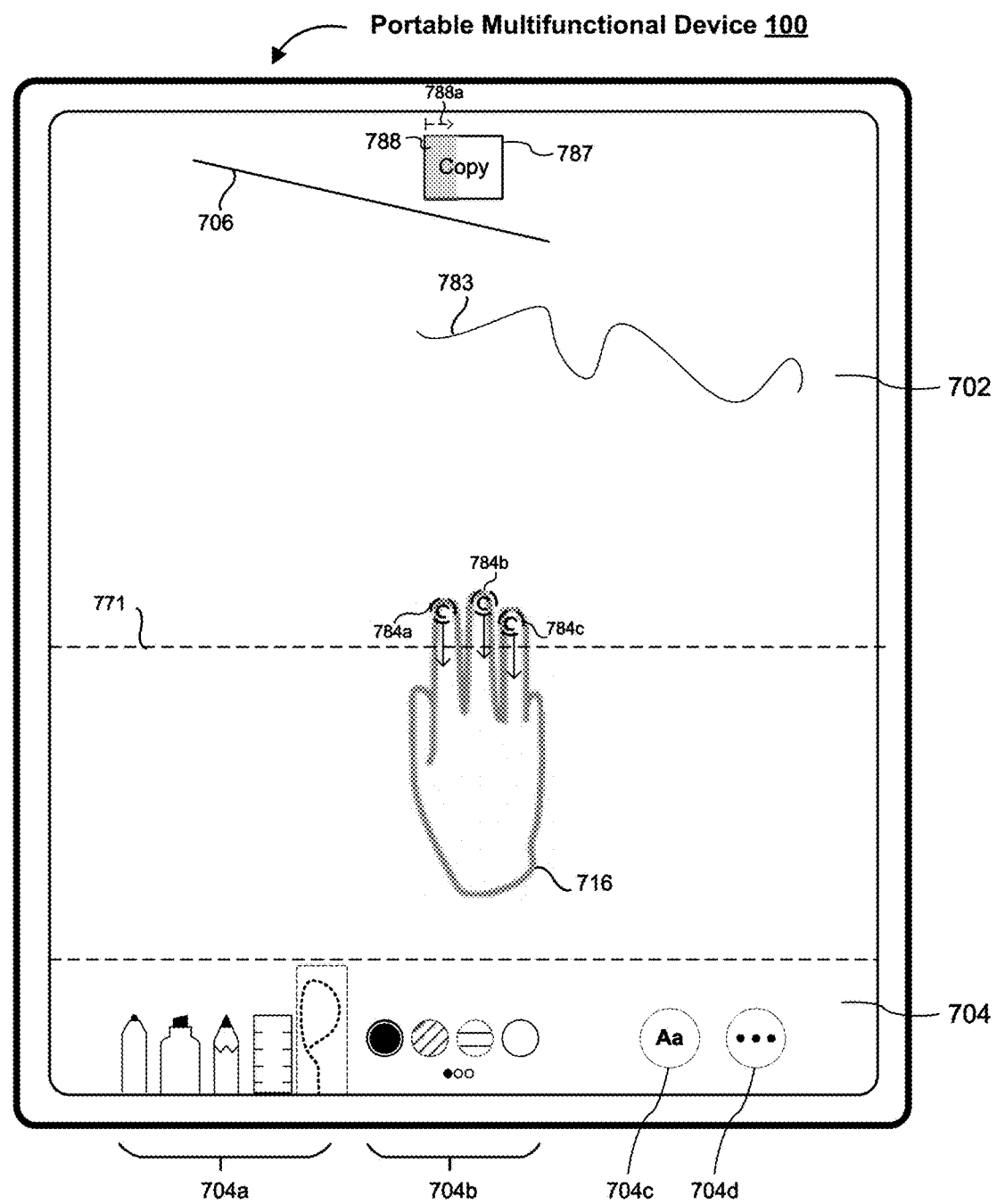
Figure 7A:
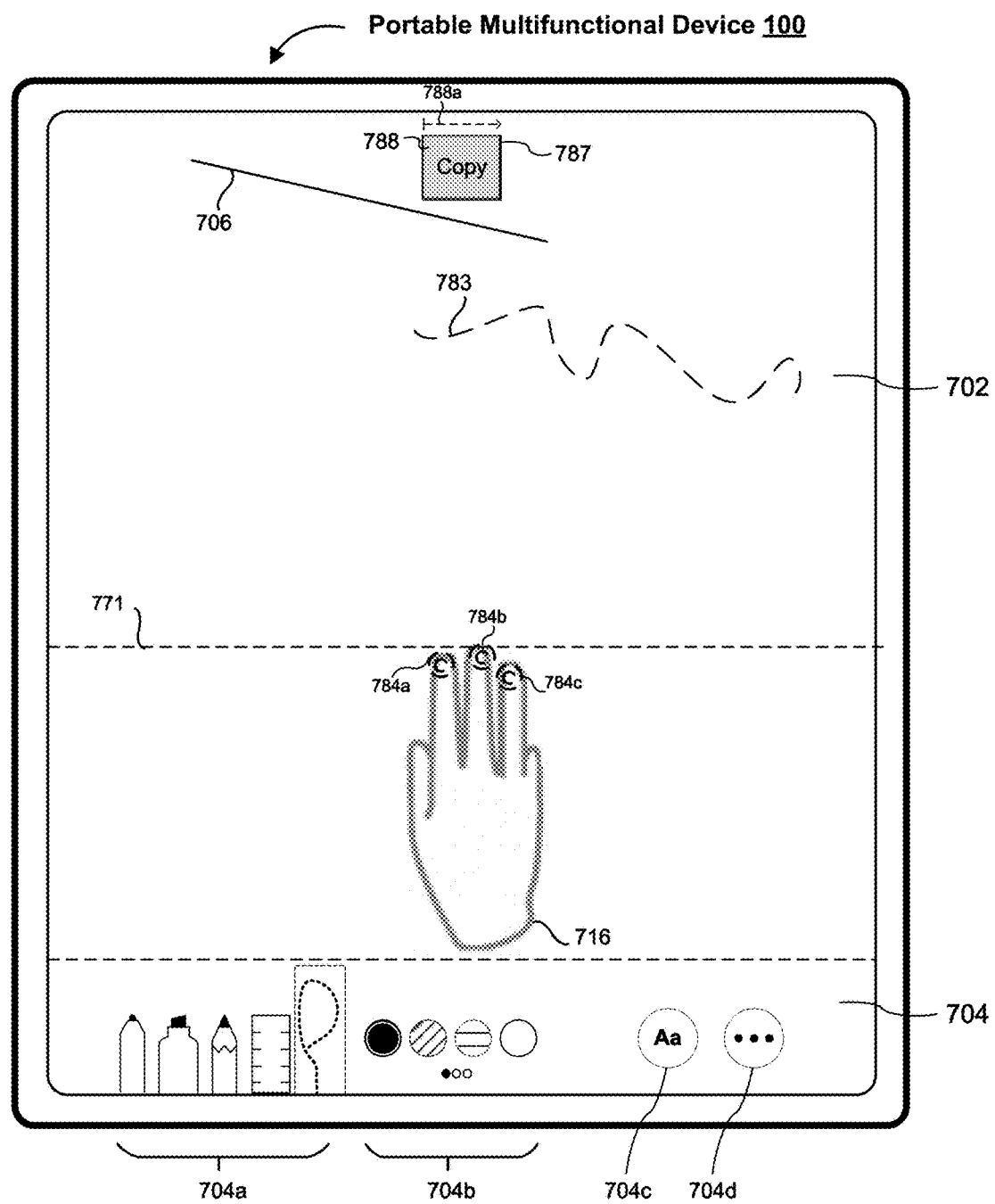
Figure 7A:
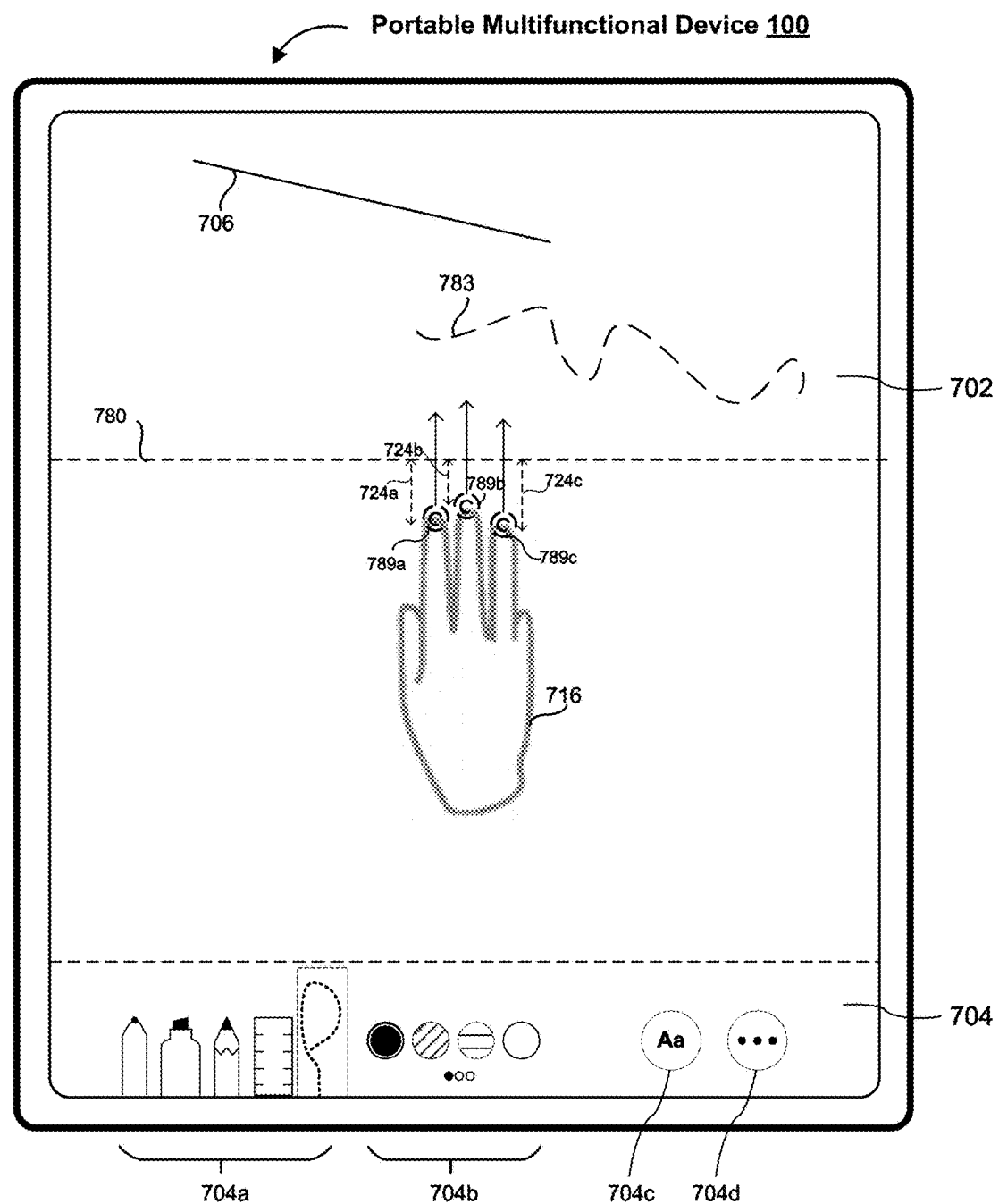
Figure 7A:
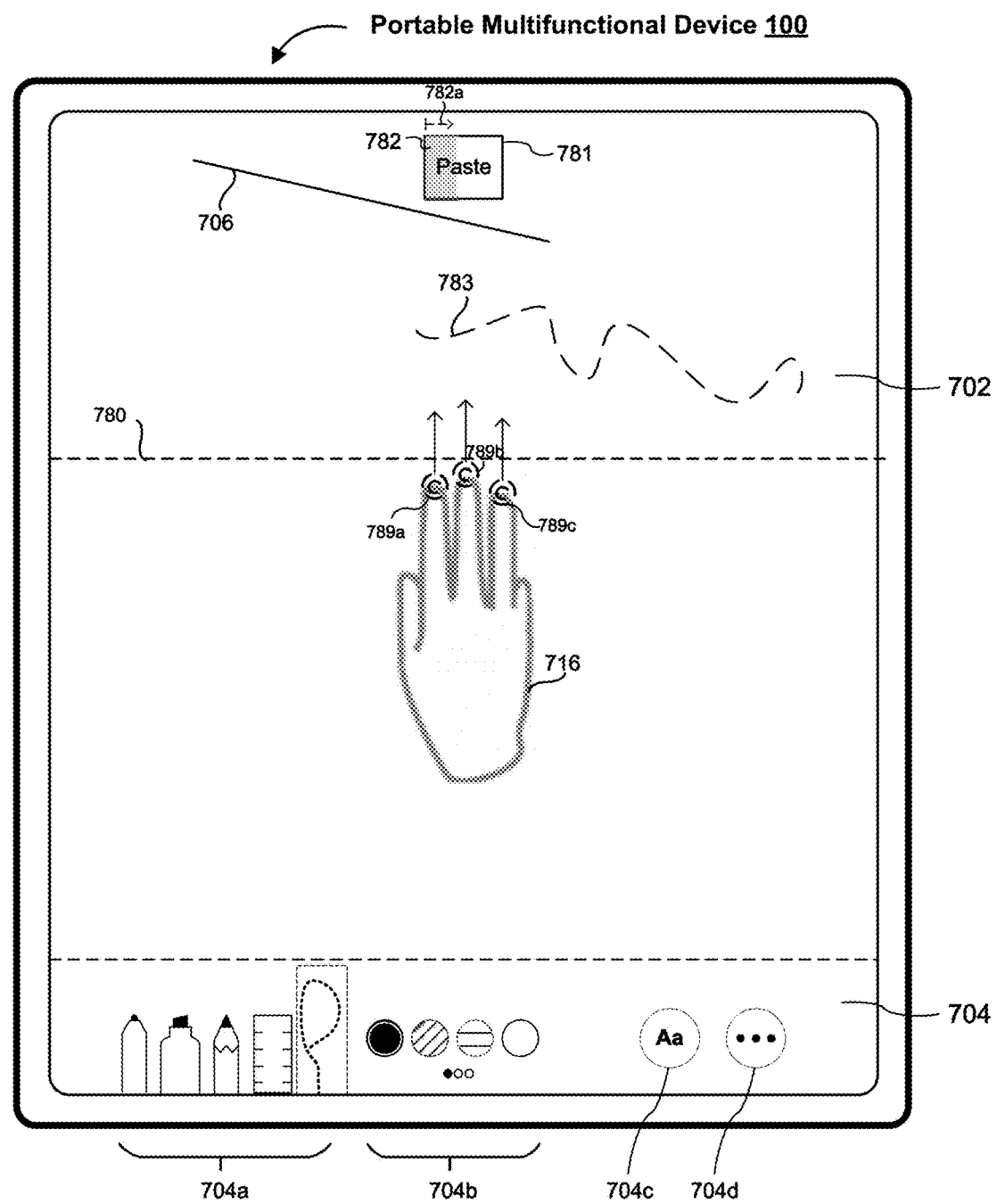
Figure 7A:
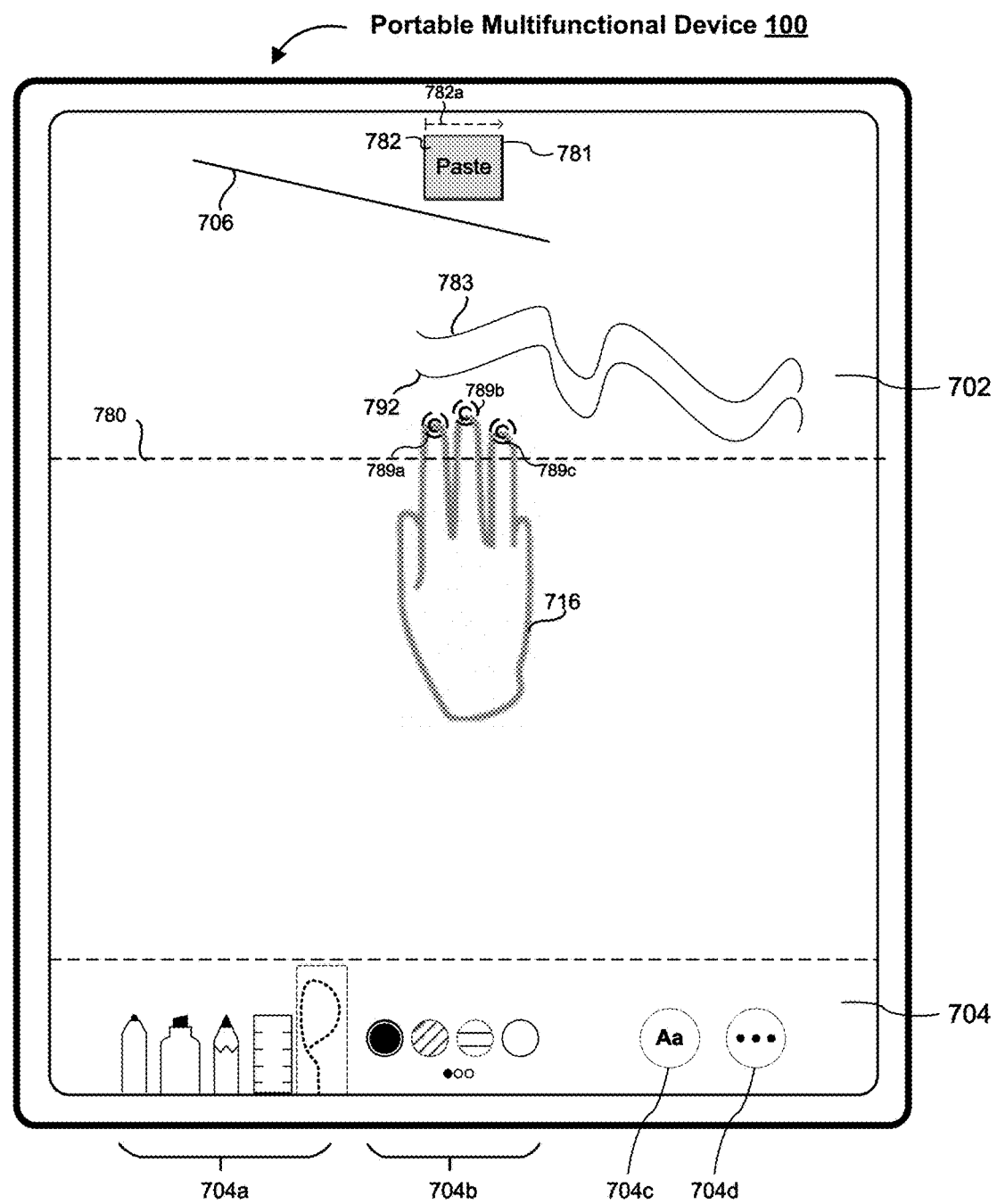
Figure 7B:
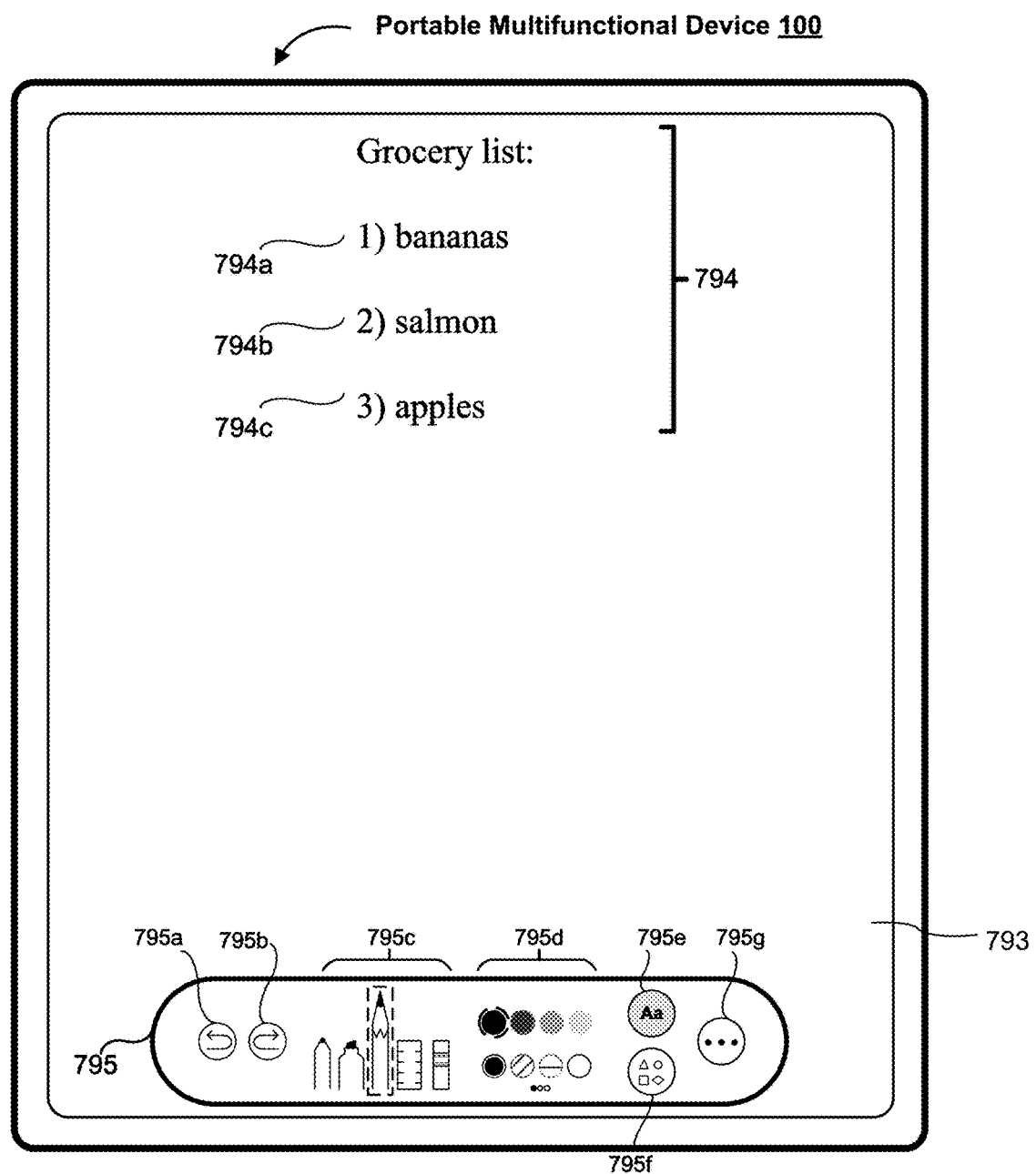
Figure 7B:
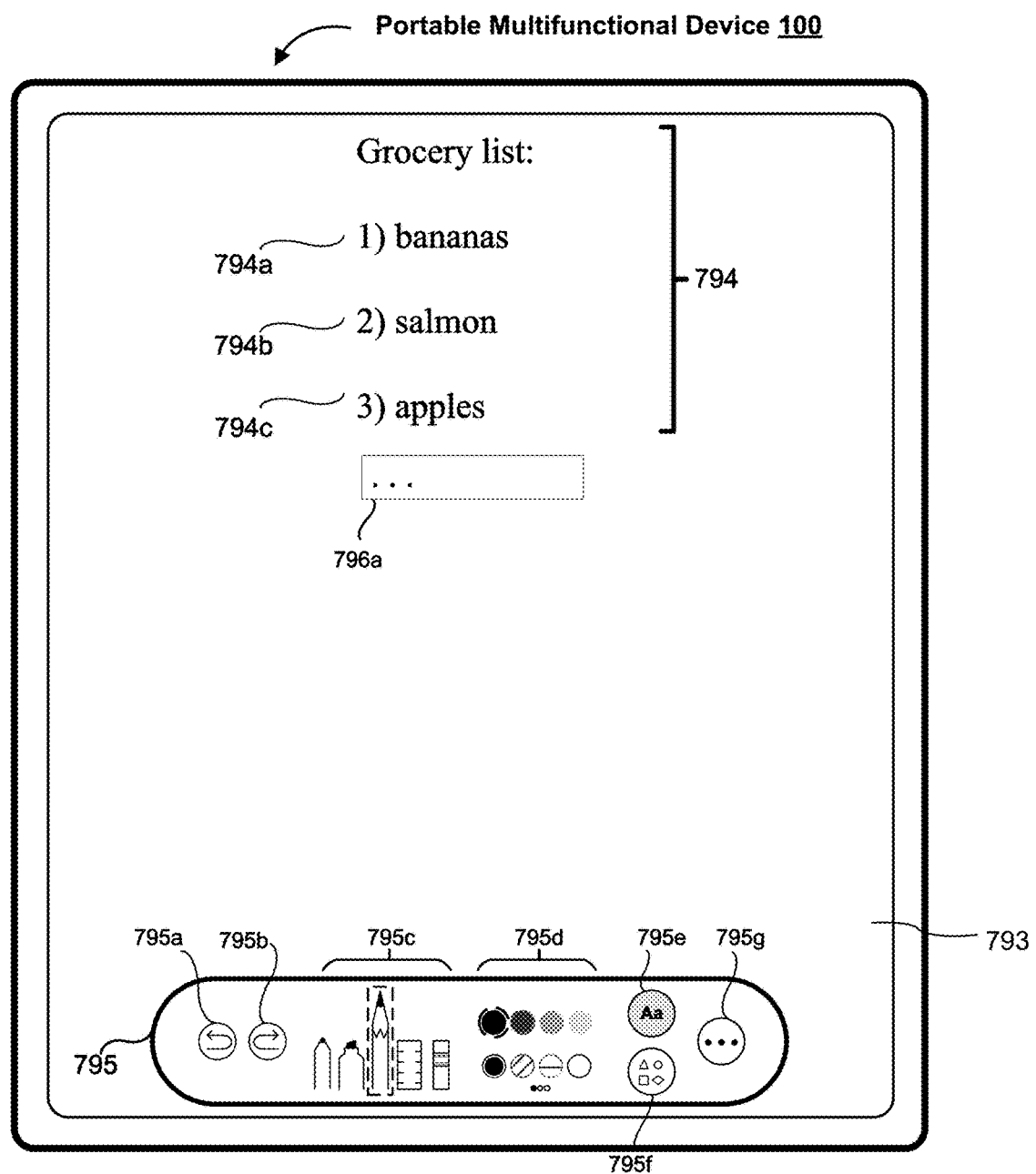
Figure 7B:
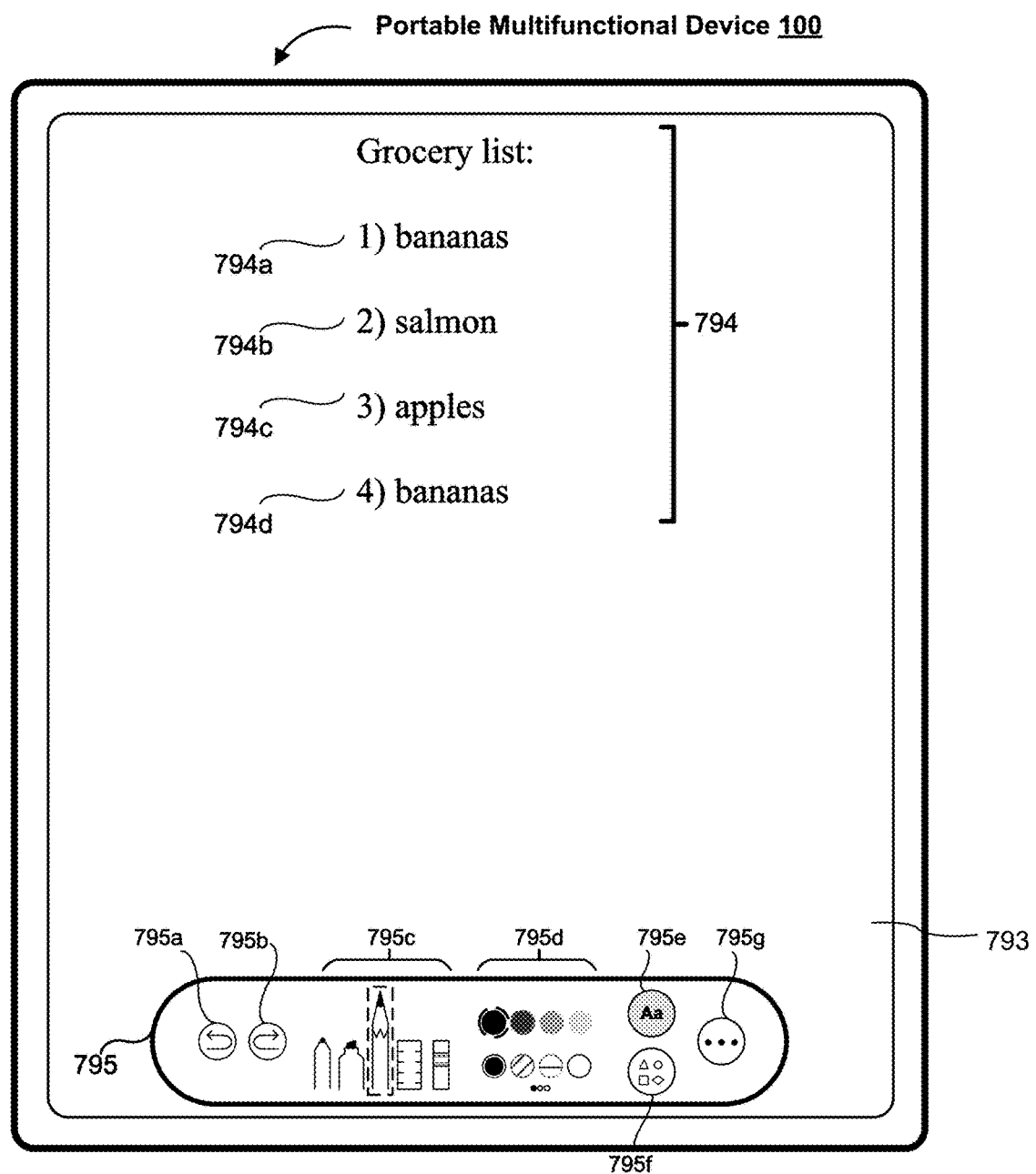
Figure 7B:
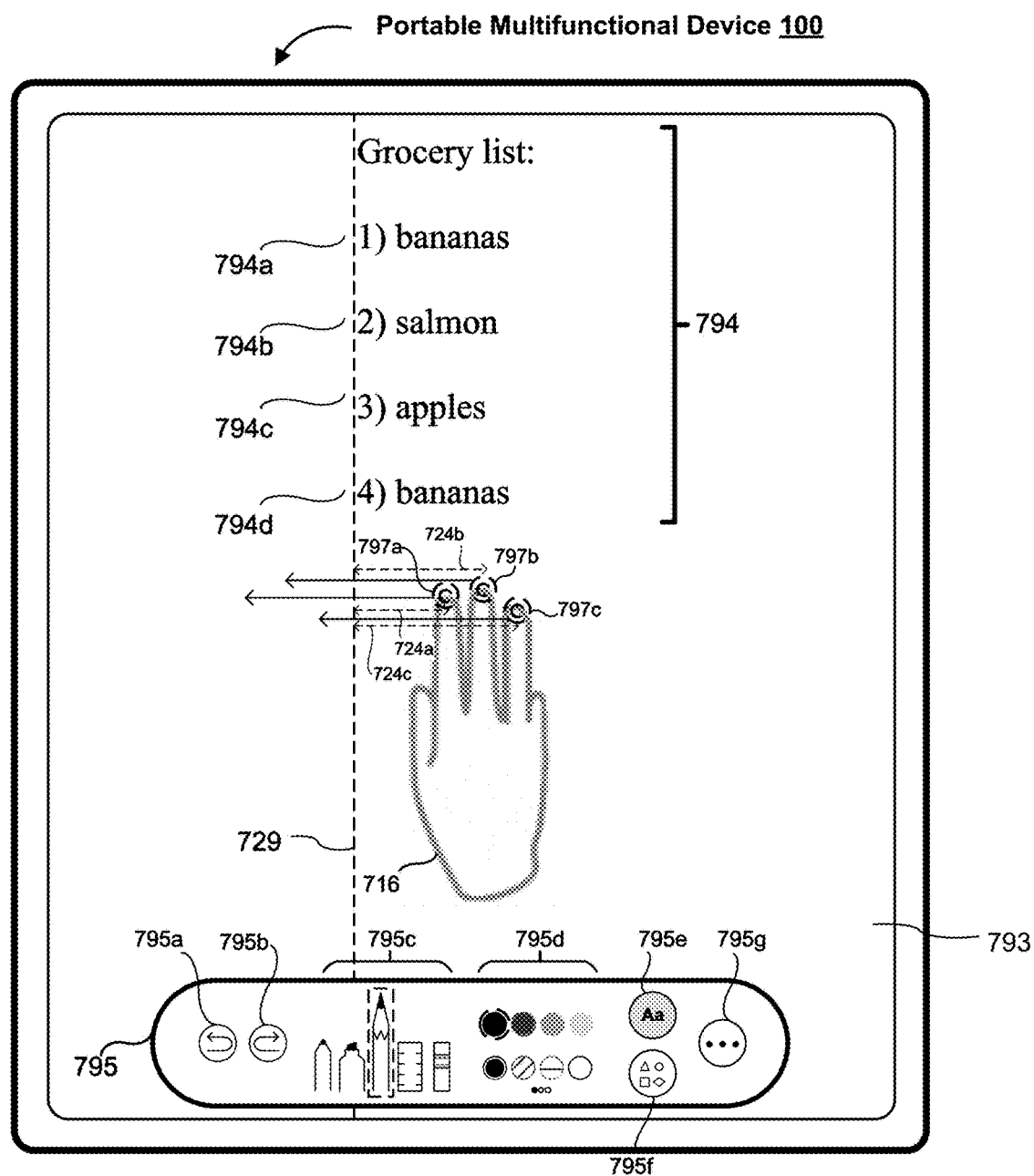
Figure 7B:
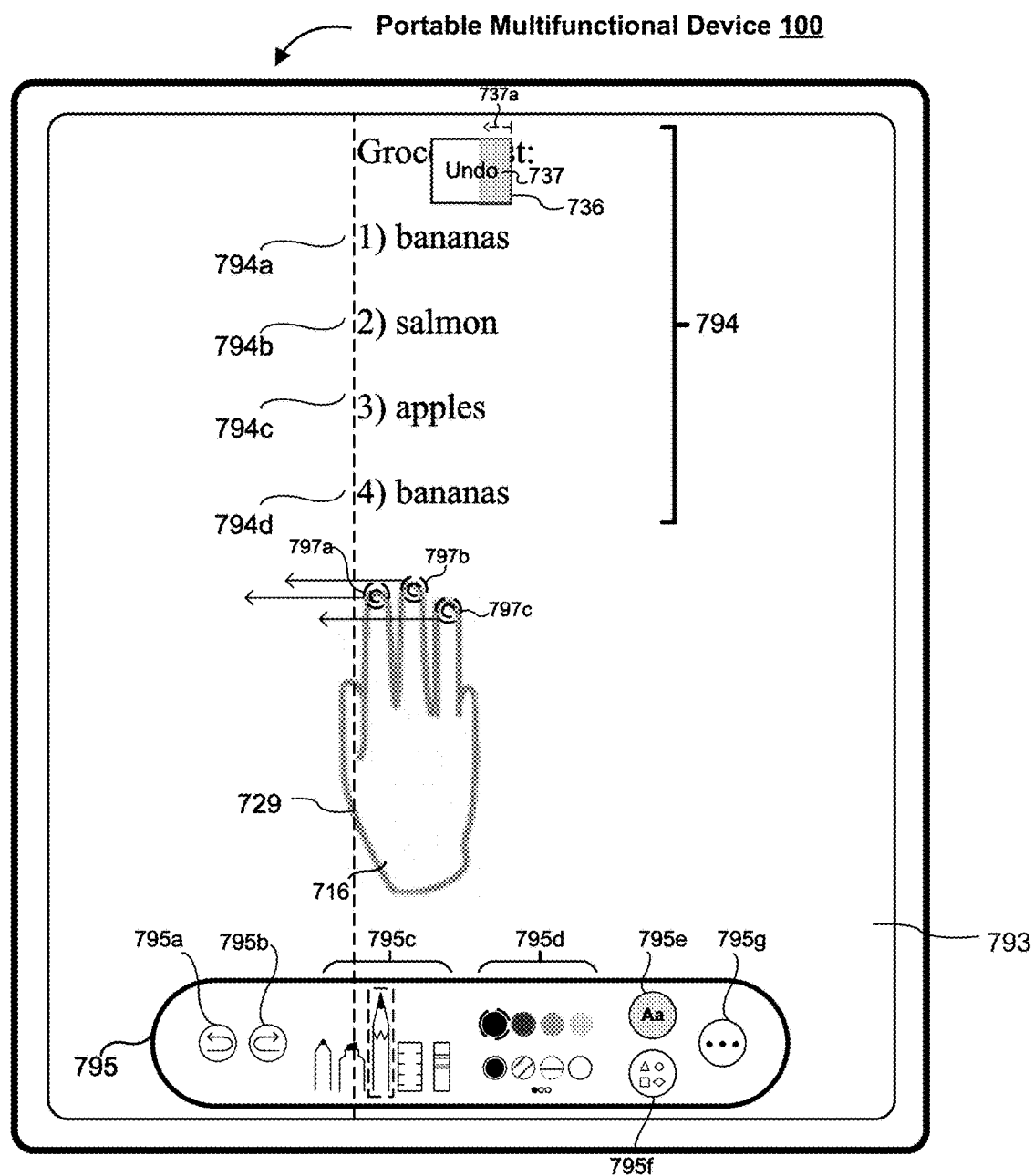
Figure 7B:
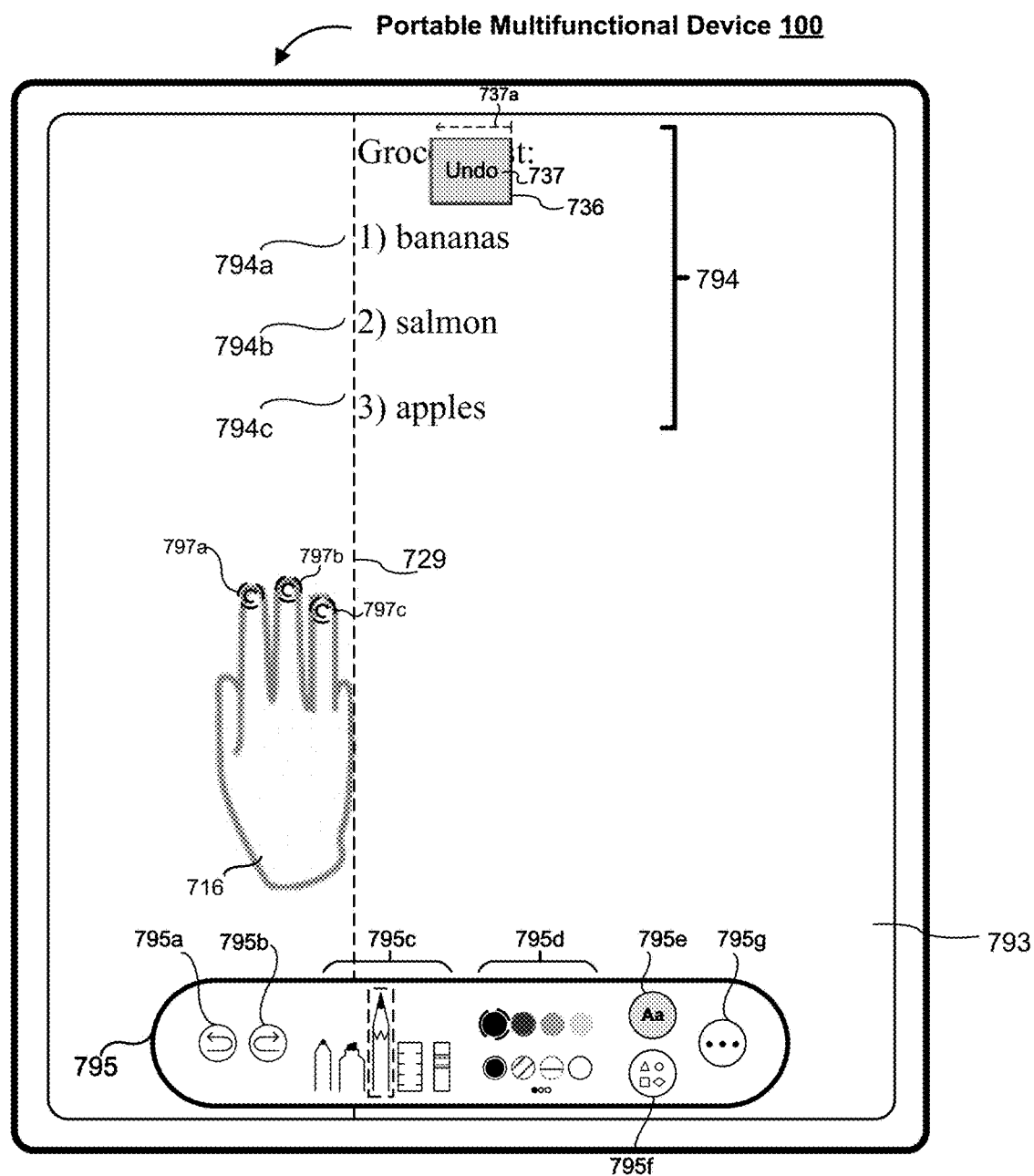

As illustrated in FIGS. 7X-7Z, the electronic device 100 foregoes performing another redo operation based on a fourth multi-finger gesture 748 in the second direction because the fourth multi-finger gesture 748 does not cross the second threshold line 744. As illustrated in FIG. 7X, the fourth multi-finger gesture 748 includes a first finger swipe input 748a, a second finger swipe input 748b, and a third finger swipe input 748c. In response to detecting the fourth multi-finger gesture 748 in FIG. 7X, the electronic device 100 displays the redo indicator 745 that is indicative of the redo operation, as is illustrated in FIG. 7Y. The electronic device 100 displays the color overlay 746 within the redo indicator 745, wherein the size 746a of the color overlay 746 is based on how near the fourth multi-finger gesture 748 is to crossing the second threshold line 744. Because, as illustrated in FIG. 7Y, the fourth multi-finger gesture 748 is approximately halfway to crossing the second threshold line 744, the size 746a of the color overlay 746 is approximately half the size of the redo indicator 745.

In response to determining that the termination point of the fourth multi-finger gesture 748 is not beyond the second threshold line 744, the electronic device 100 foregoes performing a redo operation. Namely, as illustrated in FIG. 7Z, the electronic device 100 does not redo the previous undo operation that was performed on the text string 712 described, above, with reference to FIGS. 7M-7O.

As illustrated in FIGS. 7AA-7AD, the electronic device 100 performs successive undo operations based on successive multi-finger tap inputs. As illustrated in FIG. 7AA, the electronic device 100 detects a first multi-finger tap input 751 including a first finger tap input 751a, a second finger tap input 751b, and a third finger tap input 751c. In some embodiments, as contrasted with a multi-finger single tap input 718 in FIG. 7K, the first multi-finger tap input 751 in FIG. 7AA corresponds to a multi-finger double tap input. In response to detecting the first multi-finger tap input 751 in FIG. 7AA, the electronic device 100 performs an undo operation on (e.g., removes) the second mark 708, as illustrated in FIG. 7AB.

As illustrated in FIG. 7AC, the electronic device 100 detects a second multi-finger tap input 754 including a first finger tap input 754a, a second finger tap input 754b, and a third finger tap input 754c. In some embodiments, the second multi-finger tap input 754 illustrated in FIG. 7AC is similar to the first multi-finger tap input 754 illustrated in FIG. 7AA. In some embodiments, the electronic device detects the second multi-finger tap input 754 within a threshold amount of time after detecting the first multi-finger tap input 751. In response to detecting the second multi-finger tap input 754 in FIG. 7AC, the electronic device 100 performs another undo operation on (e.g., removes) the first mark 706, as illustrated in FIG. 7AD.

As illustrated in FIGS. 7AE-7AJ, the electronic device 100 performs successive redo operations based on successive inputs directed to the redo affordance 722e within the interface 722. As illustrated in FIG. 7AE, the electronic device 100 detects a multi-finger tap input 757, such as a single tap input. The multi-finger tap input 757 includes a first finger tap input 757a, a second finger tap input 757b, and a third finger tap input 757c.

In response to detecting the multi-finger tap input 757 in FIG. 7AE, the electronic device 100 displays the interface 722 including the content manipulation operation affordances 722a-722e in FIG. 7AF. As illustrated in FIG. 7AG, the electronic device 100 detects a first input 760 directed to the redo affordance 722e. In response to detecting the first input 760 in FIG. 7AG, the electronic device 100 performs a redo operation on the first mark 706 by redisplaying the first mark 706, as illustrated in FIG. 7AH.

As illustrated in FIG. 7AI, the electronic device 100 detects a second input 761 directed to the redo affordance 722e. In response to detecting the second input 761 in FIG. 7AI, the electronic device 100 performs another redo operation on the second mark 708 by redisplaying the second mark 708, as illustrated in FIG. 7AJ. Moreover, in some embodiments, after a threshold amount of time since detecting an input (e.g., the second input 751), the electronic device 100 removes the interface 722, as illustrated in FIG. 7AJ.

As illustrated in FIG. 7AK, the electronic device 100 detects an input 762 directed to the selection tool affordance (e.g., the lasso tool affordance) of the set of drawing tool affordances 704a. In response to detecting the input 762 in FIG. 7AK, the electronic device 100 sets the selection tool as the currently-selected tool, as is illustrated in FIG. 7AL.

As illustrated in FIG. 7AM, the electronic device 100 detects a selection input 763 directed to (e.g., a canvas of) the first application interface 702. The selection input 763 selects (e.g., encloses) the second mark 708. In response to detecting the selection input 763 in FIG. 7AM, the electronic device 100 selects a corresponding portion of the first application interface 702, as indicated by the selection indictor 764 in FIG. 7AN. In some embodiments, the electronic device 100 displays the selection indicator 764 in order to provide an indication of the currently-selected region. In some embodiments, the electronic device 100 does not display the selection indicator 764, in which case the selection indicator 764 is illustrated in FIGS. 7AN-7AP for purely explanatory purposes.

As illustrated in FIGS. 7AO-7AQ, the electronic device 100 performs a cut operation based on a fifth multi-finger gesture 765. As illustrated in FIG. 7AO, the electronic device 100 detects the fifth multi-finger gesture 765 in a third direction (e.g., substantially downwards) that is different from (e.g., perpendicular to) the first and second directions. The fifth multi-finger gesture 765 includes a first finger swipe input 765a, a second finger swipe input 765b, and a third finger swipe input 765c. In some embodiments, the fifth multi-finger gesture 765 corresponds to a multi-finger multi-swipe input, such as two successive multi-finger swipes in the substantially downwards direction that the electronic device 100 detects within a threshold amount of time of each other.

The electronic device 100 determines that the fifth multi-finger gesture 765 includes more than the first predetermined amount of movement in the third direction. The first predetermined amount of movement corresponds to a distance between the origin point of a particular finger swipe and a third threshold line 771, which is illustrated for purely explanatory purposes. In various embodiments, the third threshold line 771 corresponds to a threshold distance from one of the first finger swipe input 765a, the second finger swipe input 765b, or the third finger swipe input 765c. For example, in some embodiments, the first predetermined amount of movement corresponds to the first distance 724a between the origin point of the first finger swipe input 765a and the third threshold line 771, the second distance 724b between the origin point of the second finger swipe input 765b and the third threshold line 771, the third distance 724c between the origin point of the third finger swipe input 756c and the third threshold line 771, or a combination thereof.

In response to detecting the fifth multi-finger gesture 765 in FIG. 7AO, the electronic device 100 displays a cut indicator 772 that is indicative of the cut operation, as is illustrated in FIG. 7AP. The electronic device 100 displays a color overlay 773 within the cut indicator 772, wherein the size 773a of the color overlay 773 is based on how near the fifth multi-finger gesture 765 is to crossing the third threshold line 771. Because, as illustrated in FIG. 7AP, the fifth multi-finger gesture 765 is approximately halfway to crossing the third threshold line 771, the size 773a of the color overlay 773 is approximately half the size of the cut indicator 772.

As illustrated in FIG. 7AQ, in response to detecting the fifth multi-finger gesture 765 cross the third threshold line 771, the electronic device 100 performs the cut operation on the selection indicated by the selection indicator 764, which includes the second mark 708. Moreover, the size 773a of the color overlay 773 is the same as the size of the cut indicator 772 because the fifth multi-finger gesture 765 has crossed the third threshold line 771.

As illustrated in FIGS. 7AR-7AT, the electronic device 100 performs a paste operation based on a sixth multi-finger gesture 774. As illustrated in FIG. 7AR, the electronic device 100 detects the sixth multi-finger gesture 774 in a fourth direction (e.g., substantially upwards) that is different from the first, second, and third directions (and, e.g., opposite the third direction). The sixth multi-finger gesture 774 includes a first finger swipe input 774a, a second finger swipe input 774b, and a third finger swipe input 774c.

The electronic device 100 determines that the sixth multi-finger gesture 774 includes more than the first predetermined amount of movement in the fourth direction. The first predetermined amount of movement corresponds to a distance between the origin point of a particular finger swipe and a fourth threshold line 780, which is illustrated for purely explanatory purposes. In various embodiments, the fourth threshold line 780 corresponds to a threshold distance from one of the first finger swipe input 774a, the second finger swipe input 774b, or the third finger swipe input 774c. For example, in some embodiments, the first predetermined amount of movement corresponds to the first distance 724a between the origin point of the first finger swipe input 774a and the fourth threshold line 780, the second distance 724b between the origin point of the second finger swipe input 774b and the fourth threshold line 780, the third distance 724c between the origin point of the third finger swipe input 774c and the fourth threshold line 780, or a combination thereof.

In response to detecting the sixth multi-finger gesture 774 in FIG. 7AR, the electronic device 100 displays a paste indicator 781 that is indicative of the paste operation, as is illustrated in FIG. 7AS. The electronic device 100 displays a color overlay 782 within the paste indicator 781, wherein the size 782a of the color overlay 782 is based on how near the sixth multi-finger gesture 774 is to crossing the fourth threshold line 780. Because, as illustrated in FIG. 7AS, the sixth multi-finger gesture 774 is approximately halfway to crossing the fourth threshold line 780, the size 782a of the color overlay 782 is approximately half the size of the paste indicator 781.

As illustrated in FIG. 7AT, in response to detecting the sixth multi-finger gesture 774 cross the fourth threshold line 780, the electronic device 100 performs a paste operation on the previously cut selection that includes the second mark 708. Namely, as illustrated in FIG. 7AT, the electronic device 100 pastes (e.g., displays) a third mark 783 corresponding to the second mark 708, but at a different location than the location of the second mark 708. One of ordinary skill in the art will appreciate that the electronic 100 may paste a particular selection at any location within the application interface 702, including at the location of the cut content. Moreover, the size 782a of the color overlay 782 is the same as the size of the paste indicator 781 because the sixth multi-finger gesture 774 has crossed the fourth threshold line 780.

As illustrated in FIGS. 7AU-7AW, the electronic device 100 performs a copy operation based on a seventh multi-finger gesture 784. As illustrated in FIG. 7AU, the electronic device 100 detects the seventh multi-finger gesture 784 in the third direction (e.g., substantially downwards). The seventh multi-finger gesture 784 includes a first finger swipe input 784a, a second finger swipe input 784b, and a third finger swipe input 784c. In some embodiments, the seventh multi-finger gesture 784 corresponds to a multi-finger single swipe gesture.

The electronic device 100 determines that the seventh multi-finger gesture 784 includes more than the first predetermined amount of movement in the third direction. The first predetermined amount of movement corresponds to a distance between the origin point of a particular finger swipe and the third threshold line 771, which is illustrated for purely explanatory purposes. For example, in some embodiments, the first predetermined amount of movement corresponds to the first distance 724a between the origin point of the first finger swipe input 784a and the third threshold line 771, the second distance 724b between the origin point of the second finger swipe input 784b and the third threshold line 771, the third distance 724c between the origin point of the third finger swipe input 784c and the third threshold line 771, or a combination thereof.

In response to detecting the seventh multi-finger gesture 784 in FIG. 7AU, the electronic device 100 displays a copy indicator 787 that is indicative of the copy operation, as is illustrated in FIG. 7AV. The electronic device 100 displays a color overlay 788 within the copy indicator 787, wherein the size 788a of the color overlay 788 is based on how near the seventh multi-finger gesture 784 is to crossing the third threshold line 771. Because, as illustrated in FIG. 7AV, the seventh multi-finger gesture 784 is approximately halfway to crossing the third threshold line 771, the size 788a of the color overlay 788 is approximately half the size of the copy indicator 787.

As illustrated in FIG. 7AW, in response to detecting the seventh multi-finger gesture 784 cross the third threshold line 771, the electronic device 100 performs a copy operation on the previously pasted content, corresponding to the selection including the third mark 783. With reference to FIG. 7AW, the third mark 783 is changed to a dashed line in order to indicate that the electronic device 100 has copied the third mark 783. One of ordinary skill in the art will appreciate that in some embodiments the electronic device 100 does not change the appearance of copied content and/or indicates a copy operation in a different way (e.g., by flashing the mouse cursor). Moreover, the size 788a of the color overlay 788 is the same as the size of the copy indicator 787 because the seventh multi-finger gesture 784 has crossed the third threshold line 771.

As illustrated in FIGS. 7AX-7AZ, the electronic device 100 performs another paste operation based on an eighth multi-finger gesture 789. As illustrated in FIG. 7AX, the electronic device 100 detects the eighth multi-finger gesture 789 in the fourth direction (e.g., substantially upwards). The eighth multi-finger gesture 789 includes a first finger swipe input 789a, a second finger swipe input 789b, and a third finger swipe input 789c. The electronic device 100 determines that the eighth multi-finger gesture 789 includes more than the first predetermined amount of movement in the fourth direction, such as described above with reference to FIG. 7AR.

In response to detecting the eighth multi-finger gesture 789 in FIG. 7AX, the electronic device 100 displays the paste indicator 781, as is illustrated in FIG. 7AY. The electronic device 100 displays the color overlay 782 within the paste indicator 781, wherein the size 782a of the color overlay 782 is based on how near the eighth multi-finger gesture 789 is to crossing the fourth threshold line 780. Because, as illustrated in FIG. 7AY, the eighth multi-finger gesture 789 is approximately halfway to crossing the fourth threshold line 780, the size 782a of the color overlay 782 is approximately half the size of the paste indicator 781.

As illustrated in FIG. 7AZ, in response to detecting the eighth multi-finger gesture 789 cross the fourth threshold line 780, the electronic device 100 performs a paste operation on the previously copied content that includes the third mark 783. Namely, as illustrated in FIG. 7AZ, the electronic device 100 pastes (e.g., displays) a fourth mark 792 corresponding to the third mark 783, but at a different location than the location of the third mark 783. One of ordinary skill in the art will appreciate that the electronic 100 may paste particular copied content at any location within the application interface 702. Moreover, the size 782a of the color overlay 782 is the same as the size of the paste indicator 781 because the eighth multi-finger gesture 789 has crossed the fourth threshold line 780.

As illustrated in FIGS. 7BA-7BE, the electronic device 100 performs an undo operation with respect to a second application interface 793 of a second application. The second application interface 793 is different from the first application interface 702 illustrated in FIGS. 7A-7AZ. One of ordinary skill in the art will appreciate that a variety of content manipulation operations may be performed in addition to the undo operation, such as cut, copy, paste, and/or redo operations as described above with reference to the first application interface 702. The second application interface 793 includes a drawing palette 795 that includes a variety of affordances to facilitate content manipulation operations. For example, as illustrated in FIG. 7BA, the drawing palette 795 includes an undo affordance 795a, a redo affordance 795b, a set of drawing tool affordances 795c, a set of color pots 795d, a text tool affordance 795e, a shapes tool affordance 795f, and an additional functions affordance 795g. The text tool is the currently-selected tool, as indicated by the text tool affordance 795e having a distinguished appearance (e.g., gray-colored) from the remainder of the affordances. One of ordinary skill in the art will appreciate that the drawing palette 795 may include any number and types of affordances, arranged in any number of ways.

As illustrated in FIG. 7BA, the second application interface 793 further includes content 794 corresponds to a list of grocery items, including "1) bananas" 794a, "2) salmon" 794b, and "3) apples" 794c. As illustrated in FIGS. 7BB and 7BC, in response to detecting a text entry input 796a, the electronic device 100 displays additional content corresponding to text "4) bananas" 794d. Notably, the first and fourth items on the grocery list correspond to the same item, "bananas."

As illustrated in FIG. 7BD, the electronic device 100 detects a ninth multi-finger gesture 797 in the first (e.g., substantially leftwards) direction. The ninth multi-finger gesture 797 includes a first finger swipe input 797a, a second finger swipe input 797b, and a third finger swipe input 797c. The ninth multi-finger gesture 797 includes more than the first predetermined amount of movement in the first direction.

In response to detecting the ninth multi-finger gesture 797 in FIG. 7BD, the electronic device 100 displays the undo indicator 736 that is indicative of the undo operation, as is illustrated in FIG. 7BE. The electronic device 100 displays the undo indicator 736 overlaid on the content 794 (e.g., overlaid on "Grocery List") so the content 794 does not obscure the undo indicator 736. The electronic device 100 displays the color overlay 737 within the undo indicator 736, wherein the size 737a of the color overlay 737 is based on how near the ninth multi-finger gesture 797 is to crossing the first threshold line 729. Because, as illustrated in FIG. 7BE, the ninth multi-finger gesture 797 is approximately halfway to the first threshold line 729, the size 737a of the color overlay 737 is approximately half the size of the undo indicator 736.

As illustrated in FIG. 7BF, in response to detecting the ninth multi-finger gesture 797 cross the first threshold line 729, the electronic device 100 performs an undo operation on the last entered grocery list item, corresponding to "4) bananas" 794d. Namely, the electronic device 100 ceases to display (e.g., removes) "4) bananas" 794d in FIG. 7BF. Moreover, the size 737a of the color overlay 737 is the same as the size of the undo indicator 736 because the ninth multi-finger gesture 797 has crossed the first threshold line 729.

FIGS. 8A-8AJ are examples of user interfaces for performing partial and complete undo/redo operations in accordance with some embodiments. The user interfaces in these figures are used to illustrate the processes described below, including the processes in FIGS. 11A-11C. Although some of the examples which follow will be given with reference to inputs on a touch-screen display (where the touch-sensitive surface and the display are combined, for example on touch screen 112), in some embodiments, the electronic device 100 detects inputs on touch-sensitive surface 651 that is separate from display 650, as shown in FIG. 6B.

As illustrated in FIG. 8A, the electronic device 100 displays an application interface 802 associated with, for example, a drawing application or a word-processing application. The application interface 802 includes a toolbar region 804 that may include a variety of affordances (e.g., drawing tools, editing functions, color pots) to facilitate content manipulation operations. For example, as illustrated in FIG. 8A, the toolbar region 804 includes a set of drawing tool affordances 804a, a set of color pots 804b, a text tool affordance 804c, and an additional functions affordance 804d (e.g., share affordance, save affordance, etc.). One of ordinary skill in the art will appreciate that the toolbar region 804 may include any number and types of affordances, arranged in any number of a variety of ways.

The set of drawing tool affordances 804a includes (from left-to-right) a pen affordance, a marker (e.g., highlighter) affordance, a pencil affordance, a ruler affordance, and a selection tool (e.g., lasso tool) affordance. An input directed to a particular drawing tool affordance sets the particular drawing tool as the currently-selected drawing tool.

The set of color pots 804b enables selection of the currently-selected color. As illustrated in FIG. 8A, black is the currently-selected color. An input directed to a particular color pot sets the corresponding color as currently-selected.

The text tool affordance 804c enables creation of text content within the application interface 802. As illustrated in FIG. 8A, the text tool is the currently-selected tool, as indicated by the text tool affordance 804c having a distinguished appearance (e.g., filled with gray color) relative to the remainder of the affordances.

Figure 8B:
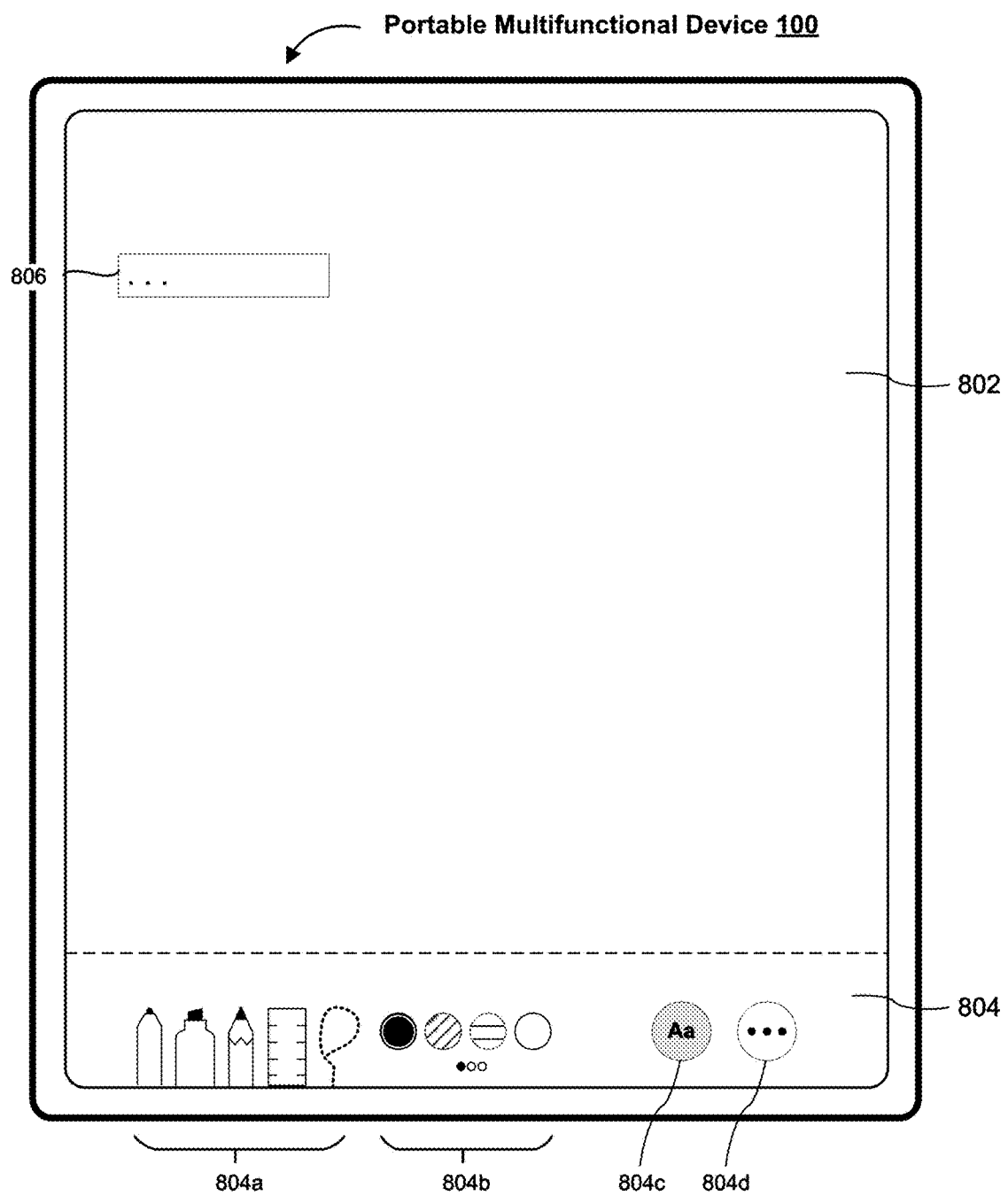

As illustrated in FIGS. 8A and 8B, the electronic device 100 detects a first content manipulation input 806 corresponding to entry of a first text string 806a. In response to detecting the first content manipulation input 806 in FIG. 8B, the electronic device 100 displays the first text string 806a in FIG. 8C.

Figure 8C:
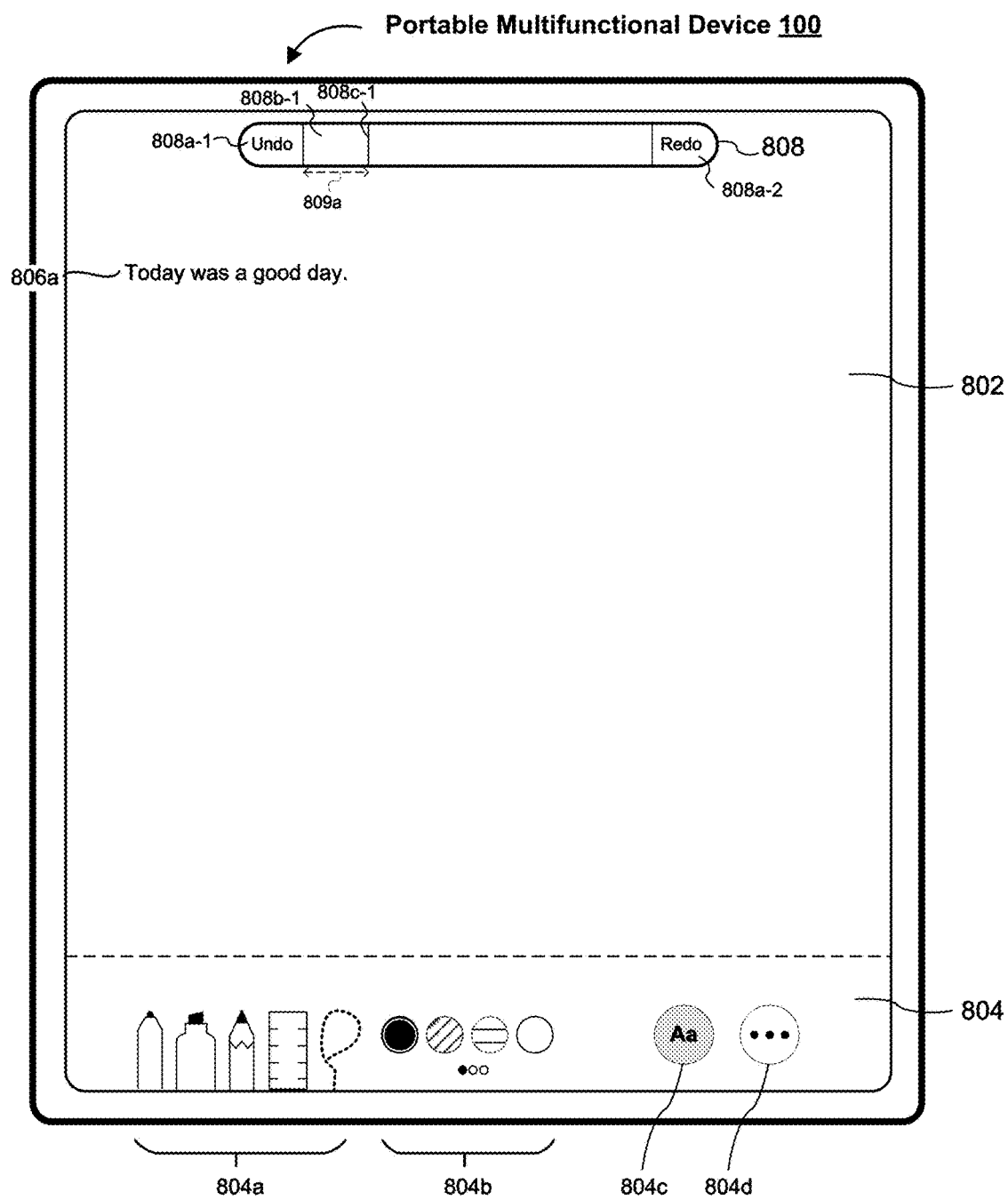

Moreover, in response to detecting the first content manipulation input 806, the electronic device 100 displays a scrubber 808 in FIG. 8C. The scrubber 808 includes an undo last affordance 808a-1, which, when selected, causes the electronic device 100 to perform an undo operation on the last performed content manipulation operation. Similarly, the scrubber 808 includes a redo last affordance 808a-2, which, when selected, causes the electronic device 100 to perform a redo operation on the last performed undo operation. One of ordinary skill in the art will appreciate that other embodiments include the last undo affordance 808a-1 and the last redo affordance 808a-2 arranged and/or positioned differently (e.g., relative to each other). In some embodiments, directly after opening the application associated with the application interface 802, the electronic device 100 detects the first content manipulation input 806 and, in response, does not display the redo last affordance 808a-2 because the electronic device 100 has yet to perform an undo operation. The scrubber 808 further includes a first distinct undo affordance 808c-1 respectively associated with the first text string 806a. The undo last affordance 808a-1 and the first distinct undo affordance 808c-1 are separated by a first partial undo operation region 808b-1. The first partial undo operation region 808b-1 is associated with a first distance 809a that is indicative of a scope (e.g., magnitude) of the first text string 806a.

Figure 8D:
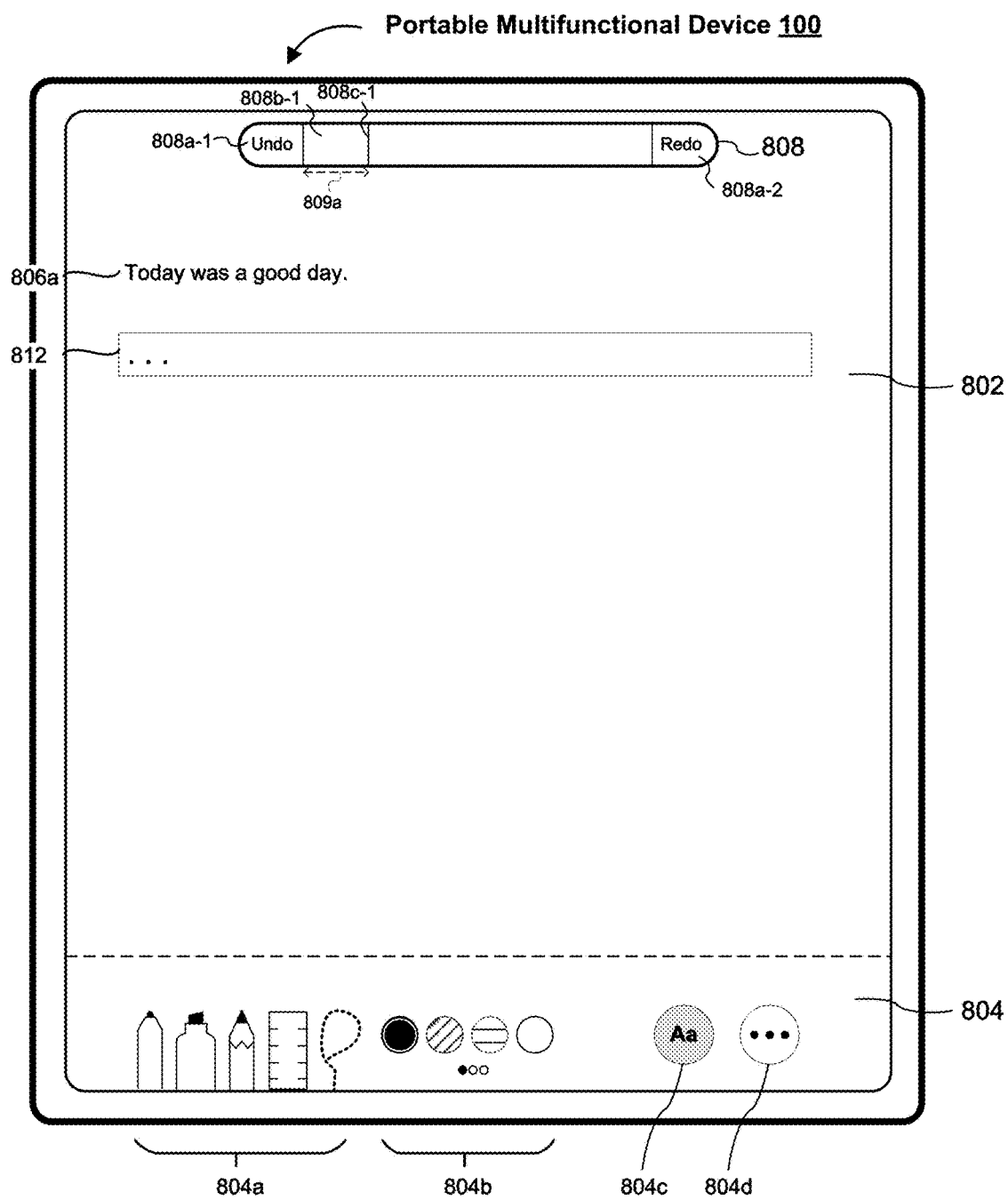
Figure 8E:
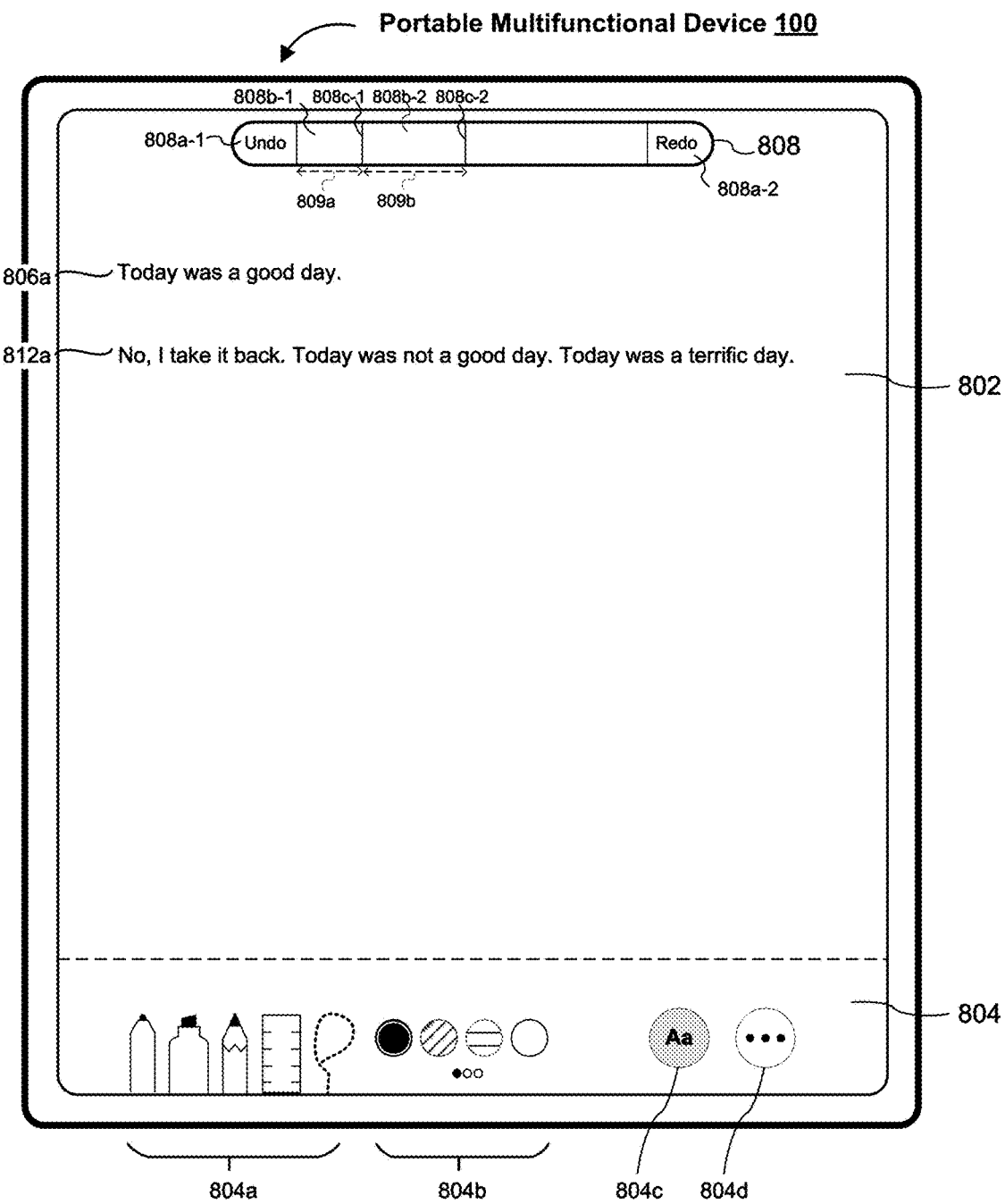

As illustrated in FIGS. 8D and 8E, the electronic device 100 detects a second content manipulation input 812 corresponding to entry of a second text string 812a. In response to detecting the second content manipulation input 812 in FIG. 8D, the electronic device 100 displays the second text string 812a in FIG. 8E. Moreover, the electronic device 100 adds, to the scrubber 808, a second distinct undo affordance 808c-2 respectively associated with the second text string 812a, as illustrated in FIG. 8E. The first distinct undo affordance 808c-1 and the second distinct undo affordance 808c-2 are separated by a second partial undo operation region 808b-2. The second partial undo operation region 808b-2 is associated with a second distance 809b that is indicative of a scope (e.g., magnitude) of the second text string 812a. Notably, the second distance 809b is larger than the first distance 809a because the second content manipulation input 812 created more content (e.g., more text) than did the first content manipulation input 806.

Figure 8F:
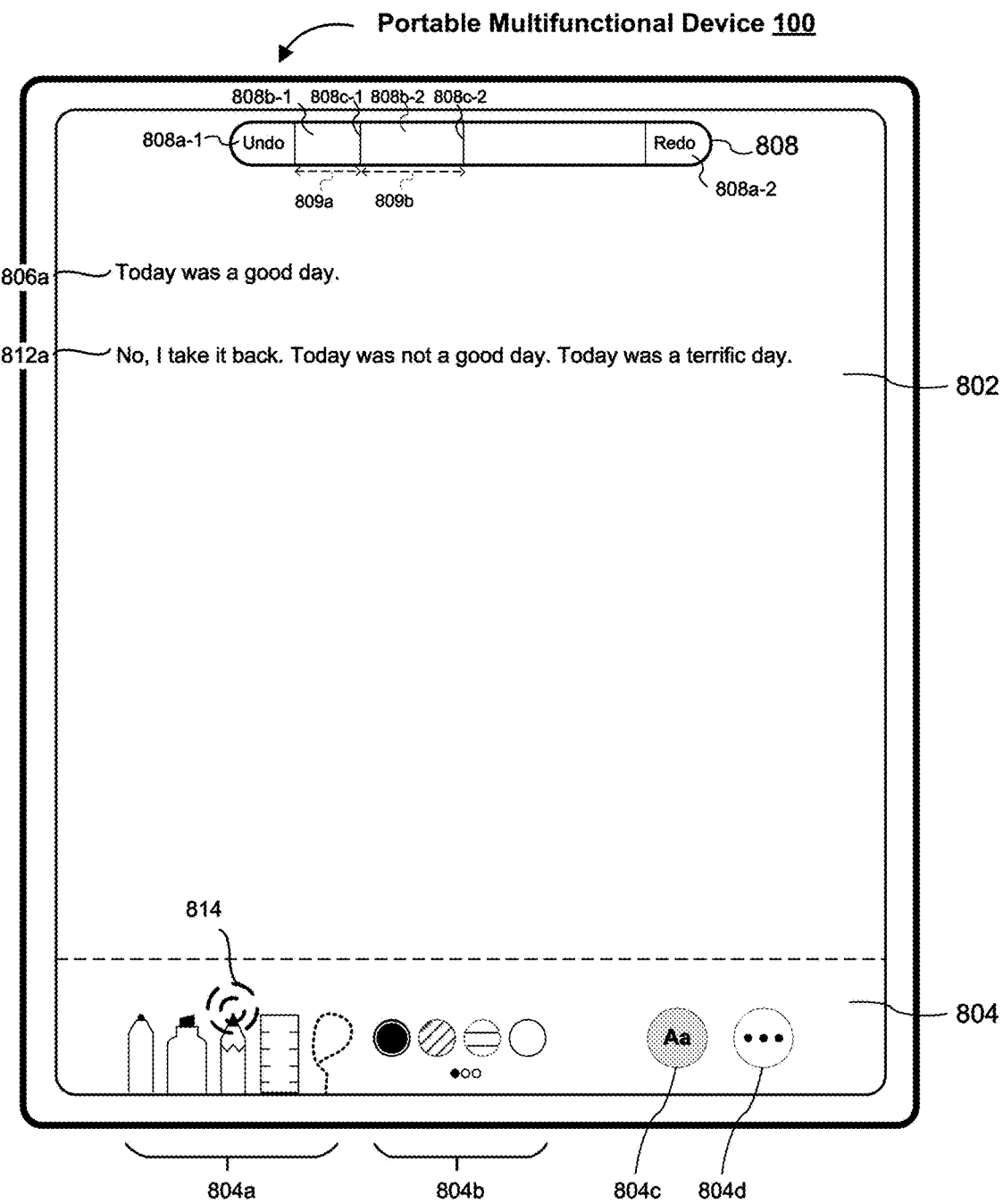
Figure 8G:
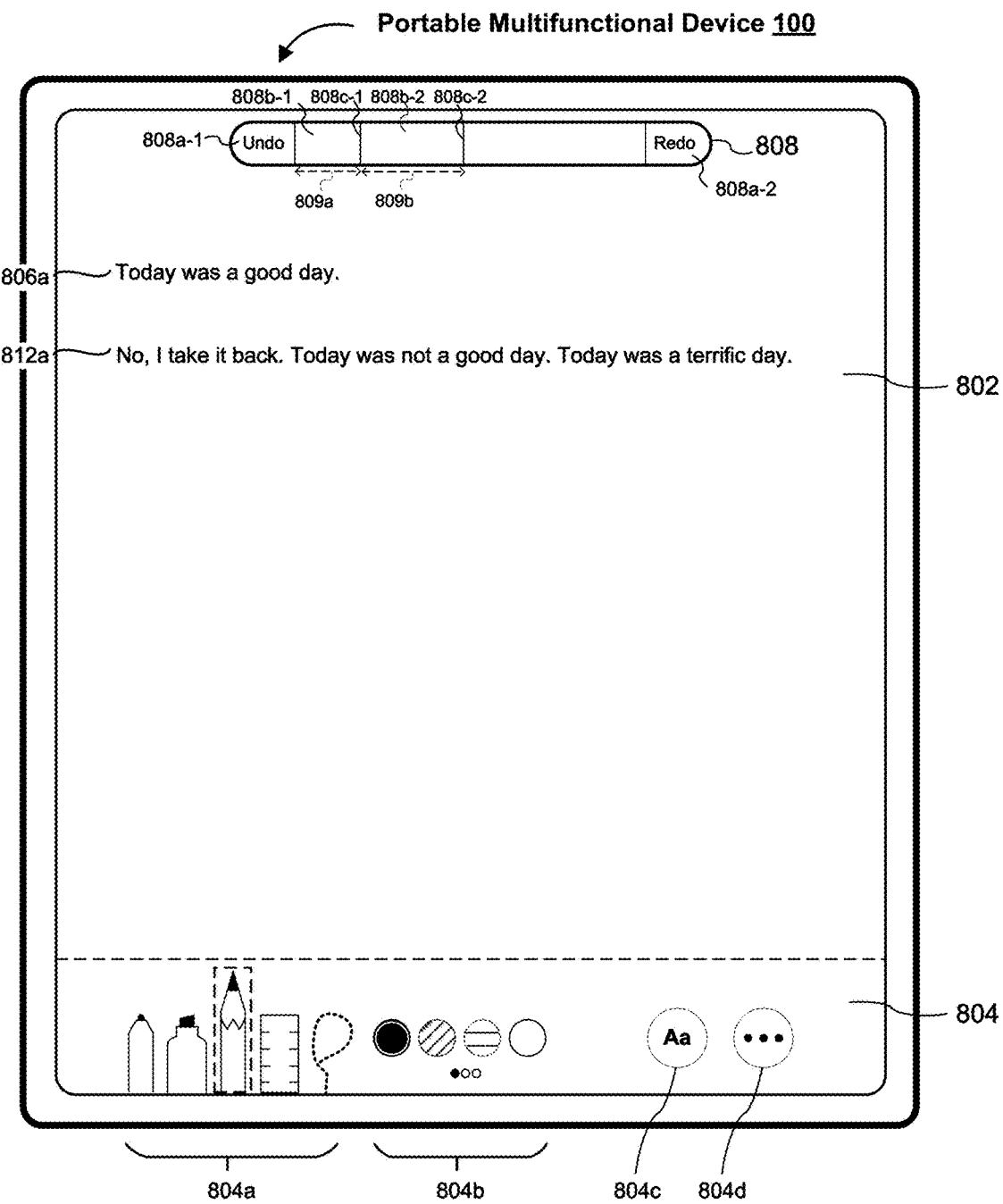

As illustrated in FIGS. 8F and 8G, in response to detecting an input 814 directed to the pencil tool affordance within the set of drawing tools 804a, the electronic device 100 changes the currently-selected tool from the text tool to the pencil tool.

Figure 8H:
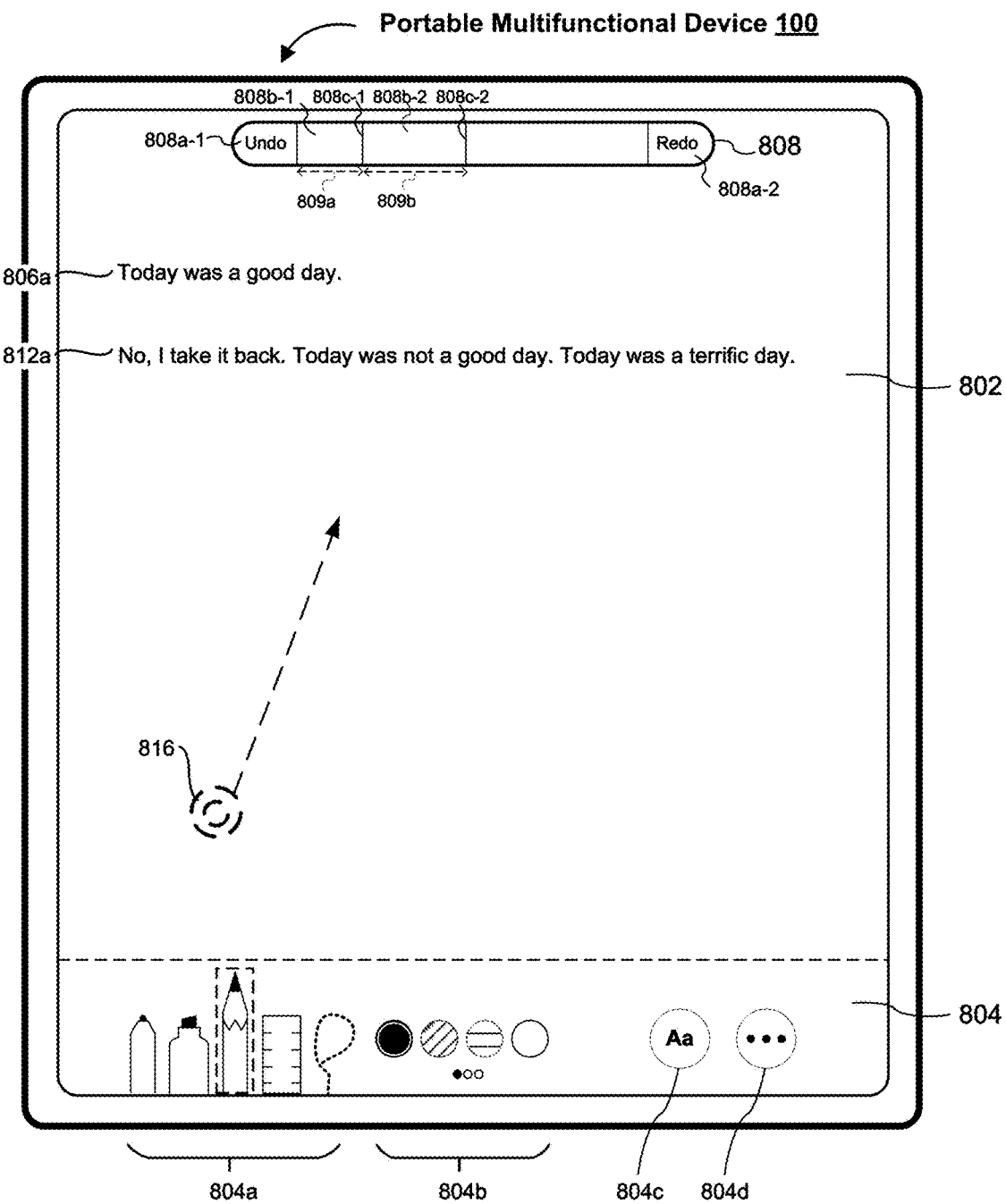
Figure 8I:
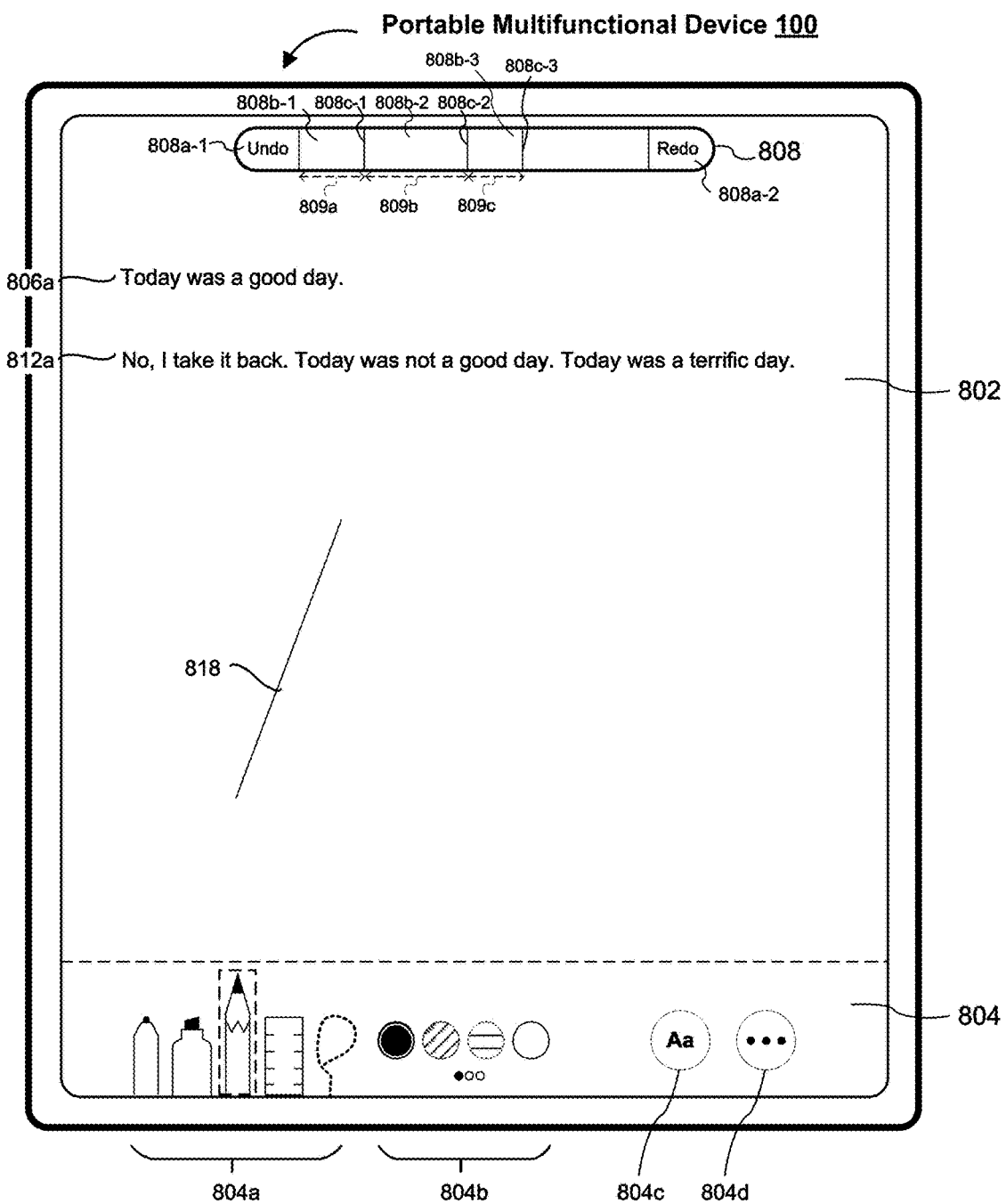

As illustrated in FIGS. 8H and 8I, the electronic device 100 detects a third content manipulation input 816 corresponding to drawing a first side 818 of a triangle. In response to detecting the third content manipulation input 816 in FIG. 8H, the electronic device 100 displays the first side 818 of the triangle in FIG. 8I. Moreover, the electronic device 100 adds, to the scrubber 808, a third distinct undo affordance 808c-3 respectively associated with the first side 818 of the triangle, as illustrated in FIG. 8I. The third distinct undo affordance 808c-3 and the second distinct undo affordance 808c-2 are separated by a third partial undo operation region 808b-3. The third partial undo operation region 808b-3 is associated with a third distance 809c that is indicative of a scope (e.g., magnitude) of the first side 818 of the triangle.

Figure 8J:
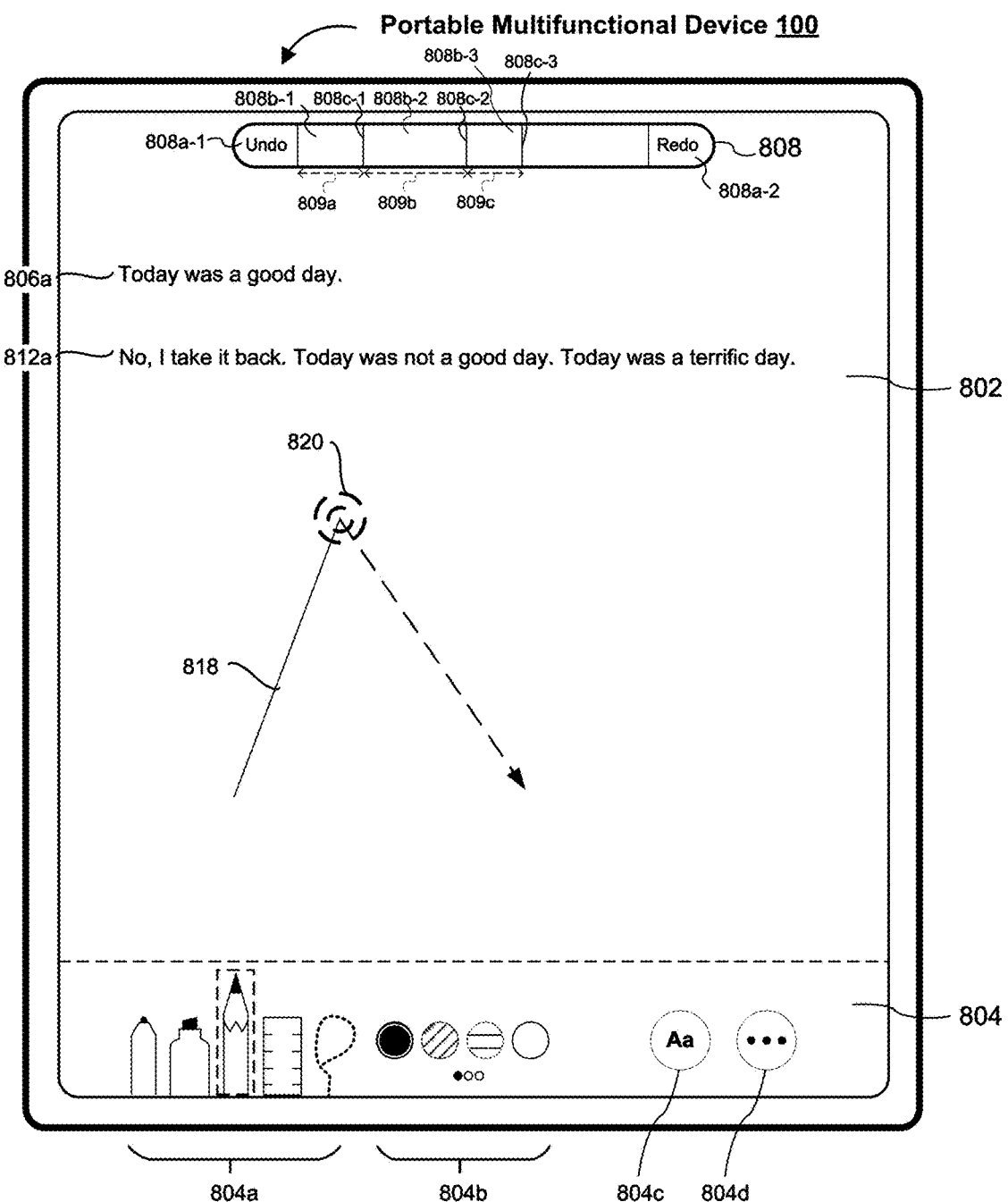
Figure 8K:
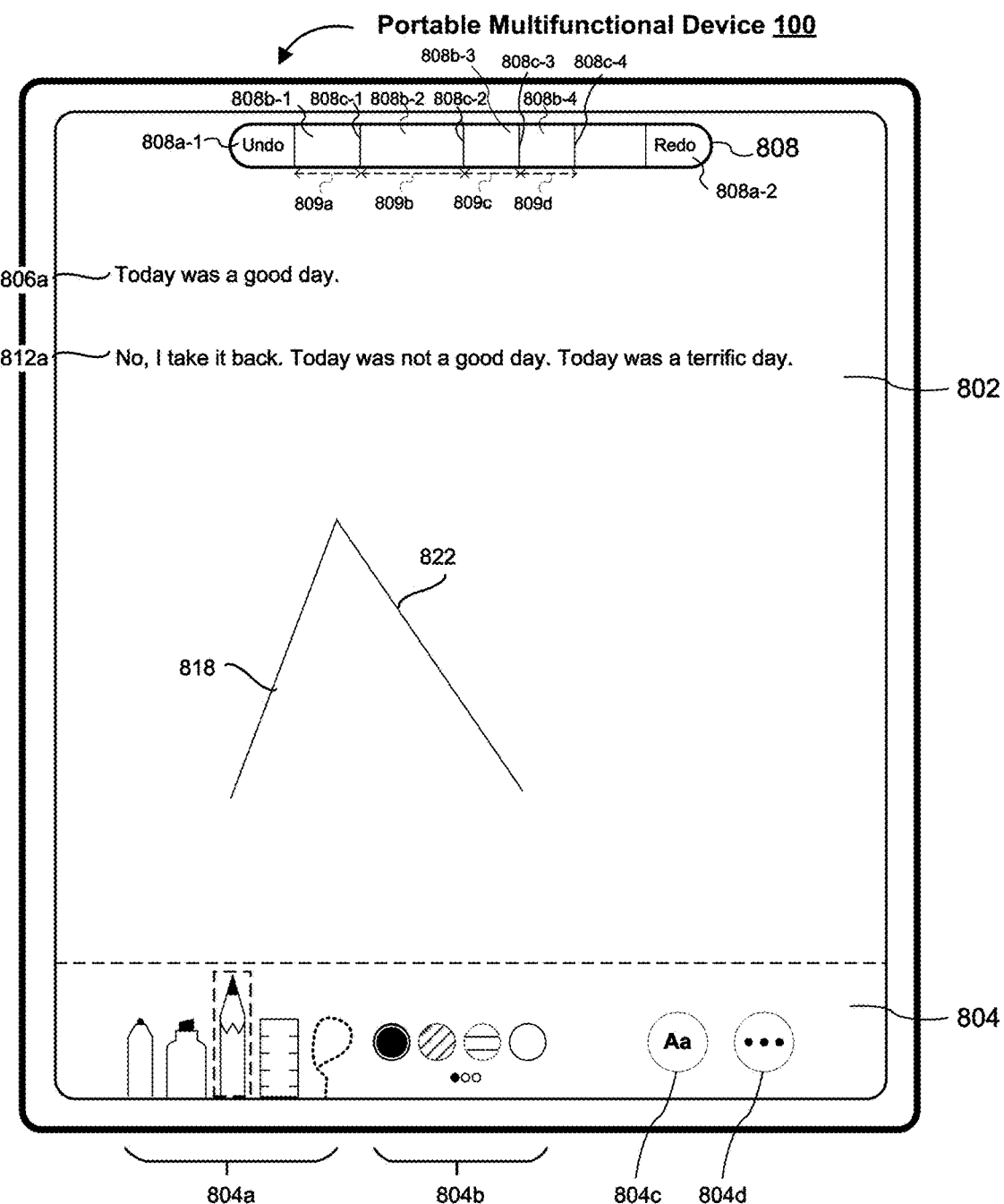

As illustrated in FIGS. 8J and 8K, the electronic device 100 detects a fourth content manipulation input 820 corresponding to drawing a second side 822 of a triangle. In response to detecting the fourth content manipulation input 820 in FIG. 8J, the electronic device 100 displays the second side 822 of the triangle in FIG. 8K. Moreover, the electronic device 100 adds, to the scrubber 808, a fourth distinct undo affordance 808c-4 respectively associated with the second side 822 of the triangle, as illustrated in FIG. 8K. The fourth distinct undo affordance 808c-4 and the third distinct undo affordance 808c-3 are separated by a fourth partial undo operation region 808b-4. The fourth partial undo operation region 808b-4 is associated with a fourth distance 809d that is indicative of a scope (e.g., magnitude) of the second side 822 of the triangle.

Figure 8L:
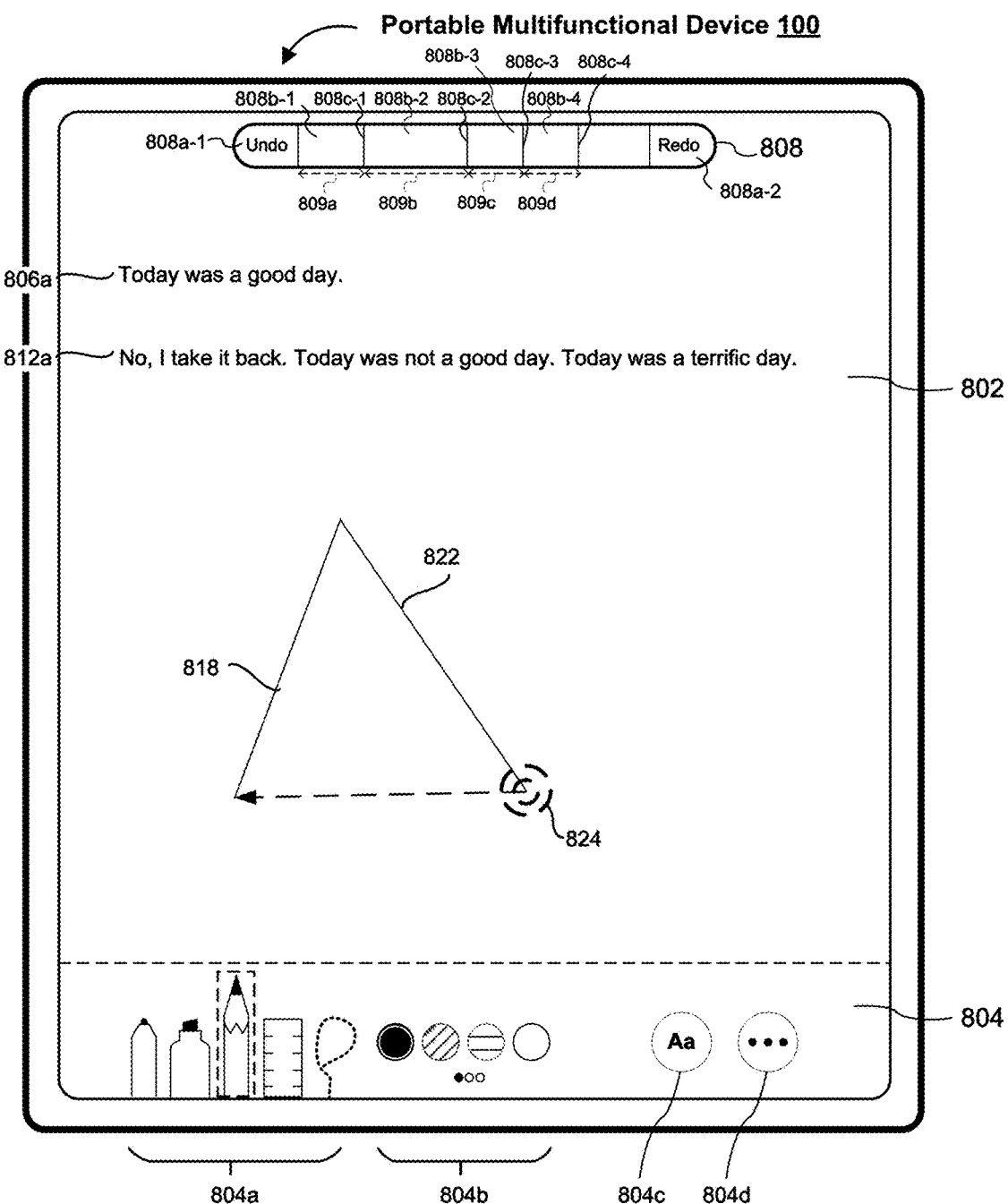
Figure 8M:
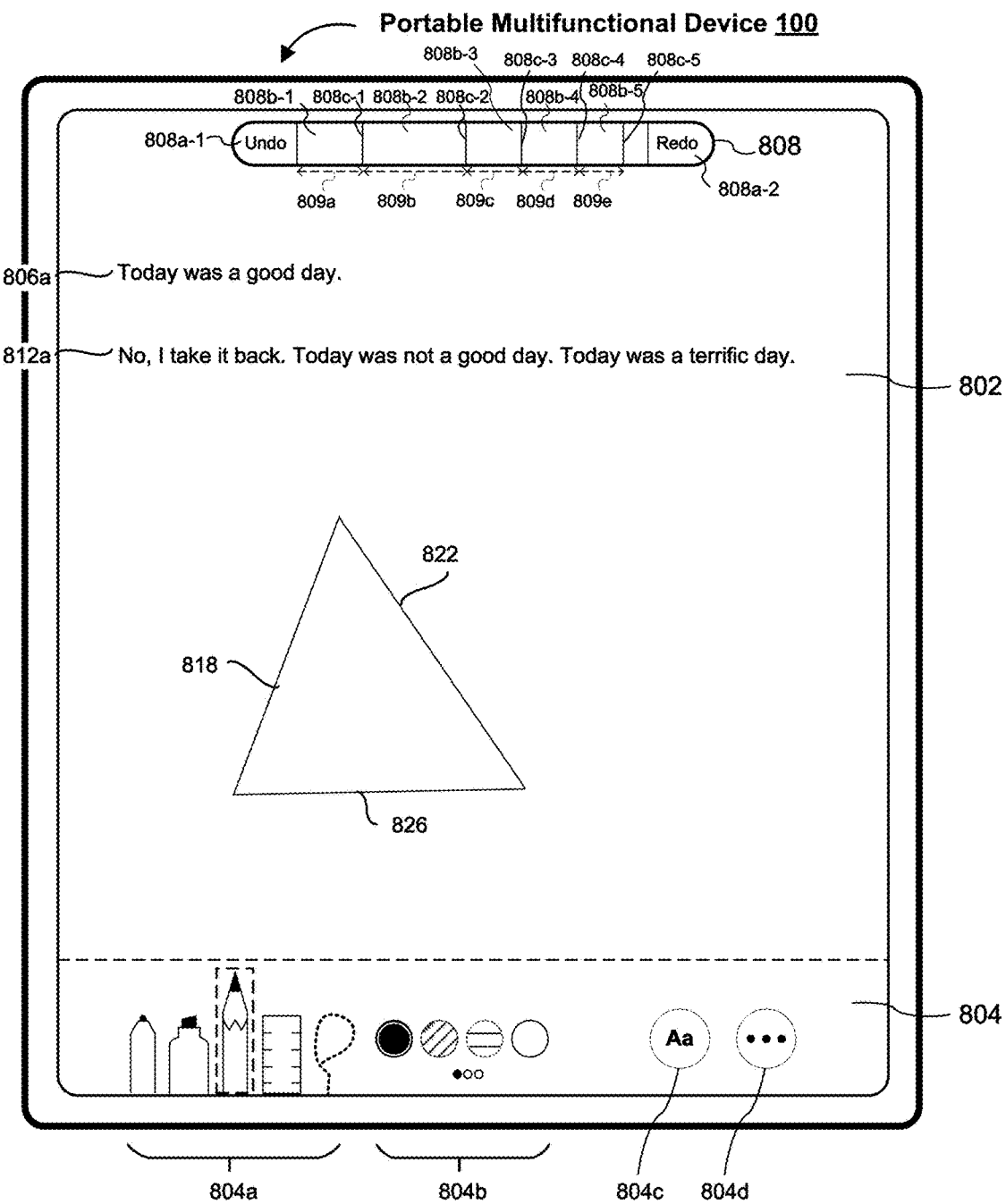

As illustrated in FIGS. 8L and 8M, the electronic device 100 detects a fifth content manipulation input 824 corresponding to drawing a third side 826 of a triangle. In response to detecting the fifth content manipulation input 824 in FIG. 8L, the electronic device 100 displays the third side 826 of the triangle in FIG. 8M. Moreover, the electronic device 100 adds, to the scrubber 808, a fifth distinct undo affordance 808c-5 respectively associated with the third side 826 of the triangle, as illustrated in FIG. 8M. The fifth distinct undo affordance 808c-5 and the fourth distinct undo affordance 808c-4 are separated by a fifth partial undo operation region 808b-5. The fifth partial undo operation region 808b-5 is associated with a fifth distance 809e that is indicative of a scope (e.g., magnitude) of the third side 826 of the triangle.

Figure 8N:
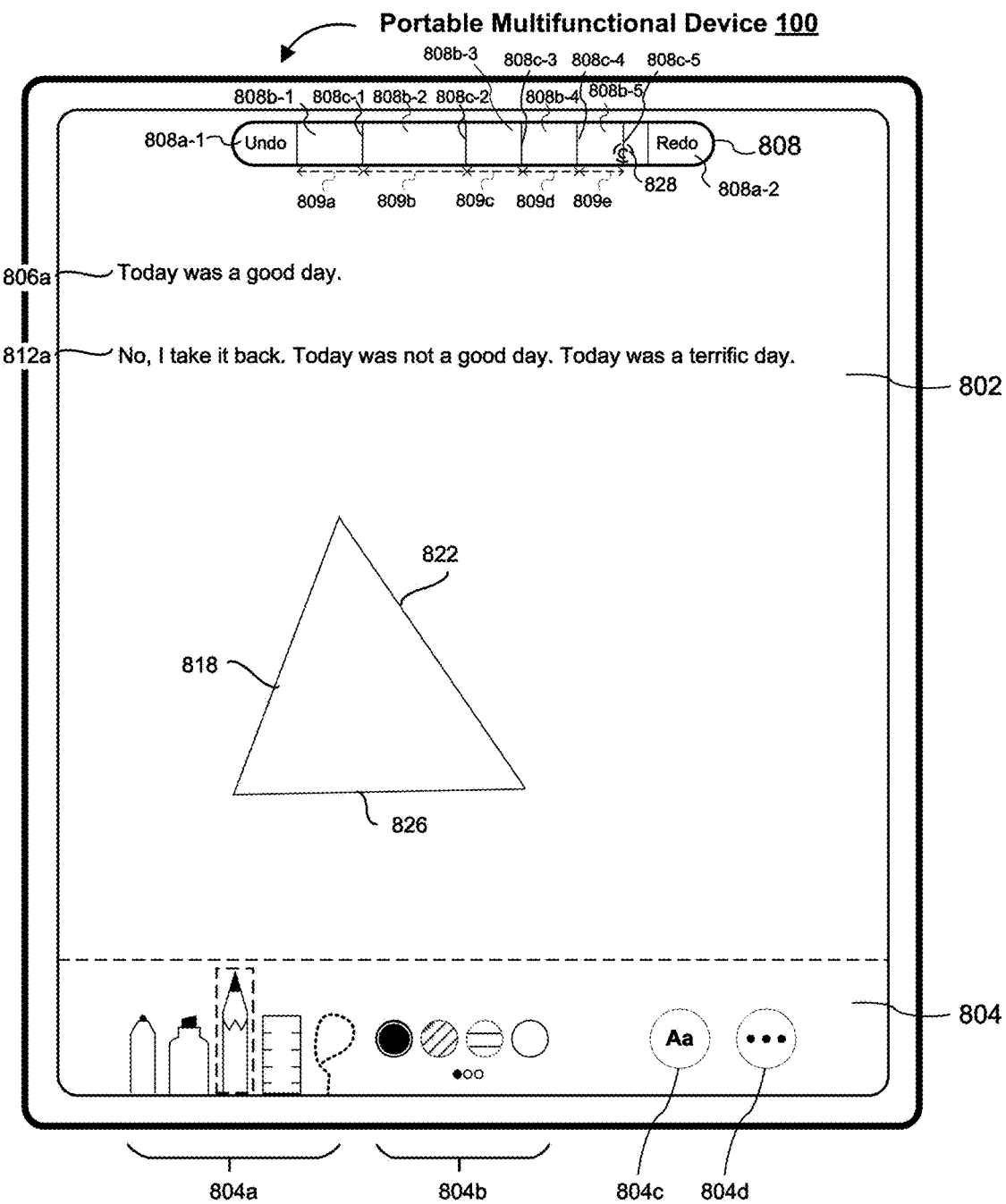
Figure 8O:
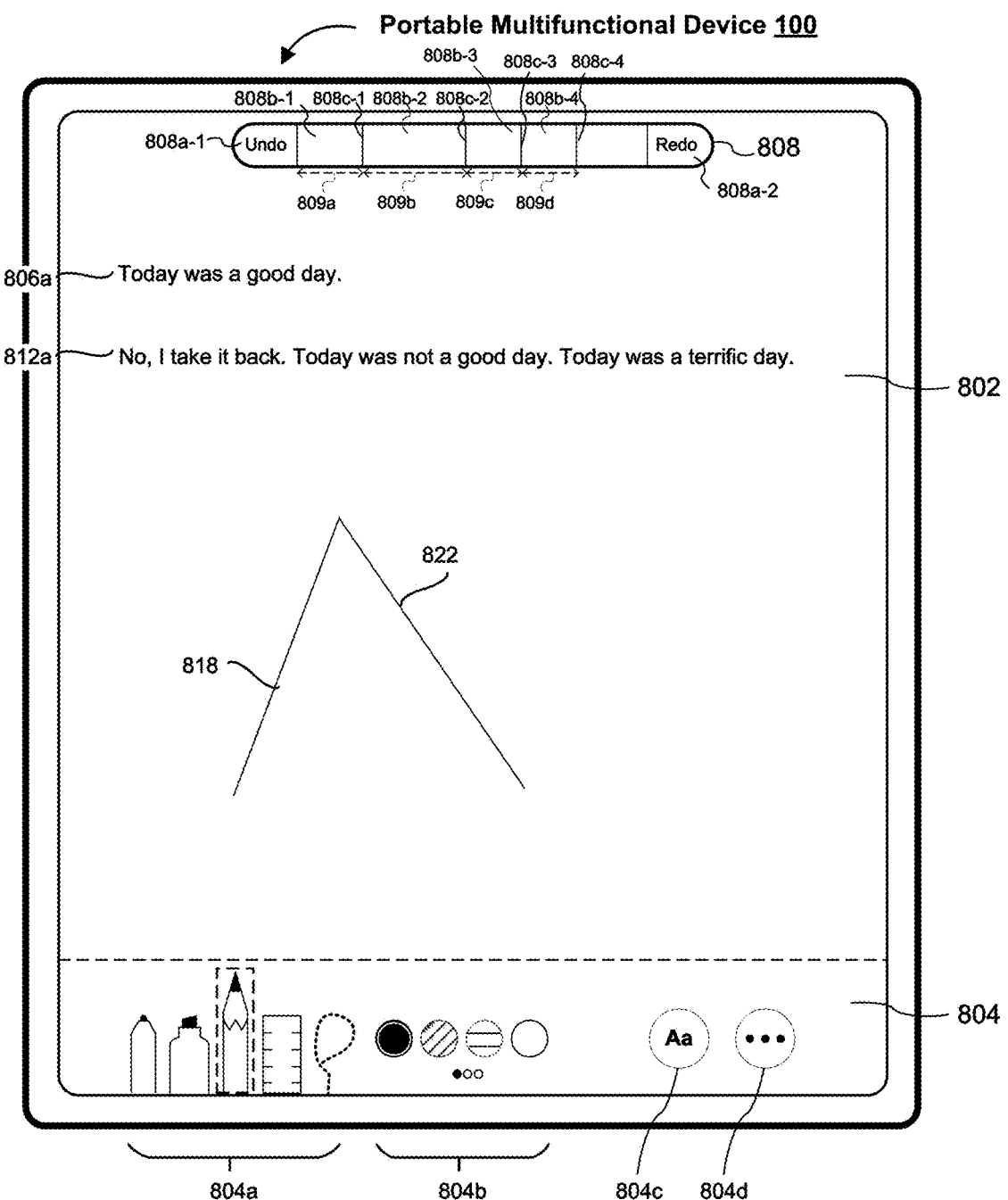

As illustrated in FIG. 8N, the electronic device 100 detects an input 828 directed to the fifth distinct undo affordance 808c-5. In response to detecting the input 828 in FIG. 8N, the electronic device 100, as illustrated in FIG. 8O, performs an undo operation on the third side 826 of the triangle that is associated with the fifth distinct undo affordance 808c-5, without partially undoing any other group of operations associated with the other four distinct undo affordances 808c-1-808c-4. Namely, the electronic device 100 removes the entirety of the third side 826 of the triangle in FIG. 8O. Additionally, the electronic device 100 removes the fifth distinct undo affordance 808c-5 from the scrubber 808 in order to indicate that undoing the third side 826 of the triangle is no longer available.

Figure 8P:
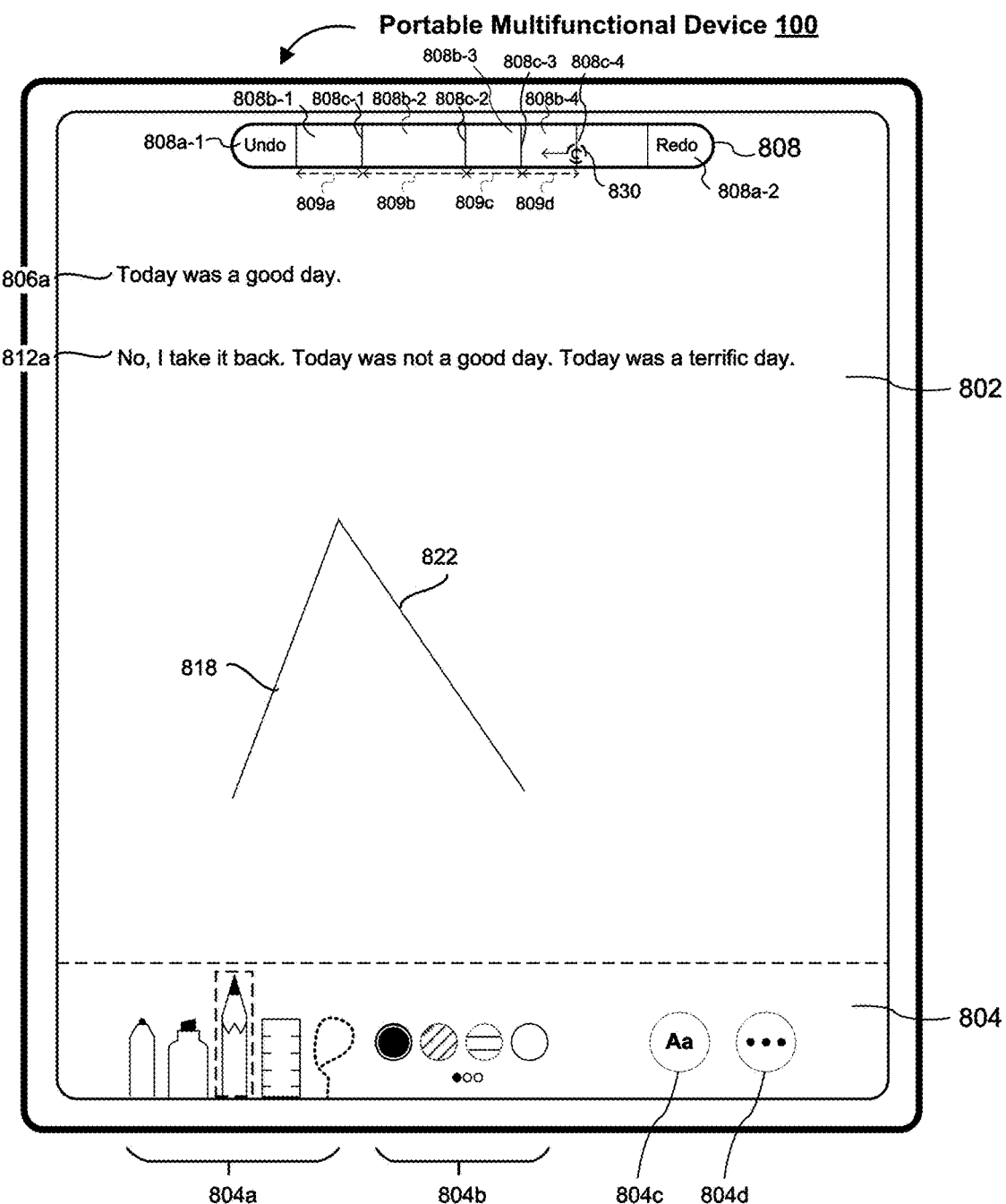
Figure 8Q:
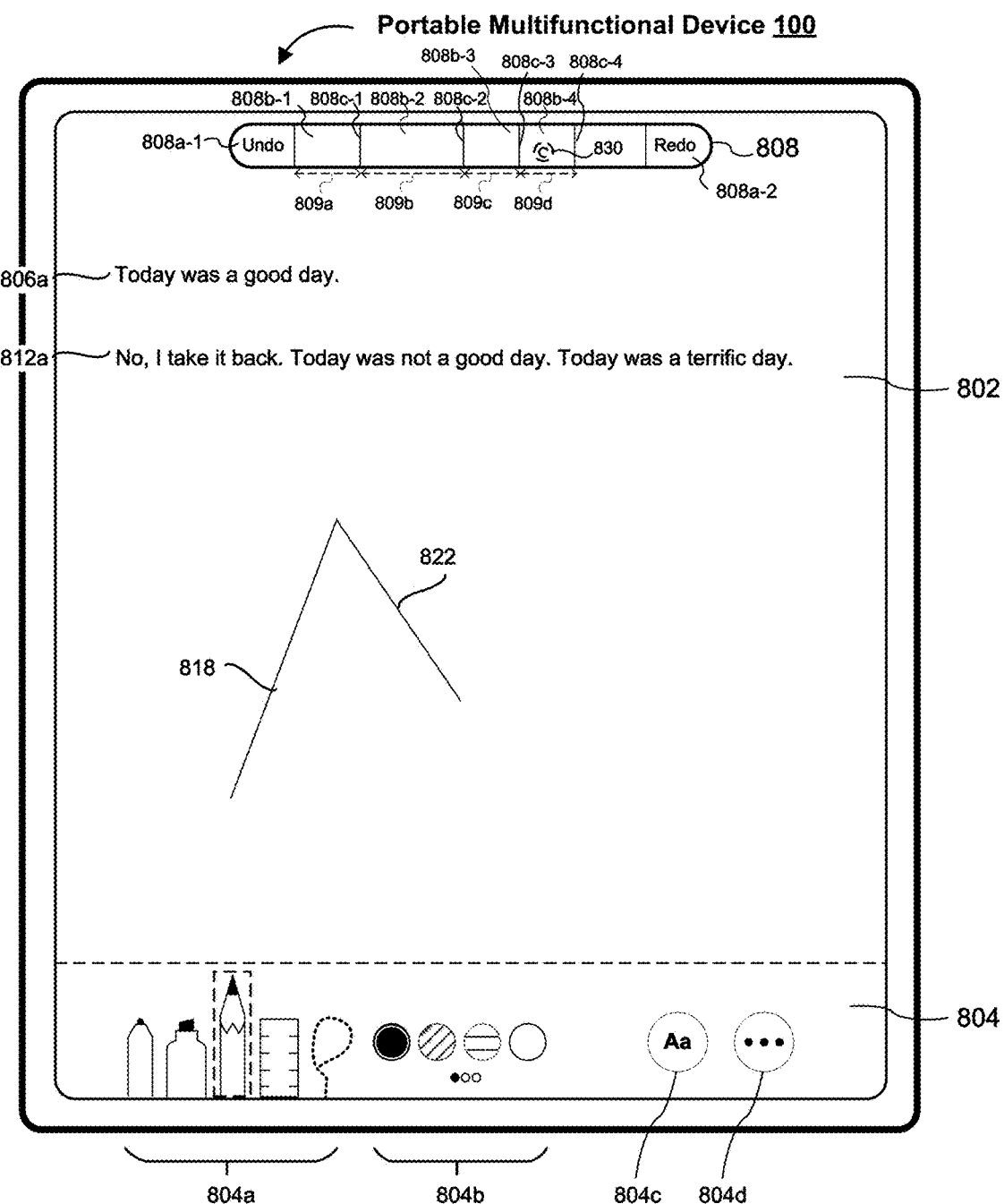
Figure 8R:
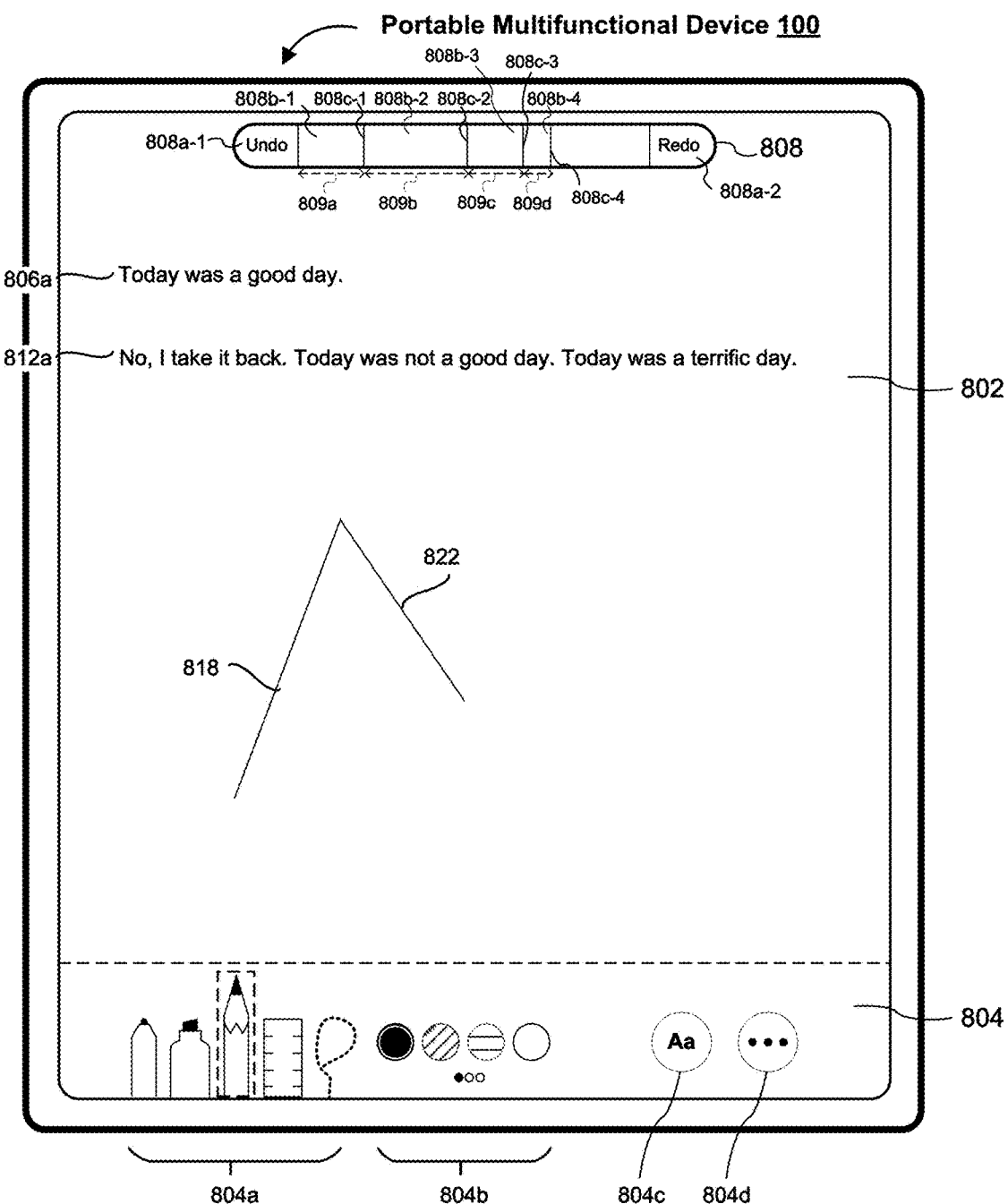

As illustrated in FIG. 8P, the electronic device 100 detects a first gesture 830. The first gesture 830 corresponds to a first movement input across the fourth partial undo operation region 808b-4 towards the third distinct undo affordance 808c-3. In response to detecting the first gesture 830 in FIG. 8P, the electronic device 100 performs an undo operation on a portion of the second side 822 of the triangle based on a magnitude of the first gesture 830, as illustrated in FIG. 8Q. The portion is less than the entirety of the second side 822 of the triangle. Namely, as illustrated in FIG. 8Q, because the magnitude (e.g., the termination point) of the first gesture 830 is approximately halfway across the fourth partial undo operation region 808b-4, the electronic device 100 performs the undo operation on (e.g., removes) approximately half of the second side 822 of the triangle. Moreover, as illustrated in FIG. 8R, in response to detecting completion of the first gesture 830, the electronic device 100 moves the fourth distinct undo affordance 808c-4 to a location that corresponds to the termination point of the first gesture 830. Accordingly, as compared with FIG. 8Q, the fourth distance 809d is shortened in order to indicate the reduced length of the second side 822 of the triangle that resulted from the first gesture 830.

Figure 8S:
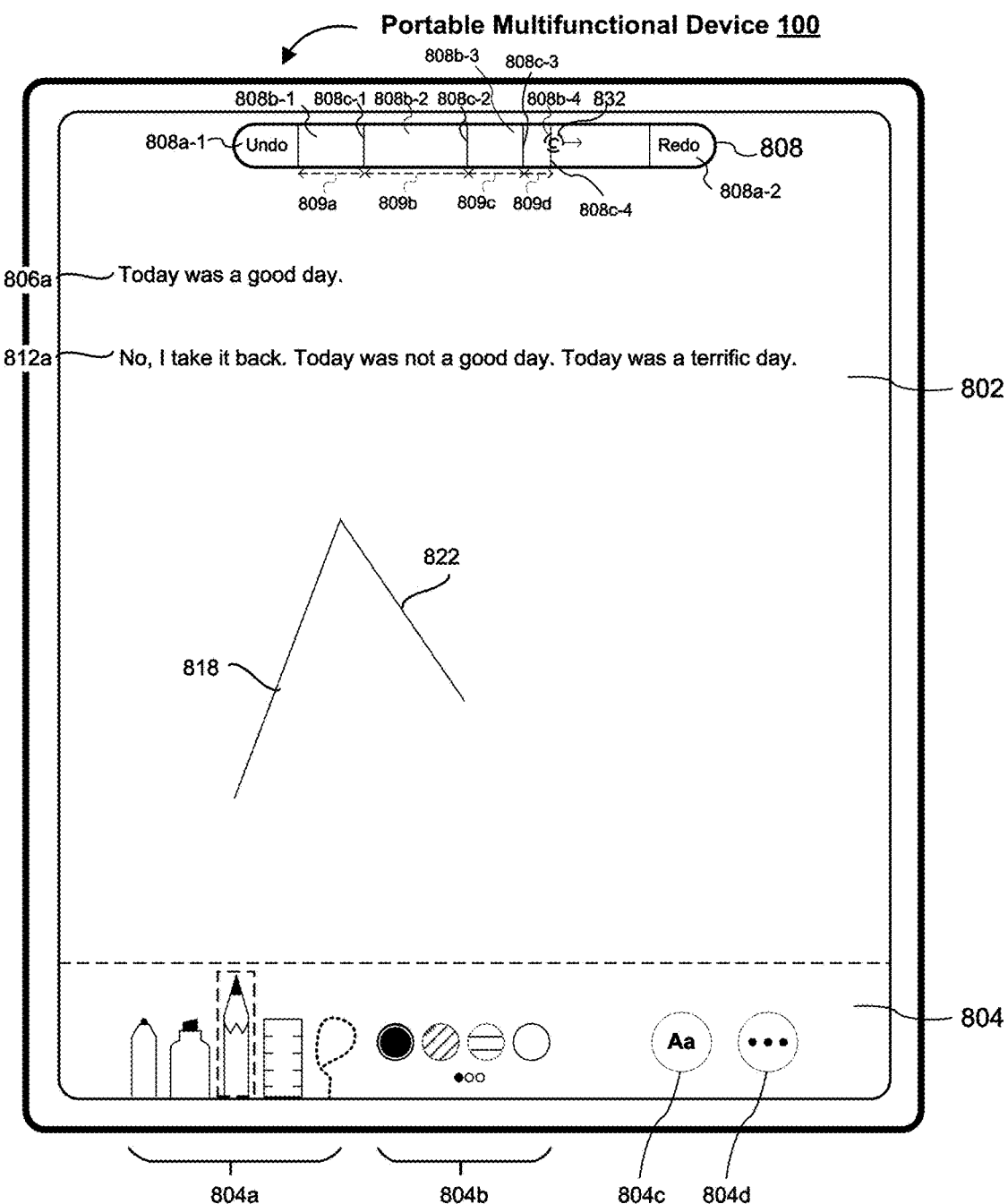
Figure 8T:
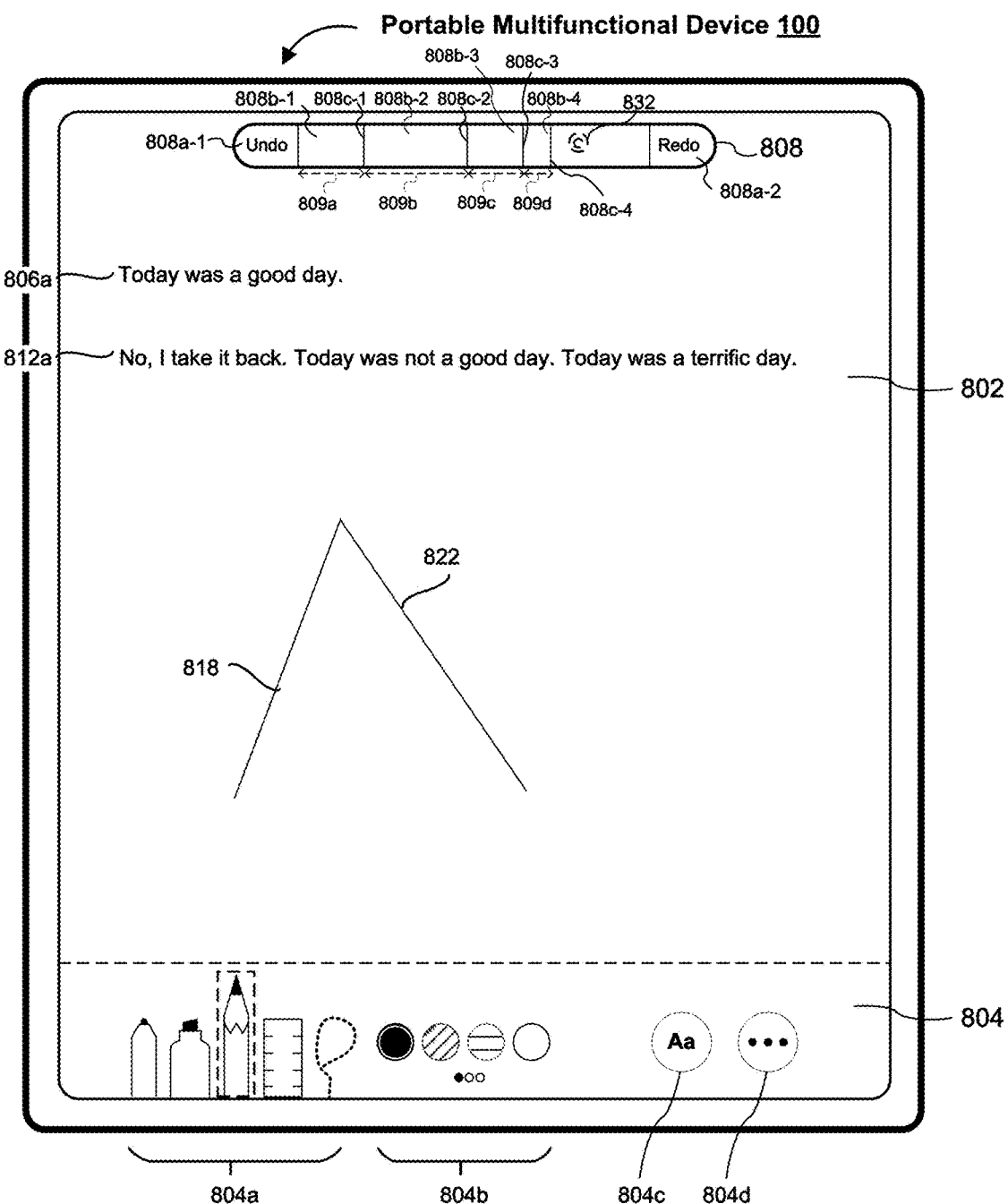
Figure 8U:
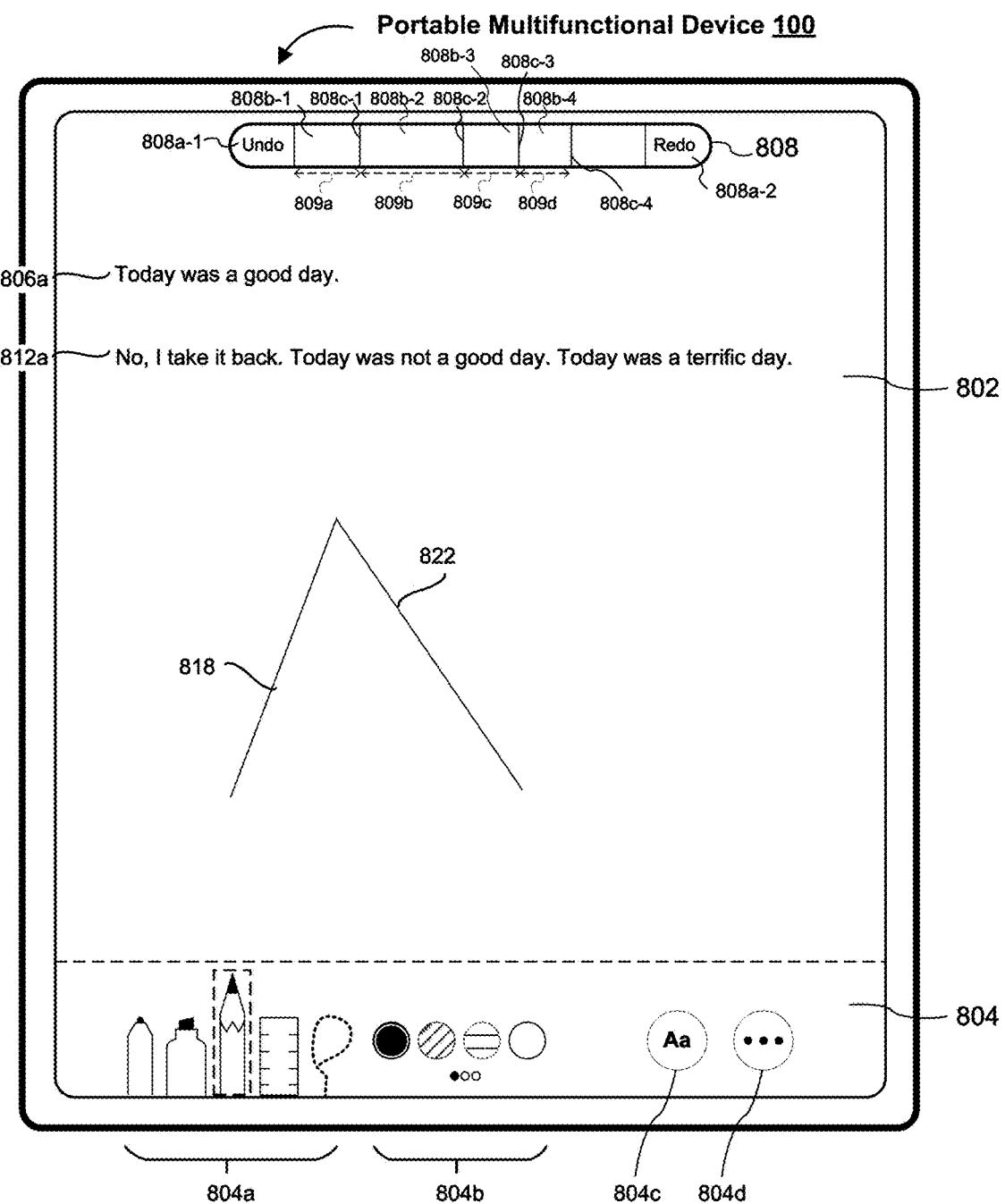

As illustrated in FIG. 8S, the electronic device 100 detects a second gesture 832. The second gesture 832 corresponds to a second movement input away from the fourth distinct undo affordance 808c-4. Notably, in contrast to the first gesture 830 that is leftwards towards the undo last affordance 808a-1, the second gesture 832 is rightwards towards the redo last affordance 808a-2. In response to detecting the second gesture 832 in FIG. 8S, the electronic device 100 performs a redo operation on the previously undone portion of the second side 822 of the triangle, based on a magnitude of the second gesture 832, as illustrated in FIG. 8T. Moreover, as illustrated in FIG. 8U, in response to detecting completion of the second gesture 832, the electronic device 100 moves the fourth distinct undo affordance 808c-4 to a location that corresponds to the termination point of the second gesture 832.

Figure 8V:
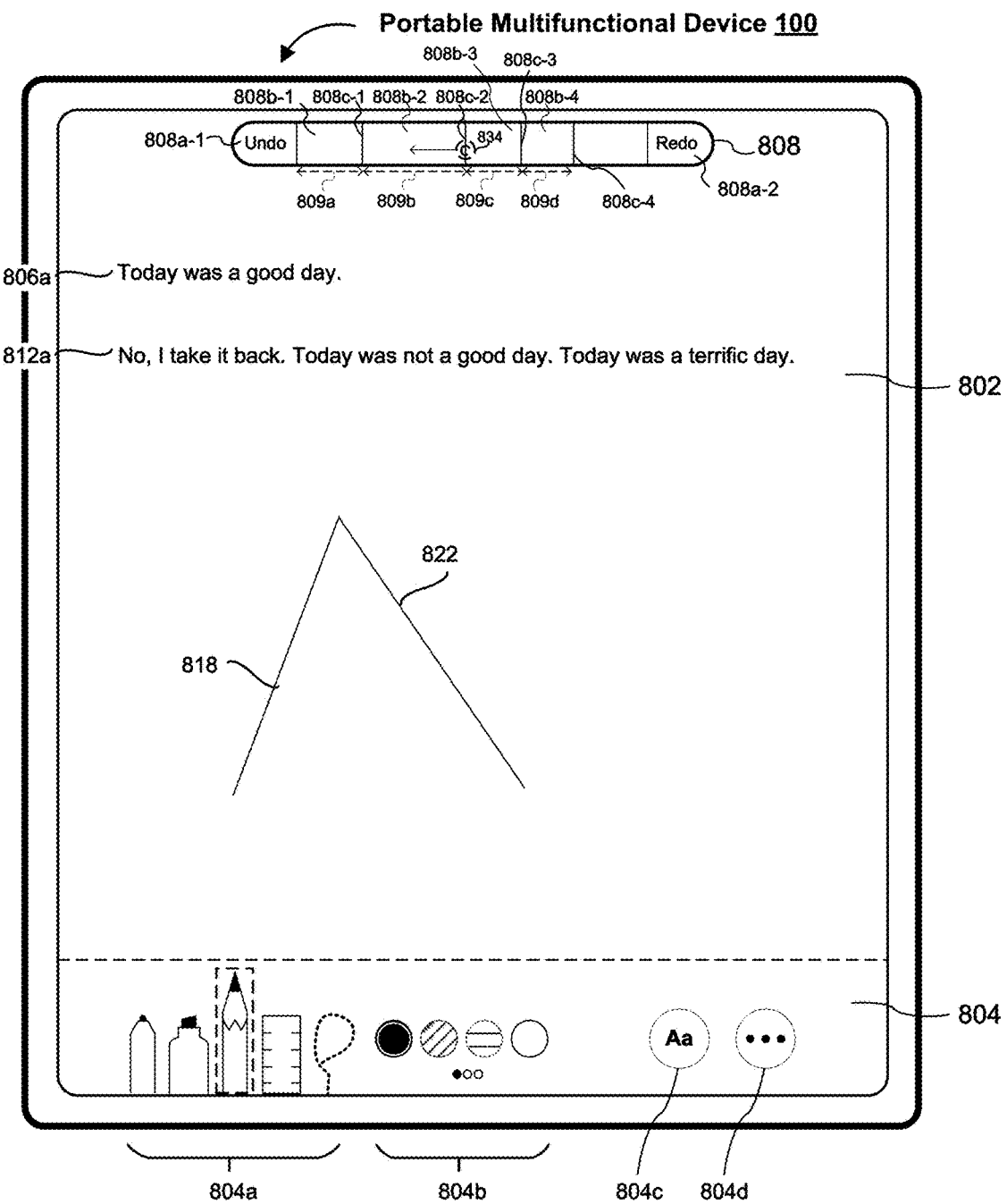
Figure 8W:
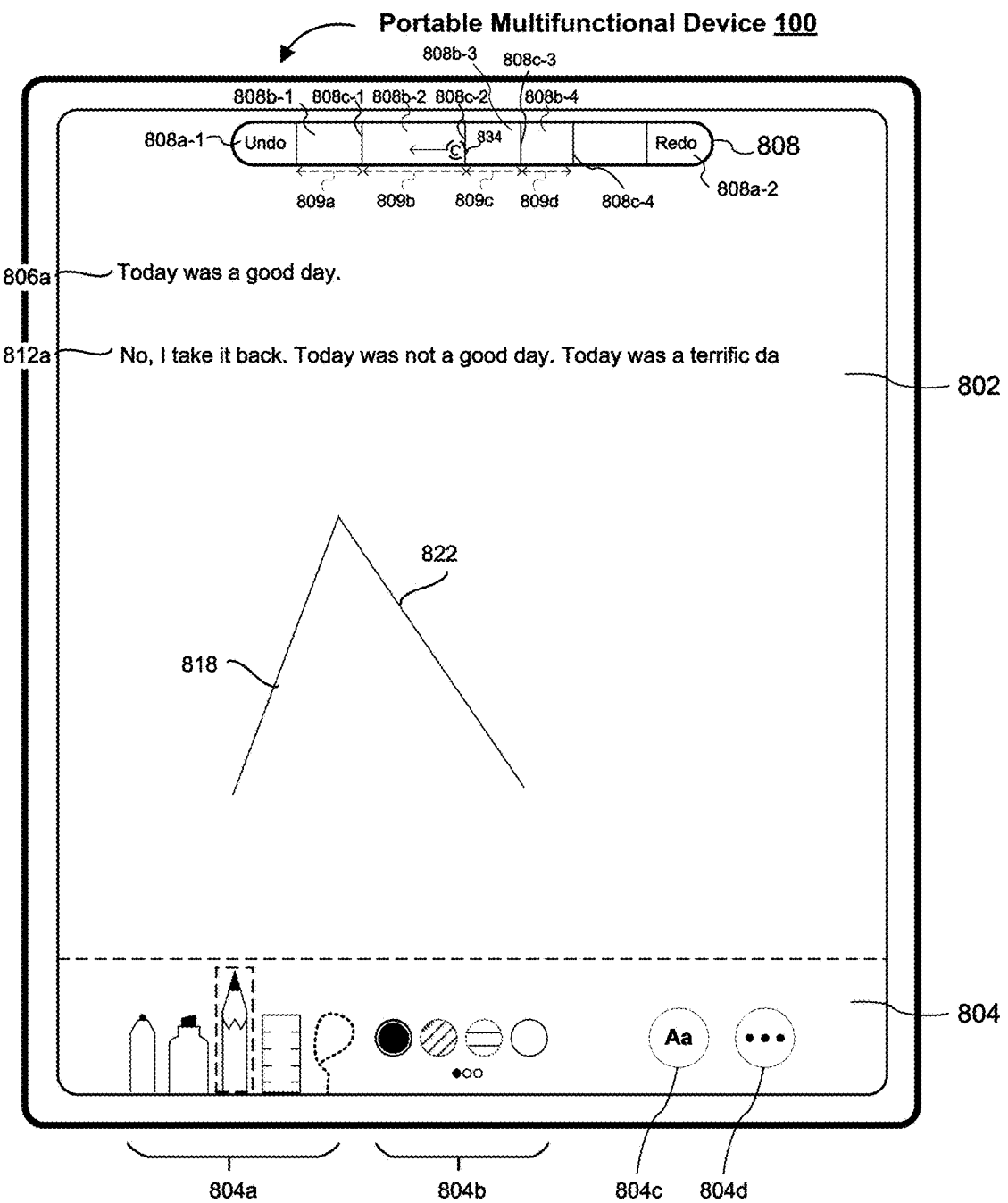
Figure 8X:
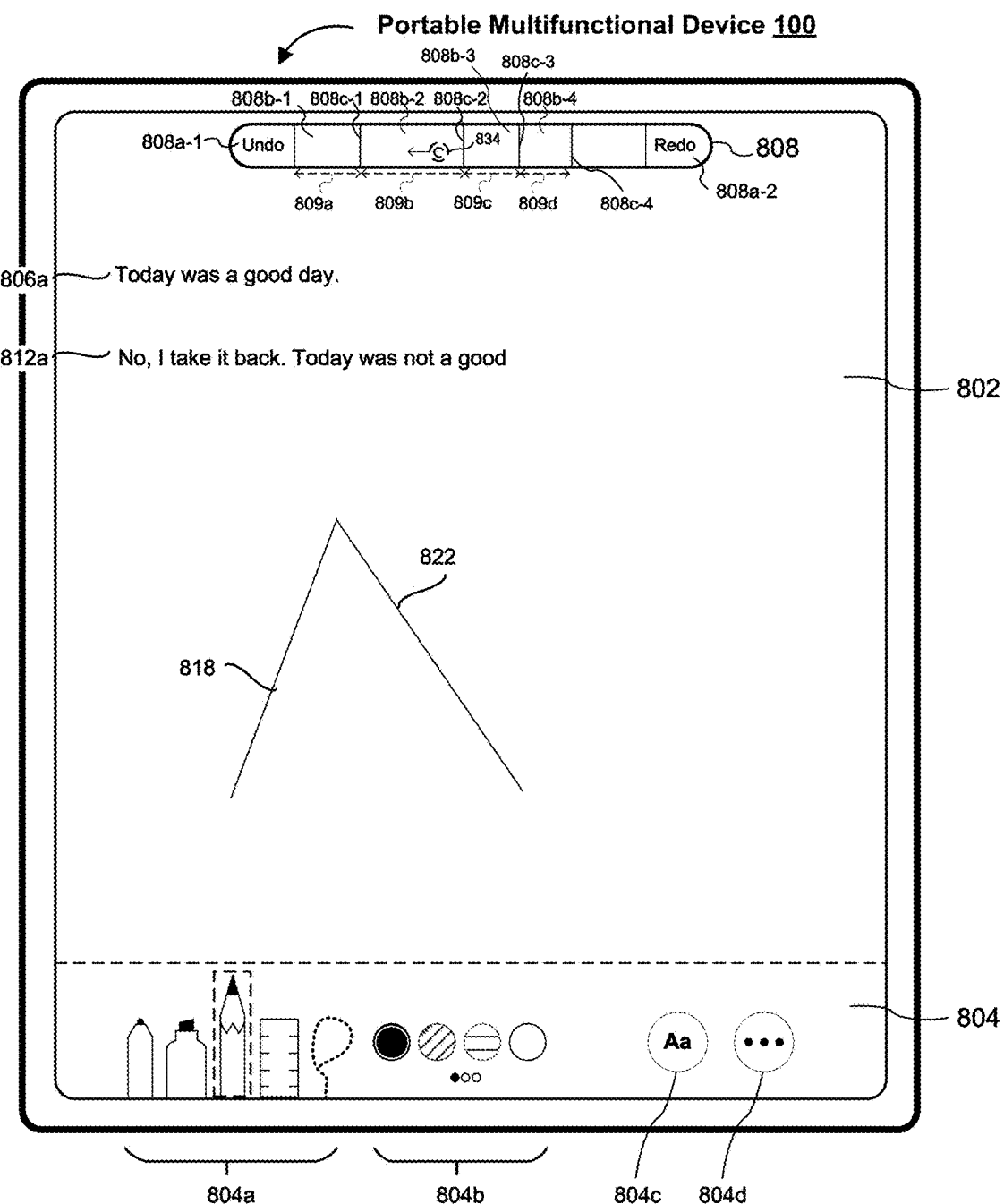
Figure 8Y:
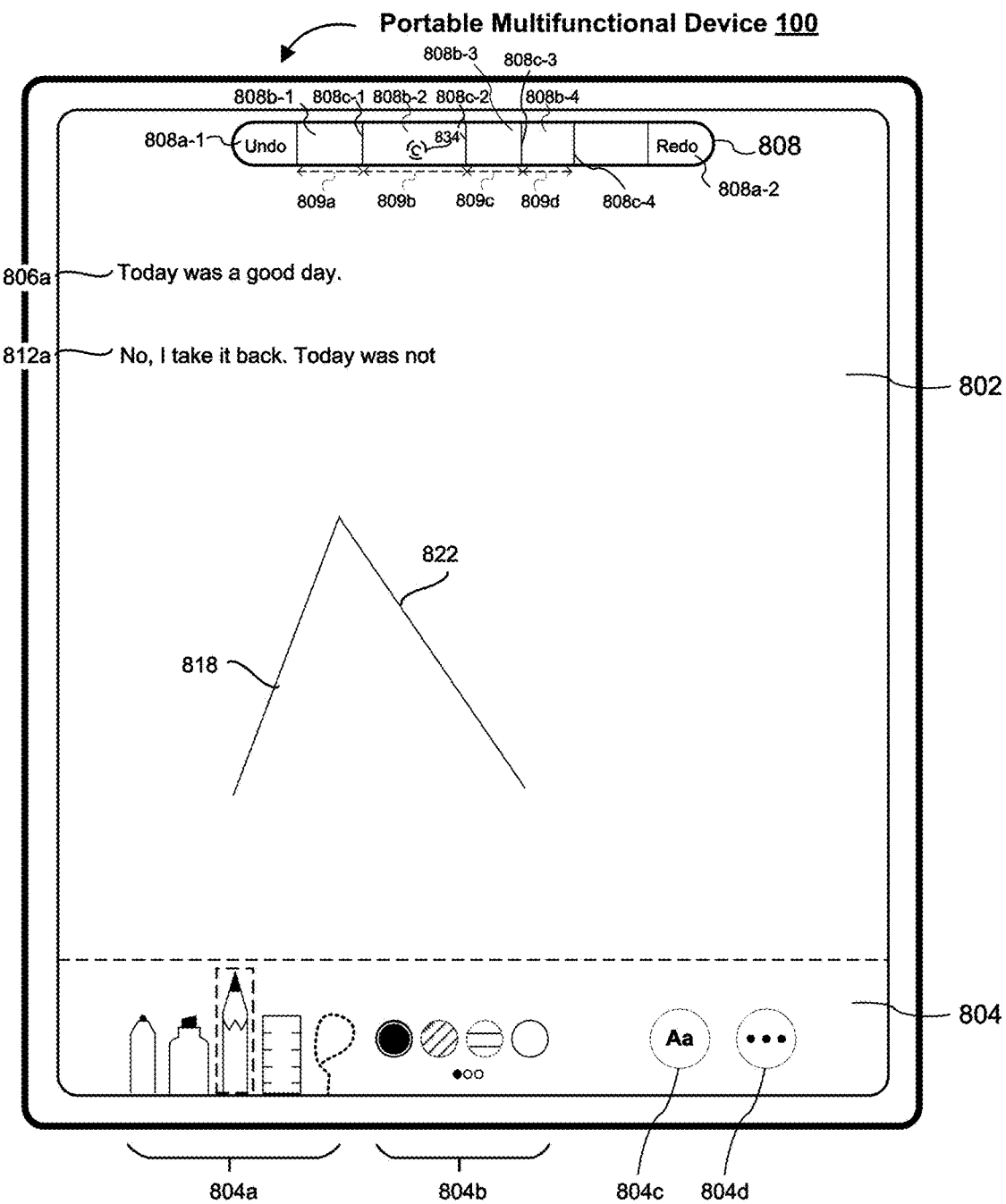

As illustrated in FIG. 8V, the electronic device 100 detects a third gesture 834 in the substantially leftwards direction. The third gesture 834 corresponds to a third movement input across the second partial undo operation region 808b-2 towards the first distinct undo affordance 808c-1. In response to detecting the third gesture 834 in FIG. 8V, the electronic device 100 performs an undo operation on a portion of the second text string 812a based on a magnitude of the third gesture 834. The portion is less than the entirety of the second text string 812a. Namely, as illustrated in FIGS. 8W-8Y, as the third gesture 834 progresses towards its termination point, the electronic device 100 undoes (e.g., removes) progressively more of the second text string 812a. In some embodiments, when the gesture has a relatively low magnitude (e.g., short swipe gesture), the electronic device 100 performs an undo or redo operation on a single character (e.g., letter, number, punctuation mark) of a text string, fewer than all the characters of a particular word of a text string, or fewer than all words in a particular sentence of a text string. In some embodiments, when the gesture has a relatively low magnitude, the electronic device 100 performs an undo or redo operation on less than the entirety of a drawn line. Accordingly, as compared with other electronic devices that perform an undo or redo operations on the entirety of content (e.g., undo or redo a complete sentence, a complete line, etc.), the electronic device 100 disclosed herein provides for greater control with respect to undo and redo operations.

Figure 8Z:
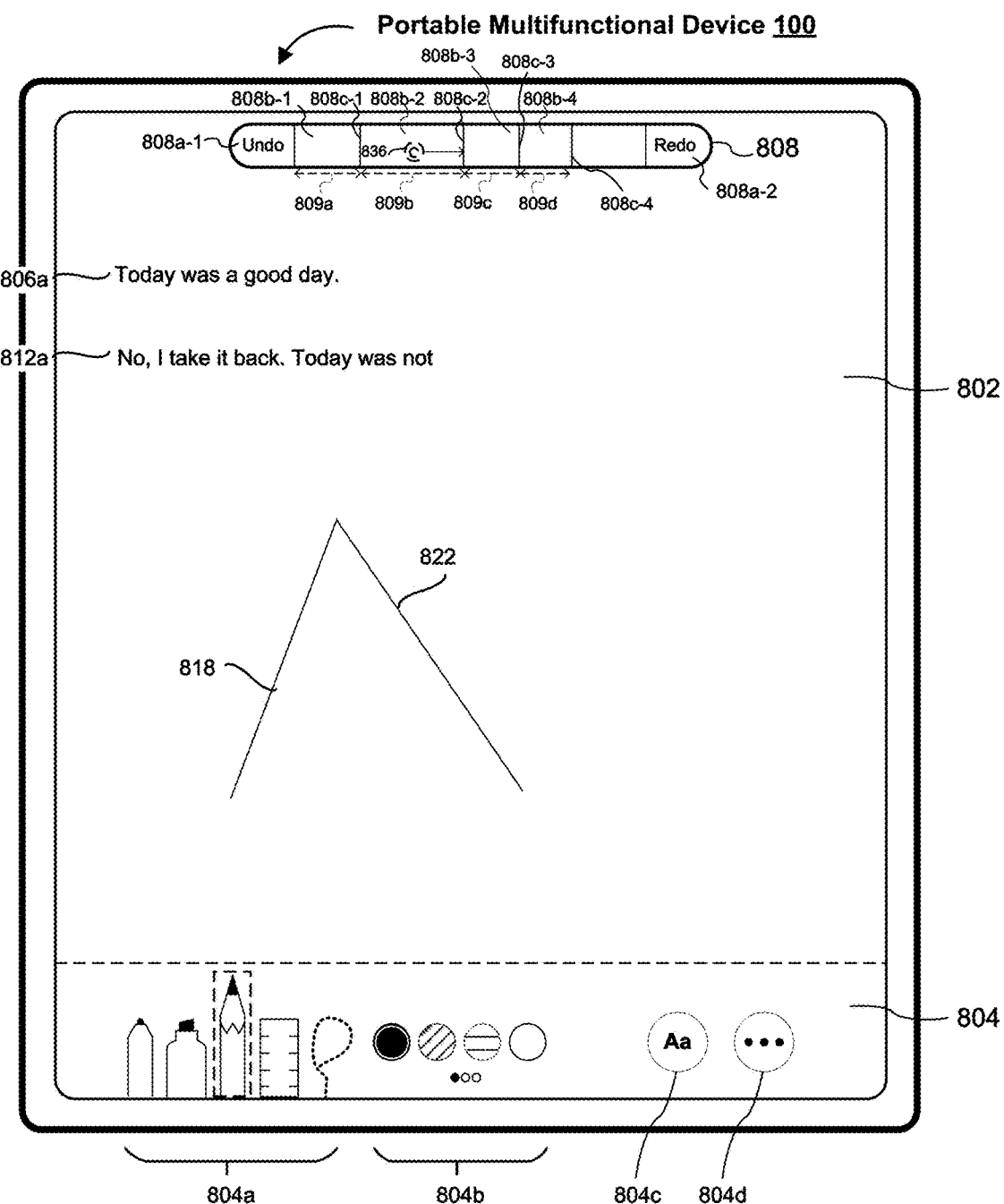
Figure 8A:
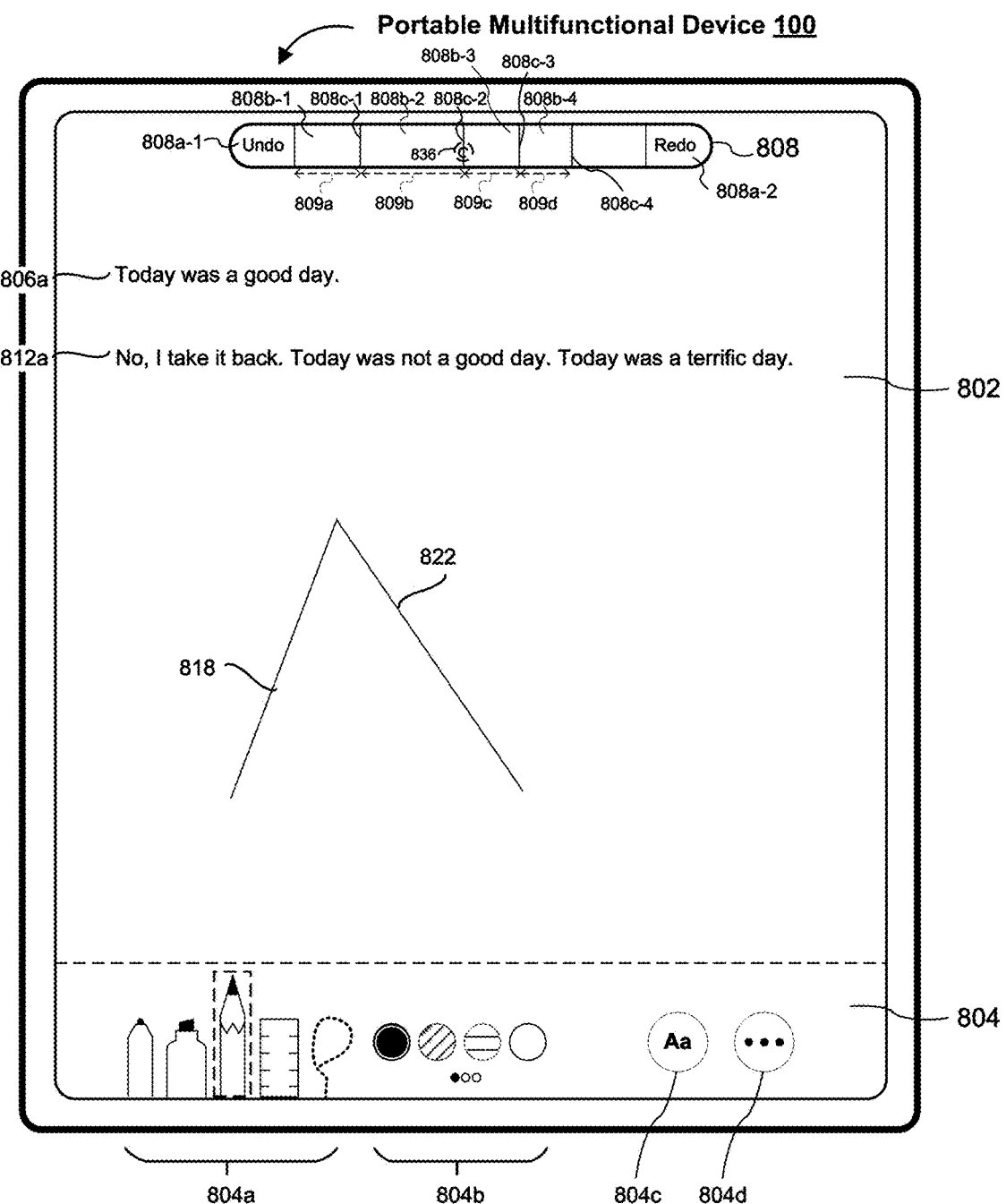
Figure 8A:
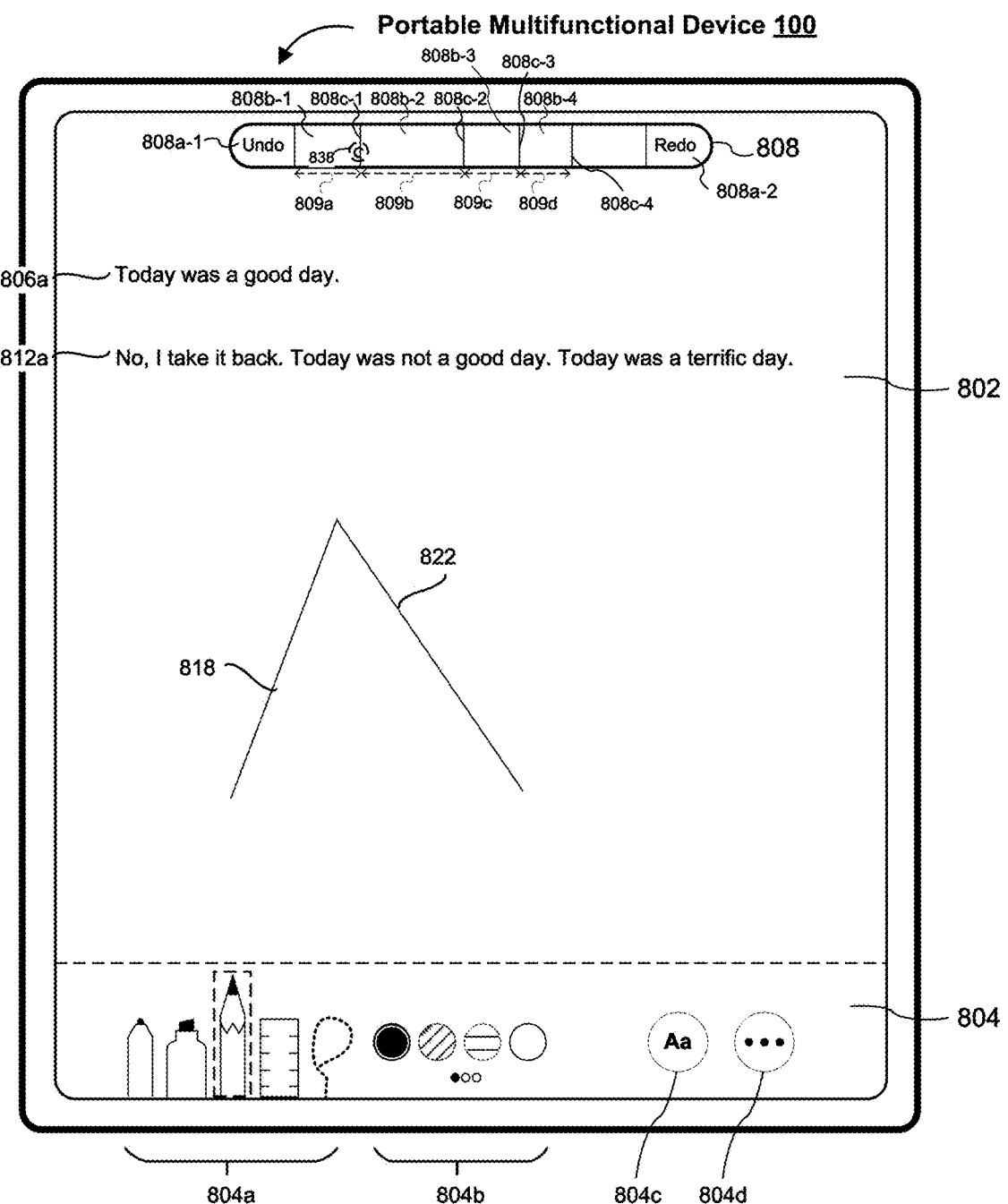
Figure 8A:
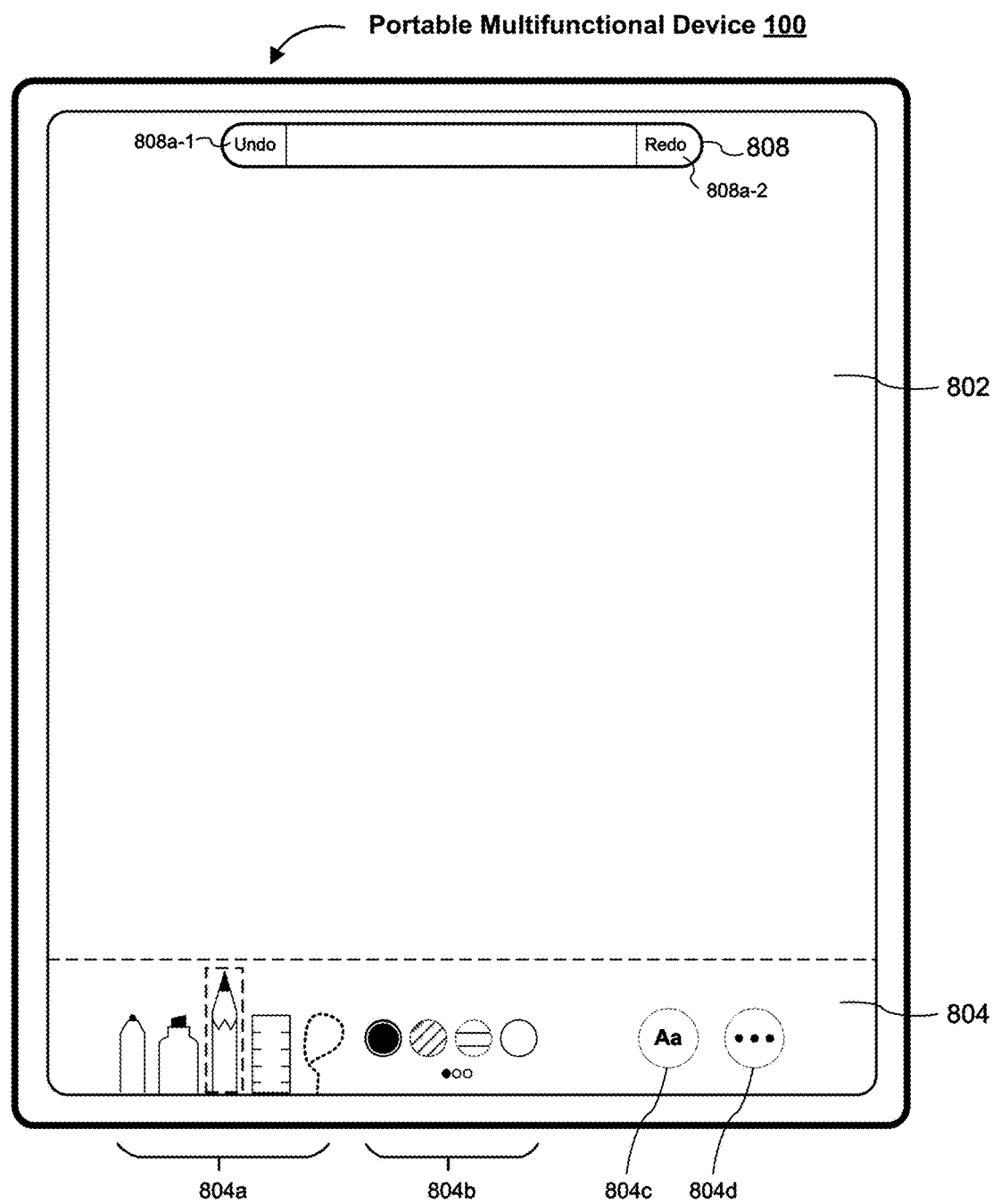
Figure 8A:
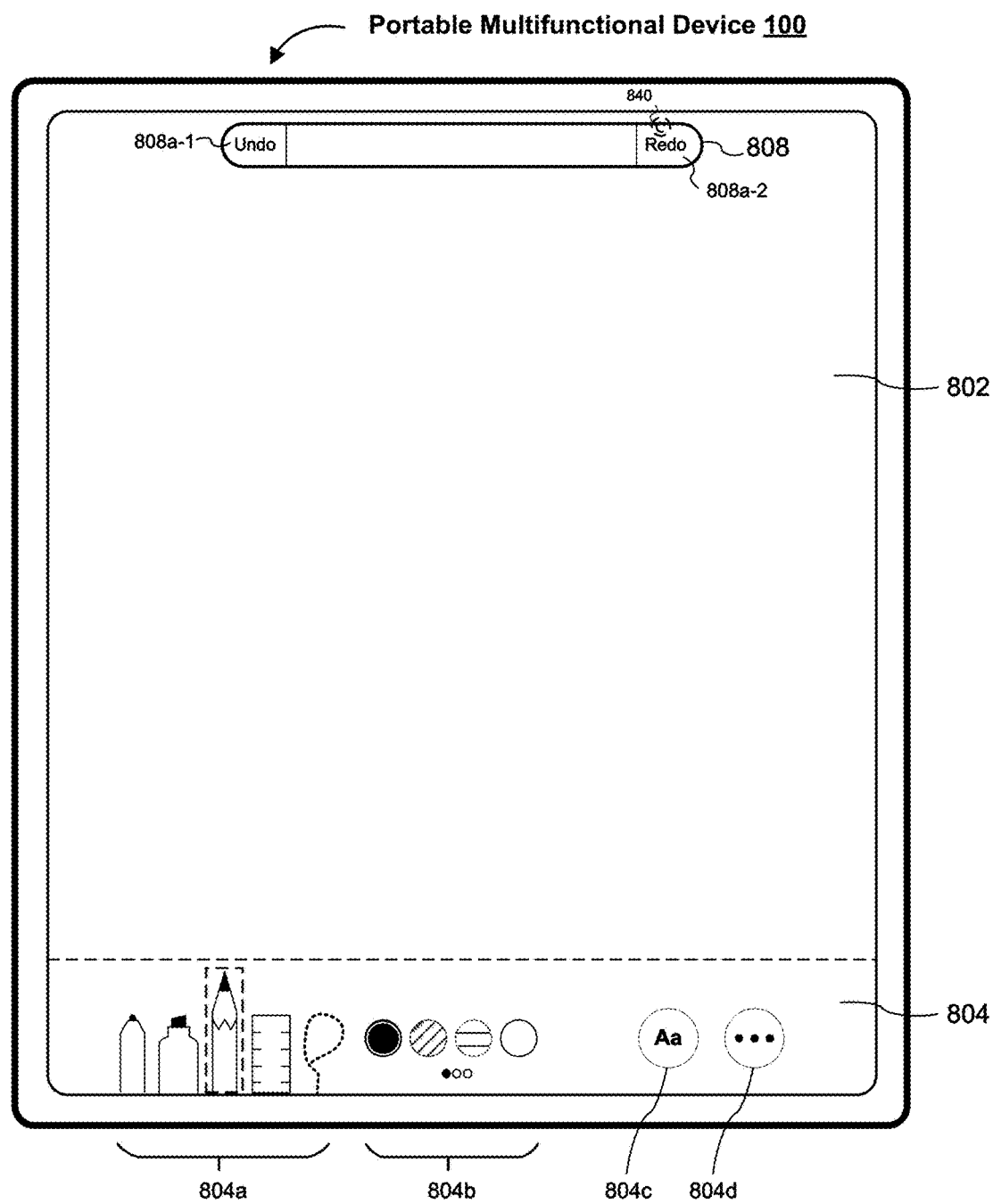
Figure 8A:
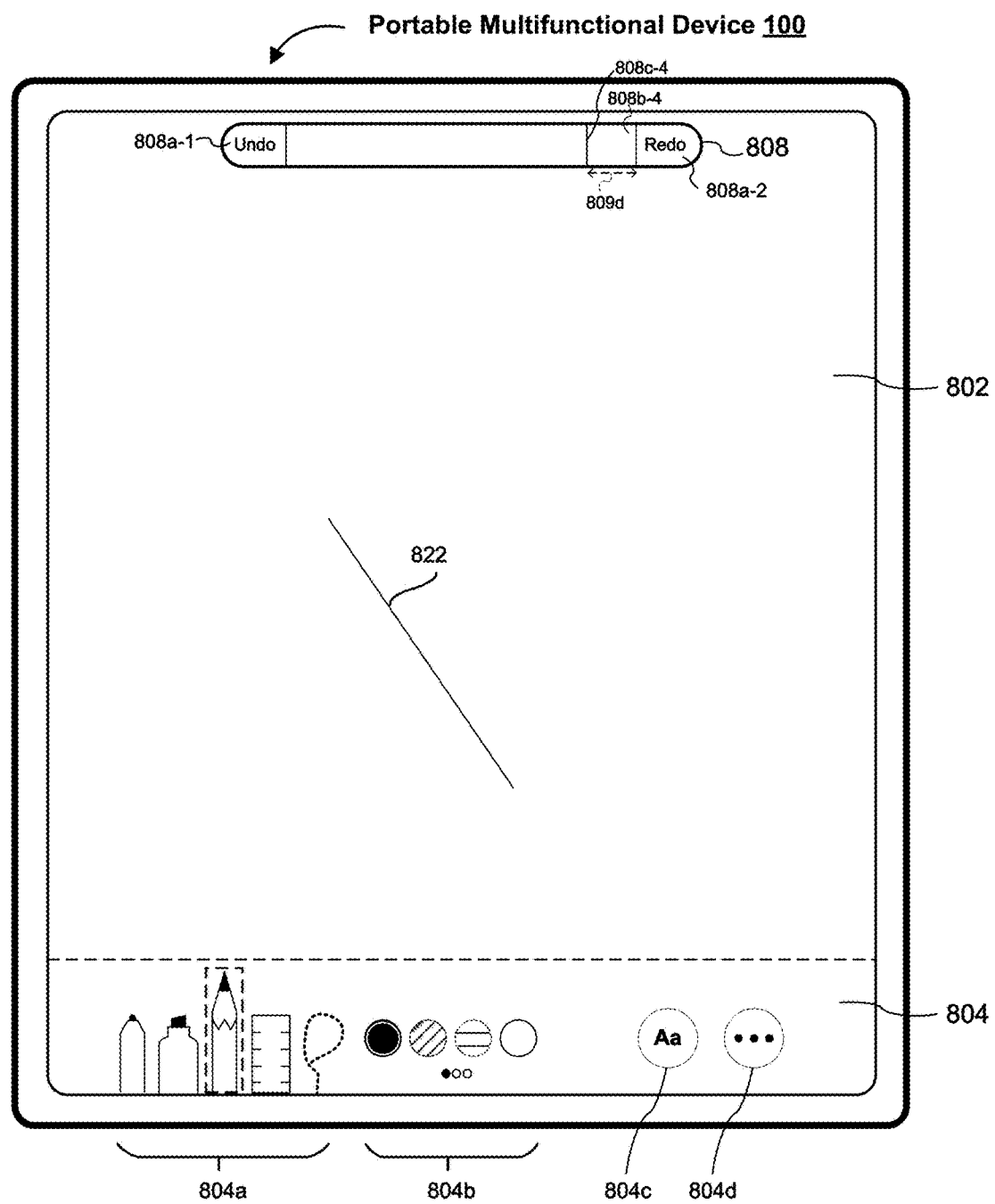
Figure 8A:
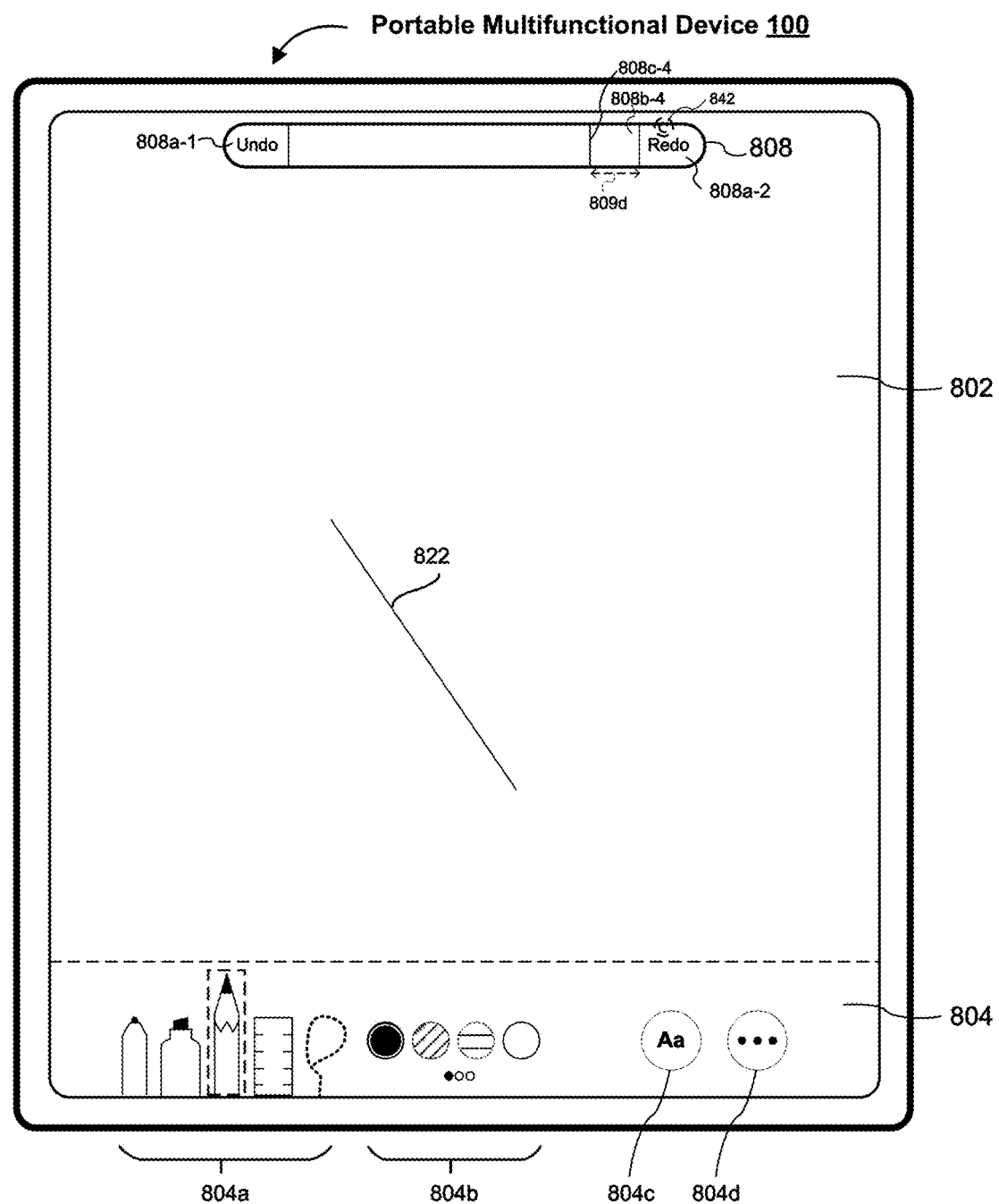
Figure 8A:
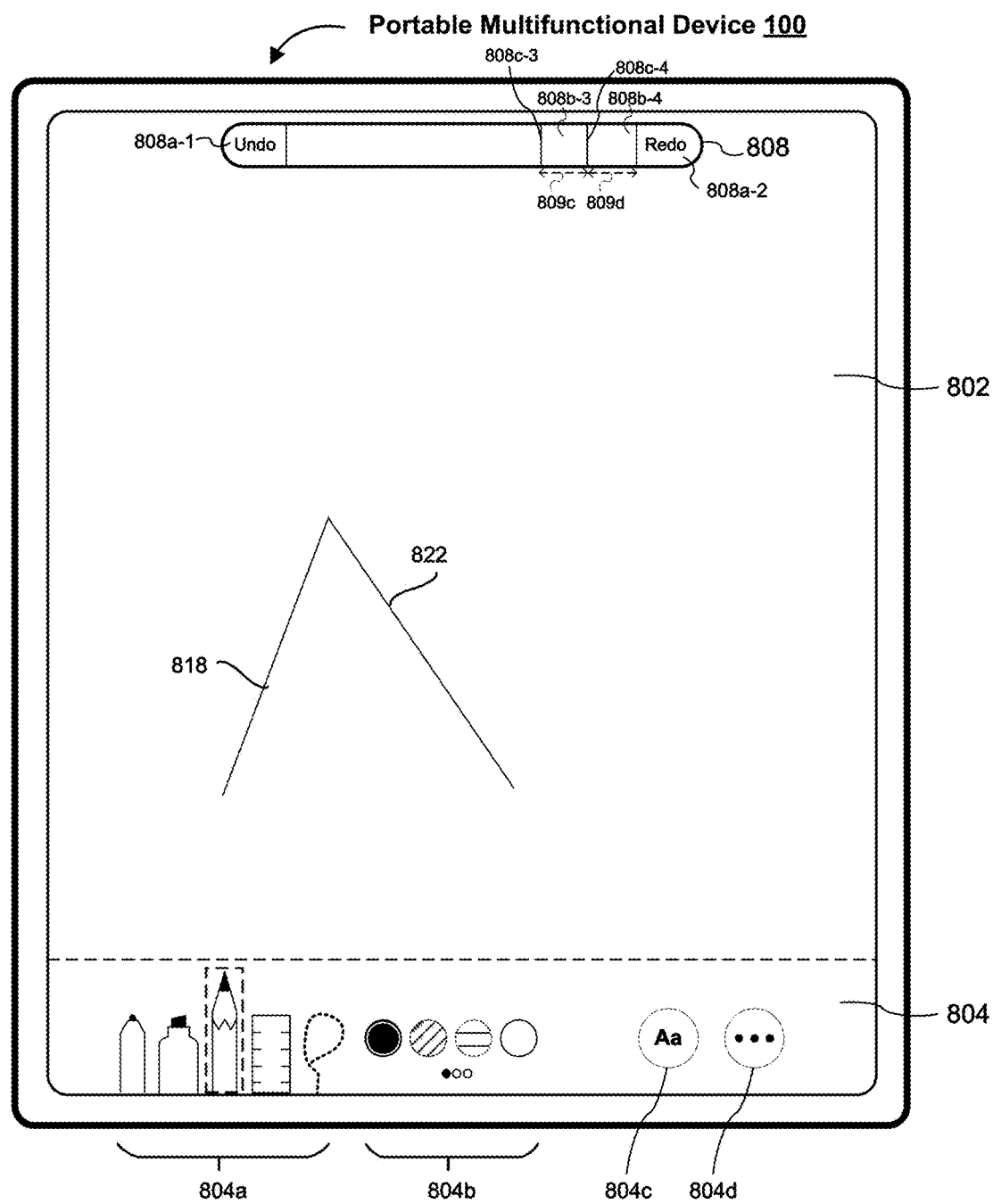
Figure 8A:
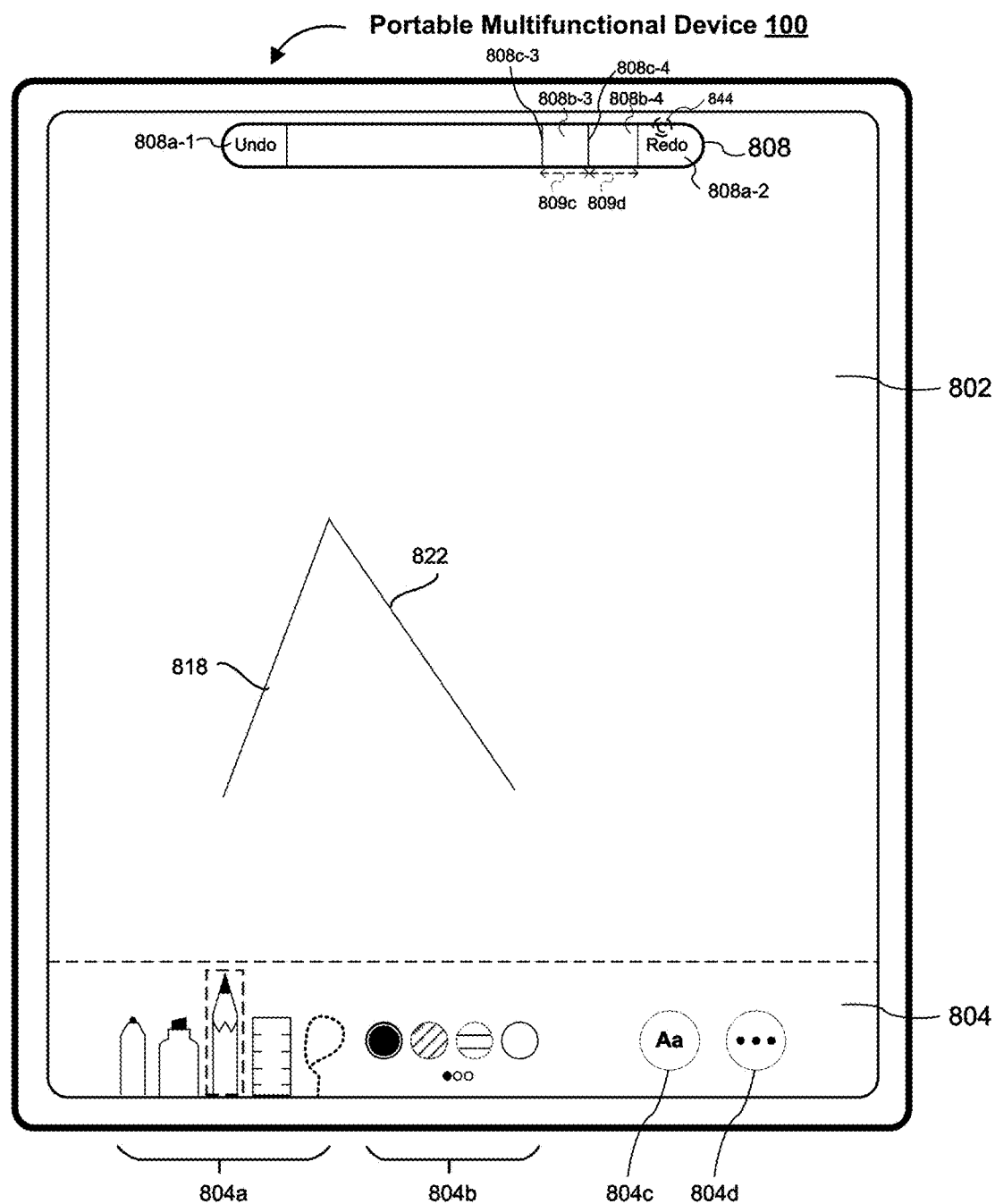
Figure 8A:
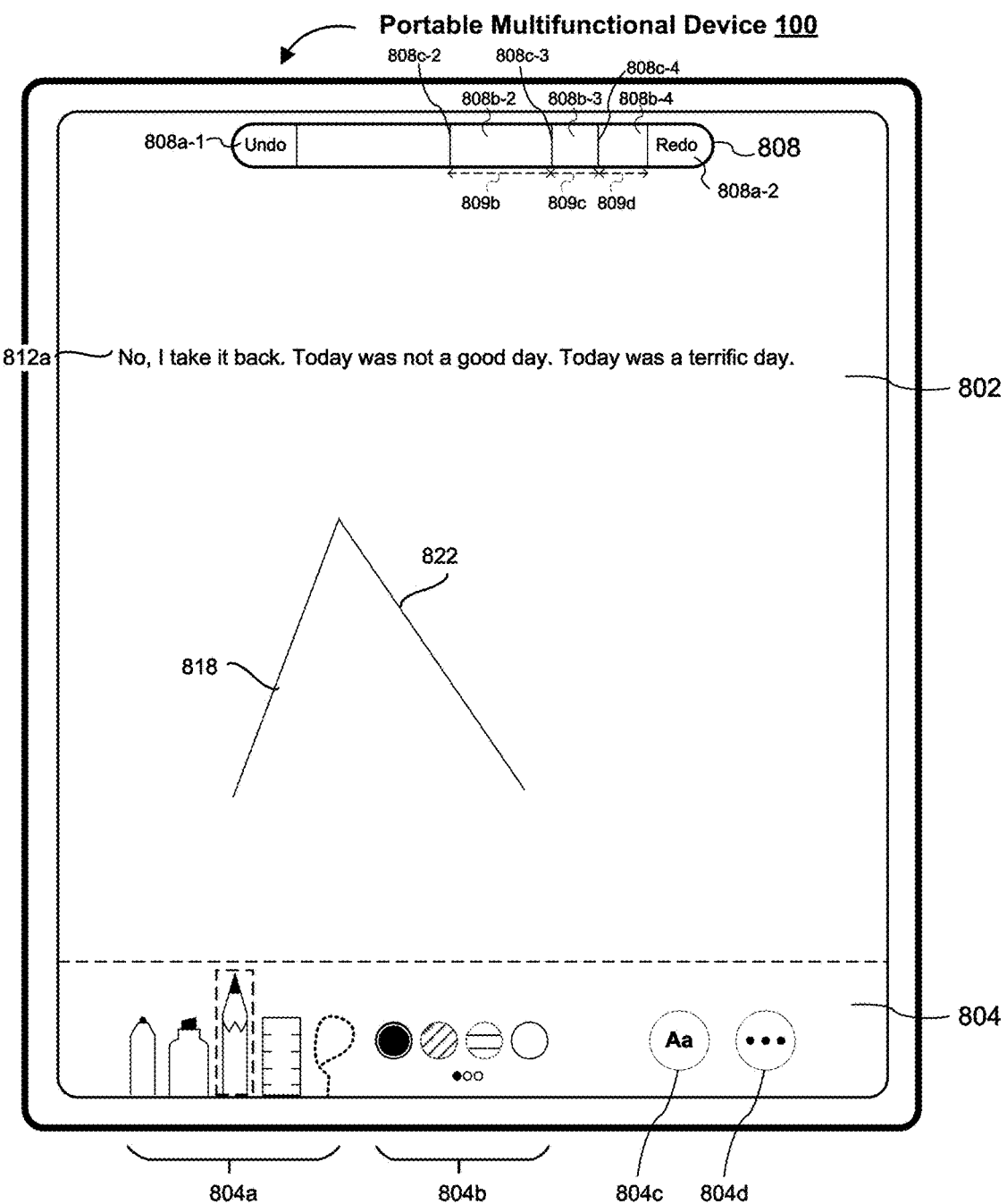
Figure 8A:
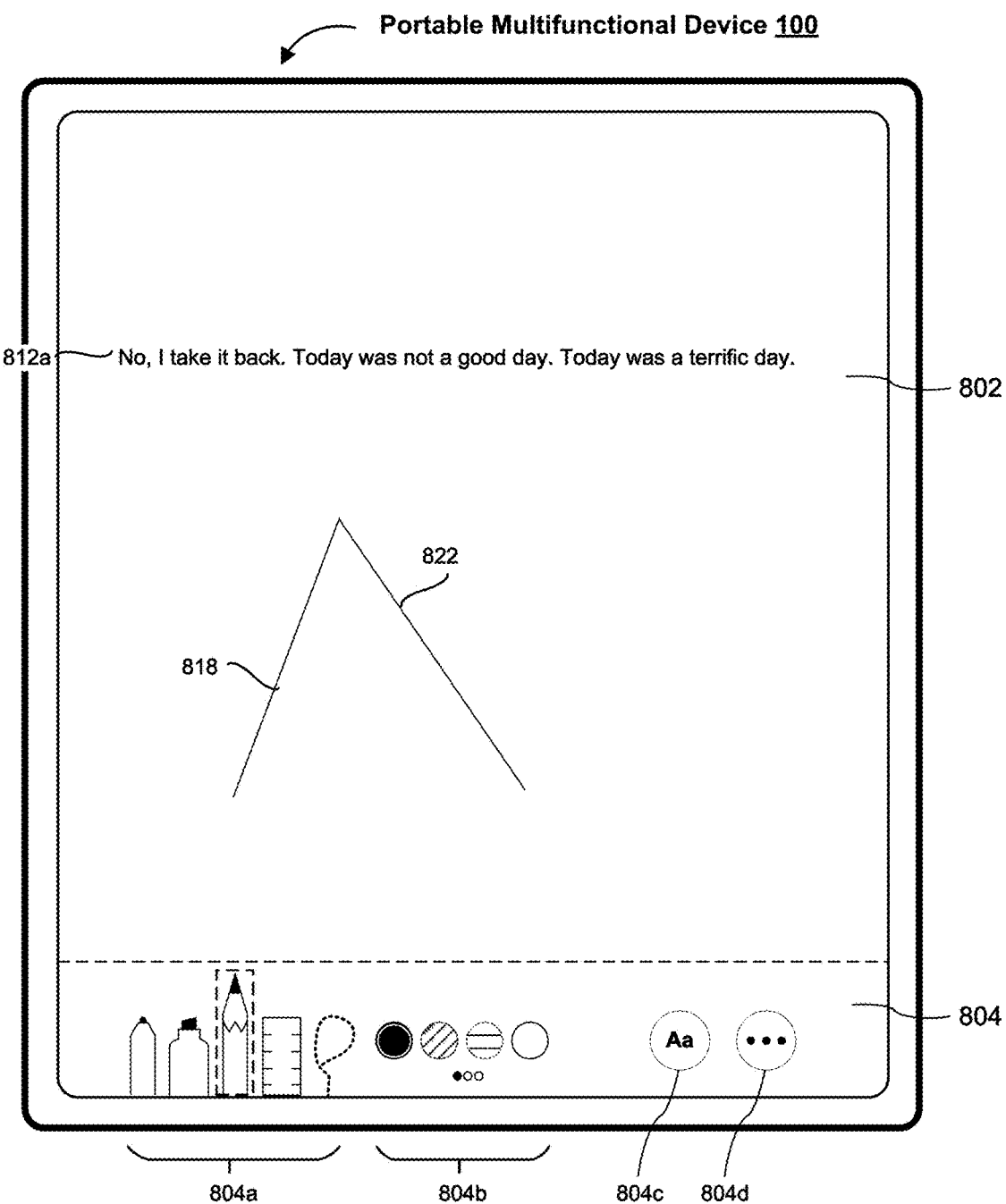

As illustrated in FIG. 8Z, the electronic device 100 detects a fourth gesture 836 without detecting a release of the third gesture 834. The fourth gesture 836 is in the substantially rightwards direction and originates at the termination point of the third gesture 834. In contrast to the example described with reference to FIGS. 8P-8R, because the electronic device 100 does not detect the release of the third gesture 834, the electronic device 100 maintains the location of the second distinct undo affordance 808c-2 that is associated with the second text string 812a. In response to detecting the fourth gesture 836 in FIG. 8Z, the electronic device 100 performs a redo operation on the previously undone portion of the second text string 812a, as illustrated in FIG. 8AA.

As illustrated in FIG. 8AB, the electronic device 100 detects an input 838 directed to the first distinct undo affordance 808c-1. In response to detecting the input 838 in FIG. 8AB, the electronic device 100 performs a complete undo operation on the first text string 806a associated with the first distinct undo affordance 808c-1. Moreover, in some embodiments, the electronic device 100 additionally performs respective complete undo operations on the sets of contents respectively associated with the second distinct undo affordance 808c-2 (e.g., the second text string 812a), the third distinct undo affordance 808c-3 (e.g., the first side 818 of the triangle), and the fourth distinct undo affordance 808c-4 (e.g., the second side 822 of the triangle). Accordingly, as illustrated in FIG. 8AC, the electronic device 100 performs an undo operation on (e.g., removes) all the content on the display.

As illustrated in FIGS. 8AD-8AI, in response to detecting successive inputs directed to the redo last affordance 808a-2, the electronic device 100 performs successive complete redo operations. As illustrated in FIG. 8AD, the electronic device 100 detects a first input 840 directed to the redo last affordance 808a-2. In response to detecting the first input 840 in FIG. 8AD, the electronic device 100 performs a redo operation on (e.g., displays) the second side 822 of the triangle in FIG. 8AE. Moreover, the electronic device 100 adds, to the scrubber 808, the fourth distinct undo affordance 808c-4 that is associated with the second side 822 of the triangle. The fourth distinct undo affordance 808c-4 and the redo last undo affordance 808a-2 are separated by the fourth partial undo operation region 808b-4. The fourth partial undo operation region 808b-4 is associated with the fourth distance 809d that is indicative of the scope (e.g., magnitude) of the second side 822 of the triangle.

As illustrated in FIG. 8AF, the electronic device 100 detects a second input 842 directed to the redo last affordance 808a-2. In response to detecting the second input 842 in FIG. 8AF, the electronic device 100 performs a redo operation on (e.g., displays) the first side 818 of the triangle in FIG. 8AG. Moreover, the electronic device 100 adds, to the scrubber 808, the third distinct undo affordance 808c-3 that is associated with the first side 818 of the triangle. The third distinct undo affordance 808c-3 and the fourth distinct undo affordance 808c-4 are separated by the third partial undo operation region 808b-3. The third partial undo operation region 808b-3 is associated with the third distance 809c that is indicative of the scope (e.g., magnitude) of the first side 818 of the triangle.

As illustrated in FIG. 8AH, the electronic device 100 detects a third input 844 directed to the redo last affordance 808a-2. In response to detecting the third input 844 in FIG. 8AH, the electronic device 100 performs a redo operation on (e.g., displays) the second text string 812a in FIG. 8AI. Moreover, the electronic device 100 adds, to the scrubber 808, the second distinct undo affordance 808c-2 that is associated with the second text string 812a. The second distinct undo affordance 808c-2 and the third distinct undo affordance 808c-3 are separated by the second partial undo operation region 808b-2. The second partial undo operation region 808b-2 is associated with the second distance 809b that is indicative of the scope (e.g., magnitude) of the second text string 812a. Moreover, as illustrated in FIG. 8AJ, in some embodiments, the electronic device 100 ceases to display the scrubber 808 after not detecting an input to the scrubber 808 for a threshold amount of time.

FIGS. 9A-9K are examples of user interfaces for performing partial and complete undo/redo operations based on multi-finger gestures in accordance with some embodiments. The user interfaces in these figures are used to illustrate the processes described below, including the processes in FIGS. 11A-11C. Although some of the examples which follow will be given with reference to inputs on a touch-screen display (where the touch-sensitive surface and the display are combined, for example on touch screen 112), in some embodiments, the electronic device 100 detects inputs on touch-sensitive surface 651 that is separate from display 650, as shown in FIG. 6B.

Figure 9A:
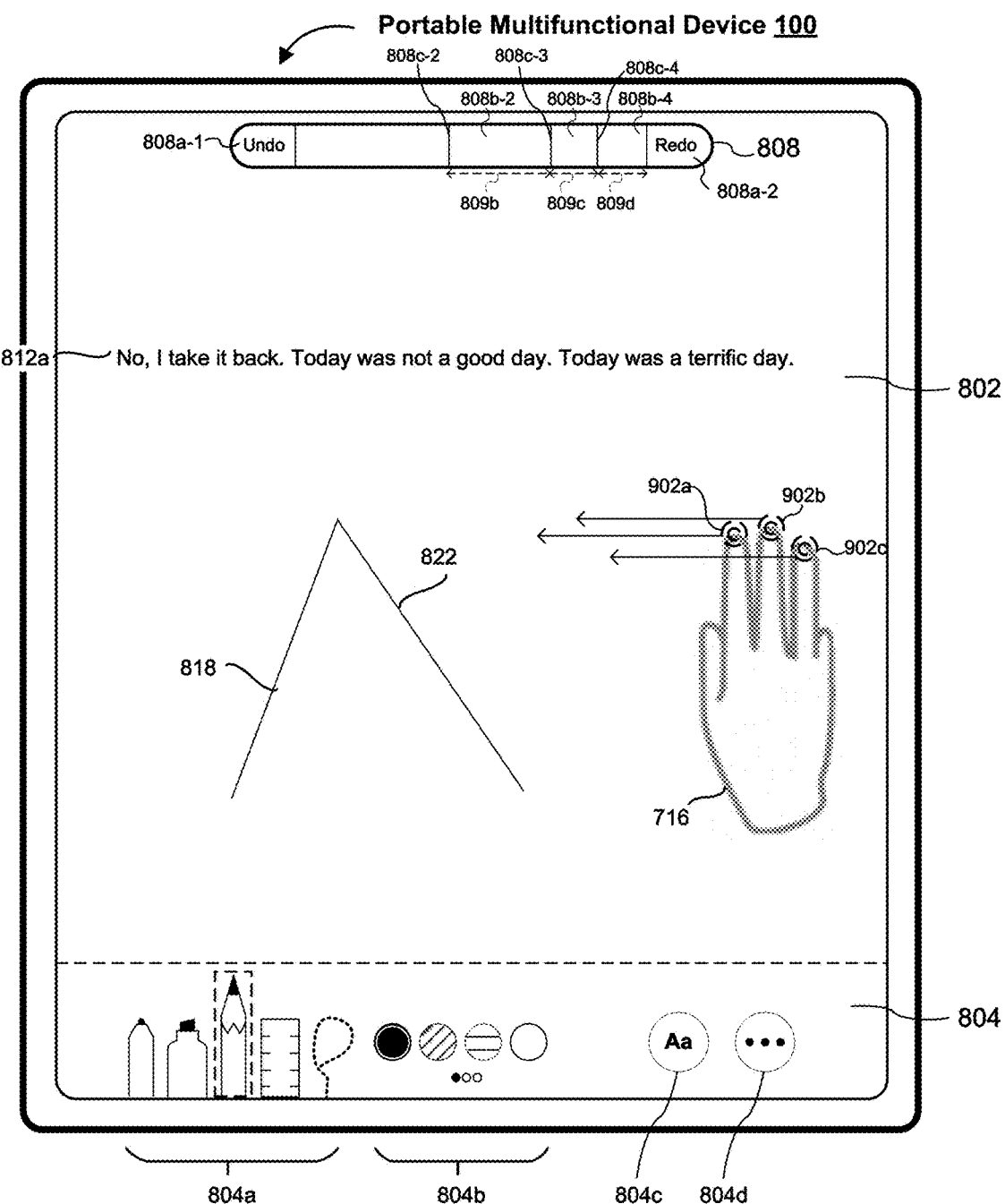
FIGS. 9A-9K are examples of user interfaces for performing partial and complete undo/redo operations based on multi-finger gestures in accordance with some embodiments.

As illustrated in FIG. 9A, the electronic device 100 displays the application interface 802 including various content including the second text string 812a, the first side 818 of the triangle, and the second side 822 of the triangle. The electronic device 100 displays this content as a result of performing successive redo operations, as described above with reference to FIGS. 8AD-8AI. Namely, the most recent redo operation corresponds to the second text string 812a, the second most recent redo operation corresponds to the first side 818 of the triangle, and the third most recent redo operation corresponds to the second side 822 of the triangle.

Figure 9B:
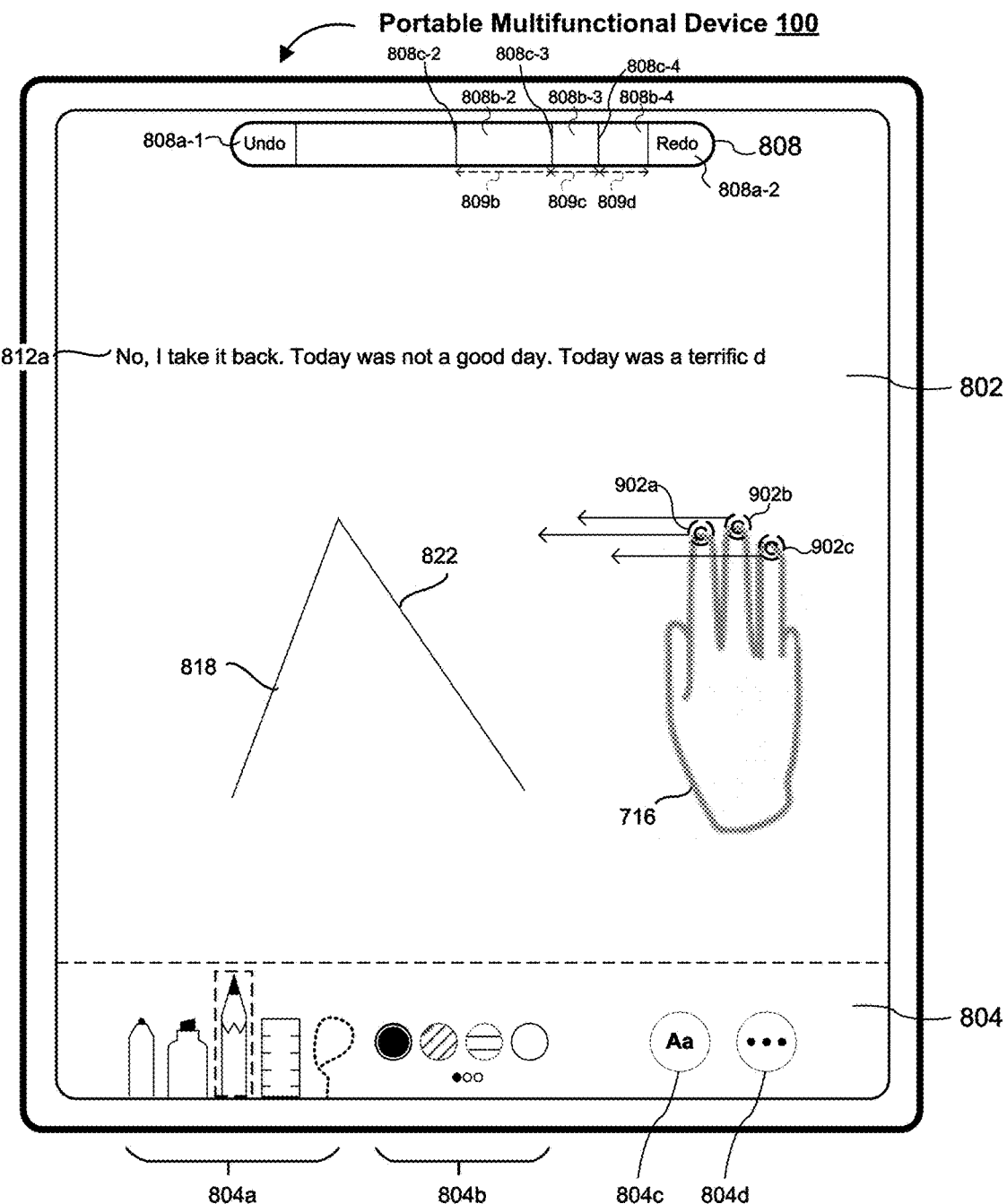
Figure 9C:
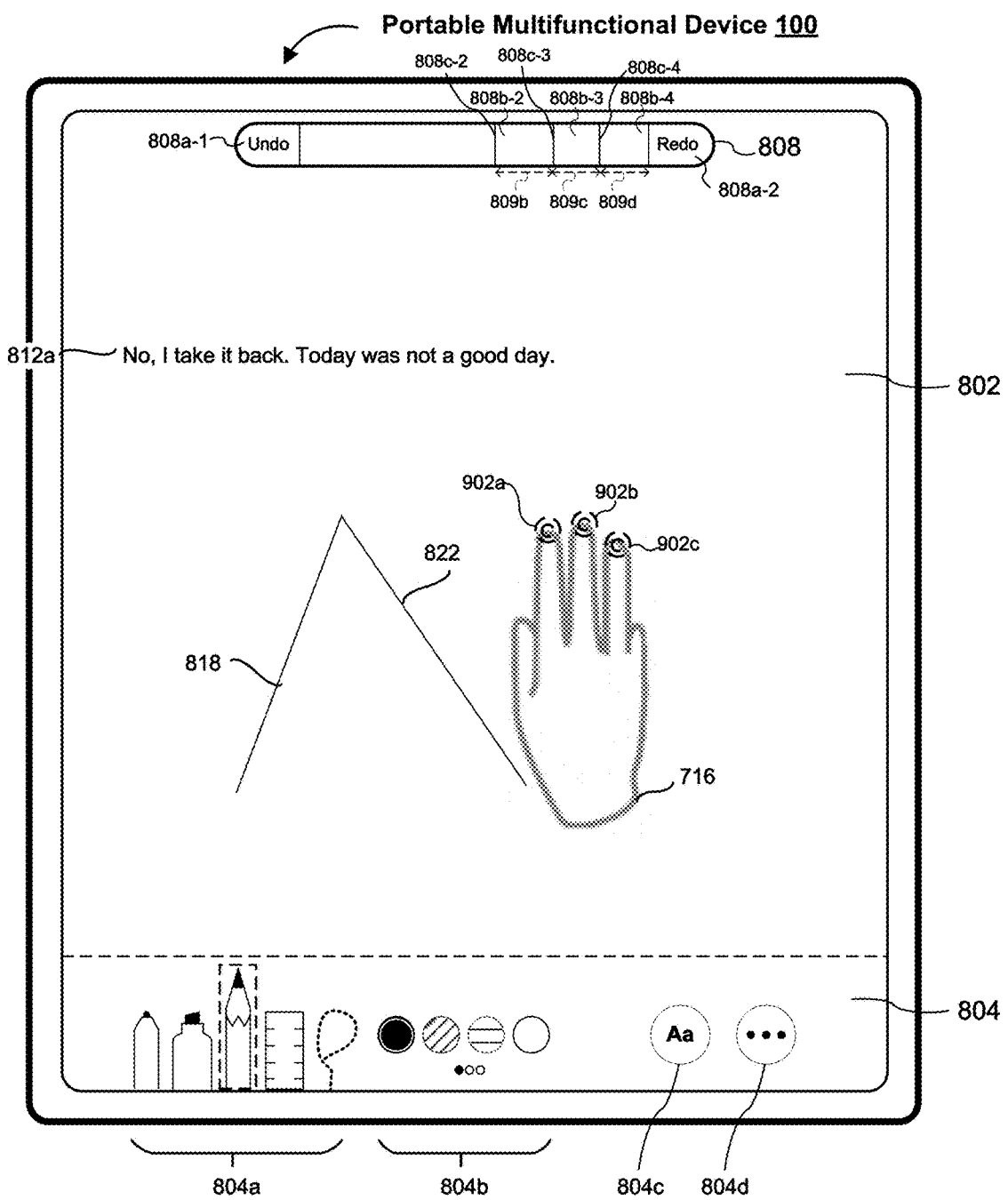

As further illustrated in FIG. 9A, the electronic device 100 detects a first multi-finger gesture 902. The first multi-finger gesture 902 includes a first finger swipe input 902a, a second finger swipe input 902b, and a third finger swipe input 902c. The first multi-finger gesture 902 is in the substantially leftwards direction. Further details regarding multi-finger gestures are provided, above, with reference to FIGS. 7A-7BF. In response to detecting the first multi-finger gesture 902 in FIG. 9A, the electronic device 100 performs an undo operation on the second text string 812a because the electronic device 100 performed the most recent redo operation on the second text string 812a. As illustrated in FIGS. 9B and 9C, the electronic device 100 performs a partial undo operation on (e.g., removes a portion of) the second text string 812a as the first multi-finger gesture 902 proceeds towards its termination point. Moreover, as illustrated in FIG. 9C, the electronic device 100 moves the second distinct undo affordance 808c-2 in order to indicate the smaller second distance 809b resulting from the shortening of the second text string 812a.

Figure 9D:
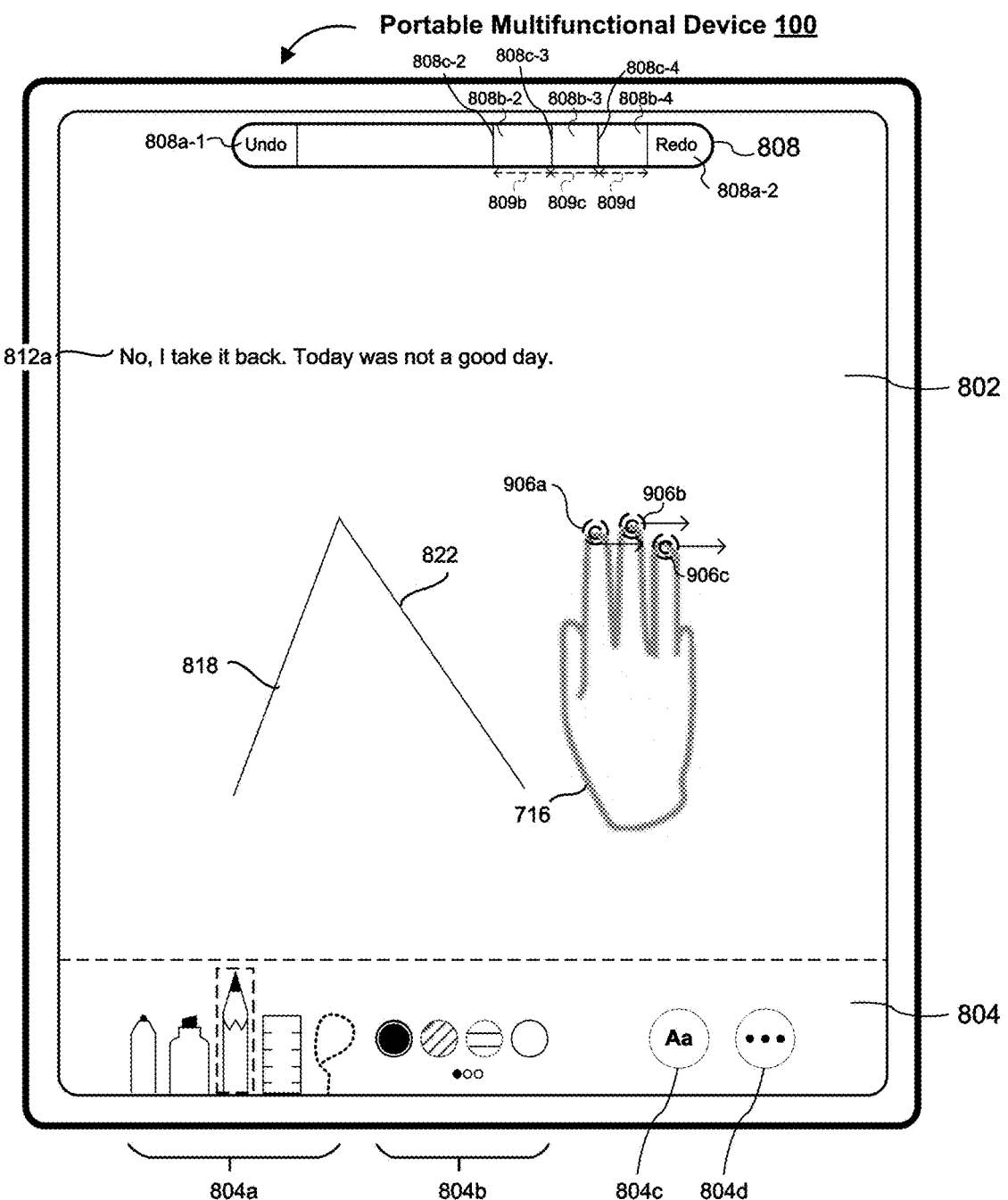
Figure 9E:
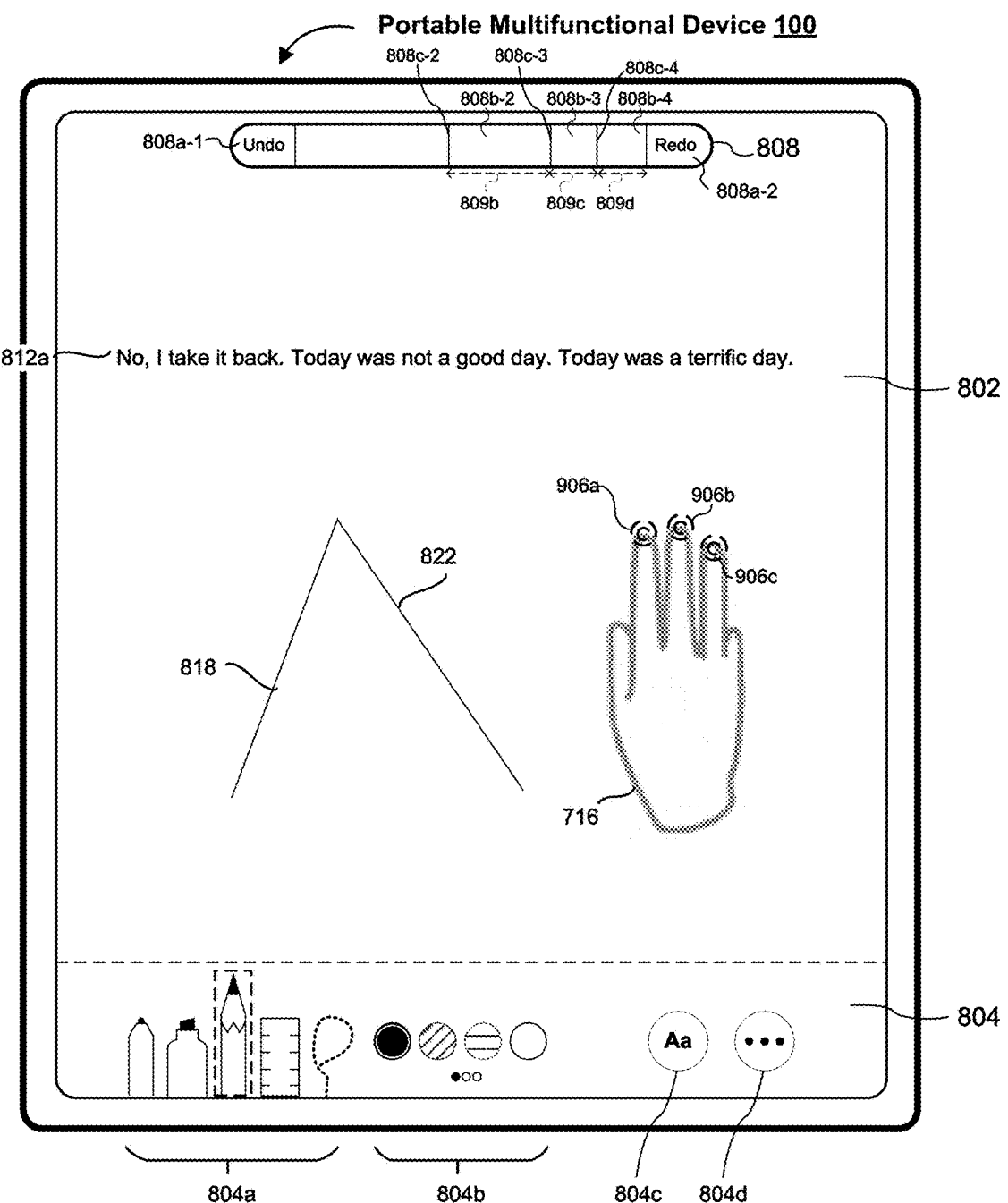

As illustrated in FIG. 9D, the electronic device 100 detects a second multi-finger gesture 906. The second multi-finger gesture 906 includes a first finger swipe input 906a, a second finger swipe input 906b, and a third finger swipe input 906c. In contrast to the first multi-finger gesture 902, the second multi-finger gesture 906 is in the substantially rightwards direction. Moreover, the second multi-finger gesture 906 corresponds to a high-velocity gesture, such as a quick-drag of flick input. In response to detecting the second multi-finger gesture 906 in FIG. 9D, the electronic device 100 performs a redo operation on the second text string 812a in order to restore the entirety of the second text string 812a, as illustrated in FIG. 9E. Although the second multi-finger gesture 906 moves a shorter distance than did the first multi-finger gesture 902, the electronic device 100 redoes the entirety of the undo operation because the second multi-finger gesture 906 corresponds to a different gesture type. Namely, the second multi-finger gesture 906 corresponds to a higher-velocity gesture than the first multi-finger gesture 902. Moreover, as illustrated in FIG. 9E, the electronic device 100 moves the second distinct undo affordance 808c-2 in order to indicate the larger second distance 809b resulting from the restoration of the second text string 812a.

Figure 9F:
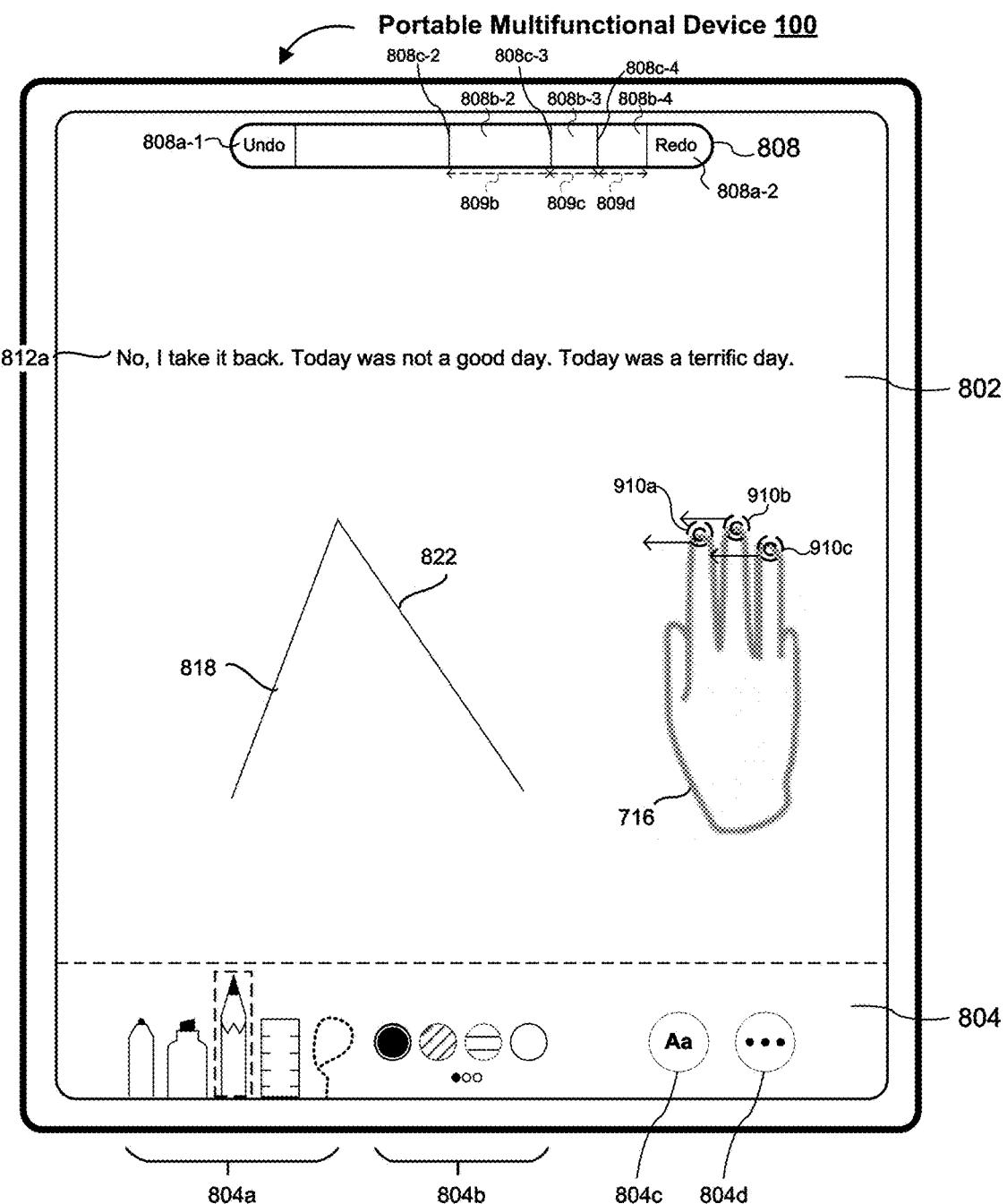
Figure 9G:
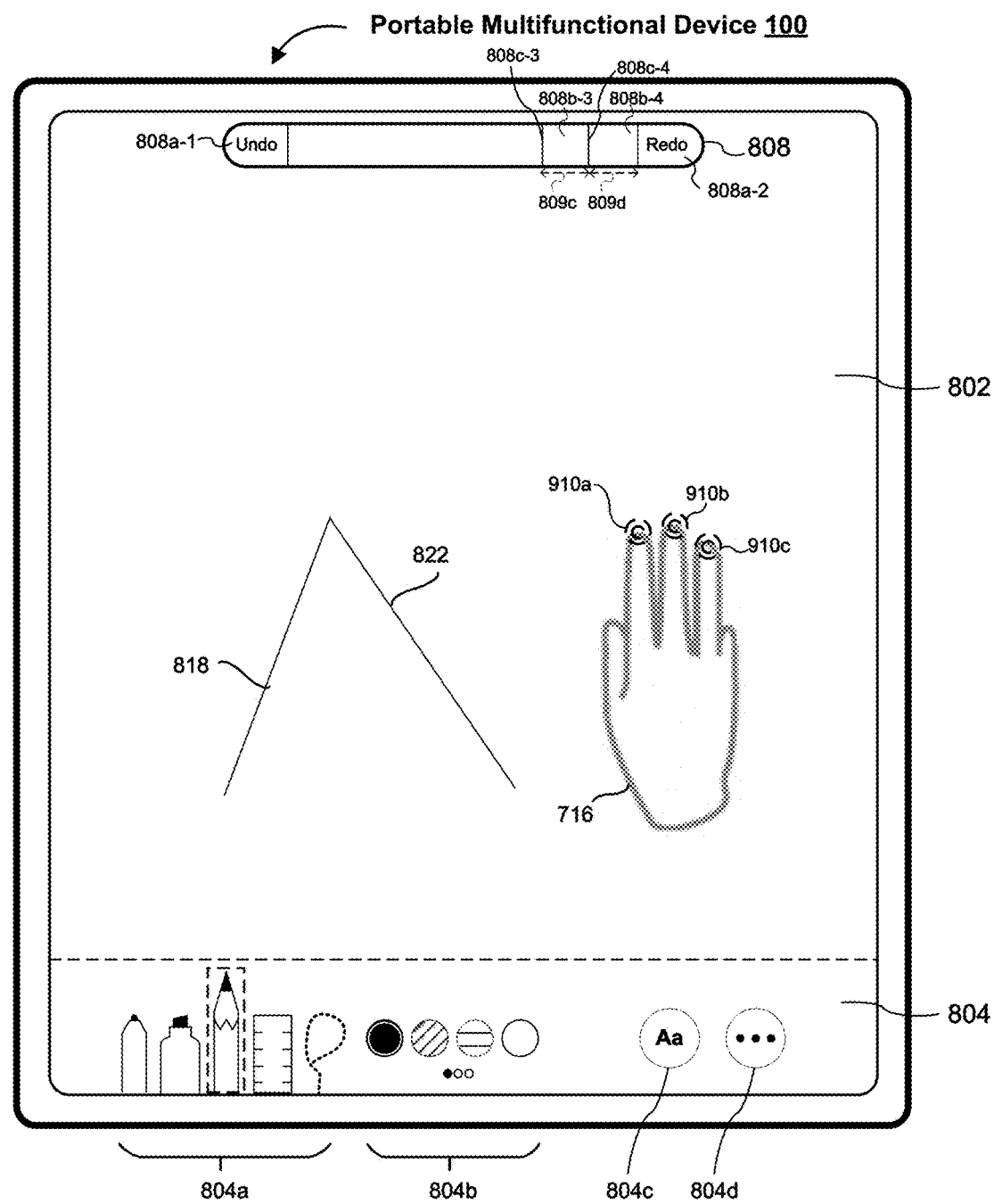

As illustrated in FIGS. 9F-9K, the electronic device 100 performs successive complete undo operations based on successive multi-finger flick gestures. As illustrated in FIG. 9F, the electronic device 100 detects a third multi-finger gesture 910 in the substantially leftwards direction. The third multi-finger gesture 910 includes a first finger flick input 910a, a second finger flick input 910b, and a third finger flick input 910c. In response to detecting the third multi-finger gesture 910 in FIG. 9F, the electronic device 100 performs an undo operation on the entirety second of the text string 812a in FIG. 9G. Although the third multi-finger gesture 910 is associated with a smaller distance than the first multi-finger gesture 902, the electronic device 100 nevertheless undoes more content because the electronic device 100 determines that the third multi-finger gesture 910 corresponds to a flick gesture. One of ordinary skill in the art will appreciate that the functionality of the flick gesture and the swipe gesture may be modified (e.g., reversed) according to some embodiments. Moreover, as illustrated in FIG. 9G, the electronic device 100 removes the second distinct undo affordance 808c-2 in order to indicate that the electronic device 100 has performed a complete undo operation on (e.g., completely erased) the associated second text string 812a and that a further undo operation on the second text string 812a is not available.

Figure 9H:
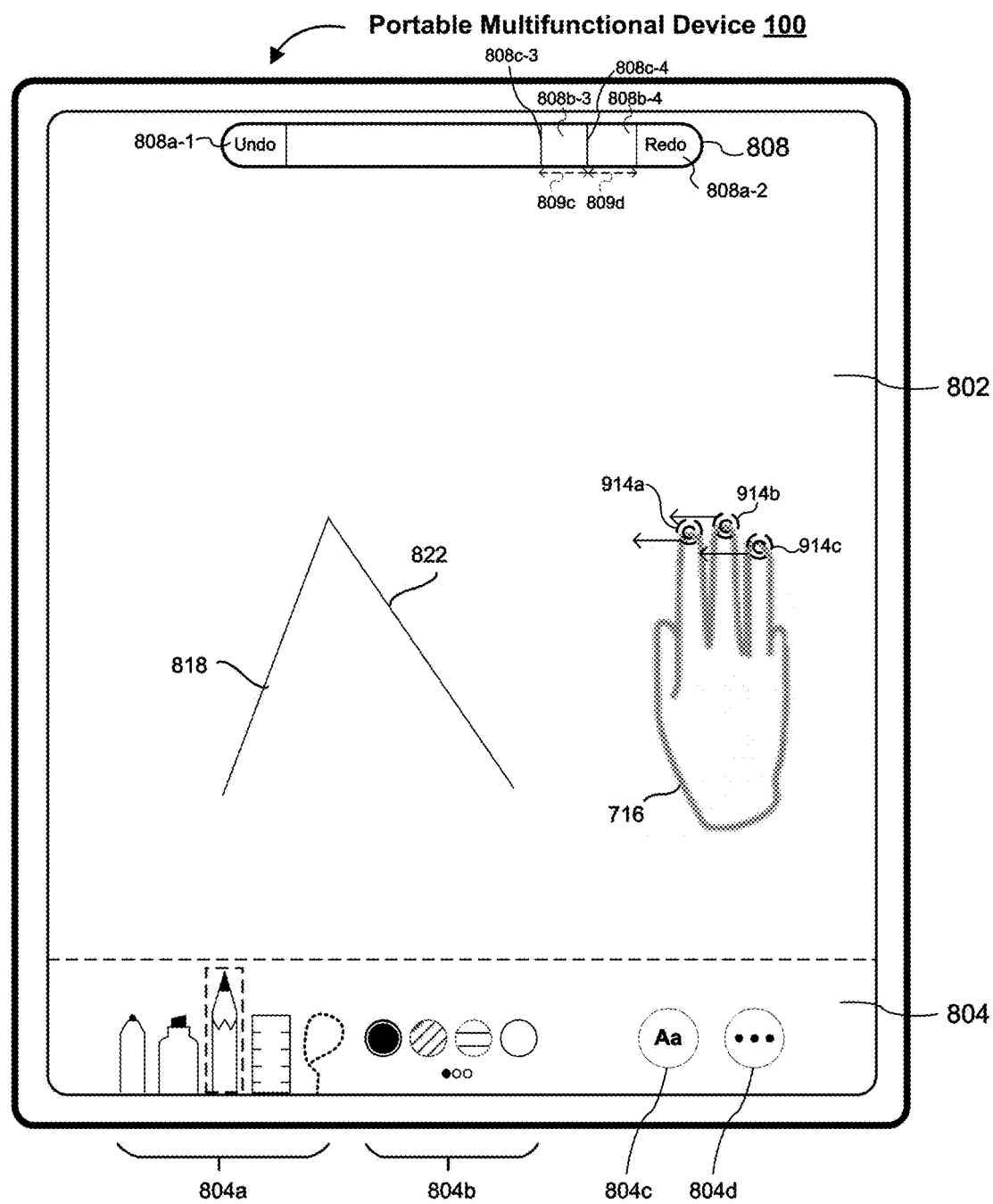
Figure 9I:
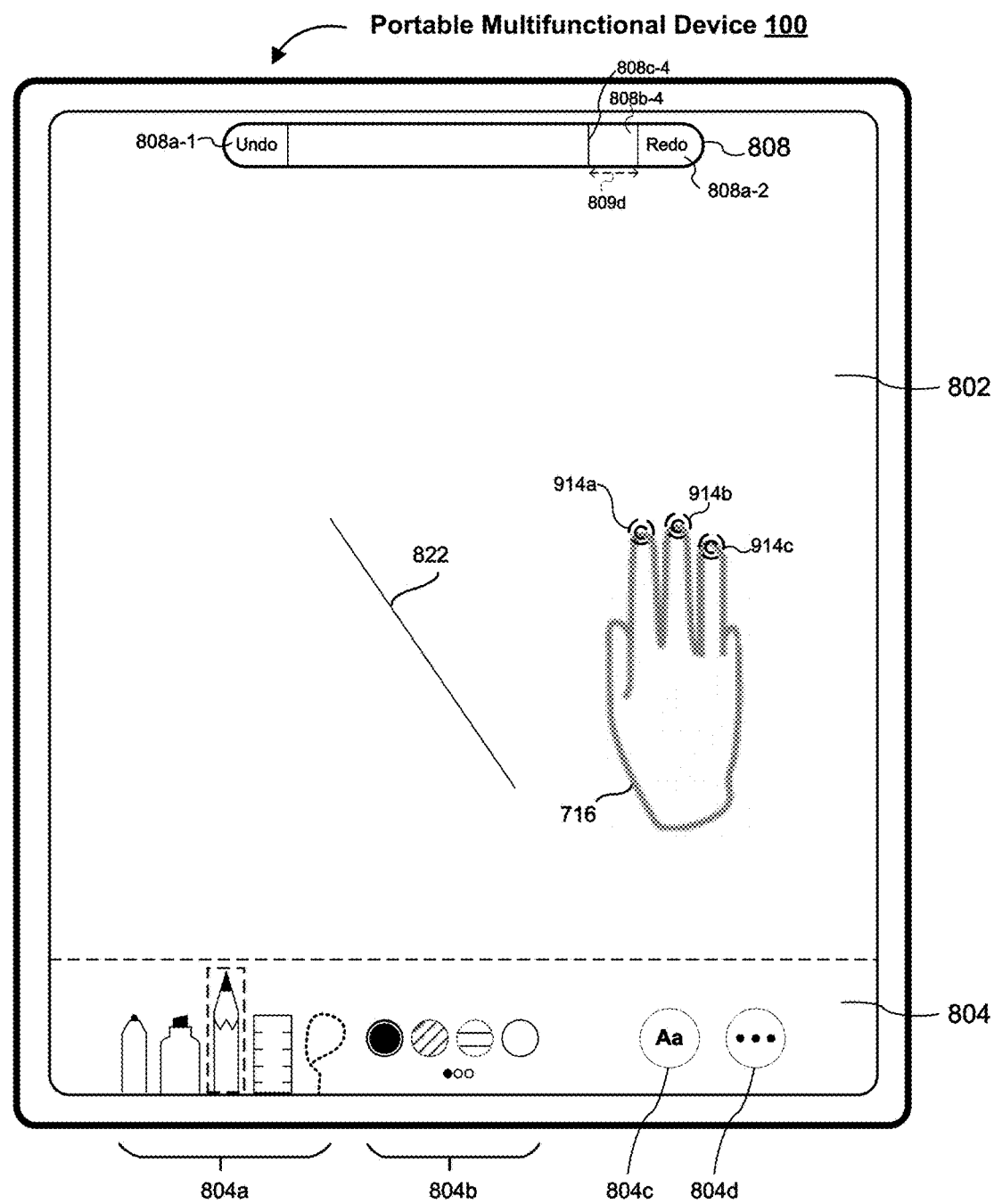

As illustrated in FIG. 9H, the electronic device 100 detects a fourth multi-finger gesture 914 in the substantially leftwards direction. The fourth multi-finger gesture 914 corresponds to a flick gesture including a first finger flick input 914a, a second finger flick input 914b, and a third finger flick input 914c. In response to detecting the fourth multi-finger gesture 914 in FIG. 9H, the electronic device 100 performs an undo operation on the entirety of the first side 818 of the triangle in FIG. 9I. Moreover, as illustrated in FIG. 9I, the electronic device 100 removes the third distinct undo affordance 808c-3 in order to indicate that the electronic device 100 has performed a complete undo operation on (e.g., completely erased) the associated first side 818 of the triangle and that a further undo operation on the first side 818 of the triangle is not available.

Figure 9J:
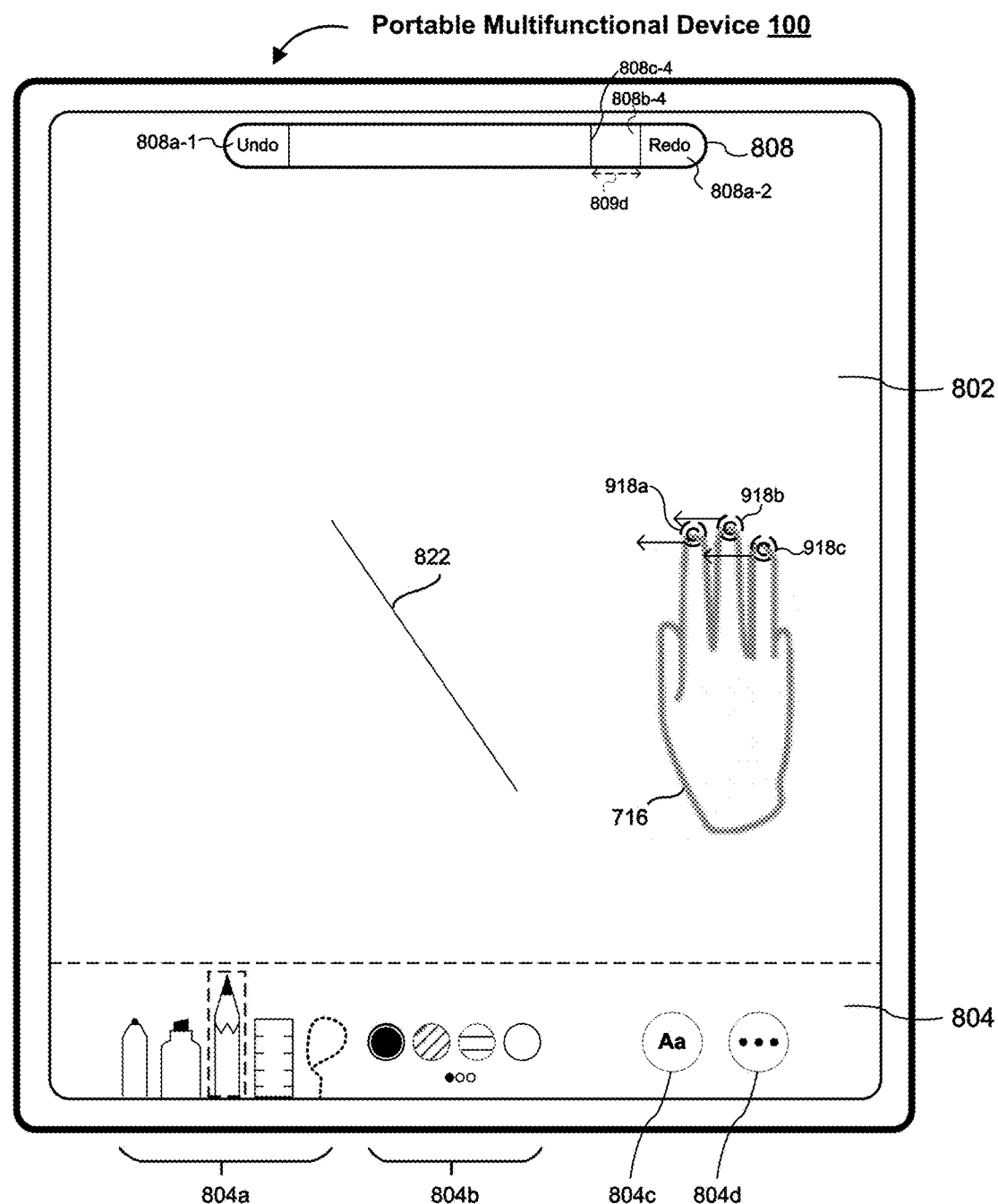
Figure 9K:
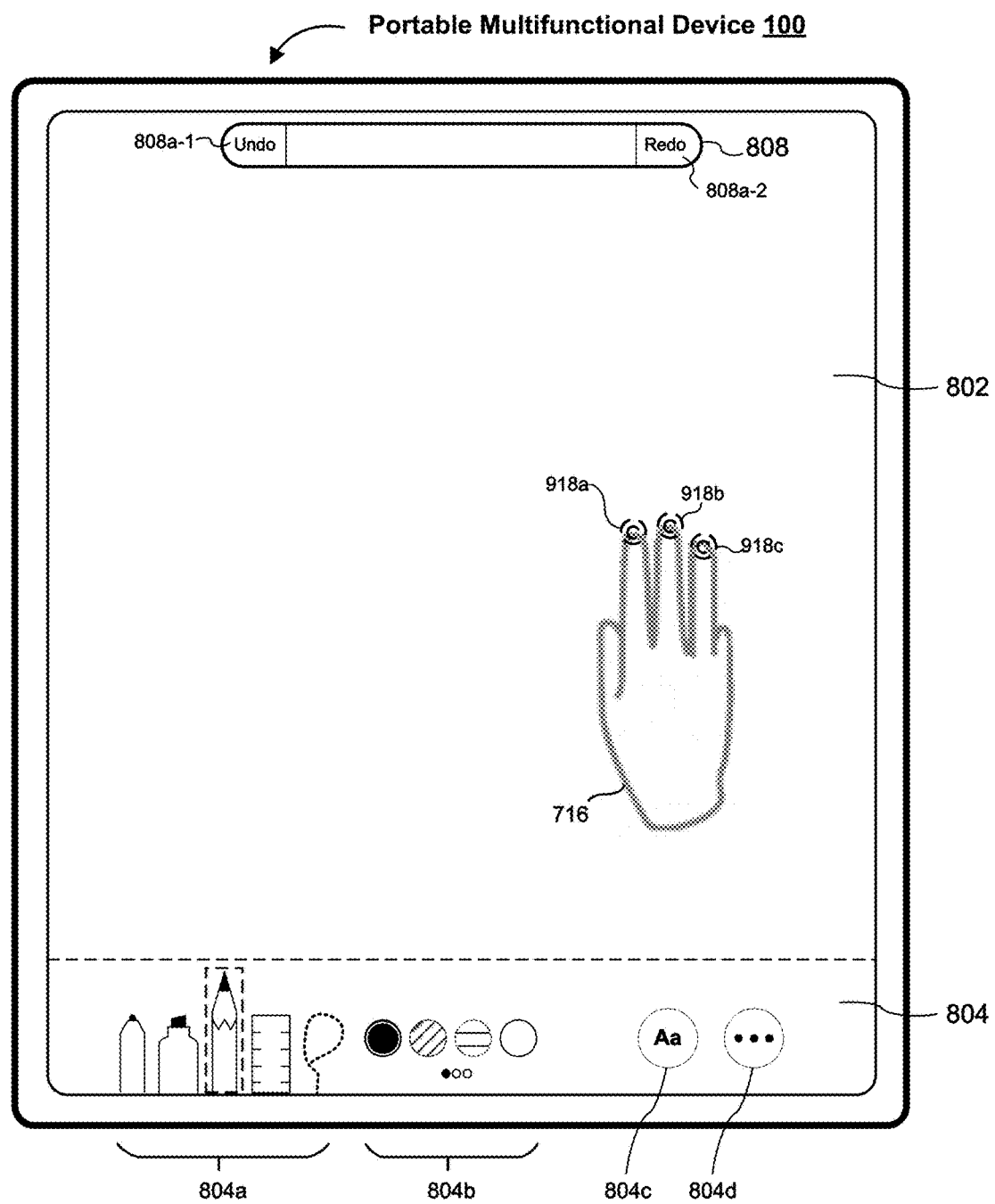

As illustrated in FIG. 9J, the electronic device 100 detects a fifth multi-finger gesture 918 in the substantially leftwards direction. The fifth multi-finger gesture 918 corresponds to a flick gesture including a first finger flick input 918a, a second finger flick input 918b, and a third finger flick input 918c. In response to detecting the fifth multi-finger gesture 918 in FIG. 9J, the electronic device 100 performs an undo operation on the entirety of the second side 822 of the triangle in FIG. 9K. Moreover, as illustrated in FIG. 9K, the electronic device 100 removes the fourth distinct undo affordance 808c-4 in order to indicate that the electronic device 100 has performed a complete undo operation on (e.g., completely erased) the associated second side 822 of the triangle and that a further undo operation on the second side 822 of the triangle is not available.

FIGS. 10A-10E is a flow diagram of a method 1000 for performing content manipulation operations in response to multi-finger gestures in accordance with some embodiments. In some embodiments, the method 1000 is performed at an electronic device (e.g., the electronic device 300 in FIG. 3, or the portable multifunction device 100 in FIG. 1A) with one or more processors, a non-transitory memory, an input device, and a display device. Some operations in the method 1000 are, optionally, combined and/or the order of some operations is, optionally, changed.

An electronic device performs different content manipulation operations based on the nature (e.g., direction, magnitude) of different multi-finger gestures. Accordingly, the electronic device saves processor and battery resources by not having to detect inputs that invoke and/or remove an editing interface that enables selection of corresponding content manipulation operations. Moreover, the electronic device being configured to perform different operations in response to the same multi-finger gesture reduces user interface clutter and provides an efficient mechanism to perform any of the operations, thus reducing the amount of user interaction with the electronic device to perform at least one of the operations. Reducing the amount of user interaction with the device reduces wear-and-tear of the device and, for battery powered devices, increases battery life of the device. In some embodiments, in response to detecting the multi-finger gesture, the electronic device displays an interface that indicates the nature of the multi-finger gesture and the electronic device ceases to display the interface after a threshold amount of time. Additionally, the electronic device provides a larger useable display by removing the interface after the threshold amount of time.

With respect to FIG. 10A, the electronic device displays (1002), via the display device, first content with respect to which a first plurality of editing operations have been performed. For example, the first plurality of editing operations includes content creation operations (e.g., type characters, draw a line, enter a value into a cell), content removal operations (e.g., backspace on typed text, eraser tool on drawn shape), content cut operations, content copy operations, content paste operations, and/or the like. As one example, with reference to FIGS. 7A-7H, the electronic device 100 displays various content (e.g., 706, 708, and 712) based on various types of inputs.

While displaying the first content, the electronic device detects (1004), on the touch-sensitive surface, a first multi-finger gesture. For example, the first multi-finger gesture corresponds to a multi-finger single tap, multi-finger double tap, multi-finger swipe, multi-finger flick, or a combination thereof. In some embodiments, the electronic device is configured to detect the first multi-finger gesture along one of a plurality of axes of movement. For example, the electronic device performs an undo operation in response to detecting a multi-finger double tap or a multi-finger swipe in a first direction and performs additional undo operations based on successive multi-finger double tap(s) or multi-finger swipe(s) in the first direction. As another example, the electronic device performs a redo operation in response to detecting a multi-finger swipe in a second direction that is different from (e.g., opposite to) the first direction and performs additional redo operations based on successive multi-finger swipe(s) in the second direction. As yet another example, the electronic device performs a copy operation in response to detecting a multi-finger swipe in a third direction that is different from (e.g., perpendicular to) the first and second directions. As yet another example, the electronic device performs a cut operation in response to detecting multiple multi-finger swipes in the third direction. As yet another example, the electronic device performs a paste operation in response to detecting a multiple multi-finger swipe in a fourth direction that is different from the first, second, and third directions, and, in some embodiments, opposite to the third direction.

In response to detecting the first multi-finger gesture: in accordance with a determination that the first multi-finger gesture includes more than a first predetermined amount of movement in a first direction, the electronic device undoes (1006) one of the first plurality of editing operations. For example, as illustrated in FIGS. 7M-7O, the electronic device 100 undoes the text string 712 in response to determining that the first multi-finger gesture 723 includes more than the first predetermined amount of movement (e.g., crosses the first threshold line 729) in a first (e.g., substantially leftwards) direction.

In some embodiments, after undoing one of the first plurality of editing operations in response to detecting the first multi-finger gesture, the electronic device detects (1008), on the touch-sensitive surface of the electronic device, a second multi-finger gesture. In response to determining that the second multi-finger gesture includes more than the first predetermined amount of movement in the first direction, the electronic device undoes (1008) another one of the first plurality of editing operations. Performing successive undo operations based on successive multi-finger gestures provides a more efficient user interface and reduces inputs that invoke and/or remove an interface (e.g., an undo stack) for selecting the undo operations. Reducing the number of inputs reduces wear-and-tear and battery usage of the electronic device. For example, the other one the first plurality of editing operations is successive to the one of the first plurality of editing operations. As one example, with reference to FIGS. 7M-7T, the electronic device 100 performs successive undo operations on the text string 712 and the second mark 708 based on successively detecting the first multi-finger gesture 723 and the second multi-finger gesture 732.

In some embodiments, the electronic device detects (1010), on the touch-sensitive surface, a first multi-finger tap input a first amount of time after undoing the one or more of the first plurality of editing operations. In accordance with a determination that the first amount of time satisfies a threshold condition, the electronic device undoes (1010) another one of the first plurality of editing operations. In accordance with a determination that the first amount of time does not satisfy the threshold condition, the electronic device foregoes (1010) undoing another one of the first plurality of editing operations. Performing successive undo operations based on a multi-finger tap input provides a more efficient user interface and reduces inputs that invoke and/or remove an interface (e.g., an undo stack) for selecting the undo operations. Reducing the number of inputs reduces wear-and-tear and battery usage of the electronic device. Moreover, by foregoing performing an undo operation when the first amount of time does not satisfy the threshold condition, the electronic device 100 avoids performing erroneous undo operations. For example, the first amount of time satisfies the threshold condition when less than a threshold amount of time separates undoing the one or more of the first plurality of editing operations and detecting the first multi-finger tap input. As one example, after performing an undo operation on the second mark 708 based on the first multi-finger tap input 751 illustrated in FIGS. 7AA and 7AB, the electronic device 100 performs another undo operation on the first mark 706 based on the second multi-finger tap input 754 illustrated in FIGS. 7AC and 7AD.

In response to detecting the first multi-finger gesture: in accordance with a determination that the first multi-finger gesture includes more than the first predetermined amount of movement in a second direction that is different from the first direction, the electronic device redoes (1012) one of the first plurality of editing operations. For example, the second direction is substantially opposite to the first direction (e.g., left versus right or up versus down). As one example, in contrast to the substantially leftwards direction first multi-finger gesture 723 that results in an undo operation in FIGS. 7M-7O, the electronic device 100 performs a redo operation in response to detecting a substantially rightwards direction third multi-finger gesture 738, as illustrated in FIGS. 7U-7W.

With reference to FIG. 10B, in some embodiments, while displaying the first content, the electronic device detects (1014), on the touch-sensitive surface, a tap input. In response to detecting the tap input, the electronic device displays (1014), via the display device, an interface including a plurality of content manipulation operation affordances indicative of a corresponding plurality of content manipulation operations. Displaying the interface with multiple content manipulation operation affordances reduces the number of inputs for opening different user interfaces including one or more of the multiple content manipulation operation affordances. Accordingly, the electronic device utilizes less processing resources, improving battery life of the electronic device. For example, the interface corresponds to a heads-up display (HUD). As another example, the plurality of content manipulation operations includes undo, redo, cut, copy, paste, etc. As yet another example, the interface includes a plurality of textual indications corresponding to the plurality of content manipulation operation, such as is illustrated in FIGS. 7L-7P. As yet another example, the tap input corresponds to a multi-finger tap input. As yet another example, the multi-finger tap input corresponds a multi-finger single tap input. In some embodiments, the electronic device deemphasizes (e.g., dims) one of more of the plurality of content manipulation operation affordances when the corresponding one or more content manipulation operations are unavailable. For example, the electronic device deemphasizes the undo affordance when a canvas is blank and thus there is nothing to undo and/or deemphasizes the paste affordance when no content has been cut, copied, or selected. In some embodiments, the electronic device removes the interface after a threshold amount of time has passed since detecting the multi-finger tap input, detecting subsequent multi-finger gesture(s), and/or detecting input(s) directed to the interface 722.

As one example, in response to detecting the multi-finger tap input 718 in FIG. 7K, the electronic device 100 displays the interface 722 in FIG. 7L. As another example, the electronic device 100 removes the interface 722 in FIG. 7Q in response to determining that a threshold amount of time has passed since detecting the completion of the first multi-finger gesture 723 in FIG. 7O.

In some embodiments, in accordance with a determination that the first multi-finger gesture is in the first direction, the electronic device changes (1016) the appearance of a first one of the plurality of content manipulation operation affordances that corresponds to an undo operation. In accordance with a determination that the first multi-finger gesture is in the second direction, the electronic device changes (1016) the appearance of a second one of the plurality of content manipulation operation affordances that corresponds to a redo operation. In accordance with a determination that the first multi-finger gesture is in the third direction, the electronic device changes (1016) the appearance of a third one of the plurality of content manipulation operation affordances that corresponds to a particular one of the plurality of content manipulation operations different from the undo operation and the redo operation. The third direction is different from the first direction and the second direction. Displaying the representation of an operation by changing the appearance of a corresponding content manipulation operation affordance provides feedback to the user, ensuring the operation is that intended by the user, reducing the likelihood of further user interaction to provide a different input. Reducing the amount of user interaction with the device reduces wear-and-tear of the electronic device and, for battery powered devices, increases battery life of the electronic device. For example, the electronic device changes the appearance of a content manipulation operation affordance by highlighting (e.g., changing color or pattern, shading in, increasing size, etc.) the content manipulation operation affordance. In some embodiments, the electronic device changes the appearance of the content manipulation operation affordance according to the magnitude of the corresponding multi-finger gesture, such as how near the corresponding multi-finger gesture is to crossing a respective threshold line. In some embodiments, the electronic device changes the appearance of the content manipulation operation affordance by distinguishing its appearance from the remainder of the plurality of content manipulation operation affordances. As one example, with reference to FIGS. 7M-7O, the electronic device 100 fills in the undo affordance 722a with a color overlay 730 according to the progression of the first multi-finger gesture 723. Namely, the size 730a of the color overlay 730 depends on how near the first multi-finger gesture 723 is to crossing the first threshold line 729.

In some embodiments, while displaying the interface: in response to detecting the first multi-finger gesture, in accordance with a determination that the first multi-finger gesture includes less than the first predetermined amount of movement, the electronic device maintains (1018) display of the user interface without performing any the plurality of content manipulation operations. By foregoing performing any the plurality of content manipulation operations, the electronic device save processing and battery resources. Moreover, by maintaining the interface, the electronic device enables subsequent inputs to be directed to the interface and/or enables displaying indications indicative of operations corresponding to subsequently detected multi-finger gestures. Accordingly, the electronic device provides a more efficient user interface. For example, the first multi-finger gesture includes less than the first predetermined amount of movement when a respective termination point of the first multi-finger gesture is not beyond a corresponding threshold line.

In some embodiments, the electronic device detects (1020), on the touch-sensitive surface of the electronic device, a first input directed to a respective one of the plurality of content manipulation operation affordances. In response to detecting the first input, the electronic device performs (1020) a content manipulation operation corresponding to the respective one of the plurality of content manipulation operation affordances. Displaying the interface with multiple content manipulation operation affordances reduces the number of inputs for opening different user interfaces including one or more of the multiple content manipulation operation affordances. Accordingly, the electronic device utilizes less processing resources, improving battery life of the electronic device. In some embodiments, in response to detecting the first input for more than a threshold amount of time, the electronic device performs another of the same operation (e.g., repeatedly or continuously performs operations). In some embodiments, in response to detecting a second input directed to the respective one of the plurality of content manipulation operation affordances within a threshold amount of time after detecting the first input, the electronic device performs another of the same operation. As one example, with reference to FIGS. 7AF-7AJ, the electronic device 100 performs successive redo operations in response to detecting the first input 760 directed to the redo affordance 722e and subsequently detecting the second input 761 directed to the redo affordance 722e within a threshold amount of time.

In some embodiments, the electronic device detects (1022) on the touch-sensitive surface of the electronic device, a drag input directed to an undo affordance of the plurality of content manipulation operation affordances. In response to detecting the drag input, the electronic device partially undoes (1022) a particular one of the first plurality of editing operations without undoing any other of the first plurality of editing operations. By performing a partial undo, the electronic device avoids detecting multiple deletion inputs, such as detecting multiple deletion inputs each removing a single character. Accordingly, the electronic device expends fewer processing and battery resources. As one example, in response to detecting a first gesture 830 in FIG. 8P, the electronic device 100 performs a partial undo operation on (e.g., erases a portion of) the second side 822 of the triangle in FIG. 8Q. In some embodiments, the electronic device 100 performs similar functionality in response to detecting a drag input directed to a particular content manipulation operation affordance within interface 722.

With reference to FIG. 10C, in some embodiments, while displaying the first content, the electronic device detects (1024), on the touch-sensitive surface, a single-finger single tap input. In response to detecting the single-finger single-tap input, the electronic device performs (1024) a particular operation different from an undo operation or a redo operation. By performing the particular operation based on detecting the single-finger single tap input, the electronic device avoids performing an erroneous undo or redo operation, resulting in a more efficient user interface. For example, inputs for resolving erroneous undo/redo operations are reduced, thereby reducing wear-and-tear and battery usage of the electronic device. In some embodiments, the particular operation corresponds to placing a cursor or activating an affordance.

In some embodiments, while displaying the first content, the electronic device detects (1026), on the touch-sensitive surface, a single-finger double tap input. In response to detecting the single-finger double tap input, the electronic device performs (1026) a particular operation different from an undo operation or a redo operation. By performing the particular operation based on detecting the single-finger double tap, the electronic device avoids performing an erroneous undo or redo operation, resulting in a more efficient user interface. For example, inputs for resolving erroneous undo/redo operations are reduced, thereby reducing wear-and-tear and battery usage of the electronic device. In some embodiments, the particular operation corresponds to selecting content.

In some embodiments, while displaying the first content, the electronic device detects (1028), on the touch-sensitive surface, a single-finger swipe input. In response to detecting the single-finger swipe input, the electronic device performs (1028) a particular operation different from an undo operation or a redo operation. By performing the particular operation based on detecting the single-finger swipe input, the electronic device avoids performing an erroneous undo or redo operation, resulting in a more efficient user interface. For example, inputs for resolving erroneous undo/redo operations are reduced, thereby reducing wear-and-tear and battery usage of the electronic device. In some embodiments, the particular operation corresponds to one of scrolling content up, down, left, or right. In some embodiments, the particular operation corresponds to drawing or erasing a mark. In some embodiments, the particular operation corresponds to placing a shape on the canvas.

In some embodiments, while displaying the first content, the electronic device detects (1030), on the touch-sensitive surface, a second multi-finger gesture, wherein the second multi-finger gesture is associated with more than a threshold number of fingers associated with the first multi-finger gesture. In response to detecting the second multi-finger gesture, the electronic device performs (1030) a particular operation different from an undo operation or a redo operation. By performing the particular operation based on detecting the second multi-finger gesture, the electronic device avoids performing an erroneous undo or redo operation, resulting in a more efficient user interface. For example, inputs for resolving erroneous undo/redo operations are reduced, thereby reducing wear-and-tear and battery usage of the electronic device. For example, the second multi-finger gesture corresponds to a four-finger gesture. In some embodiments, the particular operation corresponds to requesting to go to a home screen or switching to another application.

With reference to FIG. 10D, in some embodiments, the first multi-finger gesture is (1032) detected within a first application interface of a first application. For example, the first application interface is a canvas of a drawing application, a page of a word editing application, a spreadsheet editing application, etc. As one example, with reference to FIGS. 7A-7AZ, the electronic device 100 detects, on the touch-sensitive surface, various multi-finger gestures directed to within the first application interface 702.

In some embodiments, the electronic device detects (1034), on the touch-sensitive surface of the electronic device, a second multi-finger gesture within a second application interface of a second application that is different from the first application, wherein the second application interface includes second content with respect to which a second plurality of editing operations have been performed. In response to detecting the second multi-finger gesture: in accordance with a determination that the second multi-finger gesture includes more than the first predetermined amount of movement in the first direction, the electronic device undoes (1034) one of the second plurality of editing operations; and in accordance with a determination that the second multi-finger gesture includes more than the first predetermined amount of movement in the second direction, the electronic device redoes (1034) one of the second plurality of editing operations. By performing the same or similar operations with respect to different application interfaces (e.g., global gestures), the electronic device need not provide different mechanisms for performing undo/redo operations with respect to different application interfaces. Accordingly, the electronic device saves processing and storage resources. In some embodiments, the first application interface is concurrently displayed with the second application interface. In some embodiments the first application interface is replaced by the second application interface in response to a sequence of one or more inputs, such as in response to a request to switch between applications or a request to close the first application followed by a request to open the second application. In some embodiments, the first application interface is associated with a first application that is different from a second application associated with the second application interface. In some embodiments, the first and second application interfaces are associated with the same application, such as the first application interface corresponding to a first instance (e.g., first application window) of a particular drawing application and the second application interface corresponding to a second instance (e.g., second application window) of the particular drawing application.

As one example, with reference to FIGS. 7BD-7BF, the electronic device 100 performs an undo operation, with respect to the second application interface 793, in response to detecting the ninth multi-finger gesture 797 in the substantially leftwards direction that crosses the first threshold line 729. Likewise, with reference to FIGS. 7M-7O, the electronic device 100 performs an undo operation, with respect to the first application interface 702 that is different from the second application interface 793, in response to detecting the first multi-finger gesture 723 that is also in the substantially leftwards direction and that also crosses the first threshold line 729.

In some embodiments, in response to detecting the first multi-finger gesture, in accordance with a determination that the first multi-finger gesture includes more than the first predetermined amount of movement in a third direction that is different from the first direction and the second direction, the electronic device copies (1036) selected first content. Performing a copy operation based on the first multi-finger gesture provides a more efficient user interface and reduces inputs that invoke and/or remove an interface for selecting the copy operation. Reducing the number of inputs reduces wear-and-tear and battery usage of the electronic device. For example, the first multi-finger gesture corresponds to a multi-finger single swipe, such as a single multi-finger swipe in a substantially downward direction. As one example, with reference to FIGS. 7AU-7AW, the electronic device 100 performs a copy operation on selected content including the third mark 783 in response to detecting the seventh multi-finger gesture 784 in the substantially downwards direction.

In some embodiments, in response to detecting the first multi-finger gesture, in accordance with a determination that the first multi-finger gesture includes more than the first predetermined amount of movement in a fourth direction that is different from the first direction, the second direction, and the third direction, the electronic device pastes (1038) previously selected first content. Performing a paste operation based on the first multi-finger gesture provides a more efficient user interface and reduces inputs that invoke and/or remove an interface for selecting the paste operation. Reducing the number of inputs reduces wear-and-tear and battery usage of the electronic device. For example, the first multi-finger gesture corresponds to a multi-finger swipe in a substantially upwards direction. As one example, with reference to FIGS. 7AX-7AZ, the electronic device 100 performs a paste operation on copied content including the third mark 783 (e.g., displays the fourth mark 792) in response to detecting the eighth multi-finger gesture 789 in the substantially upwards direction.

In some embodiments, in response to detecting the first multi-finger gesture, in accordance with a determination that the first multi-finger gesture includes more than a predetermined number of multi-finger tap inputs, the electronic device undoes (1040) one or more of the first plurality of operation. Performing one or more undo operations based on the first multi-finger gesture provides a more efficient user interface and reduces inputs that invoke and/or remove an interface for selecting the undo operation(s). Reducing the number of inputs reduces wear-and-tear and battery usage of the electronic device. For example, the first multi-finger gesture corresponds to a multi-finger double tap gesture. In some embodiments, the electronic device performs successive undo operations based on successive multi-finger tap inputs. As one example, with reference to FIGS. 7AA-7AD, the electronic device 100 performs two successive undo operations on the second mark 708 and the first mark 706 in response to detecting successive multi-finger tap inputs 751 and 754.

With reference to FIG. 10E, in some embodiments, in response to detecting the first multi-finger gesture: in accordance with a determination that the first multi-finger gesture includes more than a second predetermined amount of movement in the first direction, the electronic device undoes (1042) another one of the first plurality of editing operations. The second predetermined amount of movement in the first direction is larger than the first predetermined amount of movement in the first direction. Performing another undo operation based on the first multi-finger gesture provides a more efficient user interface and reduces inputs that invoke and/or remove an interface for selecting the additional undo operation. Reducing the number of inputs reduces wear-and-tear and battery usage of the electronic device. For example, in response to determining that the first multi-finger gesture corresponds to a substantially leftwards multi-finger swipe that terminates a certain amount beyond a first threshold (e.g., the first threshold line 729 in FIGS. 7M-7O), the electronic device performs two undo operations on two corresponding content items (e.g., the text string 712 and the second mark 708 in FIGS. 7M-7O).

In some embodiments, in response to detecting the first multi-finger gesture: in accordance with the determination that the first multi-finger gesture includes more than the first predetermined amount of movement in the first direction, the electronic device displays (1044) an undo indicator indicative of an undo operation. Displaying the undo indicator provides feedback to the user, ensuring the operation is that intended by the user, reducing the likelihood of further user interaction to provide a different input. Reducing the amount of user interaction with the device reduces wear-and-tear of the electronic device and, for battery powered devices, increases battery life of the electronic device. Moreover, in some embodiments, the electronic device displays the undo indicator in response to detecting the first multi-finger gesture and independent of detecting a preceding multi-finger tap input. Accordingly, the electronic device provides an indication of the current operation based on fewer user inputs, resulting in less utilization of the processor and battery. For example, the undo indicator includes the text "undo." As another example, the electronic device emphasizes (e.g., fills in) the undo indicator as the first multi-finger gesture proceeds. As one example, with reference to FIGS. 7R-7T, in response to detecting the second multi-finger gesture 732, the electronic device 100 displays the undo indicator 736, and the electronic device 100 displays the color overlay 737 within the undo indicator 736 having the size 737a according to the current location of the second multi-finger gesture 732.

In some embodiments, in response to detecting the first multi-finger gesture: in accordance with a determination that the first multi-finger gesture includes more than a second predetermined amount of movement in the second direction, the electronic device redoes (1046) another one of the first plurality of editing operations. The second predetermined amount of movement in the first direction is larger than the first predetermined amount of movement in the first direction. Performing another redo operation based on the first multi-finger gesture provides a more efficient user interface and reduces inputs that invoke and/or remove an interface for selecting the additional undo operation. Reducing the number of inputs reduces wear-and-tear and battery usage of the electronic device. For example, in response to determining that the first multi-finger gesture corresponds to a substantially rightwards multi-finger swipe that terminates a certain amount beyond a threshold line (e.g., the second threshold line 744 in FIGS. 7U-7W), the electronic device performs two redo operations on two corresponding content items (e.g., the second mark 708 and the text string 712).

In some embodiments, in response to detecting the first multi-finger gesture: in accordance with the determination that the first multi-finger gesture includes more than the first predetermined amount of movement in the second direction, the electronic device displays (1048) a redo indicator indicative of a redo operation. Displaying the redo indicator provides feedback to the user, ensuring the operation is that intended by the user, reducing the likelihood of further user interaction to provide a different input. Reducing the amount of user interaction with the device reduces wear-and-tear of the electronic device and, for battery powered devices, increases battery life of the electronic device. Moreover, in some embodiments, the electronic device displays the redo indicator in response to detecting the first multi-finger gesture and independent of detecting a preceding multi-finger tap input. Accordingly, the electronic device provides an indication of the current operation based on fewer user inputs, resulting in less utilization of the processor and battery. For example, the redo indicator includes the text "redo." As another example, the electronic device emphasizes (e.g., highlights) the redo indicator as the first multi-finger gesture proceeds. As one example, with reference to FIGS. 7U-7W, in response to detecting the third multi-finger gesture 738, the electronic device 100 displays the redo indicator 745, and the electronic device 100 displays the color overlay 746 within the redo indicator 745 having the size 746a according to the current location of the third multi-finger gesture 738.

Figure 11A:
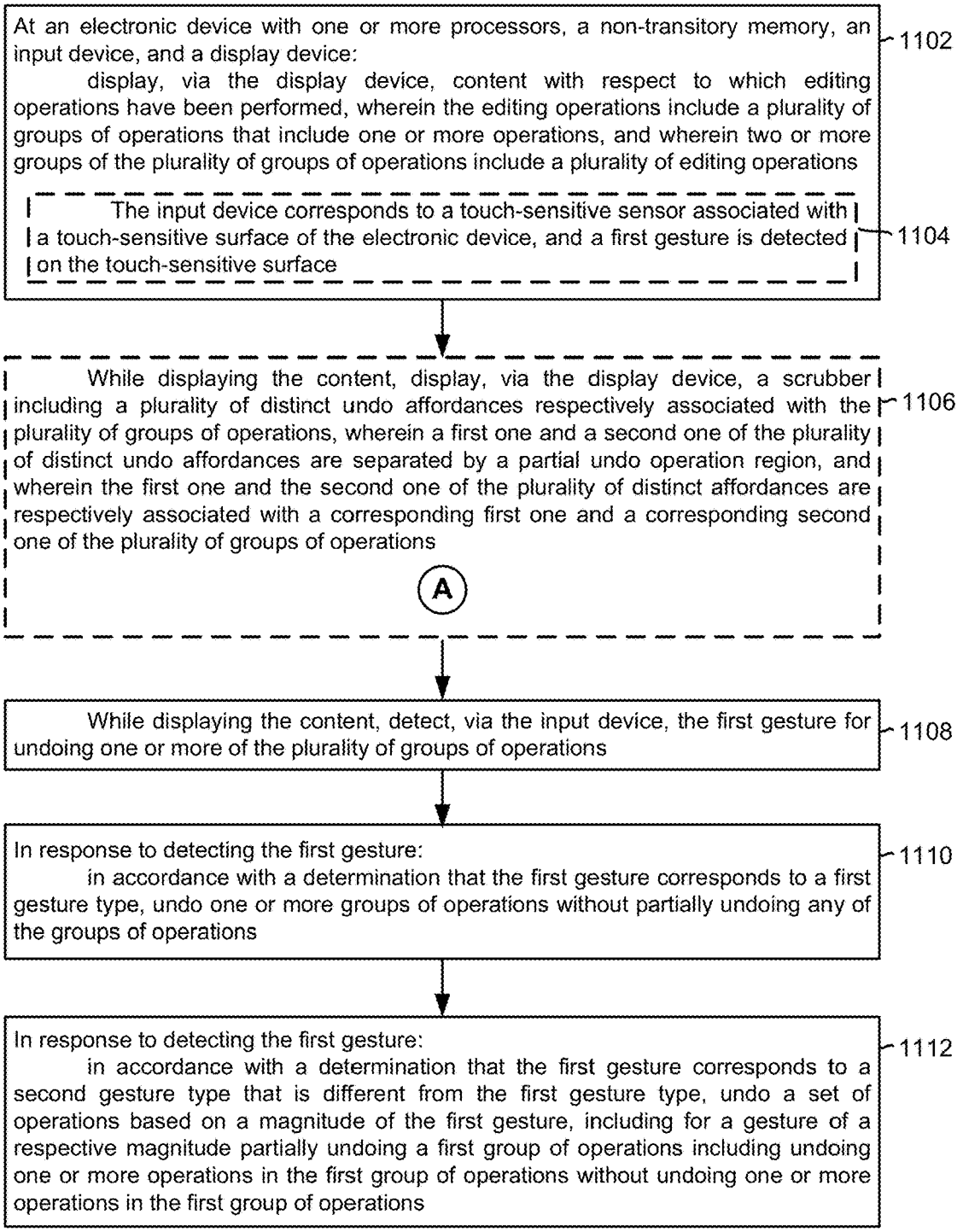

FIGS. 11A-11C is a flow diagram of a method 1100 for performing undo and redo operations in response to various inputs in accordance with some embodiments. In some embodiments, the method 1100 is performed at an electronic device (e.g., the electronic device 300 in FIG. 3, or the portable multifunction device 100 in FIG. 1A) with one or more processors, a non-transitory memory, an input device, and a display device. Some operations in the method 1100 are, optionally, combined and/or the order of some operations is, optionally, changed.

An electronic device performs complete or partial undo or redo operations, based on the nature of a detected gesture input. Accordingly, the electronic device need not detect multiple deletion inputs that cause the electronic device to perform a partial undo operation or detect multiple content-creation inputs that cause the electronic device to perform a partial redo operation. Because the electronic device detects fewer inputs, the electronic device expends fewer processing and battery resources and experiences less wear-and-tear. Moreover, the electronic device being configured to perform complete and partial undo/redo operations based on the same gesture input reduces user interface clutter and provides an efficient mechanism to perform any of the operations, thus reducing the amount of user interaction with the electronic device to perform at least one of the operations. Reducing the amount of user interaction with the device reduces wear-and-tear of the device and, for battery powered devices, increases battery life of the device.

With reference to FIG. 11A, the electronic device displays (1102), via the display device, content with respect to which editing operations have been performed, wherein the editing operations include a plurality of groups of operations that include one or more operations, and wherein two or more groups of the plurality of groups of operations include a plurality of editing operations. As one example, with reference to FIG. 8M, the electronic device 100 displays various pieces of content (e.g., the first text string 806a, the second text string 812a, the first side 818 of the triangle, the second side 822 of the triangle, and the third side 826 of the triangle), wherein each piece of content is associated with a corresponding editing operation illustrated in FIGS. 8B-8L.

In some embodiments, the input device corresponds (1104) to a touch-sensitive sensor associated with a touch-sensitive surface of the electronic device, and a first gesture is detected on the touch-sensitive surface. The touch-sensitive sensor enables the electronic device to detect complex inputs (e.g., different gesture types) without the need for an external input device, such as an external mouse or keyboard, resulting in a more efficient user interface. For example, the first gesture is a touch gesture (e.g., swipe, flick). As another example, the first gesture is a stylus movement input, such as a stylus drag. As one example, with reference to FIGS. 8O and 8P, the electronic device 100 detects, on the touch-sensitive surface of the electronic device 100, the first gesture 830 directed to the scrubber 808.

In some embodiments, while displaying the content, the electronic device displays (1106), via the display device, a scrubber including a plurality of distinct undo affordances respectively associated with the plurality of groups of operations. A first one and a second one of the plurality of distinct undo affordances are separated by a partial undo operation region. The first one and the second one of the plurality of distinct affordances are respectively associated with a corresponding first one and a corresponding second one of the plurality of groups of operations. By displaying the scrubber with multiple distinct undo affordances, the electronic device need not detect inputs that open different user interfaces including one or more of the multiple distinct undo affordances. Accordingly, the electronic device utilizes less processing resources, improving battery life of the electronic device. For example, the distance between the first one and a second one of the plurality of distinct undo affordances indicates the scope of the second undo operation. A larger distance indicates that the second undo operation is associated with a greater scope (e.g., more letters removed, more sides of a shape removed, etc.), and vice versa. As another example, each of the plurality of distinct undo affordances has a different appearance, such as a different color, size, shape, etc., as compared with a corresponding partial undo operation region. As another example, a particular distinct undo affordance corresponds to a vertical line that demarcates abutting partial undo operation regions. In some embodiments, the first one of the plurality of distinct undo affordances is the rightmost distinct undo affordances within the scrubber. In some embodiments, the second one of the plurality of distinct undo affordances is the second from the right within the scrubber. In some embodiments, the corresponding first one and the corresponding second one of the plurality of groups of operations are successive to each other.

As one example, with reference to FIG. 8C, the first distance 809a between the first distinct undo affordance 808c-1 and the undo last affordance 808a-1 indicates the scope of the first text string 806a associated with the first distinct undo affordance 808c-1. By contrast, as another example, with reference to FIG. 8E, the distance 809b between the second distinct undo affordance 808c-2 and the first distinct undo affordance 808c-1 indicates the scope of the second text string 812a associated with the second distinct undo affordance 808c-2. Because the second text string 812a is longer than the first text string 806a, the distance 809b corresponding to the second text string 812a is likewise greater than the distance 809a corresponding to the first text string 806a.

While displaying the content, the electronic device detects (1108), via the input device, the first gesture for undoing one or more of the plurality of groups of operations. As one example, as illustrated in FIG. 8N, the first gesture corresponds to an input (e.g., a touch input) directed to the scrubber 808. As another example, as illustrated in FIGS. 8P and 8Q, the first gesture corresponds to a first gesture 830 (e.g., a swipe input) in a first direction (e.g., leftwards) across a portion of the scrubber 808. As yet another example, as illustrated in FIGS. 8Z and 8AA, the first gesture 830 corresponds to a fourth gesture 836 (e.g., a swipe input) in a second direction (e.g., rightwards) that is different from the first direction, wherein the fourth gesture 836 is across a portion of the scrubber 808. As yet another example, as illustrated in FIGS. 9A-9C, the first gesture corresponds to a swipe input 902 that directed to a location outside of the scrubber 808, such as within a canvas of a drawing application. As yet another example, as illustrated in FIGS. 9F and 9G, the first gesture corresponds to a higher-velocity swipe input 910 (e.g., a quick drag or flick) that is located outside of the scrubber 808.

In response to detecting the first gesture: in accordance with a determination that the first gesture corresponds to a first gesture type, the electronic device undoes (1110) one or more groups of operations without partially undoing any of the groups of operations. For example, the electronic device performs a complete undo operation or multiple complete undo operations, such as removing the entirety of text before a carriage return or removing an entire shape. As another example, the first gesture type corresponds to an input that selects a particular distinct undo affordance within the scrubber, such as the input 828 illustrated in FIG. 8N that selects the fifth distinct undo affordance 808c-5. As another example, the first gesture type corresponds to a higher-velocity swipe input that is located outside of the scrubber, such as the third multi-finger gesture 910 illustrated in FIGS. 9F and 9G.

In response to detecting the first gesture: in accordance with a determination that the first gesture corresponds to a second gesture type that is different from the first gesture type, the electronic device undoes (1112) a set of operations based on a magnitude of the first gesture, including for a gesture of a respective magnitude partially undoing a first group of operations including undoing one or more operations in the first group of operations without undoing one or more operations in the first group of operations. For example, the electronic device performs a partial undo operation, such as removing a single side of a shape, removing one or more letters of a sentence, and/or the like. As another example, the second gesture type corresponds to a movement across a particular partial undo operation of the scrubber. As yet another example, the second gesture type corresponds to a multi-finger gesture, such as a multi-finger swipe input in the substantially leftwards direction.

As one example, in response to detecting the first gesture 830 across the fourth partial undo operation region 808b-4 of the scrubber 808 in FIG. 8P, the electronic device 100 undoes a portion of the second side 822 of the triangle in FIG. 8Q. As another example, with reference to FIGS. 9A-9C, as the first multi-finger gesture 902 progresses, the electronic device 100 undoes a portion of the second text string 812a based on the magnitude of the first multi-finger gesture 902.

With reference to FIG. 11B, in some embodiments, in response to detecting the first gesture: in accordance with a determination that the first gesture is directed to a location outside of the scrubber and corresponds to the first gesture type, the electronic device undoes (1114) the one or more groups of operations without partially undoing any of the groups of operations. In accordance with a determination that the first gesture is directed to the location outside of the scrubber and corresponds to the second gesture type, the electronic device undoes (1114) the set of operations based on the magnitude of the first gesture. Moreover, the electronic device being configured to perform different types of undo operations (e.g., complete undo versus partial undo) in response to detecting the same first gesture input reduces user interface clutter and provides an efficient mechanism to perform either undo operation type, thus reducing the amount of user interaction with the electronic device to perform at least one of the operations. Reducing the amount of user interaction with the device reduces wear-and-tear of the device and, for battery powered devices, increases battery life of the device. For example, the first gesture is directed to content displayed on the display. In some embodiments, the electronic device ceases to display the scrubber in response to detecting the first gesture.

As one example, with reference to FIGS. 9F and 9G, in response to determining that the third multi-finger gesture 910 is directed to the location outside of the scrubber 808 and corresponds to the first input type, the electronic device 100 undoes the entirety of the second text string 812a. As a counter example, with reference to FIGS. 9A-9C, in response to determining that the first multi-finger gesture 902 is directed to the location outside of the scrubber 808 and corresponds to the second input type, the electronic device 100 undoes a portion of the second text string 812a based on the magnitude of the first multi-finger gesture 902.

In some embodiments, in response to detecting the first gesture: in accordance with a determination that the first gesture is directed to the second one of the plurality of distinct undo affordances, the electronic device undoes (1116) the corresponding first one and the corresponding second one of the plurality of groups of operations without partially undoing any other group of operations of the plurality of groups of operations. By undoing multiple operations in response to detecting a single input, the electronic device avoids detecting multiple inputs corresponding to the multiple operations. Accordingly, the electronic device expends fewer processing and battery resources. As one example, in response to detecting the input 838 directed to the first distinct undo affordance 808c-1 in FIG. 8AB, the electronic device 100 undoes multiple operations, including undoing creation of the first text string 806a, creation of the second text string 812a, creation of the first side 818 of the triangle, and creation of the second side 822 of the triangle, as illustrated in FIG. 8AC.

In some embodiments, in response to detecting the first gesture: in accordance with the determination that the first gesture corresponds to a first movement input, the electronic device moves (1118) the first one of the plurality of distinct undo affordances from a first location within the scrubber to a second location within the scrubber, wherein the magnitude of the first gesture determines the second location. By moving the first one of the plurality of distinct undo affordances to the second location according to the first gesture, the electronic device enables a single input directed to the second location to result in a complete undo operation of the corresponding first one of the plurality of groups of operations. Accordingly, the electronic device need not detect a separate input to invoke, for example, an undo stack that includes a selectable complete undo operation affordance, thereby reducing processing and battery utilization by the electronic device. As one example, in response to detecting completion of the first gesture 830 in FIG. 8Q, the electronic device 100 moves the fourth distinct undo affordance 808c-4 leftwards to a location corresponding to the termination point of the first gesture 830, as illustrated in FIG. 8R. As another example, with reference to FIGS. 9A-9C, in response to detecting completion of the first multi-finger gesture 902, the electronic device 100 moves the second distinct undo affordance 808c-2 rightwards to a location based on the magnitude of the first multi-finger gesture 902.

In some embodiments, the distance between the first one of the plurality of distinct undo affordances and the second one of the plurality of distinct undo affordances indicates (1120) a scope of the corresponding first one of the plurality of groups of operations. By displaying the distinct undo affordances spaced apart according to the respective scopes of operations, the electronic device provides greater control for movement inputs across the scrubber. Accordingly, the electronic device performs more accurate partial undo and redo operations. For example, a larger distance between the first and second distinct undo affordances indicates that the corresponding first one of the plurality of groups of operations has a larger scope (e.g., an entire typed paragraph rather than a single typed sentence), and vice versa. As one example, with reference to FIG. 8C, the first distance 809a between the first distinct undo affordance 808c-1 and the undo last affordance 808a-1 indicates the scope of the first text string 806a associated with the first distinct undo affordance 808c-1. By contrast, as another example, with reference to FIG. 8E, the distance 809b between the second distinct undo affordance 808c-2 and the first distinct undo affordance 808c-1 indicates the scope of the second text string 812a associated with the second distinct undo affordance 808c-2. Because the second text string 812a is longer than the first text string 806a, the distance 809b corresponding to the second text string 812a is likewise greater than the distance 809a corresponding to the first text string 806a.

With reference to FIG. 11C, in some embodiments, in response to detecting the first gesture: in accordance with a determination that the first gesture is directed to the first one of the plurality of distinct undo affordances, the electronic device undoes (1122) the corresponding first one of the plurality of groups of operations without partially undoing any other group of operations of the plurality of groups of operations. In accordance with a determination that the first gesture corresponds to a first movement input across the partial undo operation region towards the second one of the plurality of distinct undo affordances, the electronic device undoes (1122) a portion of the corresponding first one of the plurality of groups of operations. The portion is less than the entirety of the corresponding first one of the plurality of groups of operations. An electronic device performs complete or partial undo or redo operations, based on the nature of a detected gesture input. Accordingly, the electronic device need not detect multiple deletion inputs that cause the electronic device to perform a partial undo operation or detect multiple content-creation inputs that cause the electronic device to perform a partial redo operation. Because the electronic device detects fewer inputs, the electronic device expends fewer processing and battery resources and experiences less wear-and-tear. Moreover, the electronic device being configured to perform complete and partial undo/redo operations based on the same gesture input reduces user interface clutter and provides an efficient mechanism to perform any of the operations, thus reducing the amount of user interaction with the electronic device to perform at least one of the operations. Reducing the amount of user interaction with the device reduces wear-and-tear of the device and, for battery powered devices, increases battery life of the device. For example, the first gesture is a tap input directed to the first one of the plurality of distinct undo affordances. As another example, the first movement input is a mouse drag. As yet another example, the first movement input is a finger swipe or flick detected on the touch-sensitive surface of the electronic device. As yet another example, the first movement input is a stylus movement across the touch-sensitive surface.

As one example, in accordance with a determination that the first gesture 828 (e.g., touch input) is directed to the fifth distinct undo affordance 808c-5 in FIG. 8N, the electronic device 100 performs an undo operation on the corresponding third side 826 of the triangle without partially undoing any other operations, as illustrated in FIG. 8O. As another example, in accordance with a determination that the first gesture 830 corresponds to a first movement input across the fourth partial undo operation 808b-4 region towards the third distinct undo affordance 808c-3 in FIG. 8P, the electronic device undoes a portion of the corresponding second side 822 of the triangle, as illustrated in FIG. 8Q.

In some embodiments, the first movement input originates (1124) at the first one of the plurality of distinct undo affordance. By performing a partial undo operation based on a movement input that originates at the corresponding distinct undo affordance, the electronic device avoids erroneously performing the partial undo operation based on a movement input that does not originate at the corresponding distinct undo affordance, resulting in a more efficient user interface. As one example, as illustrated in FIG. 8P, the first gesture 830 originates at the fourth distinct undo affordance 808c-4, and the movement associated with the first gesture 830 results in the electronic device performing a partial undo operation on content (e.g., the second side 822 of the triangle) that is associated with the fourth distinct undo affordance 808c-4.

In some embodiments, after undoing the portion of the corresponding first one of the plurality of groups of operations, the electronic device detects (1126) a second gesture that corresponds to a second movement input away from the first one of the plurality of distinct undo affordances. In response to detecting the second gesture, the electronic device redoes (1126) the portion of the corresponding first one of the plurality of groups of operations based on the magnitude of the second gesture. Accordingly, the electronic device provides a partial redo operation feature that complements the partial undo operation feature. As a result, the electronic device avoids detecting multiple, complex content creation inputs (e.g., retype a portion of a sentence, redraw a portion of a line, etc.) that cause the electronic device to perform the same result as a corresponding partial redo operation, resulting in the electronic device expending fewer processing and battery resources. For example, the second movement input originates at location within the partial undo operation region where first movement input terminated. As one example, in response to detecting the second gesture 832 in the substantially rightwards direction in FIG. 8S, the electronic device 100 redoes, as illustrated in FIG. 8T, the portion of the second side 822 of the triangle that was partially undone in FIGS. 8P and 8Q.

FIGS. 12A-12AY are examples of user interfaces for performing content manipulation operations in response to multi-finger pinch gestures in accordance with some embodiments. The user interfaces in these figures are used to illustrate the processes described below, including the processes in FIGS. 14A-14E. Although some of the examples which follow will be given with reference to inputs on a touch-screen display (where the touch-sensitive surface and the display are combined, for example on the touch screen 112), in some embodiments, the electronic device 100 detects inputs on the touch-sensitive surface 651 that is separate from the display 650, as shown in FIG. 6B.

As illustrated in FIG. 12A, the electronic device 100 displays content including a text string 1206 in an application interface 1202 of an application, such as a drawing application interface or a word processing application interface. The application interface 1202 includes a toolbar region 1204 that includes a variety of affordances (e.g., drawing tools, editing functions, color pots) to facilitate content manipulation operations. For example, as illustrated in FIG. 12A, the toolbar region 1204 includes a set of drawing tool affordances 1204a, a set of color pots 1204b, a text tool affordance 1204c, and an additional functions affordance 1204d (e.g., for displaying a share affordance, a save affordance, or other affordances). One of ordinary skill in the art will appreciate that the toolbar region 1204 may include any number and types of affordances, arranged in any number of a variety of ways. As illustrated in FIG. 12A, the electronic device 100 displays a first cursor 1208 that indicates a current position for user interaction on the display of the electronic device 100. Namely, the first cursor 1208 indicates that the current position within the text string 1206 is between text "lovely" and text "day."

Figure 12B:
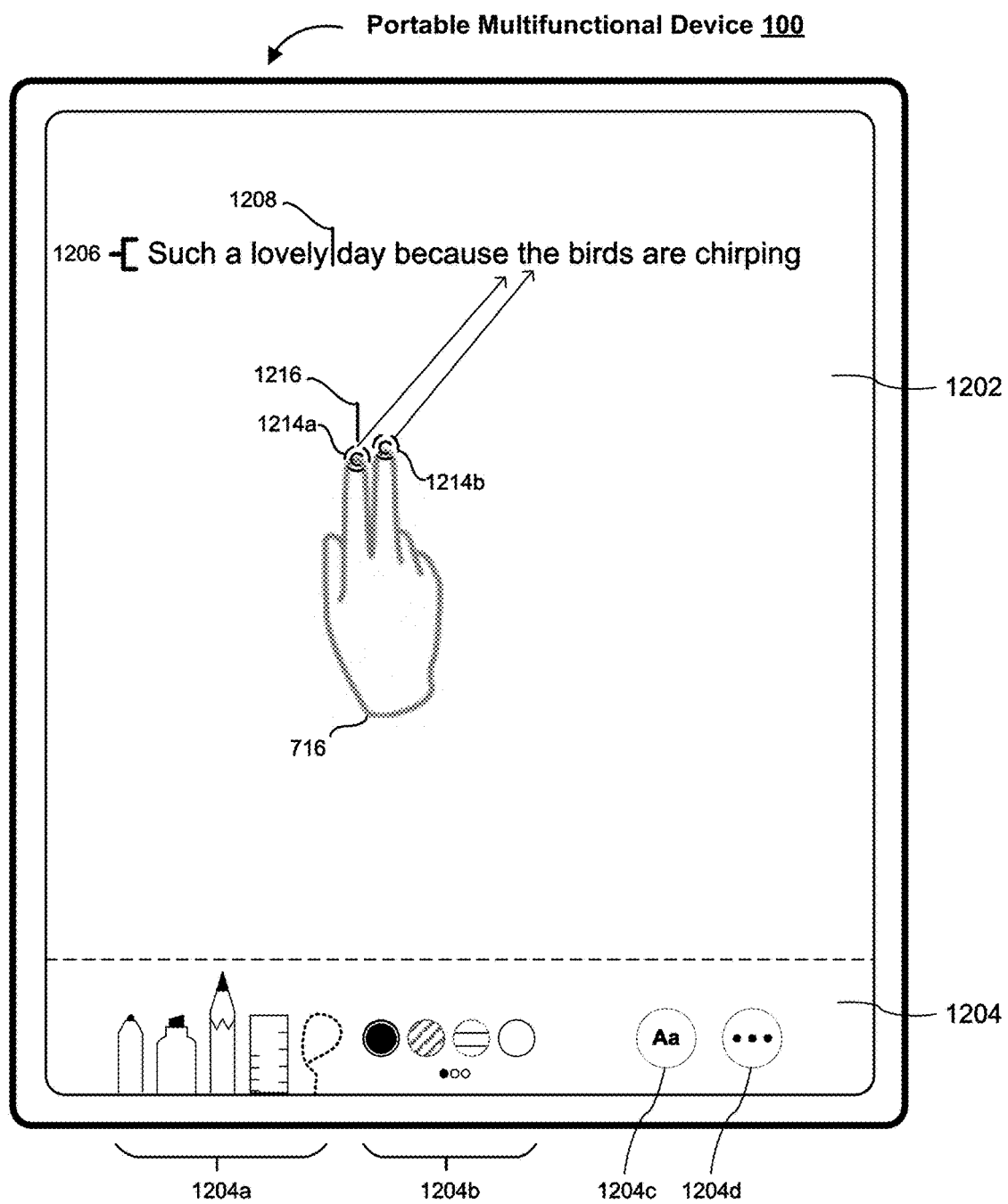

As illustrated in FIG. 12B, the electronic device 100 detects a first two-finger drag gesture 1214 on a touch-sensitive surface of the electronic device 100. The first two-finger drag gesture 1214 is performed with a first contact 1214a and a second contact 1214b of a plurality of contacts of a hand 716 of a user. In response to detecting the first two-finger drag gesture 1214, the electronic device 100 maintains display of the first cursor 1208 and displays a second cursor 1216 at a position that is associated with (e.g., proximate to) a position of the first contact 1214a, the second contact 1214b, or a combination thereof (e.g., in between the first contact 1214a and the second contact 1214b), as illustrated in FIG. 12B.

Figure 12C:
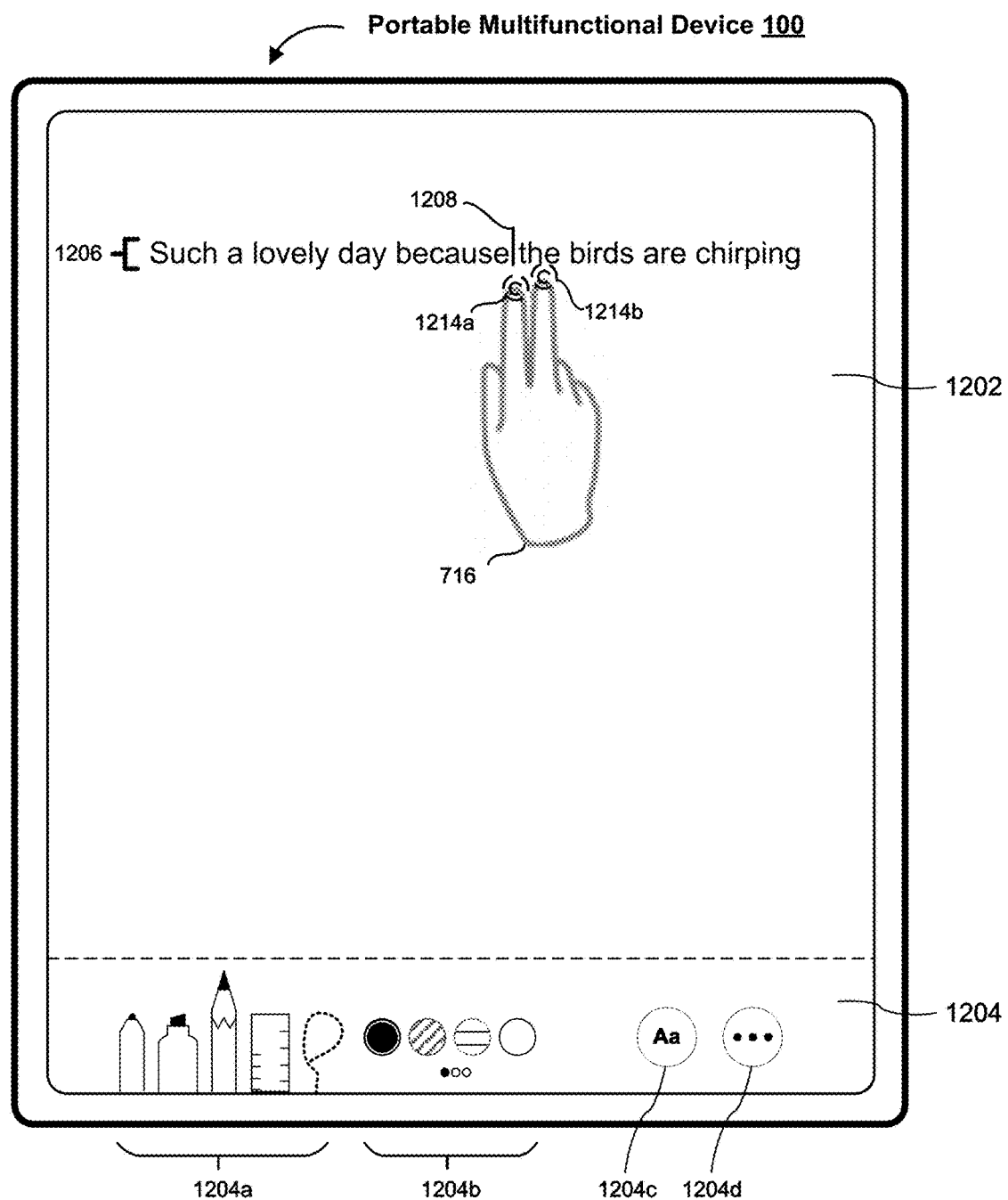

As illustrated in FIG. 12C, the electronic device 100 detects the first two-finger drag gesture 1214 within a threshold distance of the text string 1206. In response to detecting the first two-finger drag gesture 1214 within the threshold distance of the text string 1206, the electronic device 100 ceases to display the second cursor 1216 and moves the first cursor 1208 to the location of the first two-finger drag gesture 1214, e.g., to a position that indicates that the current position within the text string 1206 is between text "because" and text "the."

Figure 12D:
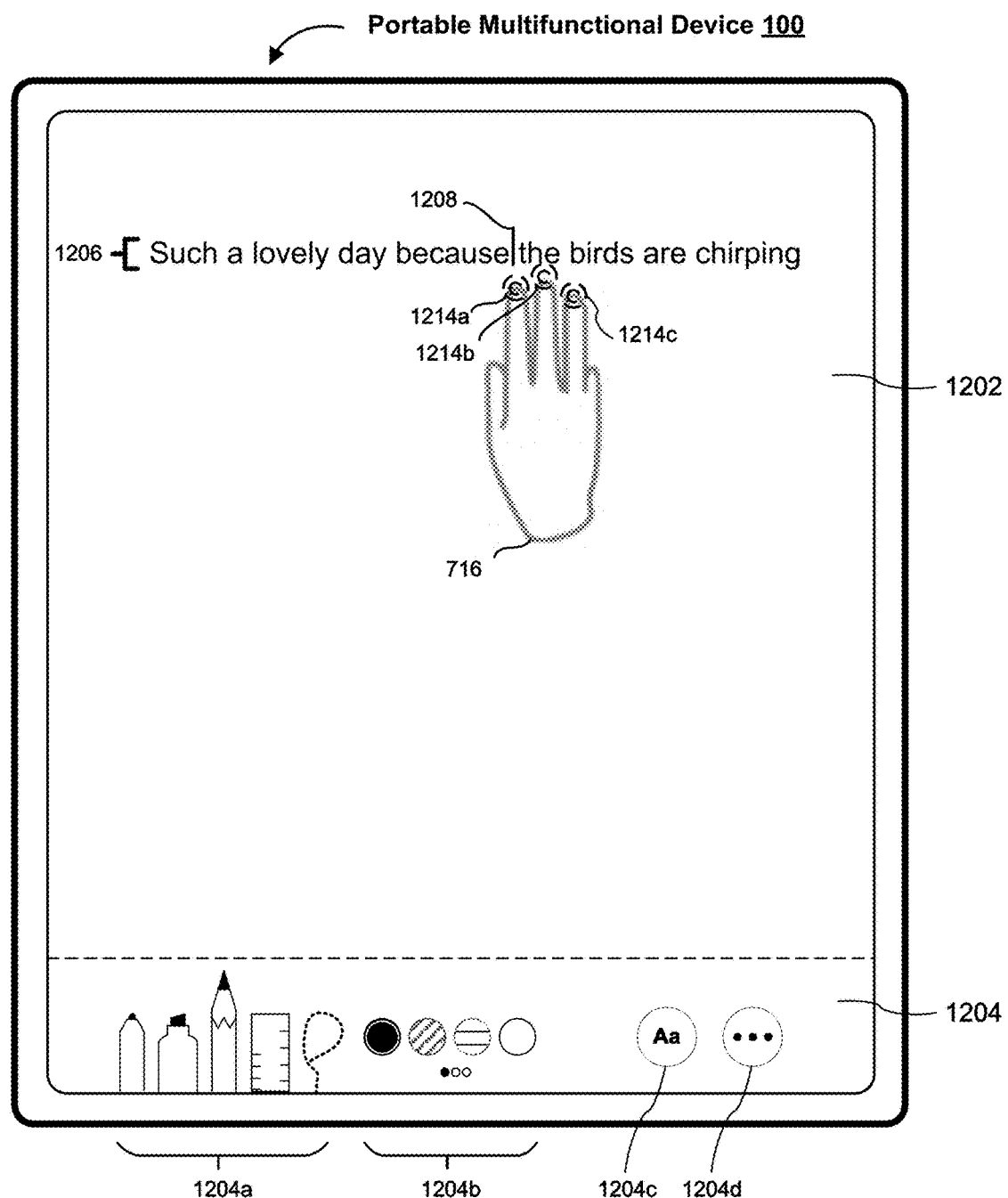

As illustrated in FIG. 12D, after detecting the first two-finger drag gesture 1214 and while detecting the first 1214a and second contacts 1214b on the touch-sensitive surface, the electronic device 100 detects a placement of a third contact 1214c on the touch-sensitive surface. In some embodiments, in response to detecting the placement of a third contact 1214c, the electronic device 100 begins a selection operation that is based on a subsequent drag input (e.g., the first three-finger drag gesture 1218 in FIG. 12E).

Figure 12E:
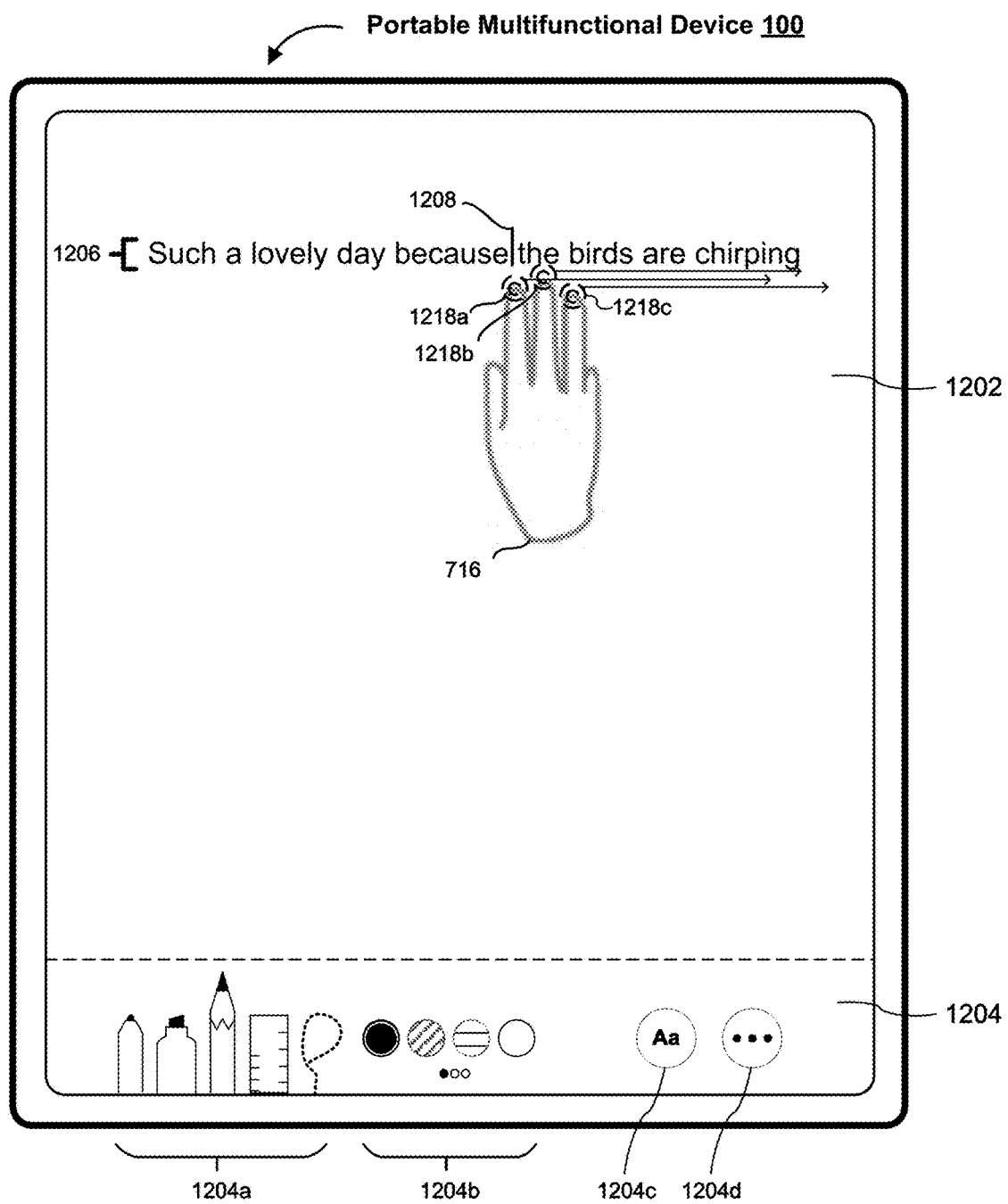
Figure 12F:
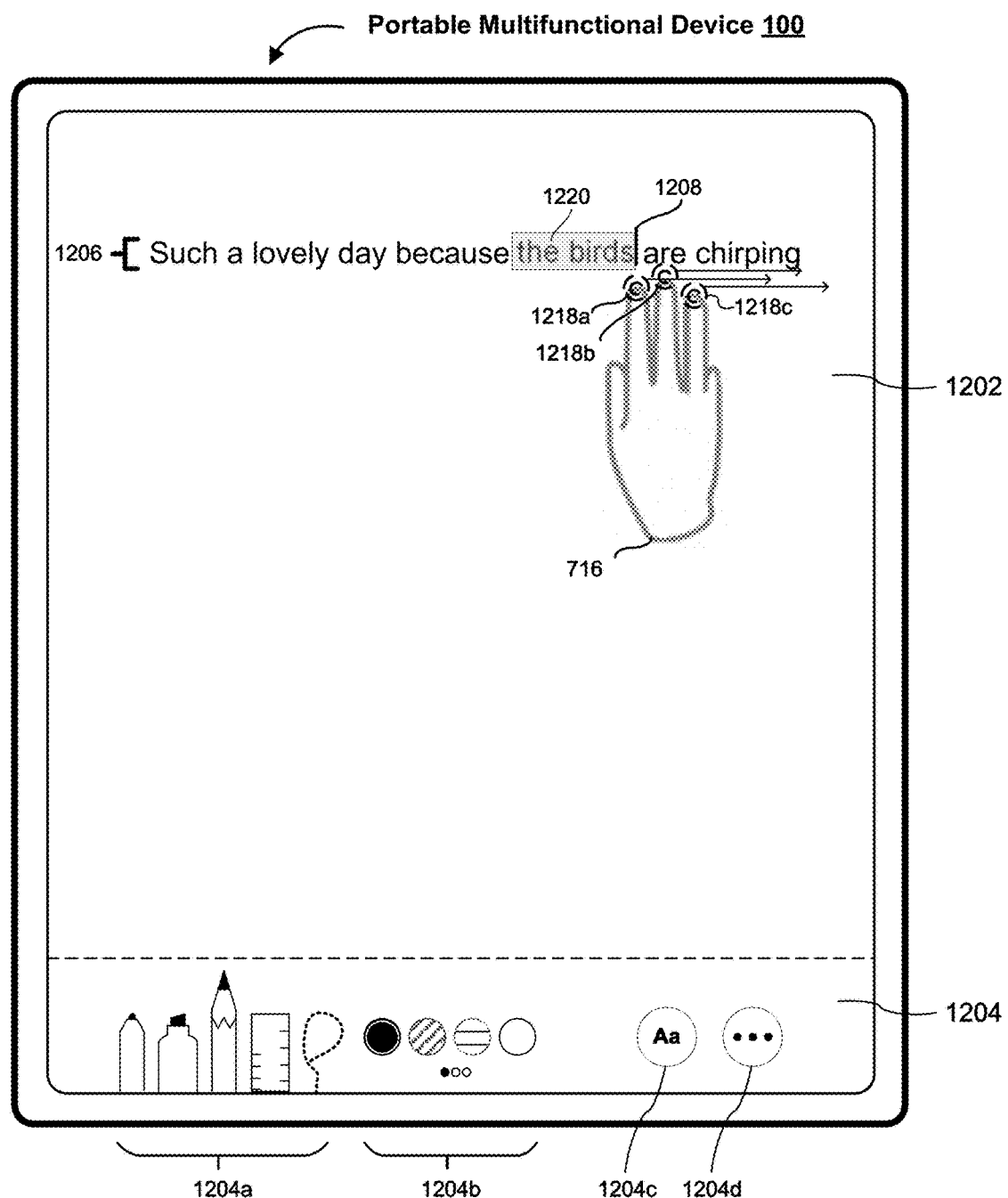
Figure 12G:
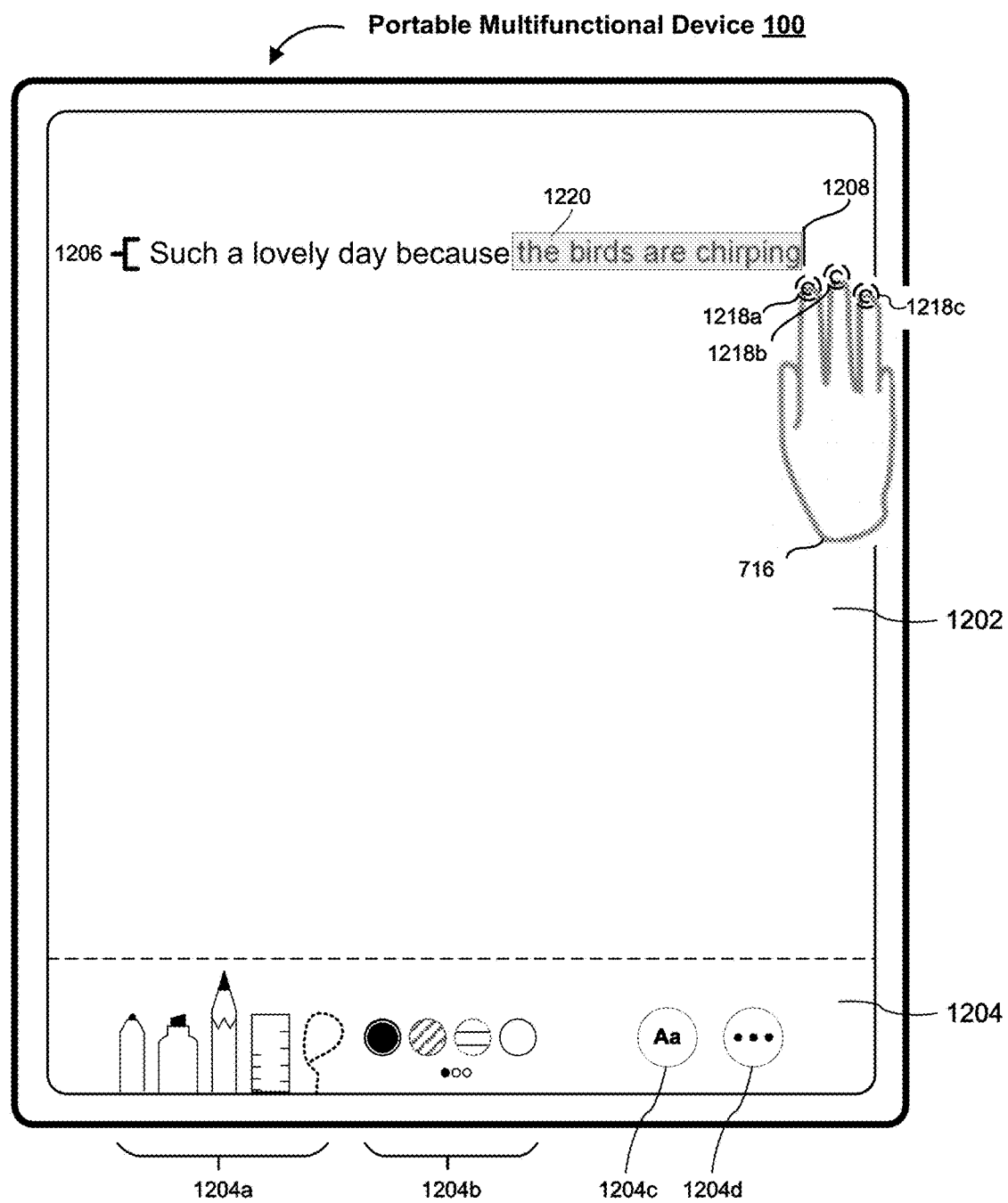

As illustrated in FIGS. 12E-12G, the electronic device 100 performs a selection operation on a subset of the text string 1206 based on a selection gesture. Namely, as illustrated in FIG. 12E, the electronic device 100 detects a first three-finger drag gesture 1218 that is performed with a first contact 1218a, a second contact 1218b, and a third contact 1218c. The first three-finger drag gesture 1218 moves in a substantially rightwards direction along the text string 1206. One of ordinary skill in the art will appreciate that, in some embodiments, the electronic device 100 performs a selection operation based on a drag gesture performed with fewer or greater than three contacts and/or in different directions. In some embodiments, as the first three-finger drag gesture 1218 proceeds, one or more of the first contact 1218a, the second contact 1218b, and the third contact 1218c remain within a threshold distance from the text string 1206.

As illustrated in FIG. 12F, in response to detecting a first portion of the first three-finger drag gesture 1218, the electronic device 100 displays a selection indicator 1220 that emphasizes (e.g., distinguishes, highlights, places a box around) a corresponding portion of the text string 1206 based on the current location of the first three-finger drag gesture 1218. Moreover, the electronic device 100 moves the first cursor 1208 based on the current location of the first three-finger drag gesture 1218. As illustrated in FIG. 12G, the electronic device 100 detects a second portion of the first three-finger drag gesture 1218 and, in response, expands the selection indicator 1220 and moves the first cursor 1208 based on the current location of the first three-finger drag gesture 1218. Thus, in response to detecting the first three-finger drag gesture 1218, the electronic device 100 selects a first subset of the text string 1206 corresponding to "the birds are chirping."

Figure 12H:
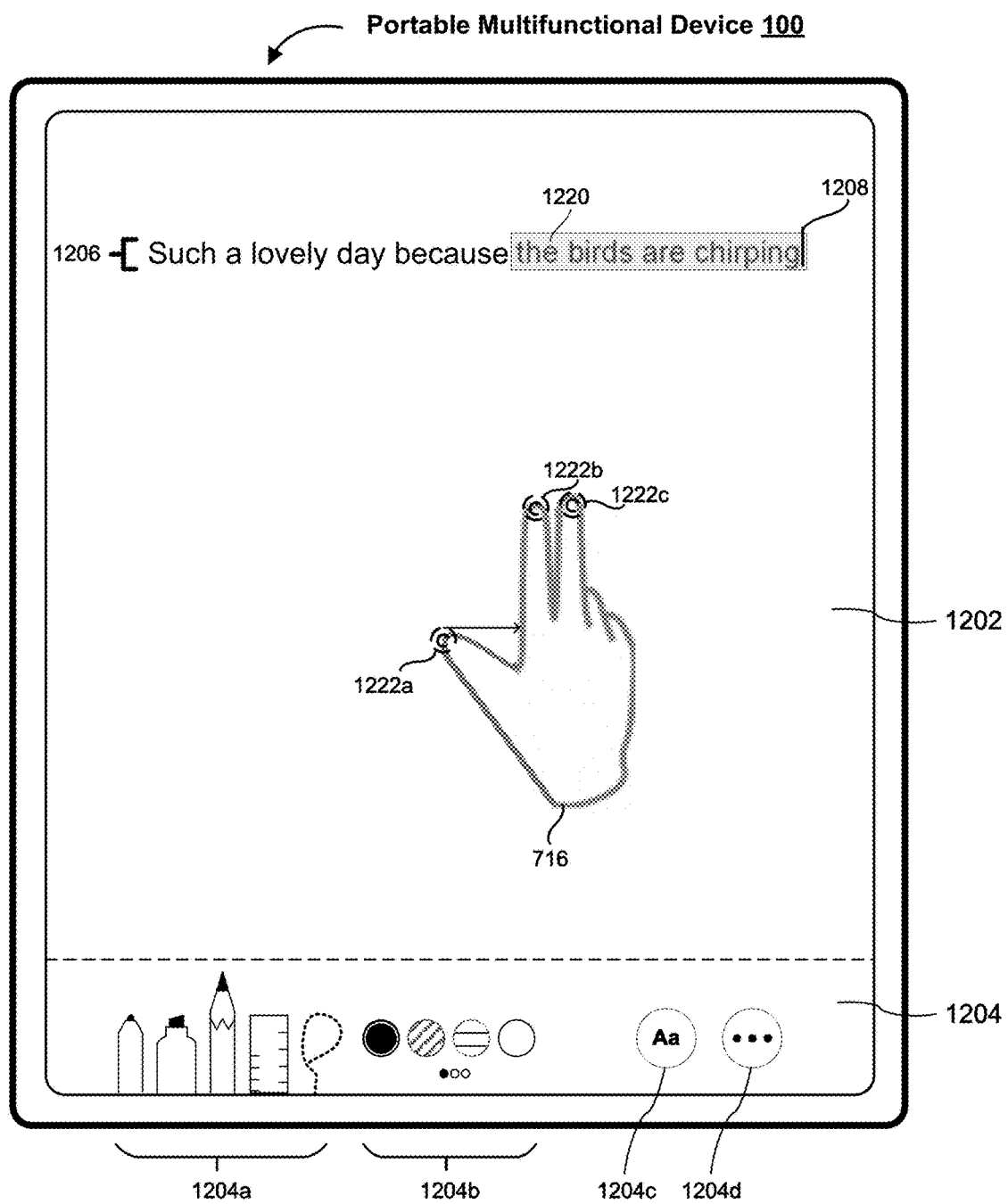
Figure 12I:
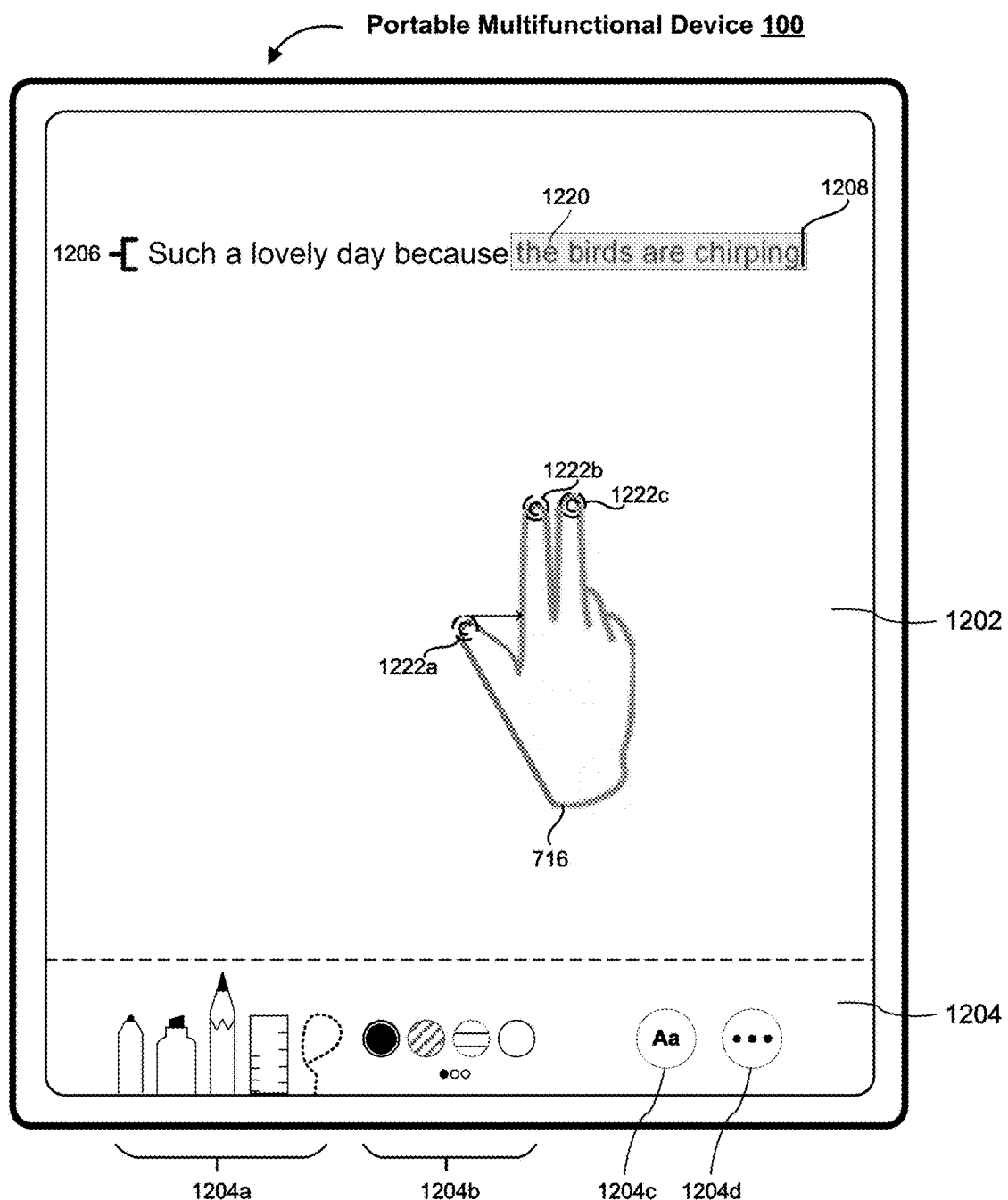

As illustrated in FIG. 12H, the electronic device 100 detects a first multi-contact pinch gesture 1222 performed with a first contact 1222a, a second contact 1222b, and a third contact 1222c. The first multi-contact pinch gesture 1222 including a first movement of two or more of the plurality of contacts (e.g., the first contact 1222a, the second contact 1222b, and the third contact 1222c) toward each other. Namely, as illustrated in FIG. 12H, the first contact 1222a moves towards the second contact 1222b and the third contact 1222c while the second contact 1222b and the third contact 1222c remain substantially stationary. In various embodiments, two or three of the first contact 1222a, the second contact 1222b, and the third contact 1222c concurrently move. For example, in some embodiments, the first contact 1222a moves substantially rightwards while the second contact 1222b and the third contact 1222c move substantially leftwards. As illustrated in FIG. 12I, the first contact 1222a continues to move closer to the second contact 1222b and the third contact 1222c.

Figure 12J:
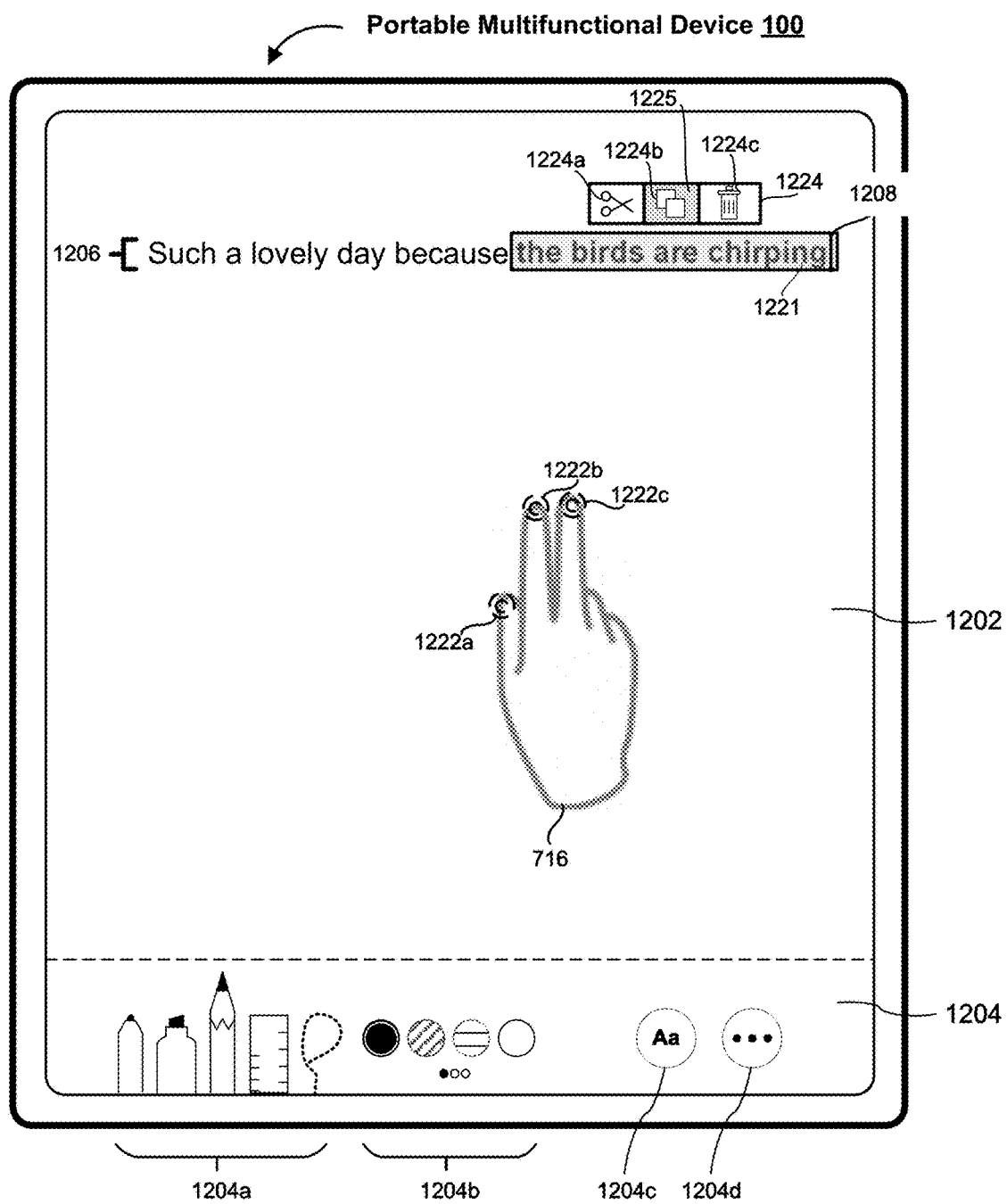

As illustrated in FIG. 12J, the electronic device 100 displays an interface 1224 including a plurality of content manipulation operation indicators 1224a-1224c. In some embodiments, the electronic device 100 displays the interface 1224 in response to detecting that a distance between two or more of the first contact 1222a, the second contact 1222b, and the third contact 1222c satisfies a distance threshold, such as the first contact 1222a moving sufficiently close to the second contact 1222b. The interface 1224 includes a cut operation indicator 1224a indicative of a cut operation, a copy operation indicator 1224b indicative of a copy operation, and a delete operation indicator 1224c indicative of a delete operation. In some embodiments, as illustrated in FIG. 12J, the electronic device 100 displays the interface 1224 proximate to the selected first subset of the text string 1206. One of ordinary skill in the art will appreciate that, in some embodiments, the interface 1224 includes a different number and/or arrangement of content manipulation operation indicators, optionally corresponding to different content manipulation operations. Moreover, the electronic device 100 displays a first color overlay 1225 within the copy operation indicator 1224b in order to indicate that the copy operation is currently selected. In other words, in response to detecting the first multi-contact pinch gesture 1222, the electronic device 100 performs the copy operation. Moreover, the electronic device 100 changes an appearance of the first subset of the text string 1206 corresponding to "the birds are chirping." Namely, the electronic device 100 displays a second color overlay 1221 and displays, within the second color overlay 1221, the first subset of the text string 1206 with boldened features. In this way, the electronic device 100 indicates which portion of content is the target of a particular content manipulation operation.

Figure 12K:
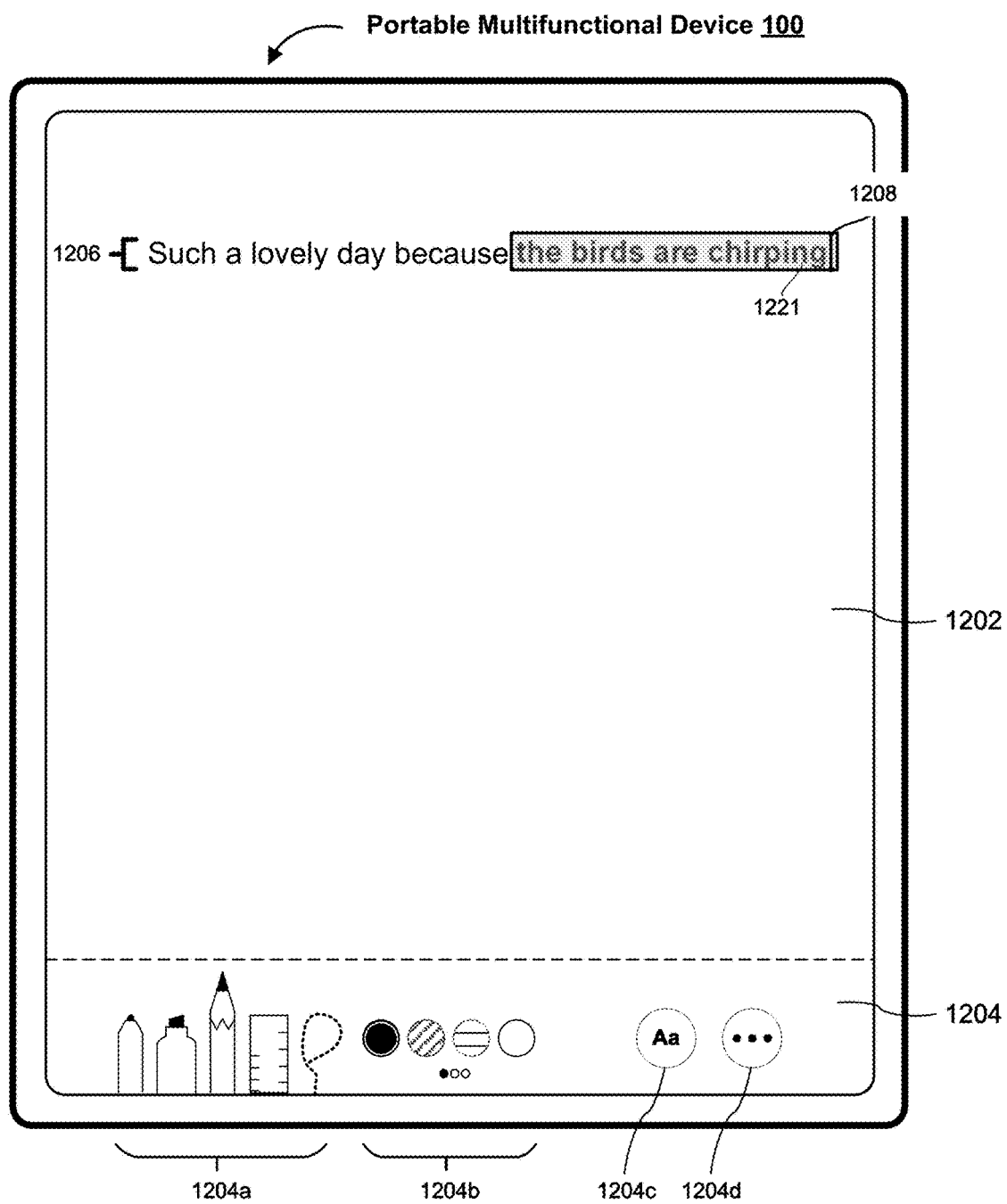

As illustrated in FIG. 12K, in response to detecting termination of the first multi-contact pinch gesture 1222, the electronic device 100 ceases to display the interface 1224. In some embodiments, as illustrated in FIG. 12K, the electronic device 100 maintains display of the second color overlay 1221 including the boldened first subset of the text string 1206 in order to indicate that the first subset of the text string 1206 has been copied.

Figure 12L:
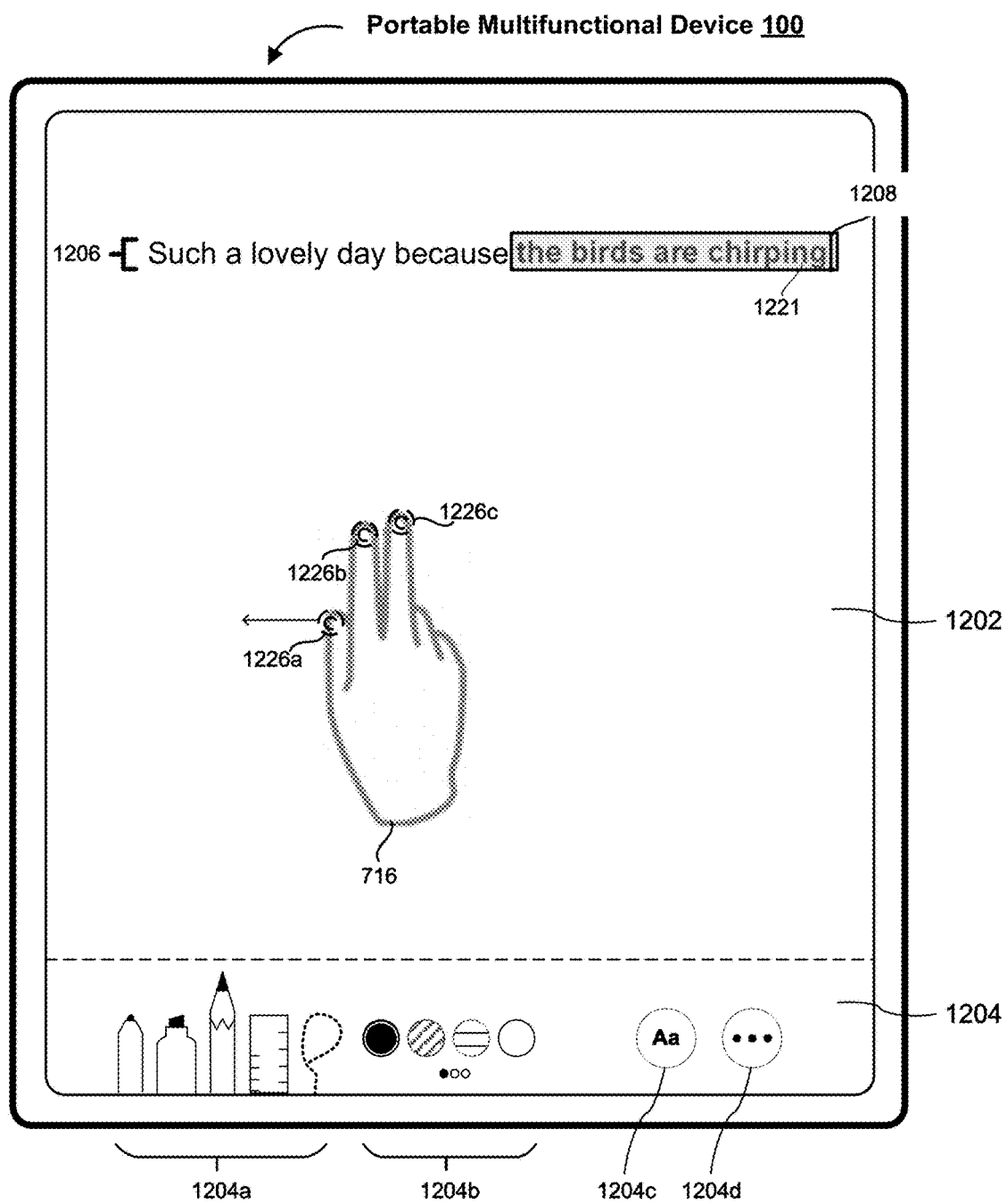

As illustrated in FIG. 12L, the electronic device 100 detects a first multi-finger de-pinch gesture 1226 performed with a first contact 1226a, a second contact 1226b, and a third contact 1226c. The first multi-finger de-pinch gesture 1226 includes a first movement of two or more of the plurality of contacts (e.g., the first contact 1226a, the second contact 1226b, and the third contact 1226c) away from each other. Namely, as illustrated in FIG. 12L, the first contact 1226a moves away from the second contact 1226b and the third contact 1226c while the second contact 1226b and the third contact 1226c remain substantially stationary. In various embodiments, two or three of the first contact 1226a, the second contact 1226b, and the third contact 1226c concurrently move. For example, in some embodiments, the first contact 1226a moves substantially leftwards while the second contact 1226b and the third contact 1226c move substantially rightwards.

Figure 12M:
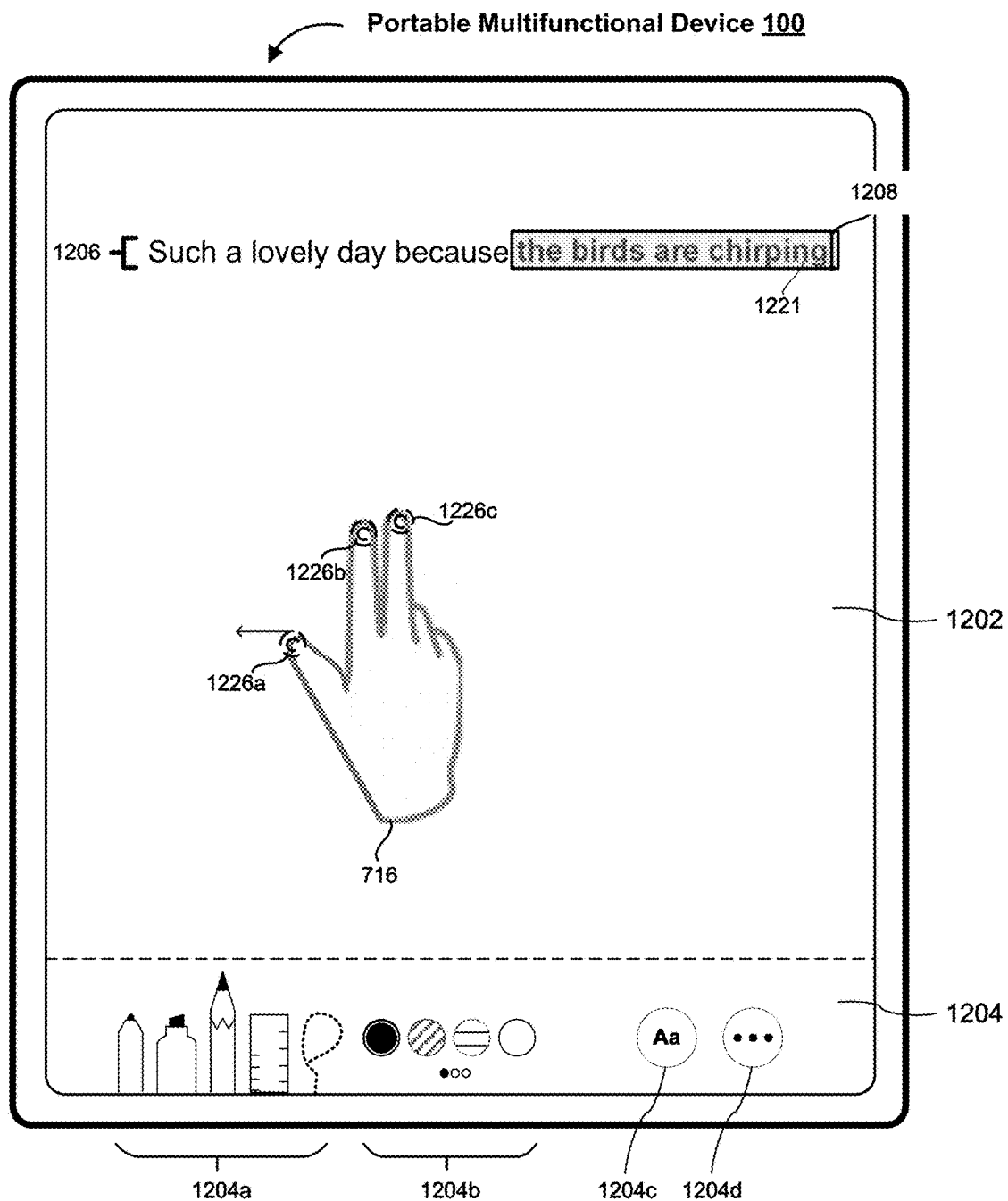
Figure 12N:
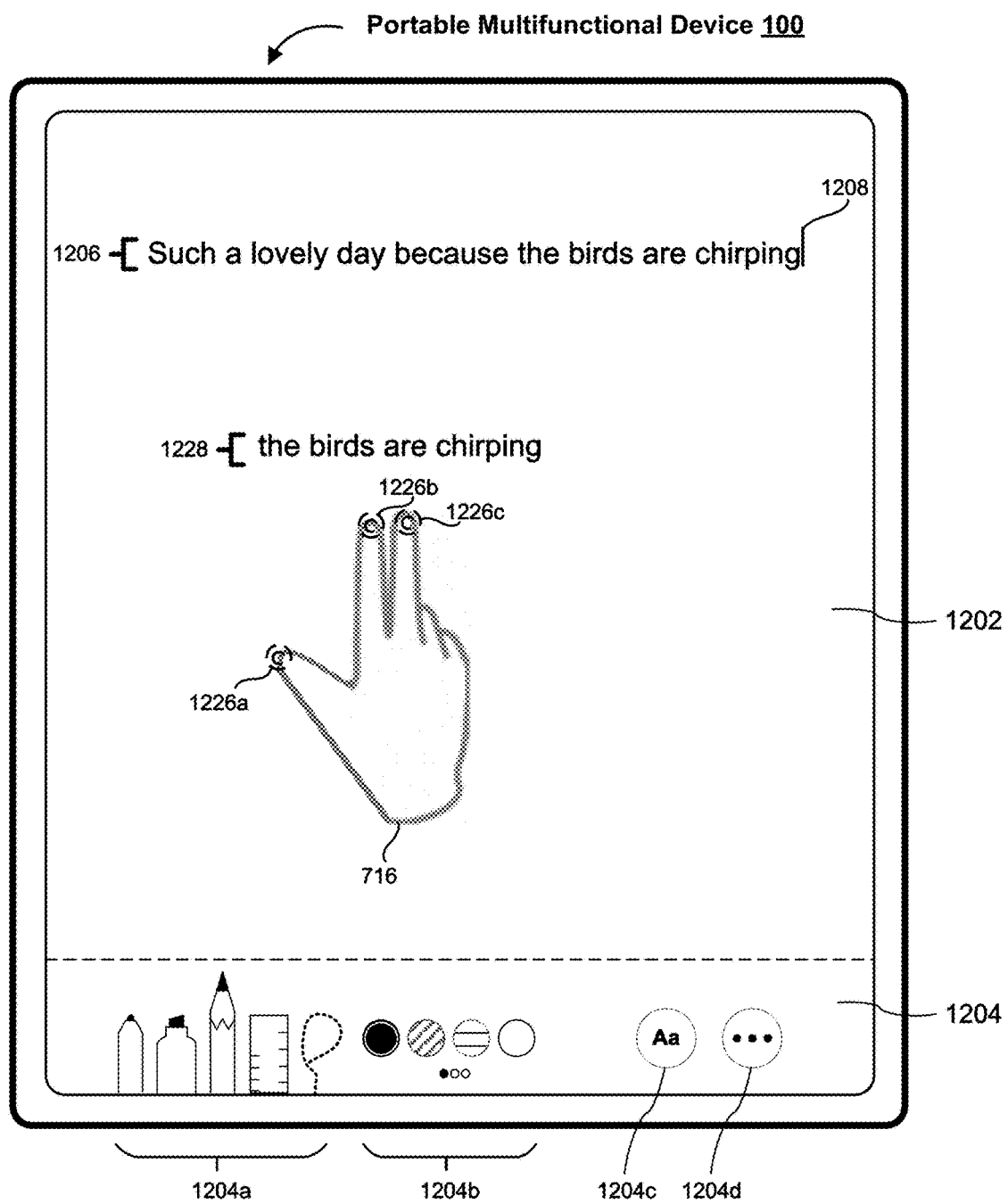
Figure 12O:
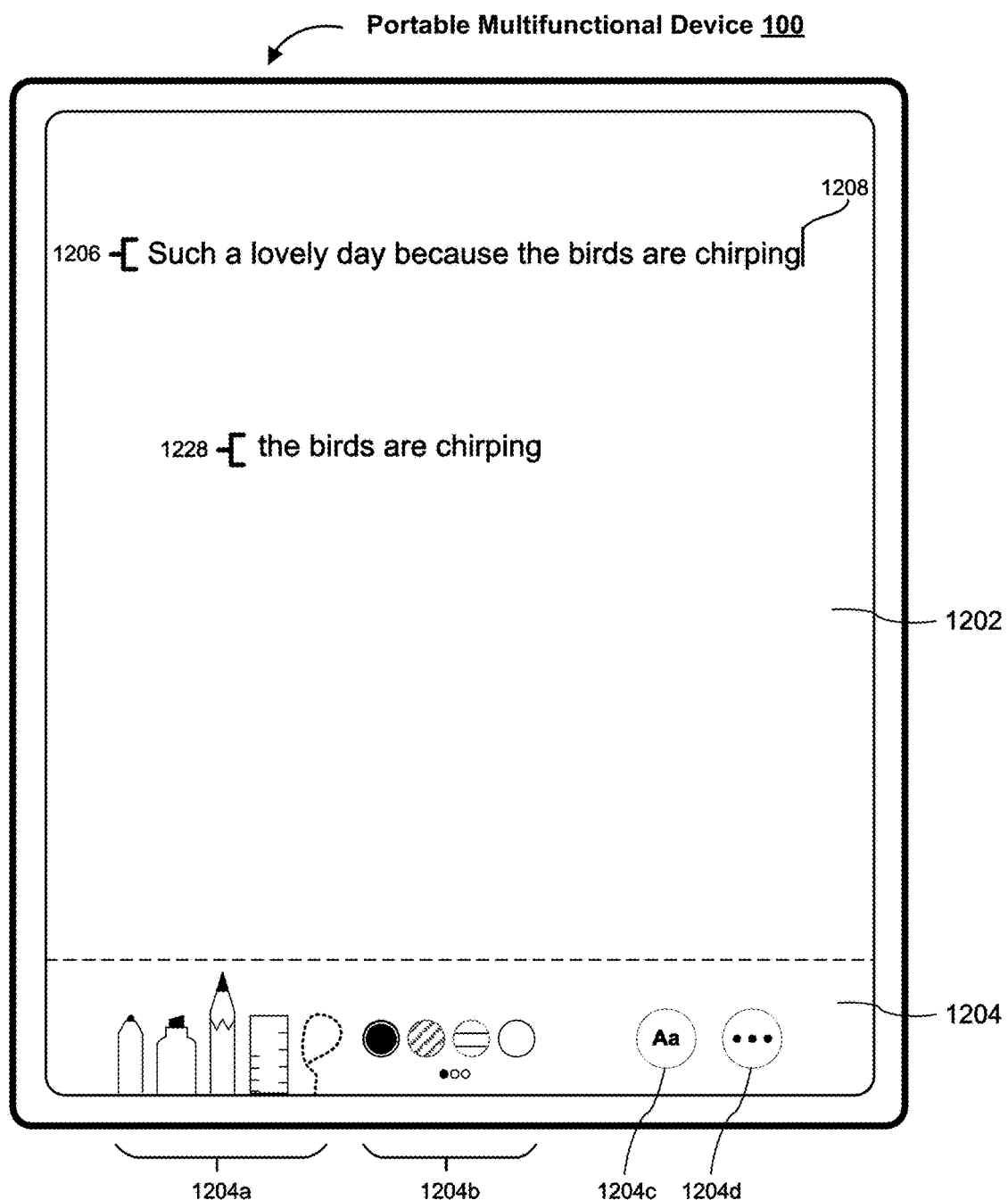

As illustrated in FIGS. 12M and 12N, the first contact 1226a continues to move away from the second contact 1226b and the third contact 1226c. In some embodiments, as illustrated in FIG. 12N, in response to detecting that the first contact 1226a moves a sufficient distance away from the second contact 1226b and the third contact 1226c, the electronic device 100 performs a paste operation on the currently copied first subset of the text string 1206. Namely, the electronic device 100 displays pasted text 1228 that corresponds to the first subset of the text string 1206. In some embodiments, the electronic device 100 displays the pasted text 1228 proximate to the location of the first multi-finger de-pinch gesture 1226 on the touch-sensitive surface. Moreover, the electronic device 100 ceases to display the second color overlay 1221 and restores the first subset of the text string 1206 (e.g., removes boldened text). As illustrated in FIG. 12O, the electronic device 100 ceases to detect the first multi-finger de-pinch gesture 1226.

Figure 12P:
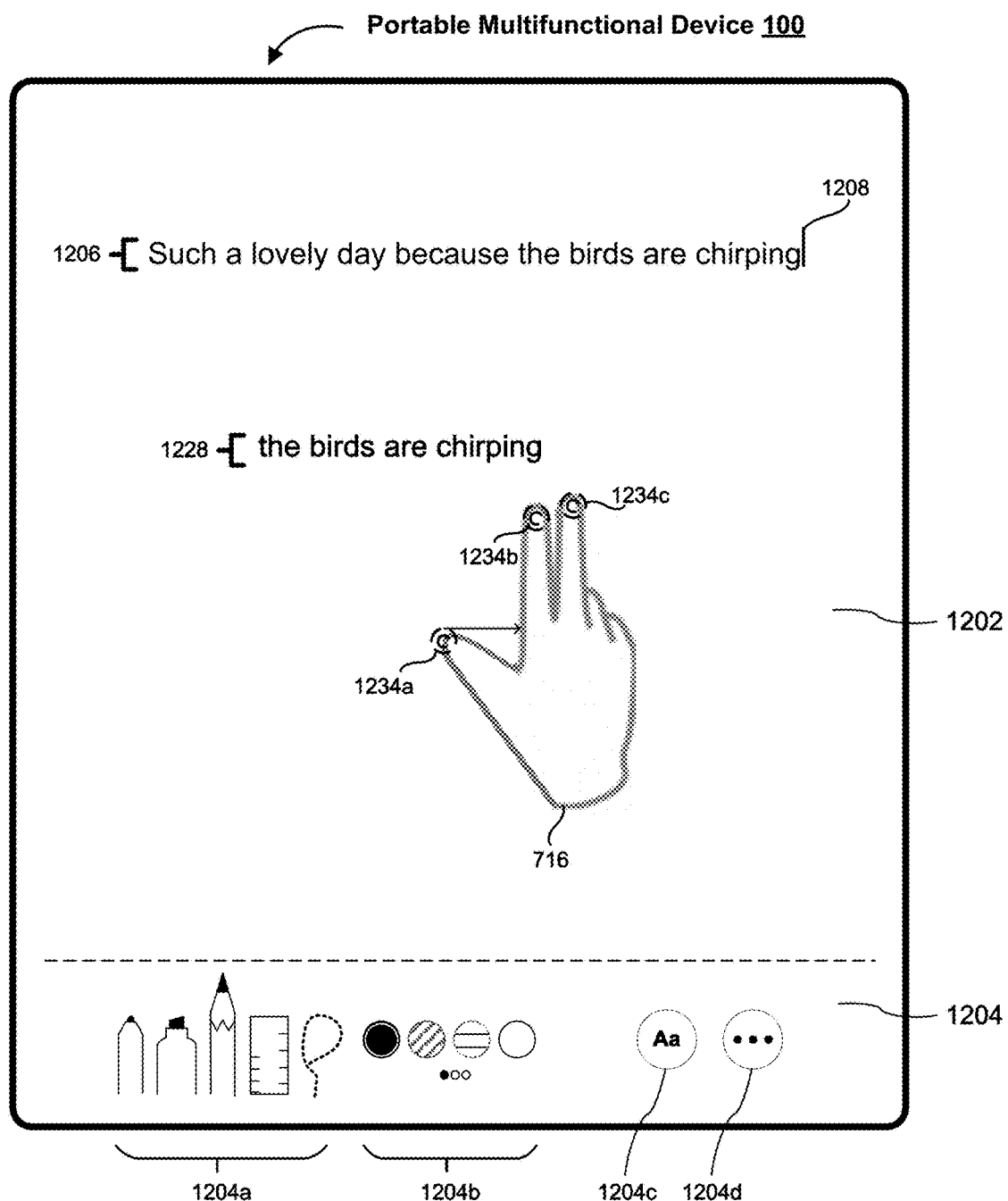
Figure 12Q:
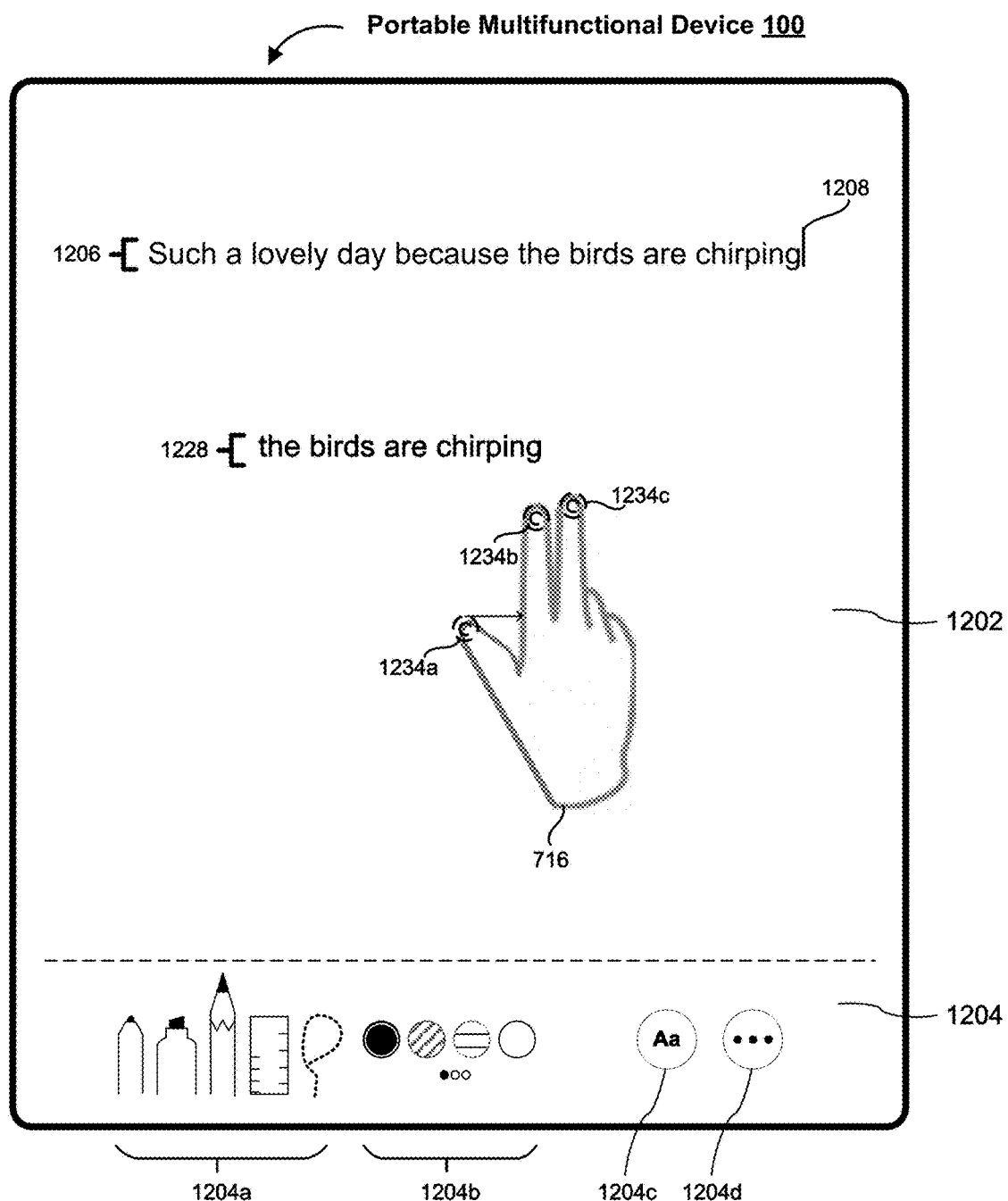
Figure 12R:
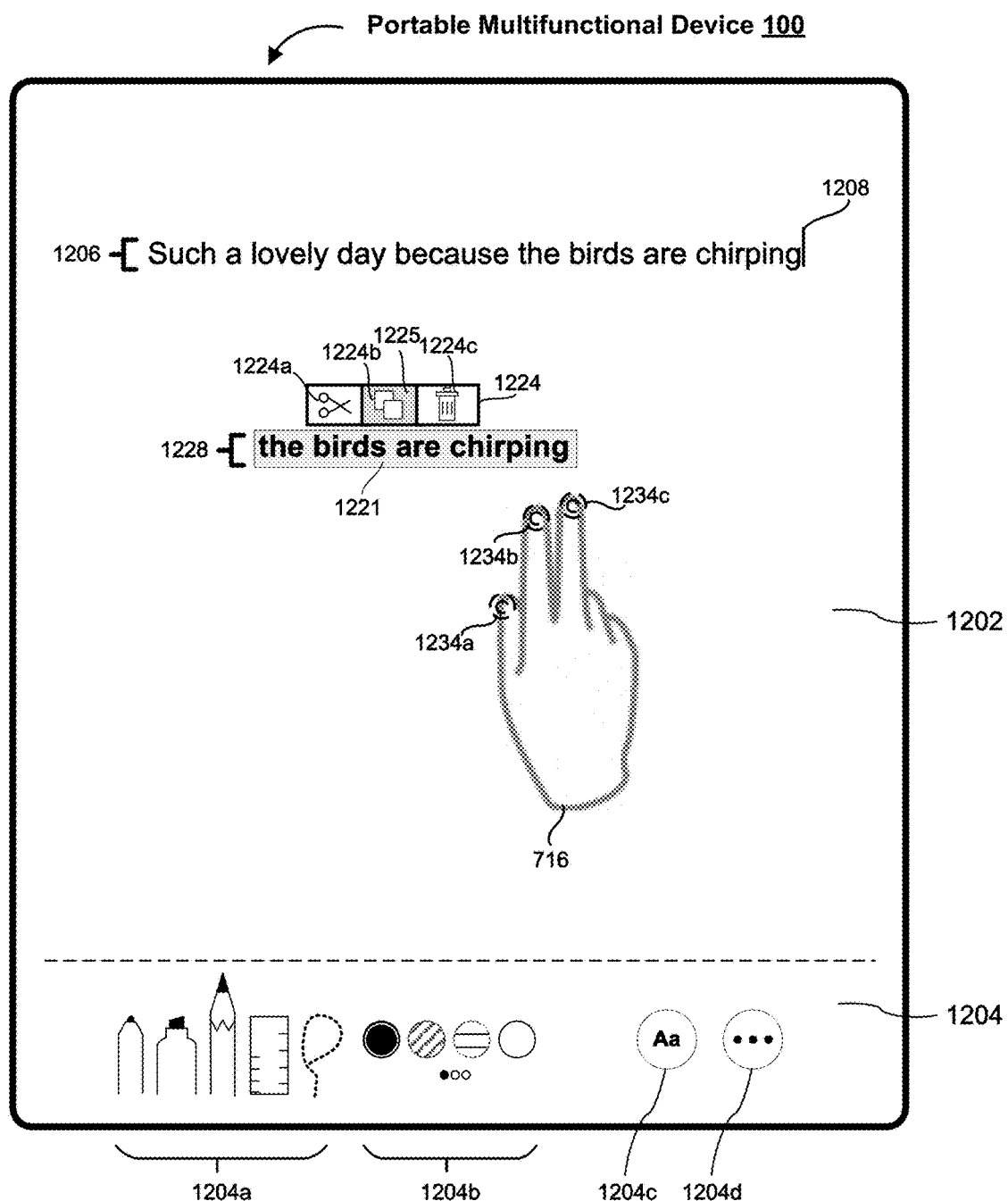

As illustrated in FIG. 12P, the electronic device 100 detects a second multi-contact pinch gesture 1234 performed with a first contact 1234a, a second contact 1234b, and a third contact 1234c. The second multi-contact pinch gesture 1234 includes a first movement of two or more of the plurality of contacts (e.g., the first contact 1234a, the second contact 1234b, and the third contact 1234c) toward each other. As illustrated in FIGS. 12Q and 12R, the first contact 1234a continues to move closer to the second contact 1234b and the third contact 1234c.

As illustrated in FIG. 12R, the electronic device 100 displays the interface 1224 and displays the first color overlay 1225 within the copy operation indicator 1224b in order to indicate that the copy operation is currently selected. In some embodiments, as illustrated in FIG. 12R, the electronic device 100 displays the interface 1224 proximate to the pasted text 1228. Moreover, the electronic device 100 displays the second color overlay 1221 and boldened pasted text 1228 within the second color overlay 1221 in order to indicate that the copy operation is associated with the pasted text 1228.

Figure 12S:
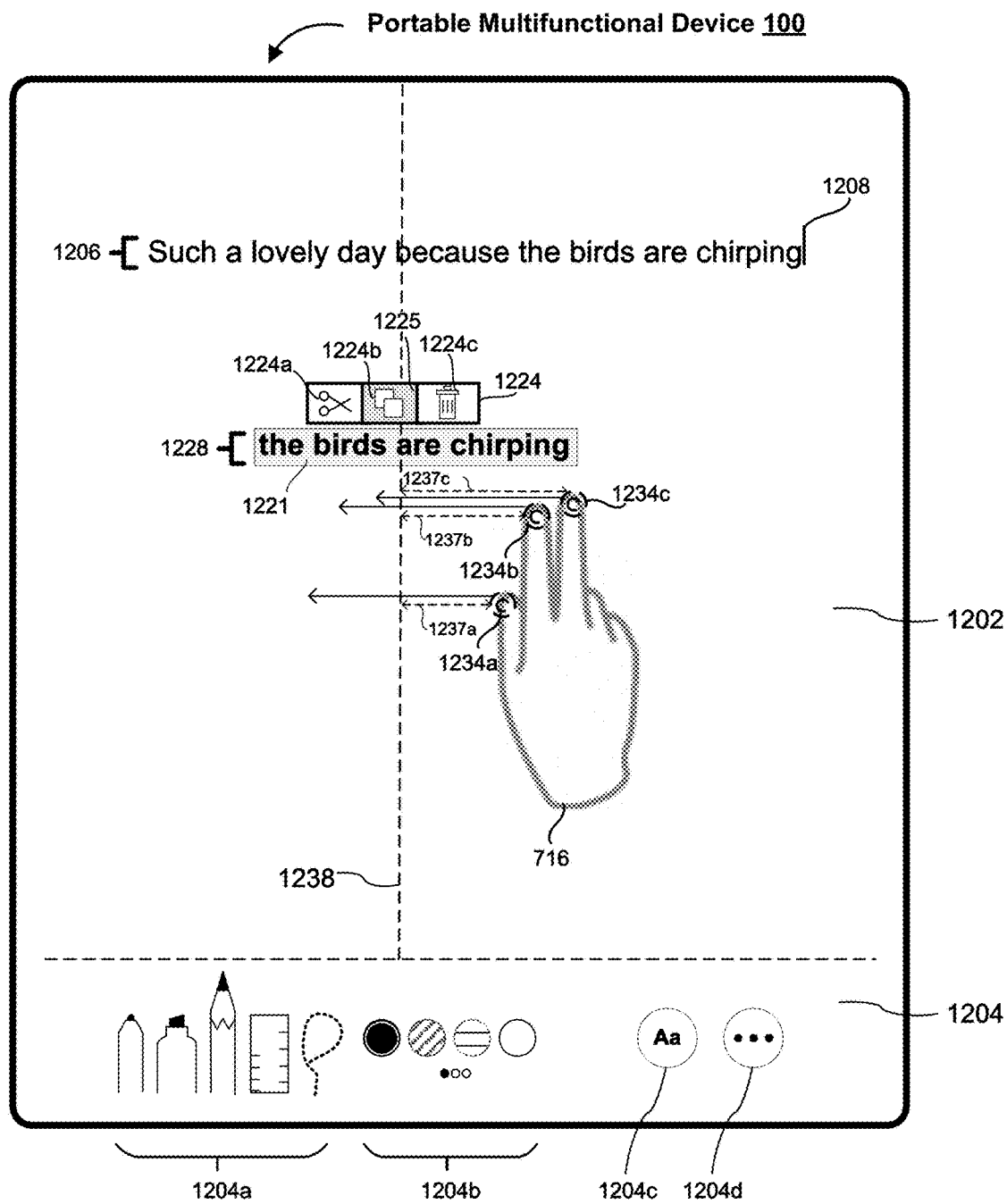

As illustrated in FIG. 12S, the electronic device 100 detects that the second multi-contact pinch gesture 1234 includes a second movement of more than a threshold amount of movement after detecting the first movement and before detecting release of the first contact 1234a, the second contact 1234b, and/or the third contact 1234c. The second movement includes a respective movement of the first contact 1234a, a respective movement of the second contact 1234*b*, and a respective movement of the third contact 1234*c*. In some embodiments, as illustrated in FIG. 12S, the second movement is in substantially the leftwards direction and crosses a first threshold line 1238, which is illustrated for purely explanatory purposes. In various embodiments, the first threshold line 1238 corresponds to a threshold distance from one of a respective origin of the movement of the first contact 1234*a*, a respective origin of the movement of the second contact 1234*b*, or a respective origin of the movement of the third contact 1234*c*. For example, as illustrated in FIG. 12S, in some embodiments, the threshold amount of movement corresponds to a first distance 1237*a* between the origin point of the first contact 1234*a* and the first threshold line 1238, a second distance 1237*b* between the origin point of the second contact 1234*b* and the first threshold line 1238, a third distance 1237*c* between the origin point of the third contact 1234*c* and the first threshold line 1238, or a combination thereof. The first distance 1237*a*, the second distance 1237*b*, and the third distance 1237*c* are illustrated for purely explanatory purposes.

Figure 12T:
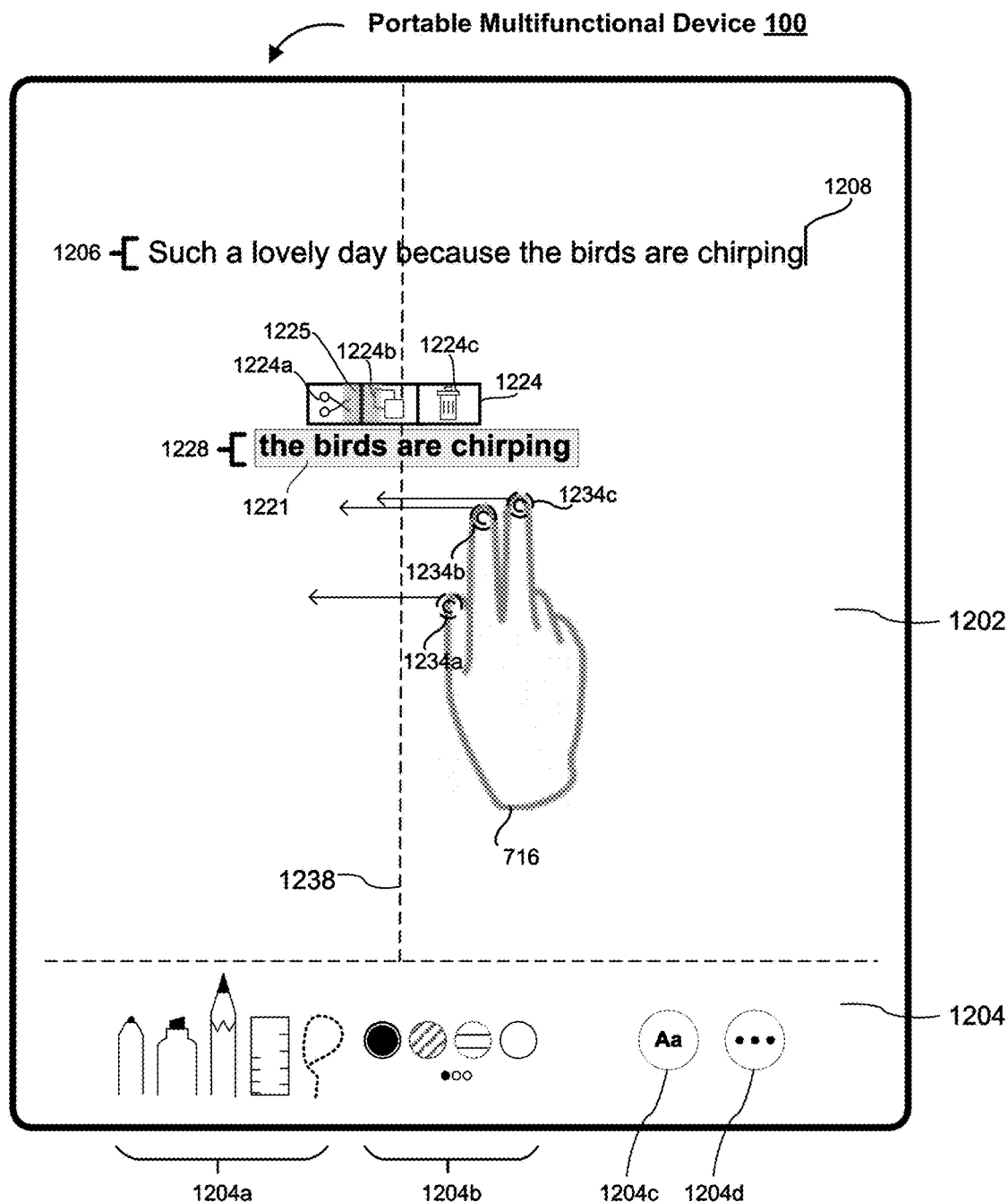
Figure 12U:
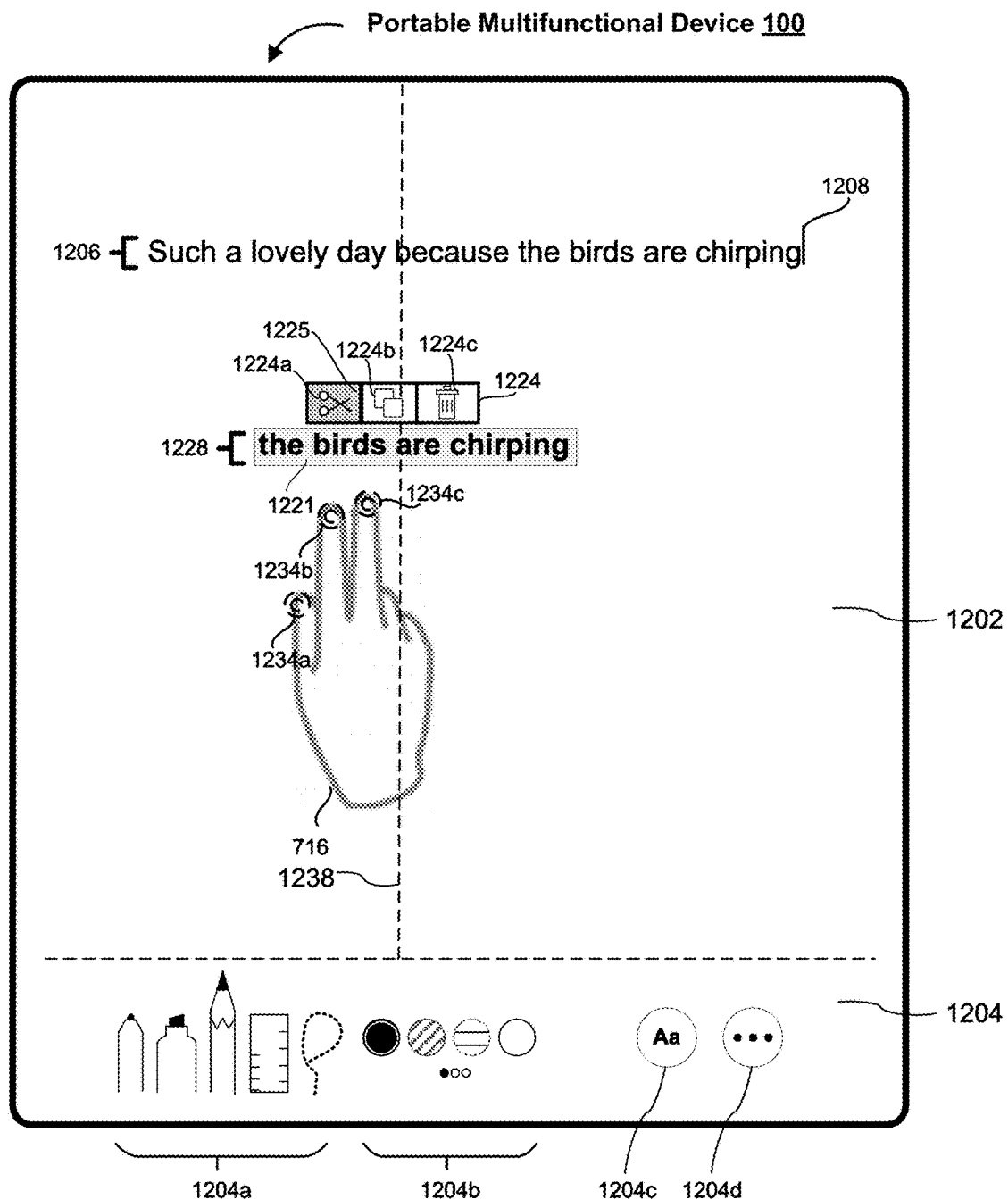
Figure 12V:
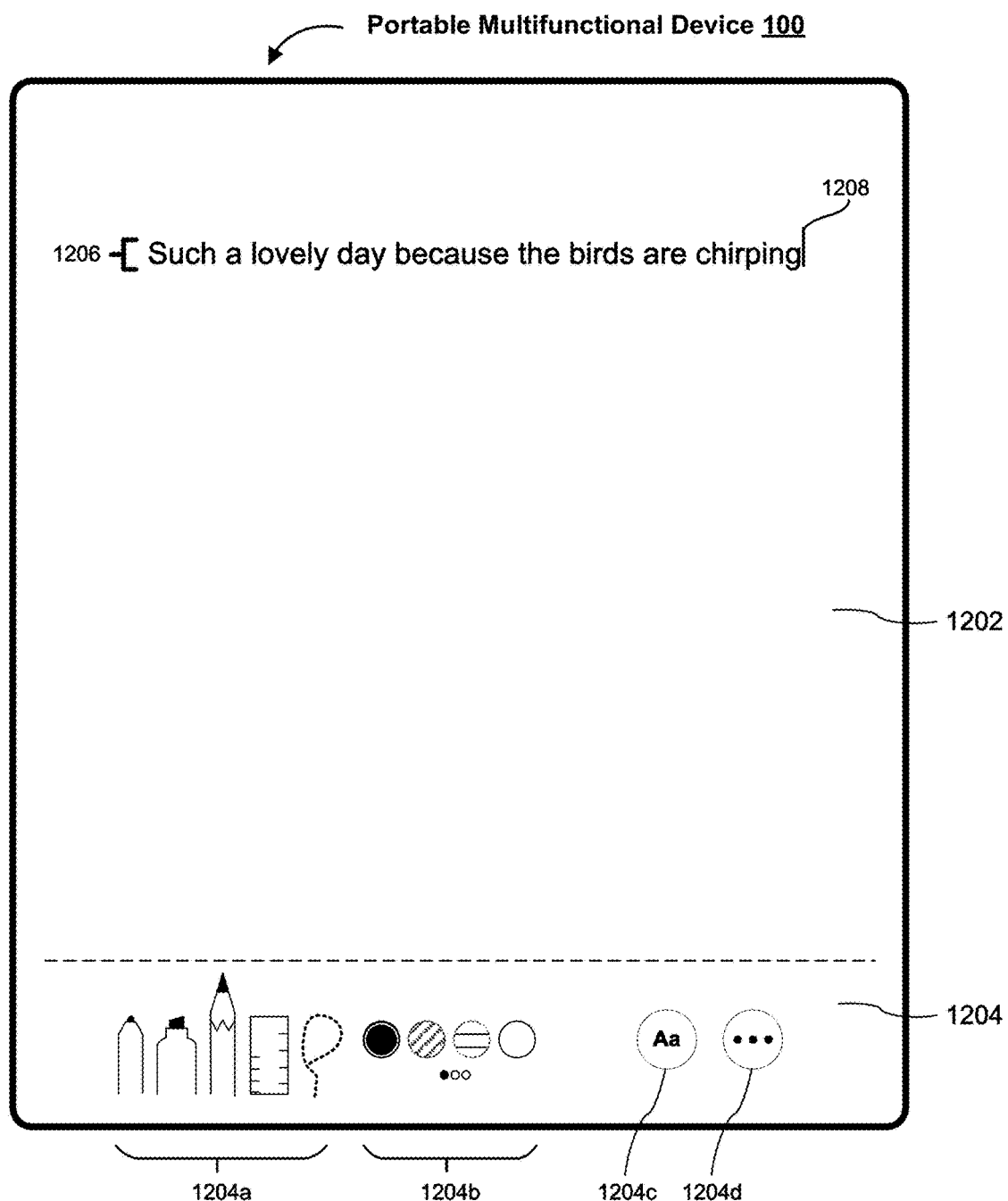

As illustrated in FIGS. 12T and 12U, while the second movement progresses closer to crossing the first threshold line 1238, the electronic device 100 correspondingly changes the first color overlay 1225 within the interface 1224. Namely, as illustrated in FIG. 12T, because the second movement is in substantially the leftwards direction and is approximately halfway to crossing the first threshold line 1238, the electronic device 100 moves the first color overlay 1225 leftwards so that half of the first color overlay 1225 is within the copy operation indicator 1224*b* and the other half of the first color overlay 1225 is within the cut operation indicator 1224*a*. As illustrated in FIG. 12U, in response to detecting the second movement cross the first threshold line 1238, the electronic device 100 moves the entirety of the first color overlay 1225 within the cut operation indicator 1224*a*. In this way, the electronic device 100 provides visual feedback that the second multi-contact pinch gesture 1234 is no longer associated with a copy operation and instead is associated with a cut operation. As illustrated in FIG. 12V, in response to ceasing to detect the first contact 1234*a*, the second contact 1234*b*, and the third contact 1234*c*, the electronic device 100 performs a cut operation on the pasted text 1228 and ceases to display the interface 1224.

Figure 12W:
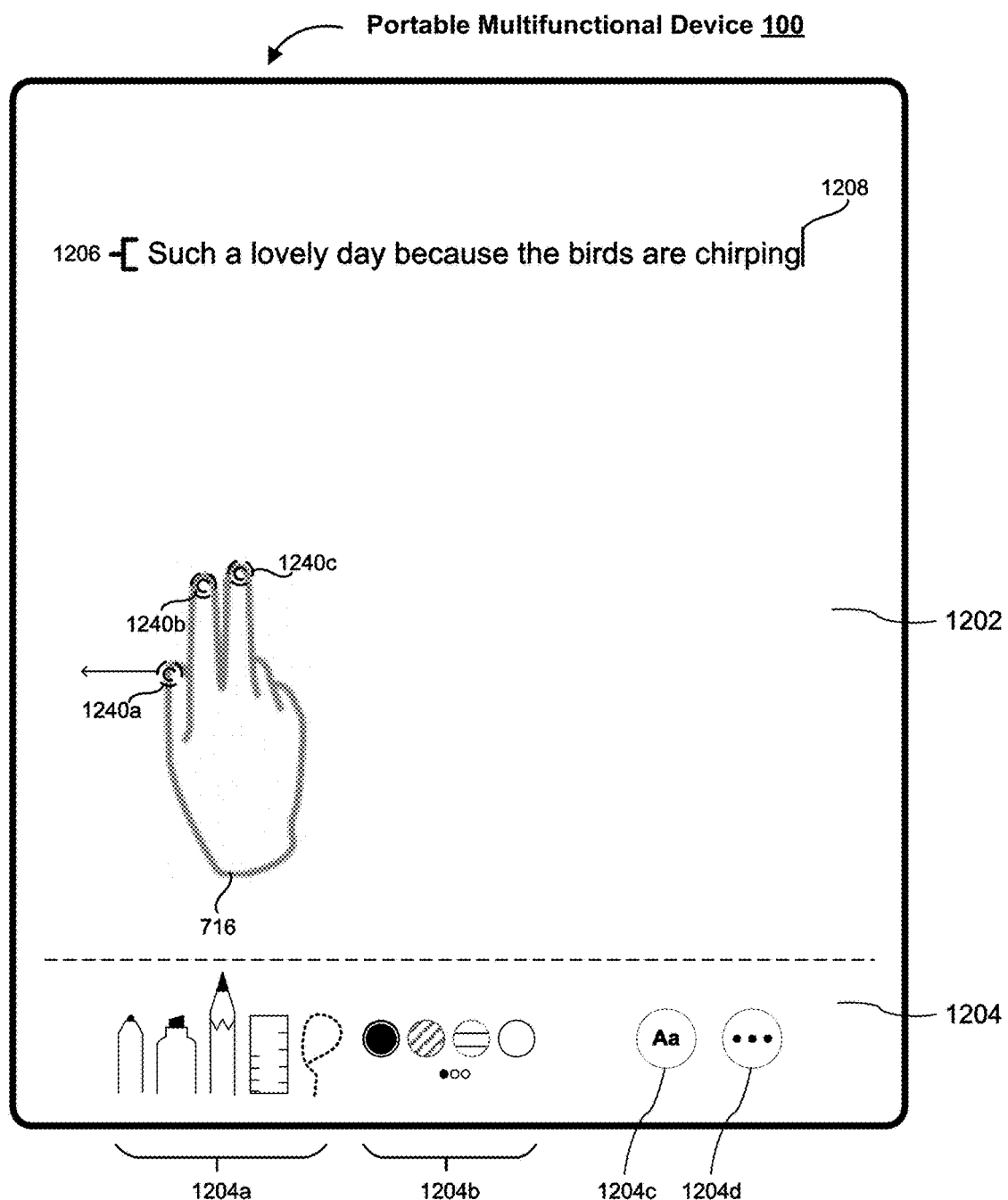

As illustrated in FIG. 12W, the electronic device 100 detects a second multi-finger de-pinch gesture 1240 performed with a first contact 1240*a*, a second contact 1240*b*, and a third contact 1240*c*. The second multi-finger de-pinch gesture 1240 includes a first movement of two or more of the plurality of contacts (e.g., the first contact 1240*a*, the second contact 1240*b*, and the third contact 1240*c*) away from each other. Namely, as illustrated in FIG. 12W, the first contact 1240*a* moves away from the second contact 1240*b* and the third contact 1240*c* while the second contact 1240*b* and the third contact 1240*c* remain substantially stationary. In various embodiments, two or three of the first contact 1240*a*, the second contact 1240*b*, and the third contact 1240*c* concurrently move. For example, in some embodiments, the first contact 1240*a* moves substantially leftwards while the second contact 1240*b* and the third contact 1240*c* move substantially rightwards.

Figure 12X:
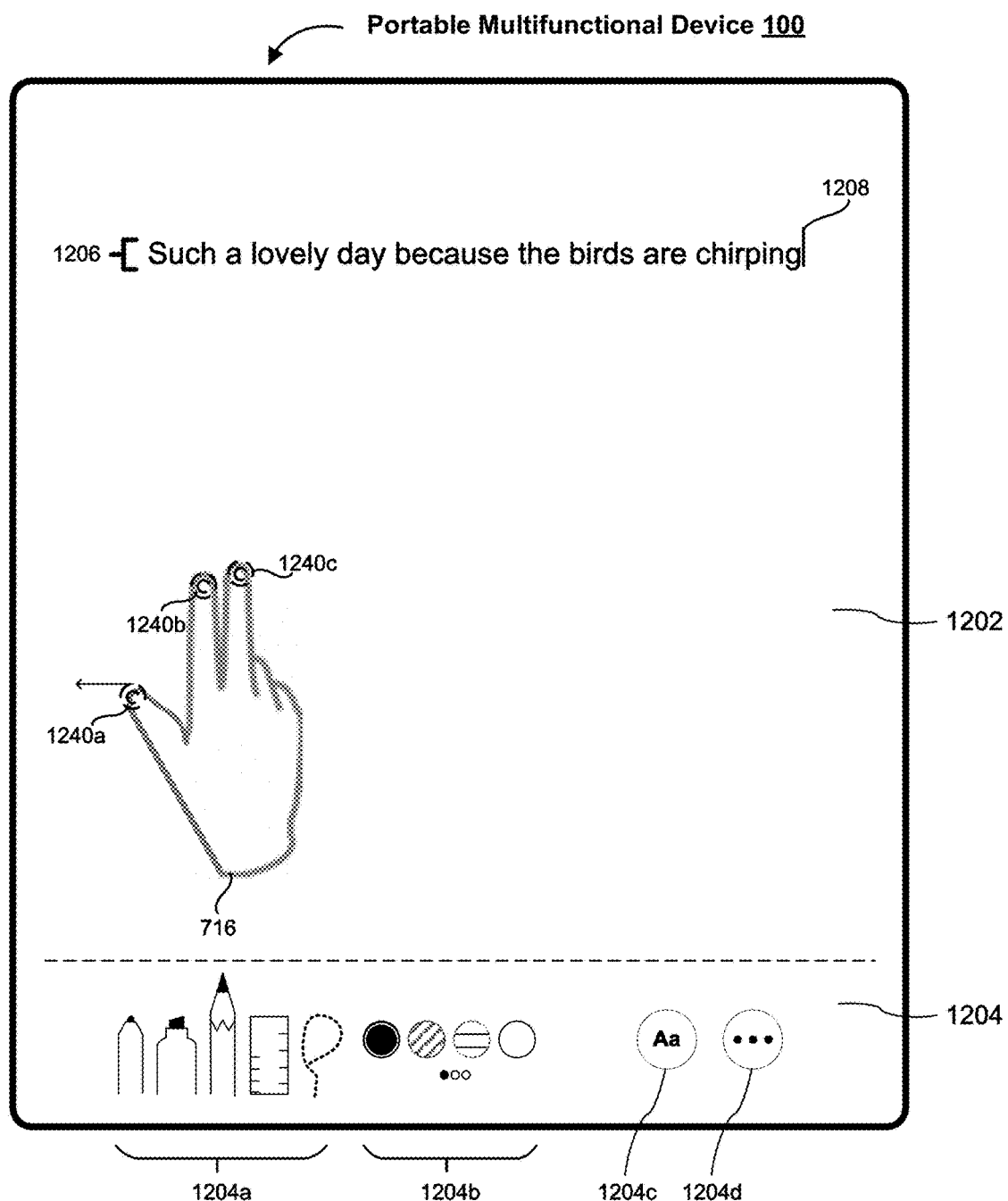
Figure 12Y:
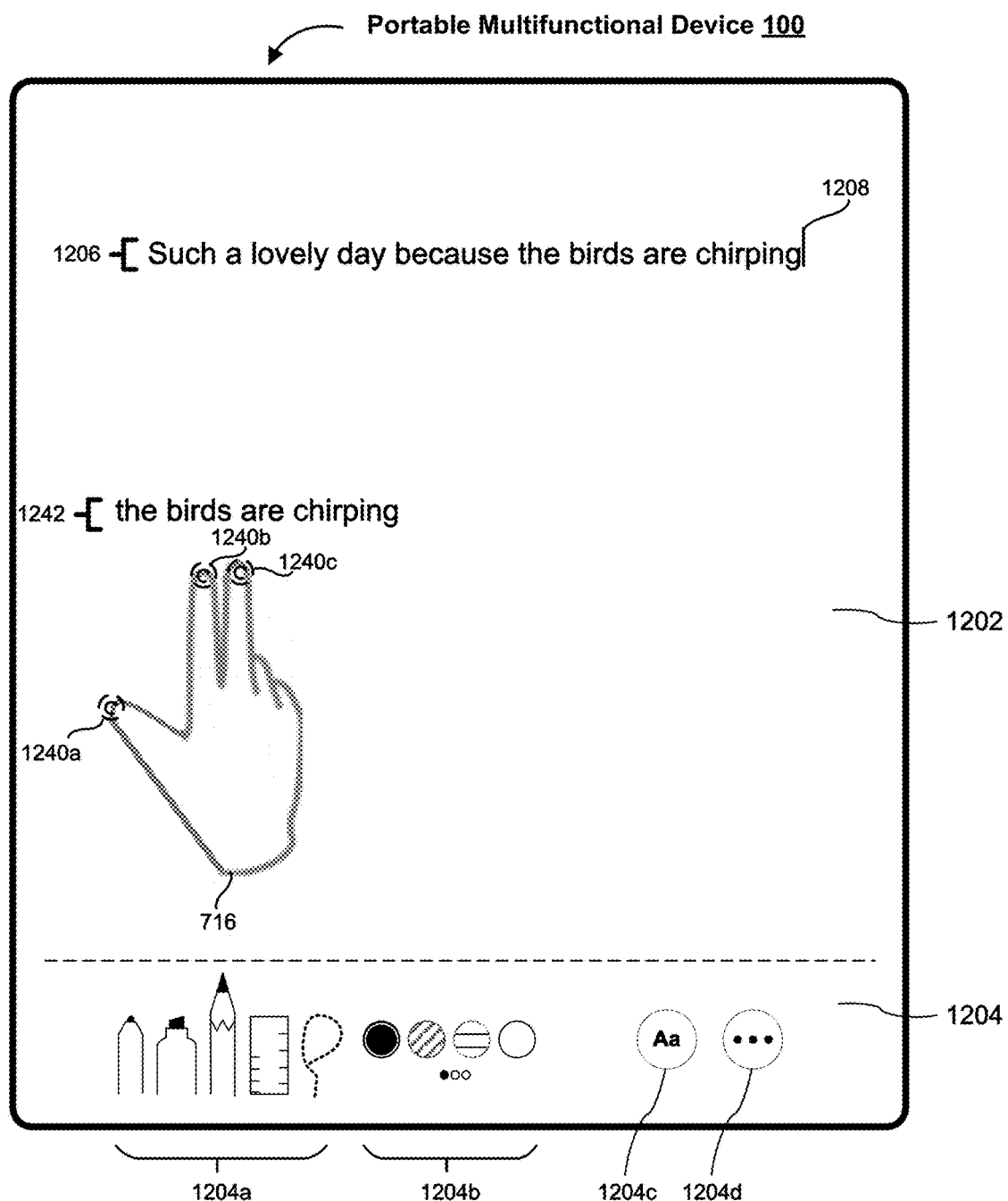

As illustrated in FIGS. 12X and 12Y, the first contact 1240*a* continues to move away from the second contact 1240*b* and the third contact 1240*c*. In some embodiments, as illustrated in FIG. 12Y, in response to detecting that the first contact 1240*a* moves a sufficient distance away from the second contact 1240*b* and the third contact 1240*c*, the electronic device 100 performs a paste operation on the previously cut content. Namely, the electronic device 100 pastes previously cut text 1242. In some embodiments, the electronic device 100 pastes the previously cut text 1242 proximate to the location of the second multi-finger de-pinch gesture 1240 on the touch-sensitive surface.

Figure 12Z:
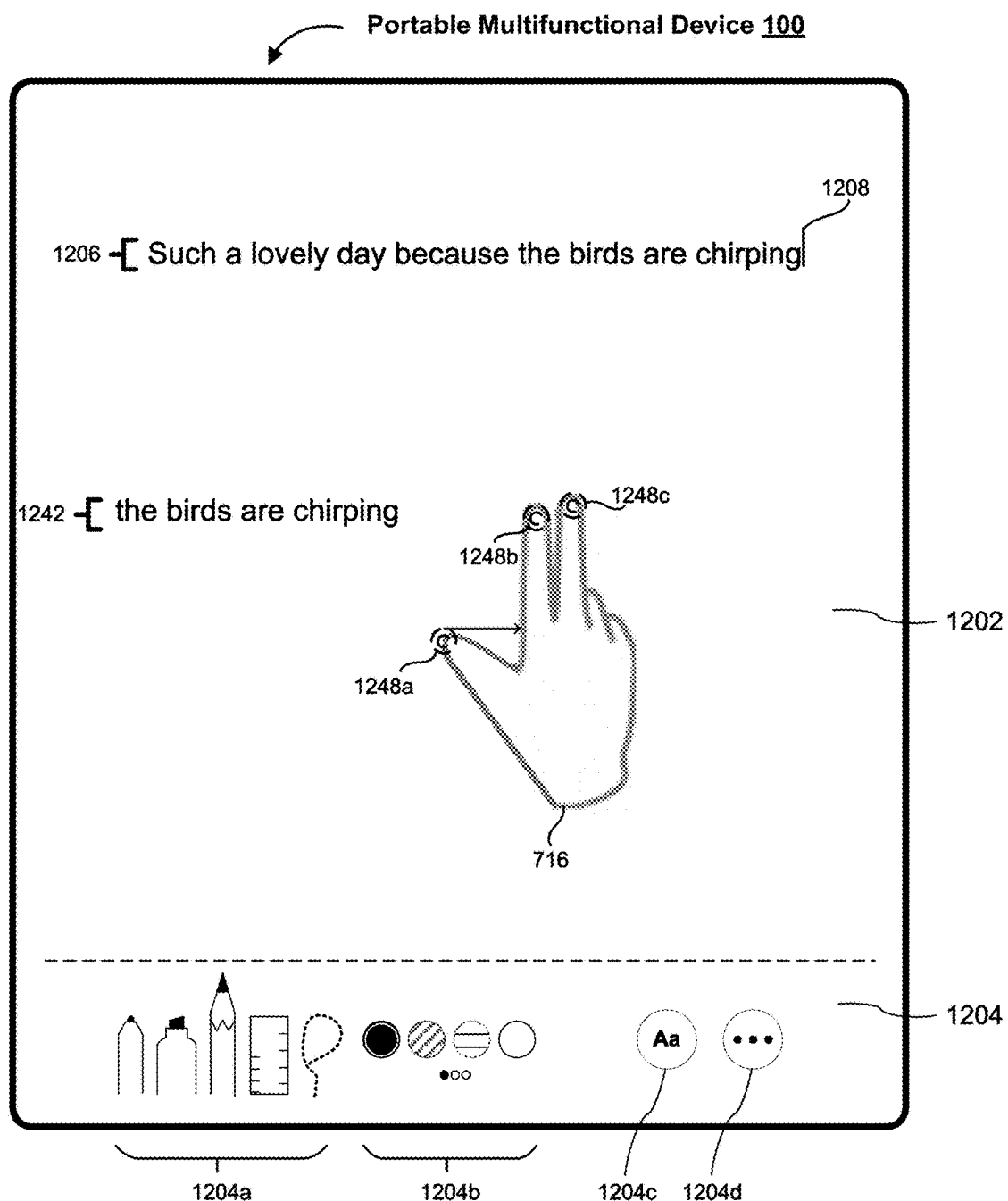
Figure 12A:
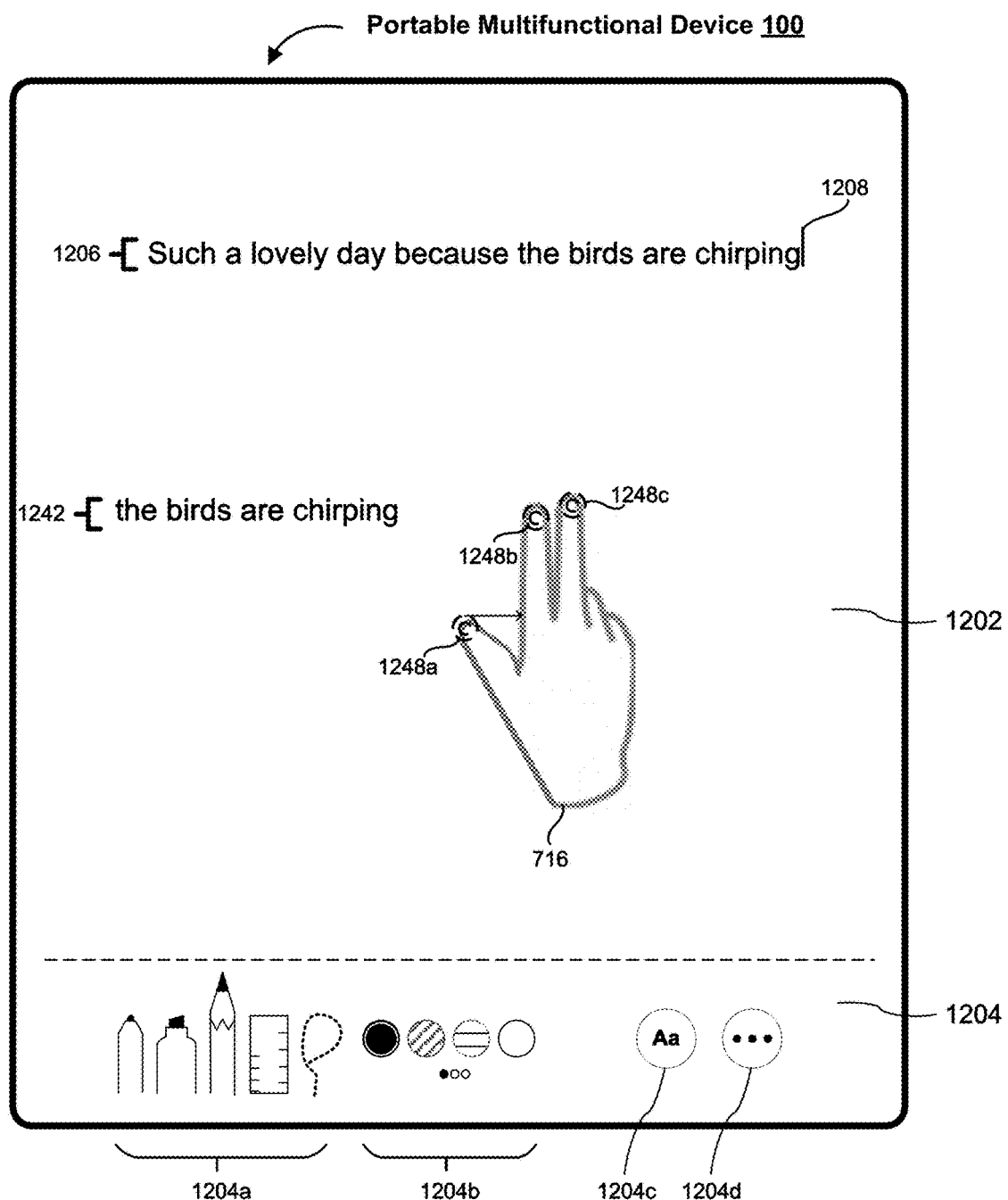
Figure 12A:
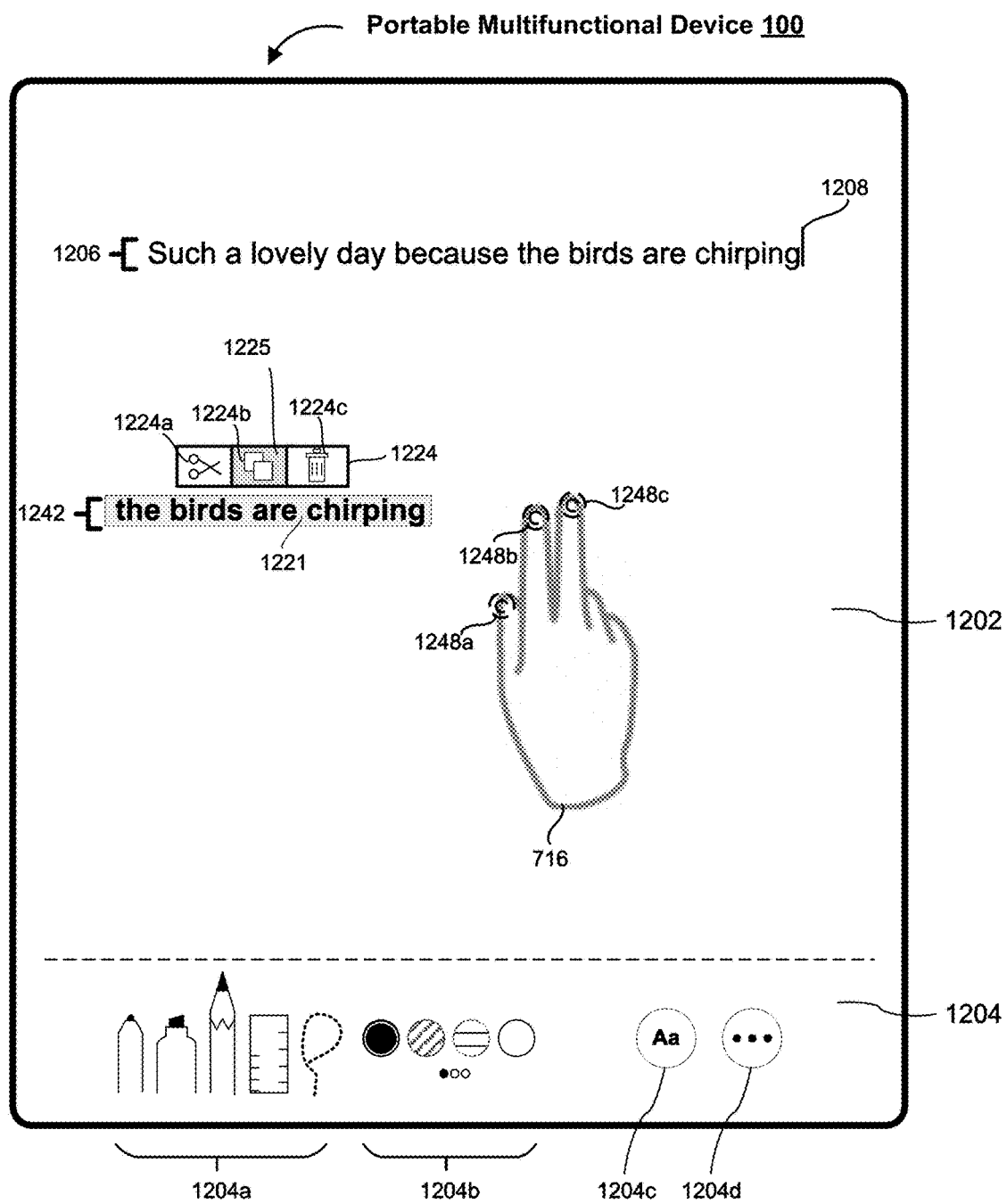
Figure 12A:
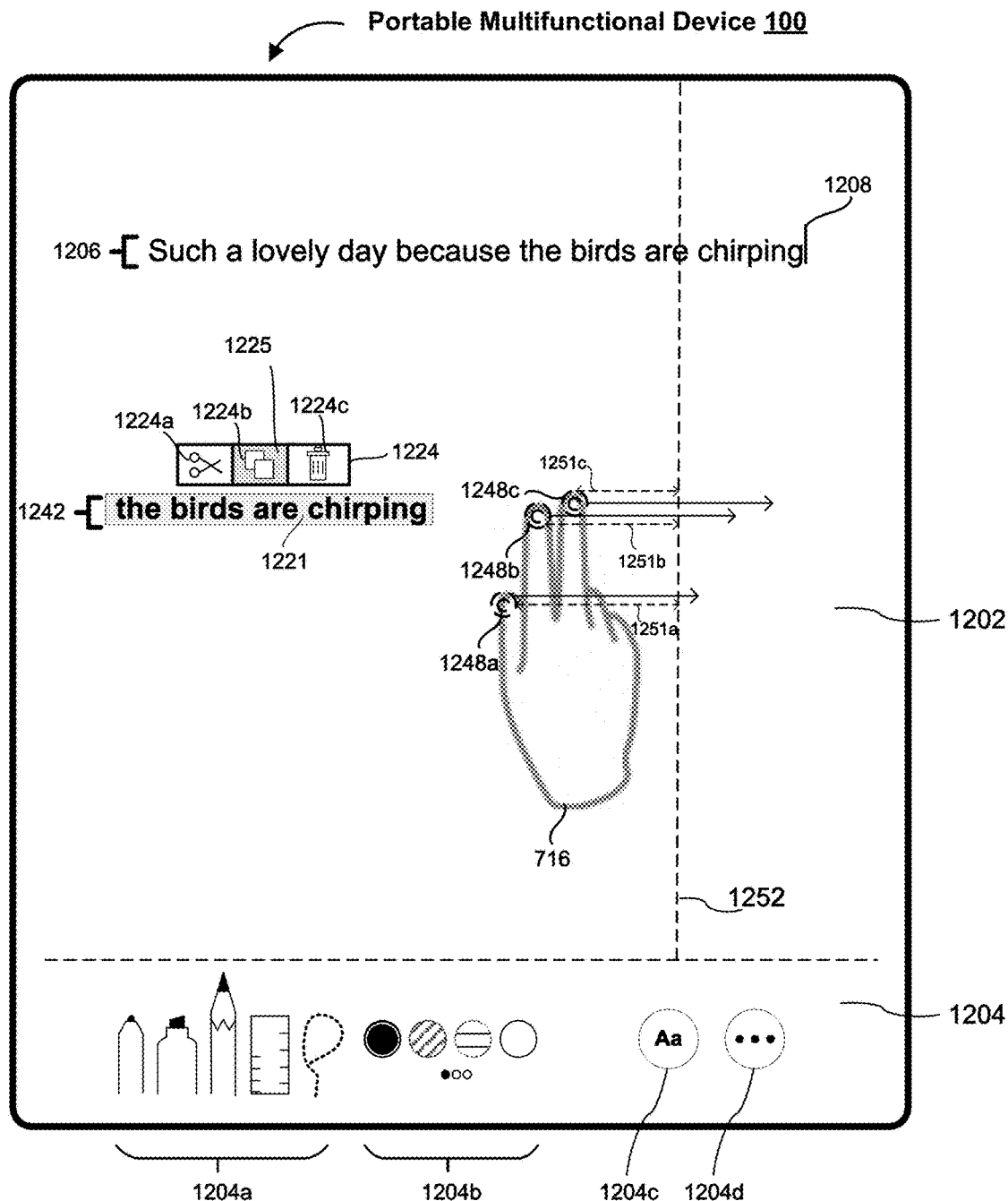
Figure 12A:
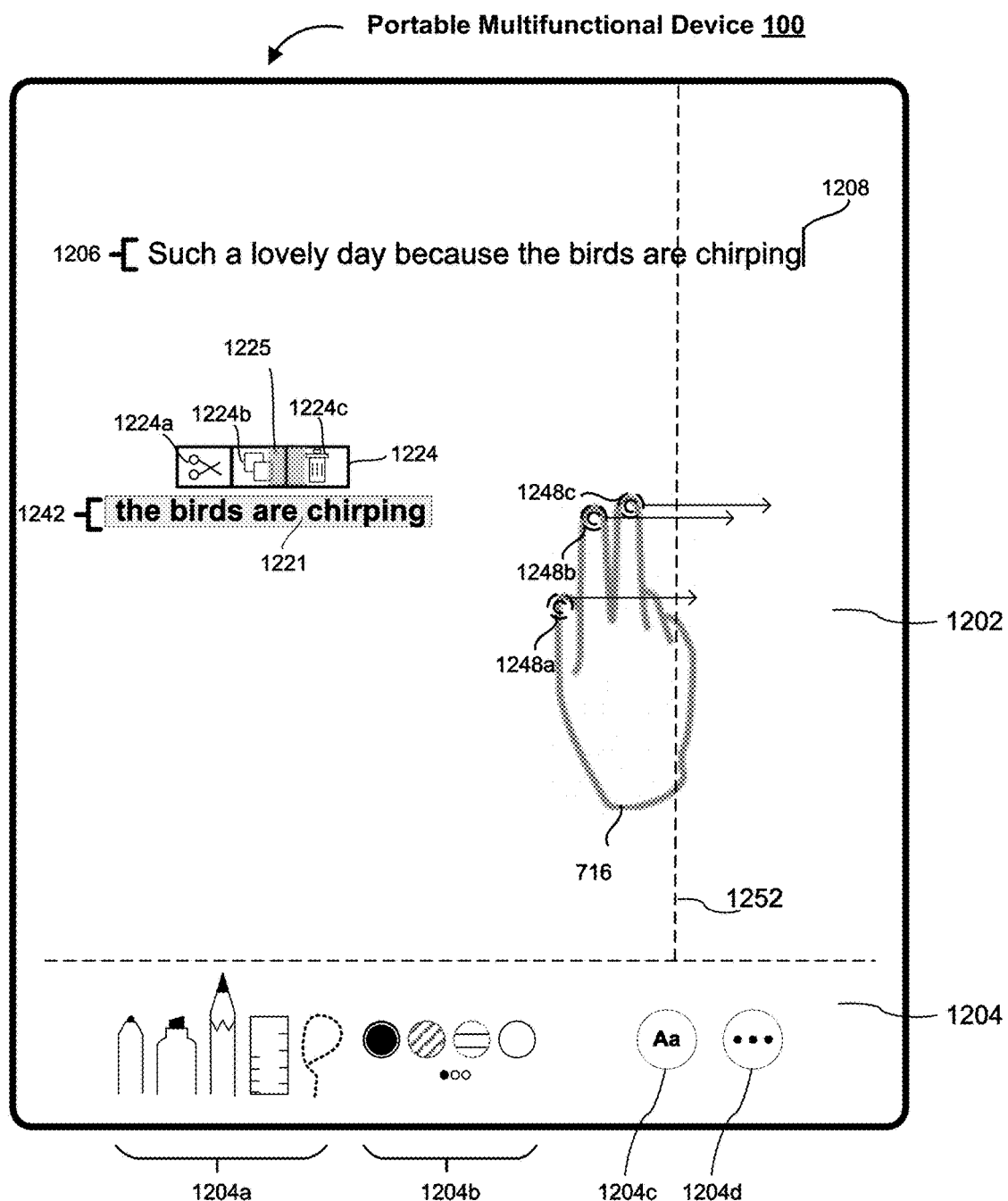
Figure 12A:
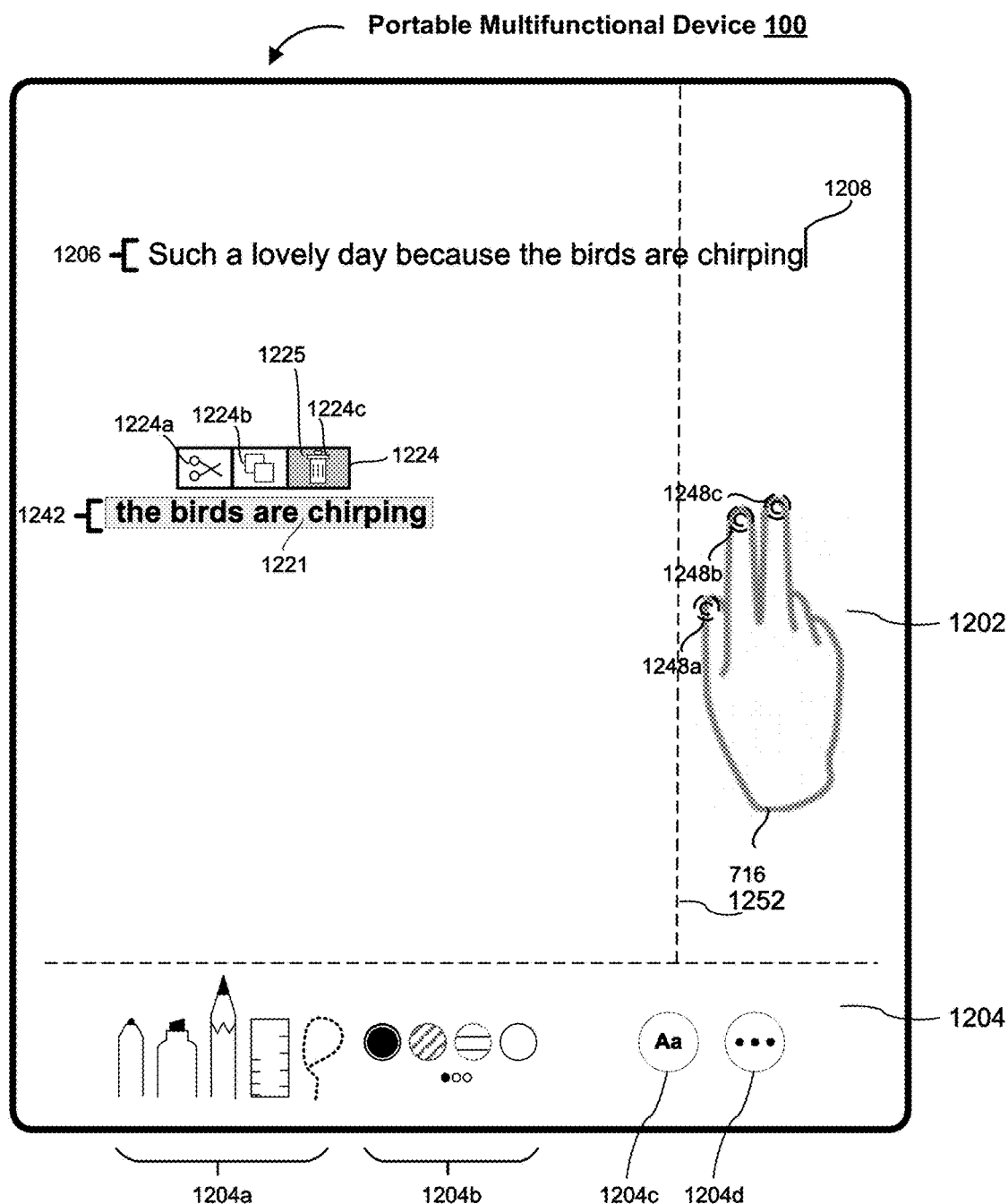
Figure 12A:
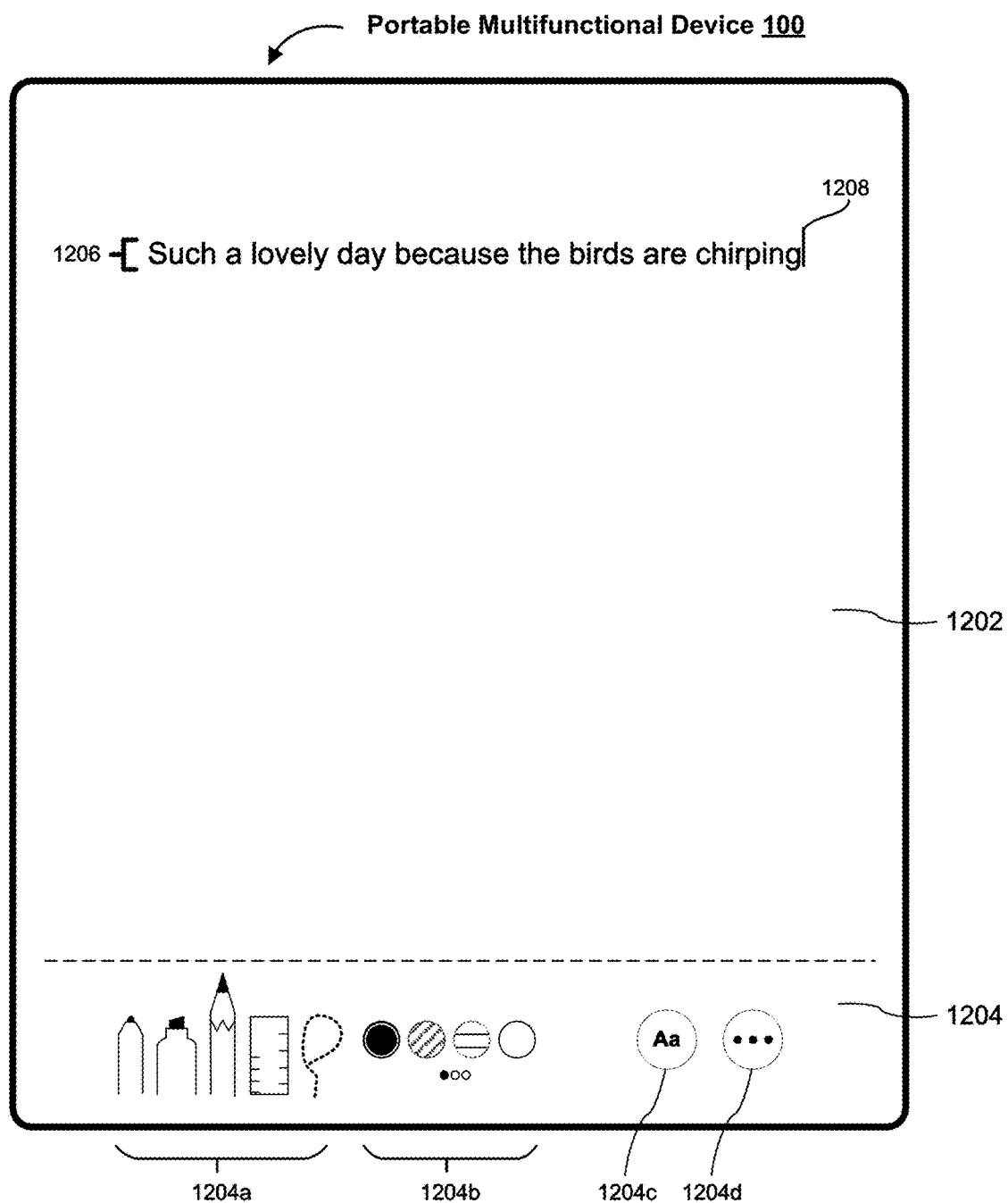
Figure 12A:
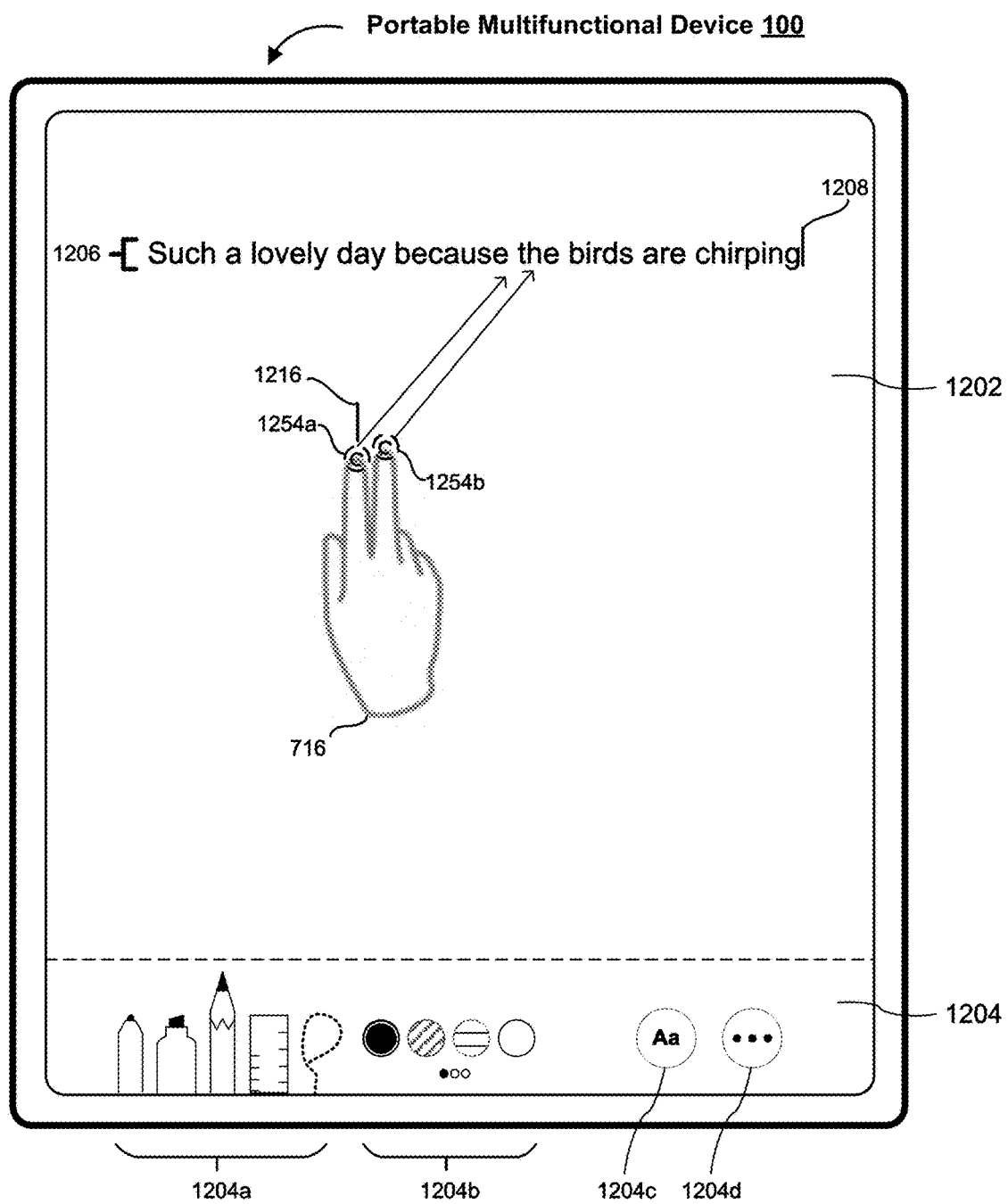
Figure 12A:
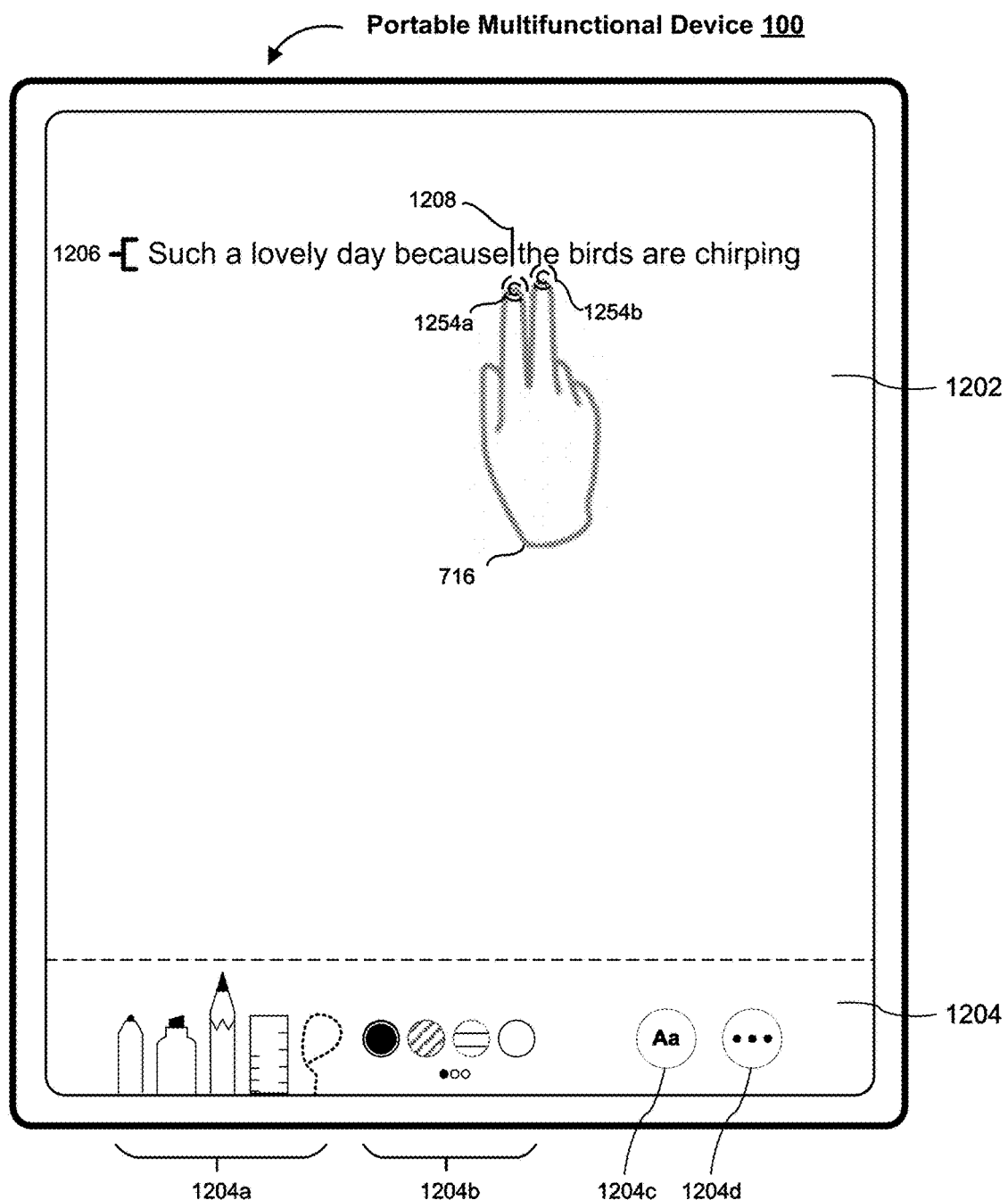
Figure 12A:
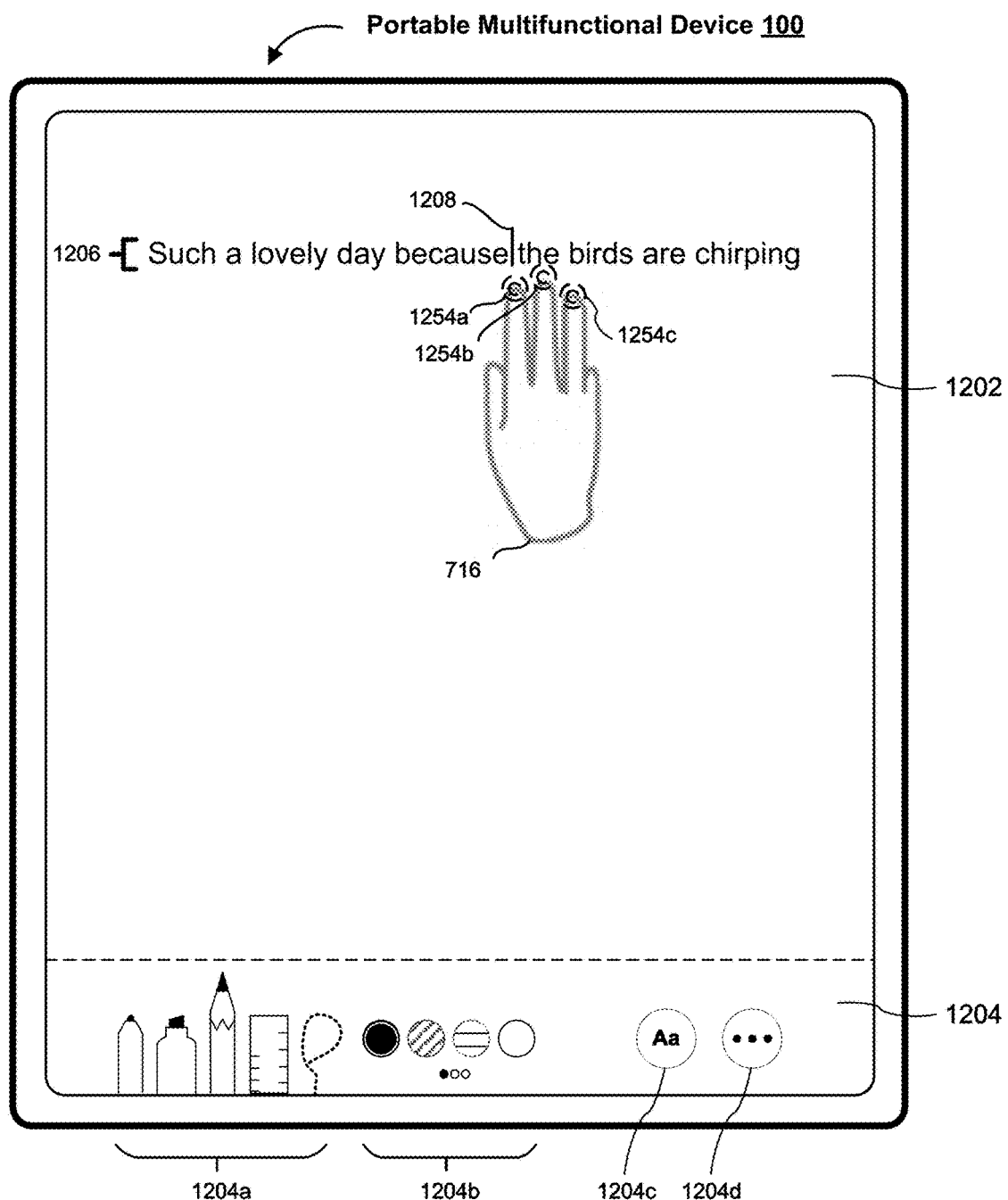
Figure 12A:
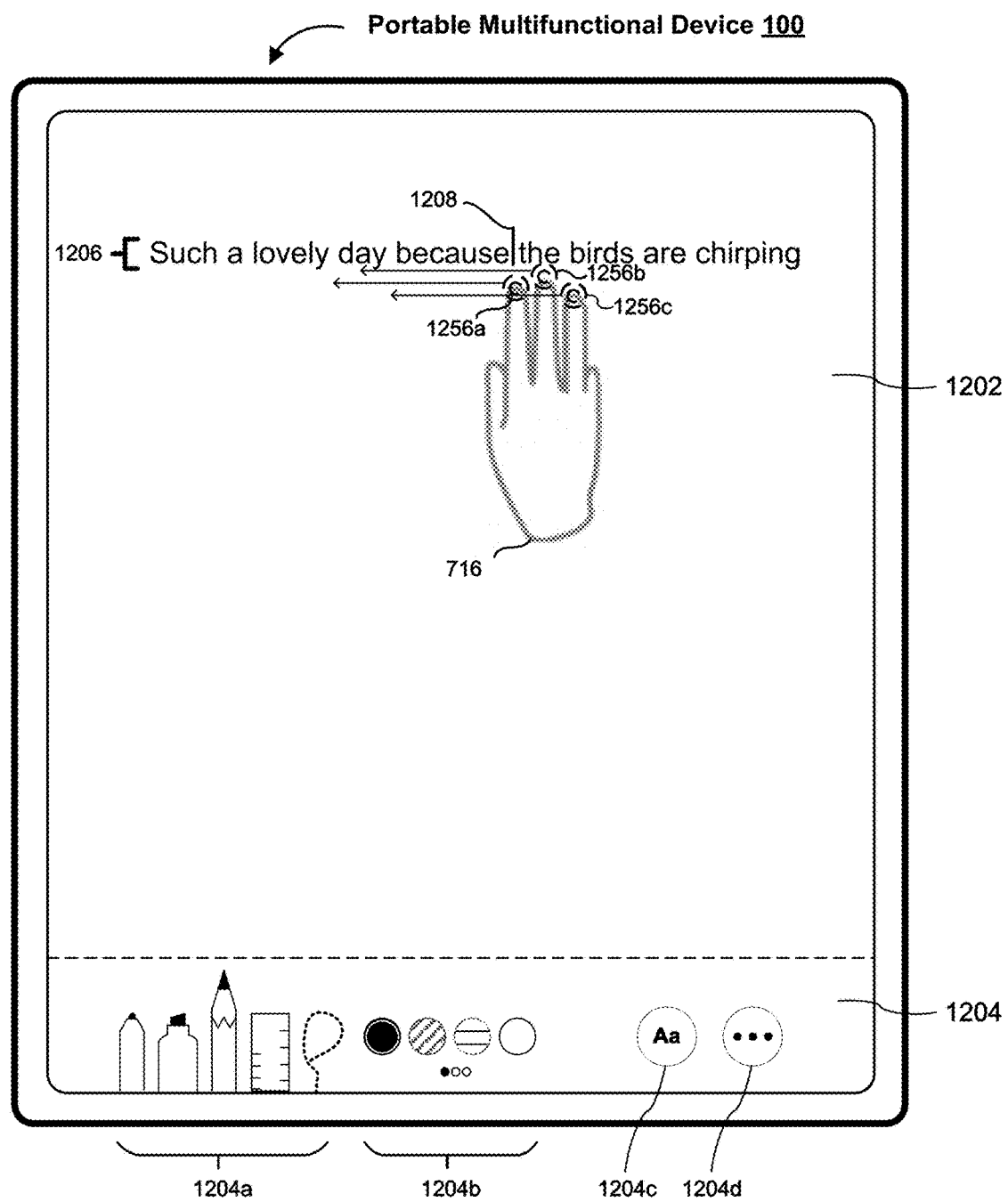
Figure 12A:
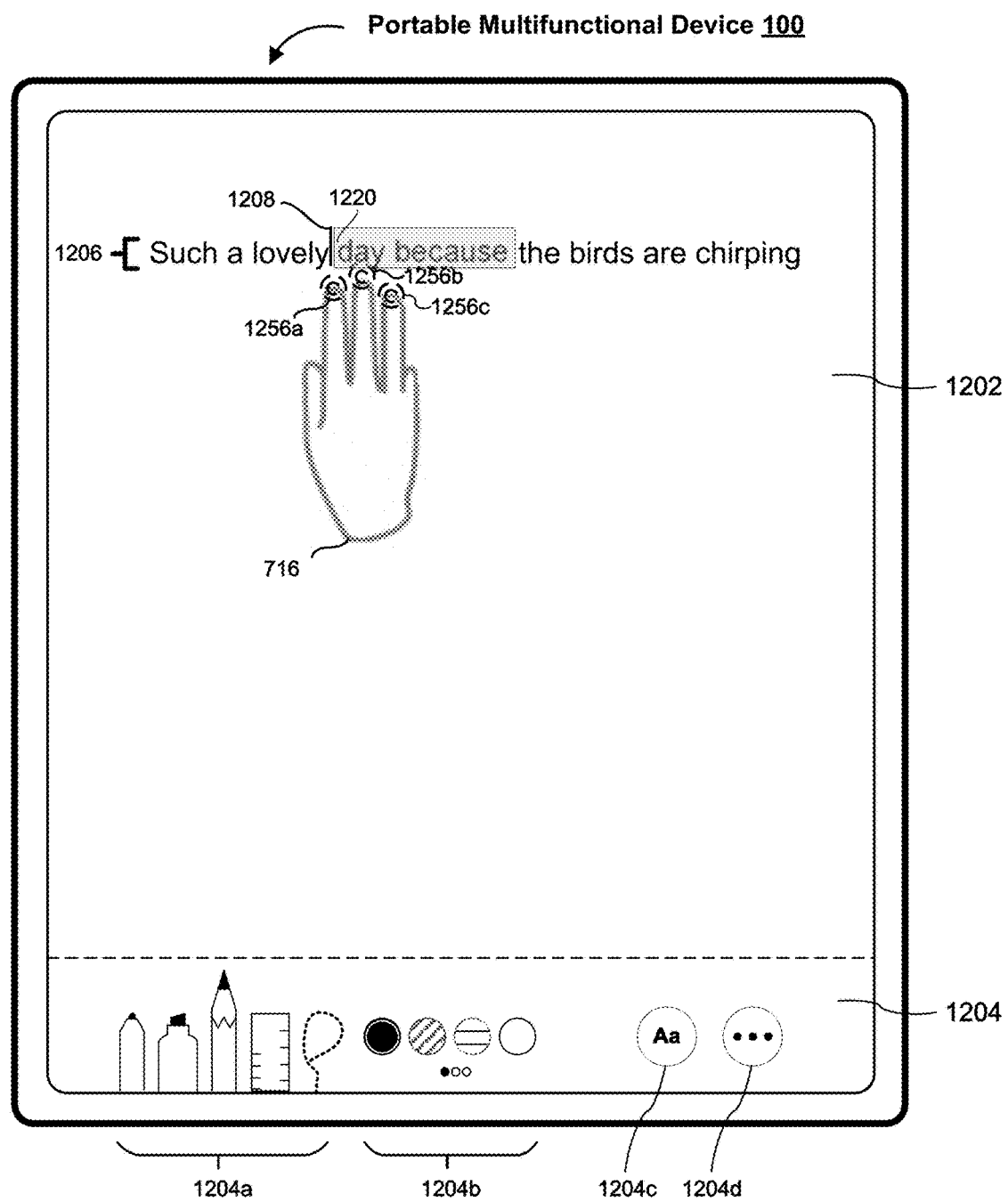
Figure 12A:
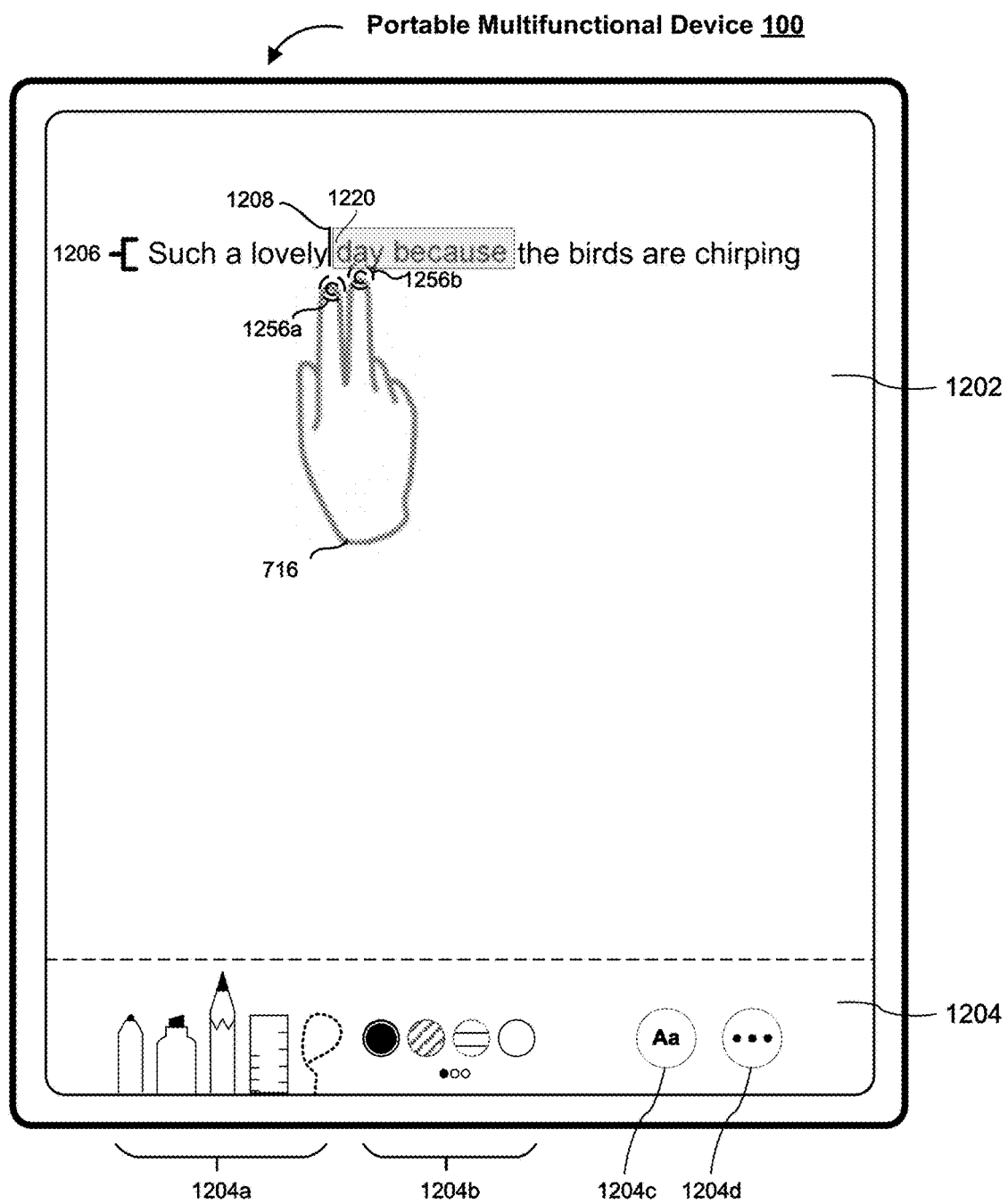
Figure 12A:
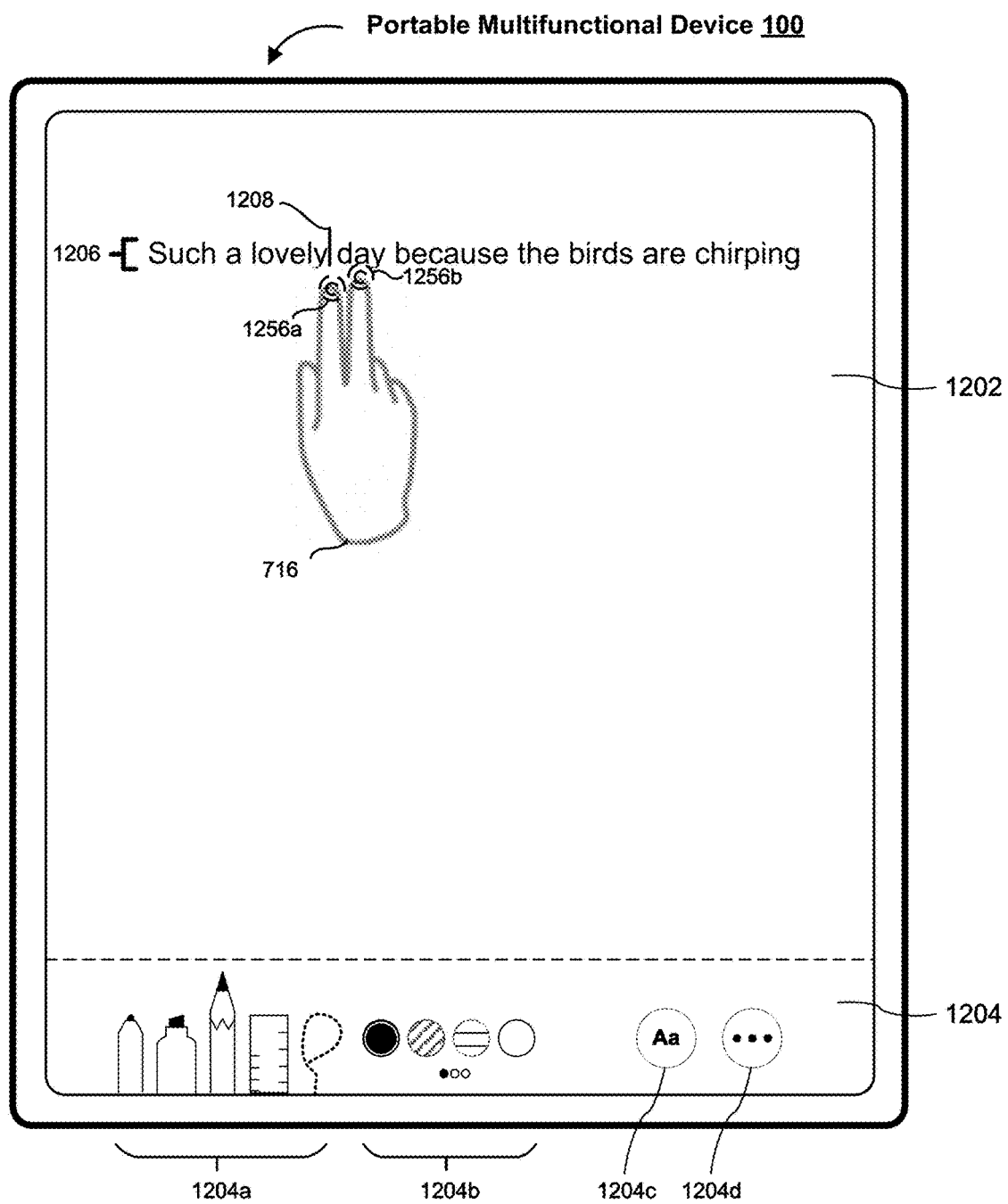
Figure 12A:
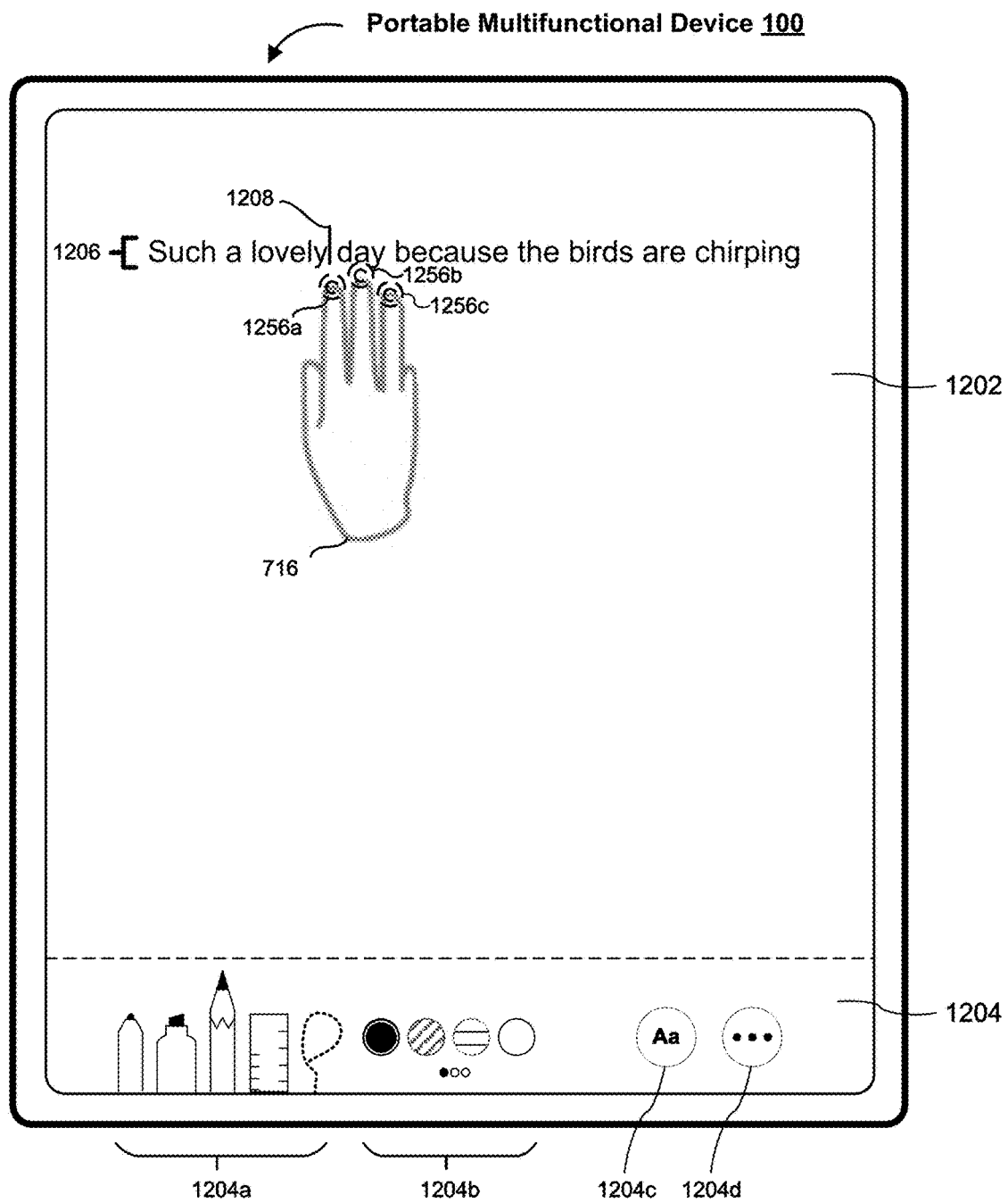
Figure 12A:
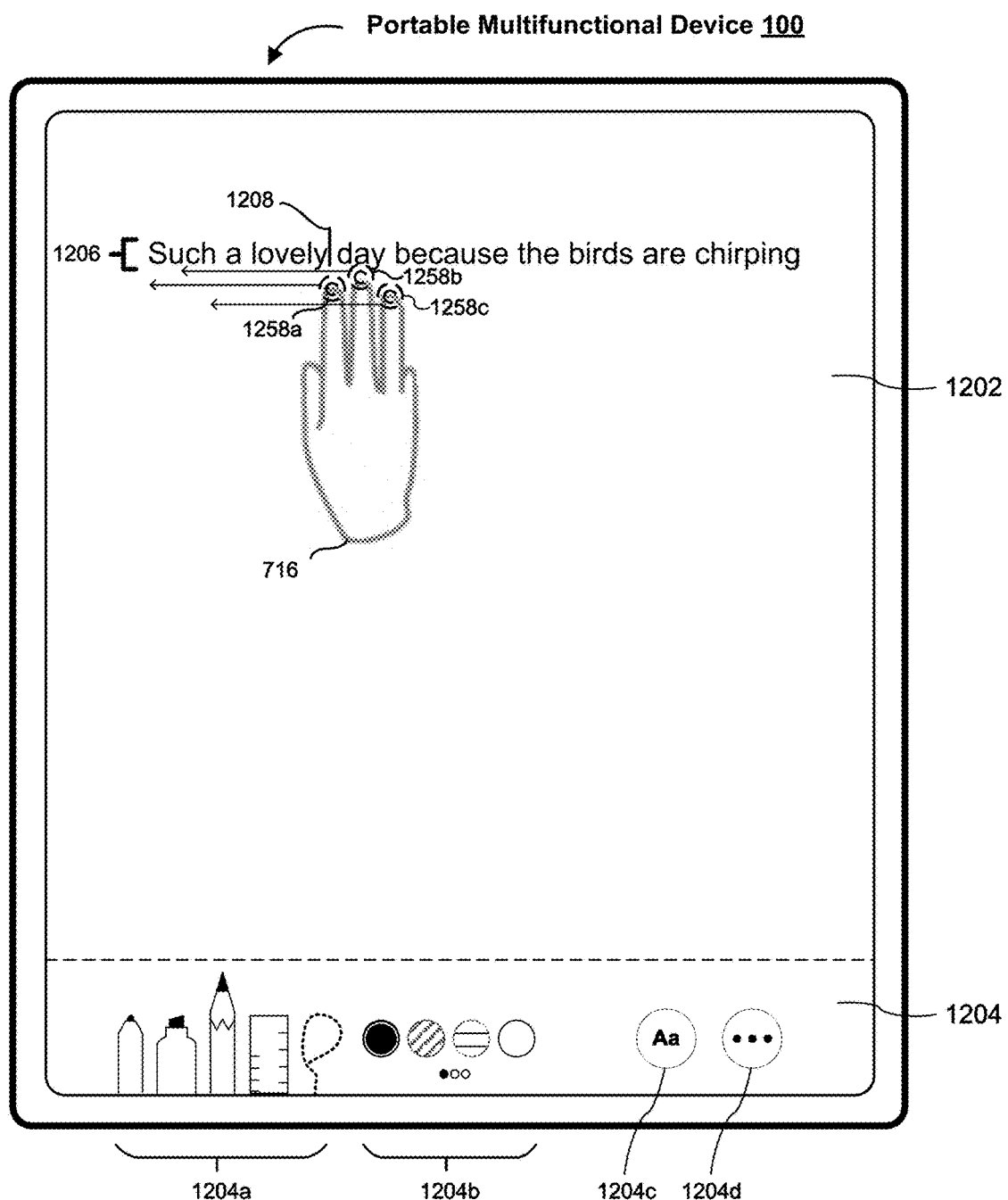
Figure 12A:
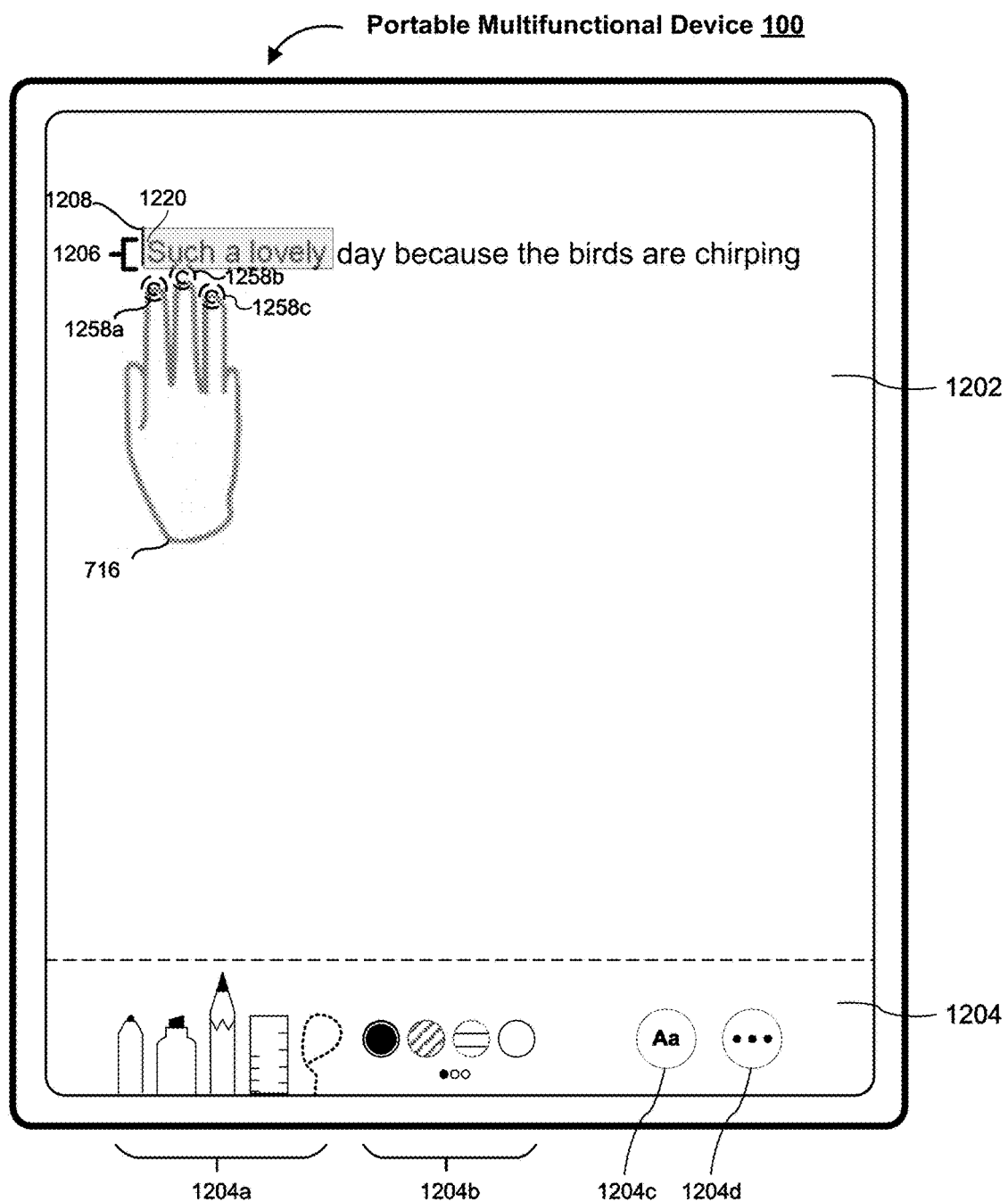
Figure 12A:
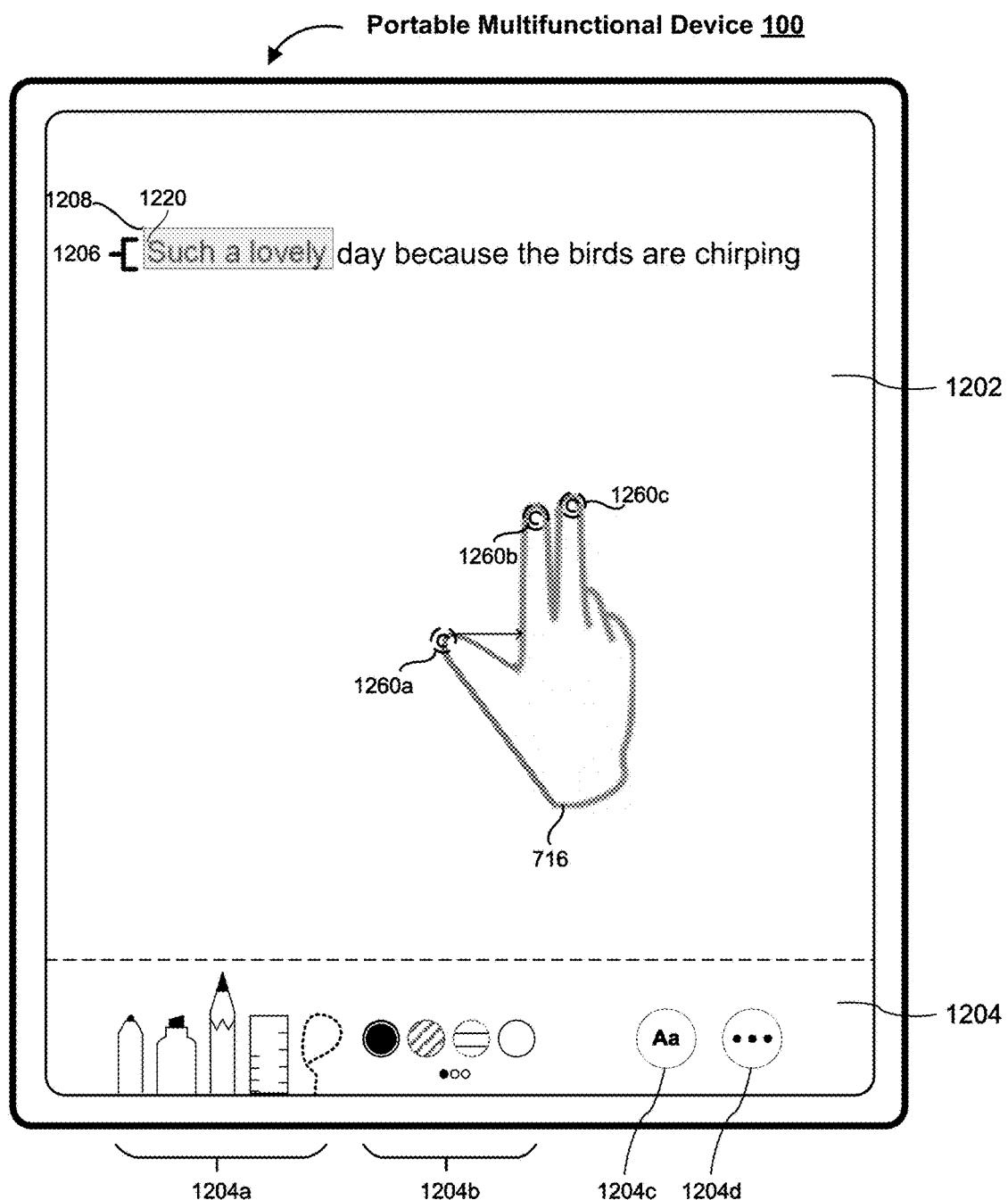
Figure 12A:
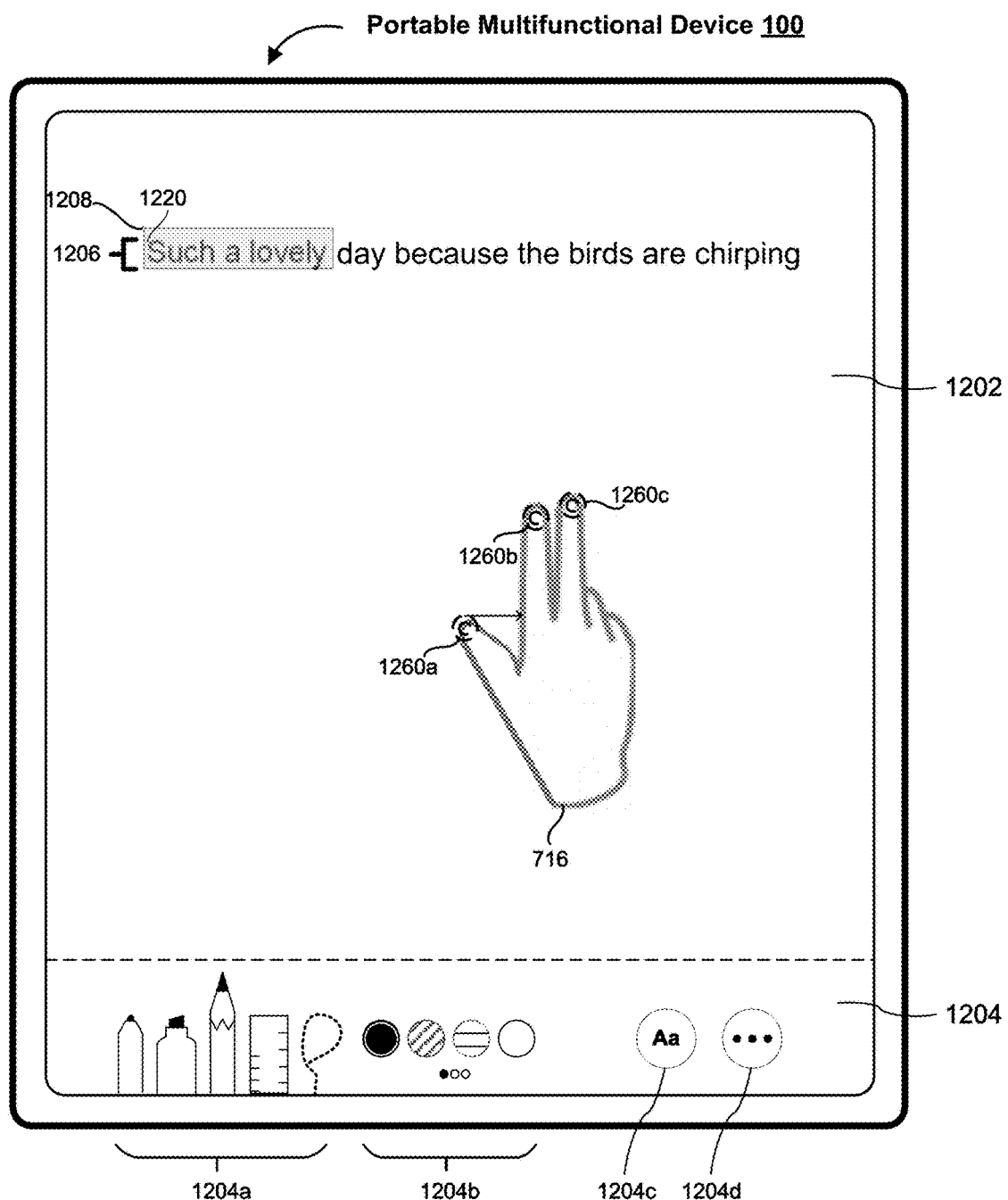
Figure 12A:
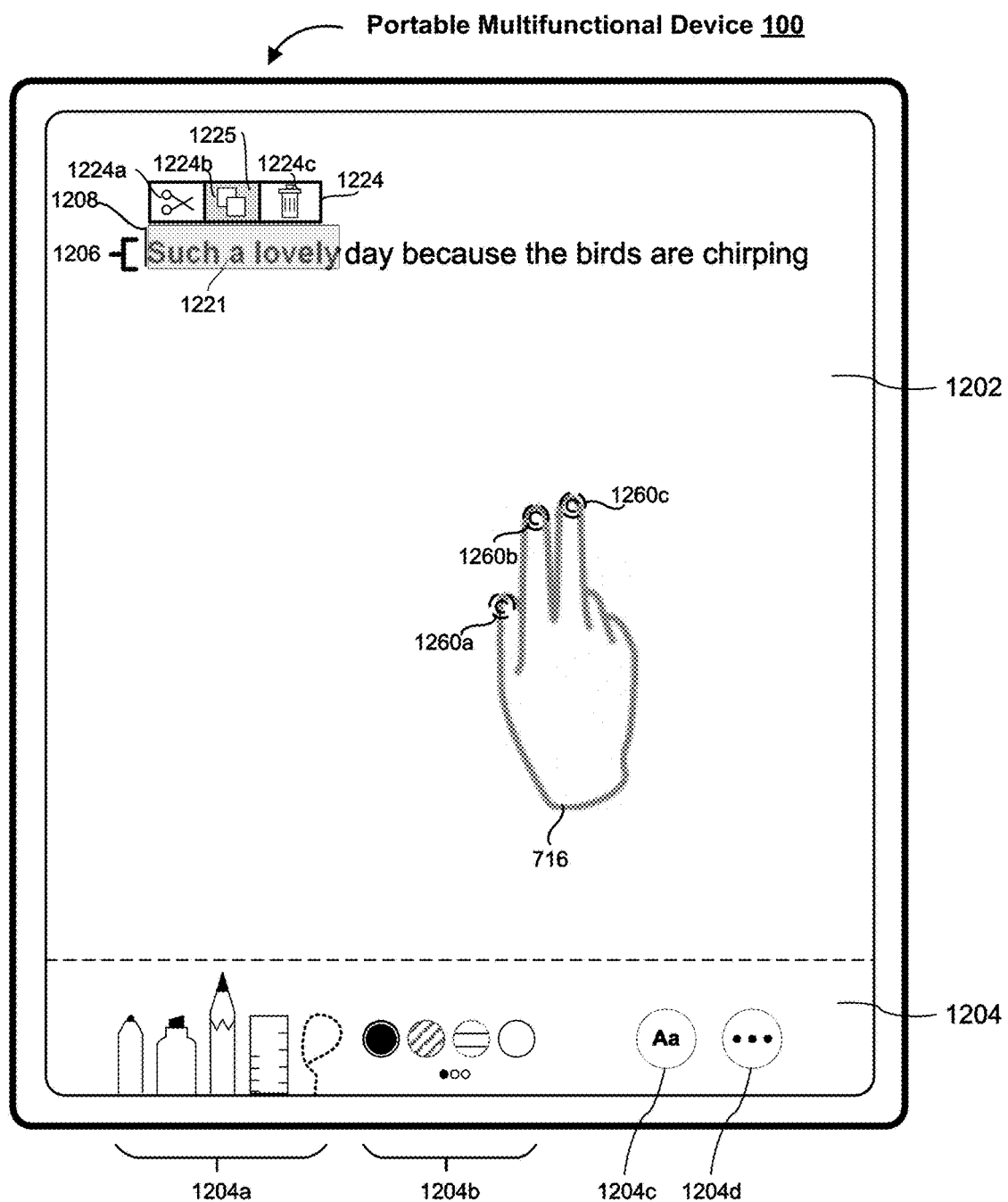
Figure 12A:
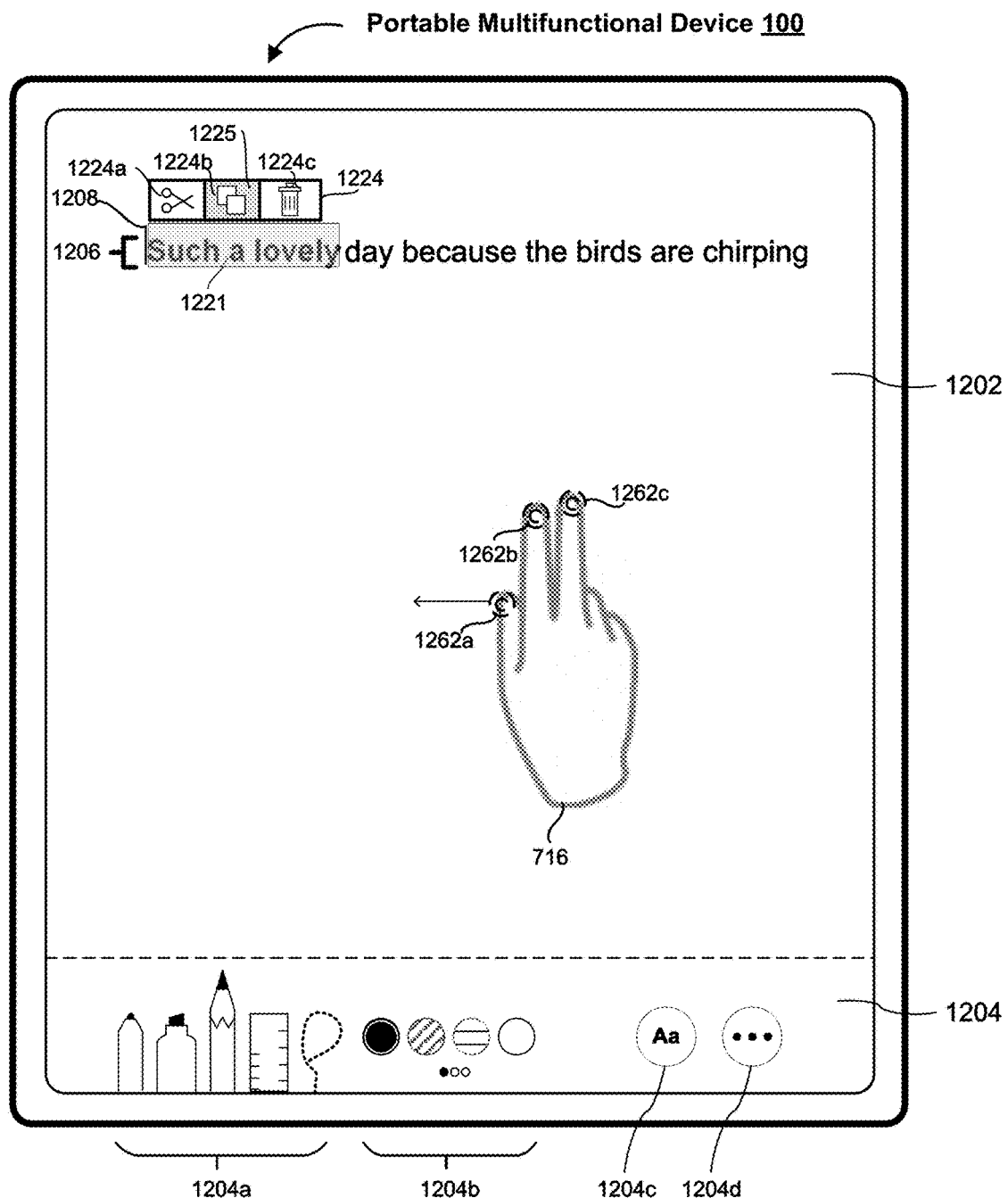
Figure 12A:
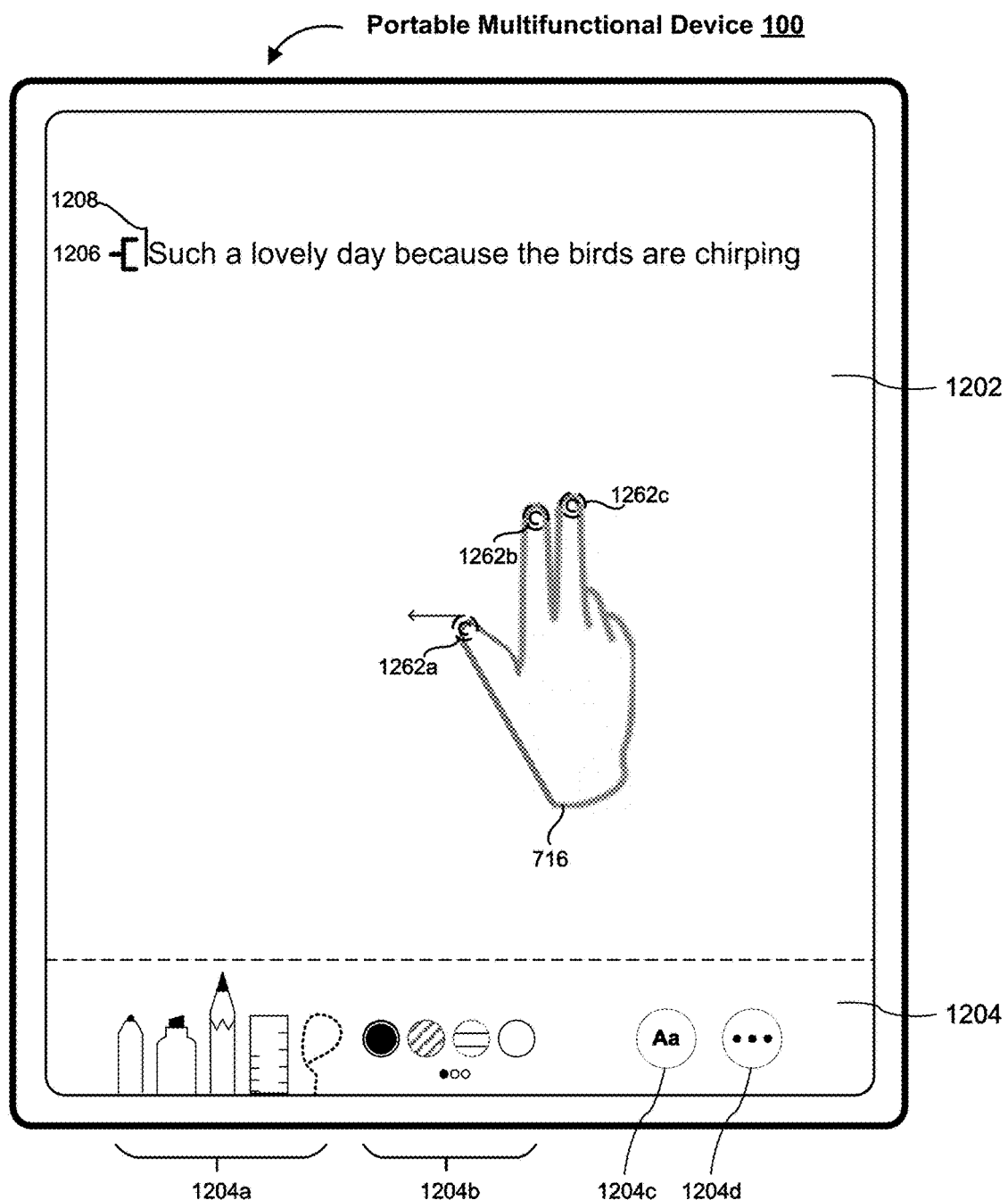
Figure 12A:
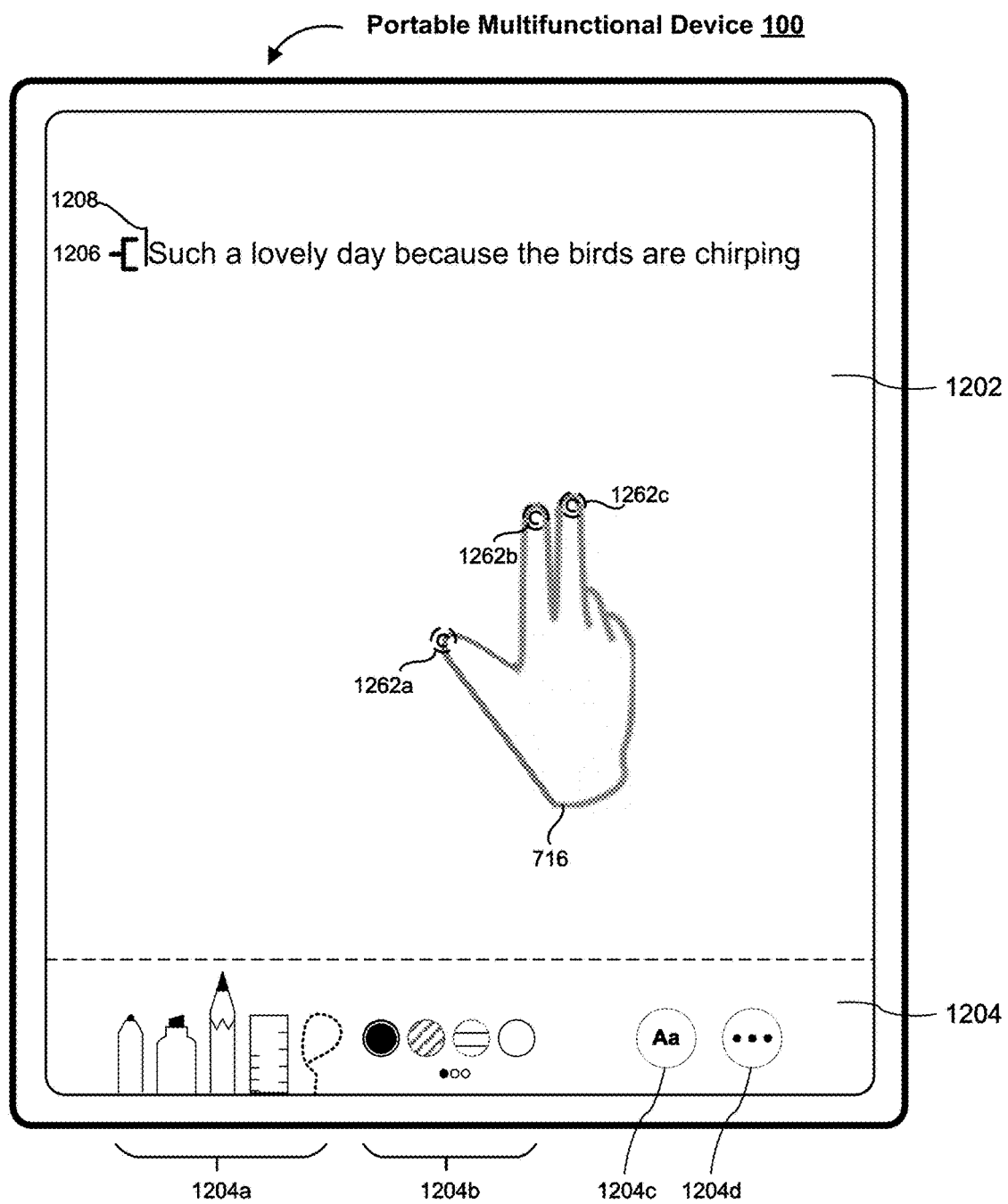
Figure 12A:
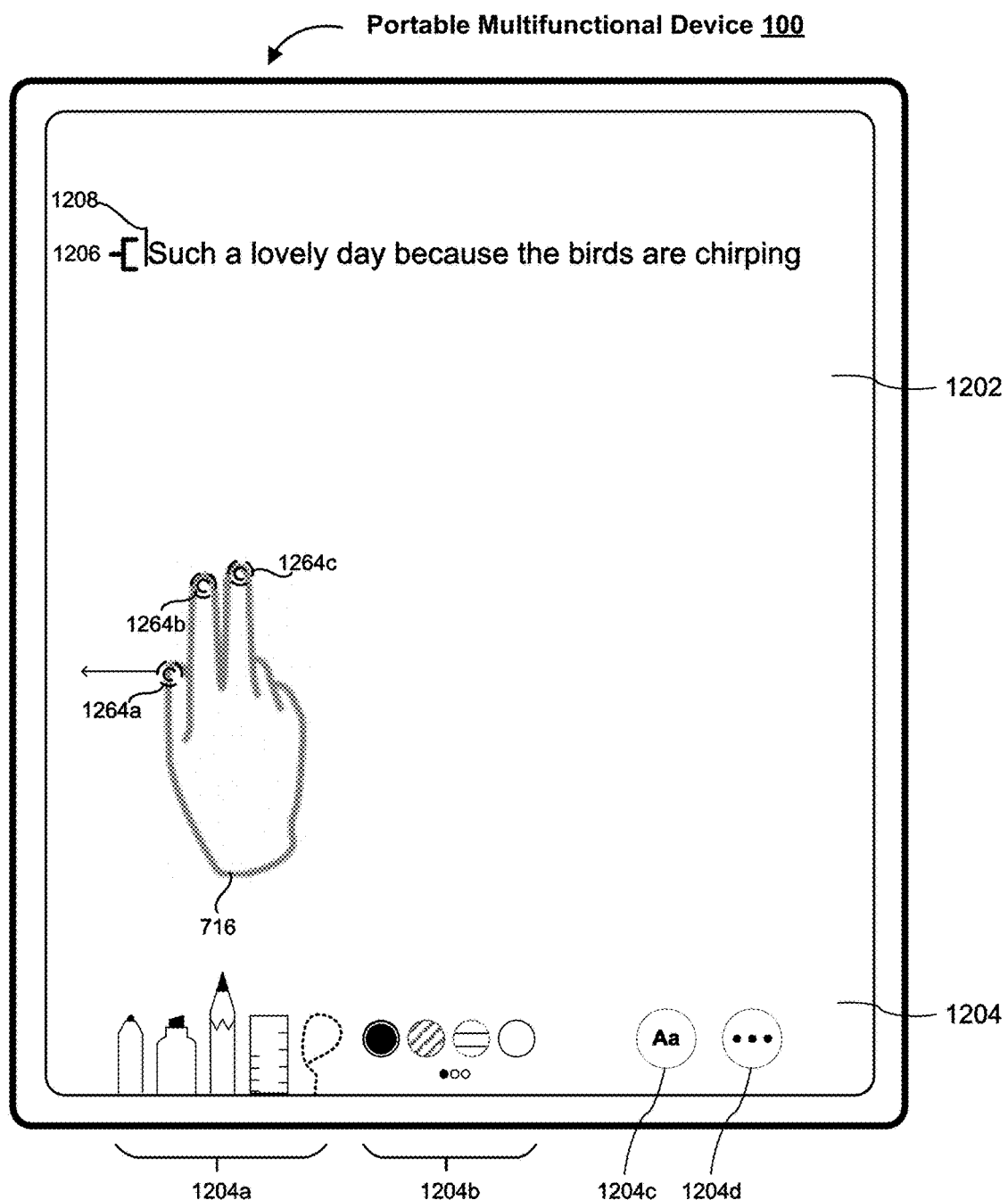
Figure 12A:
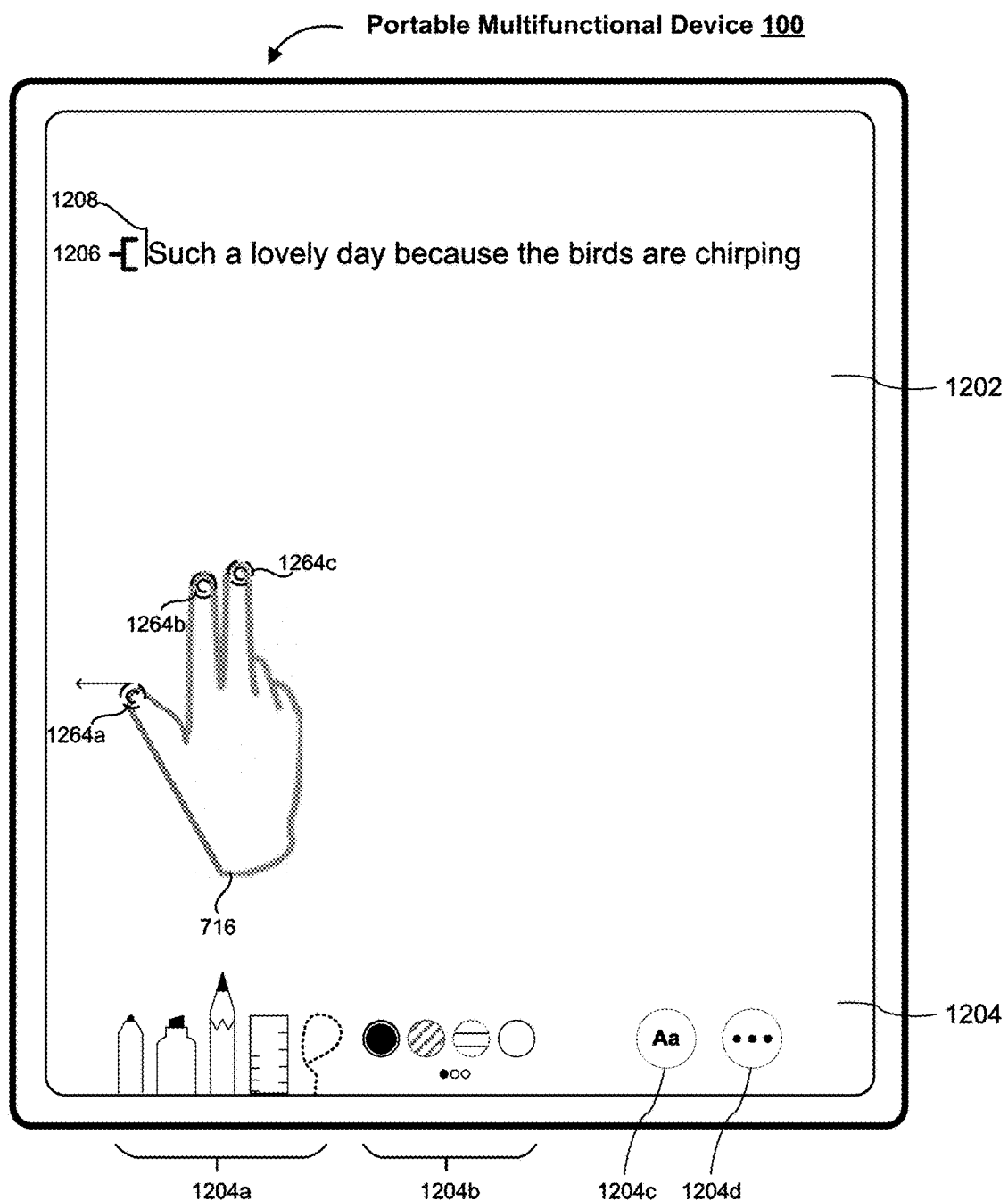
Figure 12A:
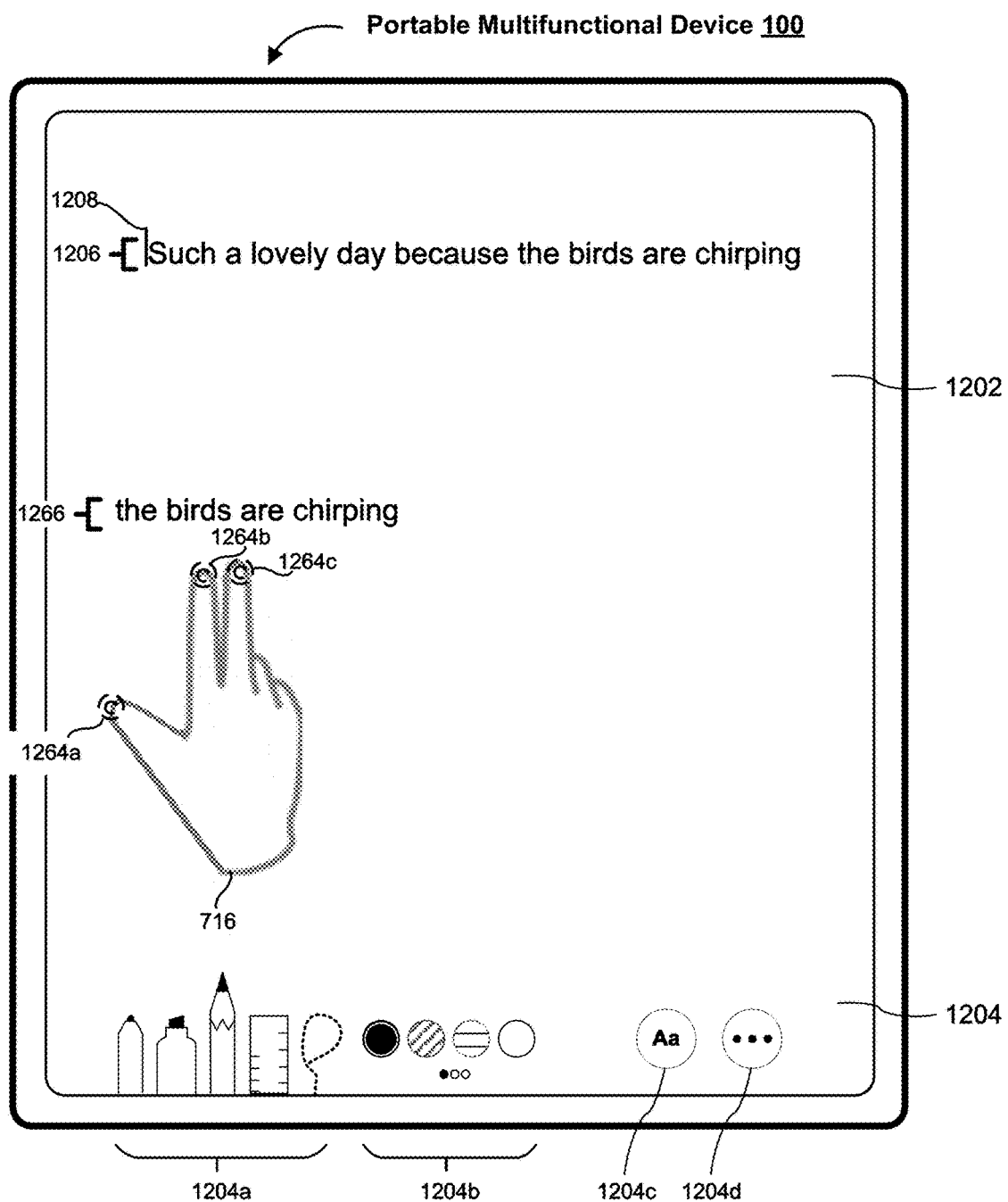

As illustrated in FIG. 12Z, the electronic device 100 detects a third multi-contact pinch gesture 1248 performed with a first contact 1248*a*, a second contact 1248*b*, and a third contact 1248*c*. The third multi-contact pinch gesture 1248 includes a first movement of two or more of the plurality of contacts (e.g., the first contact 1248*a*, the second contact 1248*b*, and the third contact 1248*c*) toward each other. As illustrated in FIGS. 12AA and 12AB, the first contact 1248*a* continues to move closer to the second contact 1248*b* and the third contact 1248*c*.

As illustrated in FIG. 12AB, the electronic device 100 displays the interface 1224 and displays the first color overlay 1225 within the copy operation indicator 1224*b* in order to indicate that the copy operation is currently selected. In some embodiments, as illustrated in FIG. 12AB, the electronic device 100 displays the interface 1224 proximate to the previously cut text 1242. Moreover, the electronic device 100 displays the second color overlay 1221 and boldened previously cut text 1242 within the second color overlay 1221 in order to indicate that the copy operation is associated with the previously cut text 1242.

As illustrated in FIG. 12AC, the electronic device 100 detects that the third multi-contact pinch gesture 1248 includes a second movement of more than a threshold amount of movement after detecting the first movement and before detecting release of the first contact 1248*a*, the second contact 1248*b*, and/or the third contact 1248*c*. The second movement includes a respective movement of the first contact 1248*a*, a respective movement of the second contact 1248*b*, and a respective movement of the third contact 1248*c*. In some embodiments, as illustrated in FIG. 12AC, the second movement is in substantially the rightwards direction and crosses a second threshold line 1252, which is illustrated for purely explanatory purposes. The threshold amount of movement corresponds to distances between respective origin points of one or more of the movements of the contacts and the second threshold line 1252. For example, as illustrated in FIG. 12AC, in some embodiments, the threshold amount of movement corresponds to a first distance 1251*a* between the origin point of the first contact 1248*a* and the second threshold line 1252, a second distance 1251*b* between the origin point of the second contact 1248*b* and the second threshold line 1252, a third distance 1251*c* between the origin point of the third contact 1248*c* and the second threshold line 1252, or a combination thereof. The first distance 1251*a*, the second distance 1251*b*, and the third distance 1251*c* are illustrated for purely explanatory purposes.

As illustrated in FIGS. 12AD and 12AE, while the second movement progresses closer to crossing the second threshold line 1252, the electronic device 100 correspondingly changes the first color overlay 1225 within the interface 1224. Namely, as illustrated in FIG. 12AD, because the second movement is in substantially the rightwards direction and is approximately halfway to crossing the second threshold line 1252, the electronic device 100 moves the first color overlay 1225 rightwards so that half of the first color overlay 1225 is within the copy operation indicator 1224*b* and the other half of the first color overlay 1225 is within the delete operation indicator 1224*c*. As illustrated in FIG. 12AE, in response to detecting the second movement cross the second threshold line 1252, the electronic device 100 moves the entirety of the first color overlay 1225 within the delete operation indicator 1224c. In this way, the electronic device 100 provides visual feedback that the third multi-contact pinch gesture 1248 is no longer associated with a copy operation and instead is associated with a delete operation. As illustrated in FIG. 12AF, in response to ceasing to detect the first contact 1248a, the second contact 1248b, and the third contact 1248c, the electronic device 100 performs a delete operation on the previously cut text 1242 and ceases to display the interface 1224.

As illustrated in FIG. 12AG, the electronic device 100 detects a second two-finger drag gesture 1254 on the touch-sensitive surface. The second two-finger drag gesture 1254 is performed with a first contact 1254a and a second contact 1254b of a plurality of contacts of the hand 716 of a user. In response to detecting the second two-finger drag gesture 1254, the electronic device 100 maintains display of the first cursor 1208 and displays the second cursor 1216 at a position that is associated with (e.g., proximate to) a position of the first contact 1254a, the second contact 1254b, or a combination thereof (e.g., in between the first contact 1254a and the second contact 1254b), as illustrated in FIG. 12AG.

As illustrated in FIG. 12AH, the electronic device 100 detects the second two-finger drag gesture 1254 within a threshold distance of the text string 1206. In response to detecting the second two-finger drag gesture 1254 within a threshold distance of the text string 1206, the electronic device 100 ceases to display the second cursor 1216 and moves the first cursor 1208 to the location of the second two-finger drag gesture 1254, e.g., to a position that indicates that the current position within the text string 1206 is between text "because" and text "the."

As illustrated in FIG. 12AI, after detecting the second two-finger drag gesture 1254 and while detecting the first 1254a and second contacts 1254b on the touch-sensitive surface, the electronic device 100 detects a placement of a third contact 1254c on the touch-sensitive surface. In some embodiments, in response to detecting the placement of a third contact 1254c, the electronic device 100 begins a selection operation.

As illustrated in FIGS. 12AJ and 12AK, the electronic device 100 performs a first selection operation on a first portion (e.g., "day because") of the text string 1206 based on a selection gesture. Namely, as illustrated in FIG. 12AJ, the electronic device 100 detects a second three-finger drag gesture 1256 that is performed with a first contact 1256a, a second contact 1256b, and a third contact 1256c. The second three-finger drag gesture 1256 moves in a substantially leftwards direction along the text string 1206. In some embodiments, as the second three-finger drag gesture 1256 proceeds, one or more of the first contact 1256a, the second contact 1256b, and the third contact 1256c remain within a threshold distance from the text string 1206. As illustrated in FIG. 12AK, as the second three-finger drag gesture 1256 proceeds, the electronic device 100 displays the selection indicator 1220 that emphasizes (e.g., distinguishes, highlights, places a box around) the first portion of the text string 1206 based on the current location of the second three-finger drag gesture 1256. Moreover, the electronic device 100 moves the first cursor 1208 based on the current location of the second three-finger drag gesture 1256.

As illustrated in FIG. 12AL, the electronic device 100 detects a release of the third contact 1256c. In response to detecting the release of the third contact 1256c in FIG. 12AL, the electronic device 100 cancels selection of the first portion of the text string 1206, as indicated by the electronic device 100 ceasing to display the selection indicator 1220 in FIG. 12AM. In some embodiments, in response to detecting the release of the third contact 1256c, instead of cancelling selection, the electronic device 100 maintains (e.g., pauses) selection until detecting a subsequent placement of the third contact 1256c and a subsequent three-finger drag gesture.

As illustrated in FIG. 12AN, after detecting the release of the third contact 1256c, the electronic device detects the third contact 1256c while detecting the first contact 1256a and the second contact 1256b. As illustrated in FIGS. 12AO and 12AP, the electronic device 100 performs a second selection operation on a second portion (e.g., "Such a lovely") of the text string 1206 based on a selection gesture. Namely, as illustrated in FIG. 12AO, the electronic device 100 detects a third three-finger drag gesture 1258 that is performed with a first contact 1258a, a second contact 1258b, and a third contact 1258c. The third three-finger drag gesture 1258 moves in a substantially leftwards direction along the text string 1206. In some embodiments, as the third three-finger drag gesture 1258 proceeds, one or more of the first contact 1258a, the second contact 1258b, and the third contact 1258c remain within a threshold distance from the text string 1206. As illustrated in FIG. 12AP, as the third three-finger drag gesture 1258 proceeds, the electronic device 100 displays the selection indicator 1220 that emphasizes (e.g., distinguishes, highlights, places a box around) the second portion of the text string 1206 based on the current location of the third three-finger drag gesture 1258. Moreover, the electronic device 100 moves the first cursor 1208 based on the current location of the third three-finger drag gesture 1258.

As illustrated in FIG. 12AQ, the electronic device 100 detects a fourth multi-contact pinch gesture 1260 performed with a first contact 1260a, a second contact 1260b, and a third contact 1260c. The third multi-contact pinch gesture 1260 includes a first movement of two or more of the plurality of contacts (e.g., the first contact 1260a, the second contact 1260b, and the third contact 1260c) toward each other. As illustrated in FIGS. 12AQ-12AS, the first contact 1260a continues to move closer to the second contact 1260b and the third contact 1260c. Additionally, in some embodiments, the electronic device 100 detects three contact gestures that include movement of two or more of the contacts as multi-contact pinch gestures if two or more of the contacts move closer to each other. In various embodiments, two or three of the first contact 1260a, the second contact 1260b, and the third contact 1260c concurrently move. For example, in some embodiments, the first contact 1260a moves substantially rightwards while the second contact 1260b and the third contact 1260c move substantially leftwards.

As illustrated in FIG. 12AS, the electronic device 100 displays the interface 1224 and displays the first color overlay 1225 within the copy operation indicator 1224b in order to indicate that the copy operation is currently selected. In some embodiments, as illustrated in FIG. 12AS, the electronic device 100 displays the interface 1224 proximate to the second portion of the text string 1206. Moreover, the electronic device 100 displays the second color overlay 1221 and boldened second portion of the text string 1206 within the second color overlay 1221 in order to indicate that the electronic device 100 has performed a copy operation on the second portion of text string 1206.

As illustrated in FIG. 12AT, after detecting the fourth multi-contact pinch gesture 1260, but before detecting release of the first contact 1260a, the second contact 1260b, and the third contact 1260c, the electronic device 100 detects a third multi-finger de-pinch gesture 1262. The third multi-finger de-pinch gesture 1262 is performed with a first contact 1262a, a second contact 1262b, and a third contact 1262c. The third multi-finger de-pinch gesture 1262 includes a first movement of two or more of the plurality of contacts (e.g., the first contact 1262a, the second contact 1262b, and the third contact 1262c) away from each other. Namely, as illustrated in FIG. 12AT, the first contact 1262a moves away from the second contact 1262b and the third contact 1262c while the second contact 1262b and the third contact 1262c remain substantially stationary. In various embodiments, two or three of the first contact 1262a, the second contact 1262b, and the third contact 1262c concurrently move. For example, in some embodiments, the first contact 1262a moves substantially leftwards while the second contact 1262b and the third contact 1262c move substantially rightwards.

As illustrated in FIGS. 12AU and 12AV, the first contact 1262a continues to move away from the second contact 1262b and the third contact 1262c. In some embodiments, as illustrated in FIG. 12AV, in response to detecting that the first contact 1262a moved a sufficient distance away from the second contact 1262b and the third contact 1262c, the electronic device 100 cancels the copy operation that was performed by the electronic device 100 with reference to FIGS. 12AQ-12AS. Namely, the electronic device 100 cancels copying of the previously selected second portion of the text string 1206 corresponding to "Such a lovely." As illustrated in FIGS. 12AU and 12AV, the electronic device 100 ceases to display the interface 1224 and the second color overlay 1221 in order to indicate that the copy operation has been cancelled with respect to the second portion of the text string 1206.

As illustrated in FIG. 12AW, after ceasing to detect the third multi-finger de-pinch gesture 1262, the electronic device 100 detects a fourth multi-finger de-pinch gesture 1264. As discussed above with reference to other multi-finger de-pinch gestures, the fourth multi-finger de-pinch gesture 1264 causes the electronic device 100 to perform a paste operation. However, because the copy operation of the second portion of the text string 1206 the electronic device 100 prepared to perform in response to detecting the fourth multi-contact pinch gesture 1260 was cancelled by the third multi-finger de-pinch gesture 1262, the electronic device does not paste the second portion of the text string 1206. Instead, as illustrated in FIGS. 12AX and 12AY, the electronic device 100 pastes text 1266 corresponding to the pasted text 1228 "the bird are chirping" described above with reference to FIGS. 12P-12U.

FIGS. 13A-13AB are examples of user interfaces for performing undo or redo operations based on rotational multi-finger gestures in accordance with some embodiments. As illustrated in FIG. 13A, the electronic device 100 displays an application interface 1302 associated with, for example, a drawing application or a word-processing application. The application interface 1302 includes a toolbar region 1304 that may include a variety of affordances (e.g., drawing tools, editing functions, color pots) to facilitate content manipulation operations. For example, as illustrated in FIG. 13A, the toolbar region 1304 includes a set of drawing tool affordances 1304a, a set of color pots 1304b, a text tool affordance 1304c, and an additional functions affordance 1304d (e.g., share affordance, save affordance, etc.). One of ordinary skill in the art will appreciate that the toolbar region 1304 may include any number and types of affordances, arranged in any number of a variety of ways.

Figure 13B:
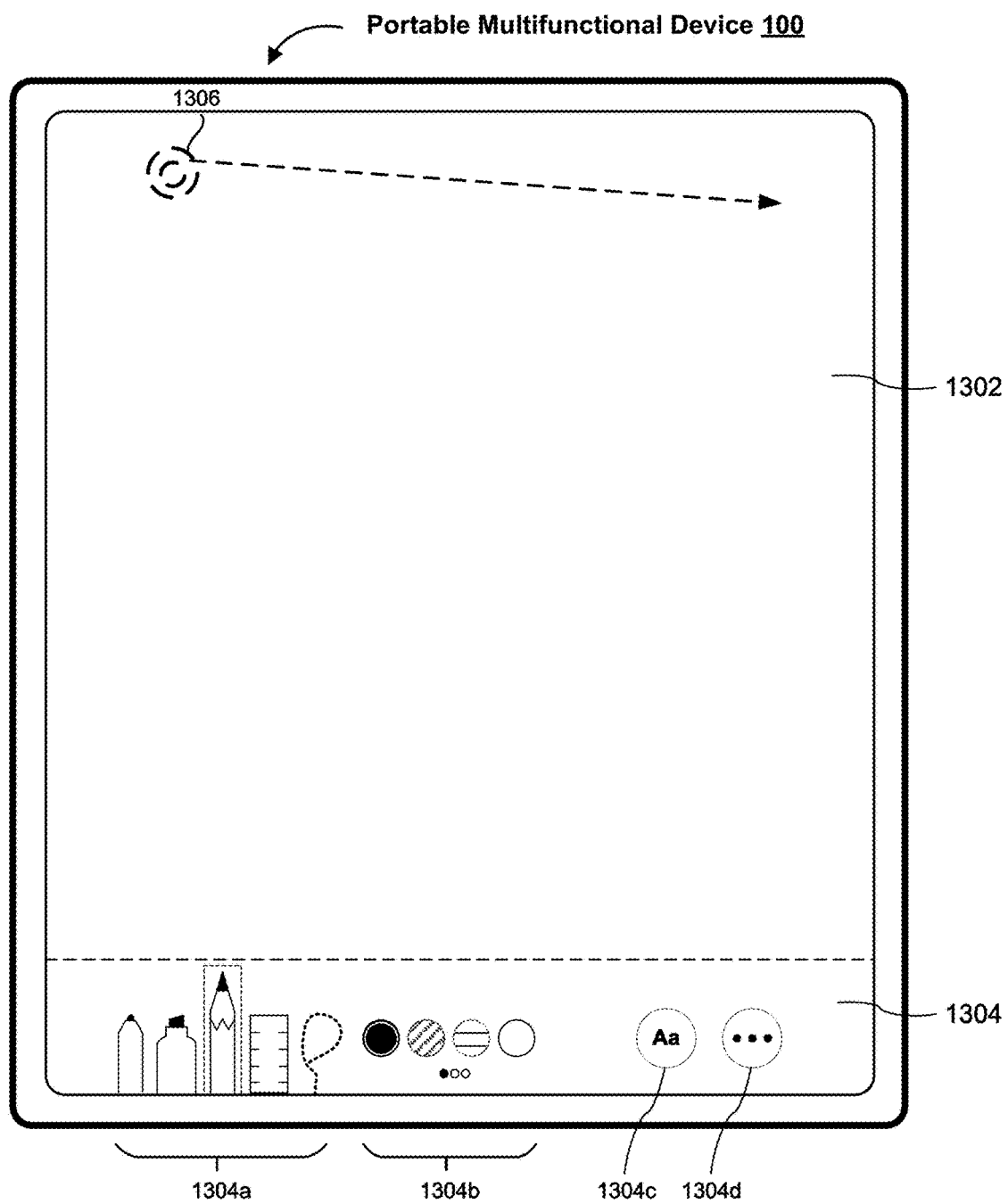
Figure 13C:
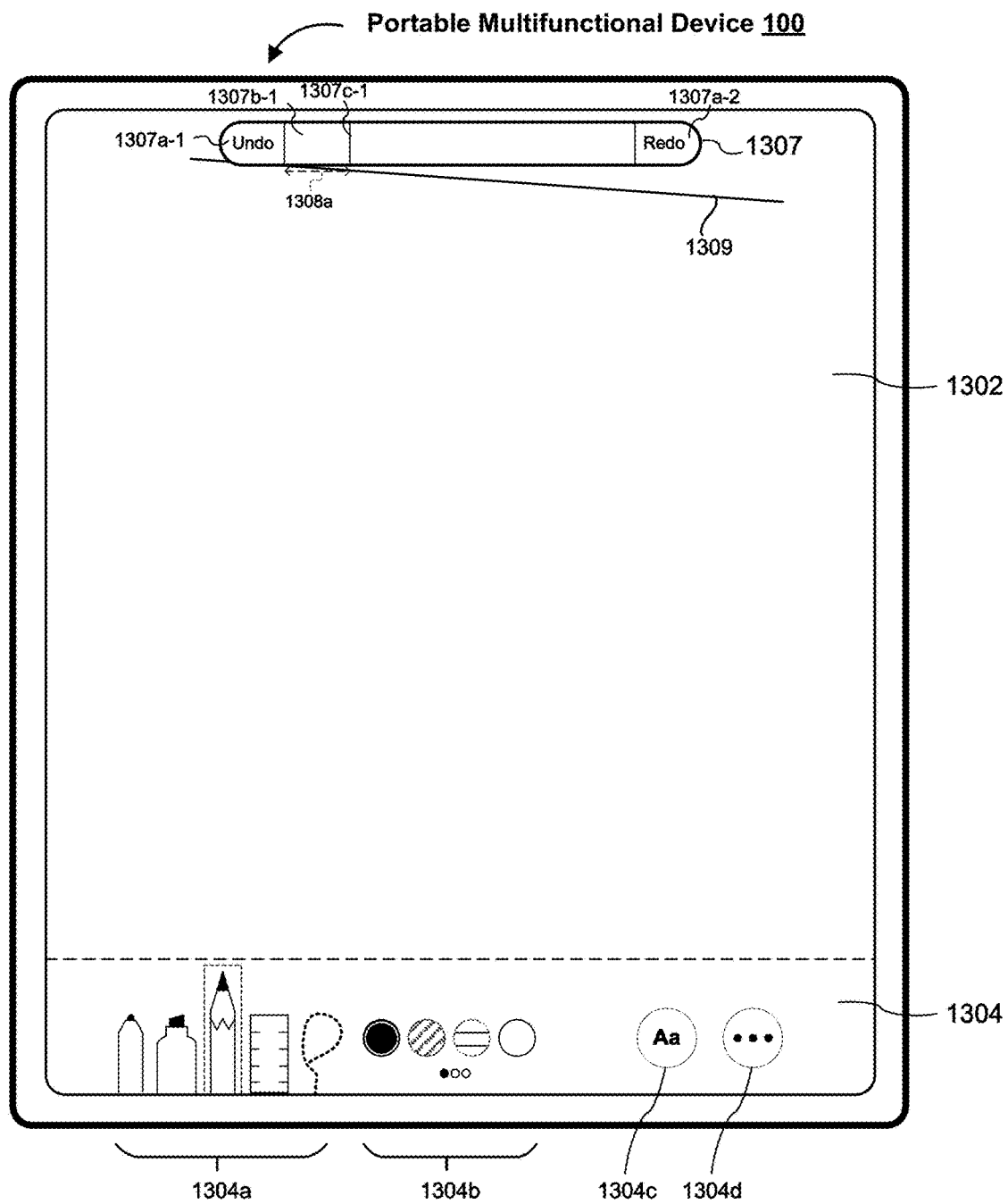

As illustrated in FIGS. 13B and 13C, the electronic device 100 detects a first content manipulation input 1306. In response to detecting the first content manipulation input 1306 in FIG. 13B, the electronic device 100 displays a first mark 1309 in FIG. 13C. Moreover, in some embodiments, in response to detecting the first content manipulation input 1306, the electronic device 100 displays a scrubber 1307, as illustrated in FIG. 13C. The scrubber 1307 may be overlaid on content so that the content does not obscure the scrubber 1307. The scrubber 1307 includes an undo last affordance 1307a-1, which, when selected, causes the electronic device 100 to perform an undo operation on the last performed content manipulation operation. Similarly, the scrubber 1307 includes a redo last affordance 1307a-2, which, when selected, causes the electronic device 100 to perform a redo operation on the last performed undo operation. One of ordinary skill in the art will appreciate that other embodiments include the last undo affordance 1307a-1 and the last redo affordance 1307a-2 arranged and/or positioned differently (e.g., relative to each other). In some embodiments, directly after opening the application associated with the application interface 1302, the electronic device 100 detects the first content manipulation input 1306 and, in response, does not display the redo last affordance 1307a-2 because the electronic device 100 has yet to perform an undo operation. The scrubber 1307 further includes a first distinct undo affordance 1307c-1 respectively associated with the first mark 1309. The undo last affordance 1307a-1 and the first distinct undo affordance 1307c-1 are separated by a first partial undo operation region 1307b-1. The first partial undo operation region 1307b-1 is associated with a first distance 1308a that is indicative of a scope (e.g., magnitude) of the first mark 1309.

Figure 13D:
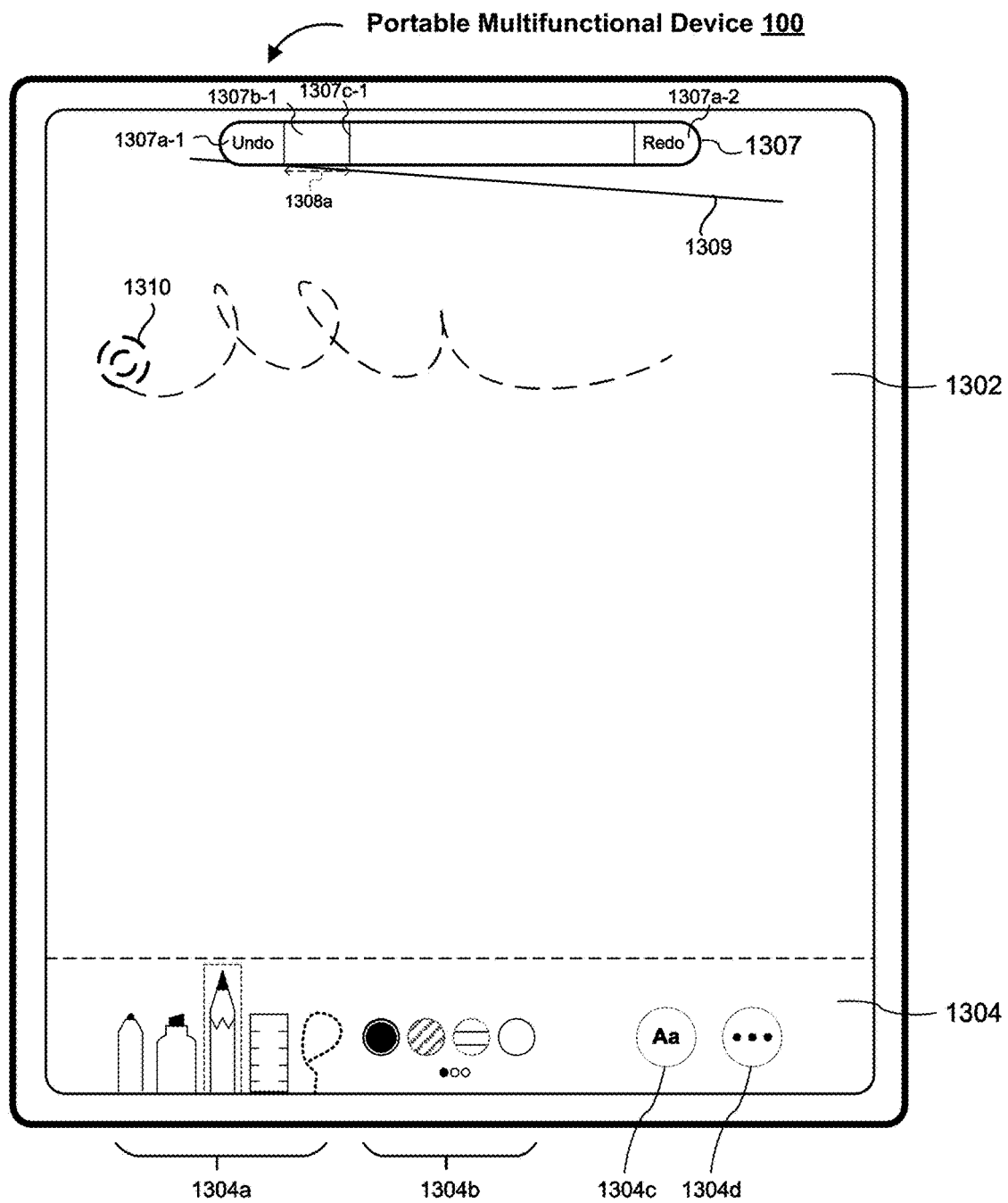
Figure 13E:
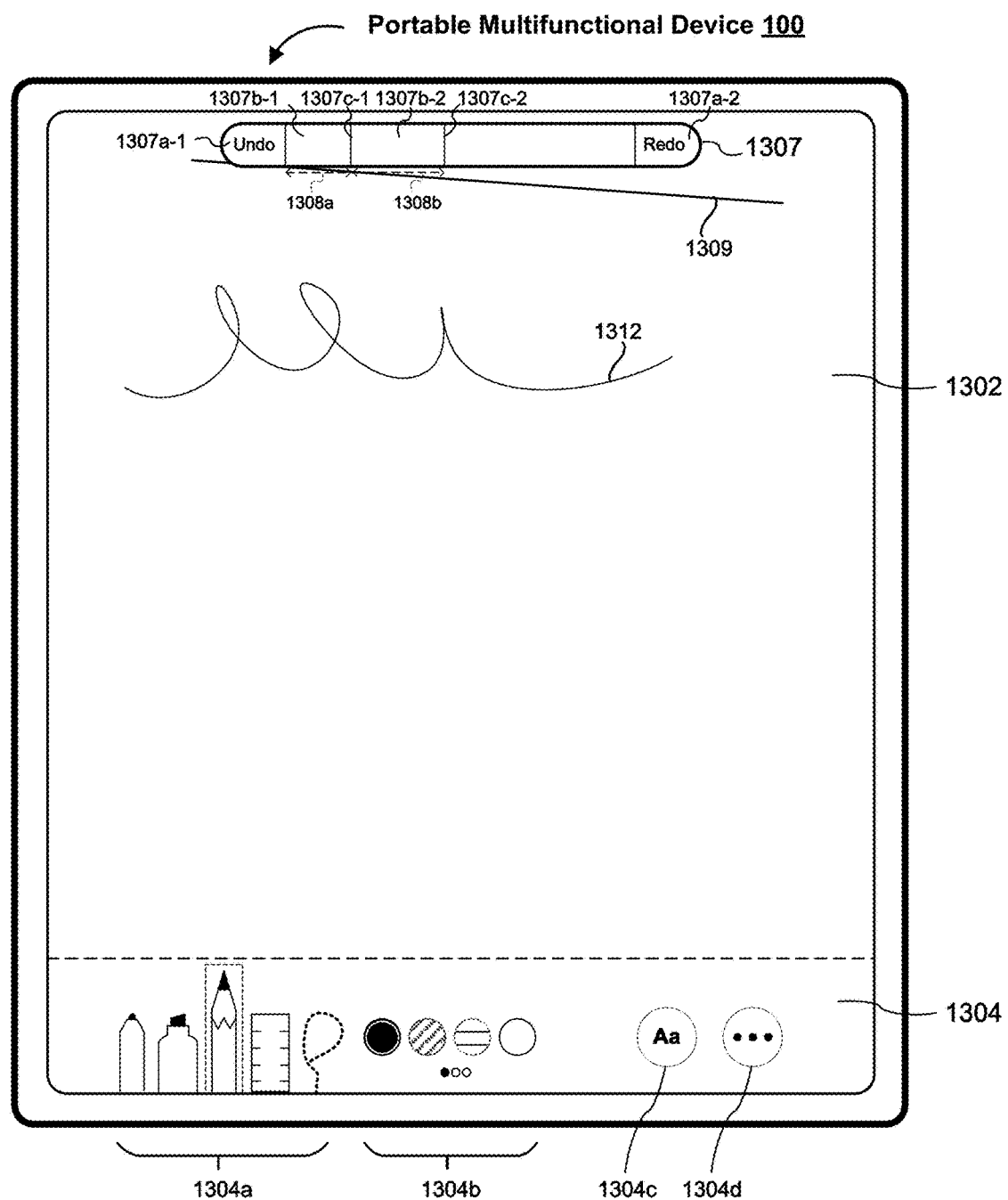

As illustrated in FIGS. 13D and 13E, the electronic device 100 detects a second content manipulation input 1310. In response to detecting the second content manipulation input 1310 in FIG. 13D, the electronic device 100 displays a second mark 1312 in FIG. 13E. Moreover, the electronic device 100 adds, to the scrubber 1307, a second distinct undo affordance 1307c-2 respectively associated with the second mark 1312, as illustrated in FIG. 13E. The first distinct undo affordance 1307c-1 and the second distinct undo affordance 1307c-2 are separated by a second partial undo operation region 1307b-2. The second partial undo operation region 1307b-2 is associated with a second distance 1308b that is indicative of a scope (e.g., magnitude) of the second mark 1312. Notably, the second distance 1308b is larger than the first distance 1308a because the second content manipulation input 1310 created more content (e.g., a longer mark) than did the first content manipulation input 1306.

Figure 13F:
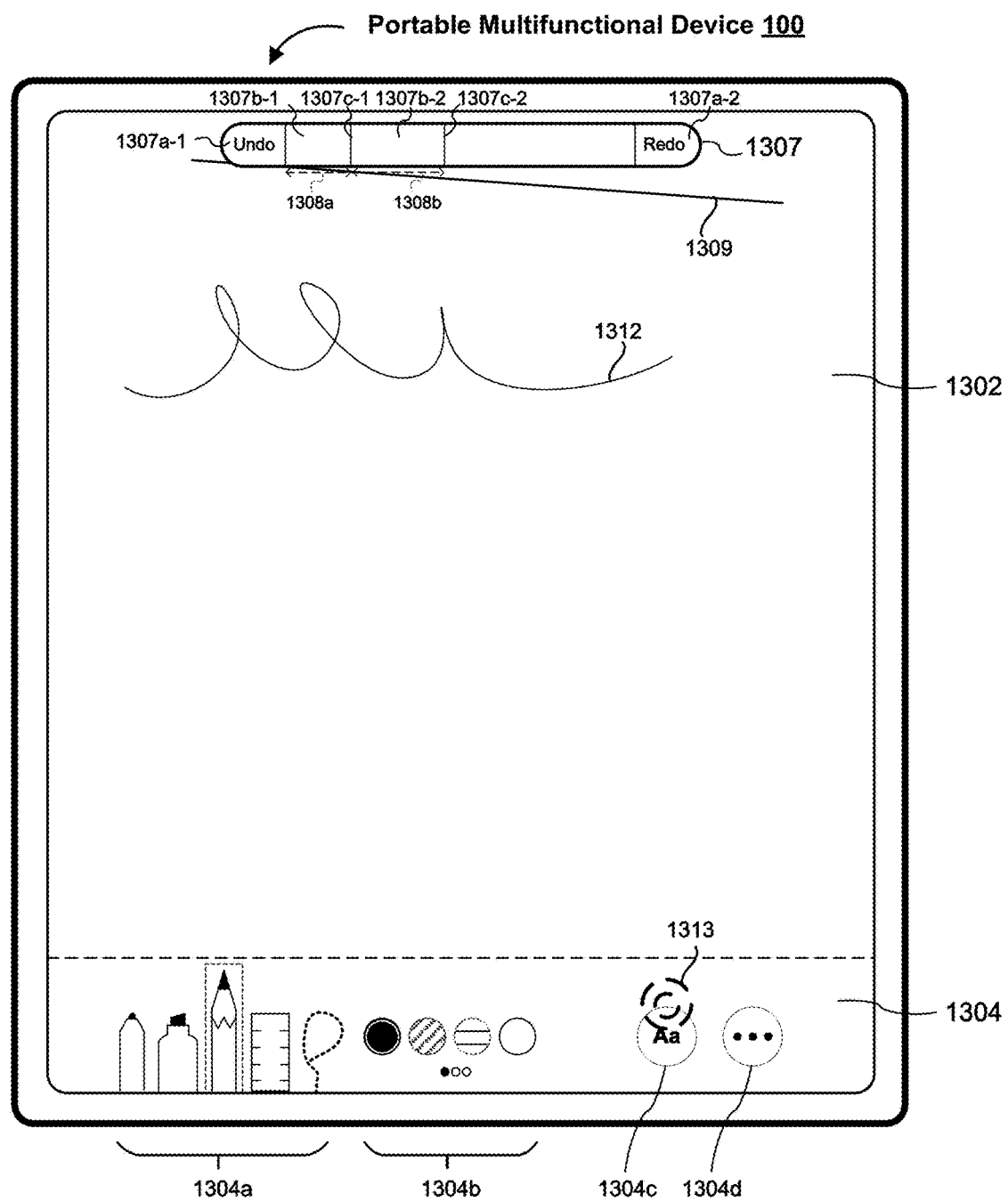

As illustrated in FIG. 13F, the electronic device 100 detects an input 1313 directed to the text tool affordance 1304c. In response to detecting the input 1313 in FIG. 13F, the electronic device 100 changes the currently selected tool from the pencil tool to the text tool, as illustrated in FIG. 13G.

Figure 13G:
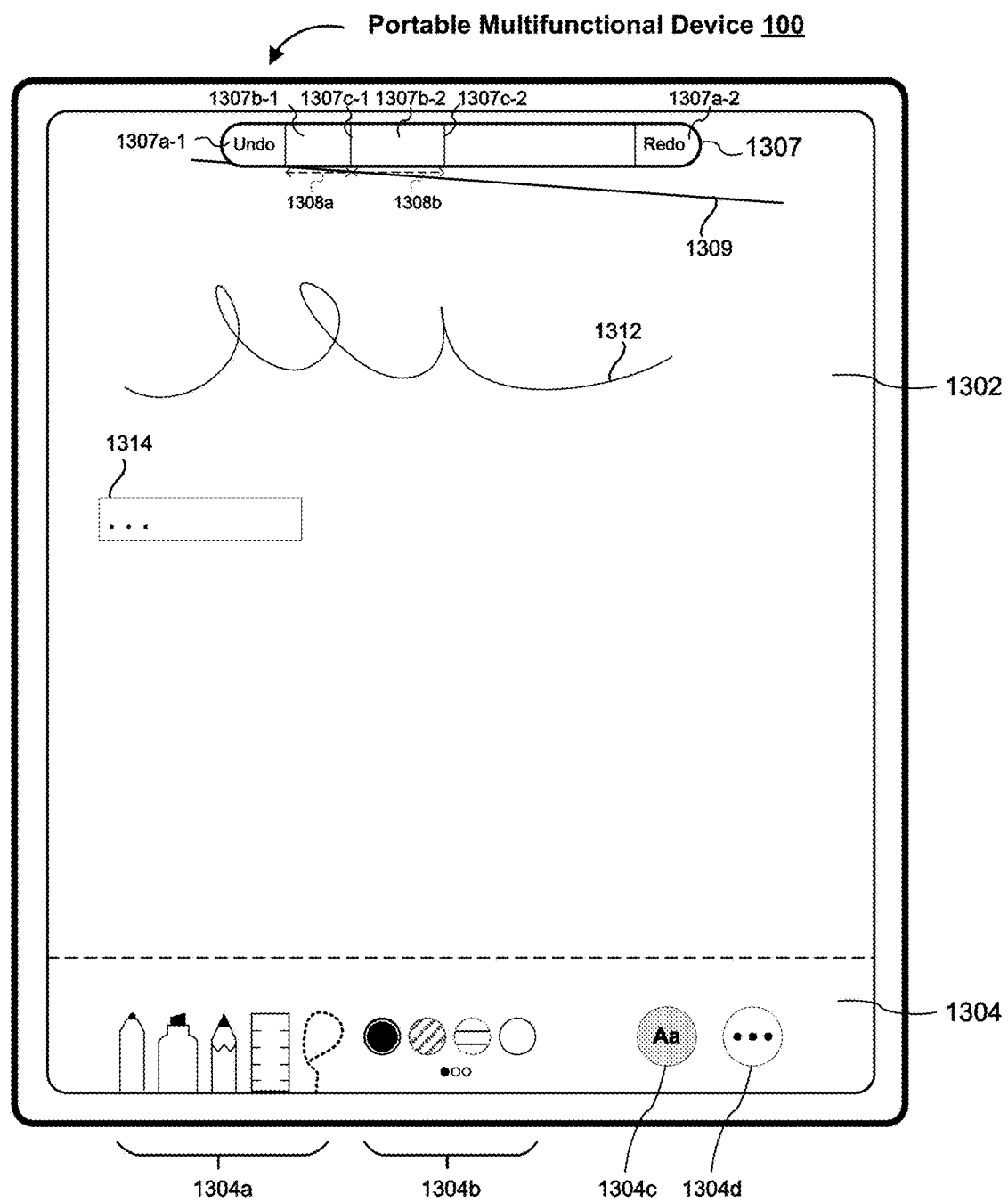
Figure 13H:
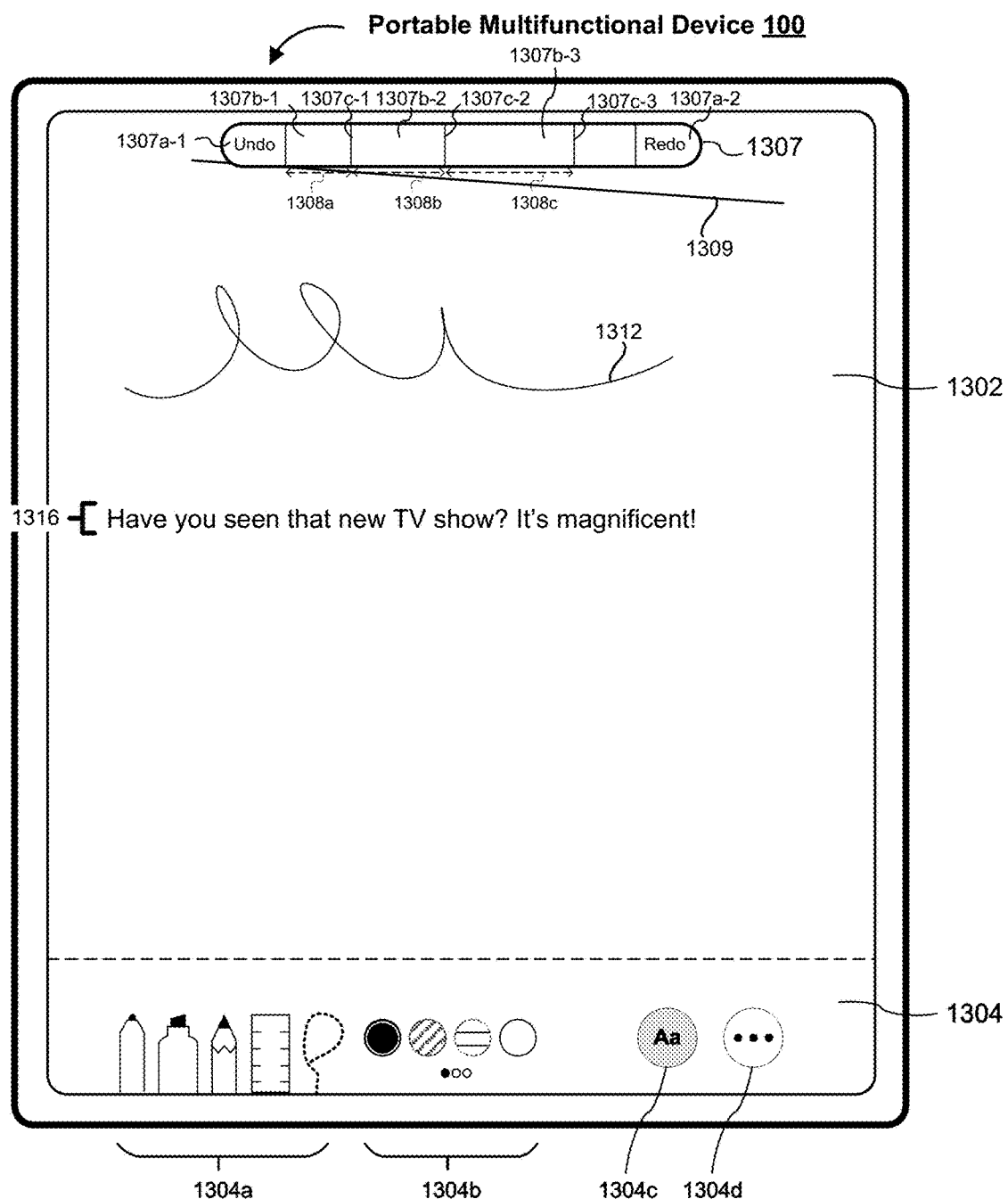

Moreover, the electronic device 100 detects a third content manipulation input 1314 in FIG. 13G. In response to detecting the third content manipulation input 1314 in FIG. 13G, the electronic device 100 displays a text string 1316 in FIG. 13H. Moreover, as described above, the electronic device 100 adds, to the scrubber 1307, a third distinct undo affordance 1307c-3 respectively associated with the text string 1316, as illustrated in FIG. 13H. The second distinct undo affordance 1307c-2 and the third distinct undo affordance 1307c-3 are separated by a third partial undo operation region 1307*b*-3. The third partial undo operation region 1307*b*-3 is associated with a third distance 1308*c* that is indicative of a scope (e.g., magnitude) of the text string 1316.

Figure 13I:
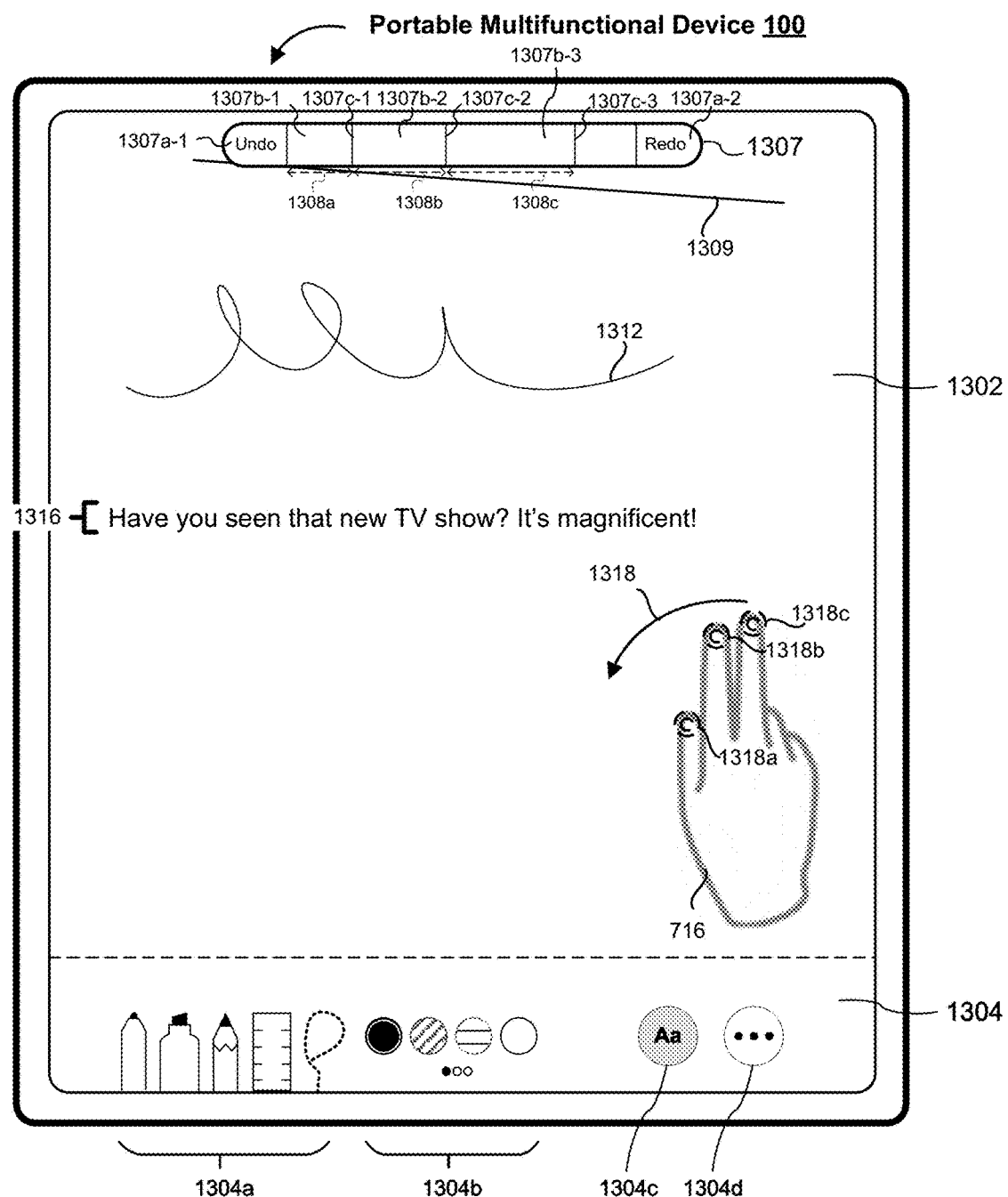

As illustrated in FIG. 13I, the electronic device 100 detects, on a touch-sensitive surface of the electronic device 100, a first multi-finger gesture 1318 that includes rotation of a first contact 1318*a*, a second contact 1318*b*, and a third contact 1318*c* as a group in a first direction (e.g., relative to a shared axis of rotation, a shared pivot point, or a shared center of rotation). The first direction in FIG. 13I corresponds to a substantially counterclockwise direction.

Figure 13J:
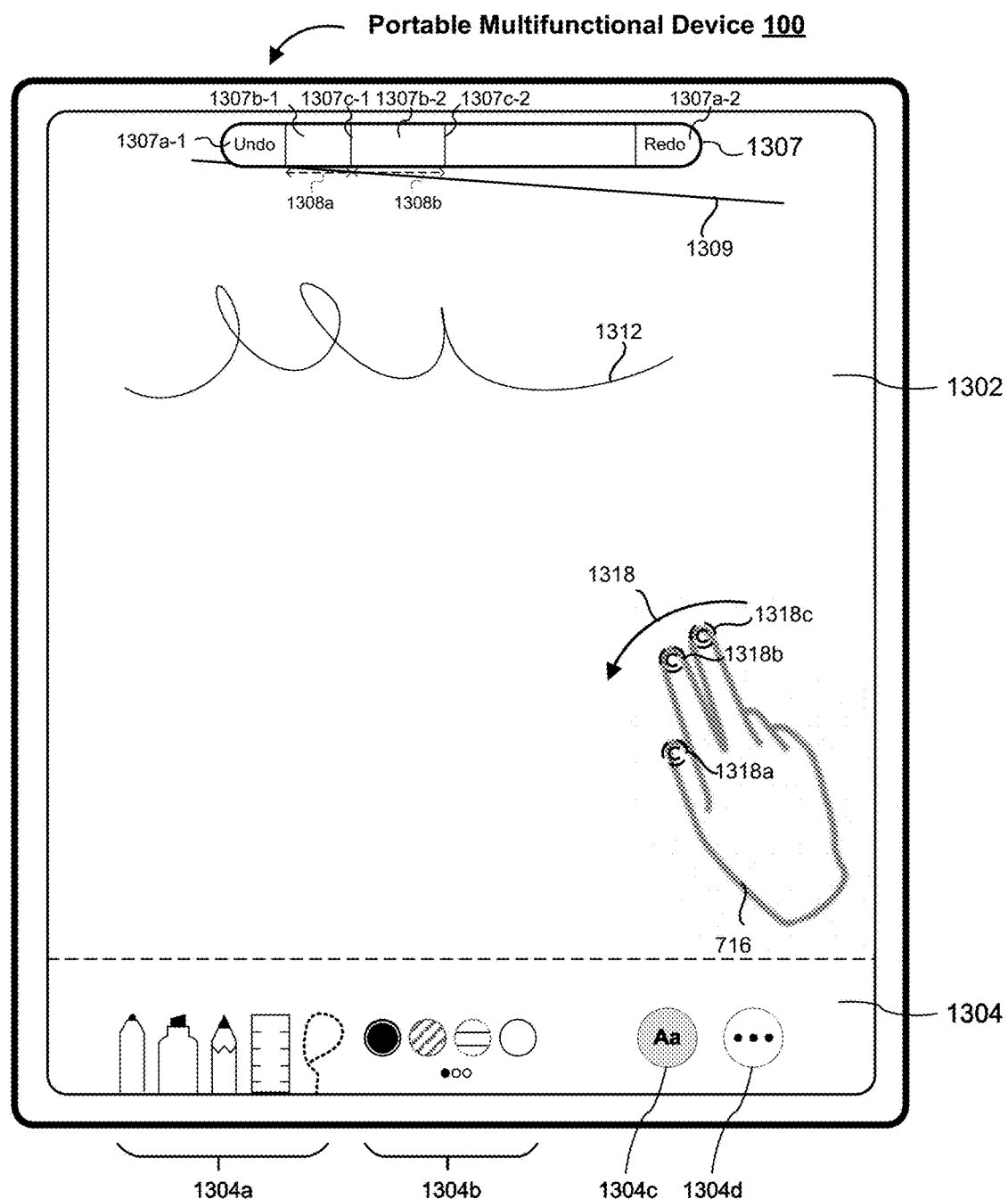

In response to determining that the first multi-finger gesture 1318 includes the rotation in the first direction, the electronic device 100 performs an undo operation on (e.g., ceases to display) the text string 1316, as illustrated in FIG. 13J. Moreover, as illustrated in FIG. 13J, the electronic device 100 ceases to display the third distinct undo affordance 1307*c*-3 within the scrubber 1307 because the text string 1316 associated with the third distinct undo affordance 1307*c*-3 has been undone.

Figure 13K:
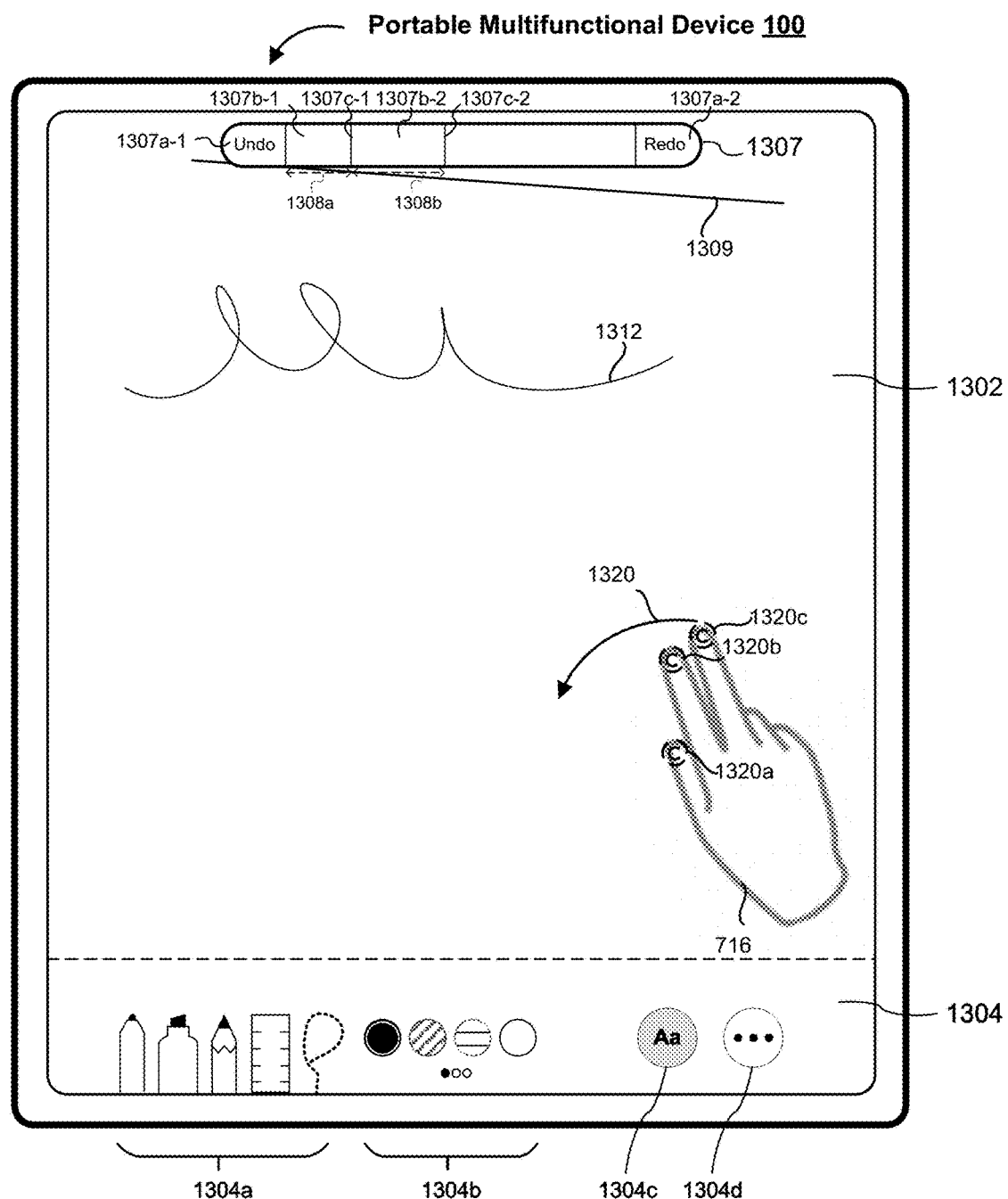

As illustrated in FIG. 13K, the electronic device 100 detects, on the touch-sensitive surface, a second multi-finger gesture 1320. The second multi-finger gesture 1320 includes rotation of a first contact 1320*a*, a second contact 1320*b*, and a third contact 1320*c* as a group in the first direction. The second multi-finger gesture 1320 corresponds to a continuation of the first multi-finger gesture 1318 in the first direction. In other words, the electronic device 100 detects the second multi-finger gesture 1320 before detecting release of the first contact 1318*a*, the second contact 1318*b*, and the third contact 1318*c* that are associated with the first multi-finger gesture 1318.

Figure 13L:
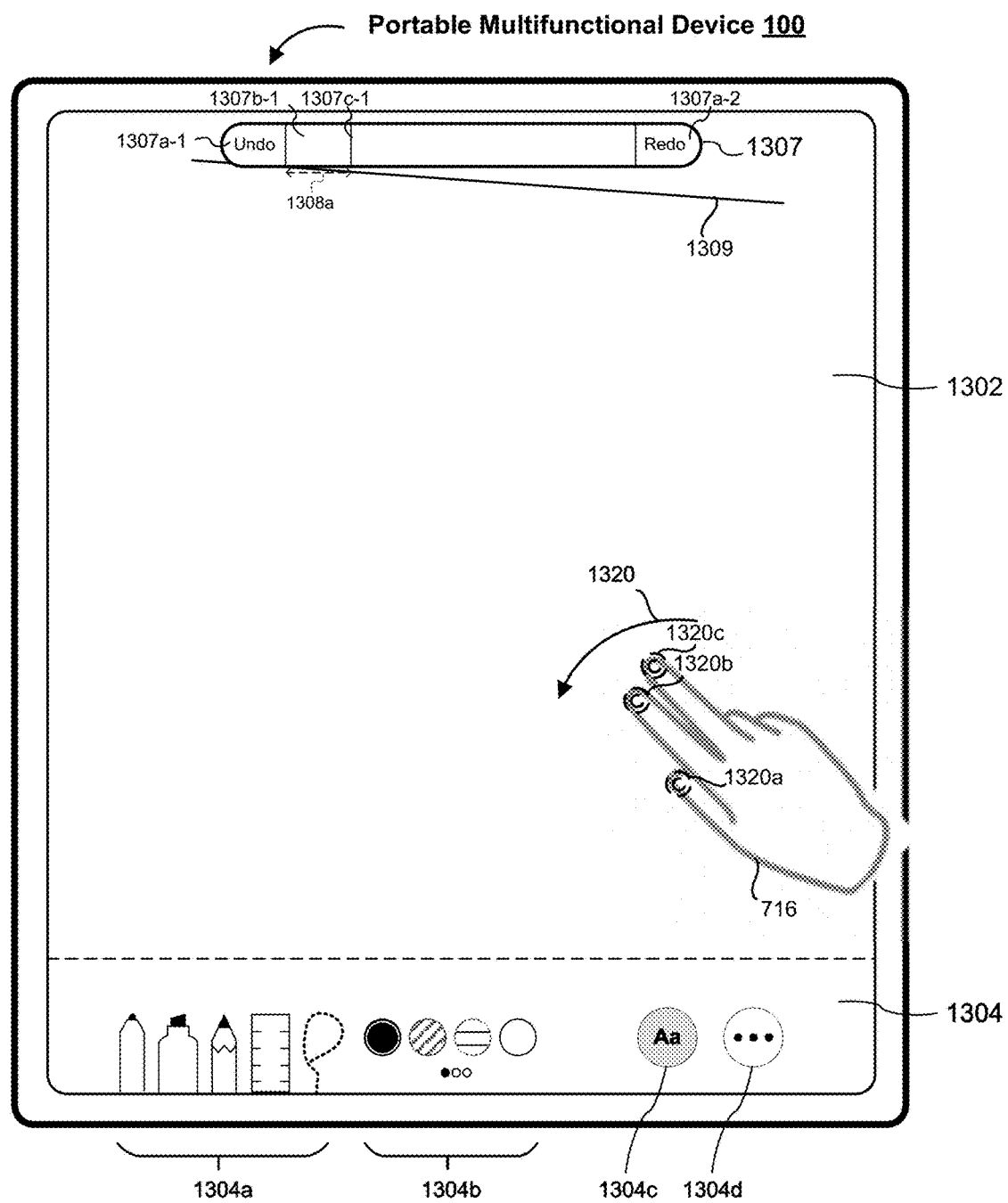

In response to determining that the second multi-finger gesture 1320 includes the rotation in the first direction, the electronic device 100 performs an undo operation on (e.g., ceases to display) the second mark 1312, as illustrated in FIG. 13L. Moreover, as illustrated in FIG. 13L, the electronic device 100 ceases to display the second distinct undo affordance 1307*c*-2 within the scrubber 1307 because the second mark 1312 associated with the second distinct undo affordance 1307*c*-2 has been undone.

Figure 13M:
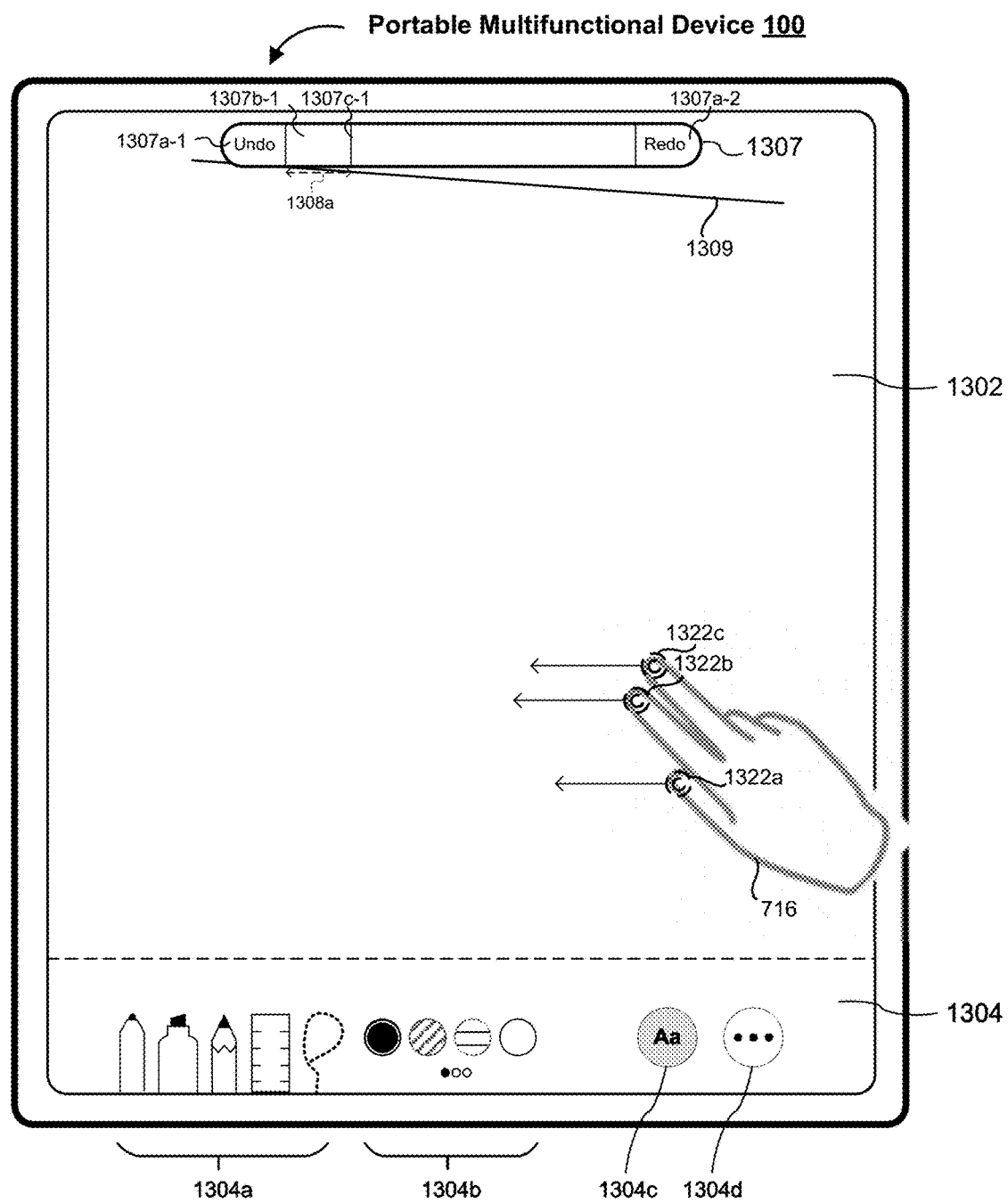

As illustrated in FIG. 13M, the electronic device 100 detects, on the touch-sensitive surface, a first multi-finger drag gesture 1322 that includes movement of a first contact 1322*a*, a second contact 1322*b*, and a third contact 1322*c* in the substantially leftwards direction. One of ordinary skill in the art will appreciate that, in some embodiments, the first multi-finger drag gesture 1322 includes movement in a different direction. In some embodiments, the electronic device 100 detects the first multi-finger drag gesture 1322 before detecting release of the first contact 1320*a*, the second contact 1320*b*, and the third contact 1320*c* that are associated with the second multi-finger gesture 1320. In some embodiments, the electronic device 100 detects a release of one or more of the first contact 1320*a*, the second contact 1320*b*, and the third contact 1320*c* that are associated with the second multi-finger gesture 1320 before detecting the first multi-finger drag gesture 1322. For example, in some embodiments, the electronic device 100 detects the first multi-finger drag gesture 1322 within a threshold amount of time after ceasing to detect the one or more of the first contact 1320*a*, the second contact 1320*b*, and the third contact 1320*c* that are associated with the second multi-finger gesture 1320.

Figure 13N:
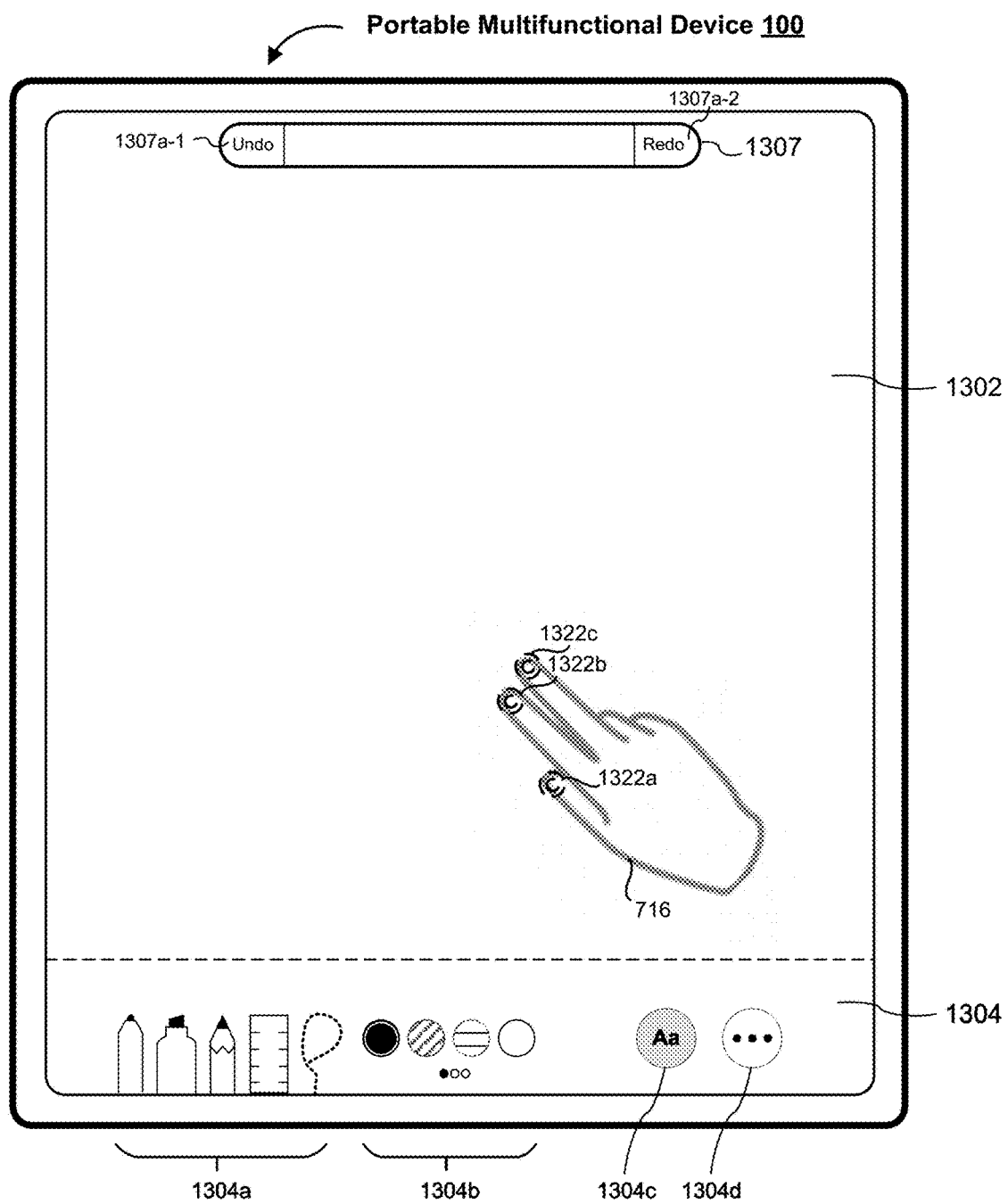

In response to detecting the first multi-finger drag gesture 1322 in FIG. 13M, the electronic device 100 performs an undo operation on (e.g., ceases to display) the first mark 1309, as illustrated in FIG. 13N. Moreover, as illustrated in FIG. 13N, the electronic device 100 ceases to display the first distinct undo affordance 1307*c*-1 within the scrubber 1307 because the first mark 1309 associated with the first distinct undo affordance 1307*c*-1 has been undone.

Figure 13O:
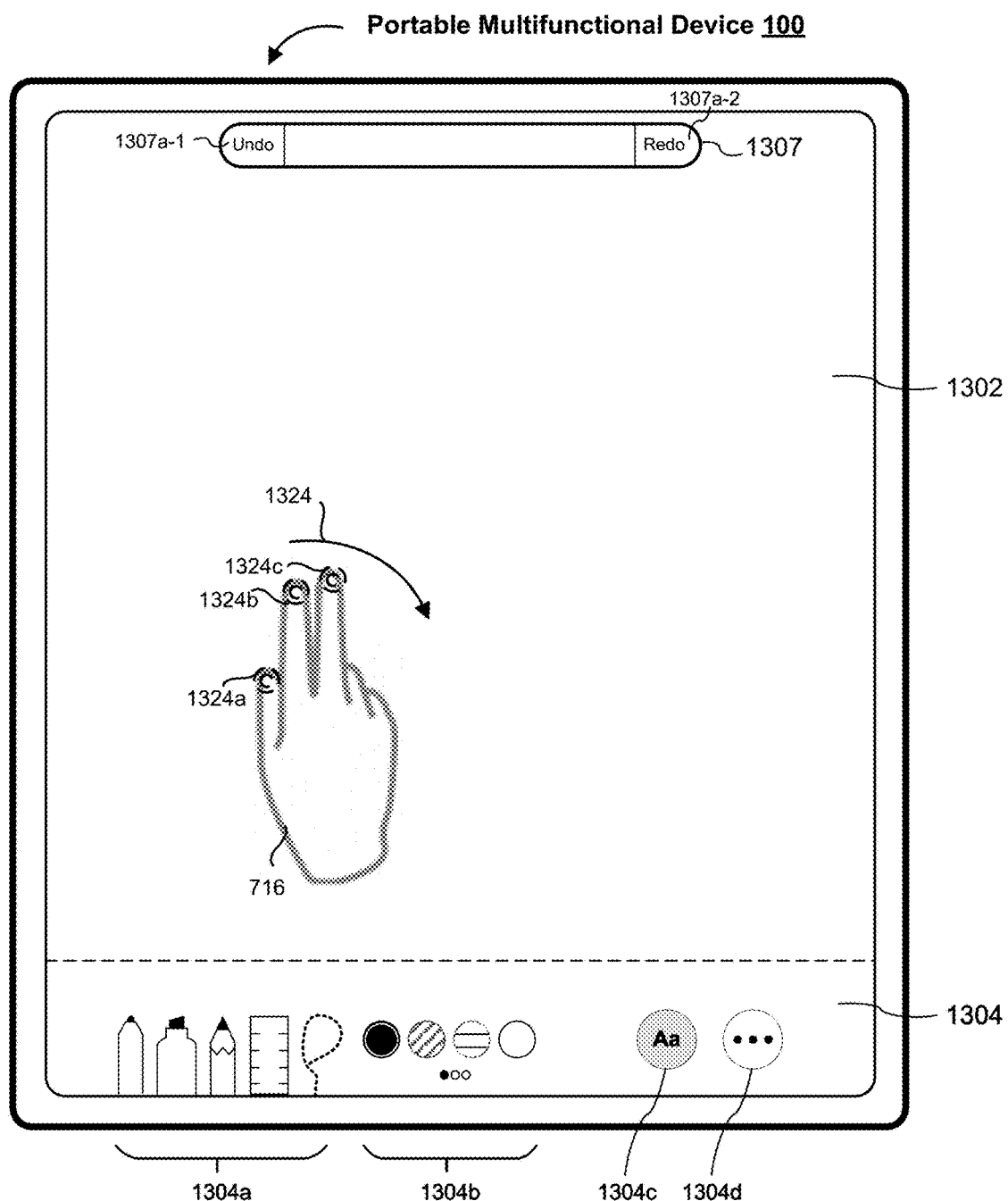
Figure 13P:
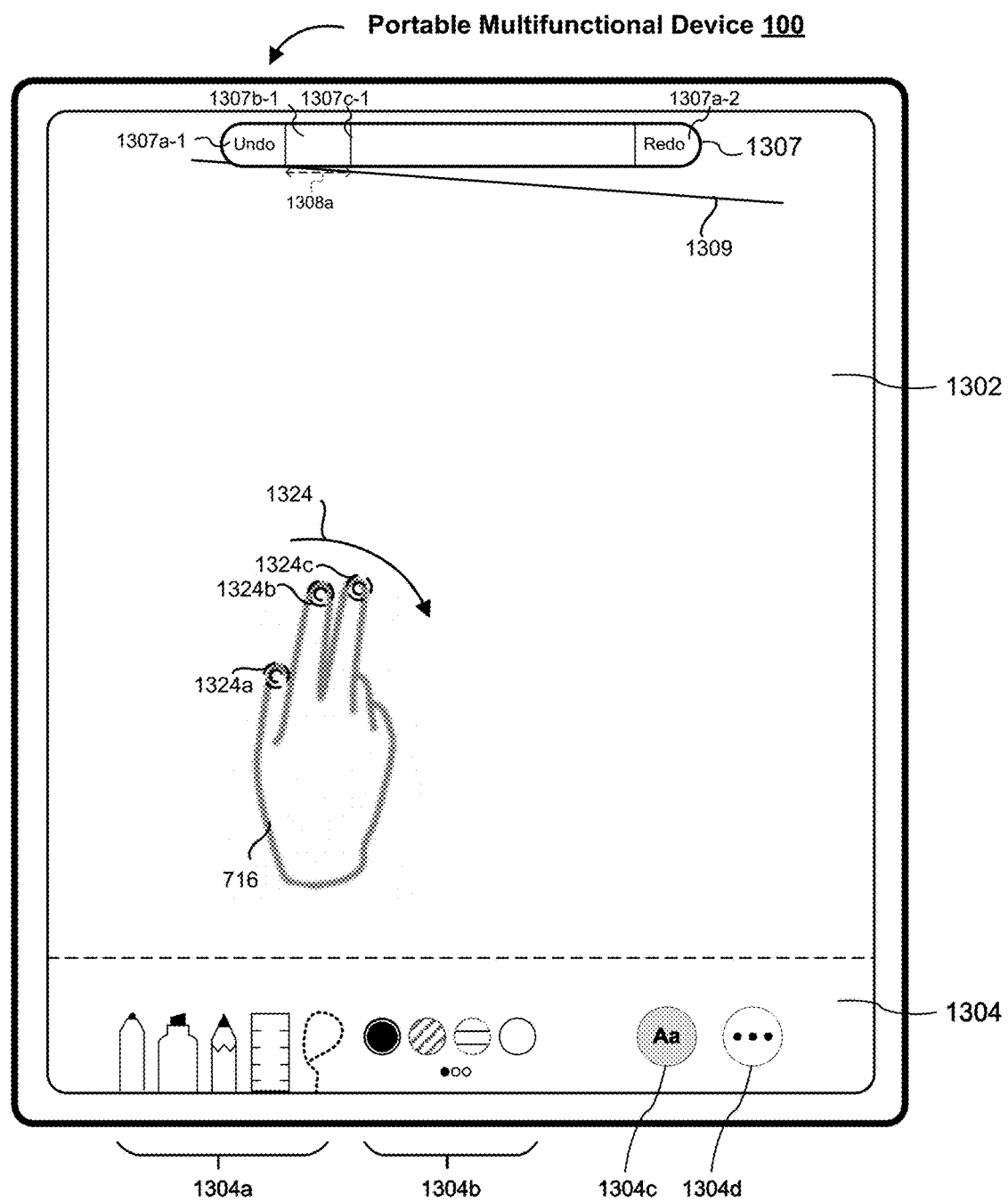

As illustrated in FIG. 13O, the electronic device 100 detects, on the touch-sensitive surface, a third multi-finger gesture 1324 that rotates in a second direction (e.g., substantially clockwise) that is different from the first direction. The third multi-finger gesture 1324 includes rotation of a first contact 1324*a*, a second contact 1324*b*, and a third contact 1324*c* as a group in the second direction. In response to determining that the third multi-finger gesture 1324 includes the rotation in the second direction, the electronic device 100 performs a redo operation on (e.g., displays) the first mark 1309, as illustrated in FIG. 13P. Moreover, as illustrated in FIG. 13P, the electronic device 100 adds, to the scrubber 1307, the first distinct undo affordance 1307*c*-1 because the first mark 1309 associated with the first distinct undo affordance 1307*c*-3 has been redone.

Figure 13Q:
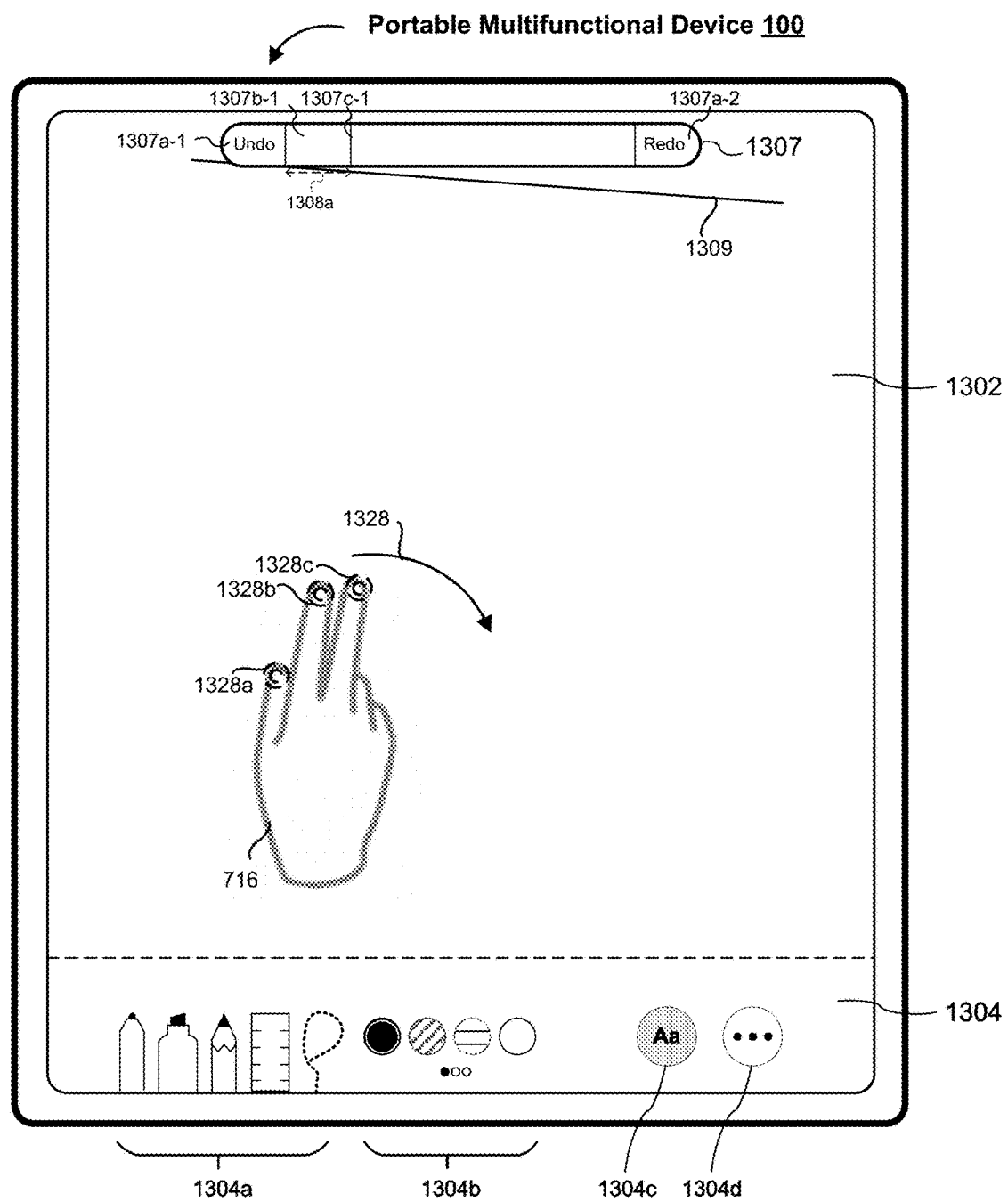

As illustrated in FIG. 13Q, the electronic device 100 detects, on the touch-sensitive surface, a fourth multi-finger gesture 1328 that rotates in the second direction. The fourth multi-finger gesture 1328 includes rotation of a first contact 1328*a*, a second contact 1328*b*, and a third contact 1328*c* as a group in the second direction. The fourth multi-finger gesture 1328 corresponds to a continuation of the third multi-finger gesture 1324 in the second direction. In other words, the electronic device 100 detects the fourth multi-finger gesture 1328 before detecting release of the first contact 1324*a*, the second contact 1324*b*, and the third contact 1324*c* that are associated with the third multi-finger gesture 1324.

Figure 13R:
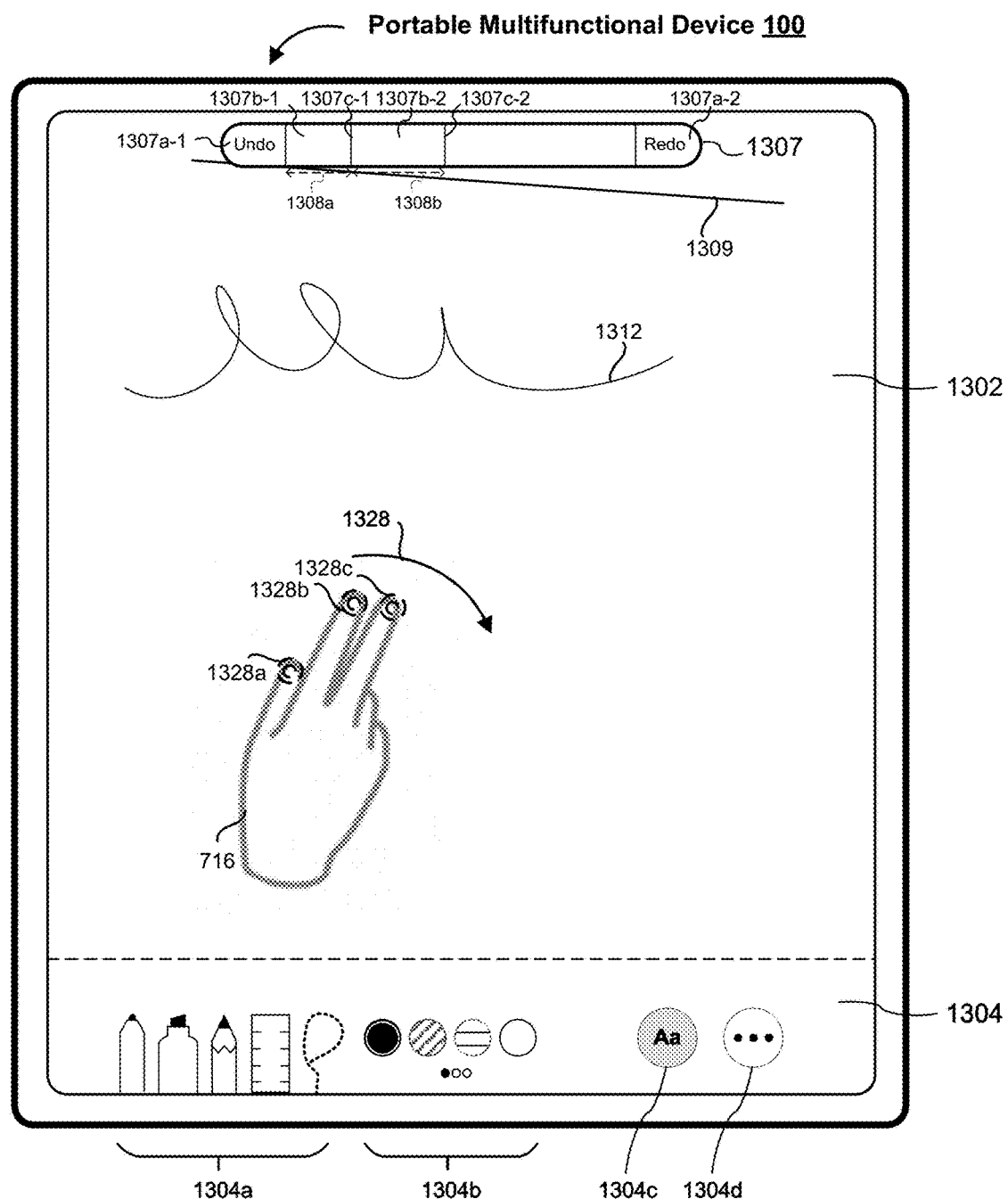

In response to determining that the fourth multi-finger gesture 1328 includes the rotation in the second direction, the electronic device 100 performs a redo operation on (e.g., displays) the second mark 1312, as illustrated in FIG. 13R. Moreover, as illustrated in FIG. 13R, the electronic device 100 adds, to the scrubber 1307, the second distinct undo affordance 1307*c*-2 because the second mark 1312 associated with the second distinct undo affordance 1307*c*-2 has been redone.

Figure 13S:
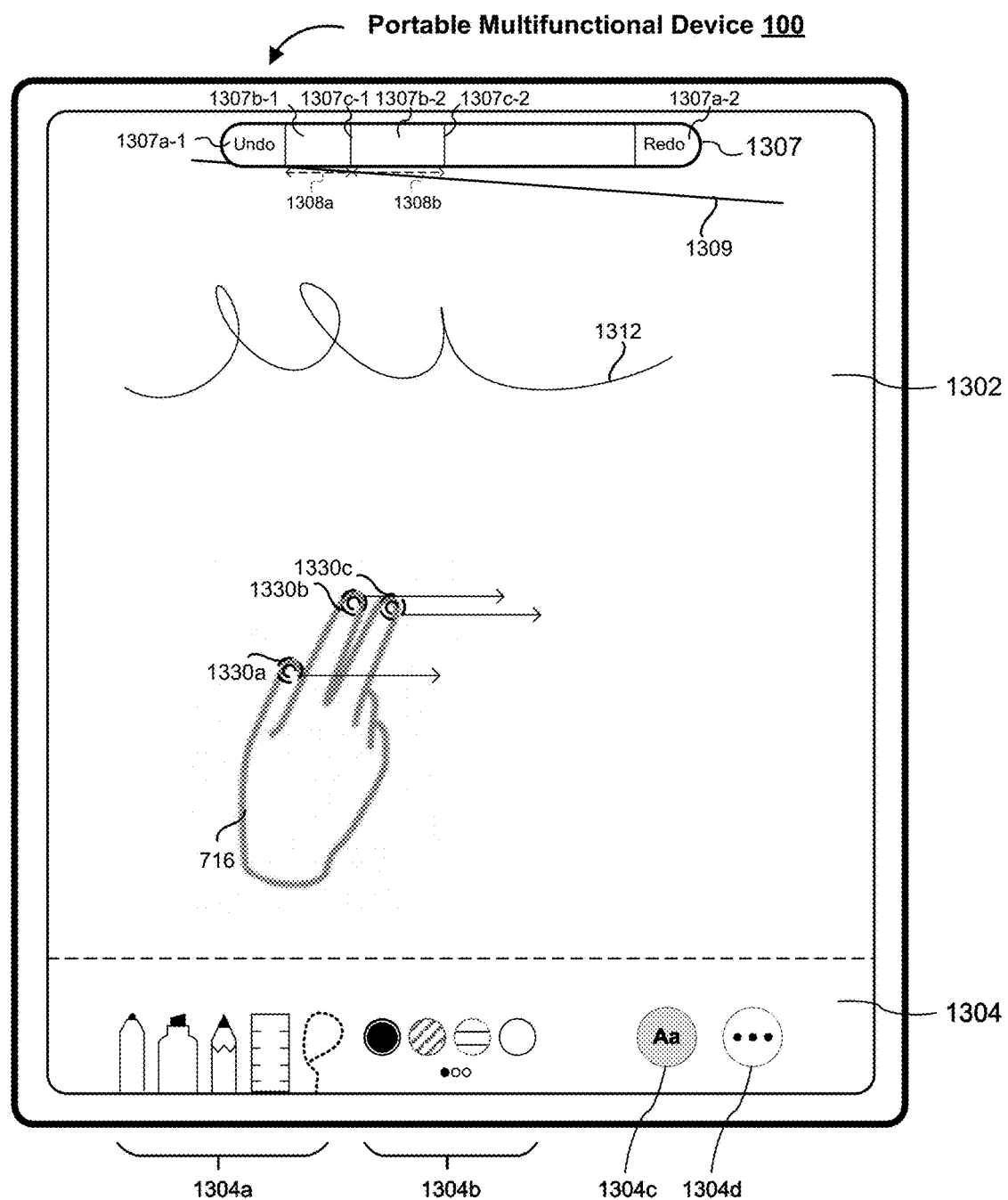

As illustrated in FIG. 13S, the electronic device 100 detects, on the touch-sensitive surface, a second multi-finger drag gesture 1330 that includes movement of a first contact 1330*a*, a second contact 1330*b*, and a third contact 1330*c* in the substantially rightwards direction. One of ordinary skill in the art will appreciate that, in some embodiments, the second multi-finger drag gesture 1330 includes movement in a different direction. In some embodiments, the electronic device 100 detects the second multi-finger drag gesture 1330 before detecting release of the first contact 1328*a*, the second contact 1328*b*, and the third contact 1328*c* that are associated with the fourth multi-finger gesture 1328. In some embodiments, the electronic device 100 detects a release of one or more of the first contact 1328*a*, the second contact 1328*b*, and the third contact 1328*c* that are associated with the fourth multi-finger gesture 1328 before detecting the second multi-finger drag gesture 1330. For example, in some embodiments, the electronic device 100 detects the second multi-finger drag gesture 1330 within a threshold amount of time after ceasing to detect the one or more of the first contact 1328*a*, the second contact 1328*b*, and the third contact 1328*c* that are associated with the fourth multi-finger gesture 1328.

Figure 13T:
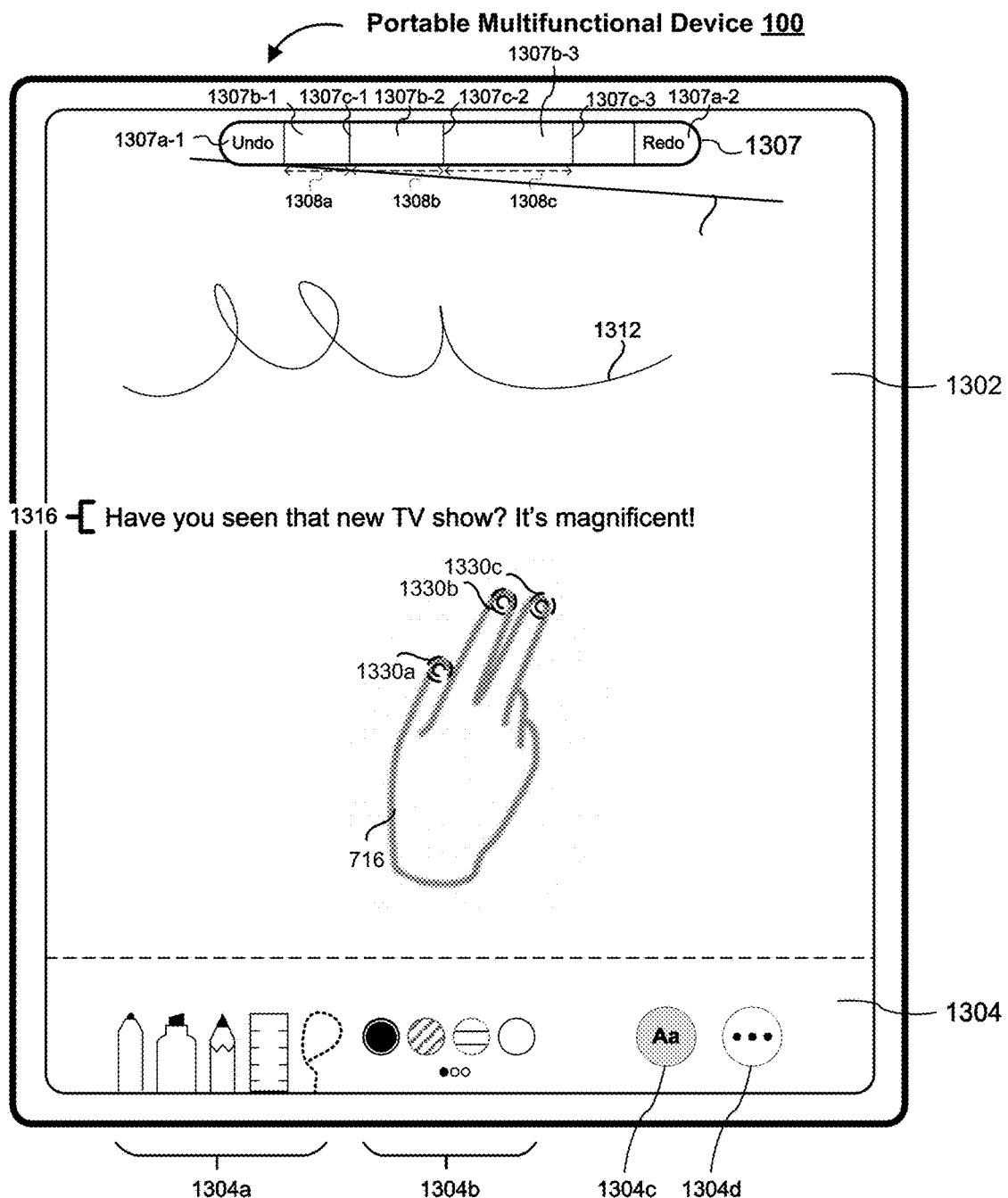
Figure 13U:
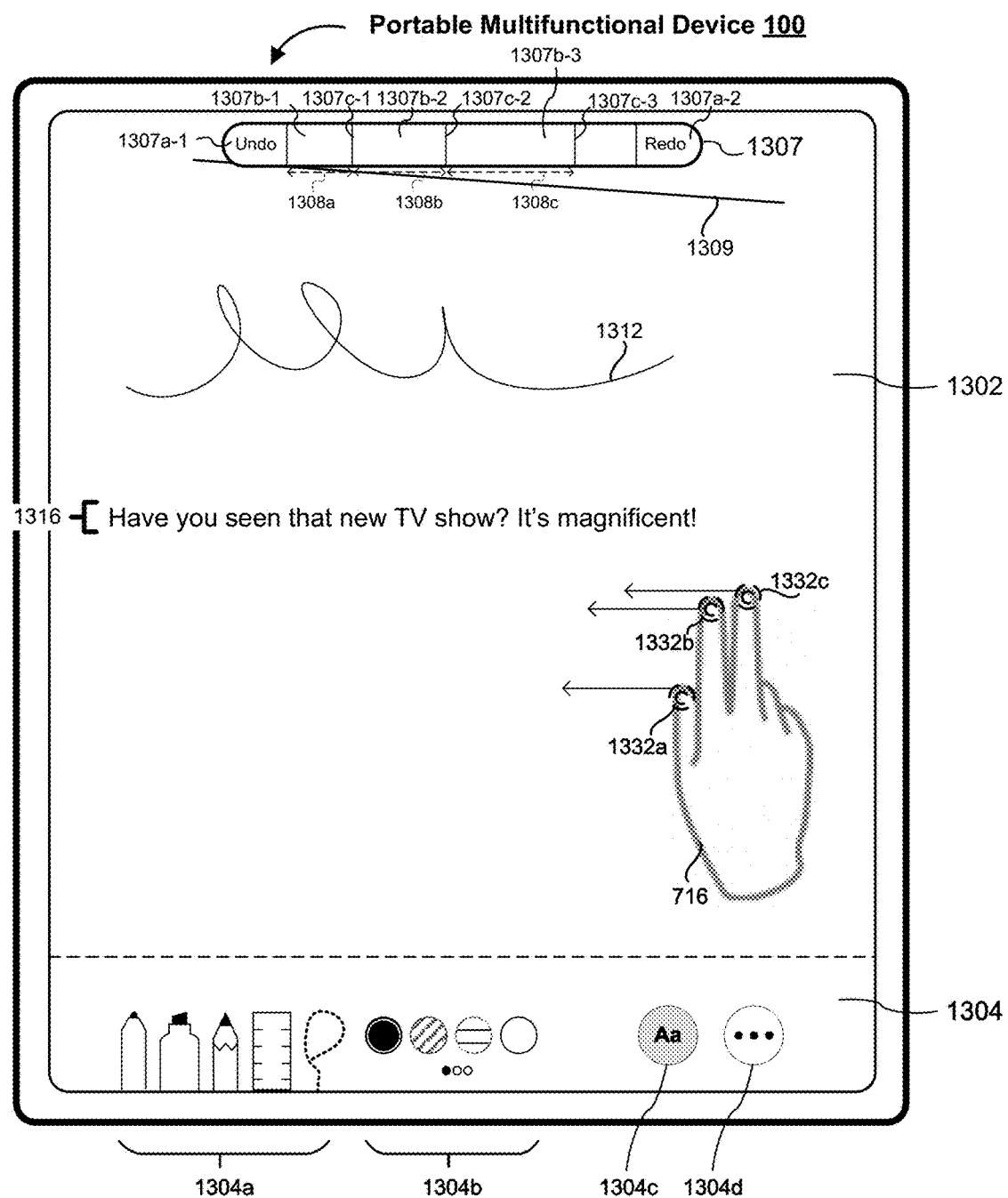
Figure 13V:
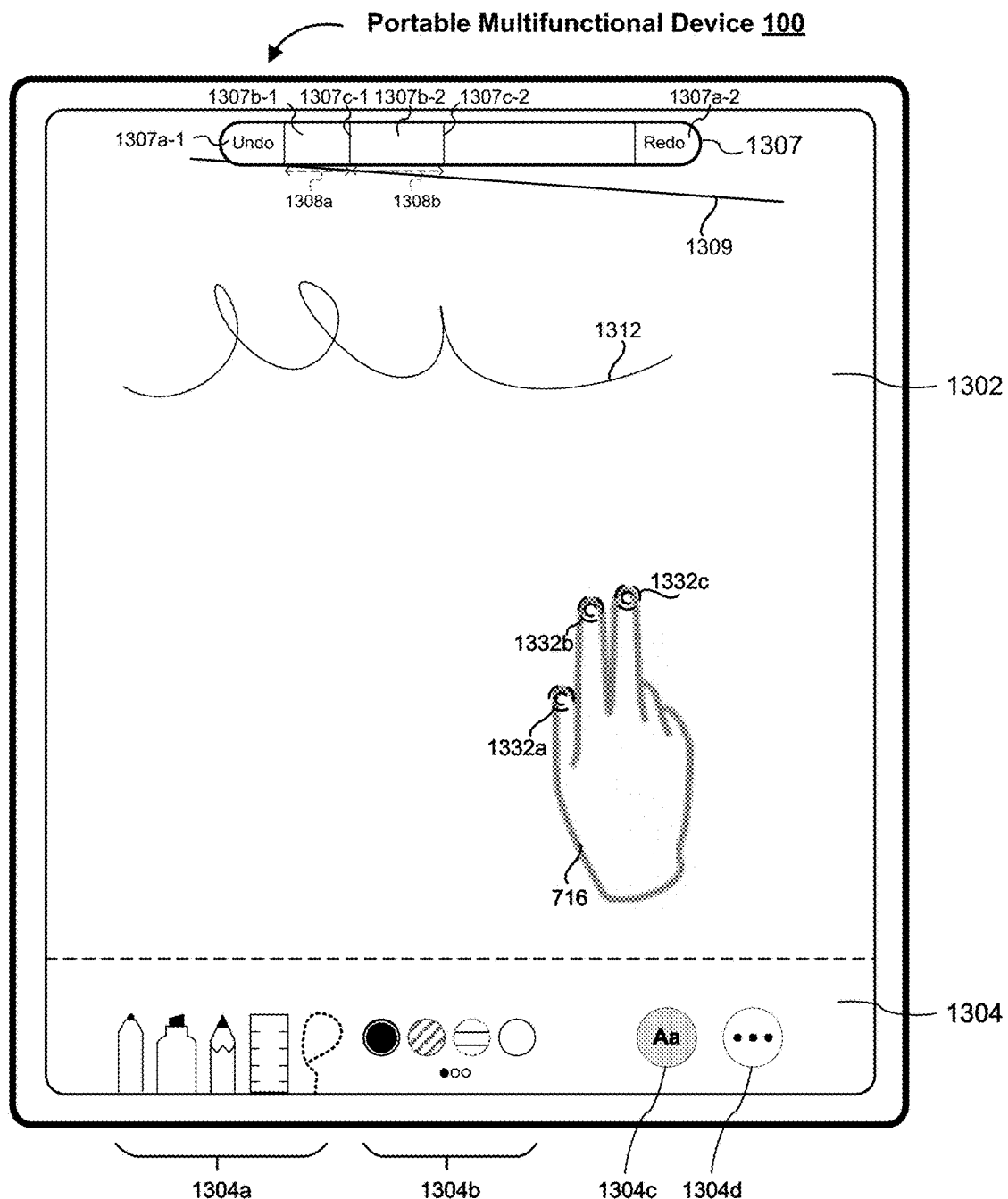
Figure 13W:
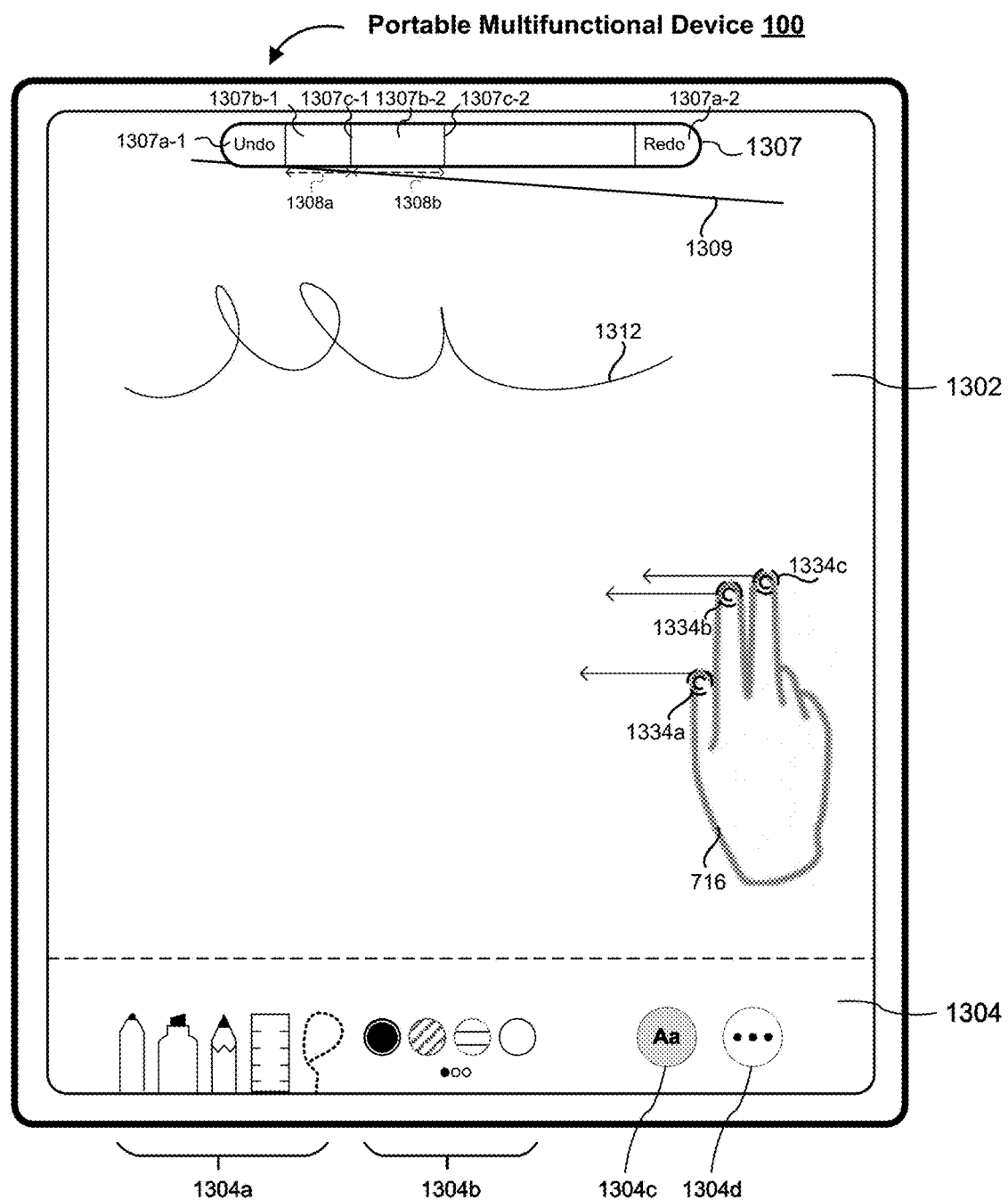
Figure 13X:
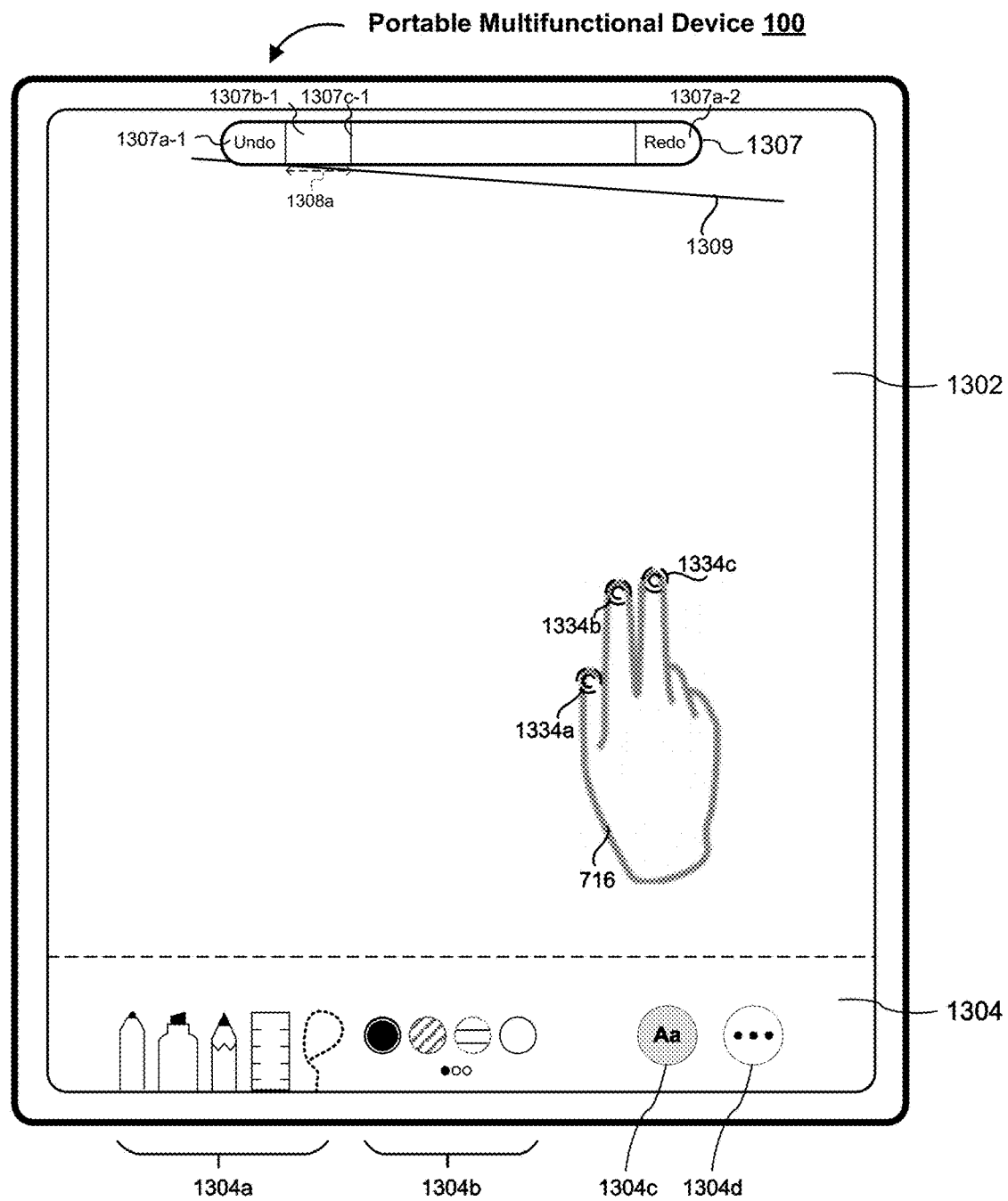

In response to detecting the second multi-finger drag gesture 1330 in FIG. 13S, the electronic device 100 performs a redo operation on (e.g., displays) the text string 1316, as illustrated in FIG. 13T. Moreover, as illustrated in FIG. 13T, the electronic device 100 adds, to the scrubber 1307, the third distinct undo affordance 1307*c*-3 because the text string 1316 associated with the third distinct undo affordance 1307*c*-3 has been redone.

As illustrated in FIGS. 13U-13X, the electronic device 100 detects, on the touch-sensitive surface, a successive third multi-finger drag gesture 1332 and fourth multi-finger drag gesture 1334, each of which includes a respective multi-finger movement in the substantially leftwards direction. In response to detecting the successive multi-finger drag gestures 1332 and 1334, the electronic device 100 performs successive undo operations on the text string 1316 and the second mark 1312, respectively. Moreover, the electronic device 100 removes, from the scrubber 1307, the third distinct undo affordance 1307*c*-3 and the second distinct undo affordance 1307*c*-2 that are associated with the text string 1316 and the second mark 1312, respectively.

Figure 13Y:
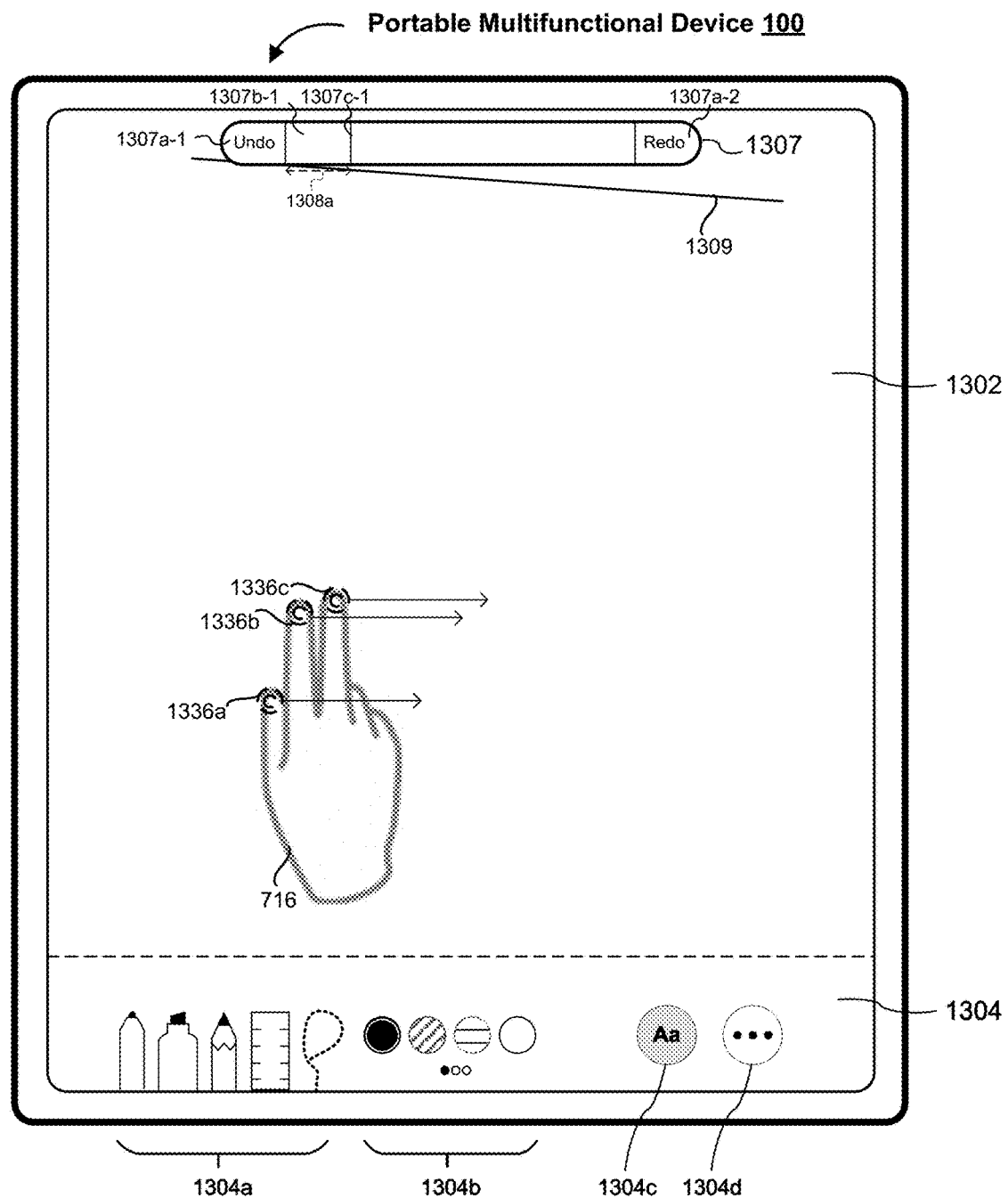
Figure 13Z:
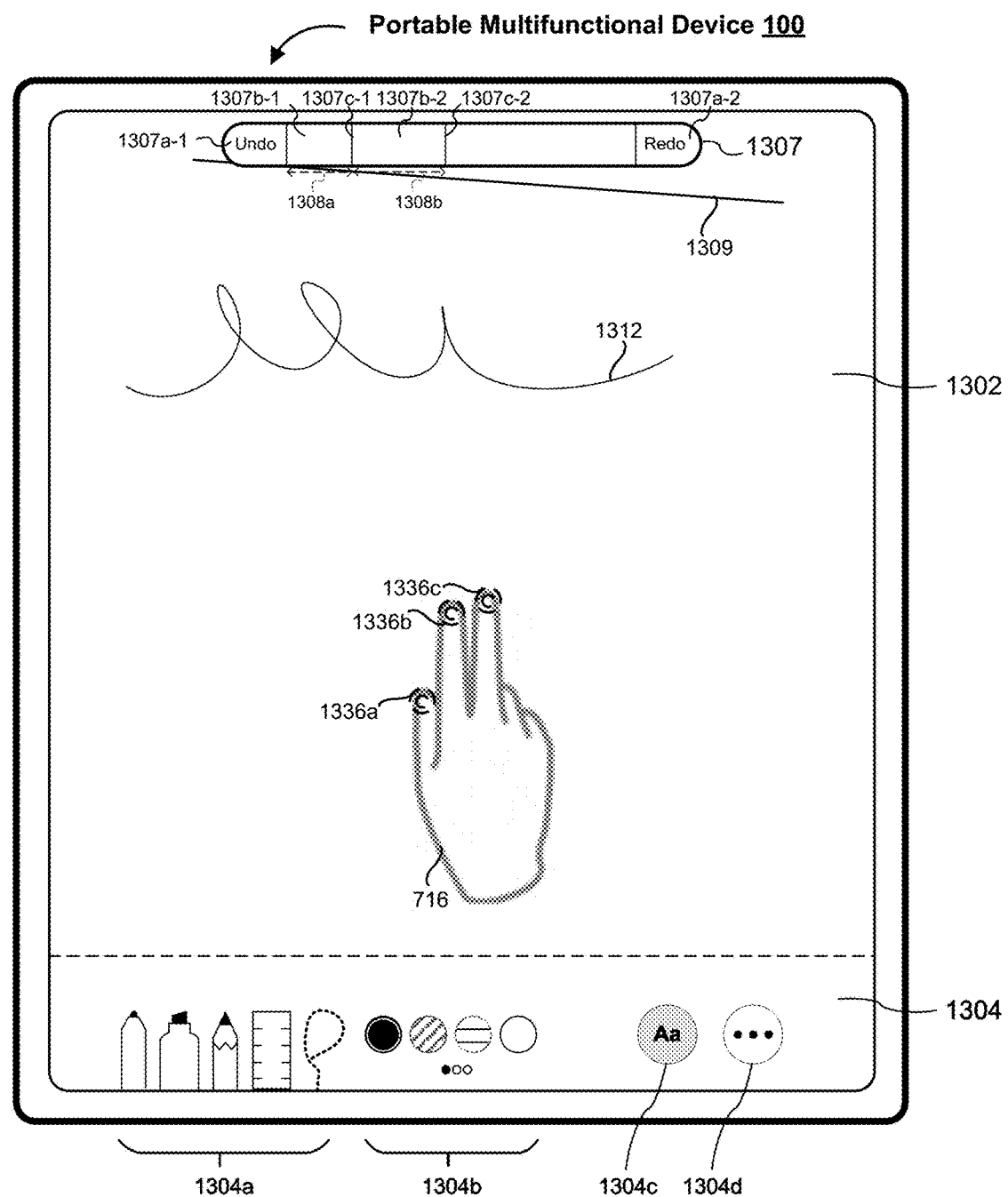
Figure 13A:
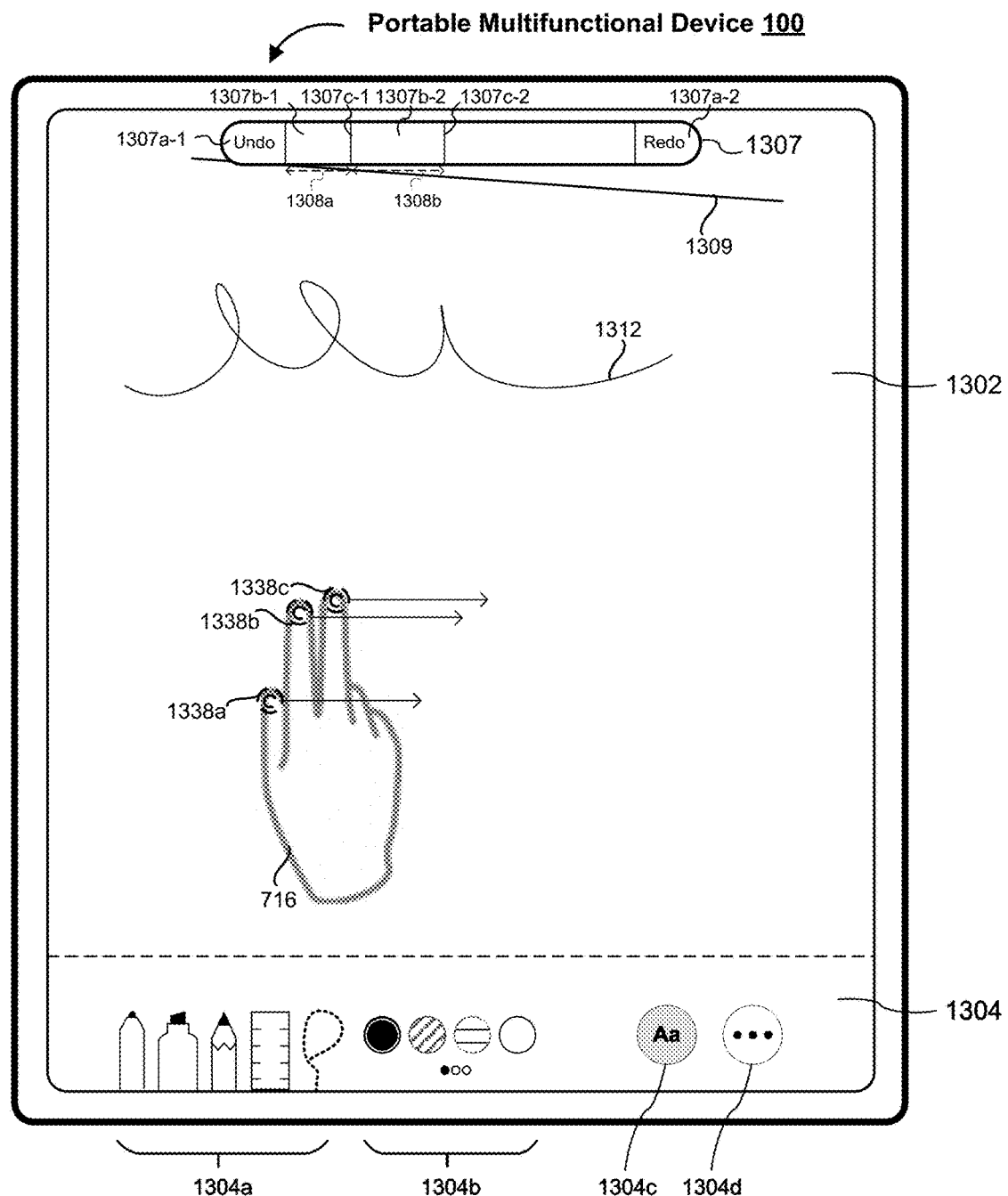
Figure 13A:
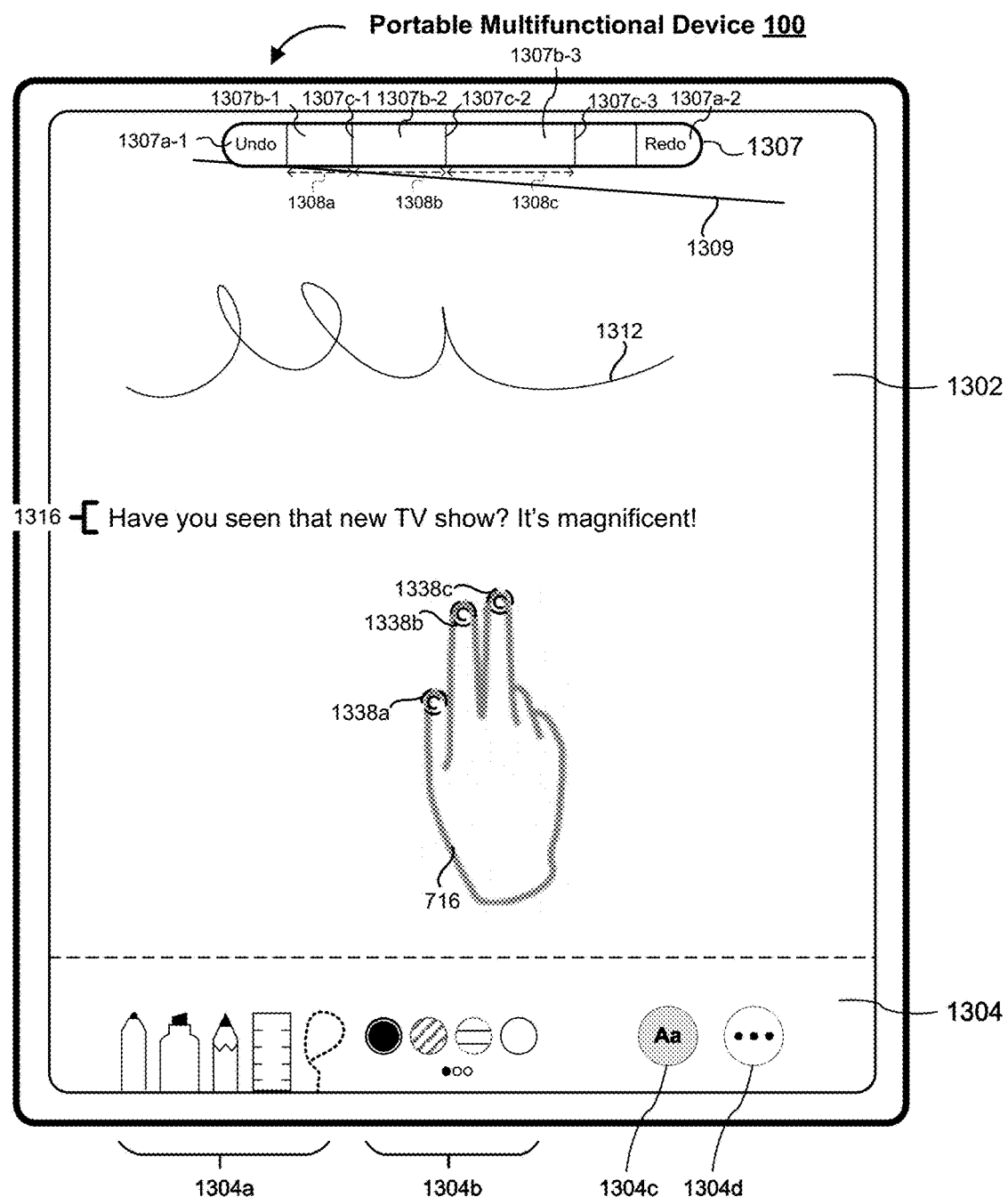

As illustrated in FIGS. 13Y-13AB, the electronic device 100 detects, on the touch-sensitive surface, a successive fifth multi-finger drag gesture 1336 and sixth multi-finger drag gesture 1338, each of which includes a respective multi-finger movement in the substantially rightwards direction. In response to detecting the successive multi-finger drag gestures 1336 and 1338, the electronic device 100 performs successive redo operations on the second mark 1312 and the text string 1316, respectively. Moreover, the electronic device 100 adds, to the scrubber 1307, the second distinct undo affordance 1307*c*-2 and the third distinct undo affordance 1307*c*-3 that are associated with the second mark 1312 and the text string 1316, respectively.

FIGS. 14A-14E is a flow diagram of a method 1400 for performing content manipulation operations in response to multi-finger pinch gestures in accordance with some embodiments. In some embodiments, the method 1400 is performed at an electronic device (e.g., the electronic device 300 in FIG. 3, the portable multifunction device 100 in FIG. 1A, or the electronic device 100 in FIGS. 12A-12AY) with one or more processors, a non-transitory memory, an input device, and a display device. Some operations in the method 1400 are, optionally, combined and/or the order of some operations is, optionally, changed.

According to various embodiments contemplated by the method 1400, an electronic device performs content manipulation operations in response to detecting multi-finger pinch gestures, independent of detecting other inputs that invoke an editing interface. In some embodiments, in response to detecting a multi-finger pinch gesture, the electronic device displays an interface that indicates the nature of the multi-finger pinch gesture and ceases to display the interface after a threshold amount of time. Accordingly, the electronic device saves processor and battery resources by not having to detect inputs that invoke and/or remove the editing interface. Additionally, the electronic device provides a larger useable display than the electronic device because the electronic device removes the interface after the threshold amount of time.

Figure 14A:
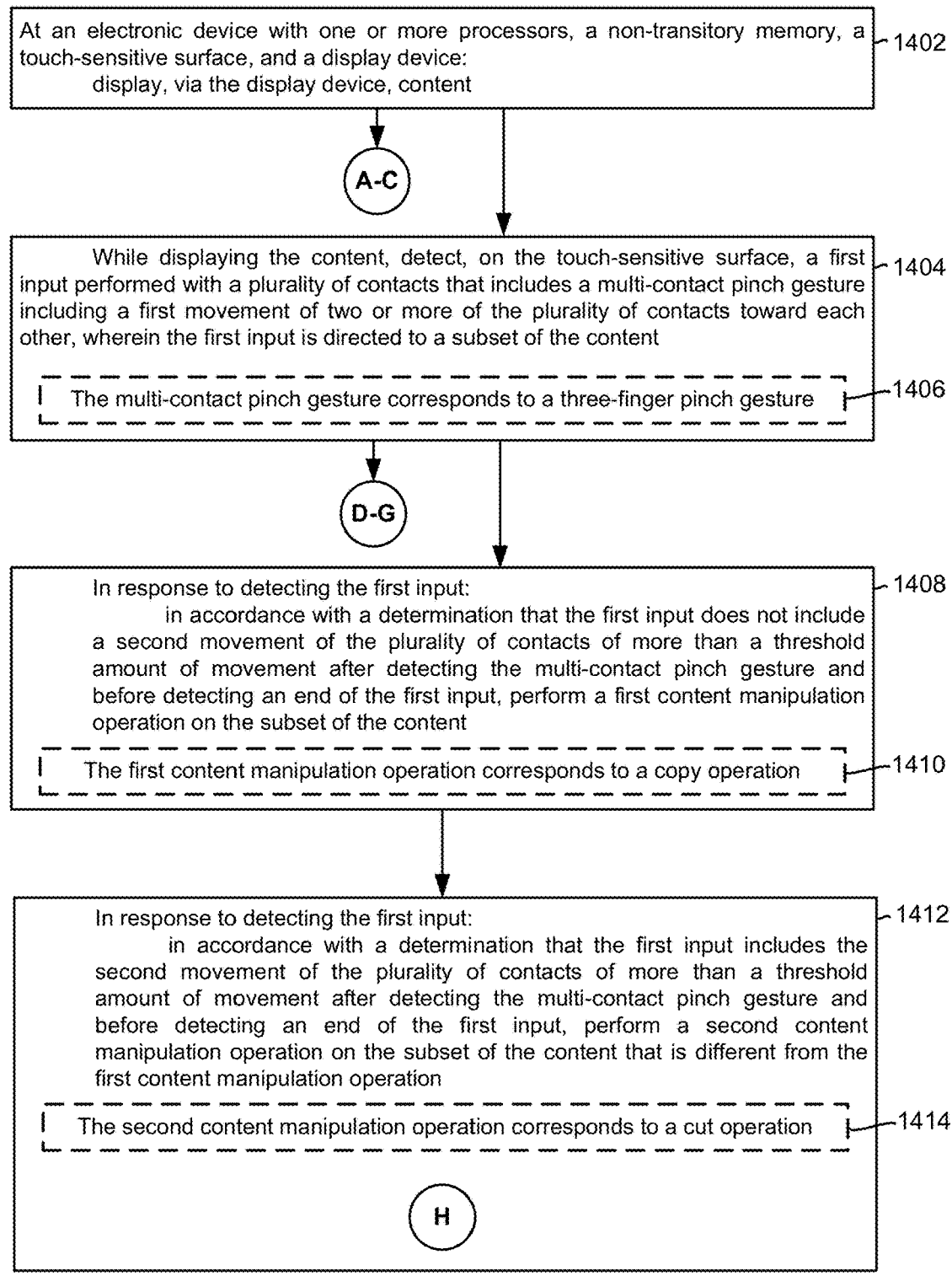

With reference to FIG. 14A, the electronic device displays (1402), via the display device, content. The content may include text content, drawing marks, predetermined shapes, bullet points, etc. As one example, the electronic device 100 displays the text string 1206 in FIG. 12A.

While displaying the content, the electronic device detects (1404), on the touch-sensitive surface, a first input performed with a plurality of contacts that includes a multi-contact pinch gesture including a first movement of two or more of the plurality of contacts toward each other, wherein the first input is directed to a subset of the content. By detecting a single input, rather than multiple inputs, the electronic device experiences less processor utilization and wear-and-tear. For example, the first movement includes a single contact moving towards one or more other contacts while the one or more other contacts remain substantially stationary. As another example, the first movement includes two or more of the contacts moving from respective origin points towards each other. As one example, with reference to FIGS. 12H-12J, the electronic device 100 detects the first multi-contact pinch gesture 1222 including the first movement of two or more of the plurality of contacts (e.g., the first contact 1222*a*, the second contact 1222*b*, and the third contact 1222*c*) toward each other. In some embodiments, the multi-contact pinch gesture corresponds (1406) to a three-finger pinch gesture, such as is illustrated in FIGS. 12H-12J.

In response to detecting the first input: in accordance with a determination that the first input does not include a second movement of the plurality of contacts of more than a threshold amount of movement after detecting the multi-contact pinch gesture and before detecting an end of the first input, the electronic device performs (1408) a first content manipulation operation on the subset of the content. By being configured to perform multiple operations based on the nature of a particular input (e.g., the multi-contact pinch gesture), the electronic device avoids detecting multiple inputs, thereby saving processing resources and experiencing less wear-and-tear. For example, the plurality of contacts corresponds to a predetermined number of the contacts, such as one contact, two contacts, all contacts. As another example, the first input ends when the electronic device detects a release of a portion of the plurality of contacts. As yet another example, the electronic device selects the subset of content before detecting the multi-contact pinch gesture. In some embodiments, the first content manipulation operation corresponds (1410) to a copy operation. As one example, in response to detecting the first multi-contact pinch gesture 1222 in FIGS. 12H-12J, the electronic device 100 performs a copy operation and indicates the same by displaying the first color overlay 1225 within the copy operation indicator 1224*b* in FIG. 12J.

In response to detecting the first input: in accordance with a determination that the first input includes the second movement of the plurality of contacts of more than a threshold amount of movement after detecting the multi-contact pinch gesture and before detecting an end of the first input, the electronic device performs (1412) a second content manipulation operation on the subset of the content that is different from the first content manipulation operation. By being configured to perform multiple operations based on the nature of a particular input (e.g., the multi-contact pinch gesture), the electronic device avoids detecting multiple inputs, thereby saving processing resources and experiencing less wear-and-tear. For example, the second movement is a drag gesture that includes the threshold amount of movement, such as a drag gesture that crosses particular threshold line that is a predetermined distance away from an origin point of the drag gesture. In some embodiments, the second content manipulation operation corresponds (1414) to a cut operation. As one example, after detecting the second multi-contact pinch gesture 1234 performed by the plurality of contacts 1234*a*-1234*c* in FIGS. 12P-12R, the electronic device 100 detects a second movement of the plurality of contacts 1234*a*-1234*c*, as illustrated in FIGS.

12S-12U. In response to detecting the second movement cross the first threshold line 1238 in FIG. 12U, the electronic device 100 performs a cut operation. Moreover, as the second movement proceeds, the electronic device 100 moves the first color overlay 1225 from within the copy operation indicator 1224b to within the cut operation indicator 1224a in order to indicate the cut operation.

With reference to FIG. 14B, in some embodiments, while displaying the content, the electronic device detects (1416) a second input performed with two contacts that includes a two-finger pinch gesture including a third movement of the two contacts toward each other, wherein the second input is directed to a portion of the content; and in response to detecting the second input, the electronic device performs (1416) a zooming operation with respect to the portion of the content. A zooming operation provides visual feedback in order to increase the accuracy of subsequent content manipulation operations. Accordingly, the electronic device detects fewer corrective inputs and thus reduces processor utilization and wear-and-tear. For example, the zooming operation includes increasing a magnification level of both selected and unselected content in response to the second input. As one example, after moving the first cursor 1208 as is illustrated in FIG. 12C, the electronic device 100 performs a zoom operation on a portion of content that is proximate to the first cursor 1208 (e.g., "because the birds") in response to detecting a second input with two contacts that includes a two-finger pinch gesture including a third movement of the two contacts toward each other, wherein the second input is directed to the portion of the content.

In some embodiments, while displaying the content, the electronic device detects (1418), on the touch-sensitive surface, a second input performed with more than three contacts that includes a multi-finger pinch gesture including a third movement of the more than three contacts toward each other; and in response to detecting the second input, the electronic device performs (1418) a system-level operation. For example, the system-level operations corresponds to displaying a home screen that includes a plurality of application icons, which, when selected, cause corresponding applications to be opened by the electronic device. As another example, the system-level operation corresponds to displaying a multitasking user interface that includes representations of a plurality of recently opened applications such as screenshots or live views of the recently opened applications that include content of the recently opened applications and which, if selected, cause display of a user interface corresponding to the representation of the application that was selected. As one example, rather than displaying the interface in FIGS. 12H-12J in response to detecting the three-contact pinch gesture 1222, the electronic device 100 displays the home screen in response to detecting a four-contact pinch gesture.

With reference to FIG. 14C, in some embodiments, while displaying the content and before detect the first input, the electronic device detects (1420), on the touch-sensitive surface, a selection gesture; and in response to detecting the selection gesture, the electronic device performs (1420) a first selection operation on the subset of the content. By enabling selection of the subset of the content before performing a content manipulation operation on the subset of the content, the electronic device provides a more accurate content manipulation operation, leading to fewer erroneous inputs and thereby reducing processor utilization and wear-and-tear of the electronic device. For example, the selection gesture corresponds to one of a double tap on a word or sentence, a tap gesture followed by a drag, a drag of a selection resizing object, and/or the like. As another example, selecting the subset of the content is based on a corresponding magnitude of the selection gesture, such as a longer drag resulting in selection of a larger portion of the content. As yet another example, selecting the subset of the content is based on a corresponding direction of the selection gesture, such as dragging in a first direction selects the subset of the content, but dragging in a second direction (e.g., substantially opposite to the first direction) does not (or selects a different subset of the content). As one example, as illustrated in FIGS. 12E-12G, in response to detecting the first three-finger drag gesture 1218 that moves along a portion of the text string 1206 corresponding to "the birds are chirping," the electronic device 100 performs a first selection operation on the "the birds are chirping" text.

In some embodiments, the electronic device detects (1422) first and second contacts of the plurality of contacts dragging on the touch-sensitive surface; and in response to detecting the first and second contacts dragging on the touch-sensitive surface, the electronic device places (1422) a focus-selector (e.g., a cursor) at a first location, wherein the first location is based on a termination point of the dragging relative to the subset of the content. By displaying a focus-selector, the electronic device provides visual feedback as to the starting position of a subsequent selection operation, reducing the detection of erroneous or corrective inputs and thereby reducing processor utilization and wear-and-tear of the electronic device. As one example, in response to detecting the first two-finger drag gesture 1214 in FIG. 12B, the electronic device 100 moves the first cursor 1208 from a previous position in FIG. 12B, to a termination point of the first two-finger drag gesture 1214, as illustrated in FIG. 12C.

In some embodiments, the electronic device detects (1424), on the touch-sensitive surface, a third contact of the plurality of contacts in addition to the first and second contacts; the electronic device detects (1424), on the touch-sensitive surface, the first, second, and third contacts moving on the touch-sensitive surface; and in response to detecting the first, second, and third contacts moving on the touch-sensitive surface, the electronic device moves (1424) the focus-selector from the first location to a second location and performs (1424) the first selection operation. By enabling selection of the subset of the content before performing a content manipulation operation on the subset of the content, the electronic device provides a more accurate content manipulation operation, leading to fewer erroneous inputs and thereby reducing processor utilization and wear-and-tear of the electronic device. For example, in response to detecting the third contact in addition to first and second contacts, the electronic device begins the first selection operation. In some embodiments, the electronic device detects the first, second, and third contacts moving from a first collective placement to a second collective placement, and the first selection operation starts at the first collective placement and ends at the second collective placement. As one example, with reference to FIG. 12C, the electronic device 100 detects the third contact 1214c in addition to the first and second contacts 1214a and 1214b and subsequently detects the three-finger drag gesture 1218. While detecting the three-finger drag gesture 1218, the electronic device 100 correspondingly moves the first cursor 1208 and selects the subset of the content, as illustrated in FIGS. 12F and 12G.

In some embodiments, the electronic device detects (1426) a release (e.g., lift off the touch-sensitive surface) of one of the contacts from the touch-sensitive surface; after detecting the release of one of the contacts, the electronic device detects (1426), on the touch-sensitive surface, the third contact in addition to the first and second contacts; the electronic device detects (1426) the first, second, and third contacts moving on the touch-sensitive surface; and in response to detecting the first, second, and third contacts moving on the touch-sensitive surface, the electronic device moves (1426) the focus-selector from the second location to a third location and performs (1426) a second selection operation that is different from the first selection operation. For example, the electronic device detects the third contact in addition to the first and second contacts within a threshold amount of time after detecting the release of the third contact. As another example, the second selection operation applies to a respective subset of content that is different from the subset of content selected by the first selection operation. In some embodiments, the electronic device detects the first, second, and third contacts moving from the second collective placement to a third collective placement, begins the second selection operation at the second collective placement, and ends the second selection operation at the third collective placement. As one example, as illustrated in FIGS. 12AK-12AM, the electronic device 100 detects release of the third contact 1256c and subsequently detects the third contact 1256d in addition to the first contact 1256a and the second contact 1256b in FIG. 12AN. In response to detecting the third three-finger drag gesture 1258 in FIG. 12AO, the electronic device 100 moves the first cursor 1208 from the second location to a third location and performs a second selection operation that is different from the first selection operation.

In some embodiments, in response to detecting the first input, the electronic device changes (1428) an appearance of the subset of the content. By changing the appearance of the subset of the content, the electronic device provides visual feedback as to the target of a respective content manipulation operation, providing a more accurate user interface with fewer erroneous and corrective inputs. Accordingly, the electronic device experiences less processor usage and wear-and-tear. For example, changing the appearance of the subset of the content includes one or more of changing the size of (e.g., increasing) the subset of the content, highlighting the subset of the content, boldening/underling/italicizing the subset of the content, placing a box around the subset of the content, etc. As another example, changing the appearance of the subset of the content includes distinguishing the subset of the content, such as by obscuring (e.g., blurring out) a portion of the remainder of the content. As one example, with reference to FIG. 12J, the electronic device 100 displays a second color overlay 1221 around the subset of the content and bolds the subset of the content in order to indicate that the subset of the content has been copied.

With reference to FIG. 14D, in some embodiments, in response to detecting the first input, the electronic device displays (1430), via the display device, an interface including a plurality of content manipulation operation indicators including a first content manipulation operation indicator that is indicative of the first content manipulation operation and a second content manipulation operation indicator that is indicative of the second content manipulation operation. Accordingly, the electronic device provides visual feedback as to the nature of the currently selected content manipulation operation, providing a more accurate user interface with fewer erroneous and corrective inputs. Accordingly, the electronic device experiences less processor usage and wear-and-tear. For example, the first content manipulation operation indicator indicates a copy operation, such as a textual indicator (e.g., "copy") or a copy icon. Another example, the second content manipulation operation indicator indicates a cut operation, such as a textual indicator (e.g., "cut") or a cut icon (e.g., an image of scissors). Another yet example, the interface includes a third content manipulation operation indicator that indicates a delete operation, such as a textual indicator (e.g., "delete") or a delete icon (e.g., an image of a trash can). For example, in response to detecting the first multi-contact pinch gesture 1222 in FIGS. 12H-12J, the electronic device 100 displays the interface 1224. The interface 1224 includes a cut operation indicator 1224a indicative of a cut operation, a copy operation indicator 1224b indicative of a copy operation, and a delete operation indicator 1224c indicative of a delete operation. In some embodiments, in response to detecting the first input: the electronic device distinguishes (1432) an appearance of the first content manipulation operation indicator from the remainder of the interface; and in accordance with the determination that the first input includes the second movement of the plurality of contacts, the electronic device distinguishes (1432) an appearance of the second content manipulation operation indicator from the remainder of the interface. As another example, after detecting a multi-finger pinch gesture, the electronic device highlights the copy operation indicator. As yet another example, distinguishing the appearance of the second content manipulation operation indicator includes deemphasizing the previously distinguished first content manipulation operation indicator. As one example, as illustrated in FIGS. 12S-12U, while detecting that the second multi-contact pinch gesture 1234 includes the second movement, the electronic device 100 moves the first color overlay 1225 from within the copy operation indicator 1224b to within the cut operation indicator 1224a.

In some embodiments, in response to detecting the first input: in accordance with a determination that the first input includes a third movement of the two or more of the plurality of contacts away from each other after the first movement of two or more of the plurality of contacts toward each other, the electronic device foregoes (1434) performing the first and second content manipulation operation. By foregoing the content manipulation operation based on the same plurality of contacts that caused the electronic device to perform the content manipulation operation, the electronic device need not detect a different, distinct plurality of touch contacts in order to forego performing the content manipulation operation. Accordingly, the electronic device expends fewer battery and processing resources and experiences less wear-and-tear. For example, as illustrated in FIGS. 12AT-12AV, the third movement corresponds to a de-pinch (e.g., pull-apart) gesture. In some embodiments, in accordance with the determination that the first input includes the third movement, the electronic device ceases to display the interface (e.g., the interface 1224 in FIG. 12AT). As another example, in accordance with the determination that the first input includes the third movement, the electronic device reverses a visual indication of a respective gesture.

In some embodiments, in response to the first movement of two or more of the plurality of contacts toward each other, the electronic device changes (1436) an appearance of the content; after changing the appearance of the content, the electronic device detects (1436) a third movement of the plurality of contacts away from each other; and in response to detecting the third movement of the plurality of contacts away from each other, reverses (1436) at least a portion of the change in appearance of the content. Accordingly, the electronic device provides visual feedback as whether the subset of the content is the target of a content manipulation operation, reducing the number of subsequent erroneous or corrective inputs. Accordingly, the electronic device expends fewer battery and processing resources and experiences less wear-and-tear. For example, changing the appearance of the content includes changing an appearance of selected content relative to unselected content. In some embodiments, the change in appearance of the content gradually progresses as the contacts move closer toward each other (e.g. gradually enlarging and increasing a simulated separation of the selected content in a z-direction as the pinch gesture progresses). As one example, as illustrated in FIGS. 12AT and 12AU, the electronic device 100 ceases to display the second color overlay 1221 and removes bolding of the content that was previously copied.

With reference to FIG. 14E, in some embodiments, the second content manipulation operation is selected based on a distance of the second movement and performing the second content manipulation operation includes: in accordance with a determination that the second movement is greater than a first movement threshold and less than a second movement threshold, the electronic device performs (1438) a first alternative operation; and in accordance with a determination that the second movement is greater than the second movement threshold, the electronic device performs (1438) a second alternative operation that is different from the first alternative operation. By configuring the electronic device to perform multiple operations based on the nature of the second movement, the electronic need not detect multiple inputs in order to cause the electronic device to perform multiple operations. Accordingly, the electronic device experiences less battery usage and wear-and-tear. For example, the first alternative operation corresponds to a cut operation. As another example, the second alternative operation corresponds to a delete operation. As one example, while a cut operation is currently selected, in response to detecting a multi-finger rightwards drag gesture that crosses a first threshold line but not a second threshold line, the electronic device deselects the cut operation and selects a copy operation, whereas, in response to detecting a multi-finger rightwards drag gesture that crosses the first and second threshold lines, the electronic device deselects the cut operation and selects a delete operation. As one example, with reference to FIG. 12AE, the electronic device 100 performs a delete operation in response to detecting that the third multi-contact pinch gesture 1248 includes a second movement that crosses the second threshold line 1252. On the other hand, were the electronic device 100 to determine that the second movement does not cross the second threshold line 1252 (e.g., detects liftoff of the third multi-contact pinch gesture 1248 in FIG. 12AD), the electronic device 100 would instead perform a copy operation.

In some embodiments, the second content manipulation operation is selected based on a direction of the second movement and performing the second content manipulation operation includes: in accordance with a determination that the second movement is in a first direction, the electronic device performs (1440) a first alternative operation; and in accordance with a determination that the second movement is in a second direction that is different from (e.g., substantially opposite to) the first direction, the electronic device performs (1440) a second alternative operation that is different from the first alternative operation. By configuring the electronic device to perform multiple operations based on the nature of the second movement, the electronic need not detect multiple inputs in order to cause the electronic device to perform multiple operations. Accordingly, the electronic device experiences less battery usage and wear-and-tear. For example, the first alternative operation corresponds to a cut operation. As another example, the second alternative operation corresponds to a delete operation. For example, the first alternative operation corresponds to a cut operation. As another example, the second alternative operation corresponds to a delete operation. As one example, whereas the leftwards second movement in FIGS. 12S-12U results in changing from a copy operation to a cut operation, the rightwards second movement in FIGS. 12AC-12E results in changing from the copy operation to a delete operation.

Figure 15A:
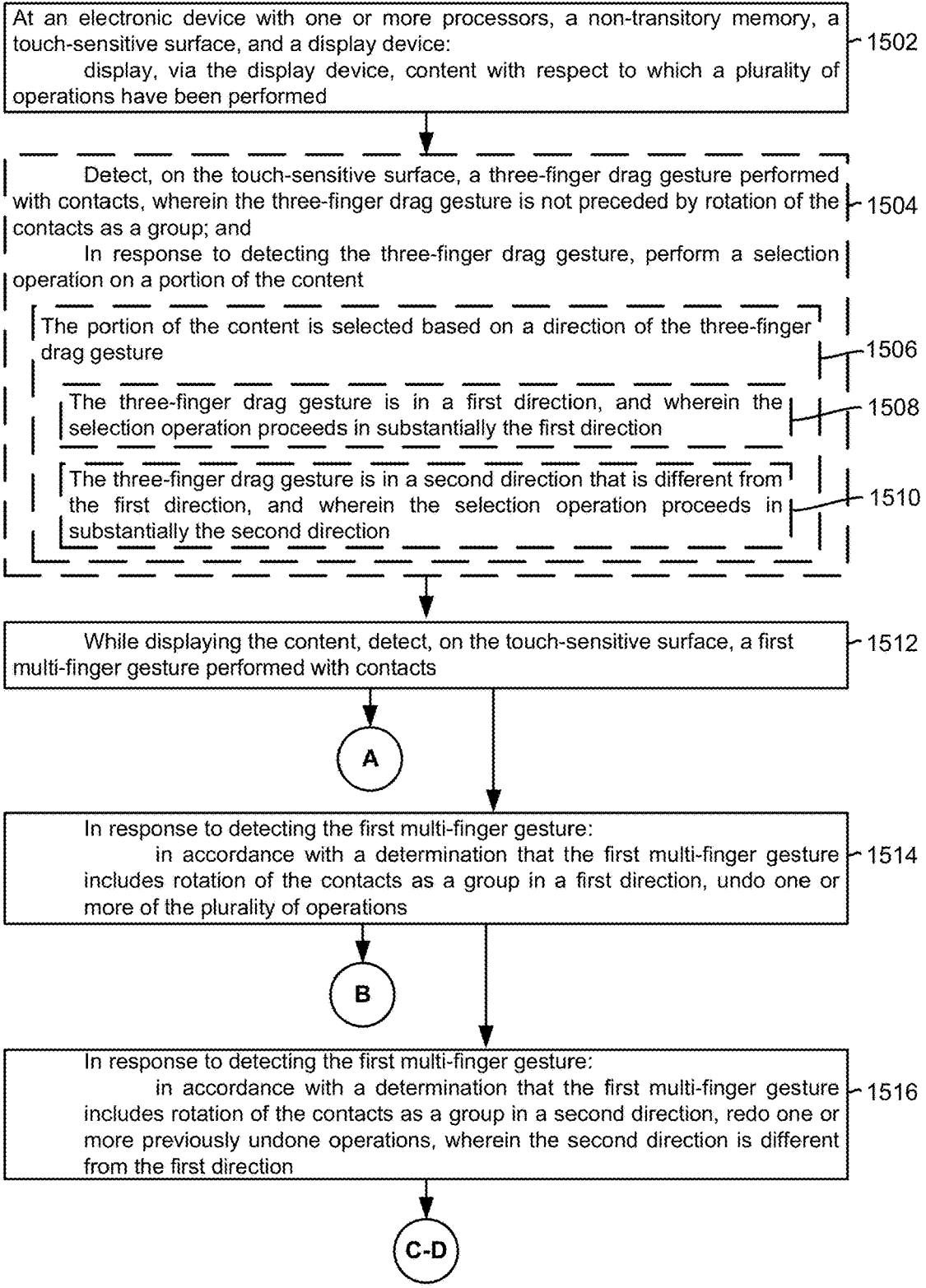

FIGS. 15A-15C is a flow diagram of a method 1500 for performing undo or redo operations based on rotational multi-finger gestures in accordance with some embodiments. In some embodiments, the method 1500 is performed at an electronic device (e.g., the electronic device 300 in FIG. 3, the portable multifunction device 100 in FIG. 1A, or the electronic device 100 in FIGS. 13A-13AB) with one or more processors, a non-transitory memory, an input device, and a display device. Some operations in the method 1500 are, optionally, combined and/or the order of some operations is, optionally, changed.

According to various embodiments contemplated by the method 1500, an electronic device performs one or more undo operations and/or one or more redo operations based on a multi-finger rotational gesture input. In some embodiments, the electronic devices performs undo/redo operations based on the magnitude and/or direction of the rotation. In some embodiments, the electronic devices performs an additional undo operation or an additional redo operation based on a multi-finger drag gesture that is detected before liftoff of the multi-finger rotational gesture input. Accordingly, the electronic device saves processor and battery resources by not having to detect multiple inputs in order to perform corresponding multiple undo/redo operations.

With reference to FIG. 15A, the electronic device displays (1502), via the display device, content with respect to which a plurality of operations have been performed. As one example, with reference to FIGS. 13A-13H, the electronic device 100 displays various content items (e.g., drawing marks, text) in response to detecting corresponding content manipulation operations.

In some embodiments, the electronic device detects (1504), on the touch-sensitive surface, a three-finger drag gesture performed with contacts, wherein the three-finger drag gesture is not preceded by rotation of the contacts as a group; and in response to detecting the three-finger drag gesture, the electronic device performs (1504) a selection operation on a portion of the content. By configuring the electronic device to perform different operations in response to detecting a three-finger drag gesture based on whether or not the three-finger drag gesture is preceded by a rotation of the contacts, the electronic device avoids accidental detection of a three-finger drag gesture to perform the different operations. Accordingly, the electronic device utilizes less processing and battery resources and experiences less wear-and-tear. For example, a magnitude of the three-finger drag gesture determines amount of content that is selected. As one example, with reference to FIGS. 12E-12G, the electronic device 100 detects the first three-finger drag gesture 1218, and, in response, selection the subset of the text string 1206 based on the magnitude of the first three-finger drag gesture 1218. In some embodiments, the portion of the content is (1506) selected based on a direction of the three-finger drag gesture. For example, in some embodiments, the three-finger drag gesture is (1508) in a first direction, and the selection operation proceeds in substantially the first direction, such as is illustrated in the rightwards first three-finger drag gesture 1218 and corresponding selection operations illustrated in FIGS. 12E-12G. As another example, the three-finger drag gesture is (1510) in a second direction that is different from (e.g., substantially opposite to) the first direction, and the selection operation proceeds in substantially the second direction.

While displaying the content, the electronic device detects (1512), on the touch-sensitive surface, a first multi-finger gesture performed with contacts. By being capable of distinguishing between a single finger gesture and multi-finger gestures, the electronic device may perform different operations based on the gesture type, resulting in an enhanced user interface. For example, the first multi-finger gesture may be directed to any portion of the display, including a canvas, palette, keyboard affordance, etc.

In response to detecting the first multi-finger gesture: in accordance with a determination that the first multi-finger gesture includes rotation of the contacts as a group in a first direction (e.g., counter-clockwise), the electronic device undoes (1514) one or more of the plurality of operations. For example, the rotation is relative to a shared axis of rotation, a shared pivot point, or a shared center of rotation. As another example, a magnitude of the rotation of the contacts determines a magnitude of the undo operations, such as the number of undo operations to perform or how much of a particular content item to undo. In some embodiments, the plurality of operations corresponds to a first temporal sequence of operations and the one or more of the plurality of operations are included in the first sequence of operations. As one example, in response to determining that the first multi-finger gesture 1318 in FIG. 13I include rotation of the plurality of contacts 1318a-1318c in a substantially counter-clockwise direction, the electronic device 100 undoes the text string 1316, as illustrated in FIG. 13J.

In response to detecting the first multi-finger gesture: in accordance with a determination that the first multi-finger gesture includes rotation of the contacts as a group in a second direction (e.g., clockwise), the electronic device redoes (1516) one or more previously undone operations, wherein the second direction is different from the first direction. For example, the rotation is relative to a shared axis of rotation, a shared pivot point, or a shared center of rotation. As another example, a magnitude of the rotation of the contacts determines a magnitude of the redo operations, such as the number of redo operations to perform or how much of a particular content item to redo. In some embodiments, the previously undone operations are included in a second temporal sequence of operations. As one example, in response to determining that the third multi-finger gesture 1324 in FIG. 13O include rotation of the plurality of contacts 1324a-1324c in a substantially clockwise direction, the electronic device 100 redoes the first mark 1309, as illustrated in FIG. 13P.

With reference to FIG. 15B, in some embodiments, after detecting the first multi-finger gesture, the electronic device detects (1518), on the touch-sensitive surface, a multi-finger drag gesture performed with the contacts, wherein the multi-finger drag gesture corresponds to a continuation of the first multi-finger gesture; and in response to detecting the multi-finger drag gesture: in accordance with a determination that the multi-finger drag gesture more than a predetermined amount of movement in a first direction, the electronic device undoes (1518) an additional one of the plurality of operations. By performing an additional undo operation based on the same contacts that performed the prior undo operation, the electronic device need not detect a subsequent release and placement of the contacts in order to perform the additional undo operation. Accordingly, the electronic device experiences less battery usage and wear-and-tear. For example, the electronic device detects the multi-finger drag gesture before detecting lift off of the first multi-finger gesture. In some embodiments, a magnitude of the multi-finger drag gesture determines number of operations to undo. For example, the electronic device undoes a prior operation in the first temporal, and the additional one of the plurality of operations is included in the first temporal sequence before the one or more of the plurality of operations. As one example, as illustrated in FIG. 13M, the electronic device 100 detects the first multi-finger drag gesture 1322, which corresponds to a continuation of the second multi-finger gesture 1320 that resulted in an undo operation of the second mark 1312. In response to detecting the first multi-finger drag gesture 1322 in FIG. 13M, the electronic device 100 performs an additional undo operation on the first mark 1309, as illustrated in FIG. 13N.

In some embodiments, in response to detecting the multi-finger drag gesture: in accordance with a determination that the multi-finger drag gesture includes more than the predetermined amount of movement in a second direction that is different from the first direction, the electronic device redoes (1520) an additional one of the one or more previously undone operations. By performing an additional redo operation based on the same contacts that performed the prior redo operation, the electronic device need not detect a subsequent release and placement of the contacts in order to perform the additional redo operation. Accordingly, the electronic device experiences less battery usage and wear-and-tear. In some embodiments, a magnitude of the multi-finger drag gesture determines number of operations to redo. In some embodiments, the electronic device redoes a next operation in the second temporal sequence of operations. For example, the additional one of the one or more previously undone operations is included in the second temporal sequence after the one or more previously undone operations. As one example, as illustrated in FIG. 13S, the electronic device 100 detects the second multi-finger drag gesture 1330, which corresponds to a continuation of the fourth multi-finger gesture 1328 that resulted in a redo operation of the second mark 1312. In response to detecting the second multi-finger drag gesture 1330 in FIG. 13S, the electronic device 100 performs an additional redo operation on the text string 1316, as illustrated in FIG. 13T.

In some embodiments, after undoing the one or more of the plurality of operations, the electronic device detects (1522), on the touch-sensitive surface, a second multi-finger gesture in the first direction, wherein the second multi-finger gesture corresponds to a continuation of the first multi-finger gesture in the first direction; and in response to detecting the second multi-finger gesture in the first direction, the electronic device undoes (1522) an additional one of the plurality of operations. By performing an additional undo operation based on the same contacts that performed the prior undo operation, the electronic device need not detect a subsequent release and placement of the contacts in order to perform the additional undo operation. In some embodiments, a magnitude of the second multi-finger gesture determines number of operations to undo. For example, the electronic device undoes a prior operation in the first temporal, and the additional one of the plurality of operations is included in the first temporal sequence before the one or more of the plurality of operations. As one example, as illustrated in FIG. 13K, the electronic device 100 detects the second multi-finger gesture 1320 that rotates in the first direction. The second multi-finger gesture 1320 corresponds to a continuation of the first multi-finger gesture 1318 that also rotates in the first direction and results in undoing the text string 1316. In response to detecting the second multi-finger gesture 1320 in FIG. 13K, the electronic device 100 performs an additional undo operation on the second mark 1312. In some embodiments, the electronic device selects (1524) the additional one of the plurality of operations based on a reverse sequential order. As one example, with reference to FIGS. 13I-13L, the ordering of the undo operations corresponds to the reverse sequential order in which the targeted content items were created in FIGS. 13D-13H. In some embodiments, the electronic device selects the additional one of the plurality of operations according to a last in, first out (LIFO) operation.

In some embodiments, after redoing the one or more previously undone operations, the electronic device detects (1526), on the touch-sensitive surface, a second multi-finger gesture in the second direction, wherein the second multi-finger gesture corresponds to a continuation of the first multi-finger gesture in the second direction; and in response to detecting the second multi-finger gesture in the second direction, the electronic device redoes (1526) an additional one of the one or more previously undone operations. By performing an additional redo operation based on the same contacts that performed the prior redo operation, the electronic device need not detect a subsequent release and placement of the contacts in order to perform the additional redo operation. Accordingly, the electronic device experiences less battery usage and wear-and-tear. In some embodiments, the additional one of the one or more previously undone operations is included in the second temporal sequence after the one or more previously undone operations. As one example, as illustrated in FIG. 13Q, the electronic device 100 detects the fourth multi-finger gesture 1328 that rotates in the second direction. The fourth multi-finger gesture 1328 corresponds to a continuation of the third multi-finger gesture 1324 that also rotates in the second direction and results in redoing the first mark 1309. In response to detecting the fourth multi-finger gesture 1328 in FIG. 13Q, the electronic device 100 performs an additional undo operation on the second mark 1312, as illustrated in FIG. 13R. In some embodiments, the electronic device selects (1528) the additional one of the one or more previously undone operations based on a reverse sequential order. As one example, with reference to FIGS. 13O-13R, the ordering of the redo operations corresponds to the reverse sequential order in which the targeted content items were undone FIGS. 13K-13N. In some embodiments, the electronic device selects the additional one of the one or more previously undone operation according to a last in, first out (LIFO) operation.

With reference to FIG. 15C, in some embodiments, after detecting the first multi-finger gesture, the electronic device detects (1530), on the touch-sensitive surface, a second multi-finger gesture performed with the contacts, wherein the second multi-finger gesture corresponds to a continuation of the first multi-finger gesture; and in response to detecting the second multi-finger gesture: in accordance with a determination that the first multi-finger gesture includes rotation of the contacts as the group in the first direction and that the second multi-finger gesture includes rotation of the contacts as the group in the second direction, the electronic device redoes (1530) the one or more of the plurality of previously undone operations; and in accordance with a determination that the first multi-finger gesture includes rotation of the contacts as the group in the second direction and that the second multi-finger gesture includes rotation of the contacts as the group in the first direction, the electronic device undoes (1530) the one or more previously redone operations. By reversing the previous operation based on a rotation of the same contacts, the electronic device need not detect an additional set of contacts input in order to reverse the previous operation.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at an electronic device with one or more processors, a non-transitory memory, a touch-sensitive surface, and a display device:
  displaying, via the display device, an application user interface that includes first content with respect to which a first plurality of editing operations has been performed;
  while displaying the first content, detecting, on the touch-sensitive surface, a first multi-finger gesture directed to a region within the application user interface, wherein detecting the first multi-finger gesture includes concurrently detecting a first movement of a first contact in a respective direction and detecting a second movement of a second contact in the respective direction; and
  in response to detecting the first multi-finger gesture directed to the region within the application user interface and in accordance with a determination that the first multi-finger gesture includes more than a first predetermined amount of movement in a first direction, undoing one of the first plurality of editing operations in the application user interface;
  in response to detecting the first multi-finger gesture directed to the region within the application user interface and in accordance with a determination that the first multi-finger gesture includes more than the first predetermined amount of movement in a second direction that is different from the first direction, redoing one of the first plurality of editing operations in the application user interface; and
  in response to detecting the first multi-finger gesture directed to the region within the application user interface and in accordance with a determination that the first multi-finger gesture includes less than the first predetermined amount of movement, maintaining display of the application user interface that includes the first content without undoing or redoing any of the first plurality of editing operations.

2. The method of claim 1, wherein the first multi-finger gesture is detected within a first application interface of a first application, and the method further comprising:
  detecting, on the touch-sensitive surface of the electronic device, a second multi-finger gesture within a second application interface of a second application that is different from the first application, wherein the second application interface includes second content with respect to which a second plurality of editing operations has been performed; and
  in response to detecting the second multi-finger gesture:

in accordance with a determination that the second multi-finger gesture includes more than the first predetermined amount of movement in the first direction, undoing one of the second plurality of editing operations; and in accordance with a determination that the second multi-finger gesture includes more than the first predetermined amount of movement in the second direction, redoing one of the second plurality of editing operations.

3. The method of claim 1, further comprising:
after undoing one of the first plurality of editing operations in response to detecting the first multi-finger gesture, detecting, on the touch-sensitive surface of the electronic device, a second multi-finger gesture; and
in response to determining that the second multi-finger gesture includes more than the first predetermined amount of movement in the first direction, undoing another one of the first plurality of editing operations.

4. The method of claim 1, further comprising:
in response to detecting the first multi-finger gesture and in accordance with a determination that the first multi-finger gesture includes more than a second predetermined amount of movement in the first direction, undoing another one of the first plurality of editing operations, wherein the second predetermined amount of movement in the first direction is larger than the first predetermined amount of movement in the first direction.

5. The method of claim 1, further comprising:
in response to detecting the first multi-finger gesture and in accordance with a determination that the first multi-finger gesture includes more than a second predetermined amount of movement in the second direction, redoing another one of the first plurality of editing operations, wherein the second predetermined amount of movement in the first direction is larger than the first predetermined amount of movement in the first direction.

6. The method of claim 1, further comprising:
in response to detecting the first multi-finger gesture and in accordance with a determination that the first multi-finger gesture includes more than the first predetermined amount of movement in a third direction that is different from the first direction and the second direction, copying the first content.

7. The method of claim 6, further comprising:
in response to detecting the first multi-finger gesture and in accordance with a determination that the first multi-finger gesture includes more than the first predetermined amount of movement in a fourth direction that is different from the first direction, the second direction, and the third direction, pasting previously the first content.

8. The method of claim 1, further comprising:
while displaying the first content, detecting, on the touch-sensitive surface, a multi-finger tap input; and
in response to detecting the multi-finger tap input, displaying, via the display device, an interface including a plurality of content manipulation operation affordances indicative of a corresponding plurality of content manipulation operations.

9. The method of claim 8, further comprising:
in accordance with a determination that the first multi-finger gesture is in the first direction, changing the appearance of a first one of the plurality of content manipulation operation affordances that corresponds to an undo operation;

in accordance with a determination that the first multi-finger gesture is in the second direction, changing the appearance of a second one of the plurality of content manipulation operation affordances that corresponds to a redo operation; and in accordance with a determination that the first multi-finger gesture is in a third direction, changing the appearance of a third one of the plurality of content manipulation operation affordances that corresponds to a particular one of the plurality of content manipulation operations different from the undo operation and the redo operation, wherein the third direction is different from the first direction and the second direction.

10. The method of claim 8, further comprising:
detecting, on the touch-sensitive surface of the electronic device, a first input directed to a respective one of the plurality of content manipulation operation affordances; and
in response to detecting the first input, performing a content manipulation operation corresponding to the respective one of the plurality of content manipulation operation affordances.

11. The method of claim 8, further comprising:
detecting, on the touch-sensitive surface of the electronic device, a drag input directed to an undo affordance of the plurality of content manipulation operation affordances; and
in response to detecting the drag input, partially undoing a particular one of the first plurality of editing operations without undoing any other of the first plurality of editing operations.

12. The method of claim 1, further comprising:
in response to detecting the first multi-finger gesture:
in accordance with the determination that the first multi-finger gesture includes more than the first predetermined amount of movement in the first direction, displaying, via the display device, an undo indicator indicative of an undo operation; and
in accordance with the determination that the first multi-finger gesture includes more than the first predetermined amount of movement in the second direction, displaying, via the display device, a redo indicator indicative of a redo operation.

13. The method of claim 1, further comprising:
while displaying the first content, detecting, on the touch-sensitive surface, a single-finger single-tap input; and
in response to detecting the single-finger single-tap input, performing a particular operation different from an undo operation or a redo operation.

14. The method of claim 1, further comprising:
while displaying the first content, detecting, on the touch-sensitive surface, a single-finger double-tap input; and
in response to detecting the single-finger double-tap input, performing a particular operation different from an undo operation or a redo operation.

15. The method of claim 1, further comprising:
while displaying the first content, detecting, on the touch-sensitive surface, a single-finger swipe input; and
in response to detecting the single-finger swipe input, performing a particular operation different from an undo operation or a redo operation.

16. The method of claim 1, further comprising:
while displaying the first content, detecting, on the touch-sensitive surface, a second multi-finger gesture, wherein the second multi-finger gesture is associated with more than a threshold number of fingers associated with the first multi-finger gesture; and in response to detecting the second multi-finger gesture, performing a particular operation different from an undo operation or a redo operation.

17. The method of claim 1, further comprising:
while displaying the application user interface that includes the first content, displaying, via the display device, a toolbar region that is separate from the application user interface, wherein the first multi-finger gesture is directed to outside of the toolbar region.

18. The method of claim 1, further comprising:
while detecting the first multi-finger gesture directed to the region within the application user interface in the first direction, displaying, via the display device, an undo indicator indicative of an undo operation with a color overlay that includes a visual characteristic associated with a current magnitude of movement of the first multi-finger gesture relative to the first predetermined amount of movement; and while detecting the first multi-finger gesture directed to the region within the application user interface in the second direction, displaying, via the display device, a redo indicator indicative of a redo operation with a color overlay that includes a visual characteristic associated with a current magnitude of movement of the first multi-finger gesture relative to the first predetermined amount of movement.

19. An electronic device comprising:
one or more processors;
a non-transitory memory;
a touch-sensitive surface;
a display device; and
one or more programs, wherein the one or more programs are stored in the non-transitory memory and configured to be executed by the one or more processors, the one or more programs including instructions for:
  displaying, via the display device, an application user interface that includes first content with respect to which a first plurality of editing operations has been performed;
  while displaying the first content, detecting, on the touch-sensitive surface, a first multi-finger gesture directed to a region within the application user interface, wherein detecting the first multi-finger gesture includes concurrently detecting a first movement of a first contact in a respective direction and detecting a second movement of a second contact in the respective direction; and
  in response to detecting the first multi-finger gesture directed to the region within the application user interface and in accordance with a determination that the first multi-finger gesture includes more than a first predetermined amount of movement in a first direction, undoing one of the first plurality of editing operations in the application user interface;
  in response to detecting the first multi-finger gesture directed to the region within the application user interface and in accordance with a determination that the first multi-finger gesture includes more than the first predetermined amount of movement in a second direction that is different from the first direction, redoing one of the first plurality of editing operations in the application user interface; and
  in response to detecting the first multi-finger gesture directed to the region within the application user interface and in accordance with a determination that the first multi-finger gesture includes less than the first predetermined amount of movement, maintaining display of the application user interface that includes the first content without undoing or redoing any of the first plurality of editing operations.

20. The electronic device of claim 19, wherein the one or more programs further include instructions for:
in response to detecting the first multi-finger gesture:
  in accordance with the determination that the first multi-finger gesture includes more than the first predetermined amount of movement in the first direction, displaying, via the display device, an undo indicator indicative of an undo operation; and
  in accordance with the determination that the first multi-finger gesture includes more than the first predetermined amount of movement in the second direction, displaying, via the display device, a redo indicator indicative of a redo operation.

21. A non-transitory computer readable storage medium storing one or more programs, the one or more programs comprising instructions, which, when executed by an electronic device with one or more processors, a touch-sensitive surface, and a display device, cause the electronic device to:
display, via the display device, an application user interface that includes first content with respect to which a first plurality of editing operations has been performed;
while displaying the first content, detect, on the touch-sensitive surface, a first multi-finger gesture directed to a region within the application user interface, wherein detecting the first multi-finger gesture includes concurrently detecting a first movement of a first contact in a respective direction and detecting a second movement of a second contact in the respective direction; and
in response to detecting the first multi-finger gesture directed to the region within the application user interface and in accordance with a determination that the first multi-finger gesture includes more than a first predetermined amount of movement in a first direction, undo one of the first plurality of editing operations in the application user interface;
in response to detecting the first multi-finger gesture directed to the region within the application user interface and in accordance with a determination that the first multi-finger gesture includes more than the first predetermined amount of movement in a second direction that is different from the first direction, redo one of the first plurality of editing operations in the application user interface; and
in response to detecting the first multi-finger gesture directed to the region within the application user interface and in accordance with a determination that the first multi-finger gesture includes less than the first predetermined amount of movement, maintain display of the application user interface that includes the first content without undoing or redoing any of the first plurality of editing operations.

22. The non-transitory computer readable storage medium of claim 21, wherein the instructions further cause the electronic device to:
in response to detecting the first multi-finger gesture:
  in accordance with the determination that the first multi-finger gesture includes more than the first predetermined amount of movement in the first direction, display, via the display device, an undo indicator indicative of an undo operation; and in accordance with the determination that the first multi-finger gesture includes more than the first predetermined amount of movement in the second direction, display, via the display device, a redo indicator indicative of a redo operation.

\* \* \* \* \*